US005655147A

United States Patent [19]

Stuber et al.

[11] Patent Number: 5,655,147

[45] Date of Patent: Aug. 5, 1997

[54] SCSI HOST ADAPTER INTEGRATED CIRCUIT UTILIZING A SEQUENCER CIRCUIT TO CONTROL AT LEAST ONE NON-DATA SCSI PHASE WITHOUT USE OF ANY PROCESSOR

[75] Inventors: Craig A. Stuber, Santa Clara; Byron Arlen Young, Palo Alto, both of Calif.

[73] Assignee: Adaptec, Inc., Milpitas, Calif.

[21] Appl. No.: 229,864

[22] Filed: Apr. 19, 1994

Related U.S. Application Data

[63] Continuation of Ser. No. 663,091, Feb. 28, 1991, abandoned.

[51] Int. Cl.$^{6}$ .................... G06F 13/12

[52] U.S. Cl. .................... 395/827

[58] Field of Search .................... 395/200, 250, 395/275, 379, 800, 827, 840, 841, 375, 825, 826

[56] References Cited

U.S. PATENT DOCUMENTS

| | | | |
|---|---|---|---|
| 4,062,059 | 12/1977 | Suzuki et al. . | |
| 4,293,927 | 10/1981 | Hoshii | 395/750 |
| 4,298,954 | 11/1981 | Bigelow et al. | 395/250 |
| 4,371,932 | 2/1983 | Dinwiddie, Jr. et al. | 395/275 |
| 4,384,327 | 5/1983 | Conway et al. . | |
| 4,553,133 | 11/1985 | Peterson et al. . | |
| 4,590,468 | 5/1986 | Stieglitz | 395/325 |
| 4,590,553 | 5/1986 | Noda | 395/750 |
| 4,602,327 | 7/1986 | LaViolette et al. | 395/325 |
| 4,635,194 | 1/1987 | Burger et al. . | |
| 4,694,393 | 9/1987 | Hirano et al. | 395/750 |
| 4,716,525 | 12/1987 | Gilanyi et al. . | |
| 4,748,559 | 5/1988 | Smith et al. | 395/750 |
| 4,766,567 | 8/1988 | Kato | 395/750 |
| 4,805,137 | 2/1989 | Grant et al. | 395/325 |
| 4,829,473 | 5/1989 | Keller et al. | 341/50 |
| 4,843,544 | 6/1989 | DuLac et al. | 395/250 |
| 4,864,291 | 9/1989 | Korpi . | |
| 4,888,691 | 12/1989 | George et al. | 395/700 |
| 4,905,184 | 2/1990 | Giridhar et al. . | |
| 4,933,840 | 6/1990 | Sera et al. . | |
| 4,942,515 | 7/1990 | Marzucco et al. | 395/275 |
| 4,965,801 | 10/1990 | DuLac | 371/40.1 |
| 4,975,829 | 12/1990 | Clarey et al. . | |
| 5,056,011 | 10/1991 | Yoshitake et al. | 395/425 |
| 5,204,951 | 4/1993 | Keener et al. . | |

(List continued on next page.)

FOREIGN PATENT DOCUMENTS

| | | |
|---|---|---|
| 28 7301 A2 | 10/1988 | European Pat. Off. . |
| 45 1516 A1 | 10/1991 | European Pat. Off. . |

*Primary Examiner*—Richard L. Ellis
*Attorney, Agent, or Firm*—Skjerven, Morrill, MacPherson, Franklin & Friel; Forrest E. Gunnison

[57] ABSTRACT

A single chip circuit is used in combination with a host system microprocessor to provide host-adapter functions for a SCSI interface. The host adapter integrated circuit includes a 128 byte DMA FIFO, a 8 byte SCSI FIFO, hardwired automatic sequencers for the SCSI ARBITRATION and SELECTION phases, hardware interrupt generating circuitry, two clock sources, a register set and a powerdown capability. The host computer system microprocessor is used to perform selected SCSI phases. Other SCSI phases are performed automatically by the integrated circuit of this invention. When a delay in a SCSI phase is anticipated, according to the principles of this invention control of the microprocessor is returned to the host computer system. Hence, the microprocessor may execute a user application while the integrated circuit simultaneously performs one or more SCSI phases. When the SCSI phase is complete or other predetermined conditions occur on the SCSI bus, a hardware interrupt is sent to the microprocessor. In response to the interrupt, the microprocessor is available to support further SCSI operations by the integrated circuit of this invention.

52 Claims, 348 Drawing Sheets

Microfiche Appendix Included
(6 Microfiche, 366 Pages)

U.S. PATENT DOCUMENTS

| | | |
|---|---|---|
| 5,233,692 | 8/1993 | Gajjar et al. . |
| 5,237,660 | 8/1993 | Weber et al. . |
| 5,241,630 | 8/1993 | Lattin, Jr. et al. . |
| 5,276,807 | 1/1994 | Kodama et al. . |
| 5,280,601 | 1/1994 | Desai et al. . |
| 5,283,872 | 2/1994 | Ohnishi . |
| 5,287,460 | 2/1994 | Olsen et al. . |
| 5,287,463 | 2/1994 | Frame et al. . |
| 5,299,315 | 3/1994 | Chin et al. . |
| 5,313,588 | 5/1994 | Nagashige et al. . |
| 5,333,276 | 7/1994 | Solari . |
| 5,404,548 | 4/1995 | Nishioka . |
| 5,410,674 | 4/1995 | Lawler . |

| Parameter | Description | min | typ | max | note |
|---|---|---|---|---|---|
| tbfr | SEL, BSY, SCSI RST to BUS FREE | | | 470 | |
| tpci | Phase change to interrupt | | | 37 | |
| tpmi | Phase chg and REQ to interrupt | | | 40 | |
| tpc | IOW to phase change | | | 46 | 1 |

Notes:

1. Target mode

| Parameter | Description | min | typ | max | note |
|---|---|---|---|---|---|
| tbsy | ENSELO to BSY true | | | 870 | |
| tsel | ENSELO to SEL true | | | 3280 | |
| tslg | ENSELO to SELINGO interrupt | | | 4670 | |
| tsld | Target BSY to SELDO interrupt | | | 270 | |
| toid | BSY assertion to own ID | | | 20 | |
| ttid | SEL assertion to target ID | 1200 | | | |

| Parameter | Description | min | typ | max | note |
|---|---|---|---|---|---|
| trdy | REQ true to SPIORDY interrupt | | | 225 | |
| tclr | IOR true to SPIORDY cleared | | | 60 | |
| tack | IOR false to ack asserted | | | 175 | |
| tacko | REQ false to ACK false | | | 125 | |

| Parameter | Description | min | typ | max | note |
|---|---|---|---|---|---|
| tas | Address setup time | 25 | | | |
| tah | Address hold time | 25 | | | |
| tdd | Valid data delay from IOR | 6.1 | | 21.4 | |
| tdv | Data valid hold time | 4.7 | | 17.2 | |
| tnd | Time between consecutive IOR | 100 | | | |
| toff | Driver off time from IOR | 5.2 | | 20.7 | |
| ton | Driver on time from IOR | 6.1 | | 21.4 | |
| tcyc | Cycle time | 200 | | | |

| Parameter | Description | min | typ | max | note |
|---|---|---|---|---|---|
| tas | Address setup time | 25 | | | |
| tah | Address hold time | 25 | | | |
| tds | Data setup time | | | | |
| tdh | Data hold time | | | | |
| tnd | Time between consecutive IOW | 100 | | | |

| Parameter | Description | min | typ | max | note |
|---|---|---|---|---|---|
| ton | Data valid delay from IOR low | 7.2 | | 21.4 | |
| thld | Data hold time from IOR high | 5.2 | | 20.7 | |
| tnd | Time between consecutive IOR | 200 | | | |
| tqo | DRQ off time from IOR | 17.8 | | 42.8 | |
| tcyc | Read cycle time | 400 | | | |
| ttw | Terminal count pulse width | 50 | | | |

| Parameter | Description | min | typ | max | note |
|---|---|---|---|---|---|
| tds | Data setup time | | | | |
| tdh | Data hold time | | | | |
| tnd | Time between consecutive IOW | 200 | | | |
| tqo | DRQ off time from IOW | 17.8 | | 42.8 | |
| tcyc | Write cycle time | 400 | | | |
| ttw | Terminal count pulse width | 50 | | | |

| Parameter | Description | min | typ | max | note |
| --- | --- | --- | --- | --- | --- |
| tas | Address setup time | 25 | | | |
| tah | Address hold time | 25 | | | |
| tds | Data setup time | 5 | | | |
| tdh | Data hold time | 15 | | | |

| Parameter | Description | min | typ | max | note |
|---|---|---|---|---|---|
| tas | Address setup time | 25 | | | |
| tah | Address hold time | 25 | | | |
| tdd | Valid data delay from IOR | 6.1 | | 21.4 | |
| tdv | Data valid hold time | 4.7 | | 17.2 | |
| toff | Driver off time from IOR | 5.2 | | 20.7 | |
| ton | Driver on time from IOR | 6.1 | | 21.4 | |

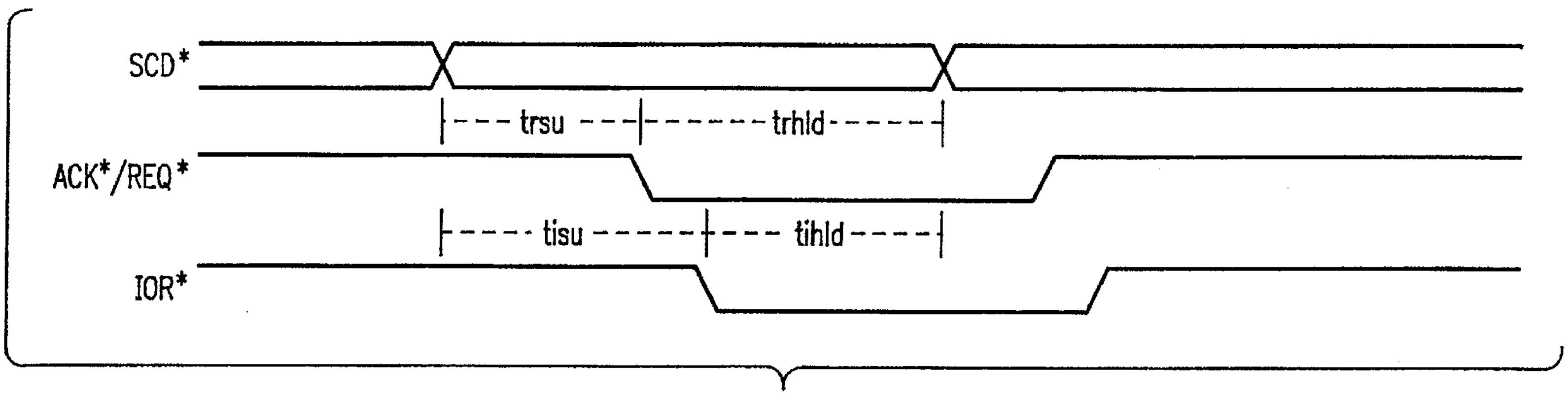

| Parameter | Description | min | typ | max | note |
|---|---|---|---|---|---|
| trsu | SCSI Data setup to REQ or ACK | 5 | | | 1 |
| trhld | SCSI Data hold from REQ or ACK | 15 | | | 1 |
| tisu | SCSI Data setup to IOR | 15 | | | 2 |
| tihld | SCSI Data hold from IOR | 5 | | | 2 |

Notes:

1. Initiator mode uses leading edge of REQ to latch data, and Target mode uses leading edge of ACK. These times apply to synchronous, asynchronous, and auto pio modes of operation.
2. These times apply to programmed I/O when reading port 347h.

KEY TO FIG. 47B

KEY TO FIG. 47C

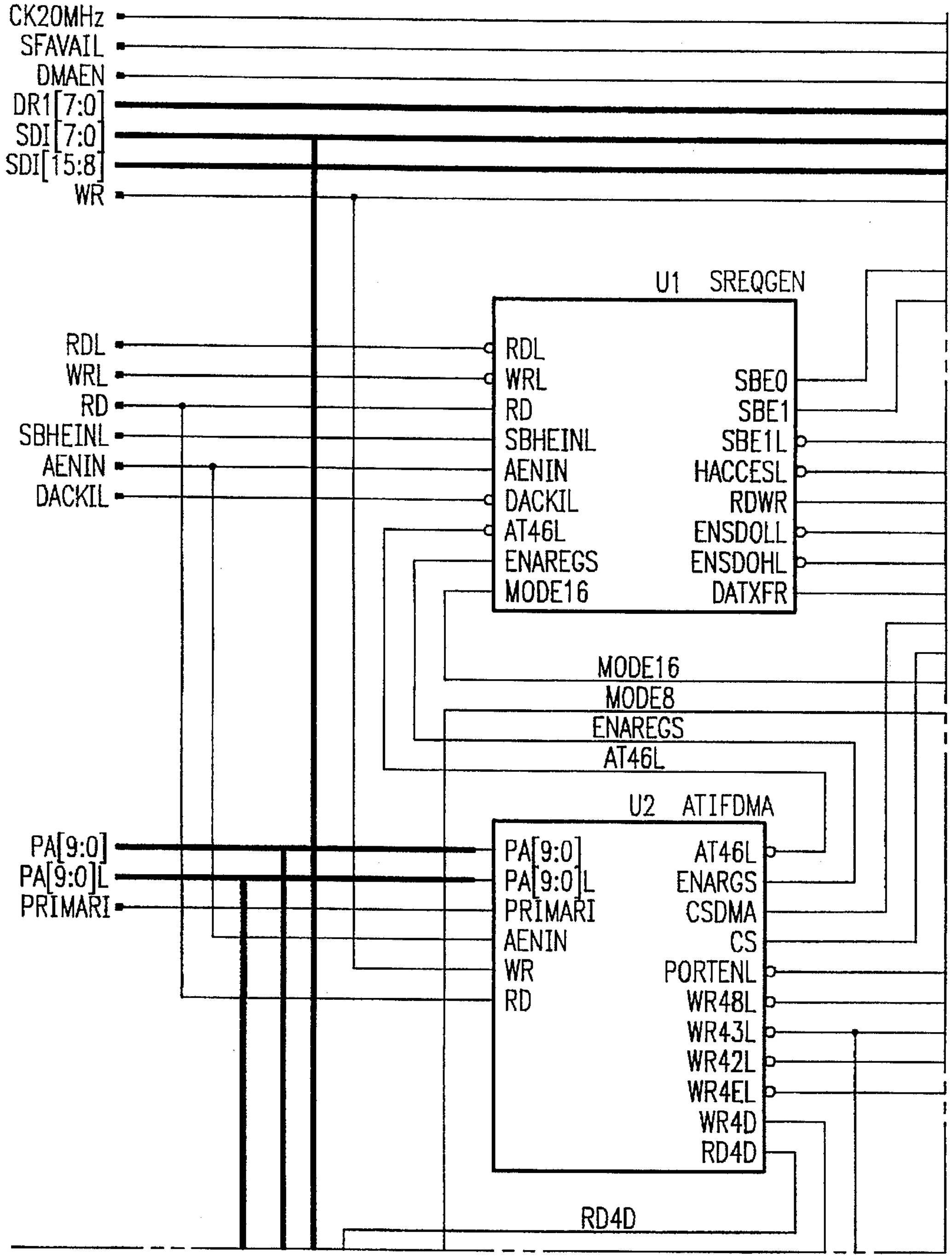
FIG. 56A-1
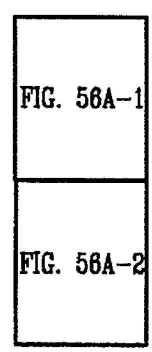
KEY TO FIG. 56A

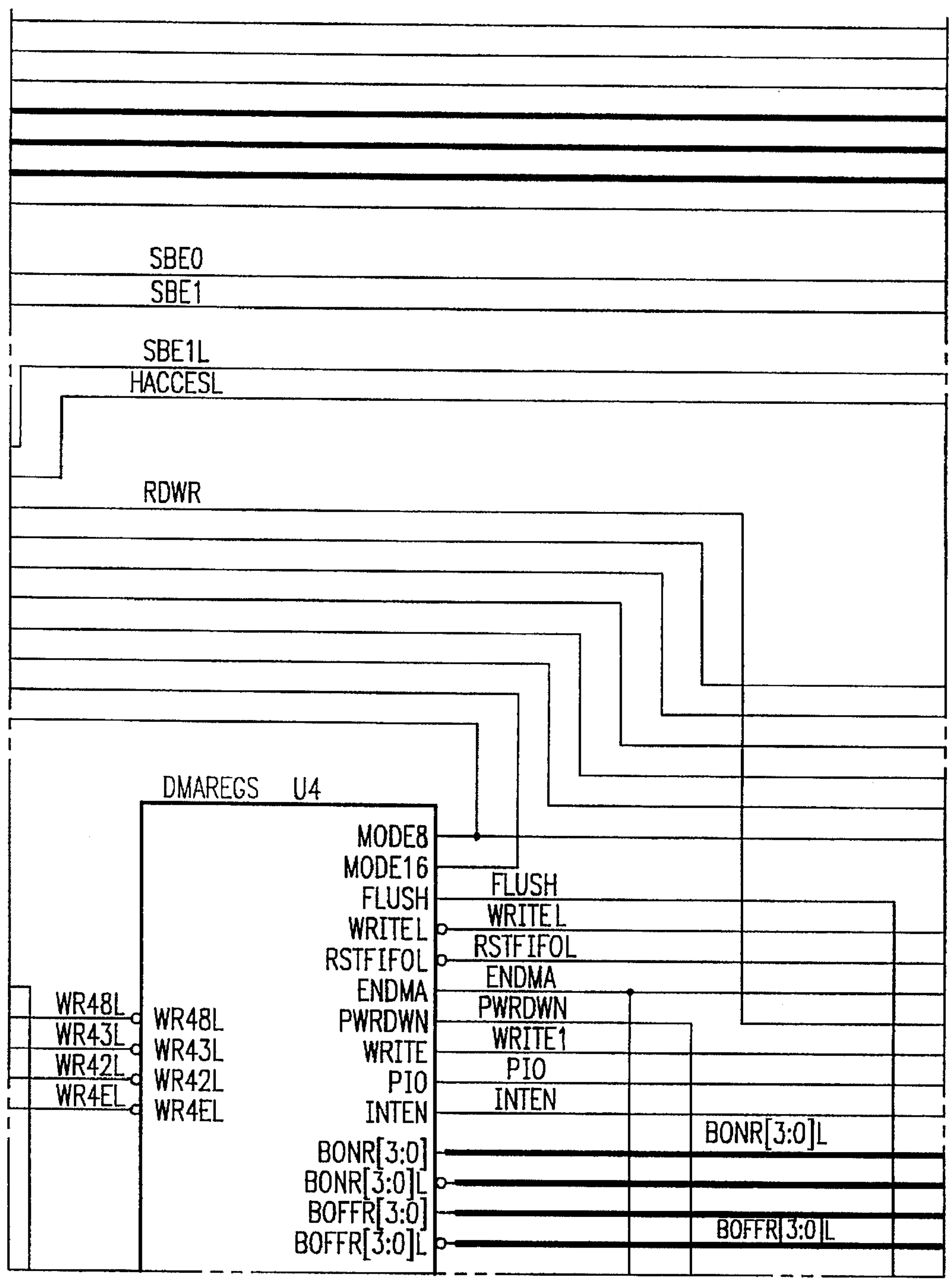
FIG. 56B-1
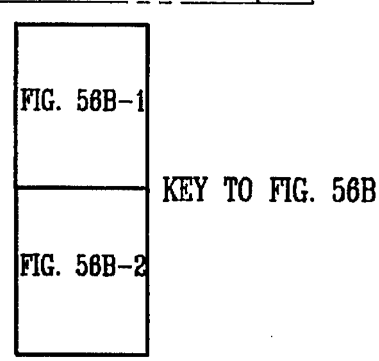

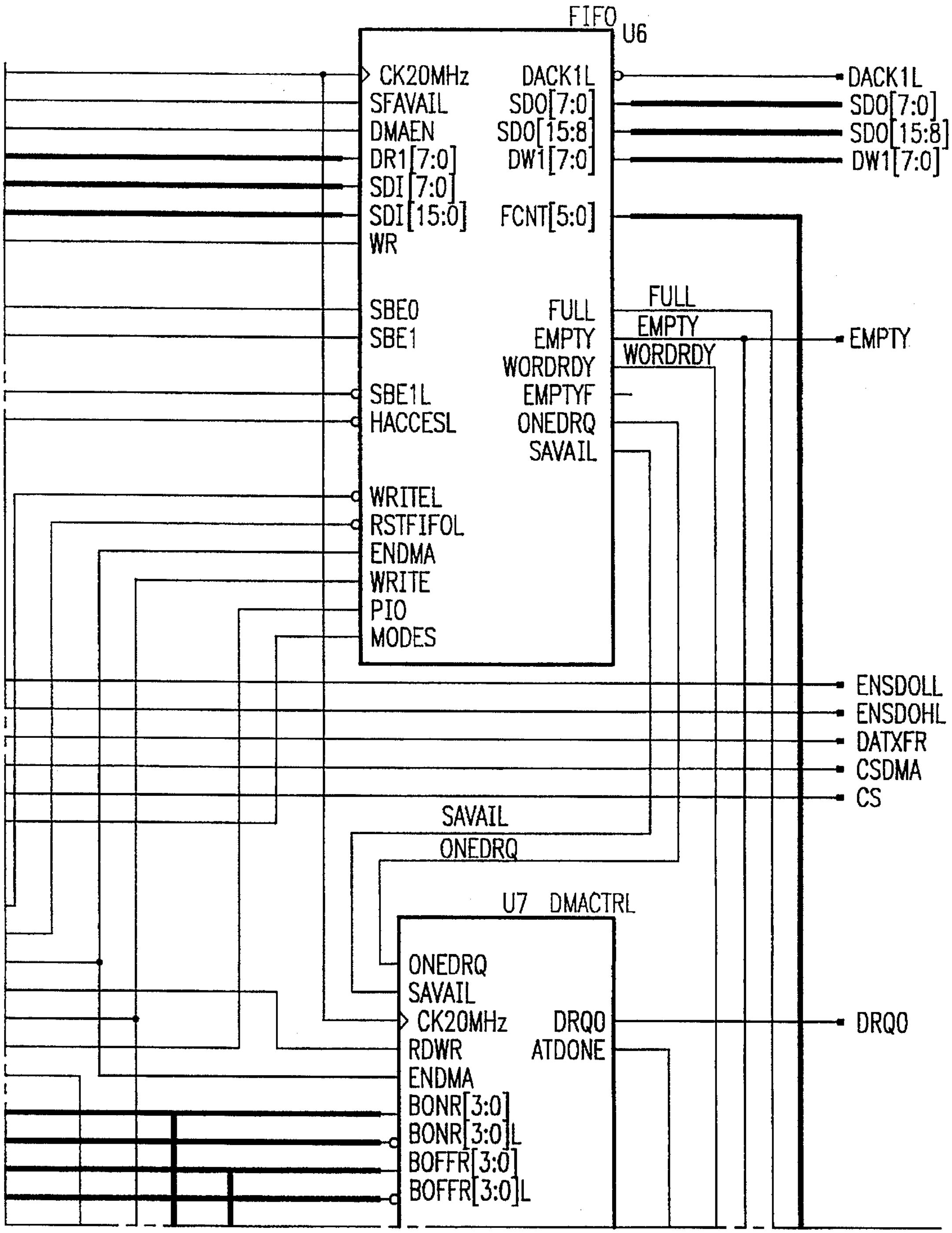
FIG. 56C-1
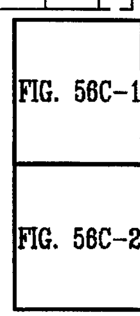
KEY TO FIG. 56C

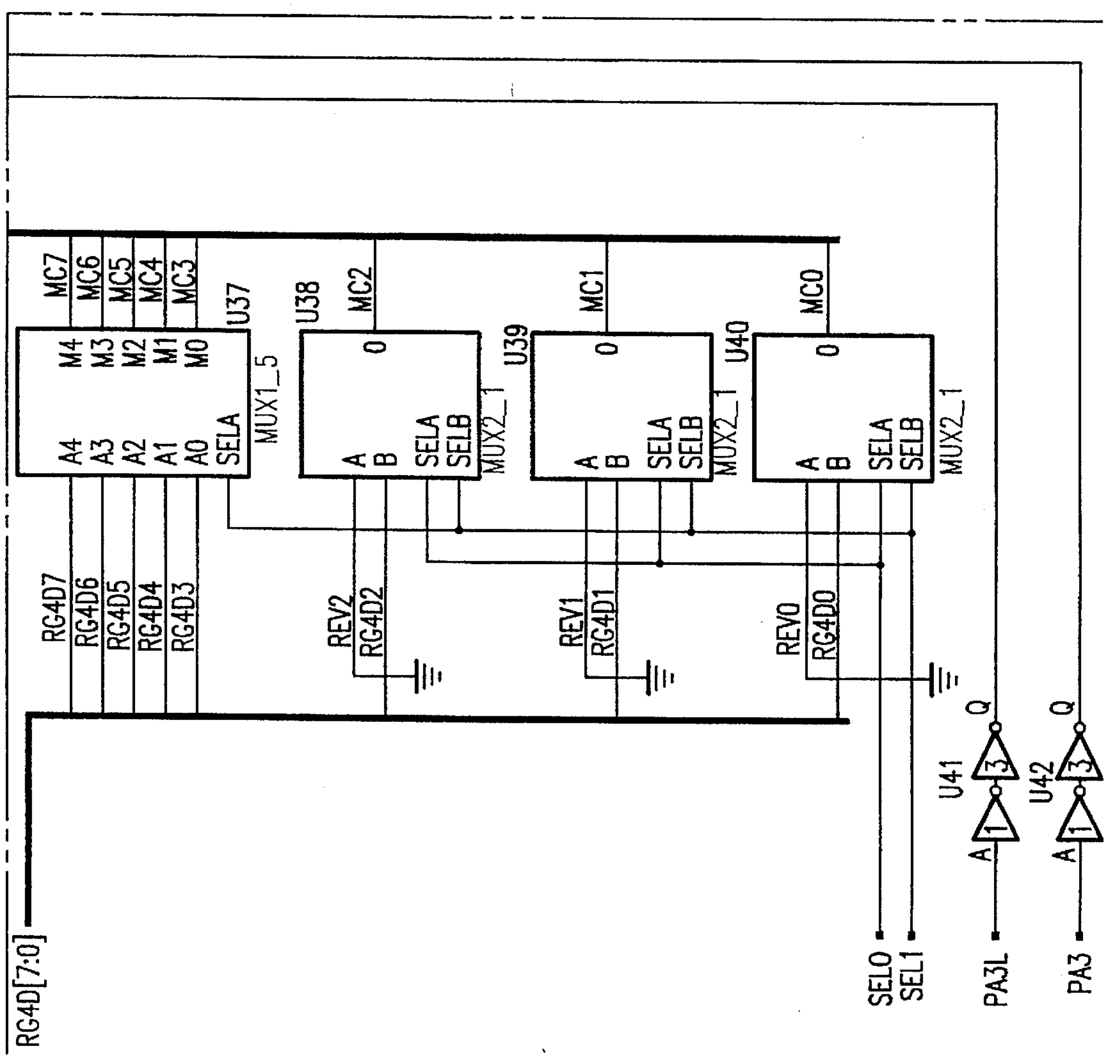
FIG. 68A-2
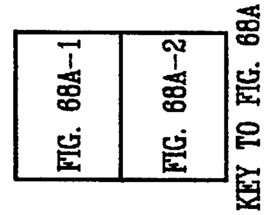
KEY TO FIG. 68A

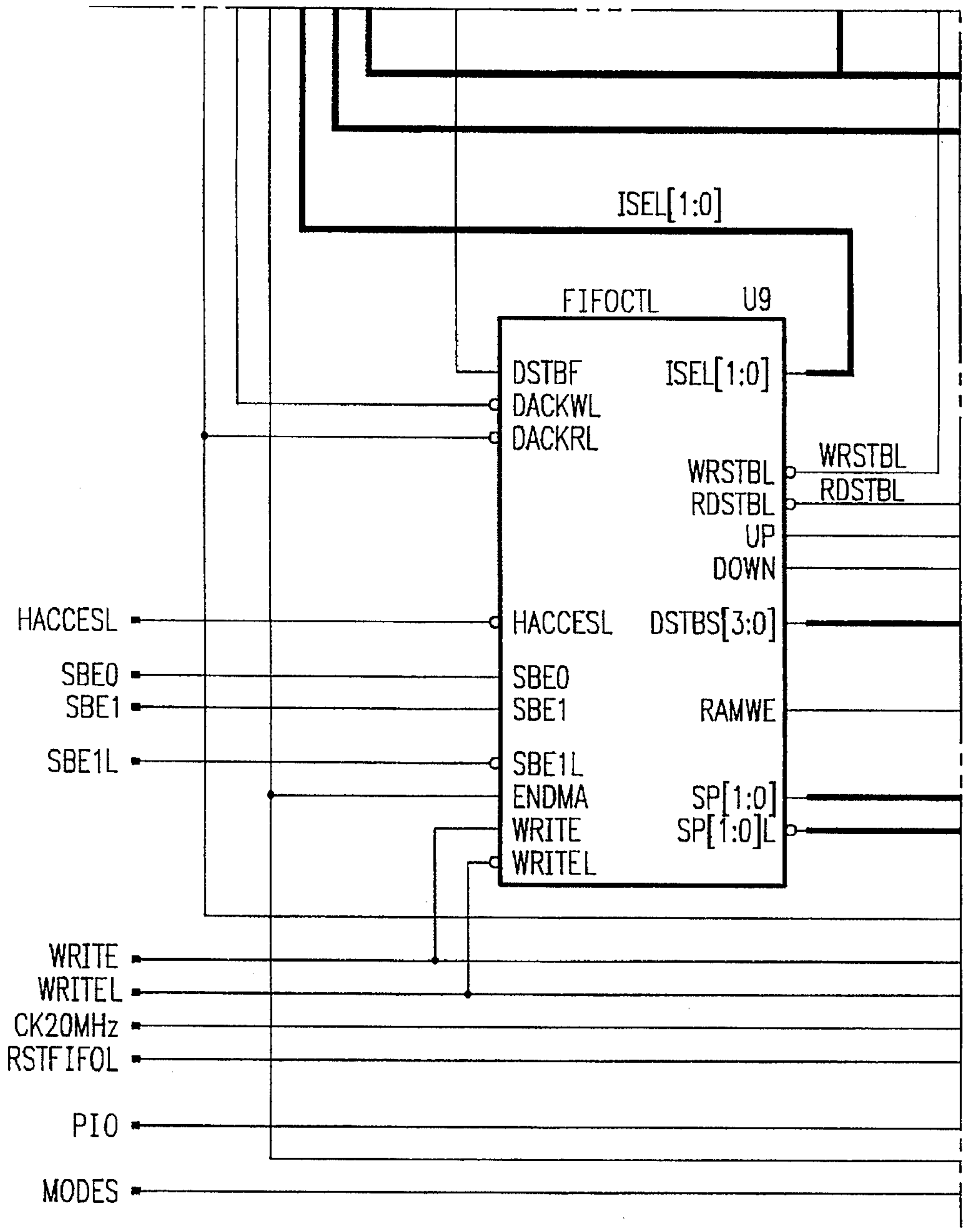
FIG. 72A-2
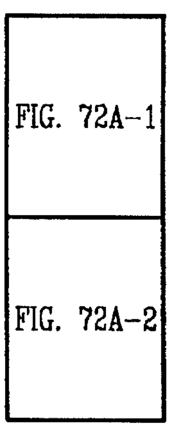
KEY TO FIG. 72A

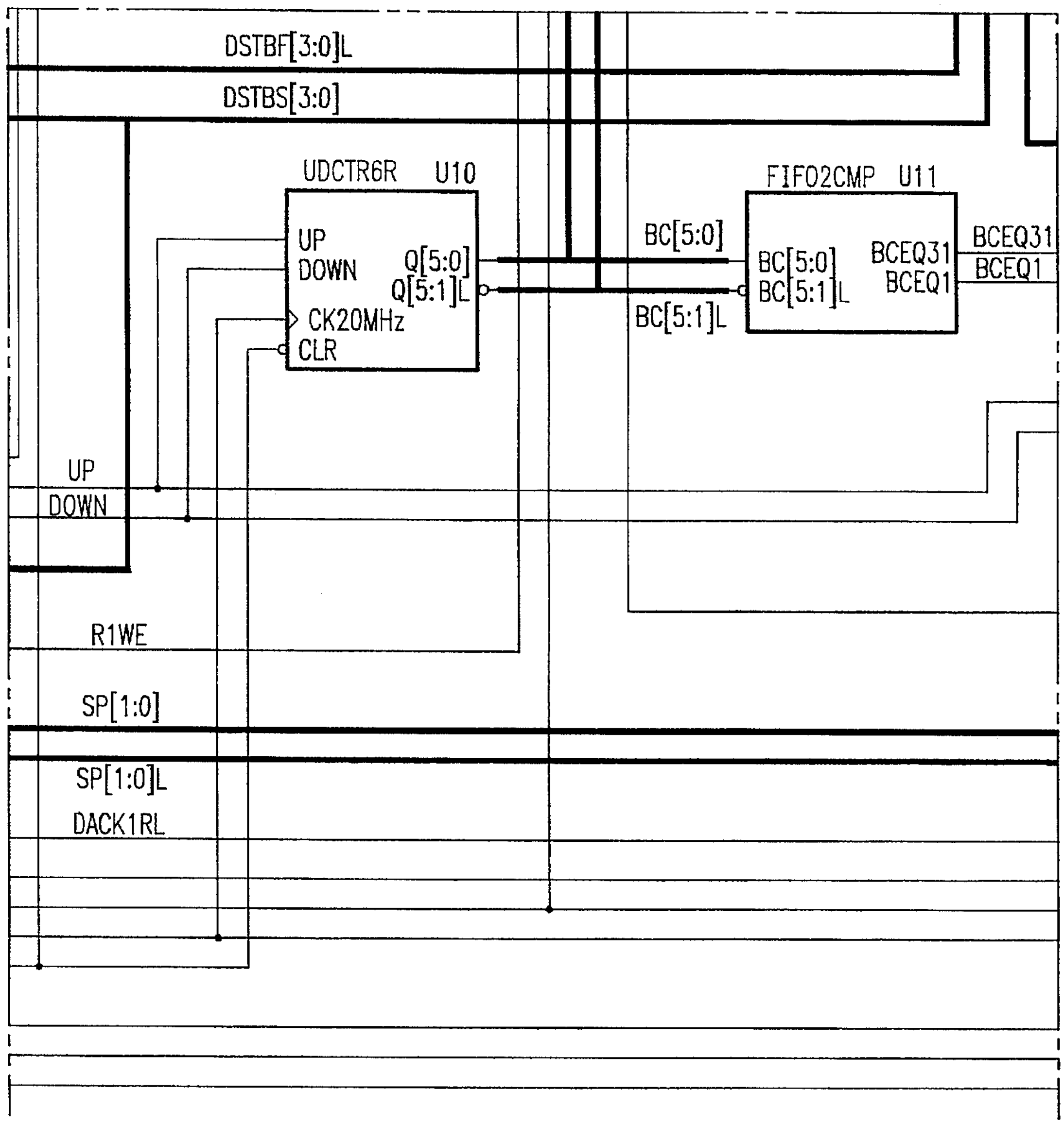
FIG. 72B-2
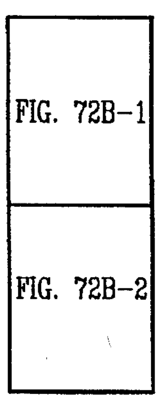
KEY TO FIG. 72B

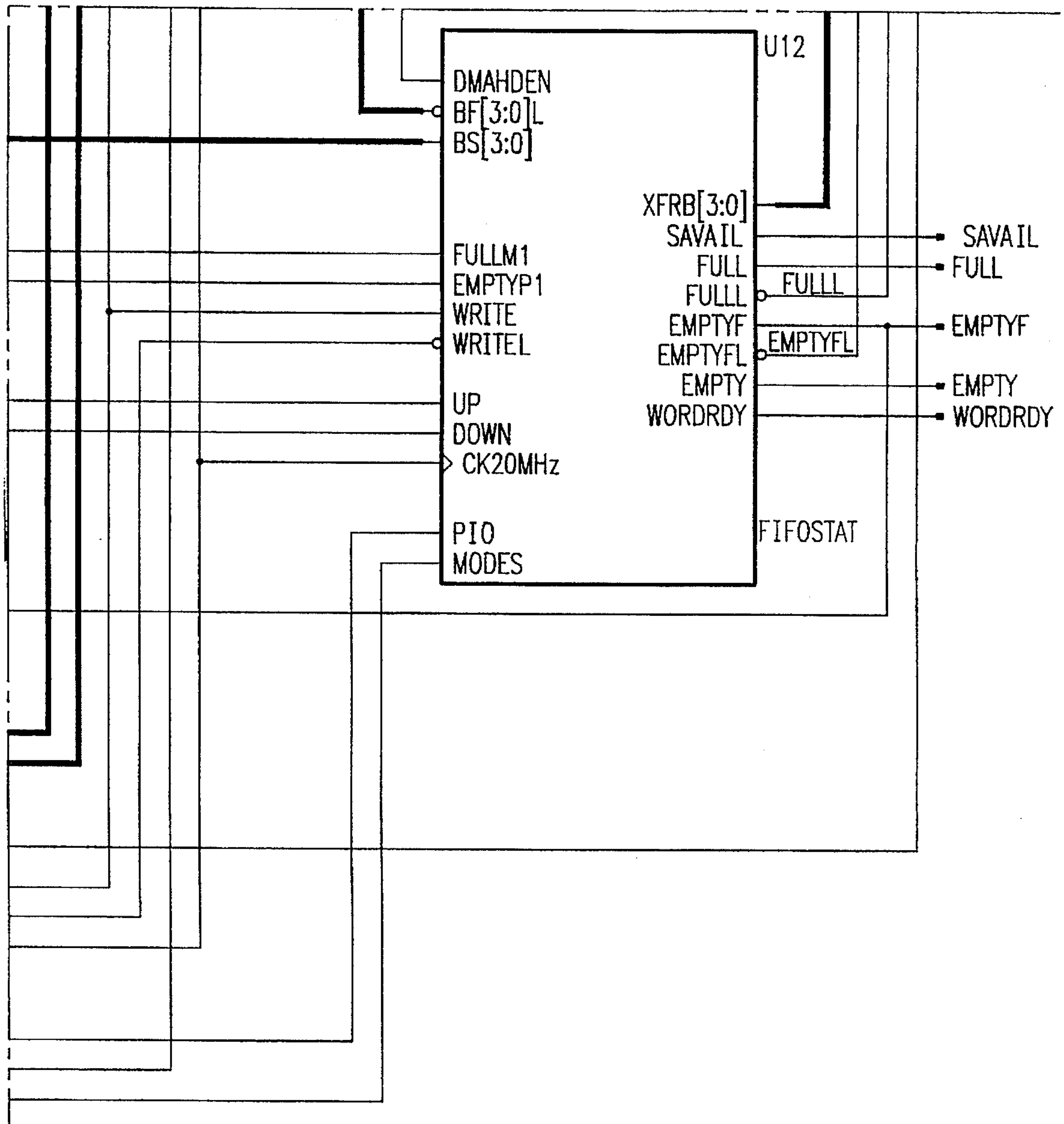
FIG. 72C-2
KEY TO FIG. 72C
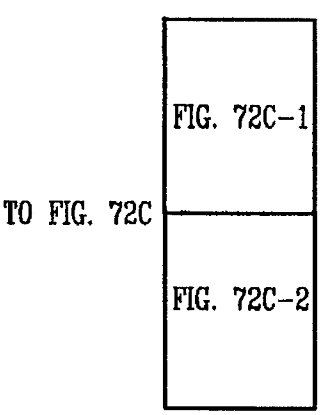

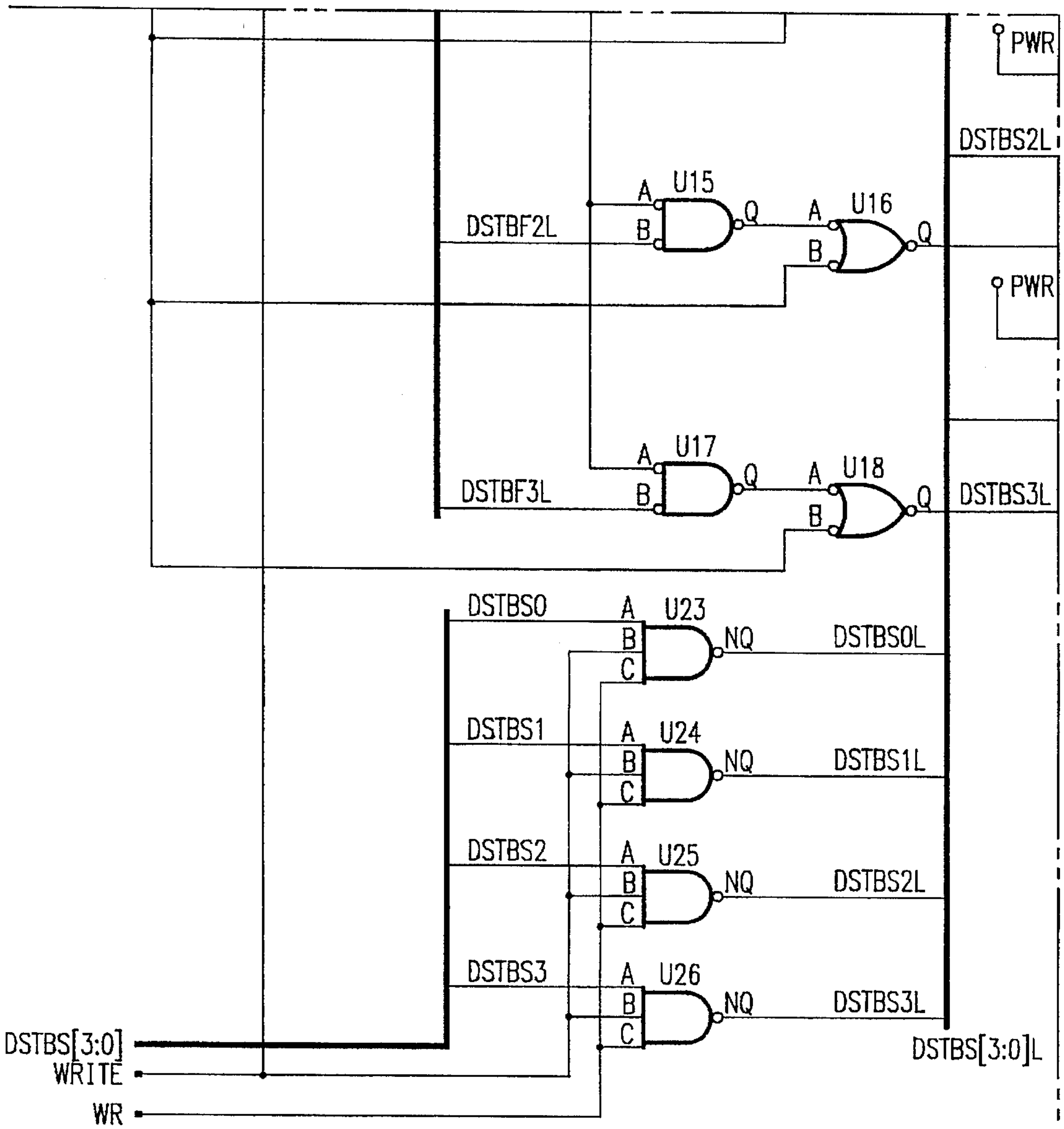
FIG. 73A-2
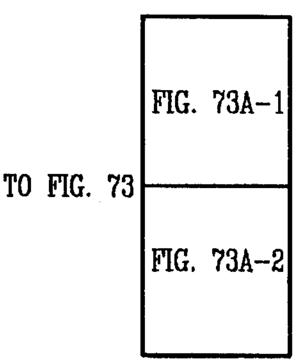
KEY TO FIG. 73

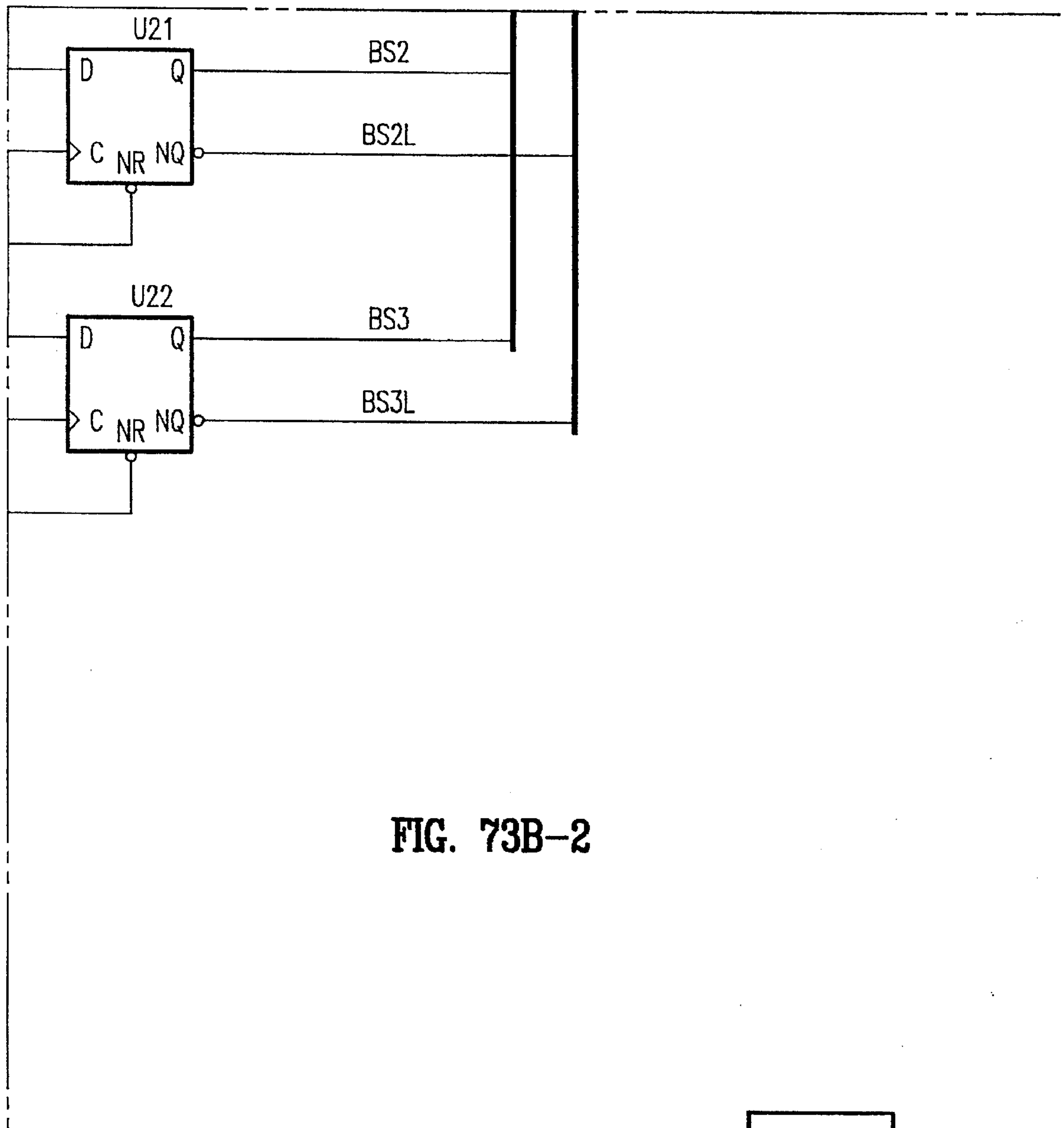
FIG. 73B-2
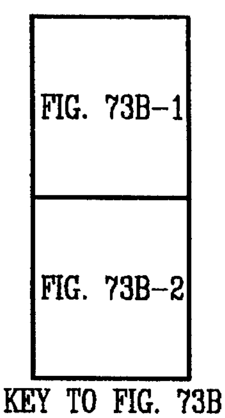
KEY TO FIG. 73B

KEY TO FIG. 85A

KEY TO FIG. 86A

KEY TO FIG. 86B

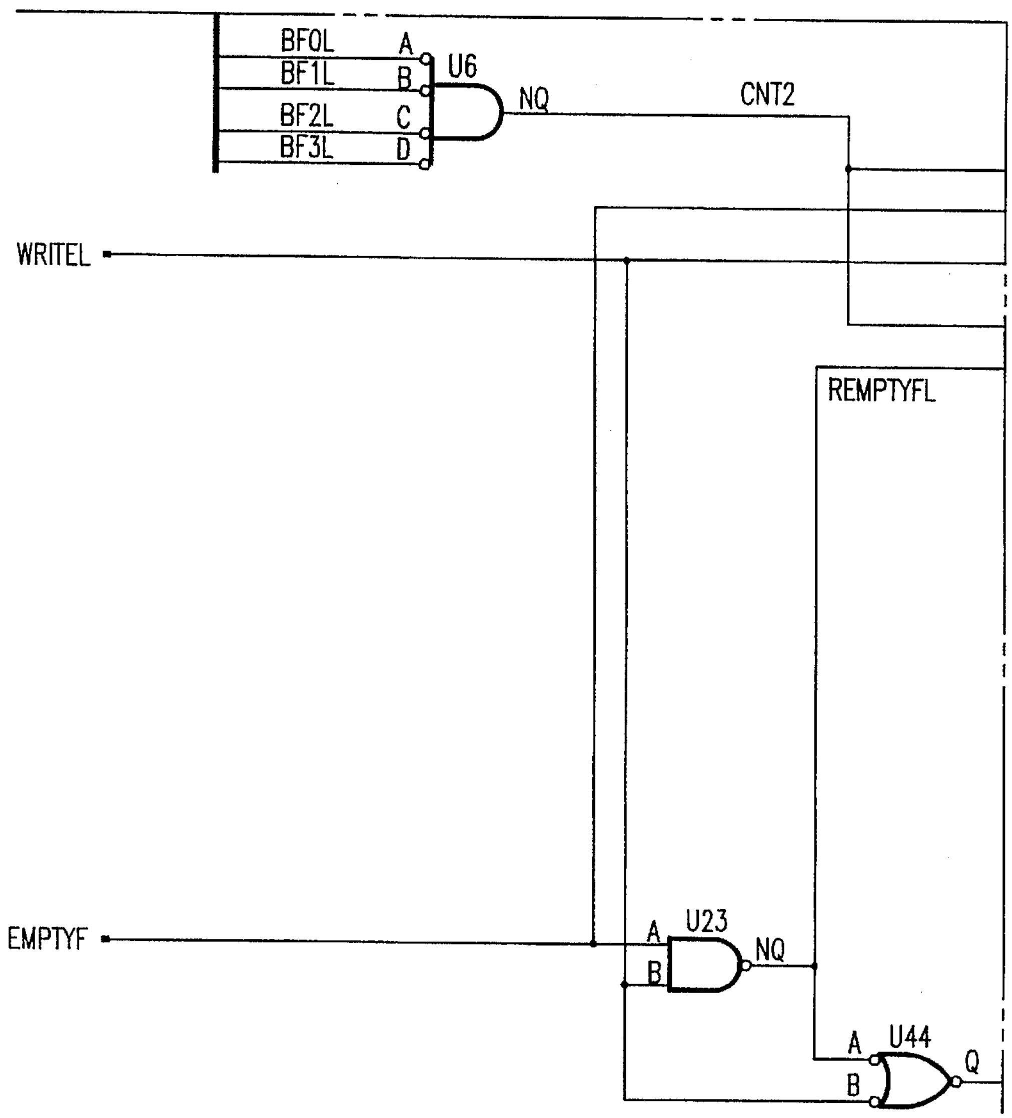
FIG. 87A-2
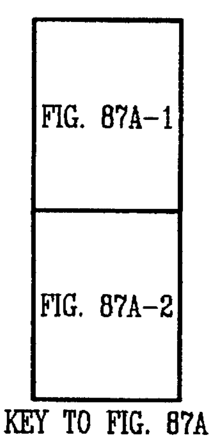
KEY TO FIG. 87A

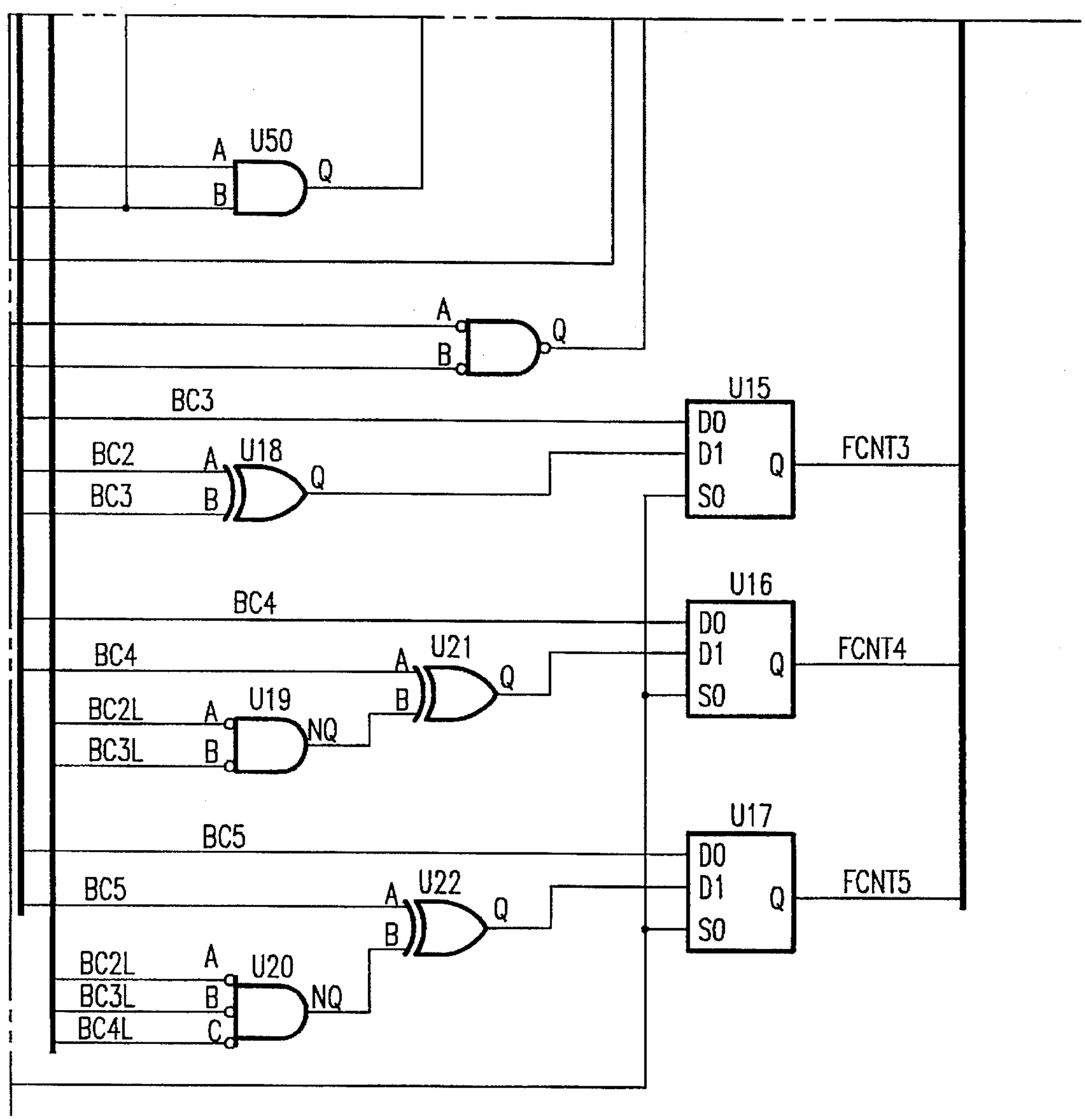
FIG. 87B-2
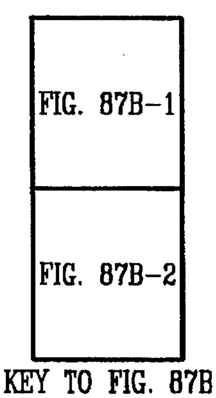
KEY TO FIG. 87B

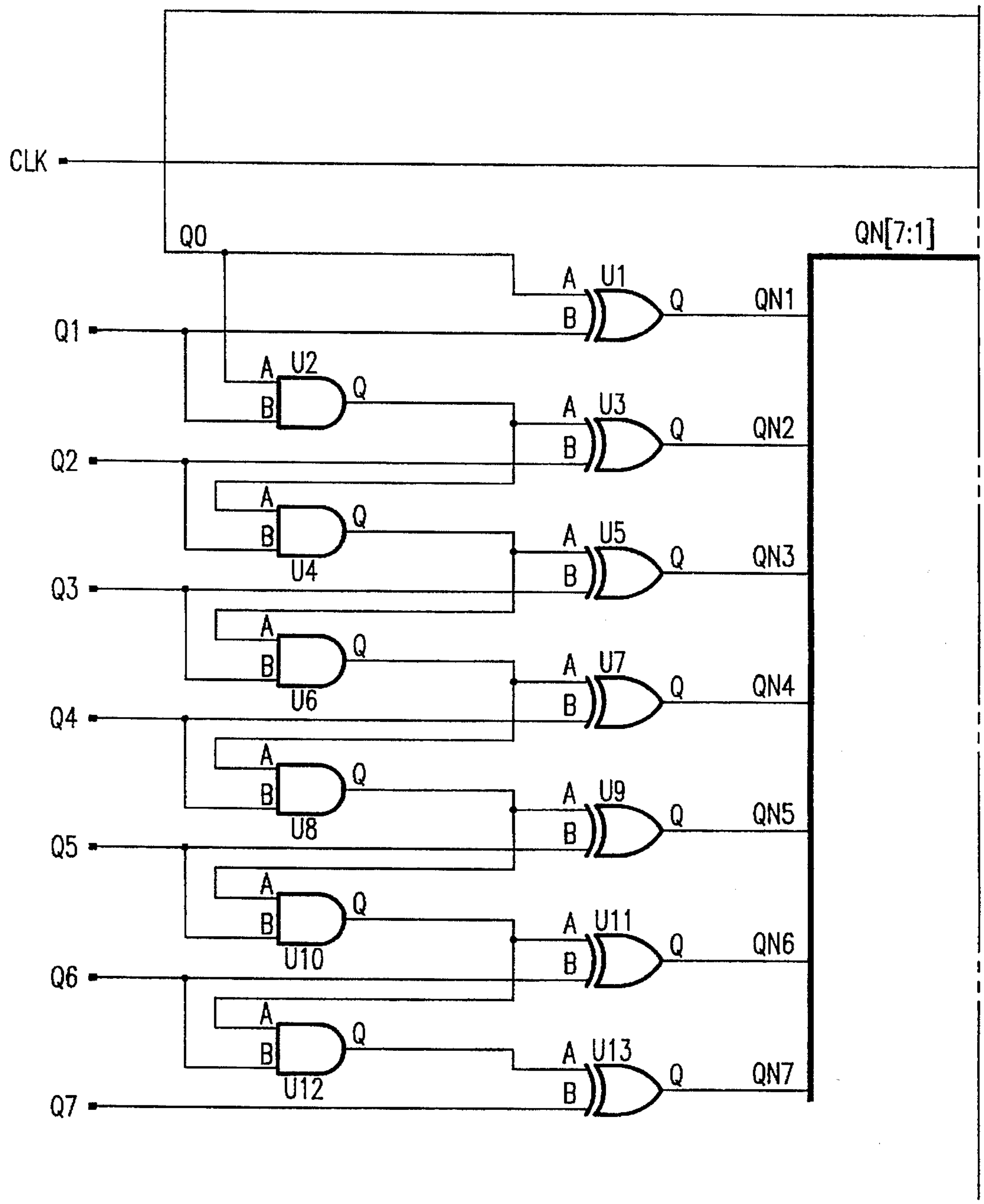
FIG. 93A
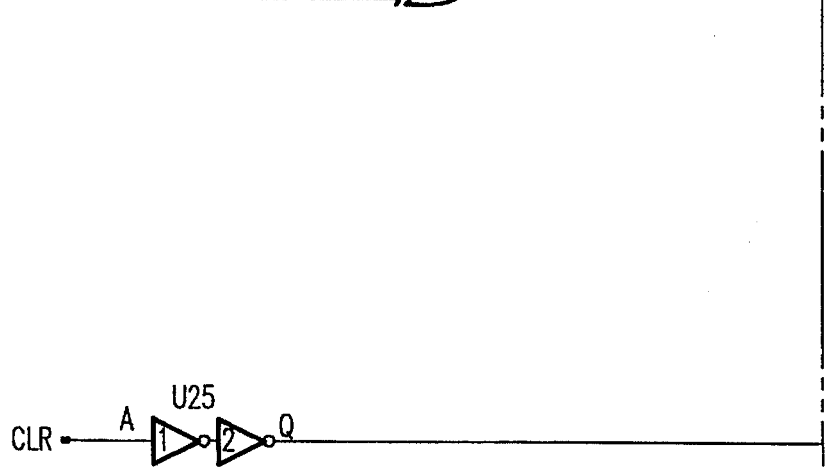

KEY TO FIG. 96A

KEY TO FIG. 96B

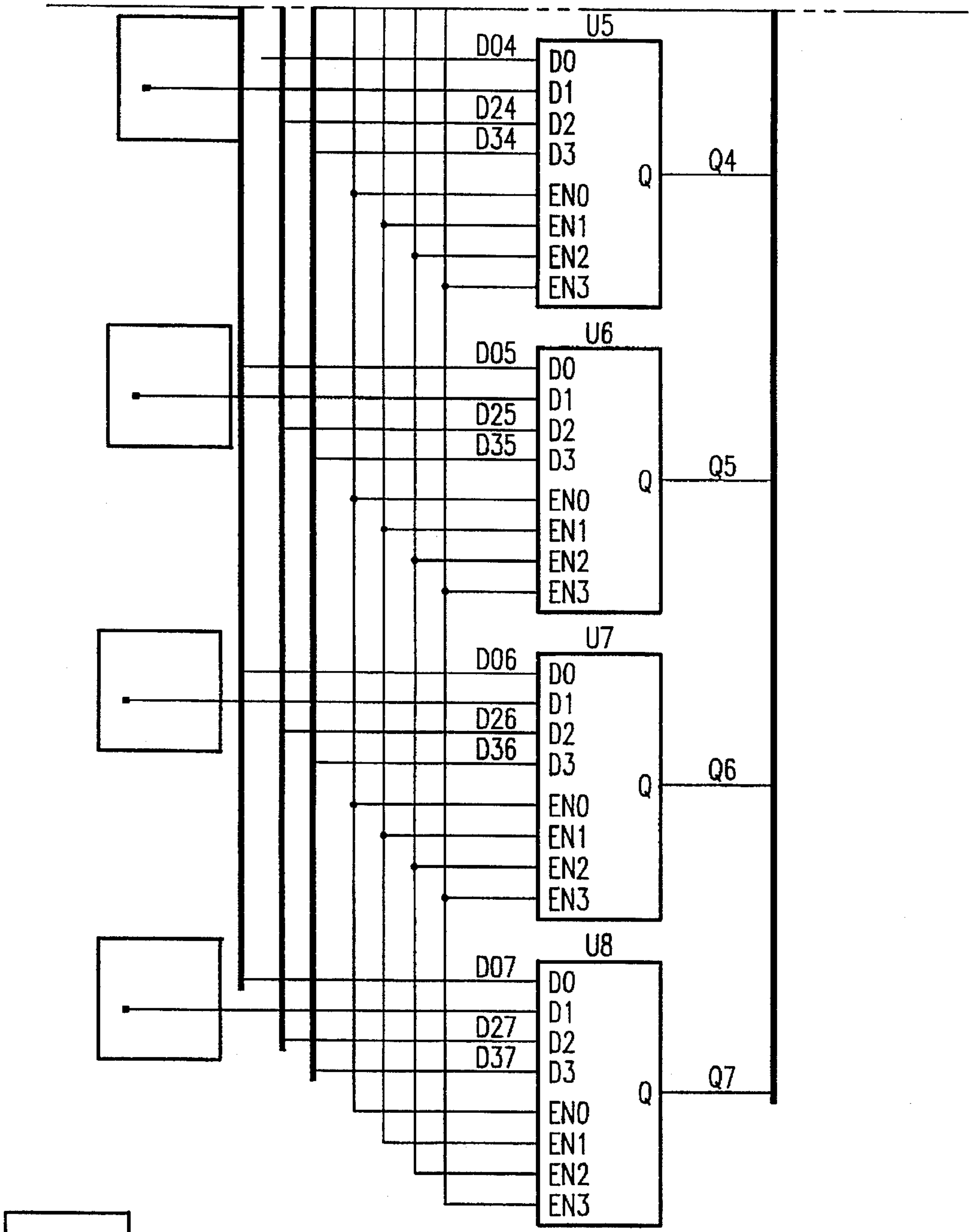
FIG. 111B
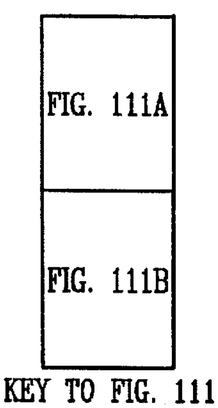
KEY TO FIG. 111

| | |
|---|---|
| FIG. 118B-1 | FIG. 118B-2 |

KEY TO FIG. 118B

KEY TO FIG. 118C

| I2 | I2 | I2 | O6 | O5 | O4 | O3 | O2 | O1 | O0 |
|---|---|---|---|---|---|---|---|---|---|
| 0 | 0 | 0 | 0 | 0 | 0 | 0 | 0 | 0 | 0 |
| 0 | 0 | 1 | 0 | 0 | 0 | 0 | 0 | 0 | 1 |
| 0 | 1 | 0 | 0 | 0 | 0 | 0 | 0 | 1 | 1 |
| 0 | 1 | 1 | 0 | 0 | 0 | 0 | 1 | 1 | 1 |
| 1 | 0 | 0 | 0 | 0 | 0 | 1 | 1 | 1 | 1 |
| 1 | 0 | 1 | 0 | 0 | 1 | 1 | 1 | 1 | 1 |
| 1 | 1 | 0 | 0 | 1 | 1 | 1 | 1 | 1 | 1 |
| 1 | 1 | 1 | 1 | 1 | 1 | 1 | 1 | 1 | 1 |

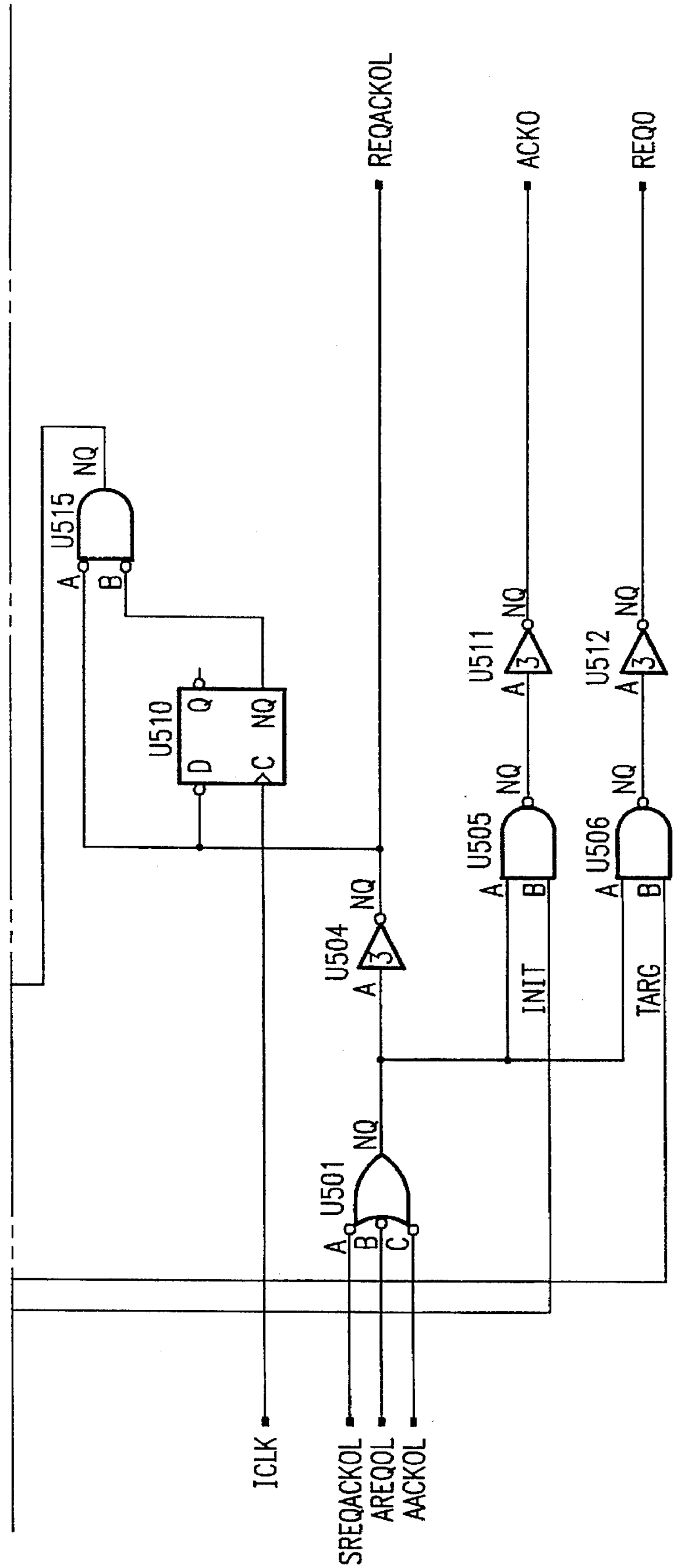
FIG. 121B
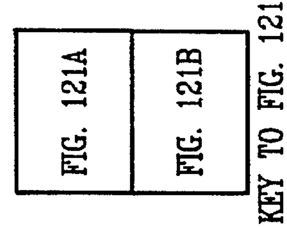
KEY TO FIG. 121

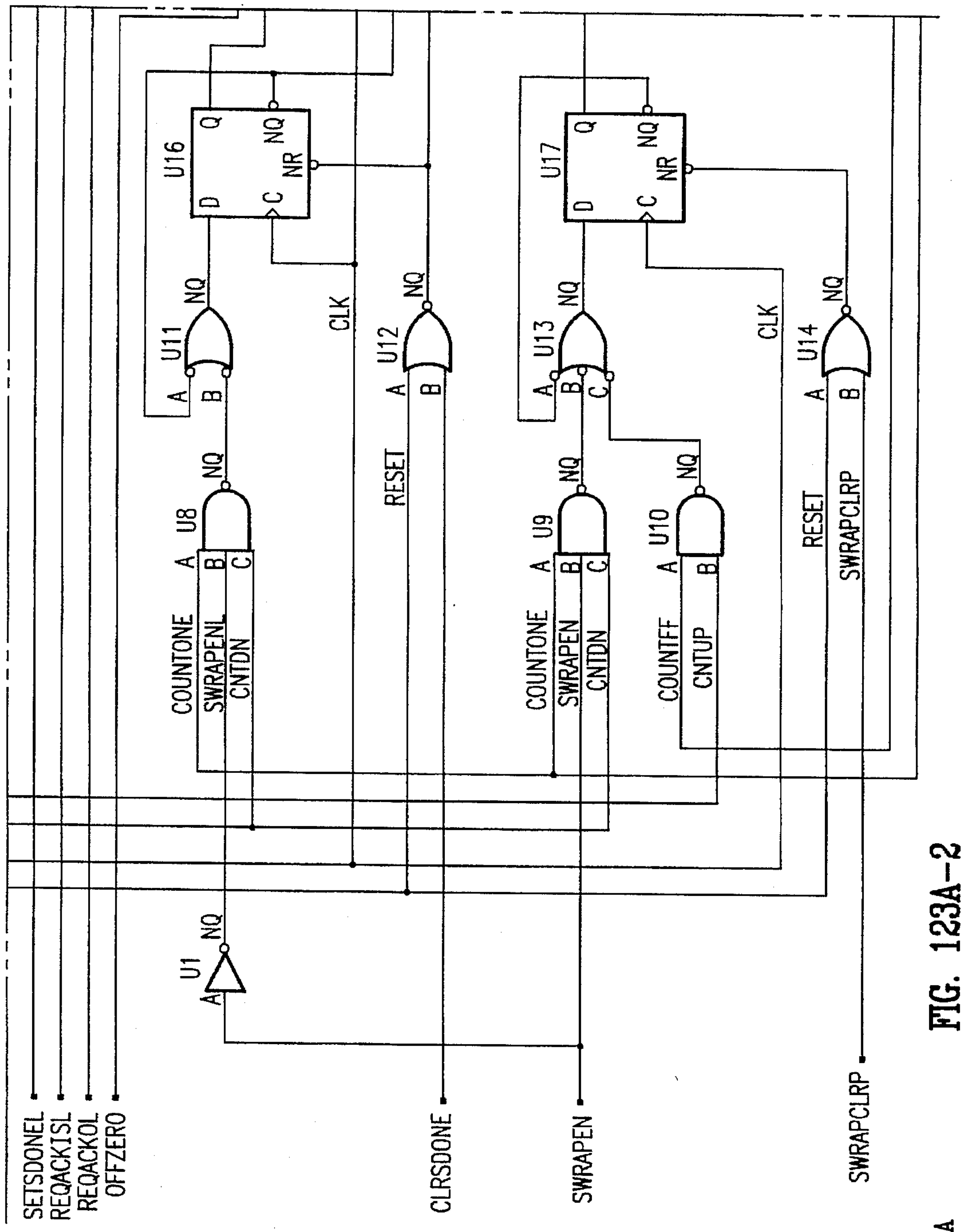
FIG. 123A-2
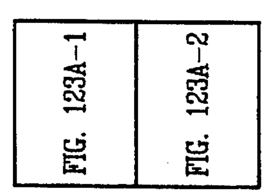
KEY TO FIG. 123A

| | |
|---|---|
| FIG. 125C-1 | FIG. 125C-2 |

KEY TO FIG. 125C

KEY TO FIG. 125D

KEY TO FIG. 126A

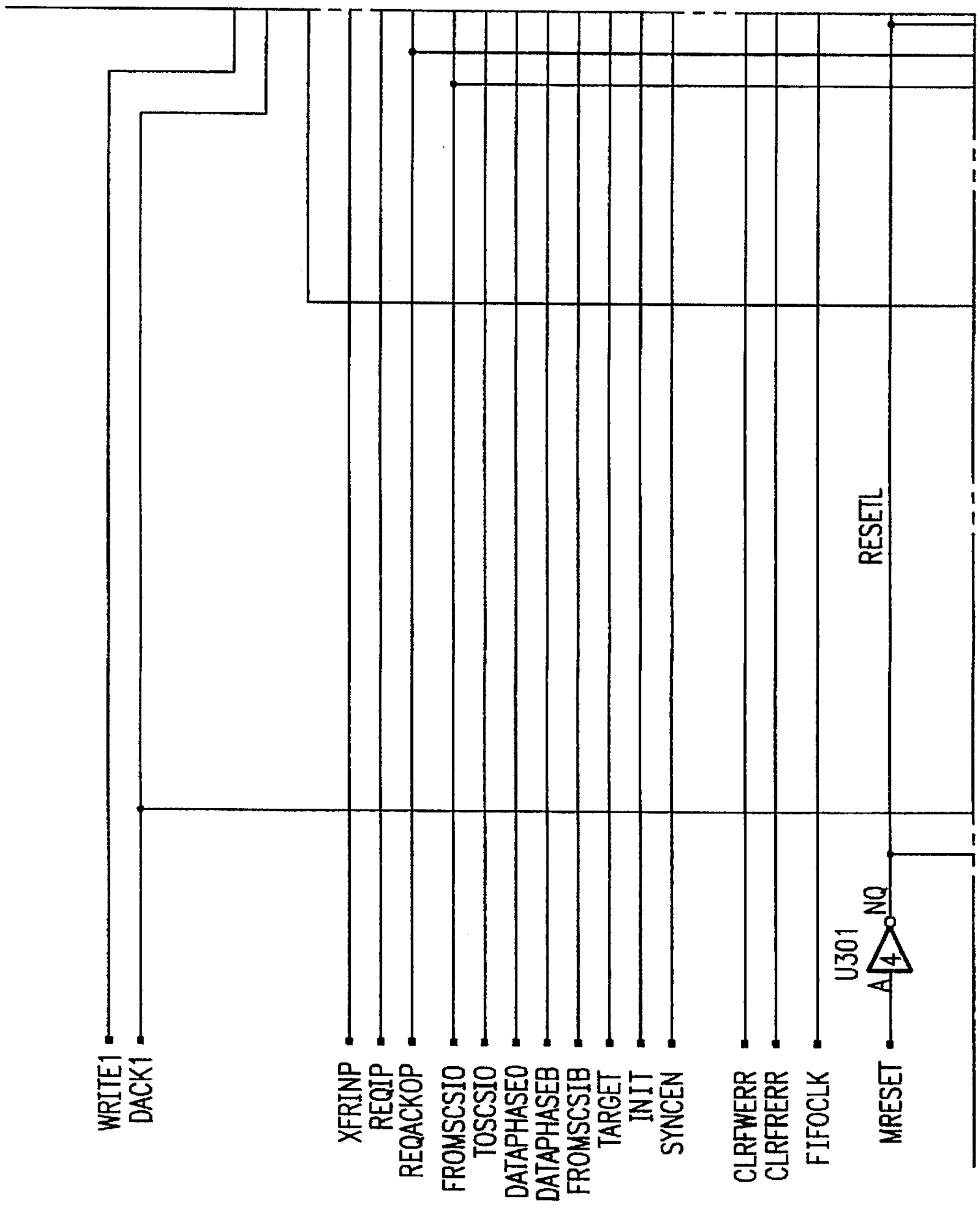
FIG. 127A-1
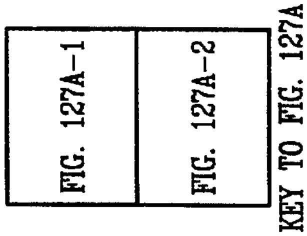
KEY TO FIG. 127A

KEY TO FIG. 127B

| FIG. 128A-1 | FIG. 128A-2 |
|---|---|

KEY TO FIG. 128A

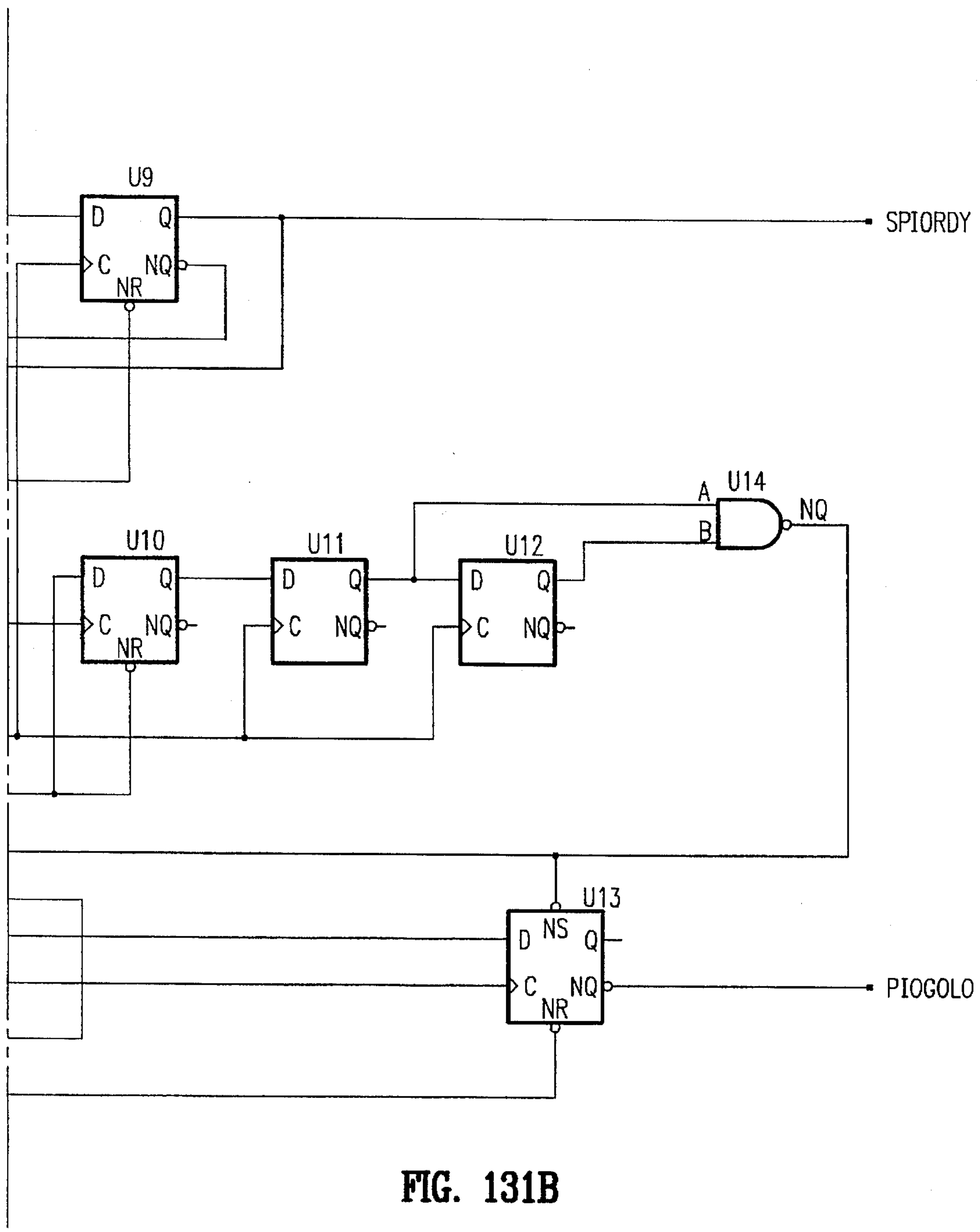
FIG. 131B
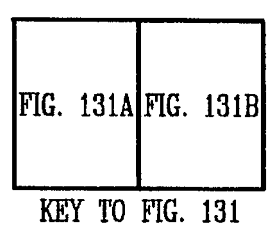
KEY TO FIG. 131

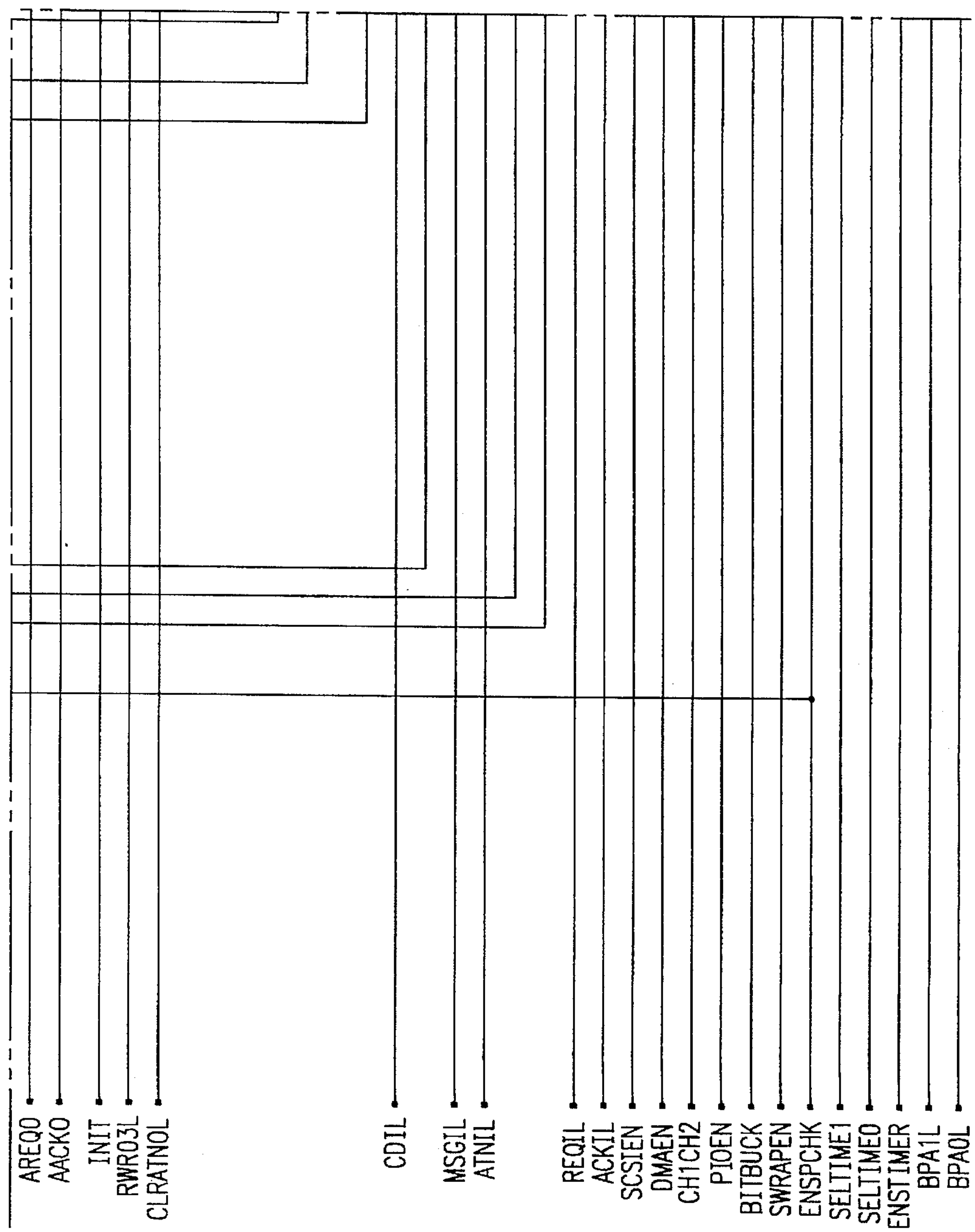
FIG. 136A-2
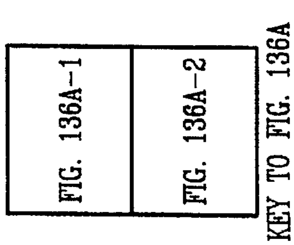
KEY TO FIG. 136A

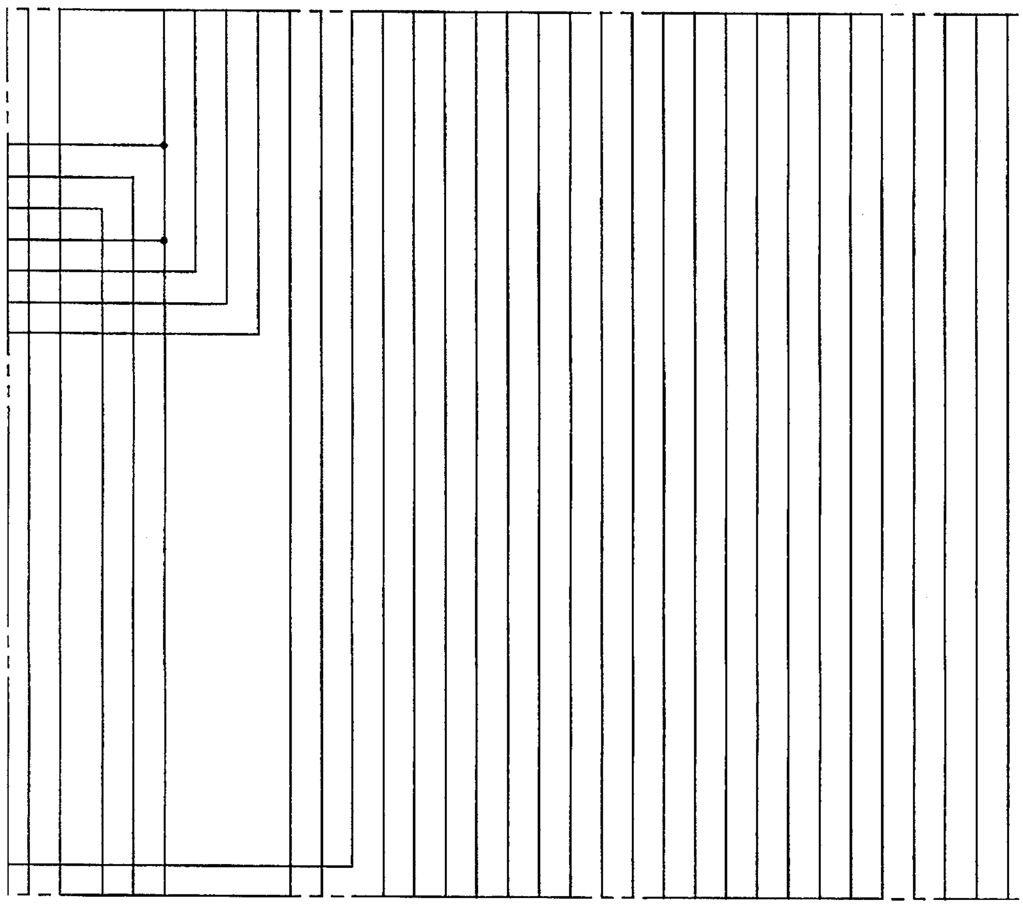
FIG. 136B-2
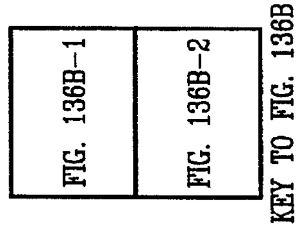
KEY TO FIG. 136B

KEY TO FIG. 136C

KEY TO FIG. 138A

KEY TO FIG. 138B

KEY TO FIG. 138C

KEY TO FIG. 139A

KEY TO FIG. 140

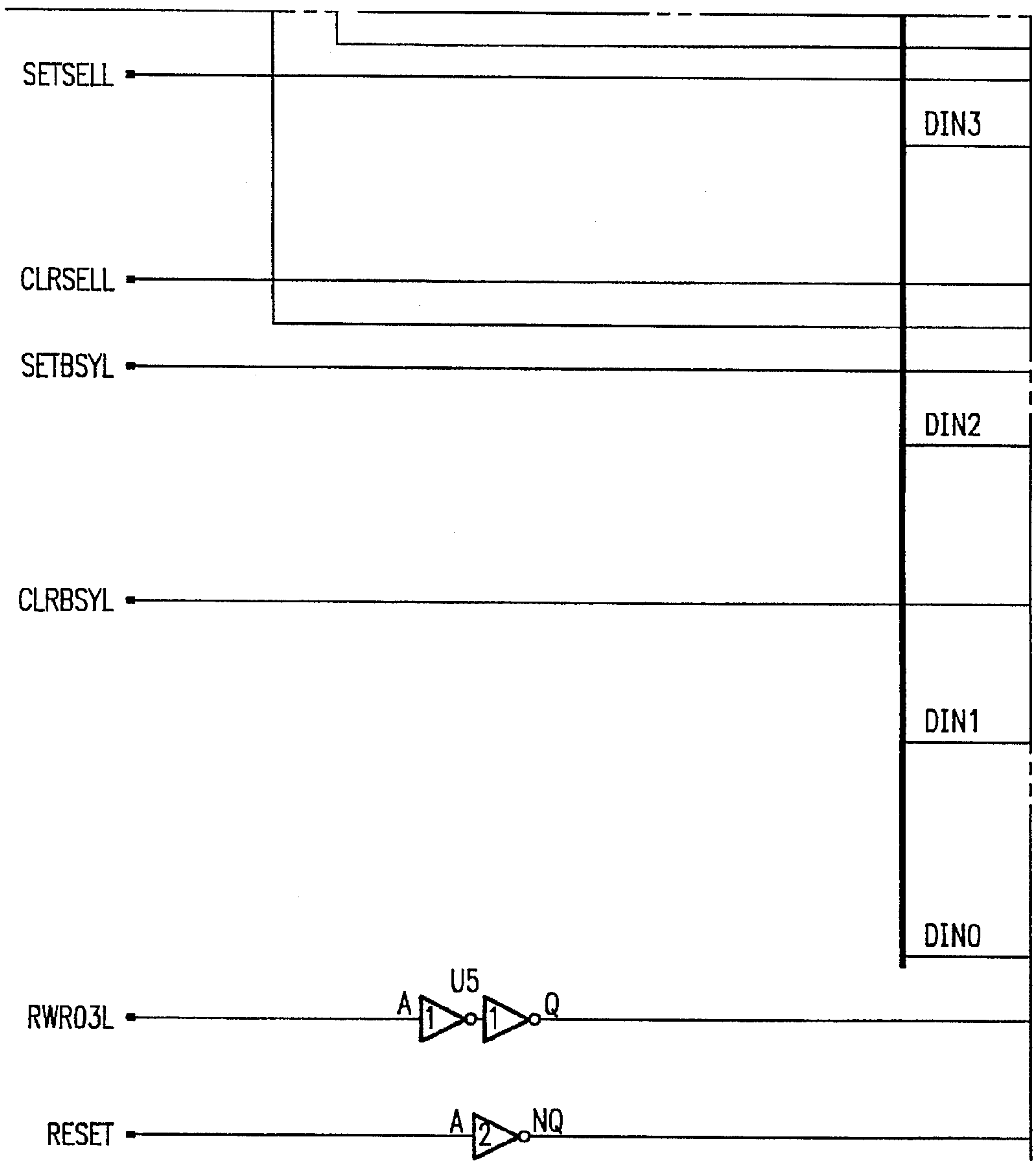
FIG. 143A-2
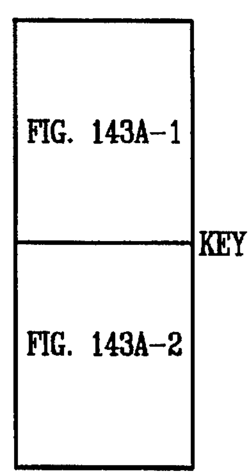
KEY TO FIG. 143A

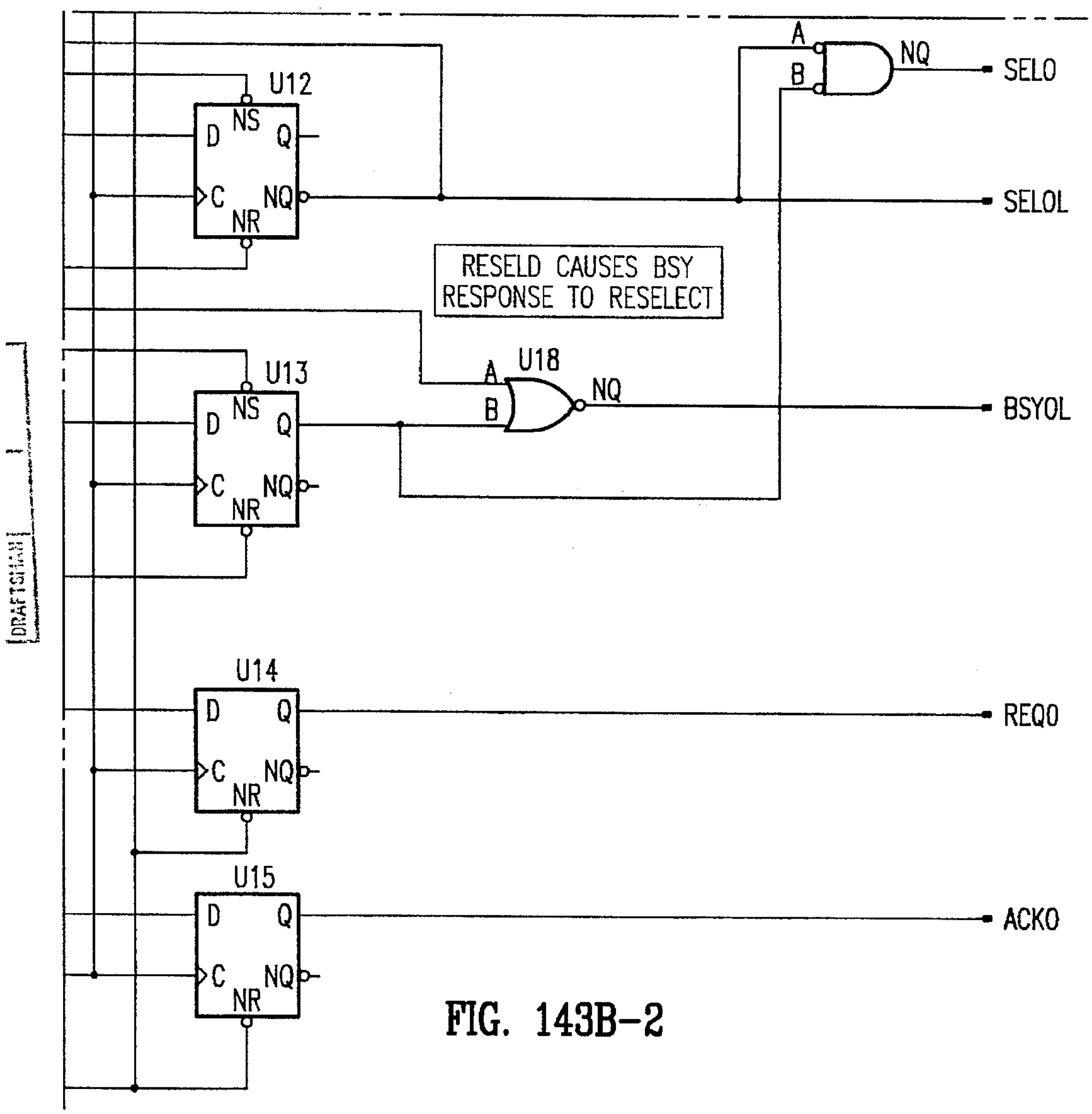
FIG. 143B-2
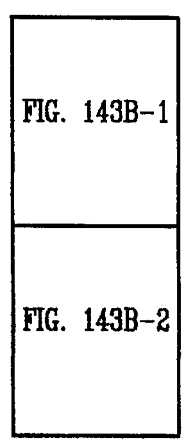
KEY TO FIG. 143B

KEY TO FIG. 144A

KEY TO FIG. 144B

| MUXIN | PORT | REGISTER |
|---|---|---|
| D3 | 0BH | SSTAT0 |
| D2 | 0AH | STCOUNT2 |
| D1 | 09 | STCOUNT1 |
| D0 | 08 | STCOUNT0 |

GROUP 5 MUX

| MUXIN | PORT | REGISTER |
|---|---|---|
| D1 | 11H | SIMODE1 [7:0] |
| D0 | 10H | SIMODE0 [7:0] |

| FIG. 146B-1 | FIG. 146B-2 |
|---|---|

KEY TO FIG. 146B

KEY TO FIG. 151B

KEY TO FIG.154A

KEY TO FIG. 154B

KEY TO FIG. 159A

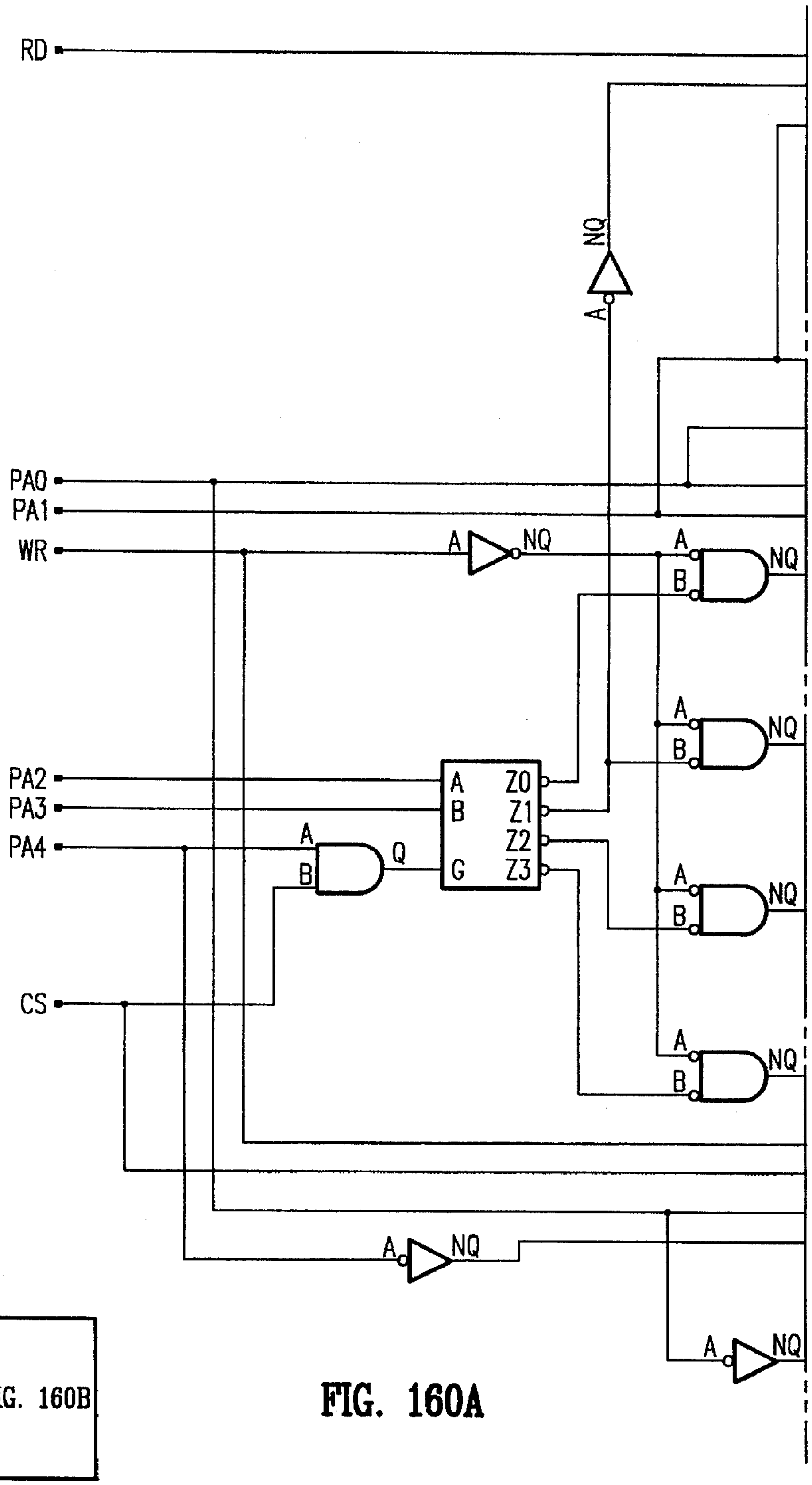
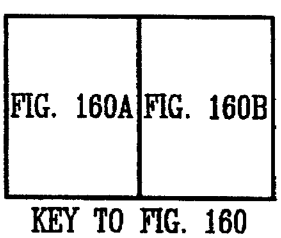
KEY TO FIG. 160
FIG. 160A

KEY TO FIG. 162

SCSI HOST ADAPTER INTEGRATED CIRCUIT UTILIZING A SEQUENCER CIRCUIT TO CONTROL AT LEAST ONE NON-DATA SCSI PHASE WITHOUT USE OF ANY PROCESSOR

This application is a continuation of application Ser. No. 07/663,091, filed Feb. 28, 1991, now abandoned.

REFERENCE TO MICROFICHE APPENDIX

Appendix A, which is a part of the present disclosure, is a microfiche appendix consisting of 6 sheets of microfiche having a total of 366 frames. Microfiche Appendix A is a listing of computer programs and related data for use with one embodiment of this invention, which is described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention is related generally to host-adapter systems for information sharing between intelligent devices connected to a common data exchange bus such as a local area network (LAN) and more specifically to host-adapter systems for shared data exchange between a bus of a first device and a second bus, such as the Small Computer System Interface (SCSI) bus, to which one or more other devices are connected.

2. Description of the Related Art

Personal computers (PC's), sometimes referred to as microcomputers, have gained widespread use in recent years primarily because they are inexpensive and yet powerful enough to handle computationally-intensive user applications. The data storage and data sharing capabilities of personal computers are often expanded by coupling a group of such computers to peripheral devices such as disk drives, tape drives, and printers. The peripheral devices and the personal computers are interconnected through a single communications network, e.g., a local area network.

The Small Computer System Interface (SCSI) standard, which is specified by the American National Standards Institute (ANSI X3.131-1986, which is incorporated herein by reference in its entirety) of 1430 Broadway, New York, N.Y. 10018, is an example of an industry-recognized standard for a relatively complex local area network. Descriptions of the SCSI bus may be found for example in U.S. Pat. No. 4,864,291 "SCSI Converter" issued Sep. 5, 1989 to J. E. Korpi and in U.S. Pat. No. 4,905,184 "Address Control System for Segmented Buffer Memory" issued Feb. 27, 1990, to R. P. Giridhar, et al., which are incorporated herein by reference in their entirety.

A typical SCSI system 100 is illustrated in FIG. 1. A plurality of intelligent devices 120, 140, 141, 142 are coupled to SCSI bus 110 so that these devices can exchange information. The intelligent devices are a first host system 120, whose internal structure is shown in detail, a second host system 140, whose internal structure is similar to that shown for system 120, a first disk drive unit (Target-A) 141, and a second disk drive unit (Target-B) 142.

Communications over SCSI bus 110 begin when one of devices 120, 140 initiates a data transfer. A typical data transfer operation has seven SCSI "phases": (1) ARBITRATE, (2)SELECT, (3)MESSAGE(out), (4)COMMAND, (5) DATA, (6) STATUS and (7) MESSAGE(in).

The operation of the SCSI phases for data transfer is well-known to those skilled in the art. Briefly, during the ARBITRATE phase, competing host systems 120 and 140 decide which system gains exclusive control of SCSI bus 110. During the SELECT phase, the winning host designates one of the other devices as a "target". After selection of the target, a command is issued from the host to specify the details of the data transfer, such as direction, length, and address of the data in the target. Data is transferred over the SCSI bus 110 either synchronously or asynchronously in blocks of, for example, 512 bytes each at a speed up to 5 megabytes (Mbytes) per second.

The host and target exchange handshakes for each byte of data transferred over the SCSI bus. When the target anticipates a time delay in the data stream, the chosen target disconnects (in the logic sense) from SCSI bus 110, and the winning host relinquishes control over SCSI bus 110. This leaves SCSI bus 110 in a Bus-Free state, permitting other SCSI transfer operations to take place over bus 110. The data transfer operations can be either single-threaded (one host-target pair is active at a time) or multi-threaded (one host initiates transfers with many targets concurrently).

System 120 typically includes a second generation microprocessor 121, e.g., a 80286™ microprocessor available from Intel Corp. of California, mounted on a printed-circuit motherboard 120*a*. The second generation microprocessor 121 (which will be referred to as the "host microprocessor") has a sixteen-bit wide data bus D and typically operates at a peak speed of approximately 10–12 million cycles per second.

Motherboard 120*a* also includes an optional math coprocessor 122, a host clock generating circuit 123 which normally includes an oscillator crystal 124 of fixed frequency, an interface circuit 125 that includes (i) address buffers 125*a* for coupling microprocessor address bus A to a 24-bit address bus portion 126*a* of expansion bus 126, (ii) data buffers 125*b* for coupling microprocessor data bus D to a 16-bit expansion data bus portion 126*b*, (iii) a bus controlling circuit 125*c* for coupling microprocessor control bus C to expansion bus control lines 126*c* and (iv) memory data buffers 125*d* for coupling microprocessor data bus D to an expansion memory data bus 126*d*, a plurality of expansion card connectors or "slots" 127, a main memory system 130 including a nonvolatile read-only memory (ROM) 130*a* and dynamically-refreshed random-access memory (DRAM) 130*b*, a memory address multiplexer 132, a DMA controller 135 coupled to a DMA bus 136, local buffers 137, and page register 138. The operation and interaction of the components on motherboard 120*a* is known to those skilled-in-the art. Electrical power (e.g., +5 volts D.C.) is provided to host motherboard 120*a* and the expansion boards by an internal power supply 128.

A SCSI host-adapter board 160 is shown plugged into one of slots 127 of host system 120. Typically, board 160 includes a microprocessor 161 that usually is a first generation microprocessor (e.g., an Intel 8086™ microprocessor) which has an eight-bit data bus and operates at a peak speed of approximately 10 MHz or less. The data processing resources of microprocessor 161, also referred to as adapter microprocessor 161, are devoted to managing SCSI bus data transfers.

In addition to adapter microprocessor 161, host-adapter board 160 typically includes a firmware ROM chip 165 for storing initialization and operational firmware used by adapter microprocessor 161. Host-adapter board 160 also includes a BIOS ROM chip 162 for storing initialization and operational software used by host microprocessor 121. In addition, board 160 includes several interface circuits. For example, a slot interface circuit 163 interfaces adapter board 160 to expansion slots 127. A SCSI bus interface circuit 164 interfaces board 160 to SCSI bus 110.

High speed firmware circuits 165, i.e., an Adaptec AIC-6250 available from Adaptec, Inc. of Milpitas, Calif., an NCR 5380 or an NCR 5390 chip, both available from NCR of Colorado Springs, Colo., are provided on host-adapter board 160 for handling functions that are too fast for adapter microprocessor 161. An on-board clock generating circuit 166 supplies a synchronizing clock signal to other components on adapter board 160. The components on adapter board 160 receive electrical power from power supply 128 of host system 120.

SCSI interface arrangement 100 is advantageous because there is minimal interference with application programs running on host microprocessor 121. Typically, host-adapter board 160 transfers data between SCSI bus 110 and memory 130 using a bus-master technique. In this technique, adapter board 160 forces microprocessor 121 into a temporary wait state and then takes control of expansion bus 126 and optionally also DMA bus 136. Bursts of data are transferred over SCSI bus 110 and expansion bus 126 to memory 130. Application programs running on microprocessor 121 are not affected by the data transfer because the state of the host microprocessor 121 is unchanged after host-adapter board 160 relinquishes control of expansion bus 126 and releases host microprocessor 121 from its wait state.

While the advantages of SCSI are widely recognized, host-adaptor board 160 limits the applications of SCSI. Most motherboards have a limited number of slots 127 and introduction of board 160 into one of the slots may eliminate another board that is needed by the user. Further, small portable computers may not have any expansion slots and so connection of such computers to either a SCSI network or SCSI peripherals is not possible. SCSI adapter board 160 typically includes a number of high cost devices which make the SCSI adapter board itself expensive.

Among the high cost devices is the host/adapter microprocessor (H/A μP) whose resources are exclusively dedicated to SCSI adapter functions. The need for a dedicated microprocessor in conjunction with the other circuits described above essentially eliminates the possibility of replacing the host adapter card with an application specific integrated circuit (ASIC). ASICs have been successfully used to reduce the number of integrated circuits required, for example, on the mother board of a computer, but typically the microprocessor has remained as an independent chip.

Unfortunately, even with a reduction of the number of integrated circuits on the motherboard of a computer, there is not sufficient room on the motherboard for the components on the SCSI host/adaptor board. Therefore, a computer with a empty expansion slot and the SCSI host/adaptor card are needed to take advantage of SCSI. A method is needed for reducing the cost of using the SCSI standard so that computer owners with limited budgets and small portable computers can take advantage of the standard.

SUMMARY OF THE INVENTION

According to the principles of this invention, a host/adaptor (H/A) integrated circuit is a computer bus to SCSI bus controller. The host/adaptor (H/A) integrated circuit of this invention allows the host computer to access a SCSI bus with flexibility while at the same time automating the more time consuming SCSI functions such as target selection and reselection. Data transfer between the SCSI bus and the computer data bus is accomplished with either DMA (Direct Memory Access) or PIO (Programmed Input Output) using a data path which preferably has the same width in bits as the computer data bus.

Unlike the prior art host/adapter systems, the H/A integrated circuit of this invention is preferably mounted on the computer system motherboard so that a separate host/adapter board is unneeded. Moreover, a processor dedicated solely to SCSI operations has been eliminated. The H/A integrated circuit of this invention uses the processor of the host computer system, sometimes called a central processing unit(CPU) or a microprocessor, to perform selected operations so that the H/A integrated circuit does not include a processor. The host computer system processor is interrupted by a signal, a system hardware interrupt, from H/A integrated circuit when the processor is needed to support SCSI operations. Unlike the prior art systems that placed the processor in a wait state, the processor stops processing the user application and turns control of the processor over to a driver for the H/A integrated circuit. The driver uses the processor to perform required SCSI operations. If the driver determines that the SCSI operations performed by the H/A integrated circuit will take some time, the necessary instructions for continued SCSI operations are provided to the H/A integrated circuit and control of the processor is returned to the host computer system. Thus, the processor is available for execution of user applications while the H/A integrated circuit of this invention simultaneously performs a predetermined SCSI phase or phases.

When the H/A integrated circuit completes the predetermined SCSI phase, a system hardware interrupt is issued to the host computer system processor. In response to the interrupt, the processor stops processing the user application and turns control of the processor over to the driver. This sequence of actions continues until the SCSI operations are complete. Thus, according to the principles of this invention, the host computer system processor is used for short segments of time to perform selected SCSI operations. Other of the SCSI operations are performed automatically by the H/A integrated circuit.

In one embodiment, the H/A integrated circuit includes means, operatively couplable to the driver, for sequencing at least one phase of operations based upon information received from the processor which in turn was based upon instructions from such a driver means. The sequencing means preferably includes hardwired sequencers for automatically performing SCSI Arbitration, Selection out(as initiator), Reselection in(as initiator), Selection in (as target), and Reselection out (as target) phases.

Upon the driver programming the H/A integrated circuit for the automatic operation of at least one hardwired sequencer using the processor, the driver returns control of the processor to the computer system and the sequencing means completes the at least one phase of operations without use of the processor.

Upon completion of at least one phase of operations, the H/A integrated circuit means for generating a hardware interrupt sends a system hardware interrupt to the host computer system processor. Upon receipt of the hardware interrupt, the processor stops operation of any program executing in the computer system and is available for support of the integrated circuit to perform another phase of operations.

The H/A integrated circuit also includes means for generating hardware interrupts indicating the status of the SCSI data bus. Thus, H/A integrated circuit of this invention uses hardware interrupts to inform the driver of the SCSI bus status.

According to the principles of this invention, three different data bits are associated with each hardware interrupt, a status bit, an enable bit, and a clear bit. These bits are stored in storage means, typically registers, included in the H/A integrated circuit. The storage means is included in the address space of the host computer system processor.

The interrupt enable bits are stored in a first register. The interrupt status bits are stored in a second register and the interrupt clear bits are stored in yet another register. In one embodiment, each interrupt status bit is set or reset by a register for that interrupt. The interrupt status bit is set by the register for that interrupt when the interrupt generating hardware generates that hardware interrupt. The status bit is set independent of whether the enable bit for the hardware interrupt is set. The interrupt status bit is reset by the register for that hardware interrupt when the clear interrupt bit for that hardware interrupt is set in the register of clear interrupt bits.

The status bit for a hardware interrupt drives a first input line of a logic gate, typically an AND gate, and the enable bit for that hardware interrupt drives a second input line of the logic gate. The output signal of the logic gate goes active only when both the enable bit and the status bit for the hardware interrupt are active. Hence, a plurality of logic gates are connected to the status bit register and the enable bit register, one logic gate for each hardware interrupt. The output signals from the plurality of logic gates drive a first logic gate.

The output signal of the first logic gate, typically an OR gate, is driven active when any one of the output signals from the plurality of logic gates is active. The output signal from the first logic gate sets an interrupt occurred bit in a register to indicate that a hardware interrupt has occurred.

The output signal from the first logic gate also drives a first input line of a second logic gate. The second input line of the second logic gate is driven by a global interrupt enable signal which is turn is provided by a global interrupt enable bit in a register. The output signal for the second logic gate is the signal on the system hardware interrupt line to the host computer system processor.

Hence, in one embodiment of this invention, a system hardware interrupt signal is sent to the processor by the hardware interrupt generating means only when that hardware interrupt is enabled, i.e., that hardware interrupt enable bit is set, and when the global hardware interrupt enable bit is set.

The H/A integrated circuit of this invention also includes a buffer means for transferring information between the computer data bus and the SCSI bus. Preferably, the data buffer means has a data transfer path with a width in bits that is equal to the width in bits of the computer data bus.

In one embodiment, the buffer means includes a first first-in-first out data buffer(FIFO) and a second FIFO. The first FIFO has a size in the range of 32 bytes to 512 bytes, preferably 128 bytes. The size of the second FIFO is determined by the offset condition for synchronous data transfer between the computer data bus and the SCSI bus and in one embodiment the size is 8 bytes.

The H/A integrated circuit also includes an internal clock oscillator circuit for generating an internal clock signal to clocked components in the integrated circuit and means, operatively coupled to a pin of the integrated circuit, for providing an external clock signal to the clocked components in the integrated circuit. Only the internal clock signal or the external clock signal is used. The operative clock signal is gated so that when the clock signal is not needed, the clock signal is gated off. This reduces the power consumption of the integrated circuit.

The integrated circuit driver of this invention includes: (i) means, operatively coupled to the host computer system processor, for programming the integrated circuit to perform at least one of the predetermined SCSI phases; (ii) means, operatively coupled to the programming means, for waiting for a hardware interrupt including (a) means for storing an address for resumption of operations of the driver upon completion of the at least one predetermined SCSI phase; and (b) means, operatively coupled to the address storing means, for returning control of the processor to the computer system while the integrated circuit performs the predetermined SCSI phase; and (iii) interrupt handler means, operatively coupled to the processor, for determining which of a plurality of hardware interrupts where generated by the integrated circuit hardware generating means wherein upon detection of a hardware interrupt indicating completion of a programmed SCSI phase, the interrupt handler returns processing in the driver to the stored address.

Another feature of this invention is the method of PIO data transfer used in the SCSI data phase. In one embodiment of this method:

- the size of the first FIFO, a data buffer means, is stored in a first register;
- the length of the data to be transferred is obtained and stored in a second register;
- testing to determine if data remains to be transferred;
- testing to determine if the data buffer is full;
- transferring the data from the data buffer upon determining that the data buffer is full;
- testing for a hardware interrupt upon the buffer full test finding that the data buffer is not full;
- jumping to the buffer full testing step upon the hardware interrupt failing to detect a hardware interrupt;
- decrementing the data transfer length by subtracting the register containing the size of the buffer means from the register containing the length of data upon completion of the data transferring step and then jumping to the step of testing to determine if data remains to be transferred.

BRIEF DESCRIPTION OF THE DRAWINGS

FIGS. 20A and 20B are a timing diagram for data setup and hold, latched data and PIO, for the integrated circuit of this invention.

In FIG.46A, block DLG00X8 represents eight level sensitive latches which are illustrated in more detail in FIG. 108.

FIGS. 93A and 93B illustrate an 8 bit counter circuit CTR8R.

FIGS. 146A, 146B and 146C illustrate circuit CLRSINT.

FIGS. 147A and 147B illustrates circuit SCSIINT0 that includes register SINODE0 which is comprised of circuit DFFC00X7, which is illustrated in FIG. 148.

FIGS. 149A and 149B illustrate circuit SCSIINT1 of FIG. 145B.

FIG. 150 illustrates circuit DFFC00X8, which are register SIMODE1.

FIGS. 151A and 151B illustrate circuit GRP3MUX of FIG. 145B that includes a plurality of circuits MUX21 and MUX41.

FIG. 152 illustrates circuit MUX41.

FIG. 153 illustrates circuit GRP5MUX that includes a plurality fo MUX two-to-one circuits.

FIGS. 154A and 154B show in more detail circuit SELTIMER that includes circuits DIV256, DIV10, and ABORTDEL.

FIGS. 155A and 155B illustrate circuits DIV256 and DIV10.

FIG. 156 illustrates circuit ABORTDEL of FIG. 154B.

FIGS. 157A and 157B illustrate the final portion of circuit SCSI that includes circuits GRP4MUX, BUF04X8, TESTCTR, HOSTINTF, and MUX41X8.

FIG. 158 illustrates circuit BUF04X8 in more detail.

FIGS. 159A and 159B illustrate circiut GRP4MUX in more detail.

Figure 160B:
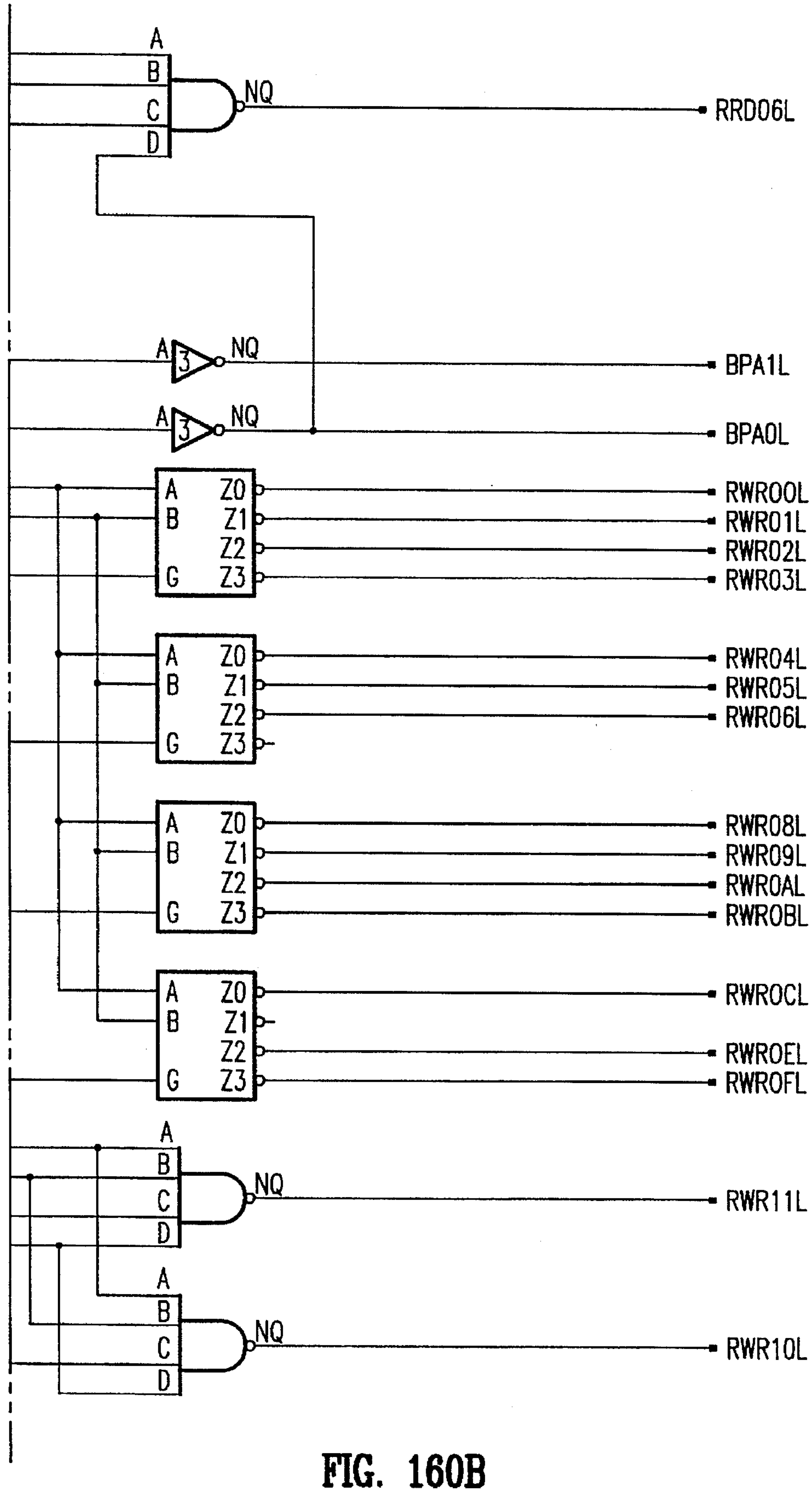

FIG. 160 illustrates circuit HOSTINTF in more detail.

Figure 161A:
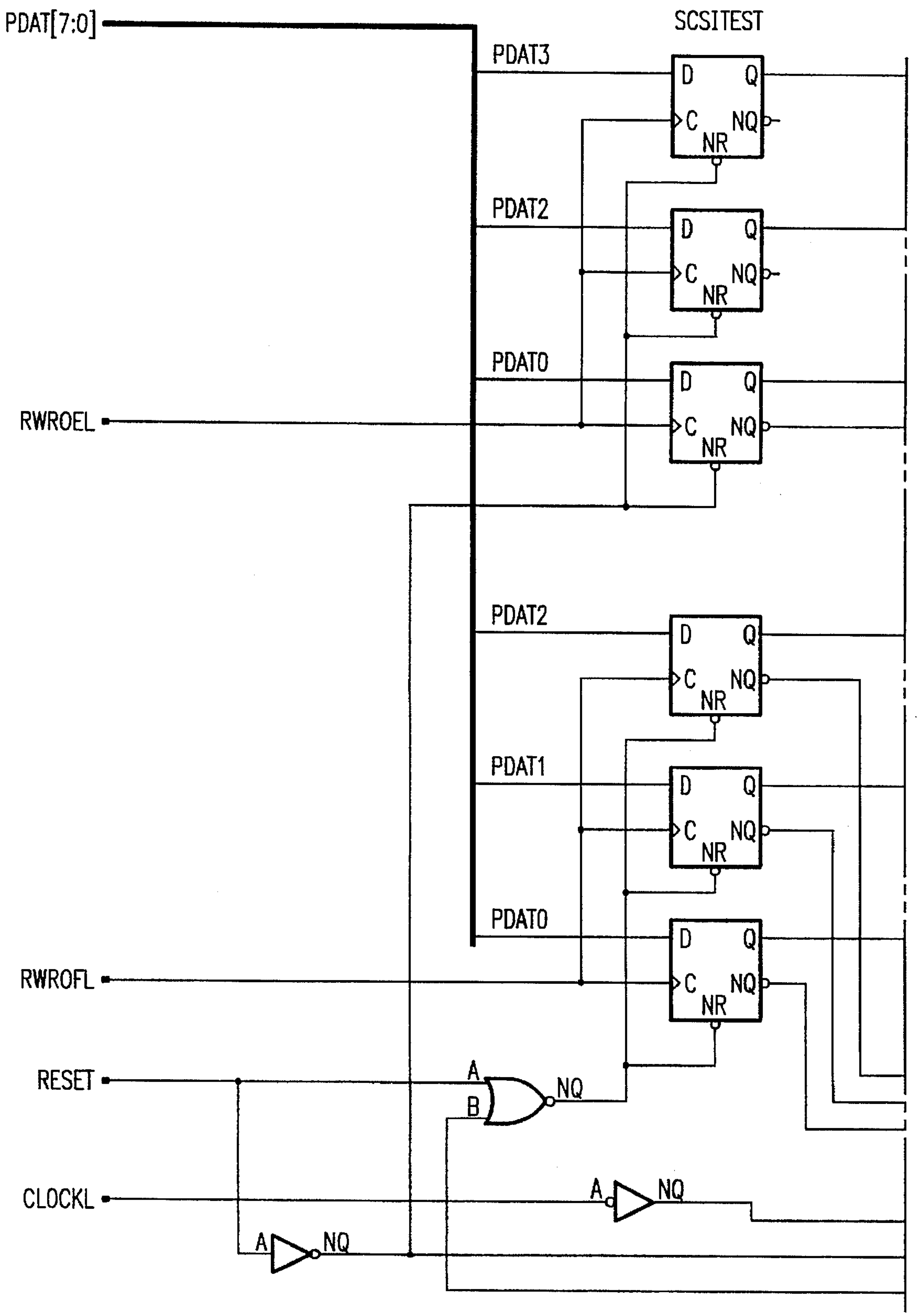
Figure 161B:
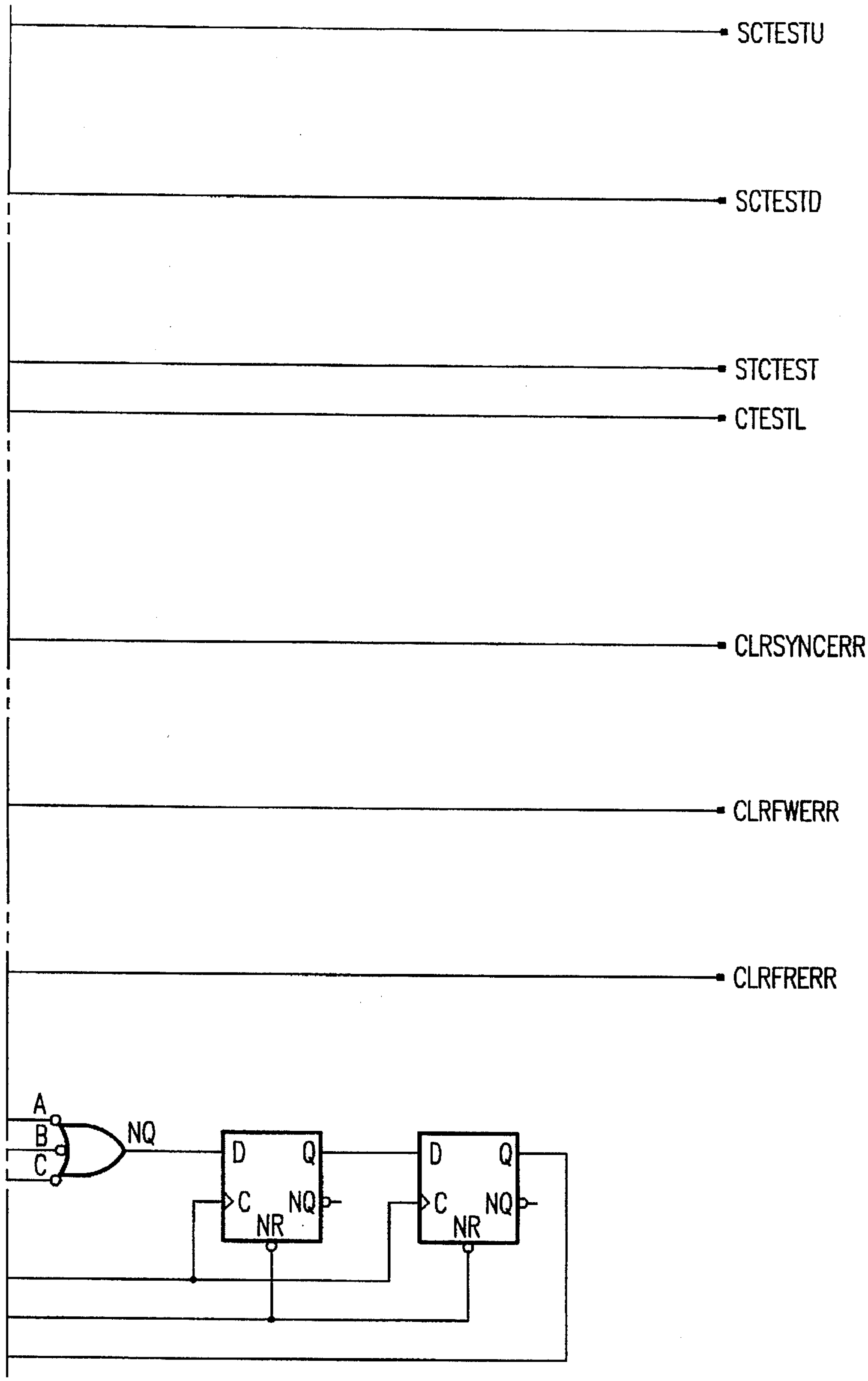

FIGS. 161A and 161B illustrate circuit TESTCLR in more detail.

Figure 162A:
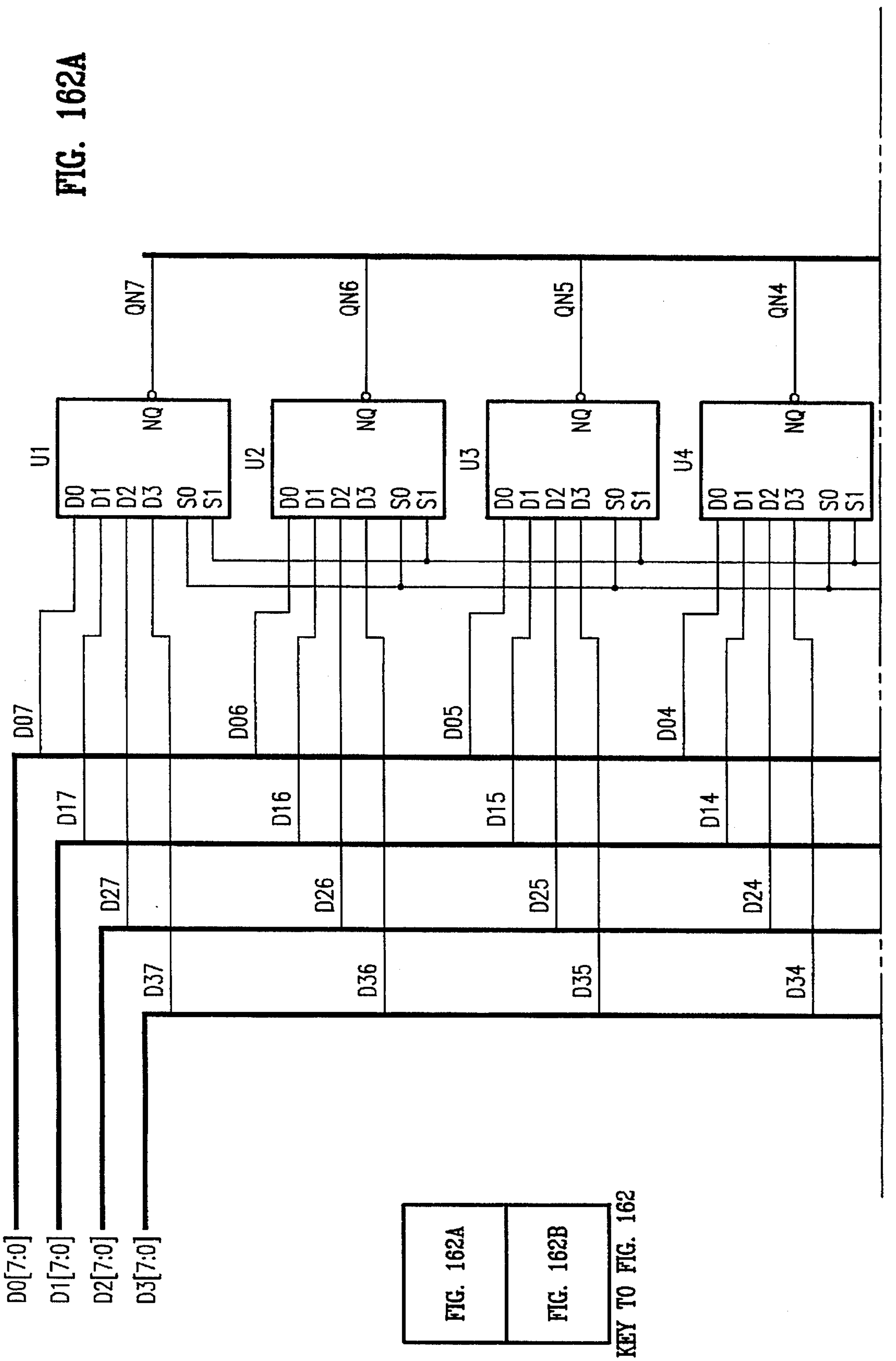
Figure 162B:
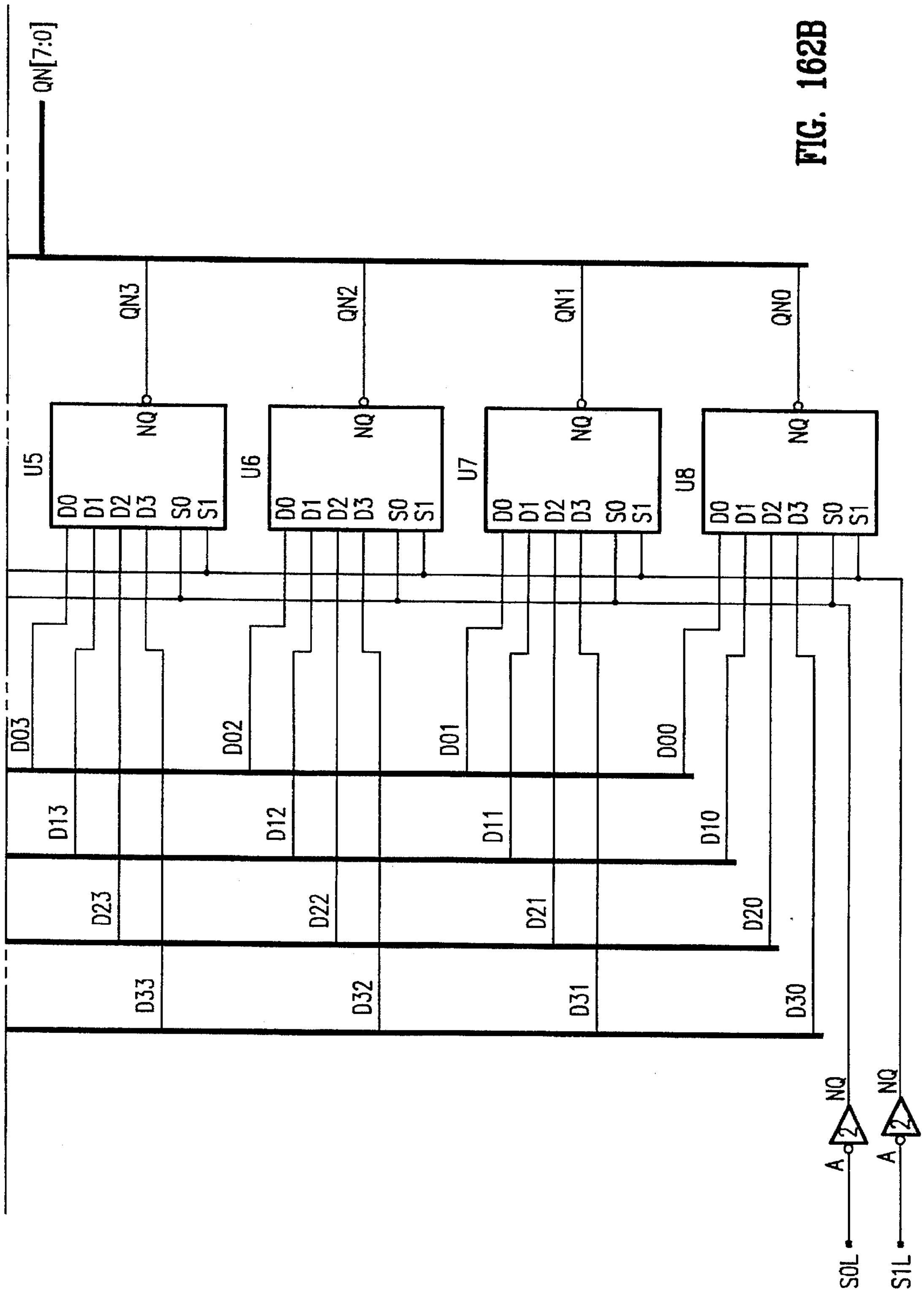

FIG. 162 illustrates circuit MUX41X8 in more detail.

Figure 163A:
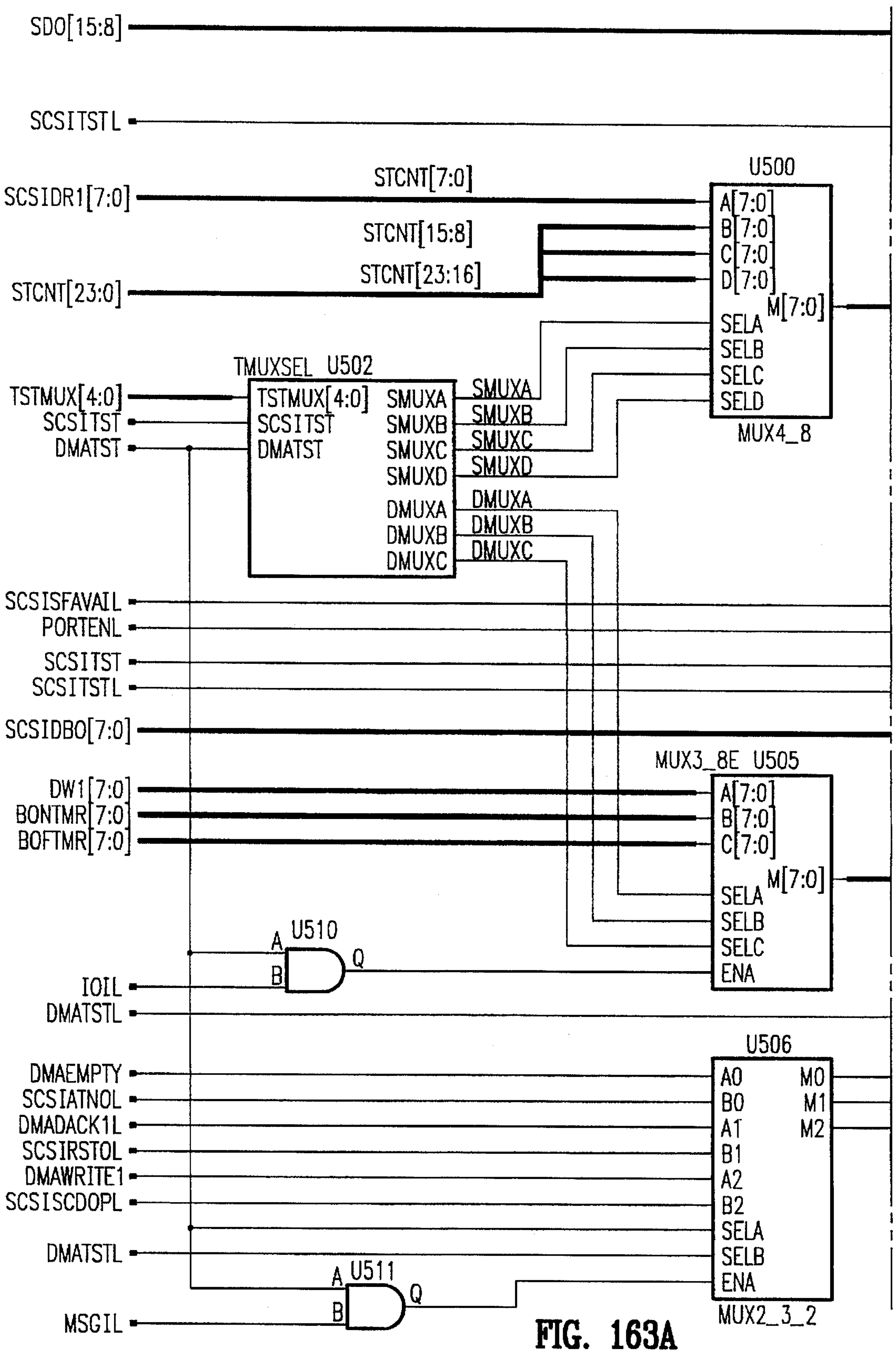
Figure 163B:
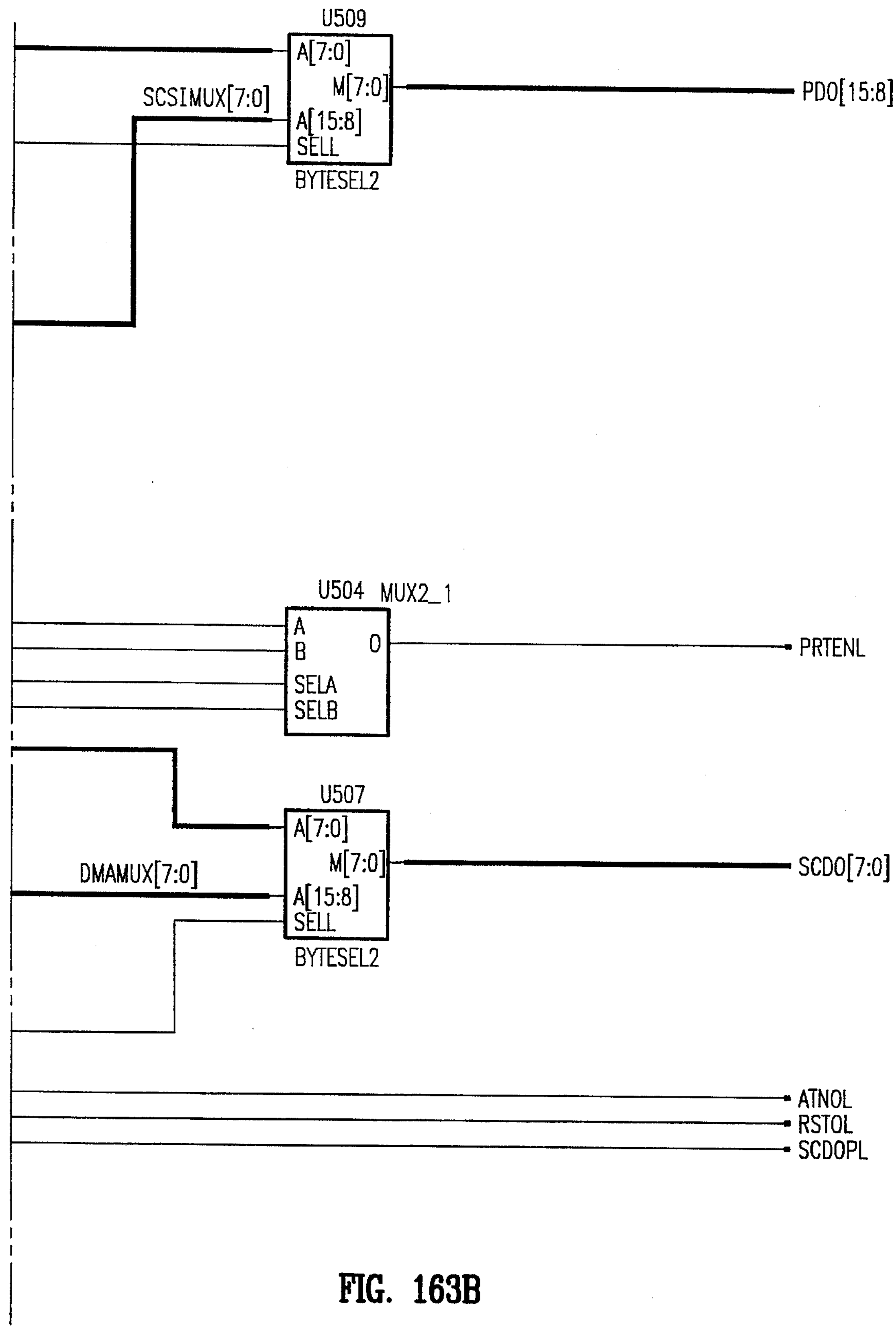

FIGS. 163A and 163B illustrate the final portion of the overall structure of H/A integrated circuit 6260 that includes circuits TMUXSEL, MUX4_8, MUX3_8E, MUX2_3_2, MUX2_1, and BYTESEL2.

Figure 164:
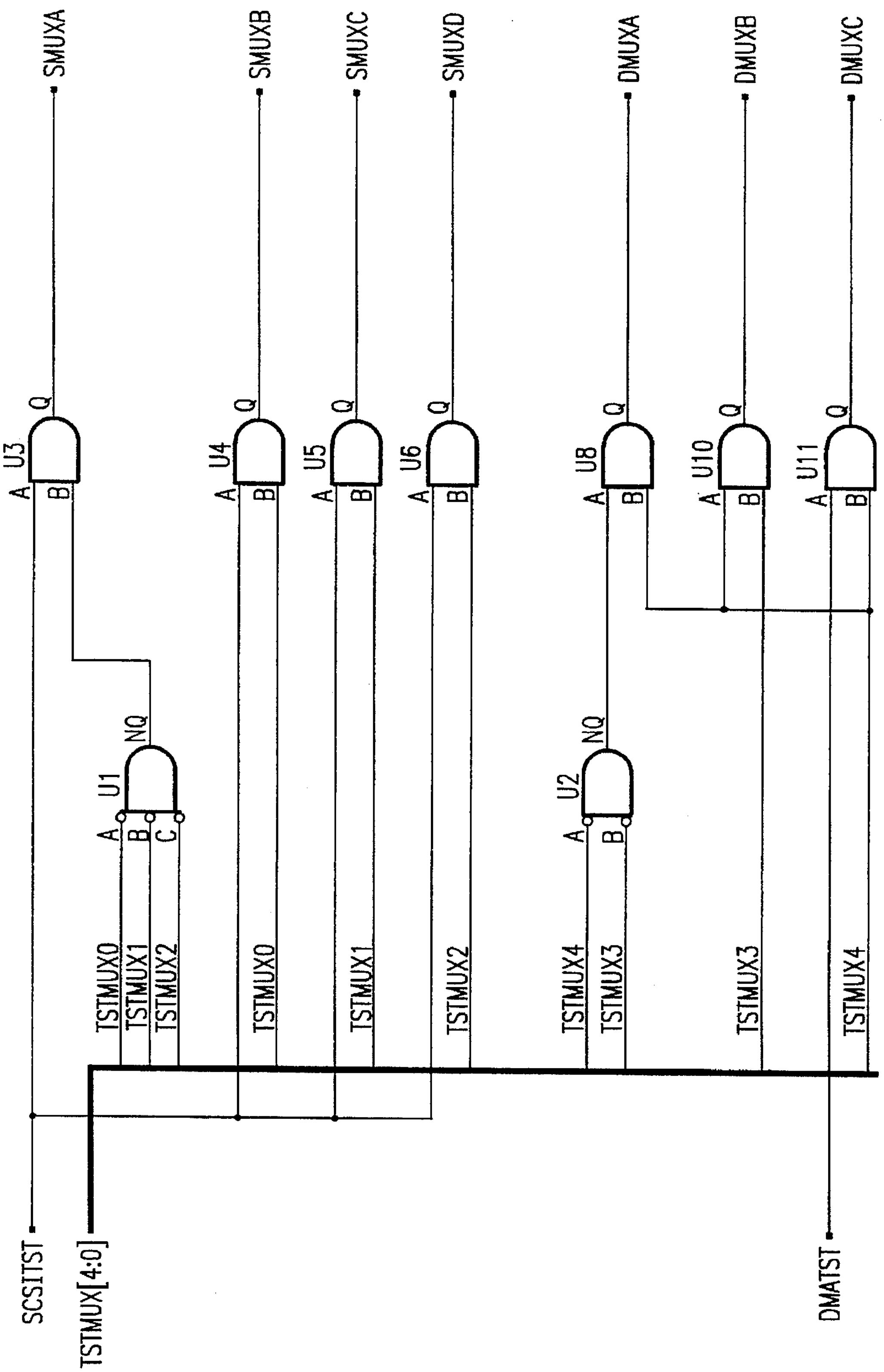

FIG. 164 illustrates circuit TMUXSEL in more detail.

Figure 165A:
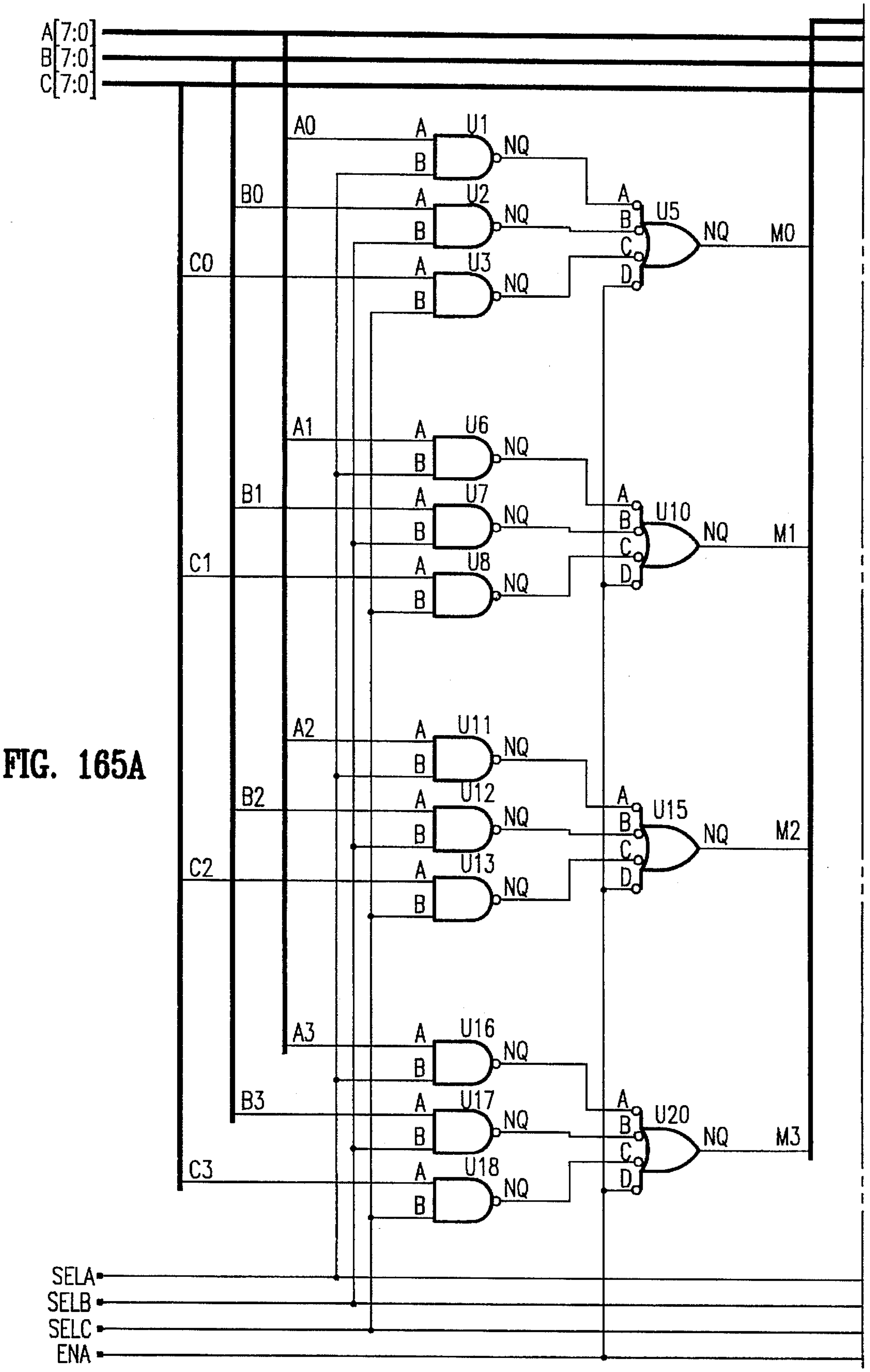
Figure 165B:
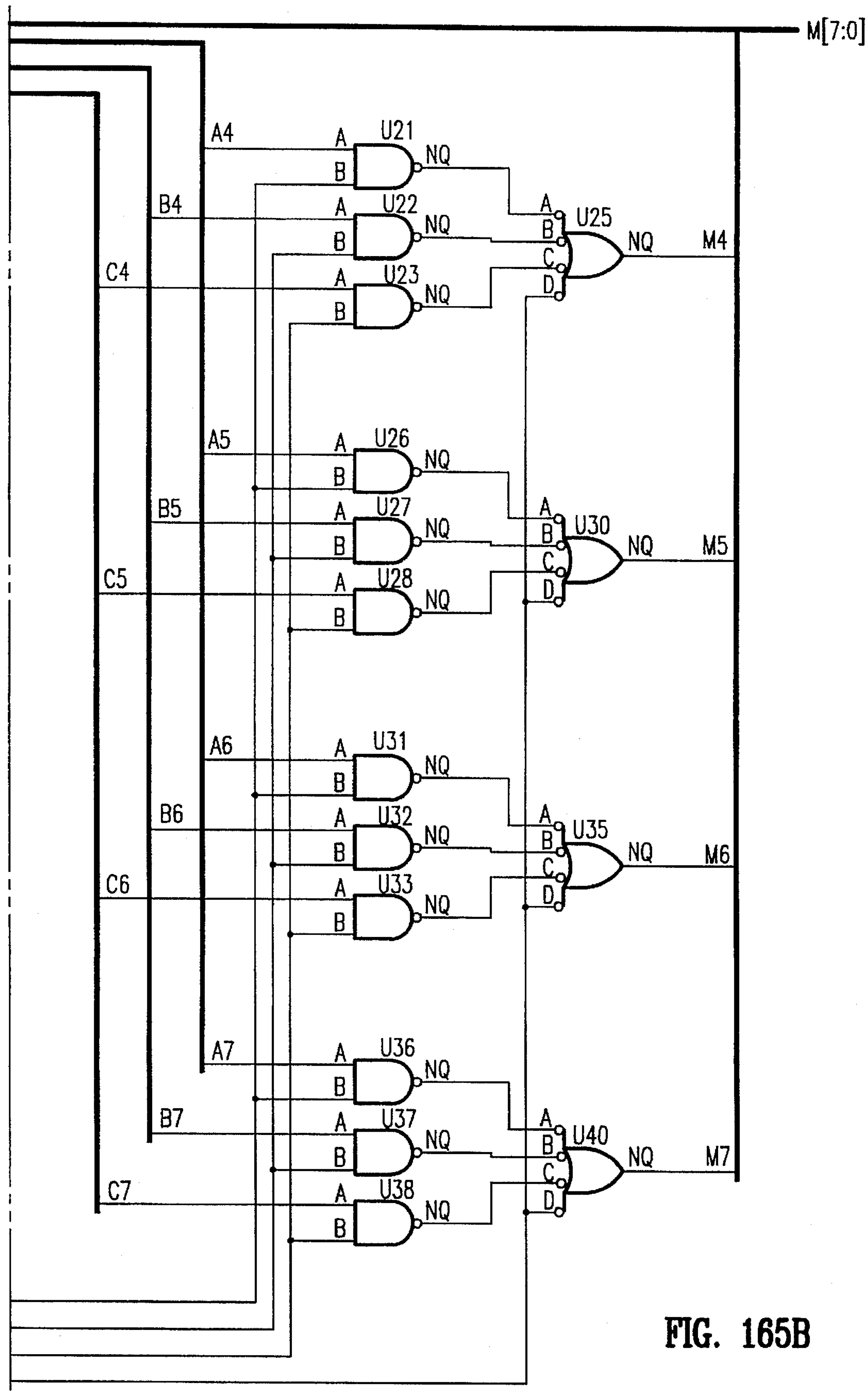

FIGS. 165A and 165B illustrates circuit MUX3_8E.

Figure 166:
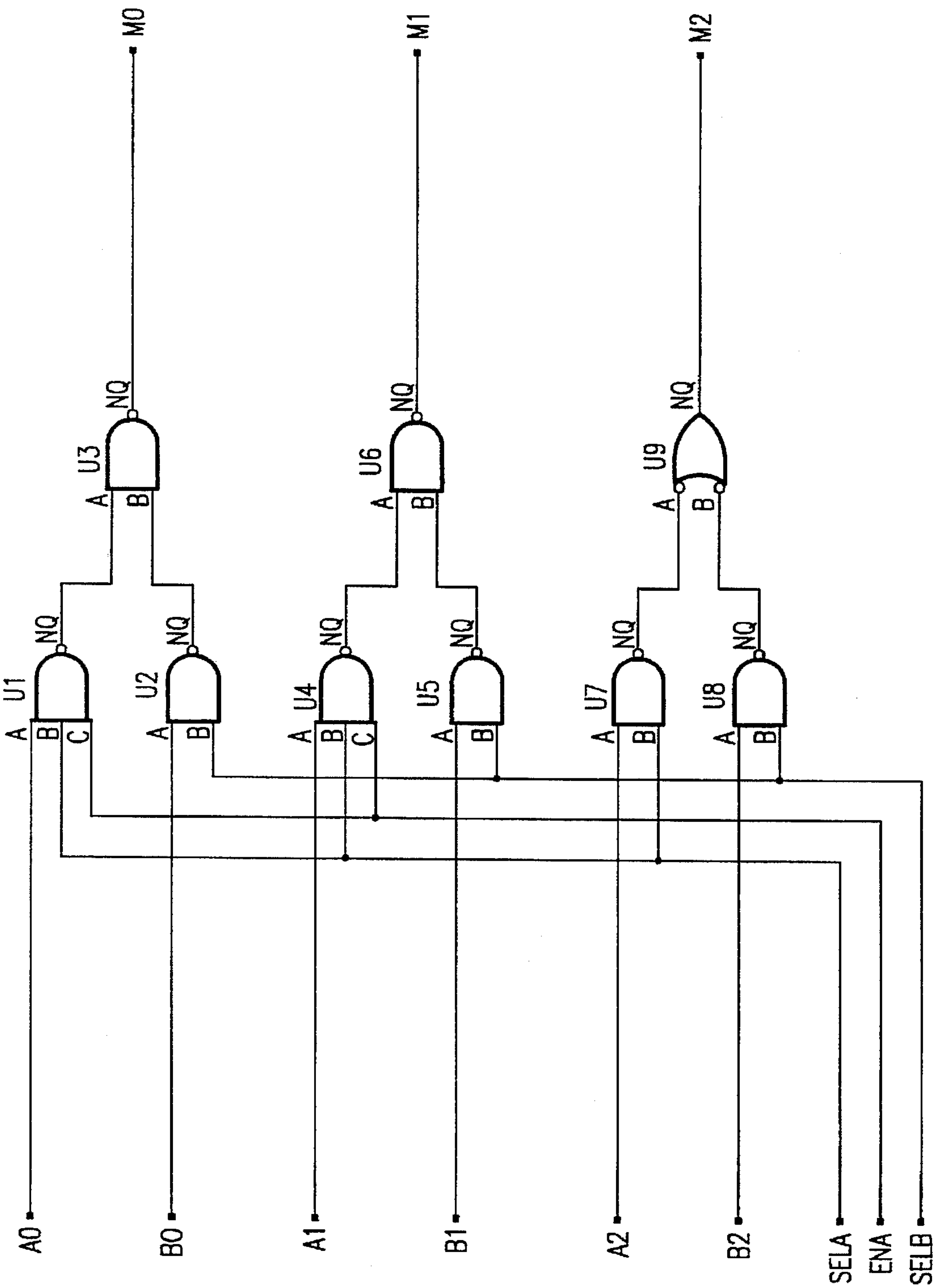

FIG. 166 illustrates circuit MUX2_3_2.

Figure 167A:
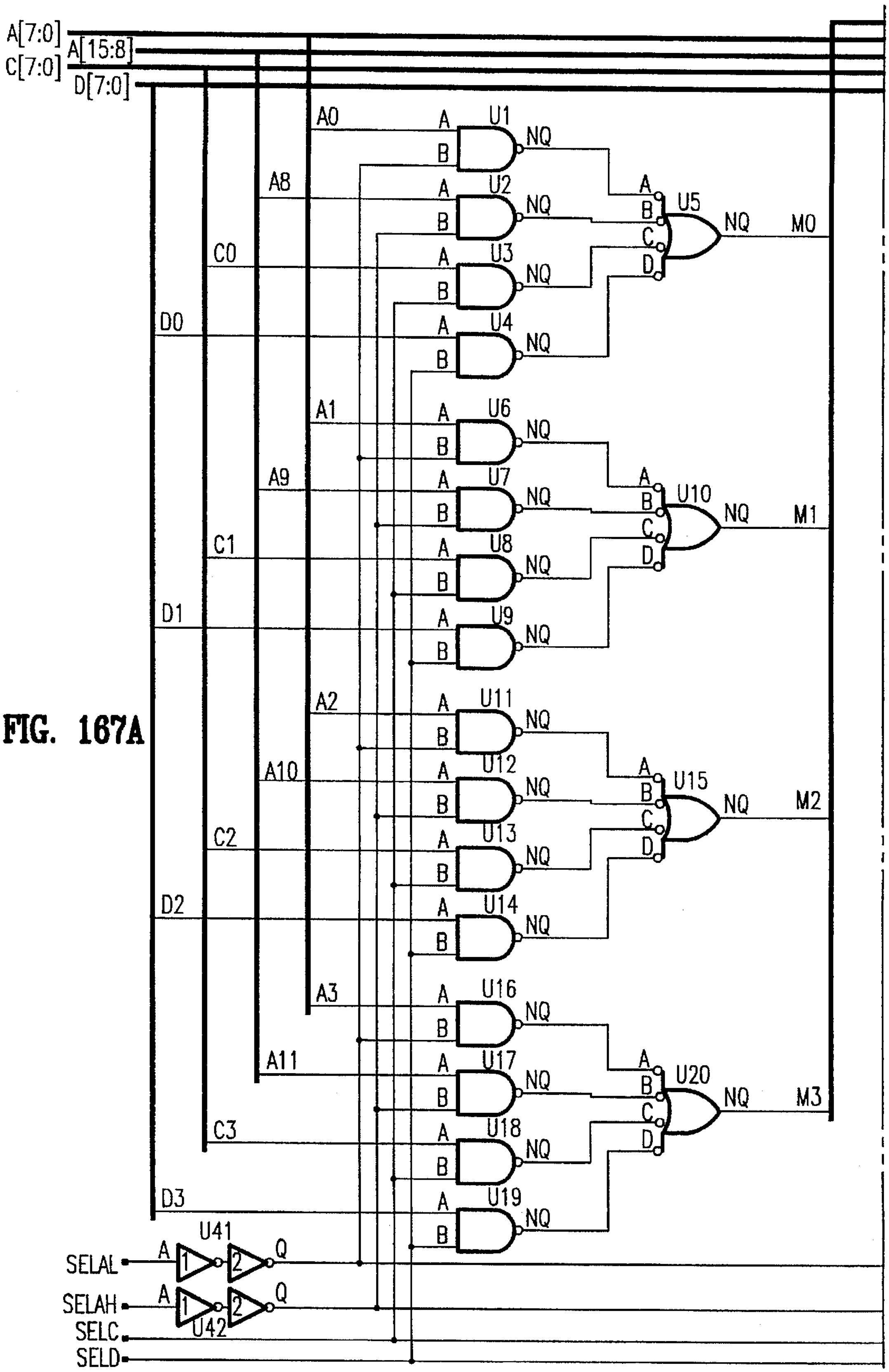
Figure 167B:
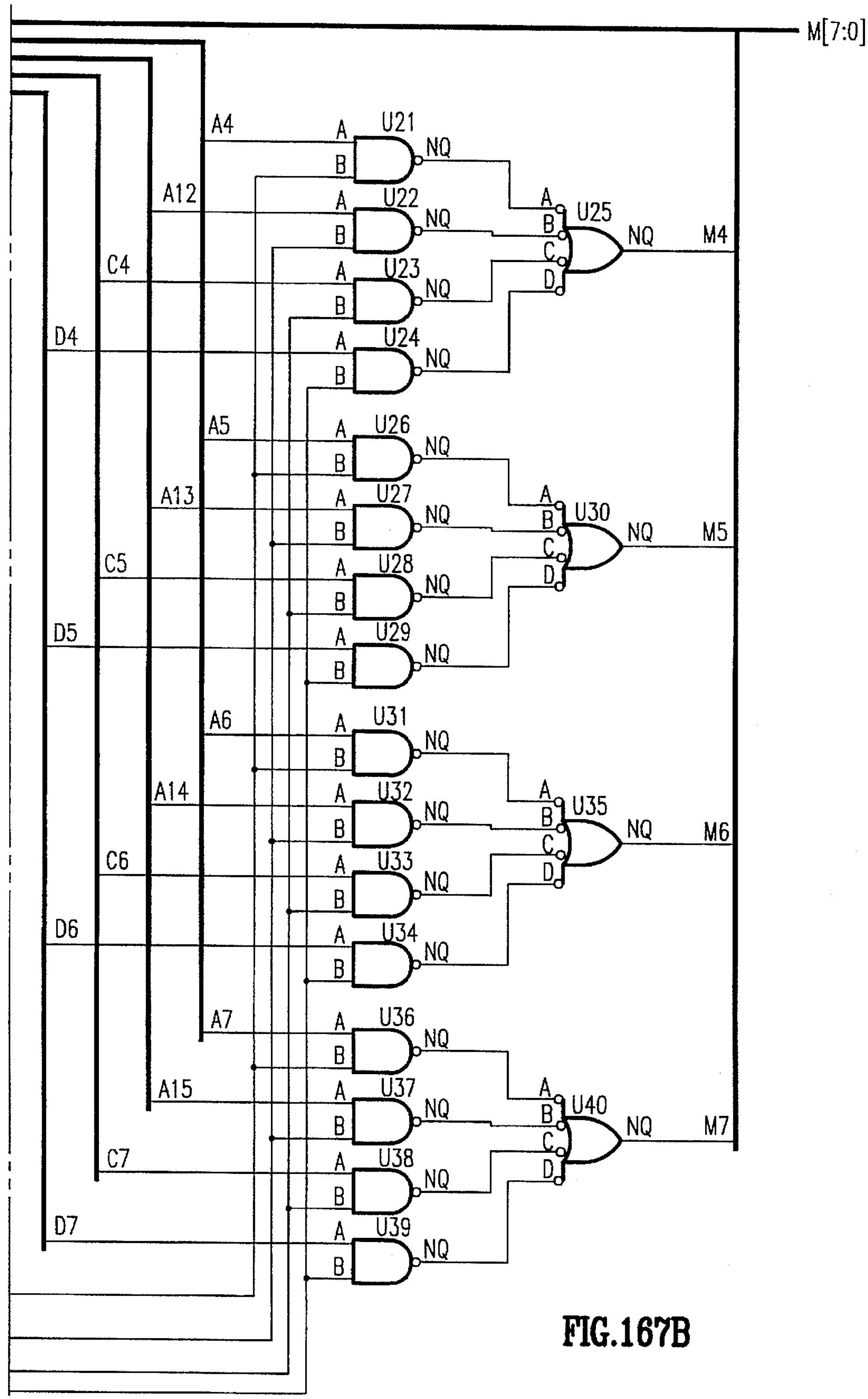

FIGS. 167A and 167B illustrates circuit BYTESEL4.

Figure 168:
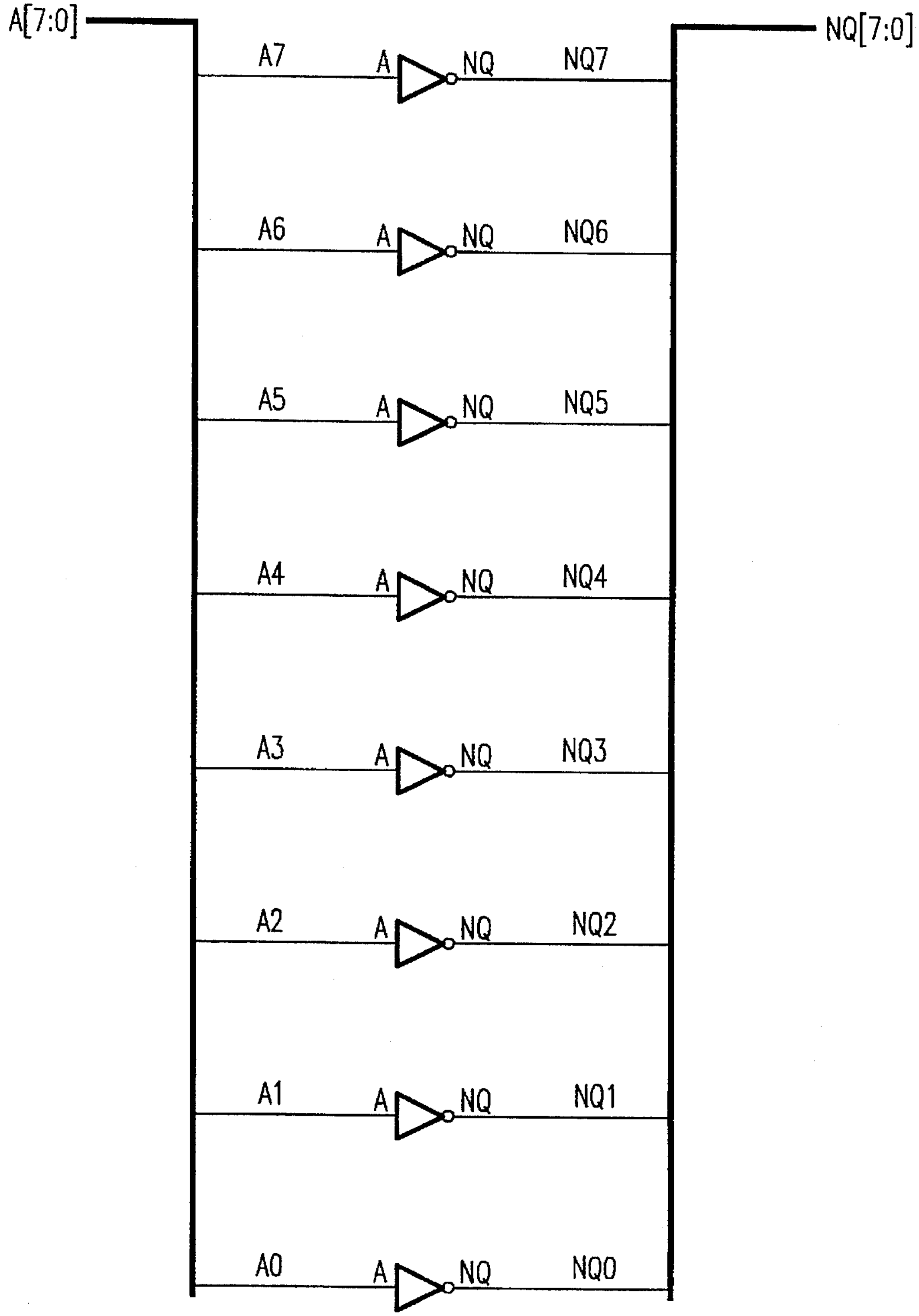

FIG. 168 illustrates octal invertor circuit INV01X8.

Figure 169:
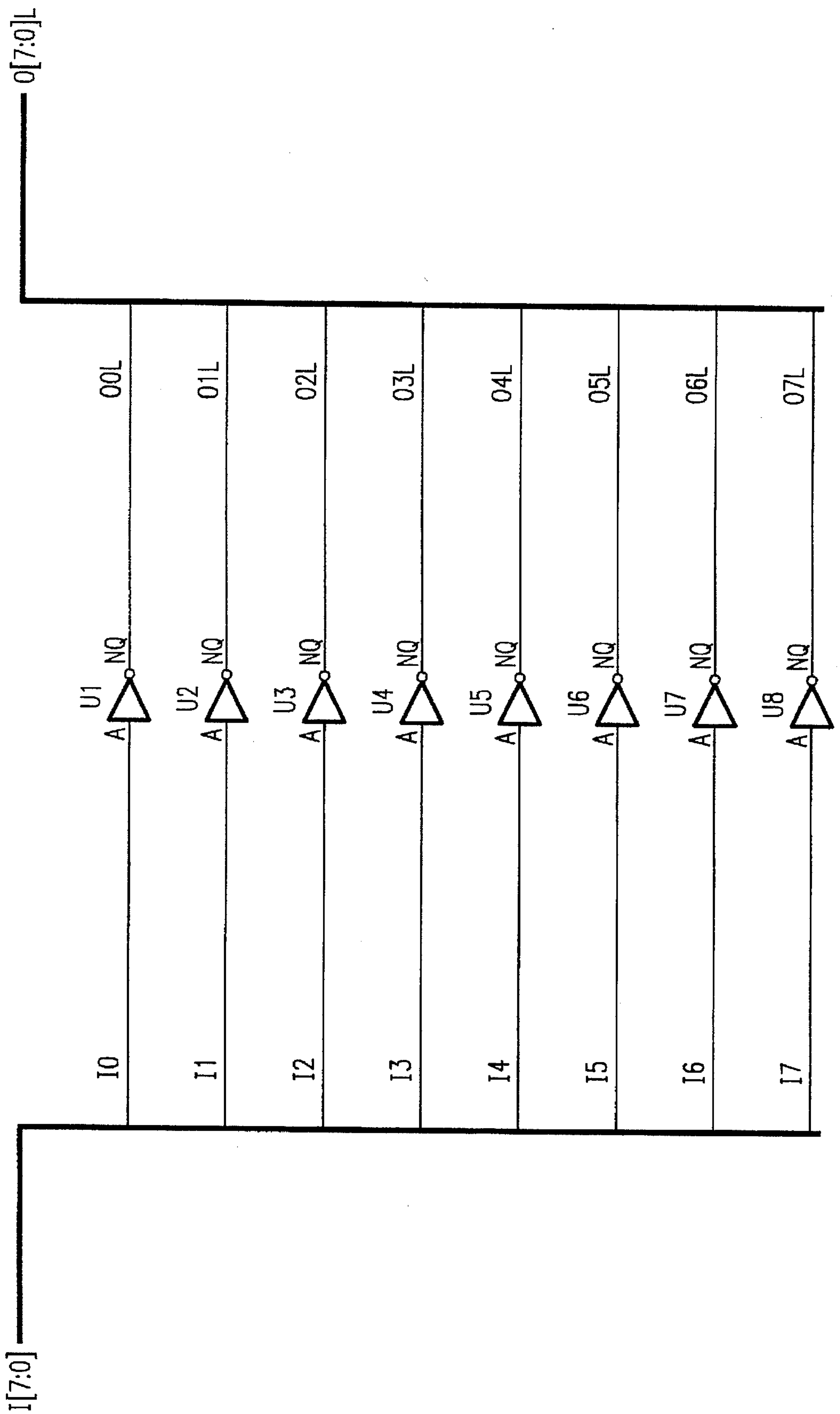
Figure 170:
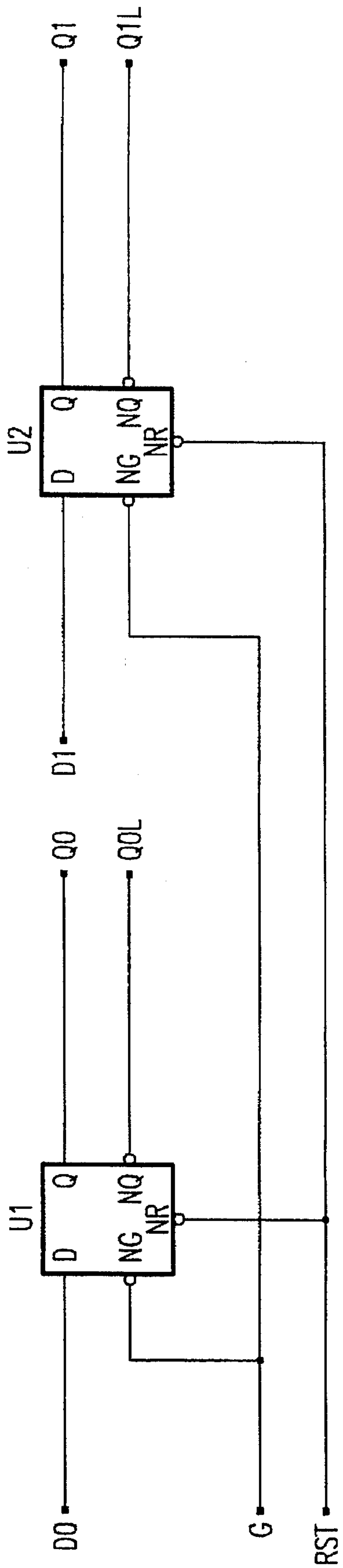
Figure 171:
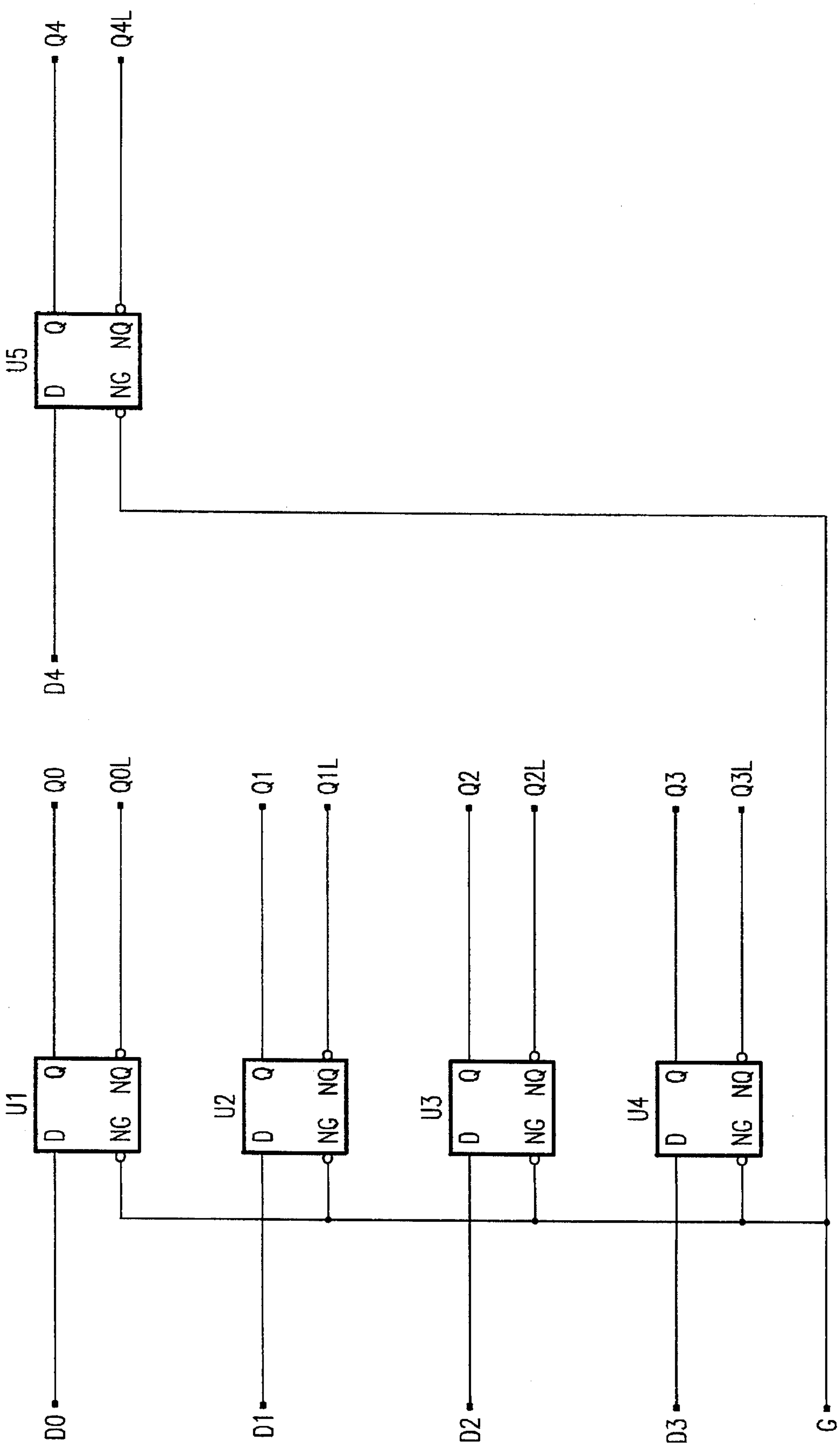
Figure 172:
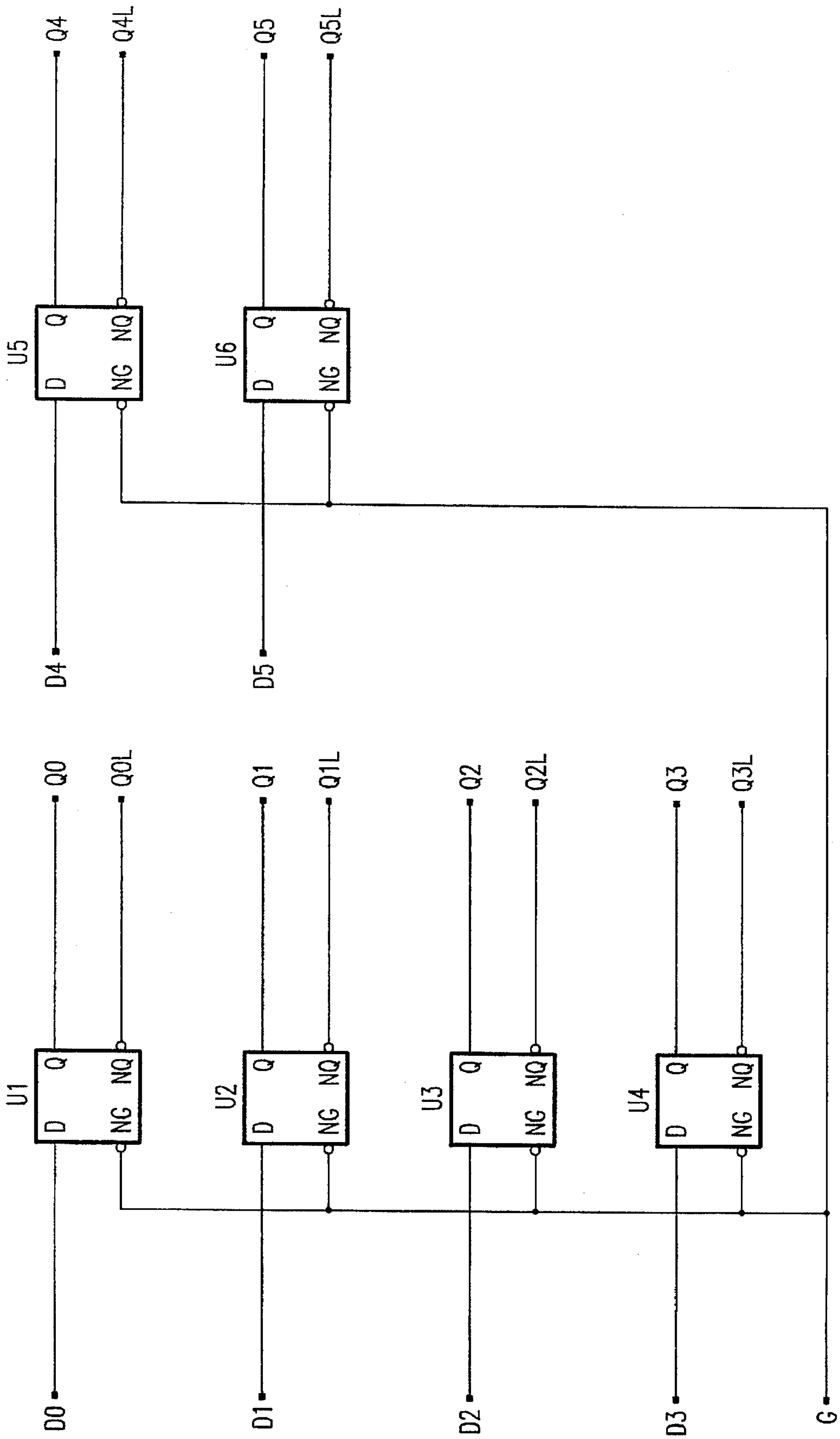
Figure 173:
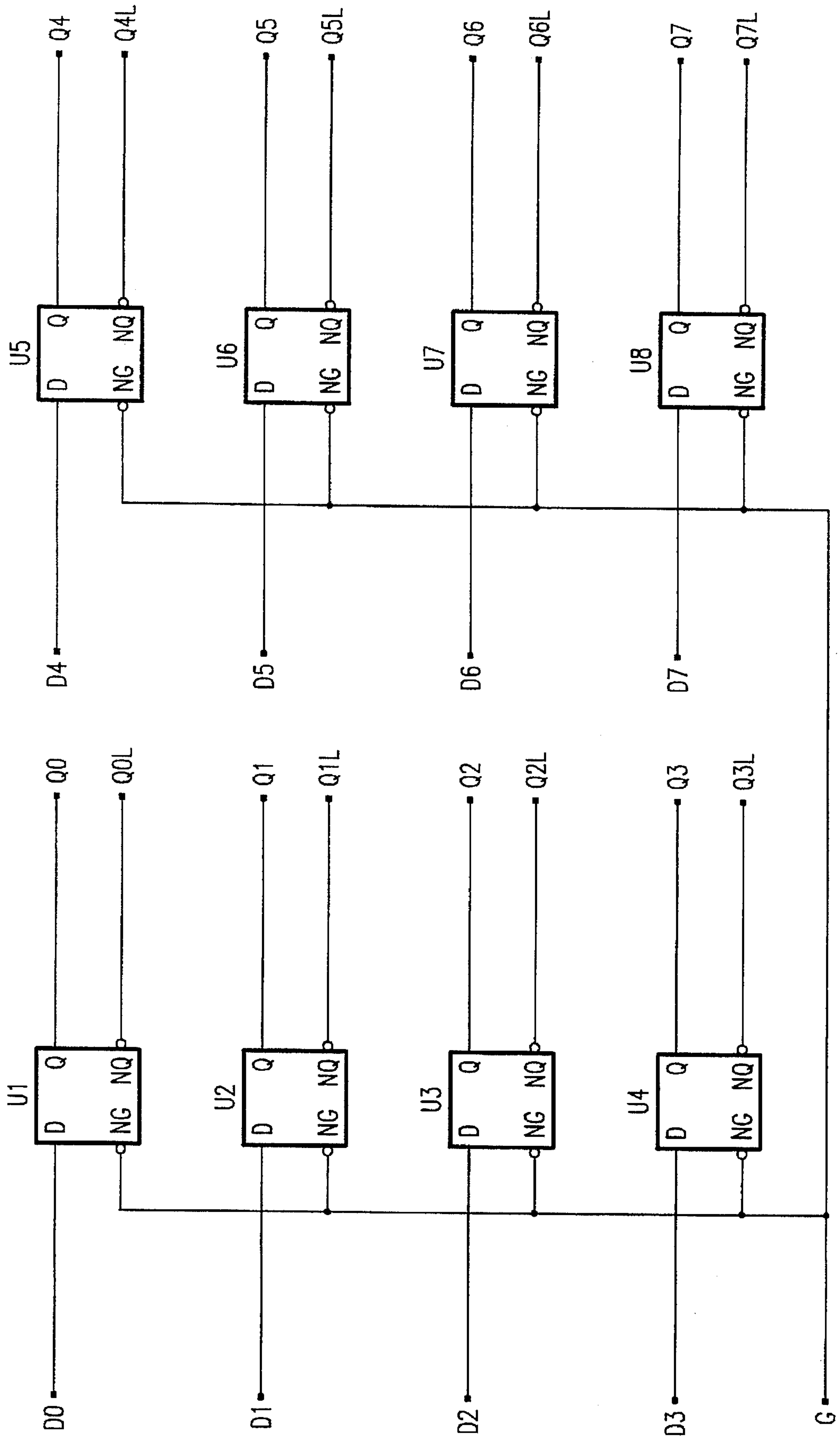
Figure 174A:
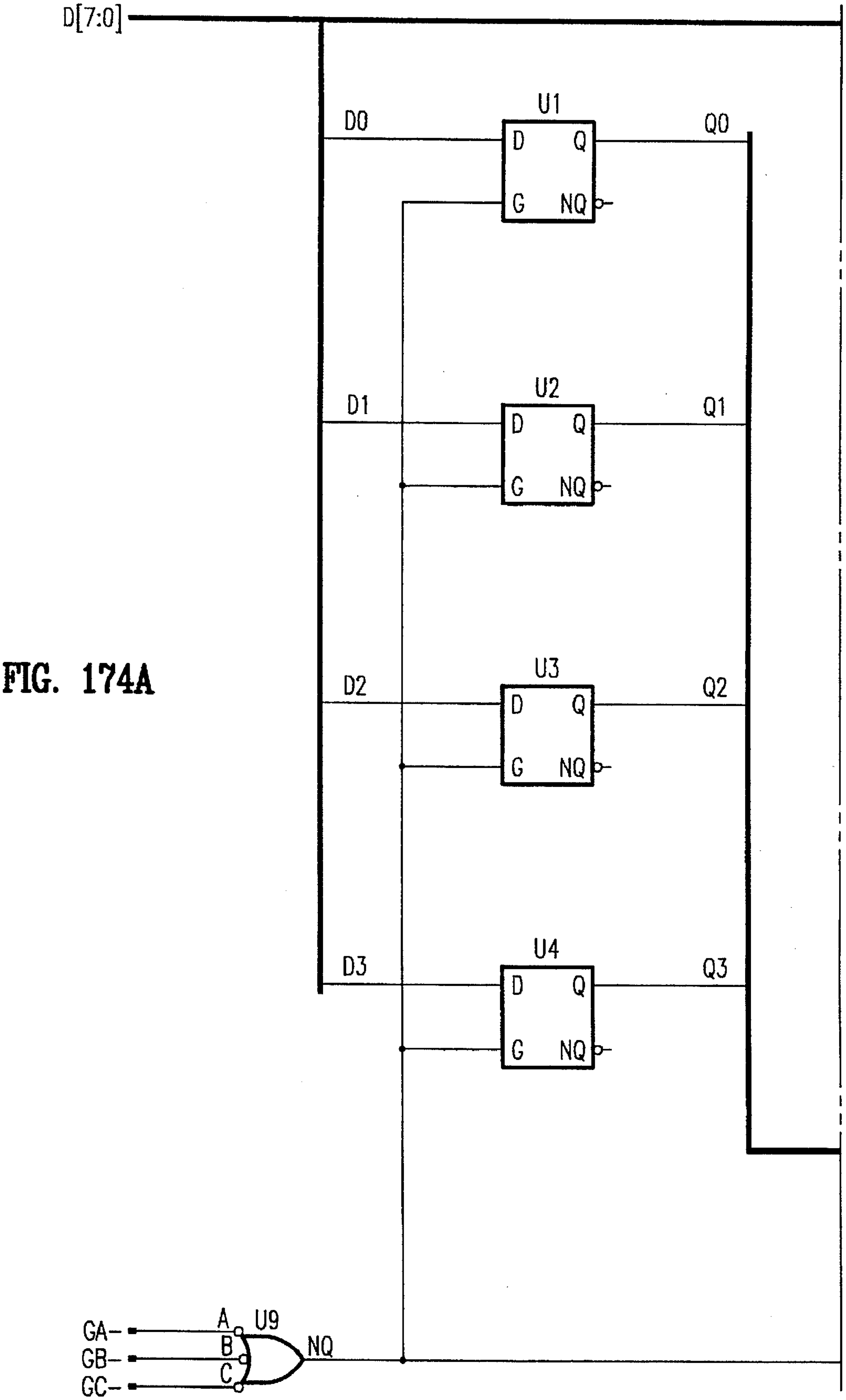
Figure 174B:
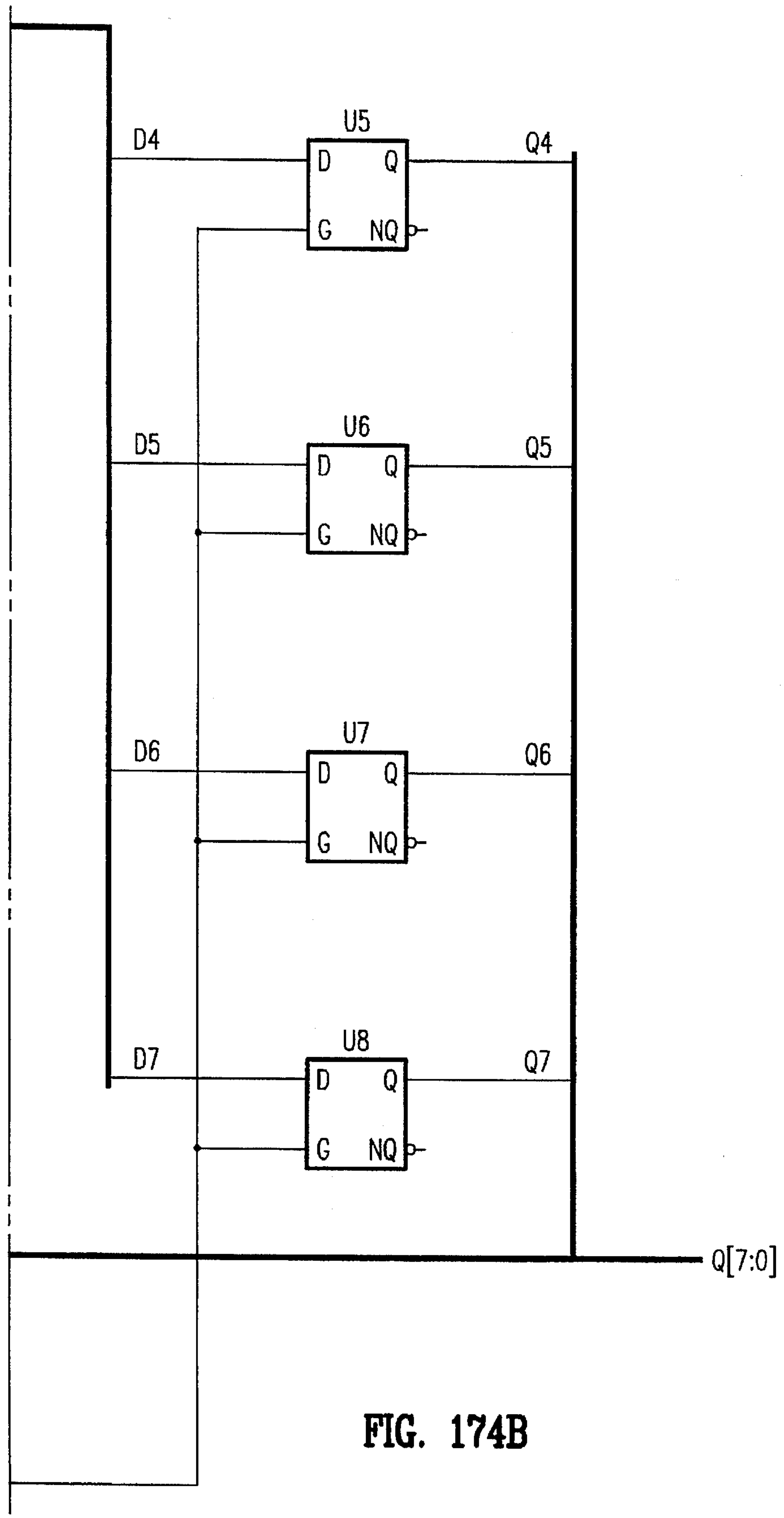

FIG. 169 illustrates circuit INVX8A.

FIGS. 170, 171, 172, 173, and 174A and 174B illustrate circuits LATCH2, LATCH5, LATCH6, LATCH8, and LATCH8HA.

Figure 175A:
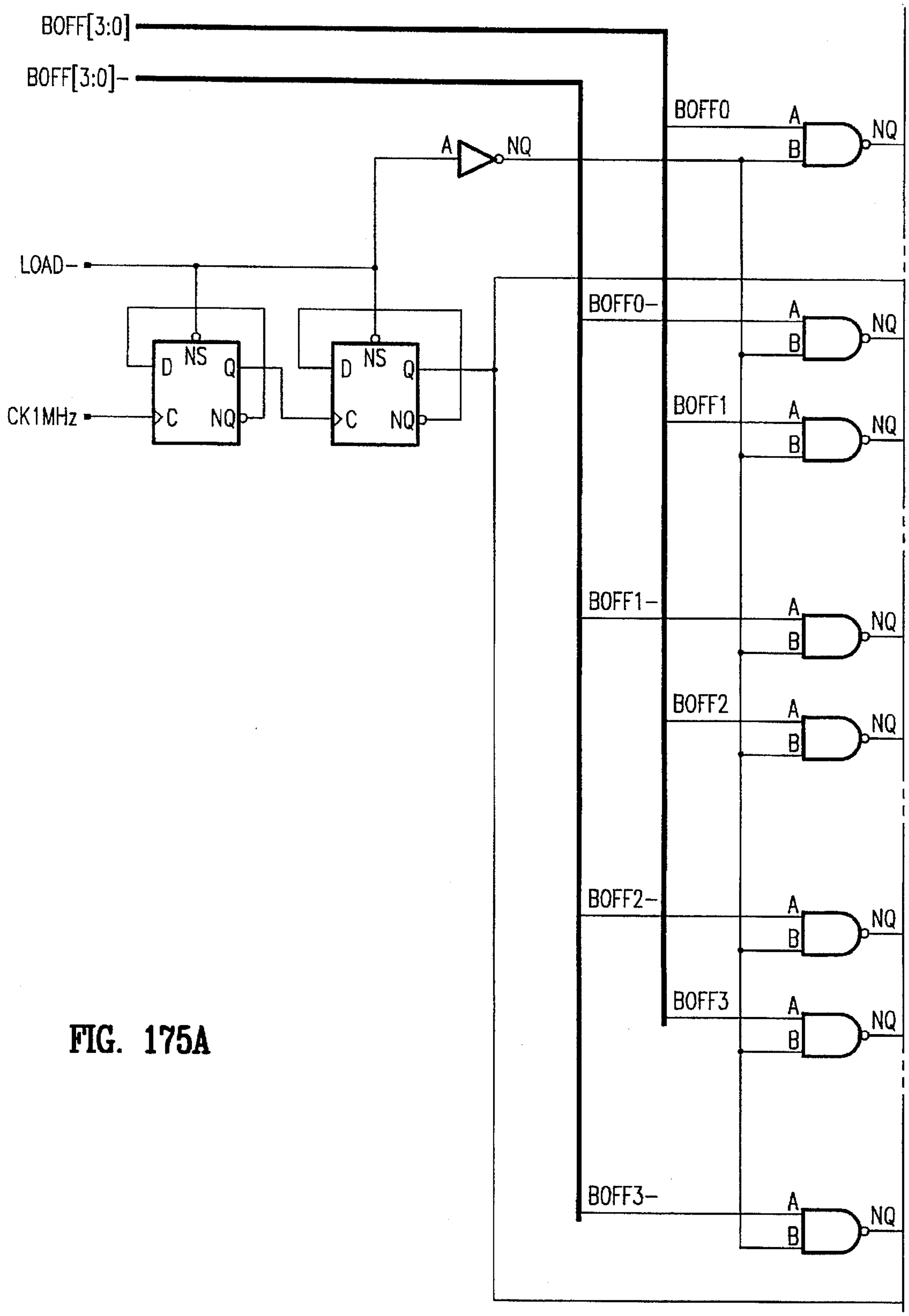
Figure 175B:
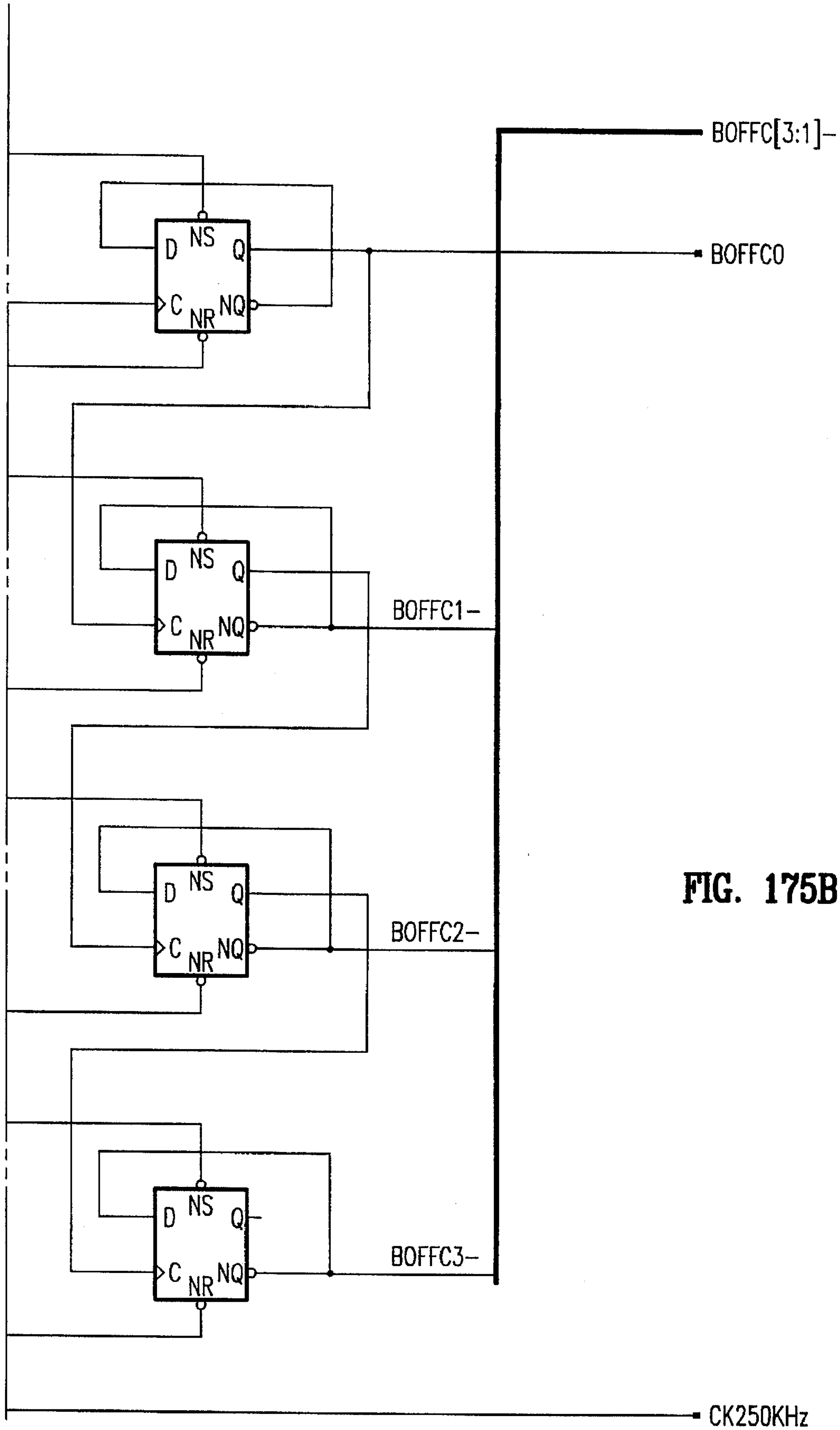

FIGS. 175A and 175B illustrates circuits BOFFCTR.

Figure 176A:
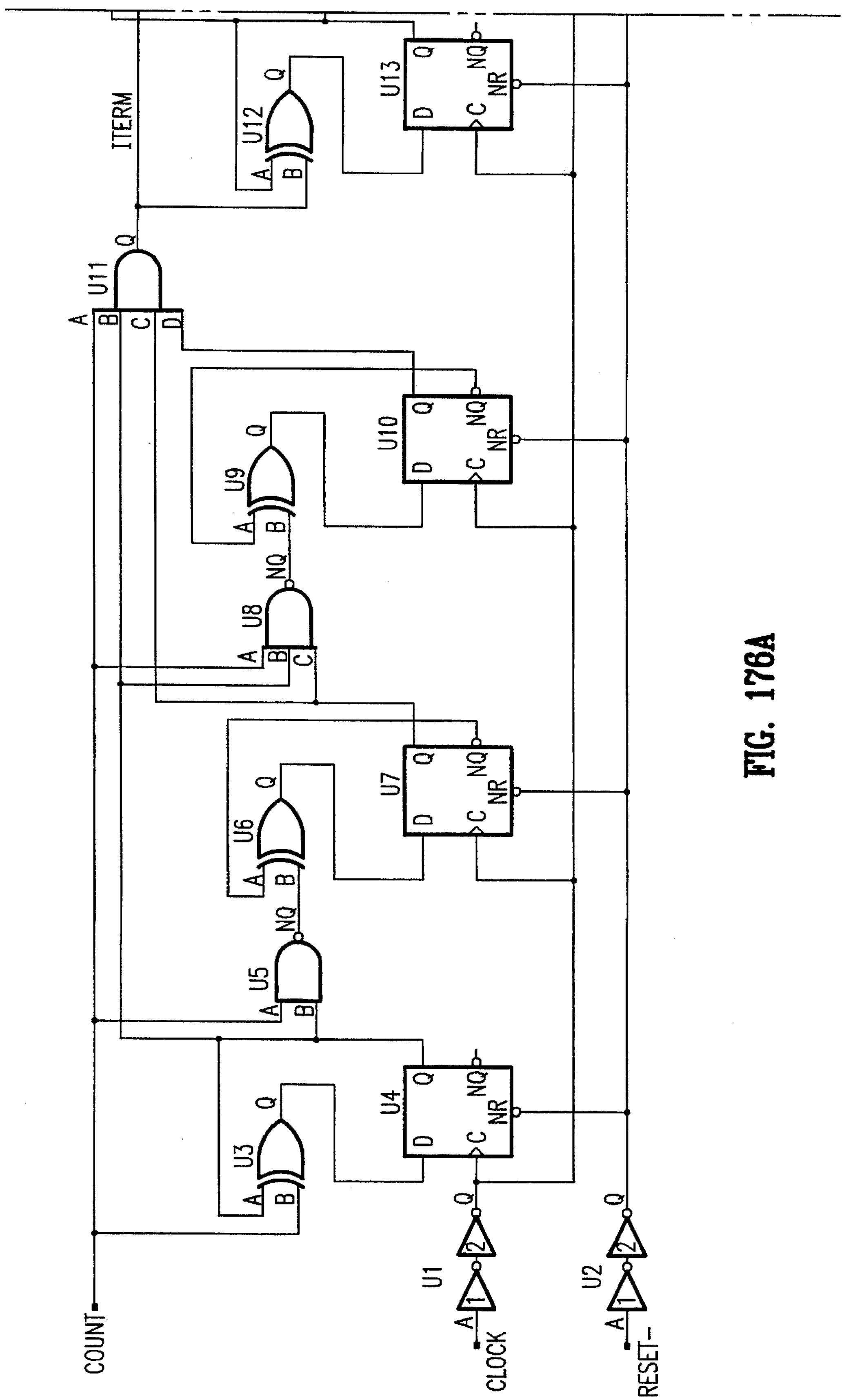

FIGS. 176A abd 176B illustrates circuit UCTR8B.

Figure 177A:
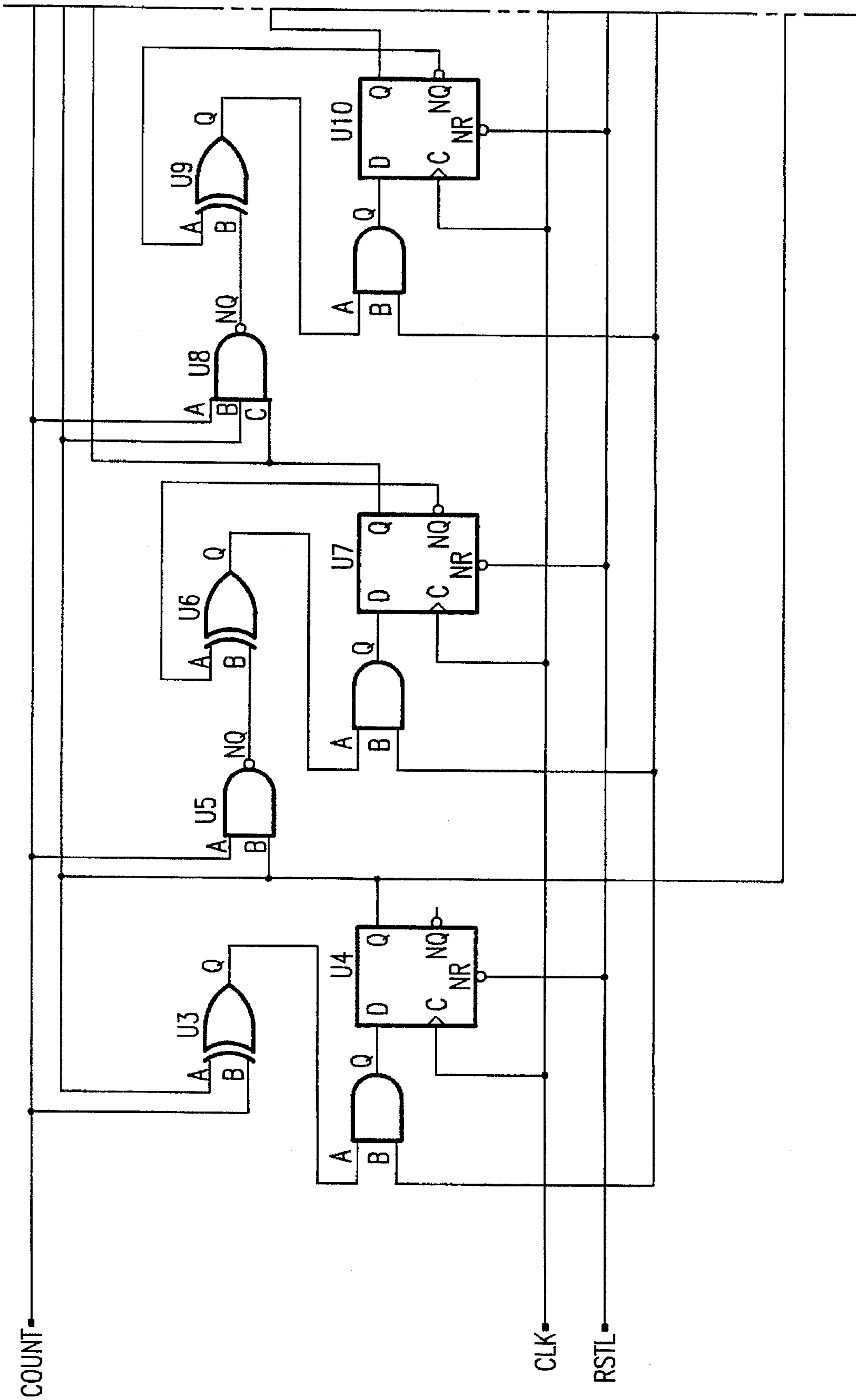
Figure 177B:
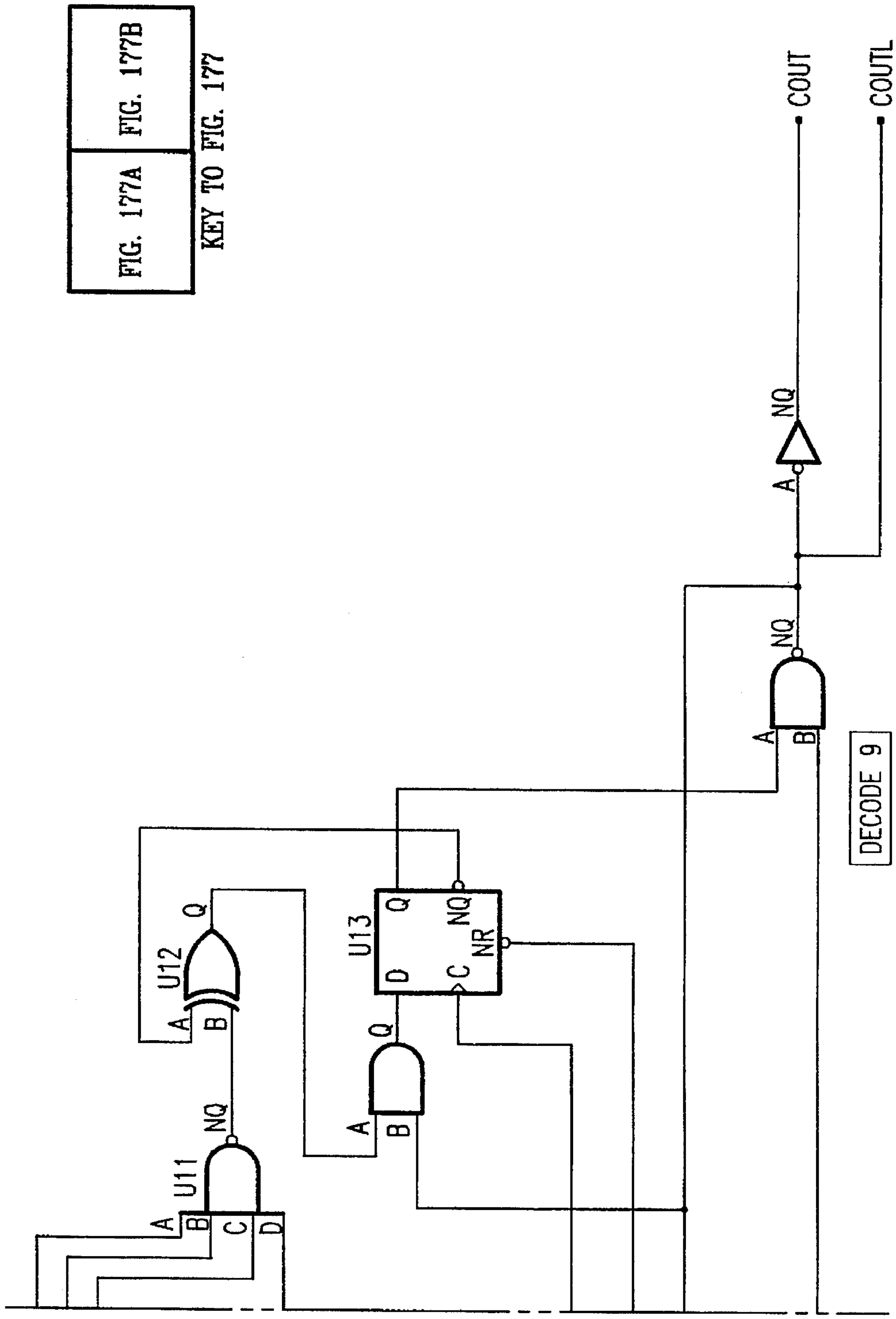

FIG. 177 illustrates circuit DIV20.

DETAILED DESCRIPTION

The host/adaptor (H/A) integrated circuit of this invention is a one-chip computer bus to SCSI bus controller. The host/adaptor (H/A) integrated circuit of this invention allows the host computer to access a SCSI bus with flexibility while at the same time automating the more time consuming SCSI functions such as target selection and reselection. As, explained more completely below, data transfer is accomplished with either DMA (Direct Memory Access) or PIO (Programmed Input Output) using a data path which has the same width in bits as the computer data bus.

In one embodiment, no additional parts are necessary for incorporating the H/A integrated circuit into an IBM-AT compatible system. In IBM-AT compatible system 220 (FIG. 2), a single-chip host/adapter integrated circuit (H/A-IC) 6260 interfaces SCSI bus 110 with computer bus 226. Like reference numerals are used in FIG. 2 to refer to elements which are similar, but not necessarily identical to those of FIG. 1, i.e., "100" was added to the reference numerals of system 120 of FIG. 1 to obtain the reference numerals of system 220 in FIG. 2.

Moreover, use of H/A integrated circuit 6260 in an IBM-AT compatible system is only illustrative of the principles of this invention and is not intended to limit the invention to the computer bus structure or the microprocessor of such a system. In view of this disclosure, those skilled in the art will be able to implement the invention in other computer systems with different bus structures and different operating systems. Further, the use of a microprocessor is illustrative only of a general processing unit, e.g., a RISC processor, in a computer system and is not intended to limit the invention.

Figure 1:
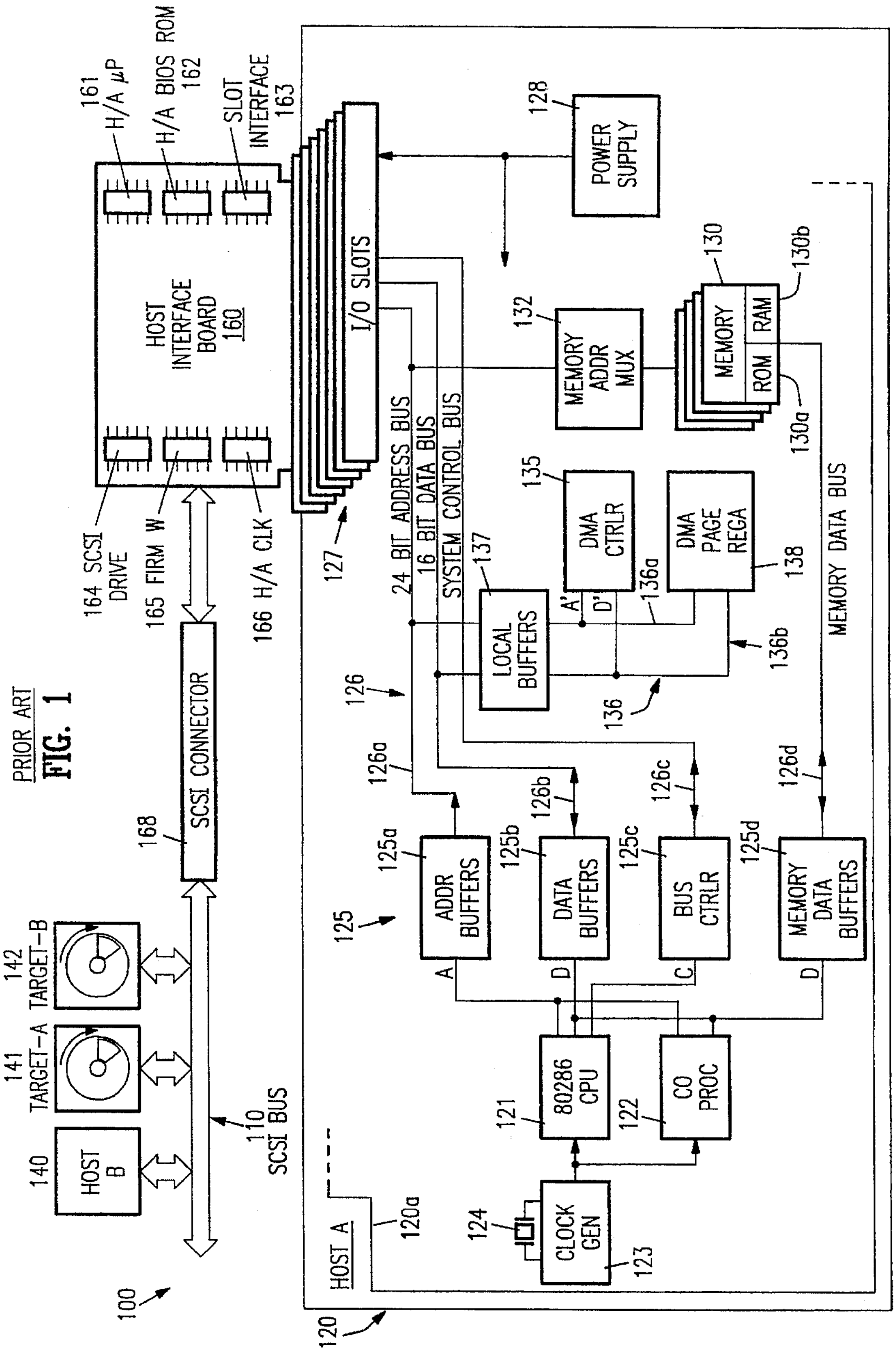
FIG. 1 is a block diagram showing a previous SCSI system.

Unlike the prior art computer system 120, H/A integrated circuit 6260 is preferably mounted on motherboard 220*a* so that adapter board 160 (FIG. 1) is unneeded. Hence, the SCSI interface in system 200 (FIG. 2) is provided at a lower cost than cost of the interface in system 100 (FIG. 1). Specifically, the cost of mounting a plurality of discrete components 161–166 onto an expansion circuit board 160 has been eliminated. Also, as described more completely below, the microprocessor dedicated solely to SCSI operations has been eliminated.

Figure 2:
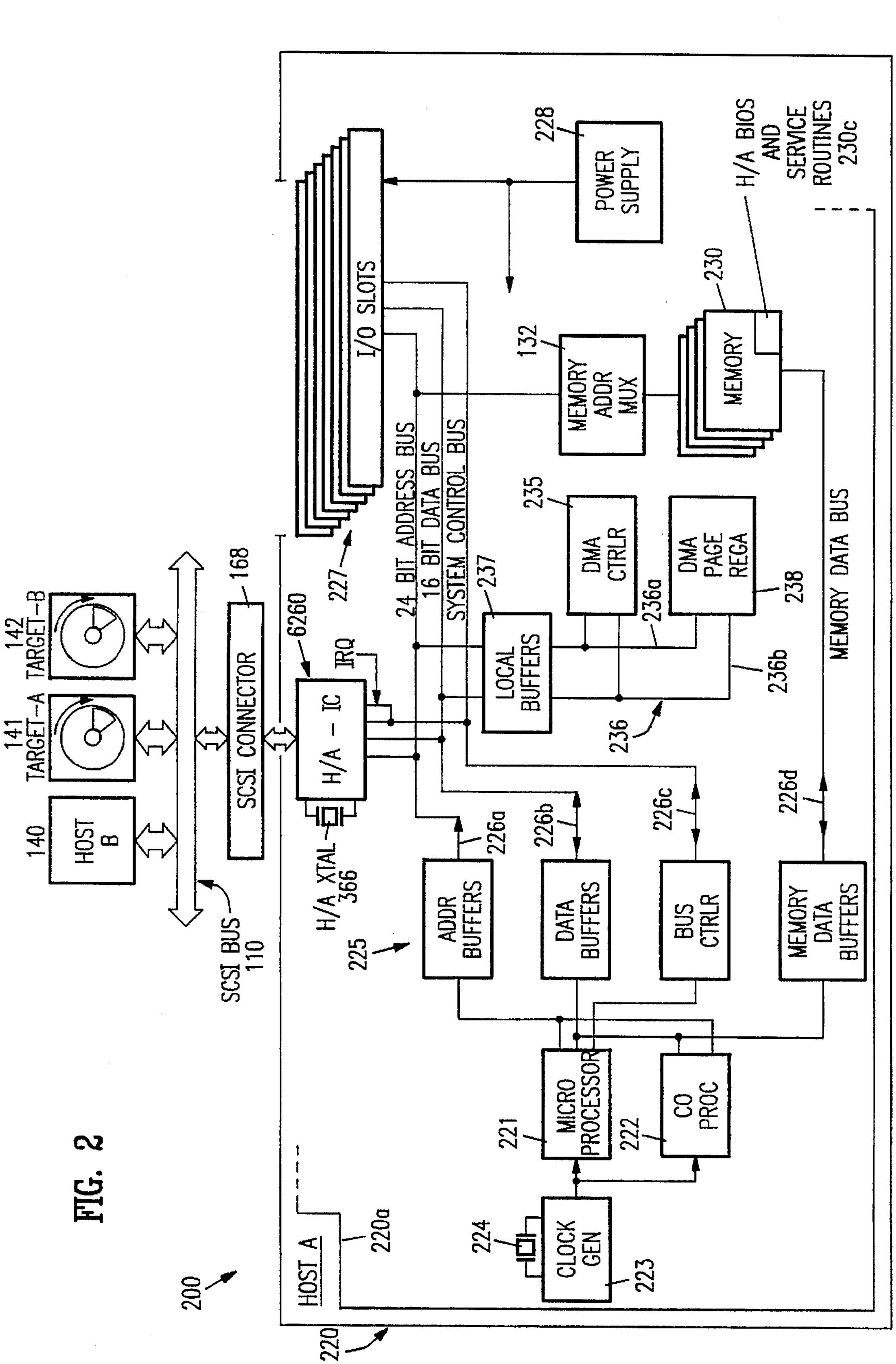
FIG. 2 is a block diagram showing a SCSI system including the integrated circuit of this invention.

H/A BIOS and service routines 230C, as described more completely below, are another important feature of this invention. One embodiment of these routines is presented in Microfiche Appendix A which incorporated herein by reference in its entirety. The other parts and components illustrated in FIG. 2 are a part of computer system 220 and are only illustrative of one embodiment of a system suitable for use with H/A integrated circuit 6260 of this invention. In addition, the operation and interaction of the various components that make up computer system 220 are well known to those skilled in the art.

Unlike the prior art host/adapter boards, H/A integrated circuit 6260 of this invention uses microprocessor 221 of host system 220 to perform selected operations so that H/A integrated circuit 6260 does not include a microprocessor. Microprocessor 221 is interrupted by a signal, a system hardware interrupt, on an IRQ line of bus 226 from H/A integrated circuit 6260 when microprocessor 221 is needed to support SCSI operations. Unlike the prior art systems that placed microprocessor 121 in a wait state, microprocessor 221 stops processing the user application and turns control of microprocessor 221 over to H/A BIOS and service routines 230C. H/A BIOS and service routines 230C use microprocessor 221 to perform required SCSI operations. If H/A BIOS and service routines 230C determine that the SCSI operations performed by H/A integrated circuit 6260 will take some time, the necessary instructions for continued SCSI operations are provided to H/A integrated circuit 6260 and control of microprocessor 221 is returned to system 220. Thus, microprocessor 221 is available for user applications while circuit 6260 simultaneously performs predetermined SCSI phases.

When H/A integrated circuit 6260 completes the SCSI operations enabled by H/A BIOS and service routines 230C, a system hardware interrupt is issued on line IRQ to microprocessor 221 by circuit 6260. In response to the interrupt, microprocessor 221 stops processing the user application and turns control of microprocessor 221 over to H/A BIOS and service routines 230C. This sequence of actions continues until the SCSI operations are complete.

Thus, according to the principles of this invention, microprocessor 221 is used for short segments of time to perform selected SCSI operations. Other of the SCSI operations are performed automatically by H/A integrated circuit 6260. As explained more completely below, (i) the number of interrupts generated by H/A integrated circuit, (ii) the sequencing of interrupt handling, (iii) the storage locations of interrupt related data, and (iv) the operations performed by H/A integrated circuit 6260 were selected so as to limit the microprocessor time required. This optimization of the operation of H/A integrated circuit 6260 coupled with the high speed processing of second, third, fourth generation microprocessors, such as Intel 80286™ microprocessor, Intel 80386™ microprocessor, Intel 80386SX™ microprocessor, or Intel 80486™ microprocessor, (referred to herein as the "80×86 microprocessors) limits any execution performance degradation of the interrupted user application.

Figure 3:
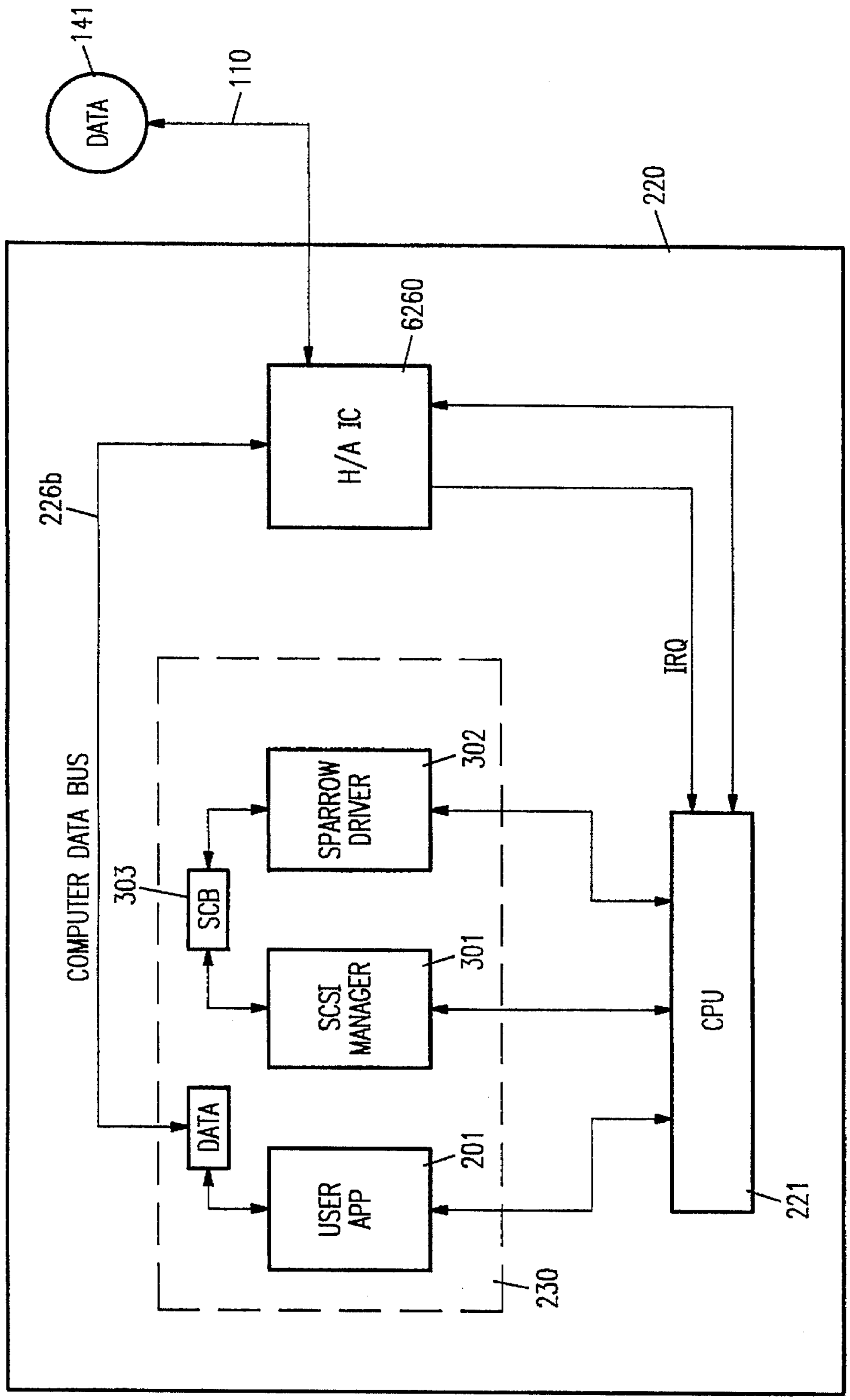
FIG. 3 is a block diagram illustrating the interrelation of the SCSI manager, Sparrow driver and integrated circuit of this invention with the microprocessor of the computer system.

One embodiment of H/A BIOS and service routines 230C is illustrated in more detail in FIG. 3. H/A BIOS and service routines 230C include a SCSI manager 301 and a Sparrow driver 302. (The trade-name for H/A integrated circuit 6260 is "Sparrow".) User application 201, SCSI manager 301 and Sparrow driver 302 are typically contained in main memory 230 of computer system 220. User application 201, SCSI manager 301 and Sparrow driver 302 use microprocessor 221 for processing.

When user application 201 instructs microprocessor 221 to either read data on or write data to SCSI device 141, microprocessor 221 vectors the request to SCSI manager 301. In response to the instructions from microprocessor 221, SCSI manager 301 builds a SCSI control block (SCB) 303 and calls Sparrow driver 302.

Sparrow driver 302 accesses SCB 303 and manages the SCSI operations specified in SCB 303 through to completion by H/A integrated circuit 6260. Microprocessor 221 executes Sparrow driver 302 instructions and in turn sends instructions to H/A integrated circuit 6260. Herein, reference to Sparrow driver 302 sending or receiving information from H/A integrated circuit 6260 should be understood to mean that the information is transferred using microprocessor 221. During the course of the SCSI command sequence, Sparrow driver 302 waits for events such as a selection complete interrupt, a transfer complete interrupt, a phase mismatch interrupt, or perhaps a SCSI reset interrupt, and upon completion of an event takes the appropriate action. Since Sparrow driver 302 shares microprocessor 221 with computer system 200, Sparrow driver 302 anticipates any significant delay, e.g., when an instant response from the target is not anticipated, and returns microprocessor 221 for use by system 220.

Prior to returning microprocessor 221 for use by system 220, Sparrow driver 302 programs, as described more completely below, H/A integrated circuit 6260 to provide a system hardware interrupt when one or more expected events occur and to perform a predetermined sequence of operations. Subsequently, after performance of the programmed operations by H/A integrated circuit 6260, circuit 6260 generates a system hardware interrupt.

In response to the system hardware interrupt, microprocessor 221 stops processing of user application 201 and turns control over to SCSI manager 301 which in turn calls Sparrow driver 302. Sparrow driver 302 examines the status of H/A integrated circuit 6260 and branches to the operations needed to complete the SCSI commands following generation of the system hardware interrupt.

Hence, H/A integrated circuit 6260 includes means for performing SCSI operations automatically, means for indicating the status of the SCSI operations, means for generating hardware interrupts upon occurrence of predetermined events and means for transferring information between a SCSI bus and a computer data bus. However, H/A integrated circuit 6260 does not contain a microprocessor. Rather, system hardware interrupts are used to cause sharing of computer system microprocessor 221.

This novel method of sharing computer system microprocessor 221 makes elimination of prior art host/adaptor board 160 (FIG. 1) possible because with this method, the hardware required for the interface between the SCSI bus and the computer data bus has been incorporated in a single H/A integrated circuit 6260. In one embodiment, H/A integrated circuit 6260 was fabricated using a 1.25 micron double layer metal P-well CMOS process.

Figure 4:
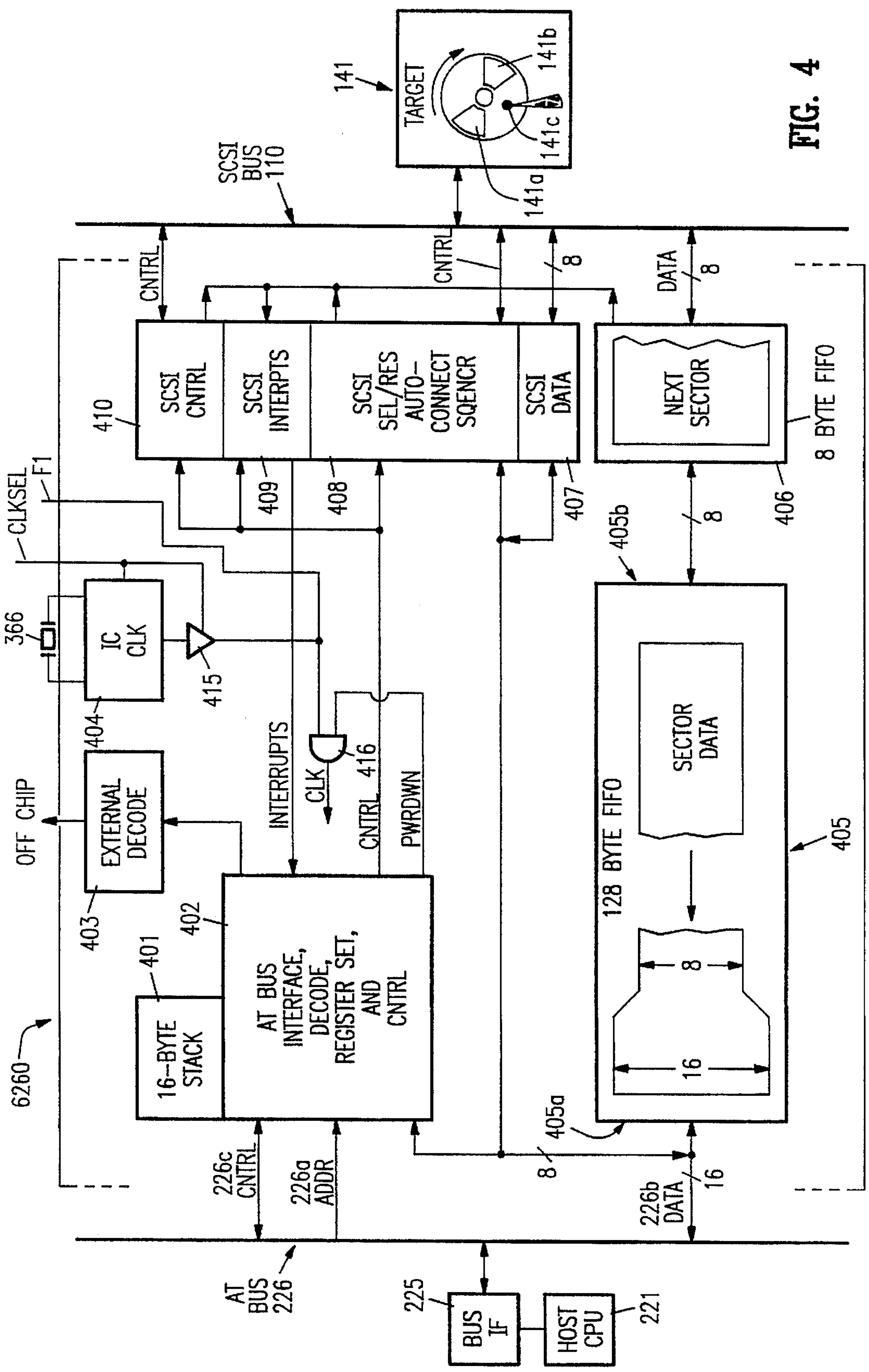
FIG. 4 is a block diagram of one embodiment of the host/adapter integrated circuit of this invention.

A block diagram of one embodiment of H/A integrated circuit 6260 is illustrated in FIG. 4. H/A integrated circuit 6260 includes a 16-byte stack 401, computer bus interface, decode, register set and control hardware 402, external decode hardware 403, IC clock hardware 404, SCSI control hardware 410, SCSI interrupt hardware 409, SCSI auto sequence control hardware 408, SCSI data hardware 407, and first-in-first-out data buffers (FIFOs) 405, 406.

Computer bus interface, decode, register set and control hardware 402, and external decode hardware 403 are coupled to address bus 226A and control bus 226C of computer bus 226. Hardware 402 includes a register set, described more completely below, that is configured as part of the address space of microprocessor 221. Hardware 402 also processes signals sent over busses 226B and 226C by microprocessor 221 in response to directions from Sparrow driver 302 and provides control signals to SCSI interrupt hardware 409, SCSI auto sequence control hardware 408, and SCSI control hardware 410. In addition, hardware 402 receives and provides information to external decode hardware 403. The decode hardware within hardware 402 decodes the addresses on bus **226*a* and determines which of the addresses are for H/A integrated circuit 6260. This decoding eliminates the need for external hardware that normally decodes the addresses and generates a chip select signal. The incorporation of this decode function in H/A integrated circuit 6260 eliminates the need for additional hardware on motherboard 220*a* (FIG. 2) to support operation of H/A integrated circuit 6260**.

In this embodiment, DMA FIFO 405 is a 128 byte FIFO. DMA FIFO 405 has either an 8-bit or a 16-bit input/output data path 405A that interfaces with computer data bus 226B. DMA FIFO 405 has an 8-bit input/output data path 405B that interfaces with SCSI FIFO 406. As explained more completely below, 16 bit input/output data path 405 is one important features of this invention. Microprocessor 221 provides an instruction that transfers 16 bits of data, a word, over data bus 226B. Preferably, data is moved between DMA FIFO 405 and bus 226B using this instruction. Therefore, data is transferred significantly faster than when only an 8-bit data path is utilized. In general, input/output data path 405A preferably has a size in bits that is equal to the size in bits of the computer data bus. A more detailed schematic diagram for one embodiment of FIFO 405 is presented in FIGS. 72A through 90D.

Another important aspect of this invention is the size in bytes of DMA FIFO 405. The size of the FIFO must consider both operational characteristics of the FIFO and the chip area required by the FIFO. For an IBM-AT compatible computer, the minimum size FIFO is defined by the size required to achieve minimum and maximum SCSI data transfer rates considering H/A integrated circuit 6260 firmware processing time overhead, Sparrow driver 302 execution time, and computer bus timing issues related to computer BIOS operation.

Specifically, to avoid skipping revolutions on the SCSI disk, at least a data transfer rate of 1.25 MBytes per second is desirable. Also, when transferring data with the SCSI synchronous method, a 5 MBytes per second transfer rate is desirable. Thus, these two rates define the allowable range of data transfer rates on SCSI bus 110. To determine the size of the FIFO to support this range of data transfer rate, a worst case computer system is used to define the size of the FIFO for the minimum transfer rate and a best case computer system is used for calculating the minimum FIFO size needed to support the maximum SCSI data transfer rates.

As explained more completely below, a basic method of PIO data transfer is for Sparrow driver 302 to look for either a full or empty FIFO (depending on direction) condition to transfer data when these conditions are detected. Data transfer rate is calculated according to the following method. In the following method, "(286)" refers to the Intel 80286 microprocessor and "(386)" refers to the Intel 80386 microprocessor.

data rate=#bytes/time where:

#bytes=fifosize time=program loop execution time

+(repeat instruction time)(#cycles)

+(AT bus time per I/O cycle)(#cycles)

#cycles=fifosize/2 (2 bytes per cycle with 16 bit transfers)

program loop time (286)=(42+(20*w)+<optional BIOS read states>)*clk program loop time (386)=(49+(20*w)+<optional BIOS read states>)*clk repeat instruction time (286)=(4+(2*w))*clk repeat instruction time (386)=(6+(2*w))*clk w=wait states clk=CPU [microprocessor] clock period For an IBM-AT compatible computer with a Intel 80286 microprocessor, a worst case timing is taken as an 8 MHz clock with one wait state, a computer bus time of 250 nanoseconds and adding 40 BIOS fetch wait states. Using these values for the worst case gives the results in Table 1.

TABLE 1

FIFO Sizes For Slowest Computer Data Transfer

| Fifo Size (Bytes) | Data Rate (MBytes/sec) |
|---|---|
| 32 | 1.11 |
| 64 | 1.43 |
| 128 | 1.67 |

The best case timing example assumes a IBM-AT compatible computer with an Intel 80386 microprocessor operating with a 33 MHz clock with no wait states. The computer bus time is 250 nanoseconds with no additional wait states. Using these values in the above expressions, the best case computer gives the results illustrated in Table 2.

TABLE 2

FIFO Sizes For Fastest Computer Data Transfer

| Fifo Size (Bytes) | Data Rate (MBytes/sec) |
|---|---|
| 32 | 3.81 |
| 64 | 4.18 |
| 128 | 4.40 |
| 192 | 4.47 |
| 256 | 4.51 |

Comparing the FIFO size with the data transfer rate as shown in Tables 1 and 2 shows that the minimum size must be larger than 32 bytes to achieve the minimum acceptable 1.25 MByte transfer rate. However, for a FIFO size of greater than 128 MBytes, the gain in data transfer rate is not appreciable. However, the chip area required for the larger FIFOs is significant. Therefore, considering chip area versus transfer rate, the optimum size of the FIFO for IBM-AT compatible computers is 128 bytes for DMA FIFO 405.

System byte stack 401 is provided for operations associated with H/A integrated circuit 6260 that require a memory. Specifically, stack 401 is semi-permanent storage for system related parameters.

Figure 5A:
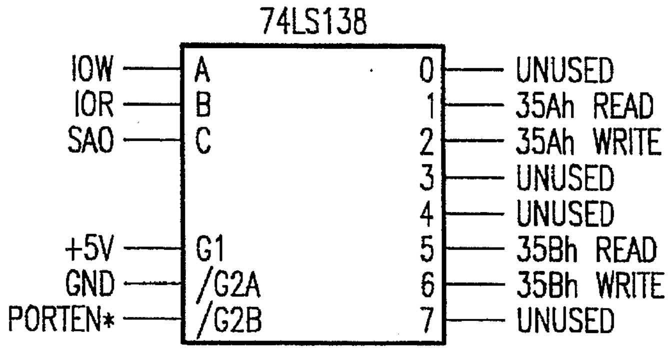
FIG. 5A is a block diagram of a decoder for the external port decode.

In one embodiment, H/A adapter circuit 6260 has two external ports. These external ports provide a convenient way for adding configuration or status information related to H/A integrated circuit 6260 operation. However, these ports are only partially decoded by external decode hardware 403 and external logic is required to use these ports. For example, an external 3-line to 8-line decoder, e.g., a model 74LS138 decoder available from Texas Instruments of Dallas, Tex., is used in one embodiment to decode signals IOW, IOR, and SAO (See FIG. 5A).

In addition to the control signals from computer bus interface, decode, register set and control hardware 402, SCSI control hardware 410 and SCSI auto sequence control hardware 408 receive control signals from SCSI bus 110. In response to these control signals, SCSI auto sequence control hardware 408 automatically performs, as required, SCSI Arbitration, Selection out(as initiator), Reselection in(as initiator), Selection in (as target), and Reselection out (as target) phases. Hence, the control signals from computer bus interface, decode, register set and control hardware 402 are used to program H/A integrated circuit 6260 to perform these operations.

Upon completion of a predetermined event or series of events by H/A integrated 6260, SCSI control hardware 410 and SCSI auto sequence control hardware 408 provide signals to SCSI interrupt hardware 409 which in turn generates a system hardware interrupt signal. The system hardware interrupt signal is passed through hardware 402, described more completely below, to computer bus 226.

Also, SCSI autosequence control hardware 408 and SCSI control hardware 410, in response to signals from SCSI bus 110, provide signals to SCSI interrupt hardware 409. In response to the signals from hardware 408, 410, SCSI interrupt hardware 409 generates hardware interrupts to indicate the condition on SCSI bus 110 as represented by the SCSI control signals provided to hardware 408, 410.

The generation of hardware interrupts is controlled by Sparrow driver 302 using a plurality of bits for each hardware interrupt. In one embodiment, each hardware interrupt has a status bit, an interrupt enable bit, and an interrupt clear bit. The use of three bits for each interrupt permits Sparrow driver 302 to poll the status bit with the interrupt either enabled or disabled. In one embodiment, the enable bits are stored in a first set of registers, the status bits in a second set of registers and the clear bits in a third set of registers in hardware 402. Preferably, the status and clear bit for a particular interrupt are arranged in corresponding bit locations in the second and third sets of registers to minimize the instructions in Sparrow driver 302 required for interrupt detection and response.

In addition to the three bits for each interrupt, SCSI interrupt hardware 409 generates a global interrupt status bit that is the logic OR of all enabled interrupts. This global interrupt status bit is available at any time in one of the registers in hardware 402. Also, system interrupt line (IRQ) is driven by the system hardware interrupt generated by SCSI interrupt hardware only if (i) a master interrupt enable was enabled by Sparrow driver 302 and (ii) the enable bit for that particular hardware interrupt was set. Independent of whether the enable bit for the particular hardware interrupt is set, the SCSI interrupt hardware sets the status bit for that particular hardware interrupt upon the occurrence of the interrupt. The master interrupt enable, sometimes referred to as a global hardware interrupt enable, is used either to prevent the hardware from issuing a system interrupt at an improper time or to toggle the signal on the system interrupt line. Thus, H/A integrated circuit 6260 may be used in either a system that requires an edge triggered system hardware interrupt or a system that requires a level triggered system hardware interrupt.

In addition to SCSI hardware 408, 409, 410, the SCSI section of H/A integrated circuit 6260 includes a SCSI data section 407 and an 8 byte SCSI FIFO 406. SCSI data section 407 is used to support SCSI PIO data transfers directly from computer data bus 226B to SCSI bus 110. SCSI FIFO 406 is used to support DMA or PIO transfers between SCSI bus 110 and computer data bus 226B.

The size of SCSI FIFO 406 is determined by the allowable offset for a SCSI synchronous data transfer. As is known to those skilled in the art, in a synchronous SCSI data transfer, an offset number of bytes may be transferred without a corresponding number of "ACK" signals being sent by the initiator. The size of SCSI FIFO 406 is determined by the maximum number of offset bytes that may be transferred in a synchronous data transfer without receiving a corresponding handshake "ACK" signal from the initiator. Thus, in this embodiment, the maximum offset number is 8 bytes.

Data transfers between a SCSI target 141 and a host system 220 may be either PIO transfers or DMA transfers through FIFOs 405, 406 or alternatively, SCSI PIO transfers through SCSI data 407. In this embodiment, SCSI FIFO 406 receives 8-bit data from SCSI bus 110 at a first transfer rate and DMA FIFO 405 outputs either byte-sized (8 bits) or word-sized (16 bits) data onto computer data bus 226B at a second transfer rate (measured in bits per second, b/s). The second transfer rate, b/SAT, to computer bus 226B is preferably much larger than the first transfer rate, $b/s_{SCSI}$, from SCSI bus 110 ($b/S_{AT} >> b/s_{SCSI}$). A typical configuration is $b/S_{AT}=150$ megabits per second while $b/s_{SCSI}=15$ megabits per second for an asynchronous transfer and $b/s_{SCSI}=40$ megabits per second for a synchronous transfer.

H/A integrated circuit 6260 includes an oscillator circuit 404 that is driven by an external crystal 366. Thus, H/A integrated circuit 6260 operates independently of the host system clock system 223 (FIG. 2). Typically, crystal 366 (FIG. 4) is fixed to operate at a frequency of approximately 20 MHz. One embodiment of an oscillator circuit suitable for use in H/A integrated circuit 6260 is described in copending, commonly filed, and Commonly assigned U.S. patent application Ser. No. 07/662,530, now U.S. Pat. No. 5,150,081, entitled "Integrated Crystal Oscillator with Circuit For Limiting Crystal Power Dissipation," of Jules Goldberg filed on Feb. 28, 1991, which is incorporated herein by reference in its entirety. Hence, in this embodiment, H/A integrated circuit 6260 has an oscillator integrally formed on its substrate. Circuit 6260 needs only an external 20 MHz crystal attached to generate its own clock signal. Thus, the external components required to support circuit 6260 on motherboard **220*a*** have been further minimized.

H/A integrated circuit 6260 uses either the clock signal from oscillator circuit 404 or an external clock signal provided on pin F1. The clock signal used is determined by the signal applied on pin CLKSEL. If +5 volts is applied to pin line CLKSEL, power is supplied to oscillator circuit 404 and three-state element 415 is enabled. Thus, the clock signal from circuit 404 is supplied to pin F1 and AND gate 416.

If pin CLKSEL is allowed to float, oscillator circuit 404 receives no power and three-state element 415 has a high impedance output. Thus, the external clock signal on pin F1 is supplied to AND gate 416. Use of the external clock saves the cost of crystal 366 and the external clock frequency may differ thereby facilitating application requirements.

If the signal on line PWRDWN is a logic one, AND gate 416 supplies the clock signal to all clocked components in H/A integrated circuit 6260. If the signal on line PWRDWN is a logic zero, the clock signal is gated off. When the clock signal is gated off, clocked transitions are stopped and the power required for such transitions is conserved. Hence, when H/A integrated circuit 6260 is not needed for SCSI transfers, the clock signal generated by oscillator circuit 404 is gated off to conserve power drawn from host power supply 228.

Figure 5B:
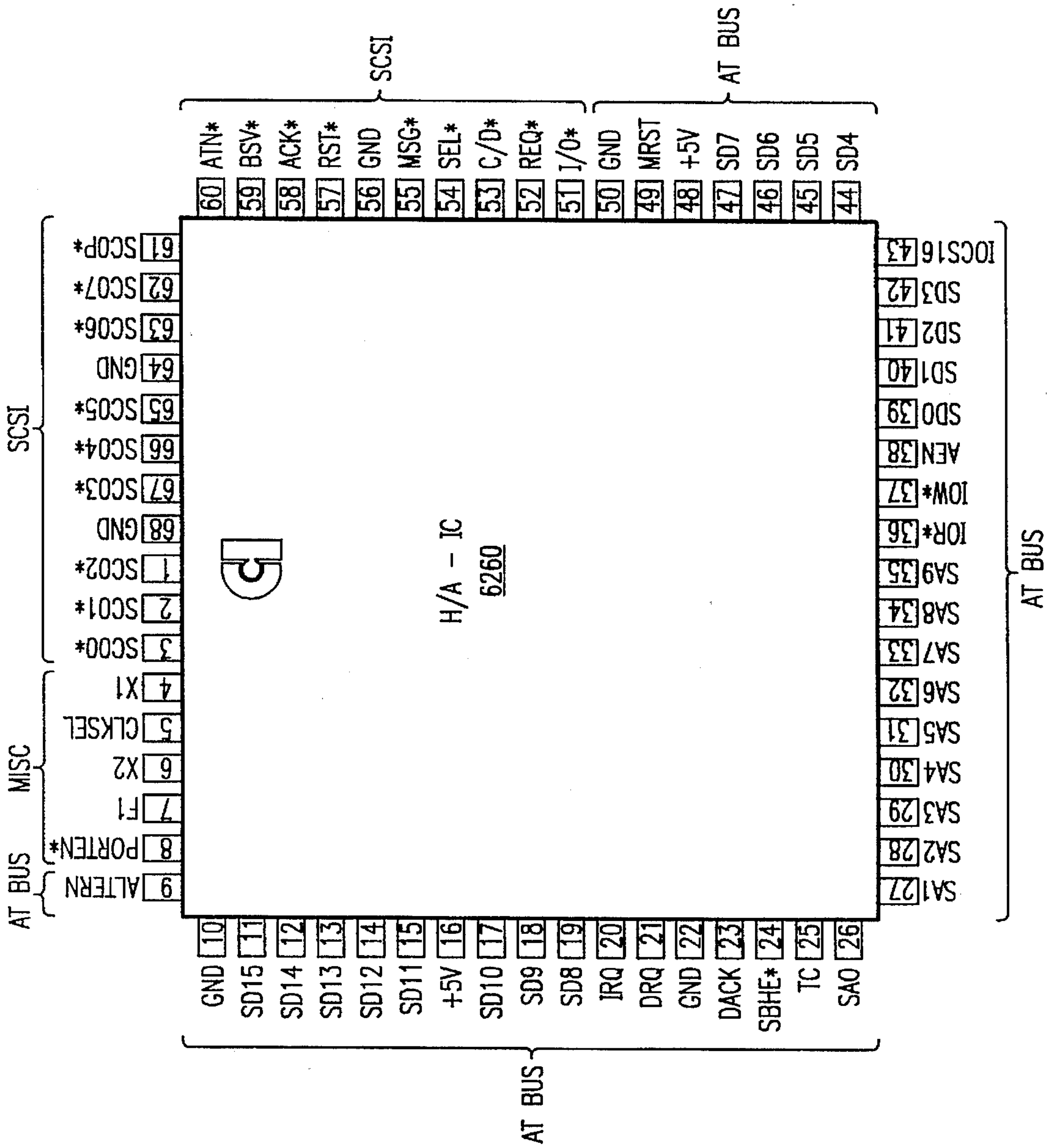
FIG. 5B is a top plan view of a host/adapter integrated circuit (H/A chip) in accordance with the invention.

Referring briefly to FIG. 5B, a top plan view of an H/A integrated circuit 6260 is shown for one embodiment of this invention. H/A integrated circuit 6260 is housed is a square-shaped 68 pin PLCC package. The pins are divided into three continuous, non-overlapping series, AT-BUS, SCSI and MISC, which circle the periphery of the integrated circuit package. A more detailed description of the signal on each pin of the package is given in Appendix I below, which is incorporated herein by reference in its entirety.

As explained above, a typical data transfer operation between a host and a target has seven SCSI "phases": (1) ARBITRATE, (2)SELECT, (3)MESSAGE(out), (4)COMMAND, (5) DATA, (6) STATUS and (7) MESSAGE(in). The low-level phases, i.e., the ARBITRATE and SELECTION phases, are performed entirely by SCSI auto sequence control hardware 408. Specifically, SCSI auto sequence control hardware 408 performs SCSI Arbitration, Selection out(as initiator), Reselection in(as initiator), Selection in (as target), and Reselection out(as target) phases. For these phases, Sparrow driver 302 programs H/A integrated circuit 6260 and then returns control of microprocessor 221 to system 220. For the other phases, Sparrow driver 302 sends and receives information to H/A integrated circuit 260 as circuit 6260 interacts with another device over SCSI bus 110. Thus, Sparrow driver 302 effectively controls or responds to all SCSI phases performed by H/A integrated circuit 6260.

Figure 6:
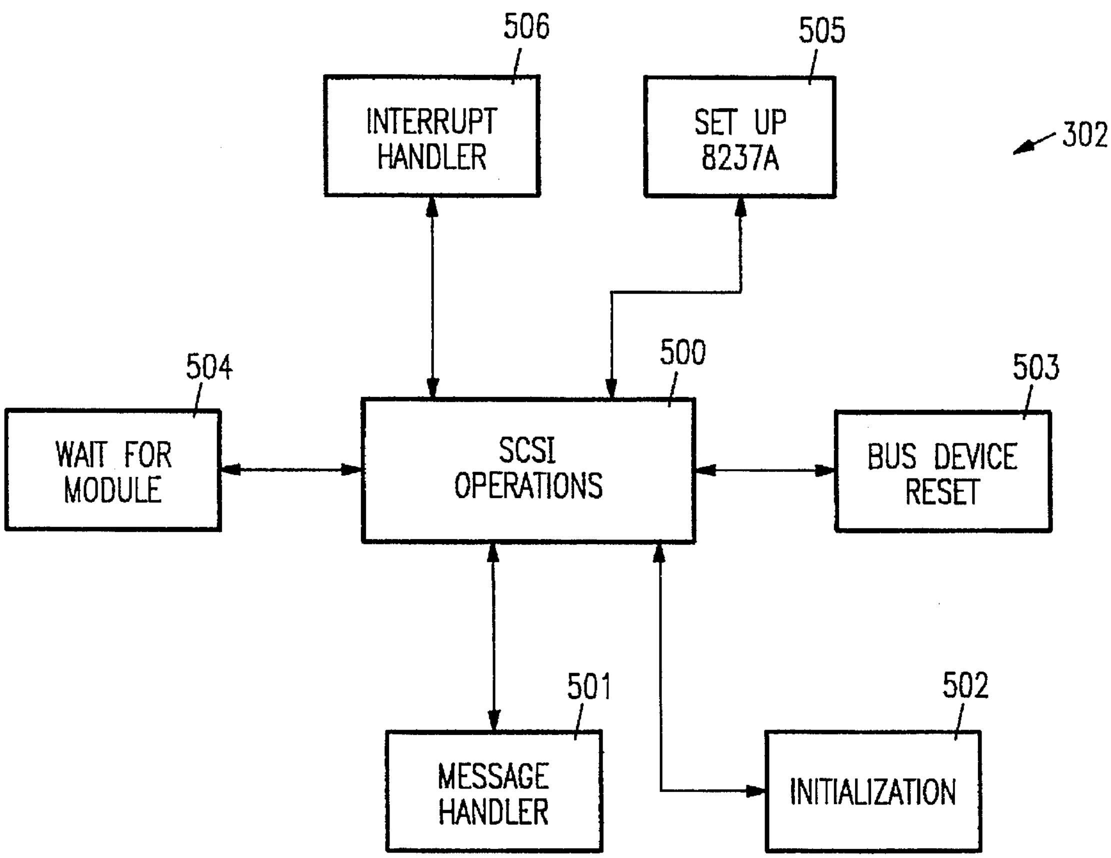
FIG. 6 is a more detailed block diagram of Sparrow driver of this invention.

A more detailed block diagram showing the components of Sparrow driver 302 is illustrated in FIG. 6. Specifically, Sparrow driver 302 includes SCSI operations module 500, interrupt handler module 506, set-up 8237A module 505, "wait for" module 504, bus device reset module 503, initialization module 502, and message handler module 501.

Upon power-up of computer system 220, initialization module 502 initializes H/A integrated circuit 6260 and system memory 230 for use by Sparrow driver 302. Included in initialization module 502 are sub-modules that (i) define equates specific to Sparrow driver 302, e.g., the module "sparequ.inc" in Microfiche Appendix A; (ii) define a SCSI command block (SCB) array structure that is shared by Sparrow driver 302 and SCSI manager 301, e.g., the module "scb.inc" in Microfiche Appendix A; and (iii) define segments and equates that are used by both Sparrow driver 302 and SCSI manager 301, e.g., the module "absegs.inc" in Microfiche Appendix A. The third module also defines constants that include H/A integrated circuit 6260 inquiry command parameters, the number of SCBs in the SCB array structure, typically eight, and H/A integrated circuit 6260 status codes.

Initially, initialization component 502 reads ports A and B of H/A integrated circuit 6260 to determine the SCSI address for the integrated circuit and other configuration information necessary for operation of H/A integrated circuit 6260 in system 220. This information is saved either in system memory 230 or on 16-byte stack 401. Other default parameters, such as the computer bus on and off times are also loaded in system memory 230 at this time.

In one embodiment, after this first set of operations by initialization component 502, a command line option module reads options from the H/A integrated circuit 6260 command line in computer system's 220 config.sys file and replaces the corresponding options read in through ports A and B with the new options. (The config.sys file is wellknown to those skilled in the art. See for example, *Microsoft MS-Dos, User's Guide and User's Reference,* Microsoft Corp., pp. 259–272 (1987), which is incorporated herein by reference.) If the port A and B configuration is acceptable, the command line option module is not used.

The parameters that may be modified using the command line option module include for Port A: (i) SCSI parity disable; (ii) DMA channel; (iii) hardware interrupt channel; and SCSI ID, and for Port B: (i) mode of data transfer, either PIO or DMA; (ii) synchronous data transfer negotiation mode; and (iii) target disconnect enable. The parameters for Port A and Port B are either maintained in system memory 230 or stack 401.

Initialization module 502 (FIG. 6) subsequently performs a H/A integrated circuit 6260 diagnostic check and an initial configuration of circuit 6260. The diagnostic check includes writing to and reading from the various registers, described more completely below, and FIFOs 405, 406. The diagnostic check, in this embodiment, accesses neither computer bus 226 nor SCSI bus 110, and a SCSI bus reset is not issued. If the diagnostic check is successful, a reset carry flag is returned. Otherwise, a set carry flag is returned. Initialization module 502 subsequently configures H/A integrated circuit 6260 for initial operation. After initialization is completed, initialization module 502 is typically removed from main memory 230. One embodiment of initialization component is presented in Microfiche Appendix A, which is incorporated herein by reference in its entirety.

The SCSI command block array formed in main memory 230 upon power up of the computer system is an important aspect of this invention since a SCB 303 (FIG. 3) is the means for communication between SCSI manager 301 and Sparrow driver 302. One embodiment of the SCB structure is given in TABLE 3. In this embodiment, each of eight SCBs 303 is 64 bytes in size.

TABLE 3

SCSI COMMAND BLOCK DEFINITION

| BYTE | SCSI Command Block |
|---|---|
| 0 | Command Status |
| 1 | Host Command Type |
| 2 | SCSI Target ID/LUN |
| 3 | Data Transfer Mode to Host |
| 4 | Reserved |
| 5 | Data Length (MSB) |
| 6 | Data Length (MID) |
| 7 | Data Length (MID) |
| 8 | Data Length (LSB) |
| 9 | Physical Data Address (MSB) |
| 10 | Physical Data Address (MID) |
| 11 | Physical Data Address (MID) |
| 12 | Physical Data Address (LSB) |
| 13 | Virtual Data Address, Segment (MSB) |
| 14 | Virtual Data Address, Segment (LSB) |
| 15 | Virtual Data Address, Offset (MSB) |
| 16 | Virtual Data Address, Offset (LSB) |
| 17 | Host Adapter Status |
| 18 | SCSI Target Status |
| 19 | SCSI Command Length |
| 20–35 | SCSI Command CDB |
| 36–37 | Reserved for Sparrow Driver Use |
| 38–41 | Available to SCSI Manager |
| 42 | Reserved for Sparrow Driver Use |
| 43–63 | Reserved. |

TABLE 4 lists the values of the command status that may be entered in byte 0 of SCB 303.

TABLE 4

VALUES OF COMMAND STATUS IN BYTE 0 OF SCB

| SCSI COMMAND STATUS | DESCRIPTION |
|---|---|
| 00h | Free |
| 04h | Queued |
| 08h | Ready |
| 10h | Done |
| 20h | Waiting |
| 40h | Disconnected |
| 80h | Active |
| 81h | Active |

A free status "00h" indicates that SCB 303 is available for loading a command to Sparrow driver 302.

After loading a command into SCB 303, a ready command status "08h" is set by SCSI manager 301 to indicate that SCB 303 is ready for execution. SCSI manager 301 may limit the number of ready SCBs, i.e., those SCBs with a command status of "Ready," for any given target/LUN (LUN is logical unit number) so as to order the execution of commands.

For example, in case of a check condition from the target, SCSI manager 301 may insert a Request Sense Status command ahead of the next command to that target. SCSI manager 301 preferably waits for a done command status before setting another SCB ready for the same target/LUN. After setting the command status of SCB 303 to ready, SCSI manager 301 calls Sparrow driver 302 if there are no other SCBS with a command status of "active" or "waiting." If SCB 303 cannot be set to a command status of ready, the command is queued in the SCB array by setting the command status to "queued." SCSI manager 301 has the responsibility of managing queued commands and ultimately changing their command status to ready. In this embodiment, Sparrow driver 302 does not recognize queued SCBs.

Once Sparrow driver 302 has completed a SCSI command, the SCB command status is set to "done" by driver 302. SCSI manager 301 upon detection of the SCB command status done completes the SCSI command using the H/A status (Byte 17) and target status (Byte 18) returned by Sparrow driver 302 in SCB 303 and sets the command status to free.

A command status of "waiting" acknowledges that the Sparrow driver 302 has received a ready SCB from SCSI manager 301 and is attempting to select a target. A command status of "disconnected" indicates that the target has been selected and has disconnected from SCSI bus 110. A command status of "active" indicates that the target has been selected and is still on SCSI bus 110 but Sparrow driver 302 has anticipated a delay and has returned control to SCSI manager 301.

Thus, byte 0 of SCB 303 is set to free, queued or ready by the SCSI manager 301. All other entries in the command status byte are made by Sparrow driver 302. A command status of waiting, disconnected, or active requires no action by SCSI manager 301 except to call Sparrow driver 302 when a system hardware interrupt is generated by H/A integrated circuit 6260.

In this embodiment, Sparrow driver 302 supports two host command types, 00h and 81h for the first byte in SCB 303. Host command type 81h instructs driver 302 to send a bus device reset message to the target/LUN specified in byte 2 of SCB 303. Command type 00h is specified for all other commands.

Byte 2 of the SCB is the SCSI target ID/LUN. Bits 7–5 of byte 2 specify the SCSI target number. Bits 2–0 of byte 2 specify the target LUN number. Bits 3 and 4 are reserved and must be set to 0.

Byte 3 of SCB 303 is the data transfer mode to the host. Bit 0 of byte 3 specifies the data transfer mode to the host. Specifically, in one embodiment, if bit 0 is "0", the transfer mode is DMA and if bit 0 is "1", the transfer mode is PIO. In this embodiment, Sparrow driver 302 places a constraint on the use of the DMA mode. Both the data address and the data length must be even for DMA channels 5–7. If either the data address or the data length is odd, Sparrow driver 302 transfers data to the host via the PIO data transfer mode. There is no constraint on the use of DMA channel 0. Bits 7–1 of byte 3 are not presently used by Sparrow driver 302. However, bit 1 may be used by SCSI manager 301.

Bytes 5–8 of SCB 303 specify the data length which is the number of bytes to be transferred. Bytes 9–12 are the physical data address that Sparrow driver 302 loads to specify the physical address location in the host memory for the data transfer. Bytes 13–16 are the virtual data address. If SCSI manager 301 is operating in a MS-DOS operating system environment, the virtual address is given by segment:offset of the host memory for the data transfer. If SCSI manager 301 is operating in the OS/2 operating system environment, bytes 13–16 are not needed. The Sparrow driver 302 gains this information in the OS/2 operating system environment.

TABLE 5, shown below, gives the possible entries for byte 17, host adapter status, of SCB 303.

TABLE 5

VALUES OF HOST ADAPTER STATUS IN BYTE 17 OF SCB 303

| HOST ADAPTER STATUS | DESCRIPTION |
|---|---|
| 00h | No Error |
| 11h | Selection Timeout |
| 12h | Data Overrun/Underrun |
| 13h | Unexpected Bus Free |
| 14h | SCSI Bus Sequence Error |
| 16h | Invalid SCB Byte 1 |
| 1ah | Invalid SCB Parameter |
| 1bh | SCSI Reset Occurred |
| 1ch | SCB Aborted |
| 1eh | Odd Data Address or Length |

The host adapter status byte indicates problems encountered by H/A integrated circuit 6260 during execution of a SCSI command. For a host adapter status of "00h", execution of the SCSI command by H/A integrated circuit 6260 was normal. However, the target may have encountered an error so that the target status (Byte 18 of SCB 303) should be checked. A status of "11h" means that while H/A integrated circuit 6260 was attempting to select a target, H/A integrated circuit 6260 timed out.

A status of "12h" means that during a data transfer H/A integrated circuit 6260 encountered either a data overrun (the target remained in "the data phase" longer than expected) or a data underrun (the target ended "the data phase" sooner than expected). Data overruns are reported only for the target-to-host transfer direction and data underruns are reported only for the host-to-target direction.

A host adapter status of "13h" means that the target dropped off SCSI bus 110 unexpectedly. A host adapter status of "14h" is reported when H/A integrated circuit 6260 encountered an inappropriate SCSI bus phase. As described more completely below, H/A integrated circuit 7260 responds with a SCSI bus reset. Also, this error may be reported for other unusual target errors not defined by host adapter status or target status values.

A host adapter status of "16h" is returned when the host command type in SCB byte 1 has an undefined value. A host adapter status of "1ah" means that H/A integrated circuit 6260 has observed an invalid parameter in SCB 303. A host adapter status of "1bh" in byte 17 of the SCB means that a SCSI bus reset has occurred. A host adapter status of 1ch means that the SCB was aborted by SCSI manager 301. A host adapter status of "1eh" means that an odd data address or data length was specified for a DMA transfer to channels 5–7. The transfer actually occurred via PIO.

Byte 18 of the SCB is the SCSI target status. Values of the SCSI target status, in one embodiment, are given in TABLE 6 below. However, any value sent by the target is loaded in byte 18.

TABLE 6

VALUES OF SCSI TARGET STATUS IN BYTE 18 OF SCB 303

| TARGET STATUS | DESCRIPTION |
|---|---|
| 00h | No Target Status |
| 02h | Check Condition |
| 08h | Target Busy |
| 18h | Reservation Conflict |

The target status indicates problems or conditions encountered by the target during execution of a SCSI command. Byte 19 of the SCB is the SCSI command length. The SCSI command length is the number of bytes in the command description block (CDB) that is sent to the host. The maximum length, in this embodiment, is 16 bytes. Bytes 20–35 in the SCB are the SCSI command CDB. The SCSI command CDB is the command block sent to the target to initiate an action by the target.

Figure 7:
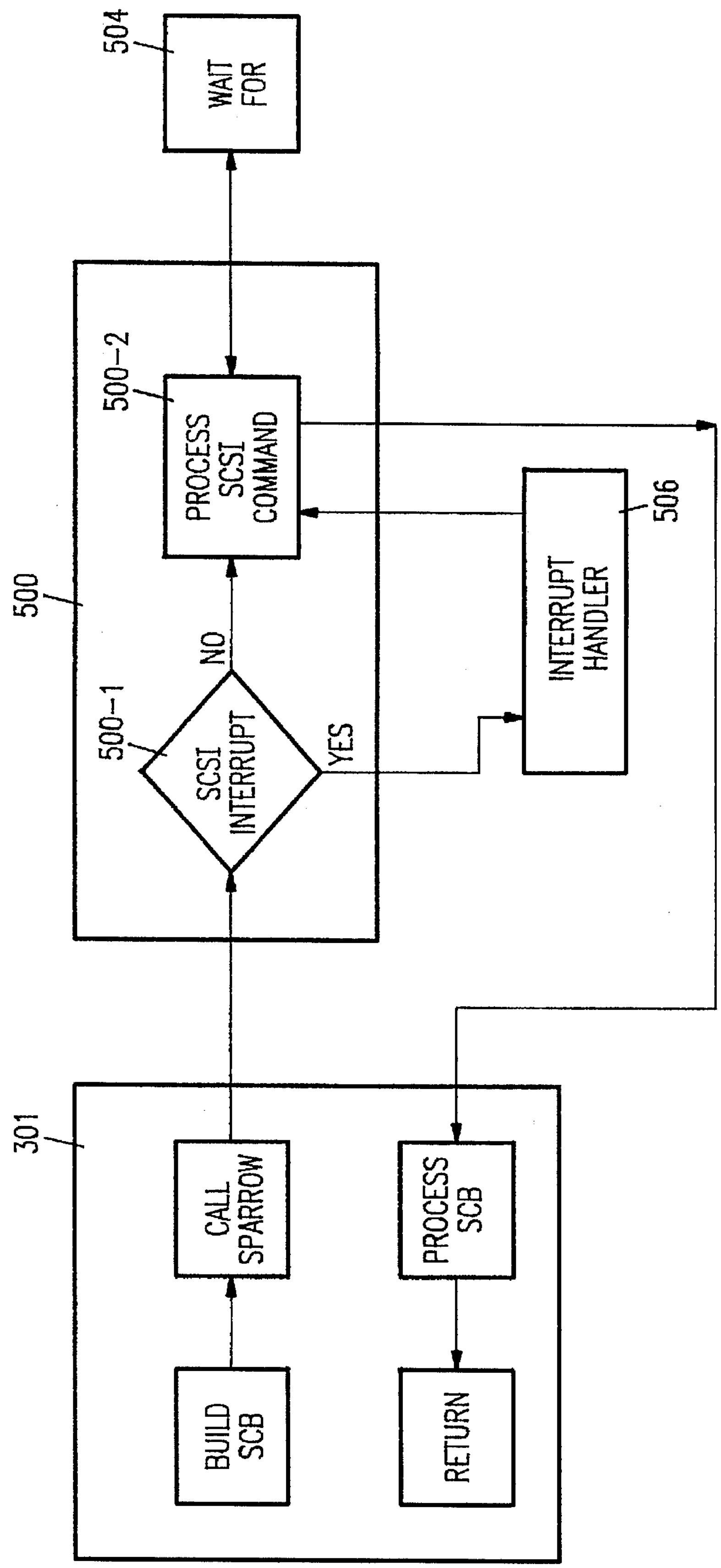
FIG. 7 is a process flow diagram for SCSI manager and Sparrow driver of this invention.

All modules other than initialization module 502 are subsequently utilized by SCSI operation module 500 as described more completely below. Operation of SCSI operation module 500 is illustrated by process diagram FIG. 7.

SCSI manager 301 calls Sparrow driver 302 to execute a SCSI command. However, there are several operations performed by SCSI manager 301 prior to the call to Sparrow driver 302. SCSI manager 301 first disables H/A integrated circuit 6260 system hardware interrupt. Specifically, bit INTEN in register DMACNTRL0, described more completely below, is set to a logical low value. H/A integrated circuit 6260 system hardware interrupt is not enabled while Sparrow driver 302 is executing.

Also, SCSI manager 301 preferably assures that H/A integrated circuit 6260 system hardware interrupt is disabled while SCSI manager 301 examines or alters any SCB. After disabling the system hardware interrupt, SCSI manager 301 defines the SCSI command to be executed by preparing an SCB and setting the SCB status to ready in build SCB 301-1. As described above, the SCB contains the CDB to be sent to the target, the target/LUN numbers, the address of the host memory data area and the length of the data transfer.

After the construction of SCB 303 is complete, SCSI manager 301 calls Sparrow driver 302 using call Sparrow module 301-2. SCSI operation module 500 receives the call from SCSI manager 301. Upon receipt of the call, SCSI operations 500 first checks in SCSI interrupt check 500-1 to see whether a SCSI interrupt has occurred. Since in this example, this is the first SCB sent to Sparrow driver 302, an interrupt has not occurred so that the SCSI interrupt check 500-1 passes control to process SCSI command 500-2.

Process SCSI command 500-2 scans the SCB array for an SCB having a command status of ready. This scan starts at the SCB pointed to by a round robin pointer which is typically left at the last SCB with a command status of ready. If a SCB with a command status of ready is not found, Sparrow driver 302 returns processing to SCSI manager 301 which proceeds as described more completely below. Conversely, when a SCB with a command status of ready is found, the command status is changed to "waiting" by process SCSI command 500-2 and target selection begins. Specifically, process SCSI command 500-2 programs H/A integrated circuit 6260 to automatically perform the SCSI arbitration and selection phases, which are described more completely below.

If target selection completes quickly, the command status in the SCB is changed to active and the SCSI command sequence is continued. However, if target selection does not complete quickly, process SCSI command 500-2 transfers control to wait for module 504. Wait for module 504 stores the address at which processing in Sparrow driver 302 is to resume in SCB 303 and returns processing to process SCSI command 500-2. Process SCSI command 500-2 enables a H/A integrated circuit 6260 system hardware interrupt, restores the microprocessor configuration to the state that the configuration was in upon entry to Sparrow driver 302 and returns to SCSI manager 301.

Upon return to SCSI manager 301, manager 301 checks for a SCB command status of done using process SCB 301-3. For any other SCB command status, process SCB 301-3 transfer processing to return 301-4 which in turn transfers control of microprocessor 221 to system 220. When H/A integrated circuit 6260 completes the SCSI selection phase, a system hardware interrupt is issued to system 220. Upon receipt of the hardware interrupt, microprocessor 221 suspends operations for user application 201 and passes control to SCSI manager 301 which in turn calls Sparrow driver 302 to resume processing.

Since a system hardware interrupt has occurred, SCSI interrupt check 500-1 passes control to interrupt handler 506. As described more completely below, interrupt handler 506 determines which H/A integrated circuit 6260 interrupt has occurred and obtains the address for resumption of processing from SCB 303. Interrupt handler 506 branches to that address in process SCSI command 500-2.

Thus, process SCSI command 500-2 continues at the point where control of microprocessor 221 was originally returned to system 220 while H/A integrated circuit 6260 performed the predetermined SCSI phases. Process SCSI command 500-2 continues and when data are transferred and all SCSI phases are complete, the SCB command status is set to done. When the SCB command status is set to done, the target status and host adapter status in the SCB are also updated. Upon return to SCSI manager 301, process SCB 301-3 extracts any status information of interest from the SCB and sets the SCB command status to free.

SCSI manager 301 is then free to initiate another command for this target/LUN by marking another SCB ready. Only one SCB at a time is marked ready for a given target/LUN thread. Any other SCBs with the same thread are marked queued. If any other SCB has a status of active or waiting, host H/A integrated circuit 6260 is not available and Sparrow driver 302 is not called until a system hardware interrupt occurs. When there are no active or waiting SCBs, SCSI manager 301 calls Sparrow driver 302 with a ready SCB. If SCSI manager 301 wishes to return to the user application before starting another ready SCB, SCSI manager 301 forces Sparrow driver 302 to initiate an interrupt to insure being called again by system 220 interrupt handler.

Both Sparrow driver 302 and the SCSI manager 301 service ready SCBs in a round-robin fashion. To maintain Sparrow driver 302 computer operating system independent, Sparrow driver 302 makes a call to SCSI manager 301 to get a virtual address on the fly. SCSI manager 301 then makes an operating system call to get the segment and offset address needed by Sparrow driver 302 and loads the address into the SCB and returns processing to Sparrow driver 302. The SCB that is loaded is the SCB with a SCB command status of active because there is only one SCB marked active at any given time.

Message handler 501 (FIG. 6) preferably processes messages using SCSI PIO transfer. Certain special cases processed by handler 501 are messages after selection, multiple messages, or parity errors. After selection if messages are to be sent to the target by the initiator, SCSI bus attention signal ATN is asserted on SCSI bus 110. The target responds with phase message out at this time. The first message is the ID message.

After this message, message handler 501 has the option of sending a multiple byte message such as a synchronous data transfer request. As long as there is one message byte to be sent to the target, attention signal ATN remains asserted, and message out transfers occur as usual.

To maintain SCSI protocol, SCSI bus attention signal ATN is preferably cleared before the last acknowledge signal ACK of a message sequence or in the case of automatic SCSI PIO, the last write to register SCSIDAT, described more completely below. In the case of an error condition, SCSI bus attention signal ATN is cleared after the first request signal REQ of the phase message out and before the last acknowledge signal ACK of the message sequence. If a parity error occurs on Message In, attention signal ATN is asserted before acknowledge signal ACK and the message should be re-transmitted.

The circuitry and operation of H/A integrated circuit 6260 is a function of the number of hardwired sequencers, SCSI interrupts and registers contained in the integrated circuit as well as the size and operation of the FIFOs. For the embodiment that includes hardwired sequencers for SCSI Arbitration, Selection out (as initiator), Reselection in (as initiator), Selection in (as target), and Reselection out (as target) phases, fifteen interrupts are used. The interrupts are defined in TABLE 7.

TABLE 7

| Interrupt | Interrupt status |
|---|---|
| SELDO | Selection out completed. |
| SELDI | H/A integrated circuit reselected. |
| SELINGO | Arbitration won, selection started. |
| SWRAP | Transfer counter wrapped around. |
| SDONE | Mode=target, data transfer complete. |
| SPIORDY | Automatic PIO data transfer enabled and ready to transfer data. |
| DMADONE | DMA data transfer is complete. |
| SELTO | Selection timeout. |
| ATNTARG | Mode=target, initiator set attention. |
| SCSIRSTI | Another device asserted a SCSI bus reset. |
| PHASEMIS | SCSI phase other than that expected. |
| BUSFREE | SCSI bus free occurred. |
| SCSIPERR | SCSI parity error. |
| PHASECHG | SCSI phase change. |
| REQINIT | Latched request, one or more request signals have been sent by the target for which no acknowledge signal has yet been sent by the initiator |

Most of the hardware interrupts (interrupts) in Table 7 are generated by H/A integrated circuit 6260 in response to conditions on SCSI bus 110. The interrupts are generated to alert Sparrow driver 302 that conditions on the bus have changed so Sparrow driver 302 can modify the operations performed by H/A integrated circuit 6260 as necessary. Other interrupts are generated by H/A integrated circuit 6260 to alert Sparrow driver 302 that preprogrammed operations are complete. Note as explained more completely below, the hardware interrupt may only set an interrupt status bit in H/A integrated circuit 6260. An actual system interrupt signal is sent on line IRQ to microprocessor 221 by H/A integrated circuit 6260 only when a global interrupt enable bit is set in circuit 6260 and that interrupt is individually enabled.

Figure 8A:
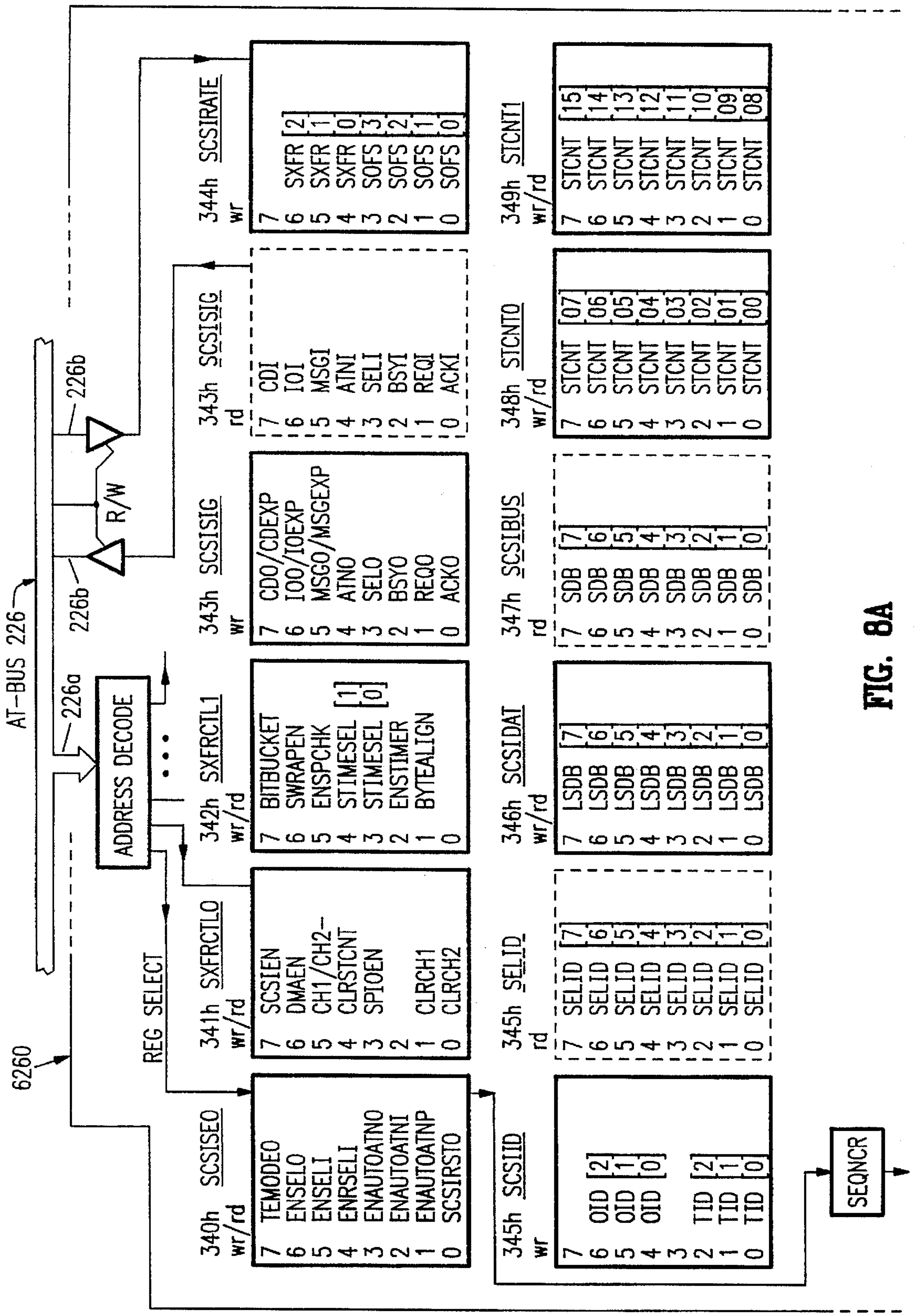
FIGS. 8A through 8C are one embodiment of data storage, i.e., a register set, in the integrated circuit of this invention.
Figure 8B:
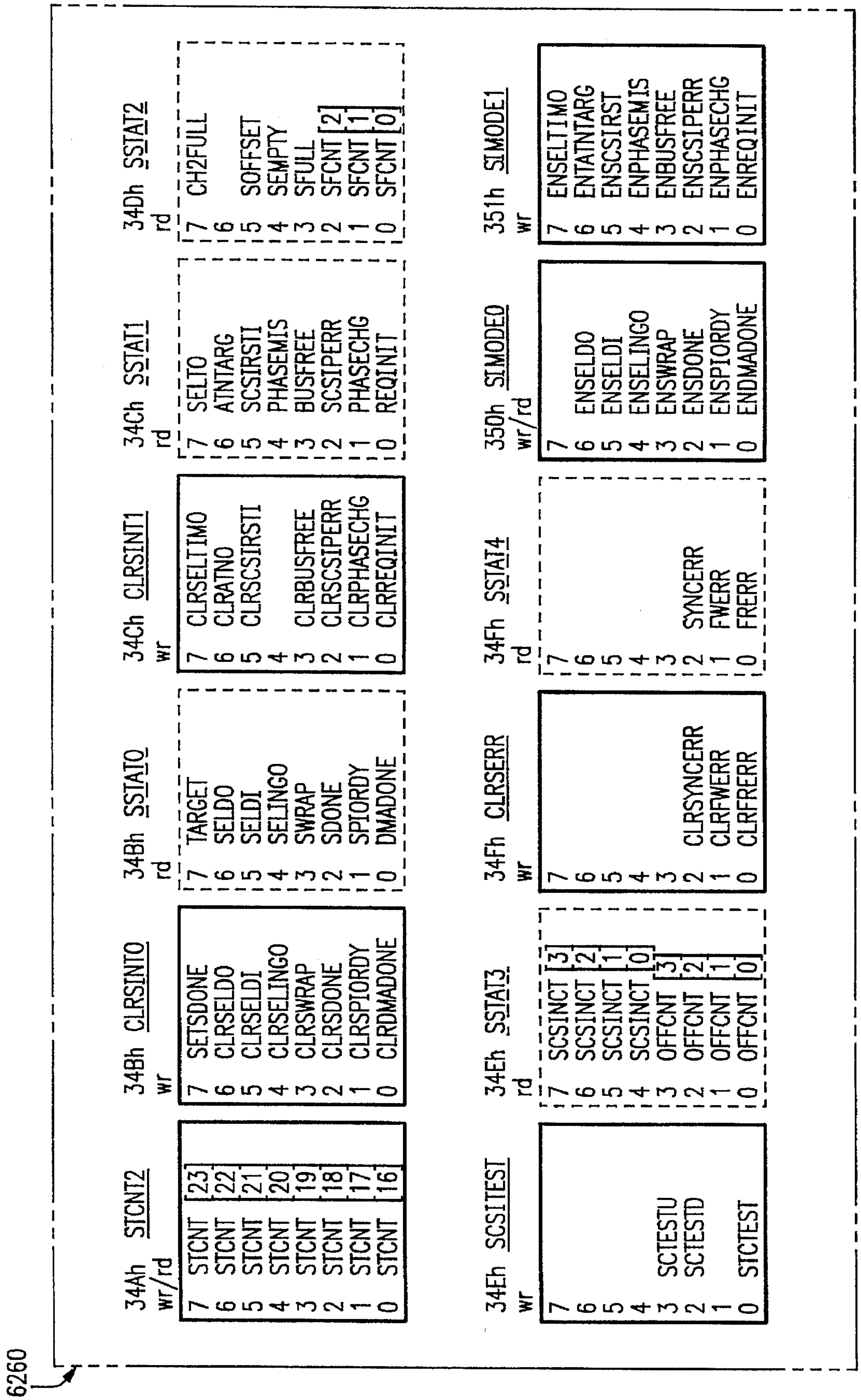
Figure 8C:
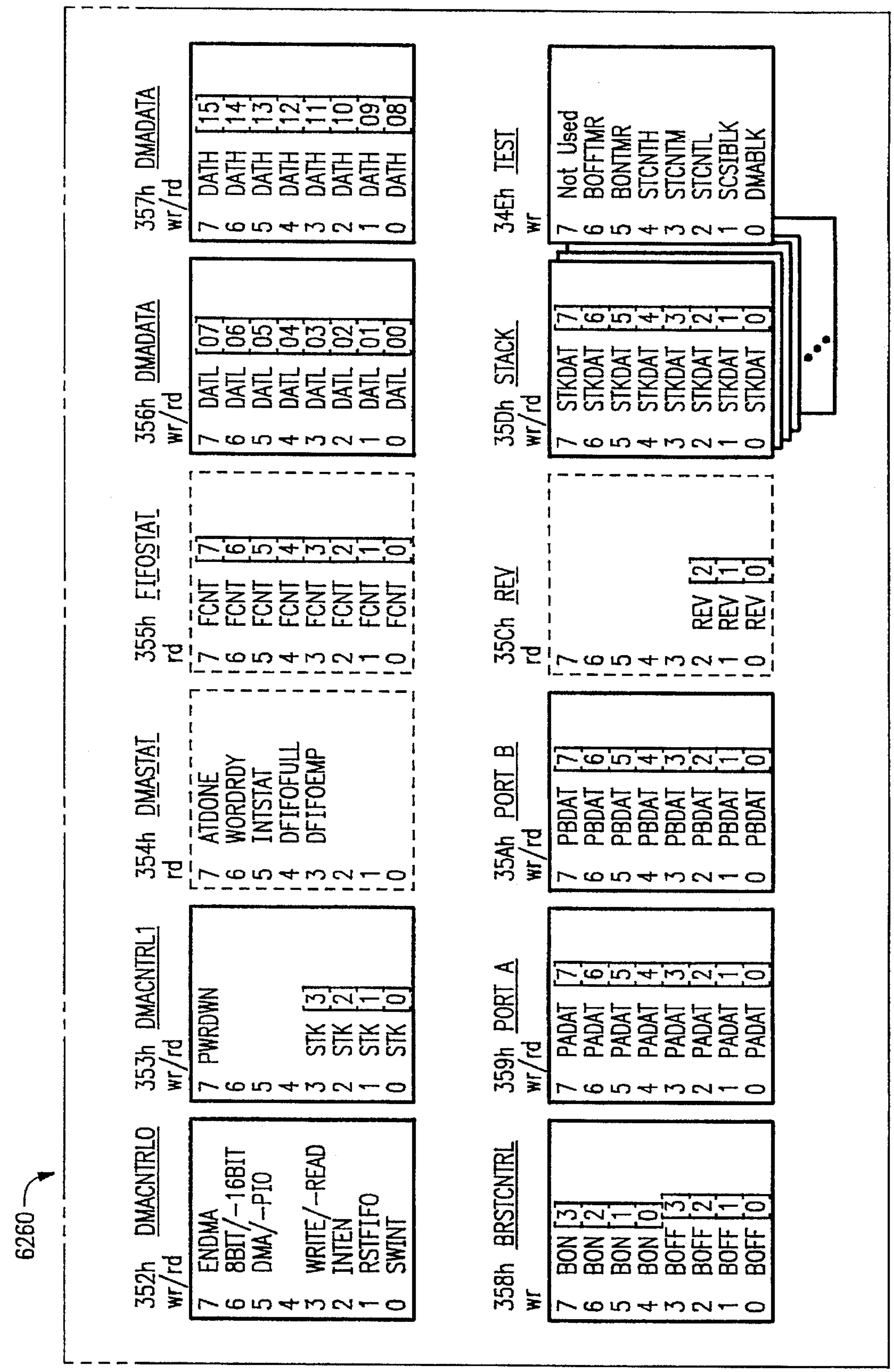

Hence, circuitry, as described more completely below, is provided in H/A integrated circuit 6260 to generate each of the fifteen interrupts and to perform the SCSI operations for each of the five automatic sequences. In addition, at least 28 registers are preferably contained in H/A integrated circuit 6260. The 28 registers are one embodiment of a data storage means. TABLE 8 lists each of the registers. The name of each register is followed by an acronym in parenthesis for the register and an indication of whether the register is read (R), written to (W), or both (R/W) by host microprocessor 221. The name of each register is preceded by the relative hexadecimal position of the register in host microprocessor address space 340h through 35Eh inclusive. Some of the registers are listed twice because these registers contain different data depending on whether Sparrow driver 302 is reading or writing data. A more detailed description of each of the bits of data stored in each of the registers is given in Appendix II below, which is incorporated herein by reference in its entirety. FIGS. 8A, 8B and 8C illustrate the data in each of H/A integrated circuit 6260 28 on-board registers.

TABLE 8

| | | | | |
|---|---|---|---|---|
| 1. | 340h | SCSI Sequence Control | (SCSISEQ) | W/R |
| 2. | 341h | SCSI Transfer Control 0 | (SXFRCTL0) | W/R |
| 3. | 342h | SCSI Transfer Control 1 | (SXFRCTL1) | W/R |
| 4. | 343h | SCSI Signal | (SCSISIG) | W/R |
| 5. | 344h | SCSI Rate Control | (SCSIRATE) | W |
| 6. | 345h | SCSI Identification | (SCSIID) | W |
| | | Selection/Reselection Id. | (SELID) | R |
| 7. | 346h | SCSI Latched Data | (SCSIDAT) | W/R |
| 8. | 347h | SCSI Data Bus | (SCSIBUS) | R |
| 9. | 348h | SCSI Transfer Count, lsb | (STCNT0) | W/R |
| 10. | 349h | SCSI Transfer Count, mid | (STCNT1) | W/R |
| 11. | 34Ah | SCSI Transfer Count, mid | (STCNT2) | W/R |
| 12. | 34Bh | Clear SCSI Interrupts 0 | (CLRSINT0) | W |
| | | SCSI Status 0 | (SSTAT0) | R |
| 13. | 34Ch | Clear SCSI Interrupts 1 | (CLRSINT1) | W |
| | | SCSI Status 1 | (SSTAT1) | R |
| 14. | 34Dh | SCSI Status 2 | (SSTAT2) | R |
| 15. | 34Eh | SCSI Test Control | (SCSITEST) | W |
| | | SCSI Status 3 | (SSTAT3) | R |
| 16. | 34Fh | Clear SCSI Errors | (CLRSERR) | W |
| | | SCSI Status 4 | (SSTAT4) | R |
| 17. | 350h | SCSI Interrupt Mask 0 | (SIMODE0) | W/R |
| 18. | 351h | SCSI Interrupt Mask 1 | (SIMODE1) | W/R |
| 19. | 352h | DMA Control 0 | (DMACNTRL0) | W/R |
| 20. | 353h | DMA Control 1 | (DMACNTRL1) | W/R |
| 21. | 354h | DMA Status | (DMASTAT) | R |
| 22. | 355h | No. of Bytes in DMA FIFO | (FIFOSTAT) | R |
| 23. | 356h | 16 Bit Host Data Port | (DMADATA) | R/W |
| 24. | 358h | Burst Control | (BRSTCNTRL) | W |
| 25. | 35Ah | Jumpers | (PORTA) | W/R |
| 26. | 35Bh | Port B | (PORTB) | W/R |
| 27. | 35Ch | Revision number | (REV) | R |
| 28. | 35Dh | 8 byte Stack | (SPARSTACK) | R/W |

The SCSI Sequence Control register is read and written into by microprocessor 221 in response to instructions from Sparrow driver 302. Each bit in this register enables a specified hardware sequence. Since the register is readable, bit manipulation instructions are possible without saving a register image in the local scratch RAM of host microprocessor 221. All bits in the register except bit SCSIRSTO are disabled by a SCSI reset.

The status of all interrupts is always available in registers SSTAT0 and SSTAT1. The generation of each interrupt is controlled by programming the enable registers SIMODE0 and SIMODE1 with the appropriate mask. When the interrupt occurs, the interrupt may be cleared by writing one to the appropriate bit in the interrupt clear registers CLRSINT0 and CLRSINT1 registers, or by clearing the appropriate interrupt enable bit in SIMODE0 and SIMODE1.

In the read mode, register SCSISIG permits microprocessor 221 to read the actual state of signals on SCSI bus 110. Similarly, in the write mode register SCSISIG permits microprocessor 221 to control the SCSI signals that are enabled on bus 110 according to the mode of operation, e.g., target or initiator. Register SCSIRATE contains bits that select the SCSI transfer rate and offset. Register SELID is read only. After a selection in or reselection has occurred, the host and target IDs are read from this register to determine the reselecting target. Register SCSIDAT is a read/write latch that is used to transfer data on SCSI bus 110 through SCSI PIO transfers. Register SCSIBUS is a read only register that reads the SCSI data lines directly. This register is used to read the bus during manual selection/reselection.

Registers STCNT0 through STCNT2 contain the DMA byte transfer count on the SCSI interface. Register SSTAT2 is read only and gives the status of the SCSI channel one FIFO. Register SSTAT3 contains the status of a current synchronous SCSI information transfer phase. Register SSTAT4 contains the possible error conditions during a SCSI transfer. Register DMACNTRL0 contains the basic controls for a data transfer using PIO or DMA to and from SCSI bus 110. The bits in register DMACNTRL1 are set to define the mode of operation. Register DMASTAT reports in real time the status of a DMA or PIO transfer. Register FIFOSTAT indicates how many bytes are left in DMA FIFO 405.

Register DMADATA is a port where data transfer takes place for DMA or PIO operations. Register BRSTCNTRL controls the burst on and burst off time during DMA transfers. Register port A provides an external 8 bit read/write port which may be accessed at any time. Port B is similar in function to port A. Register SPARSTACK is an 8 bit wide by 16 byte deep stack for use as general purpose memory. The operation of the on-board register set of H/A integrated circuit 6260 and the use of specific bits within the registers to control operations of integrated circuit 6260 are described more completely below.

Figure 9:
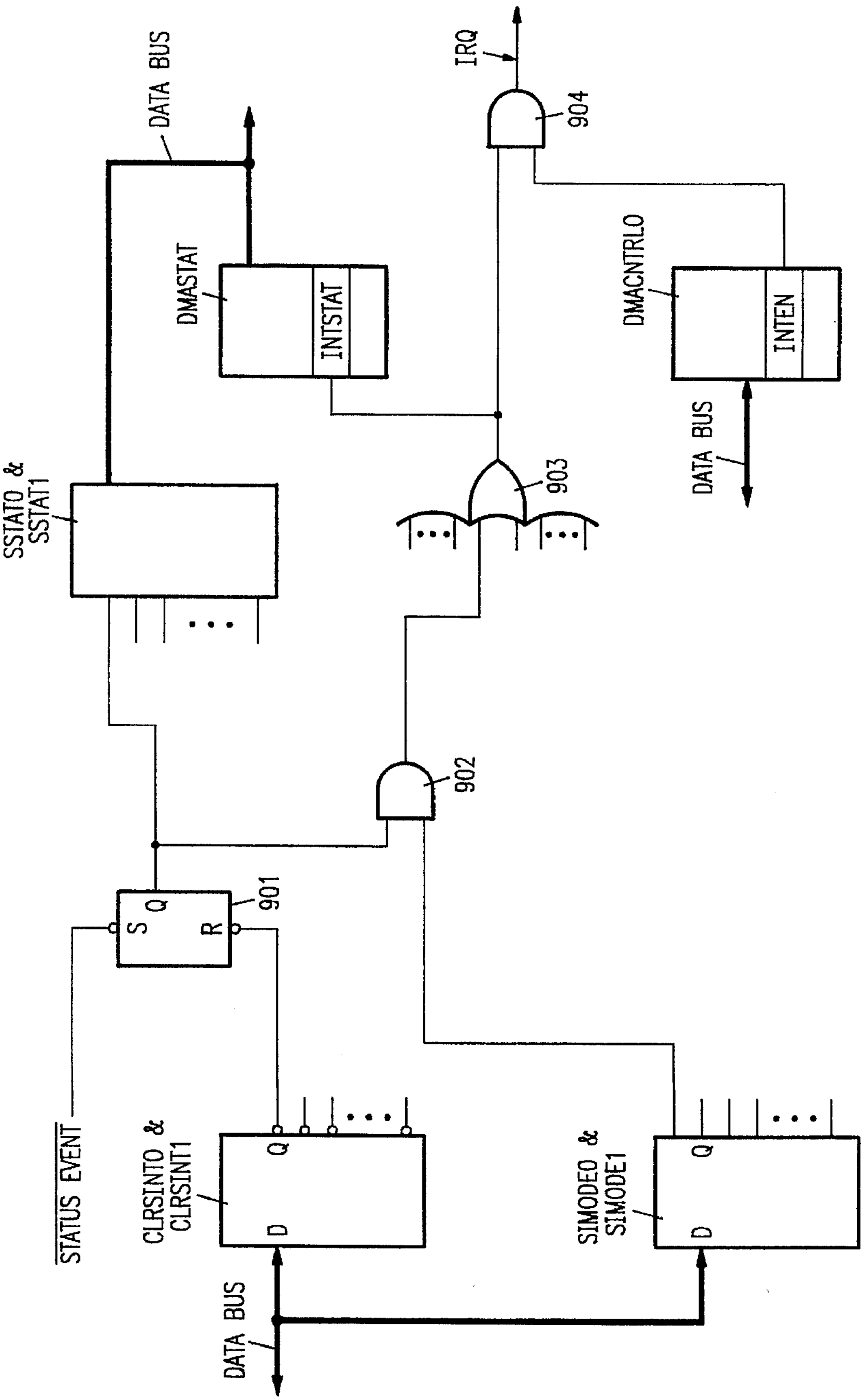
FIG. 9 is a detailed schematic of the interrupt generating circuit of this invention.

Prior to considering the detailed operation of Sparrow driver 302 and H/A integrated circuit 6260 to perform each SCSI phase, the hardware and interactions of SCSI interrupt hardware 409 (FIG. 4) and the register set in computer bus decode, register set and control hardware 402 are considered in more detail. FIG. 9 is a conceptual diagram of the coupling between the register set and the interrupt hardware for a single interrupt.

FIG. 9 includes registers CLRSINT0, CLRSINT1, SIMODE0, SIMODE1, SSTAT0, SSTAT1, DMASTAT and DMACNTRL0. As previously described, registers CLRSINT0 and CLRSINT1 contain clear bits for each hardware interrupt. When a bit is set to clear an interrupt in either register CLRSINT0 or CLRSINT1, output terminal $\overline{Q}$ goes low which in turn provides a low input signal to terminal $\overline{R}$ of register 901. Accordingly, this signal resets register 901 so that the signal on terminal Q of register 901 is low. The low signal from terminal Q of register 901 is read as the appropriate bit for the interrupt in either register SSTAT0 or SSTAT1. Accordingly, when the interrupt status bit is polled over the data bus by microprocessor 221 in response to instructions from Sparrow driver 302, the status of the interrupt is inactive. The low signal from terminal Q of register 901 is also a first input signal to AND gate 902.

Hence, the output signal from AND gate 902 is low as is the output of OR gate 903. The low signal from OR gate 903 drives bit INTSTAT low in register DMASTAT. Thus, when microprocessor 221, in response to directions from Sparrow driver 302, polls bit INTSTAT of register DMASTAT, Sparrow driver 302 learns that H/A integrated circuit 6260 has not generated a hardware interrupt. The low output signal from OR gate 903 drives a first input terminal of AND gate 904. The output signal from AND gate 904 drives system hardware interrupt line IRQ. Thus, the signal on line IRQ is also low.

This discussion has considered a single interrupt and has assumed that all other interrupts are cleared. In FIG. 9, lines for the other interrupts are shown from each component, but for clarity the interconnections for only a single interrupt are shown. The actual circuit includes a plurality of AND gates 902. Each AND gate is driven only by a signal from one hardware interrupt enable bit in register SIMODE0 or SIMODE1 and a signal corresponding to the status bit for that hardware interrupt in register SSTAT0 or SSTAT1. The output signals from the plurality of AND gates drive OR gate 903.

When an interrupt, i.e., a status event occurs, the complement of that status event goes low. Accordingly, the signal on terminal $\overline{S}$ of register 901 goes low which sets register 901. When register 901 is set, a high signal is driven on output terminal Q. The high signal from output terminal Q is provided to the first input terminal of AND gate 902 and sets the appropriate interrupt status bit in either register SSTAT0 or SSTAT1. Thus, if registers SSTAT0 and SSTAT1 are polled, Sparrow driver 302 will observe that an interrupt has occurred.

AND gate 902 does not generate a high signal unless a high signal is provided from either register SIMODE0 or SIMODE1 for the status event. As previously described, registers SIMODE0 and SIMODE1 contain interrupt enable bits for each of the interrupts in Table 7. Accordingly, if Sparrow driver 302 has previously enabled the status event, the output signal from AND gate 902 goes high. Otherwise, the output signal of AND gate 902 remains low and OR gates 903 and AND gate 904 function as previously described.

When the output signal from AND gate 902 goes high, the output signal from OR gate 903 also goes high. Accordingly, bit INTSTAT is set in register DMASTAT. Thus, by polling bit INTSTAT of register DMASTAT, Sparrow driver 302 learns that the status event, i.e., an interrupt, has occurred. To ascertain which interrupt has occurred, Sparrow driver 302 polls registers SSTAT0 and SSTAT1. The high output signal from OR gate 903 also drives a first input terminal of AND gate 904.

However, AND gate 904 does not provide a signal on line IRQ unless interrupt enable bit INTEN in register DMACNTRL0 is high. Interrupt enable bit INTEN is a global interrupt enable bit. Thus, Sparrow driver 302 can control when a signal is generated on line IRQ by setting bit INTEN in register DMACNTRL0. The circuit illustrated in FIG. 9 illustrates how each of the three bits associated with an interrupt are used in conjunction with the SCSI interrupt hardware to generate a system hardware interrupt signal on line IRQ. Notice that a status interrupt bit in one of registers SSTAT0 and SSTAT1 is always set when a hardware interrupt occurs independent of whether a signal is generated on line IRQ.

Figure 145A:
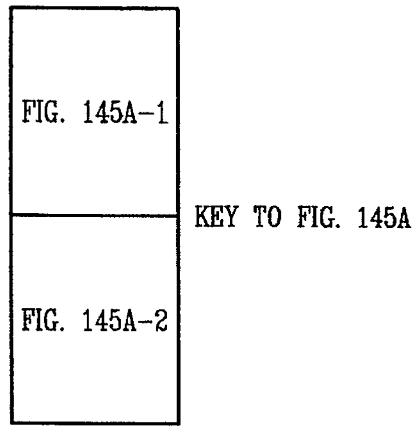
FIGS. 145A, 145B and 145C illustrate the sixth part of circuit SCSI and includes circuits SLRSINT, SCDIINT1, SCSIINT0, GRP3MUX, GRP5MUX, and SELTIMER.
Figure 1:
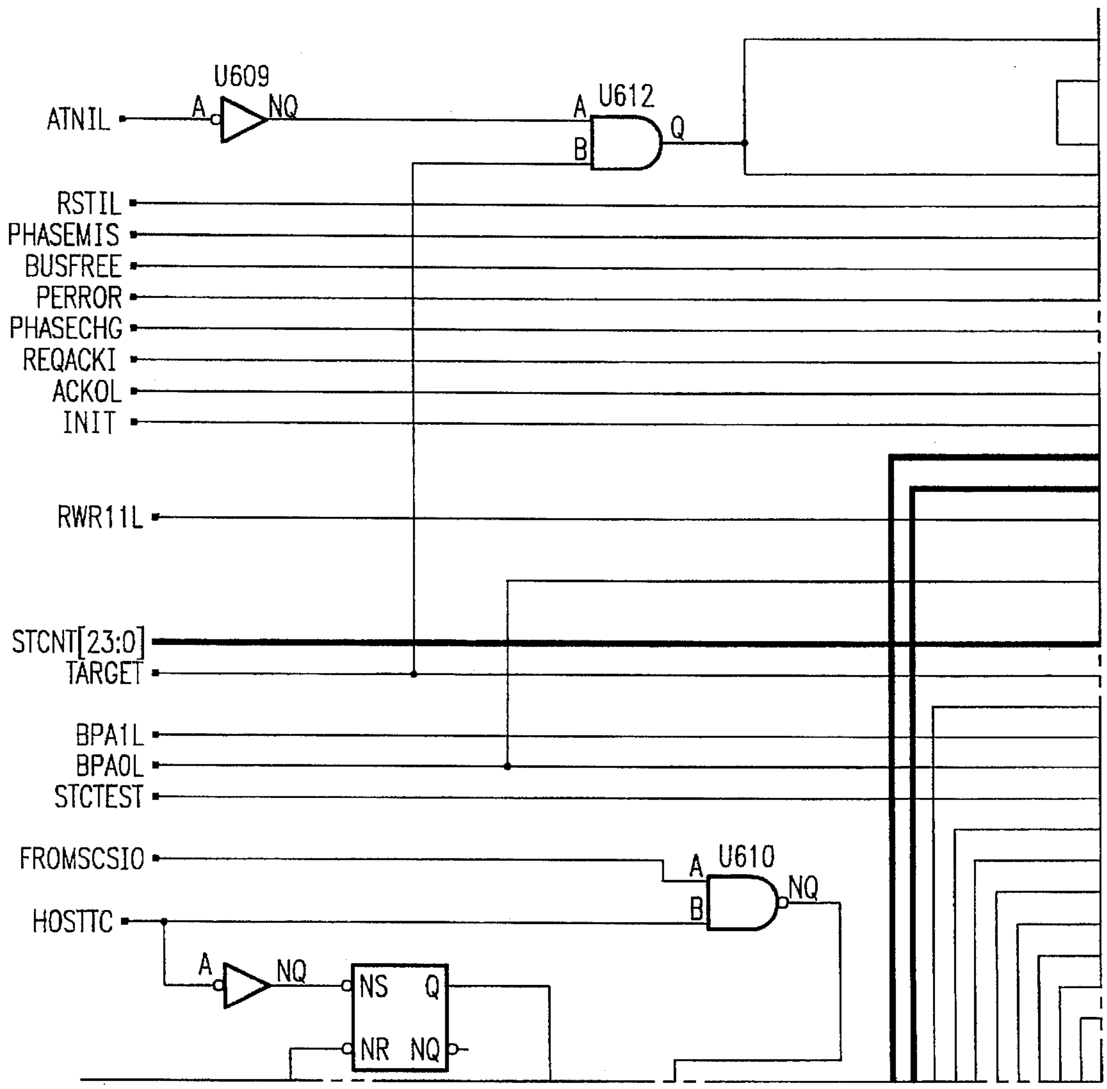
Figures 2, 145A:
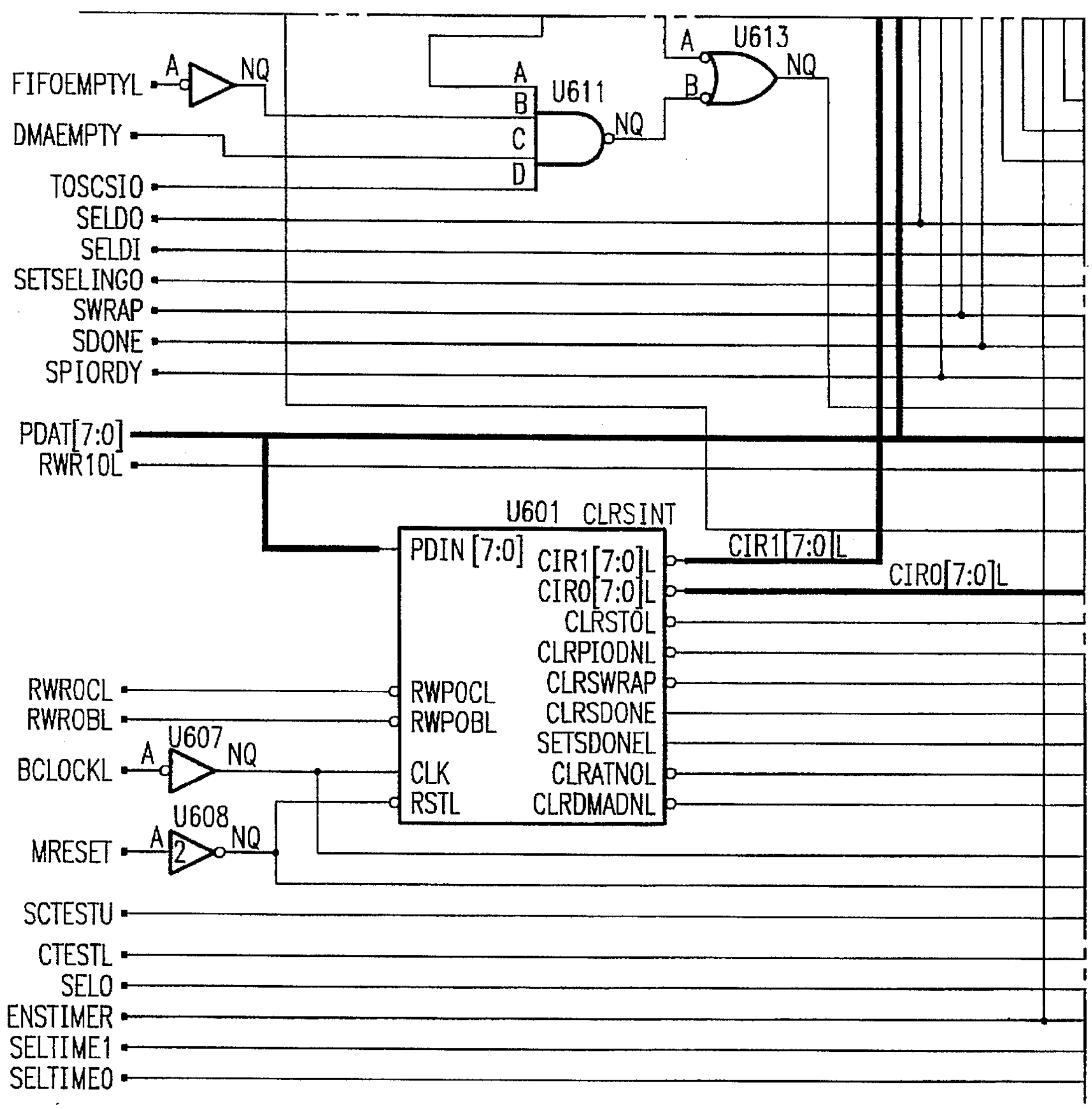
Figure 145B:
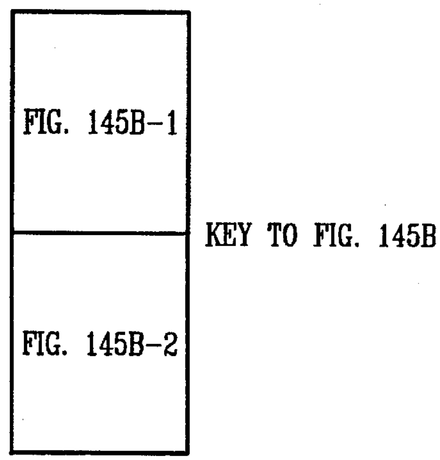
Figure 1:
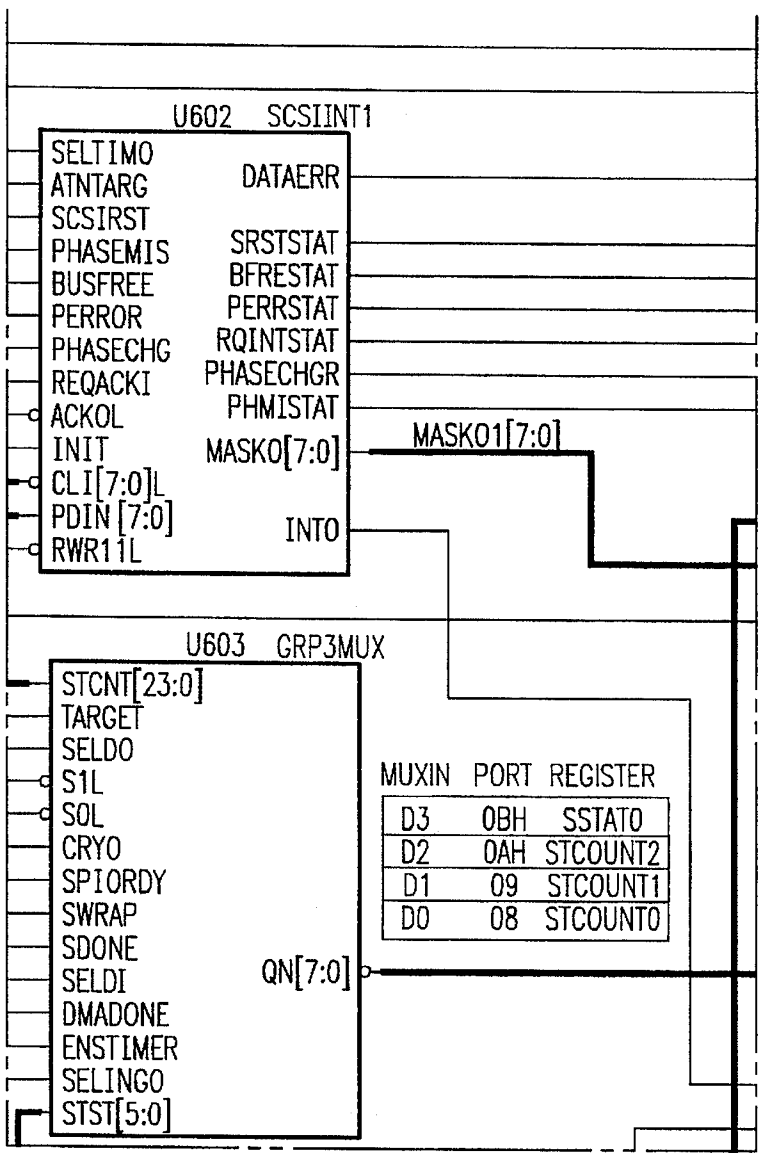
Figures 2, 145B:
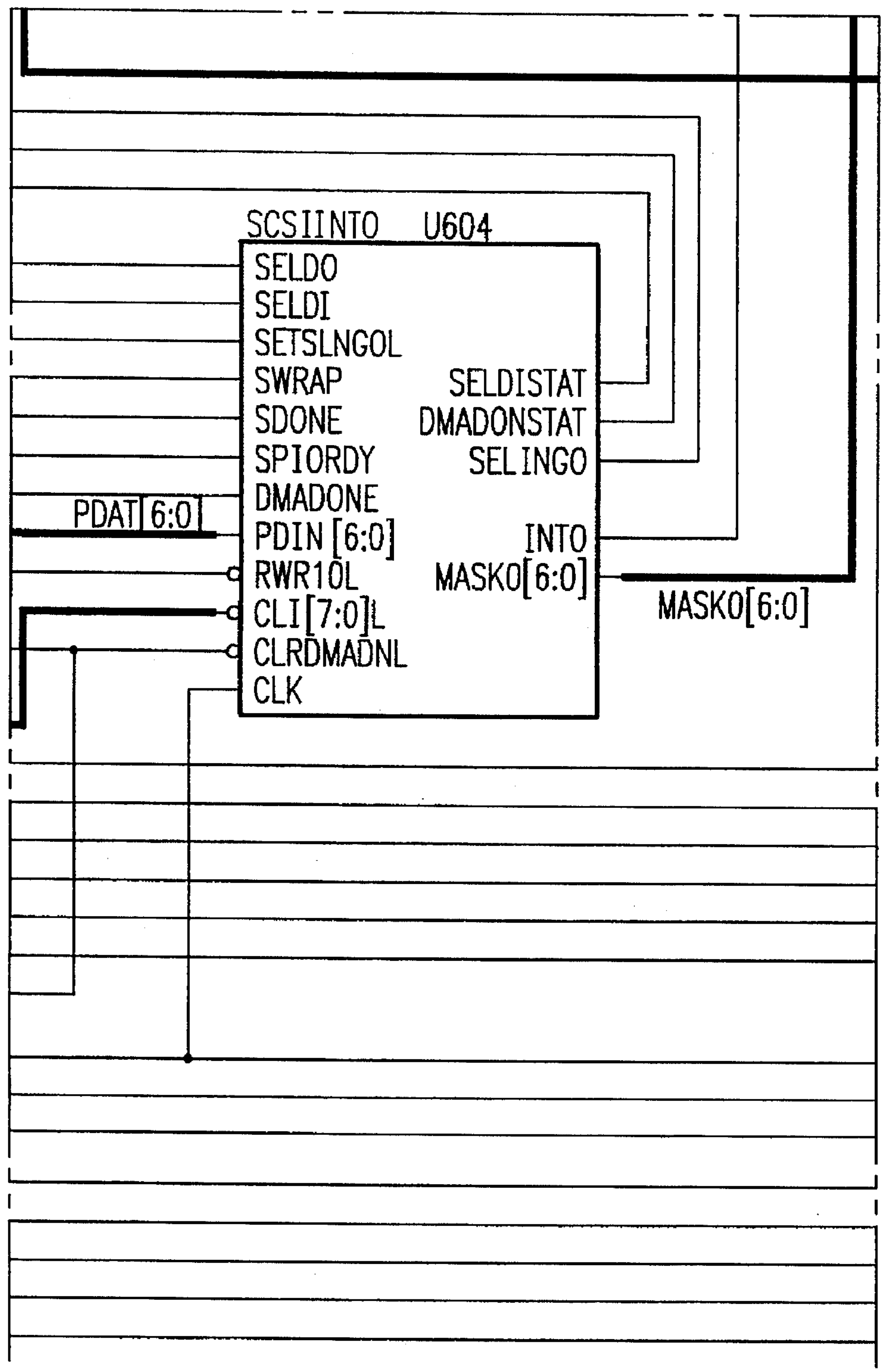
Figure 145C:
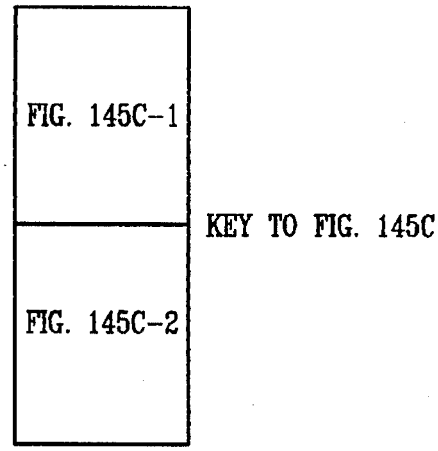
Figure 1:
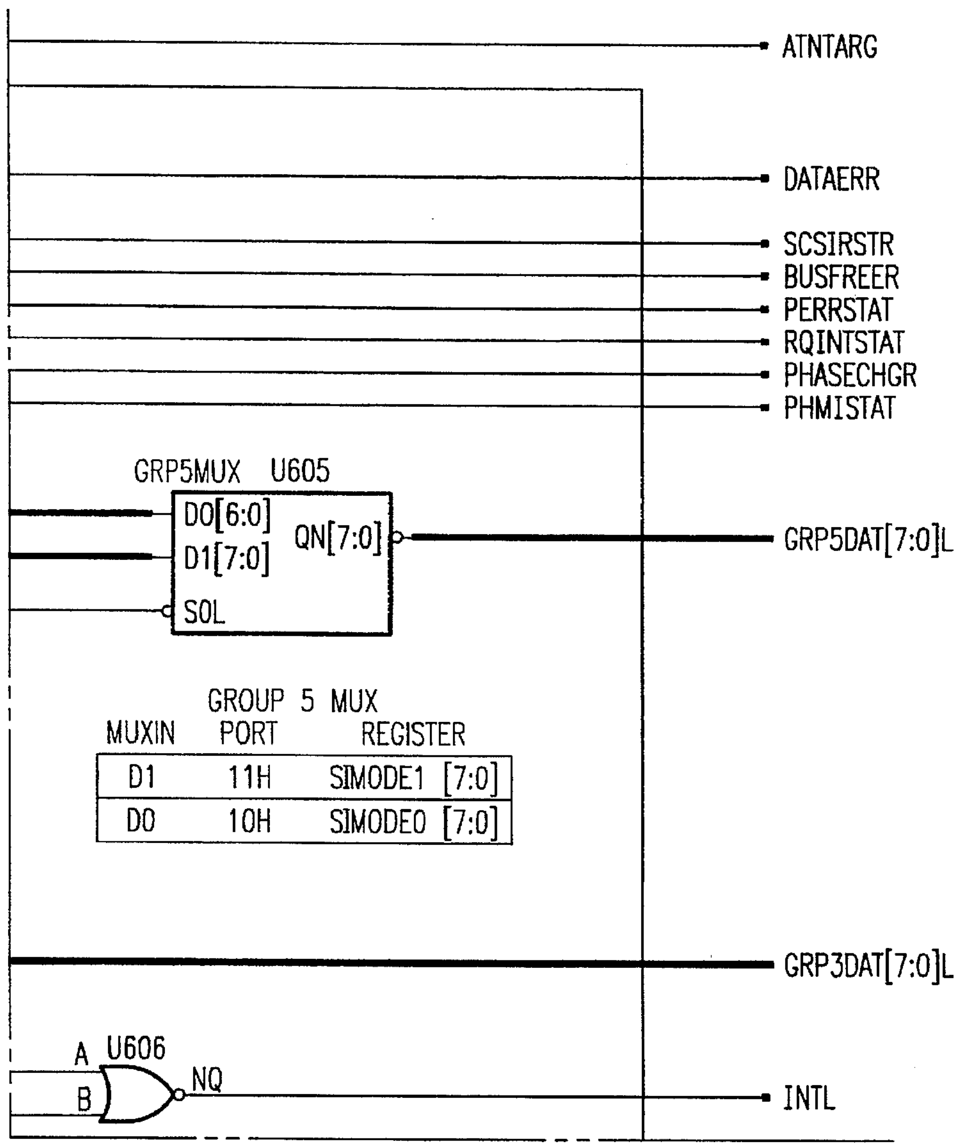
Figures 2, 145C:
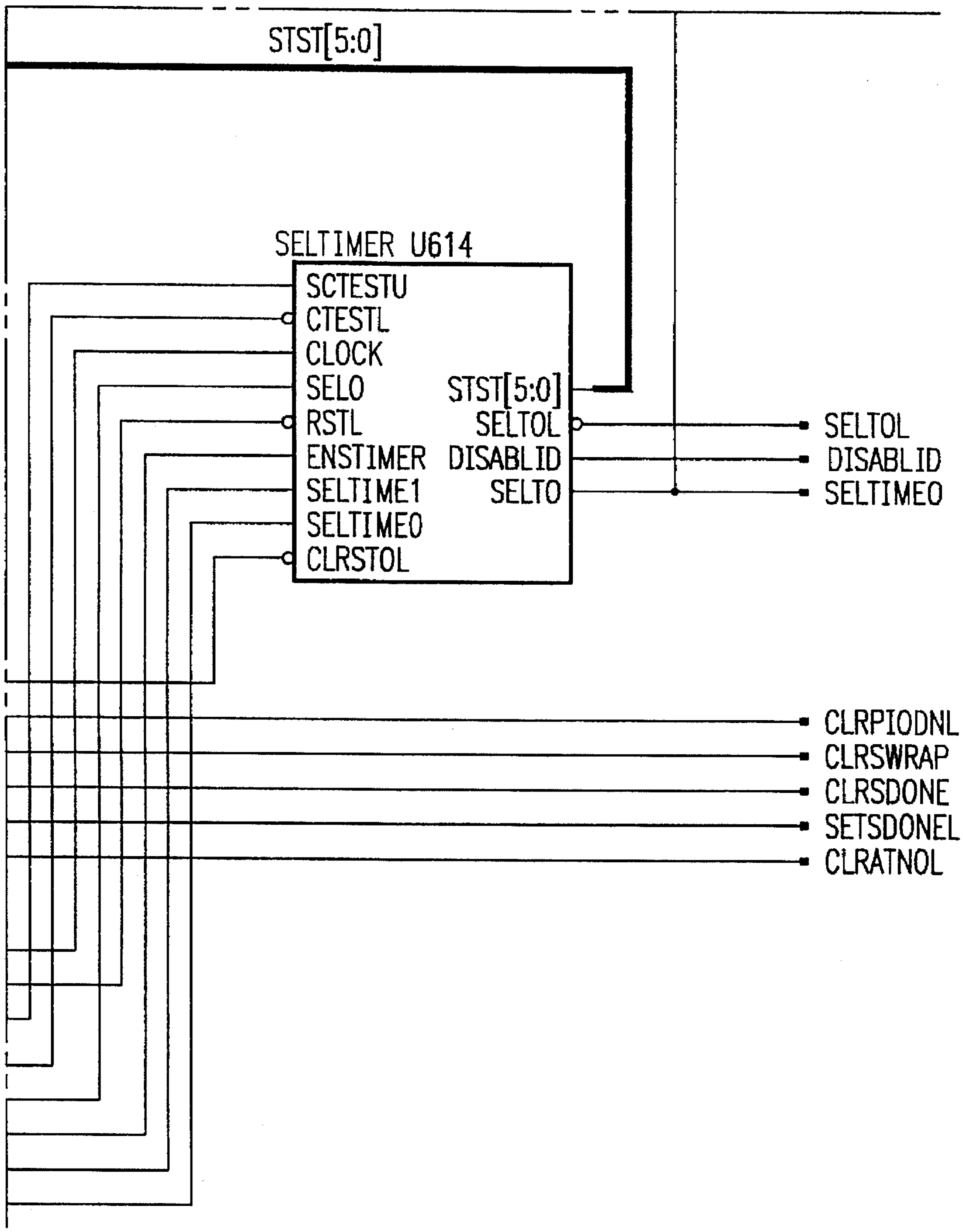
Figures 1, 146A:
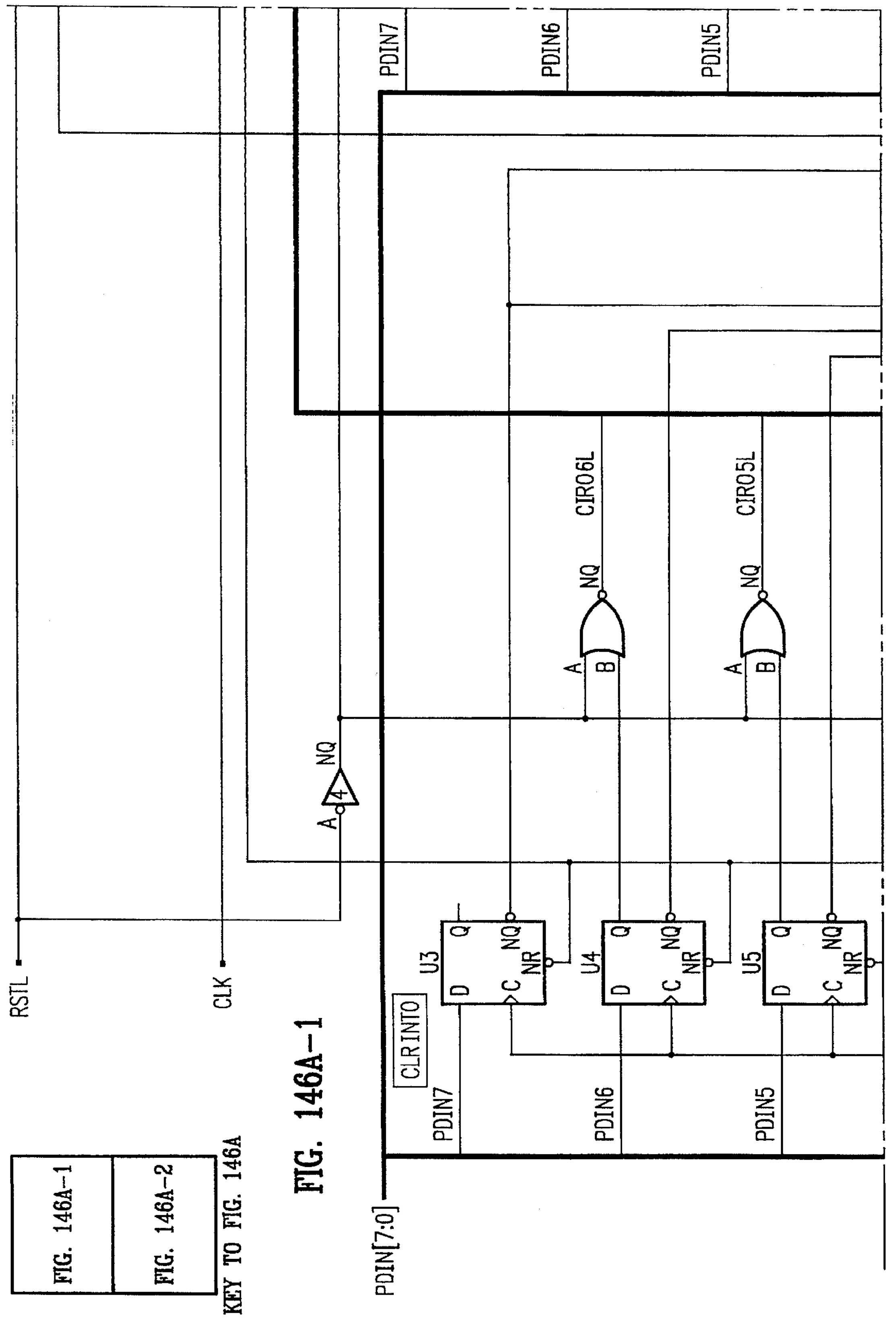
Figures 2, 146A:
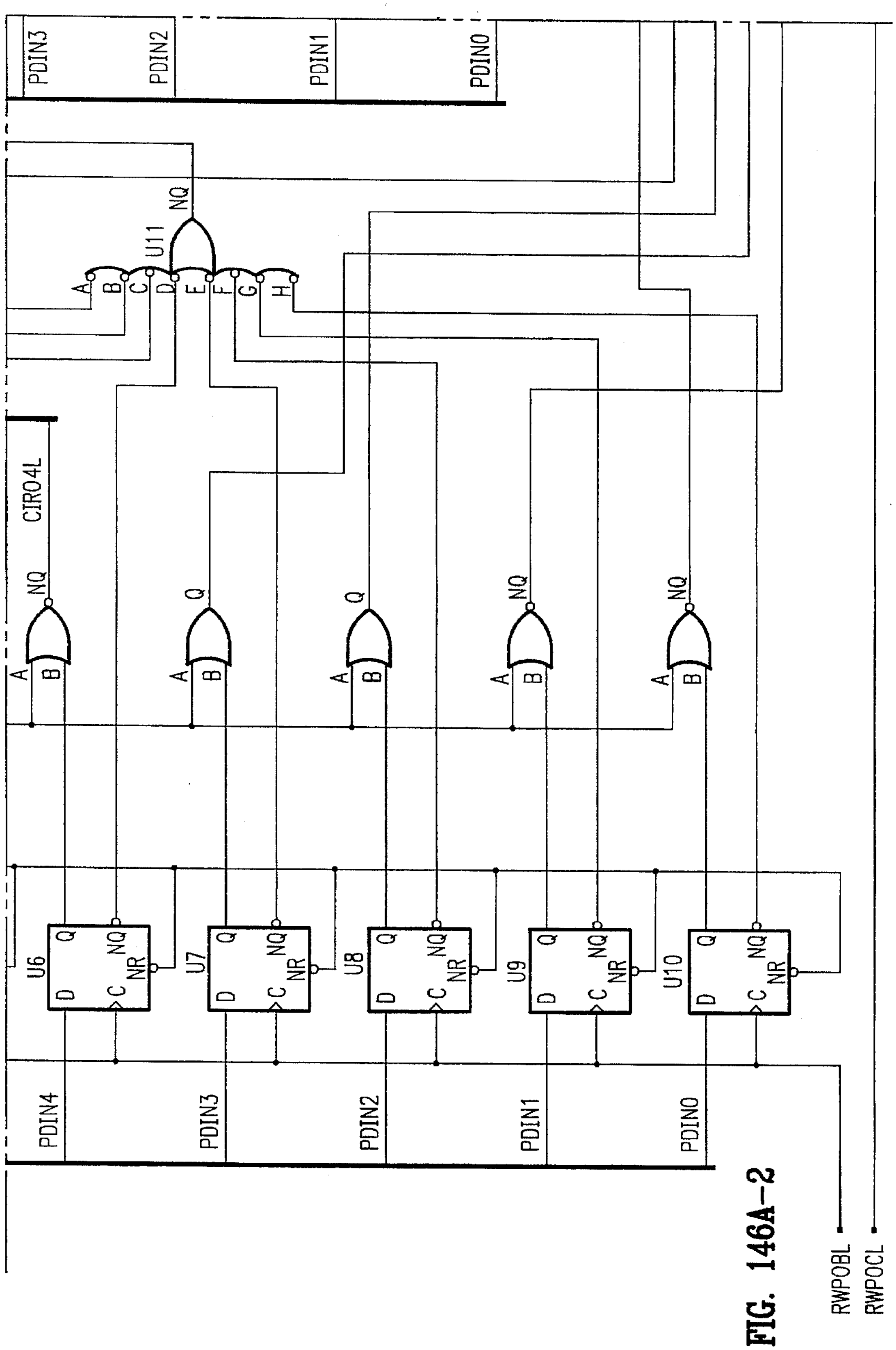
Figures 1, 146B:
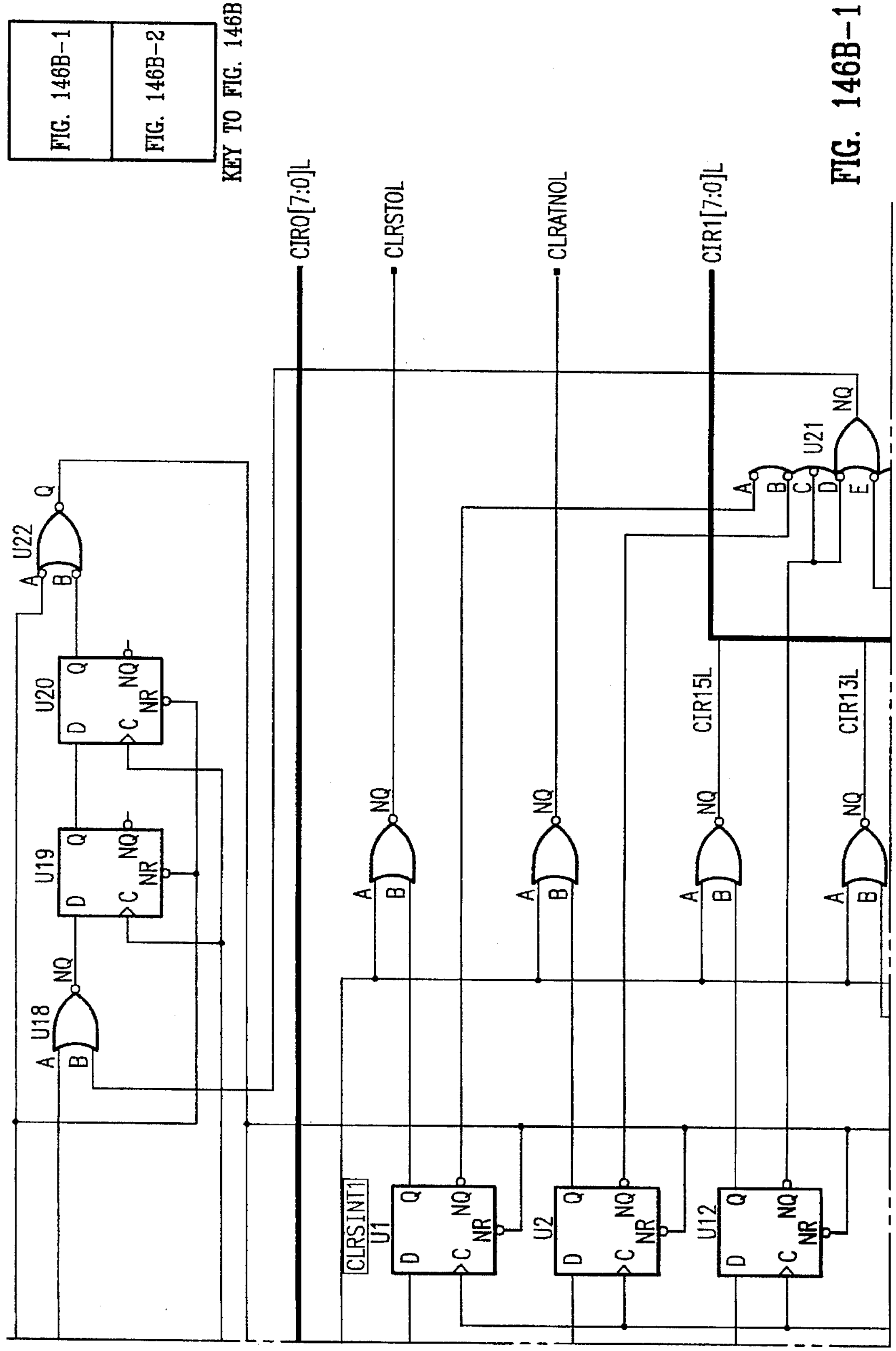
Figures 2, 146B:
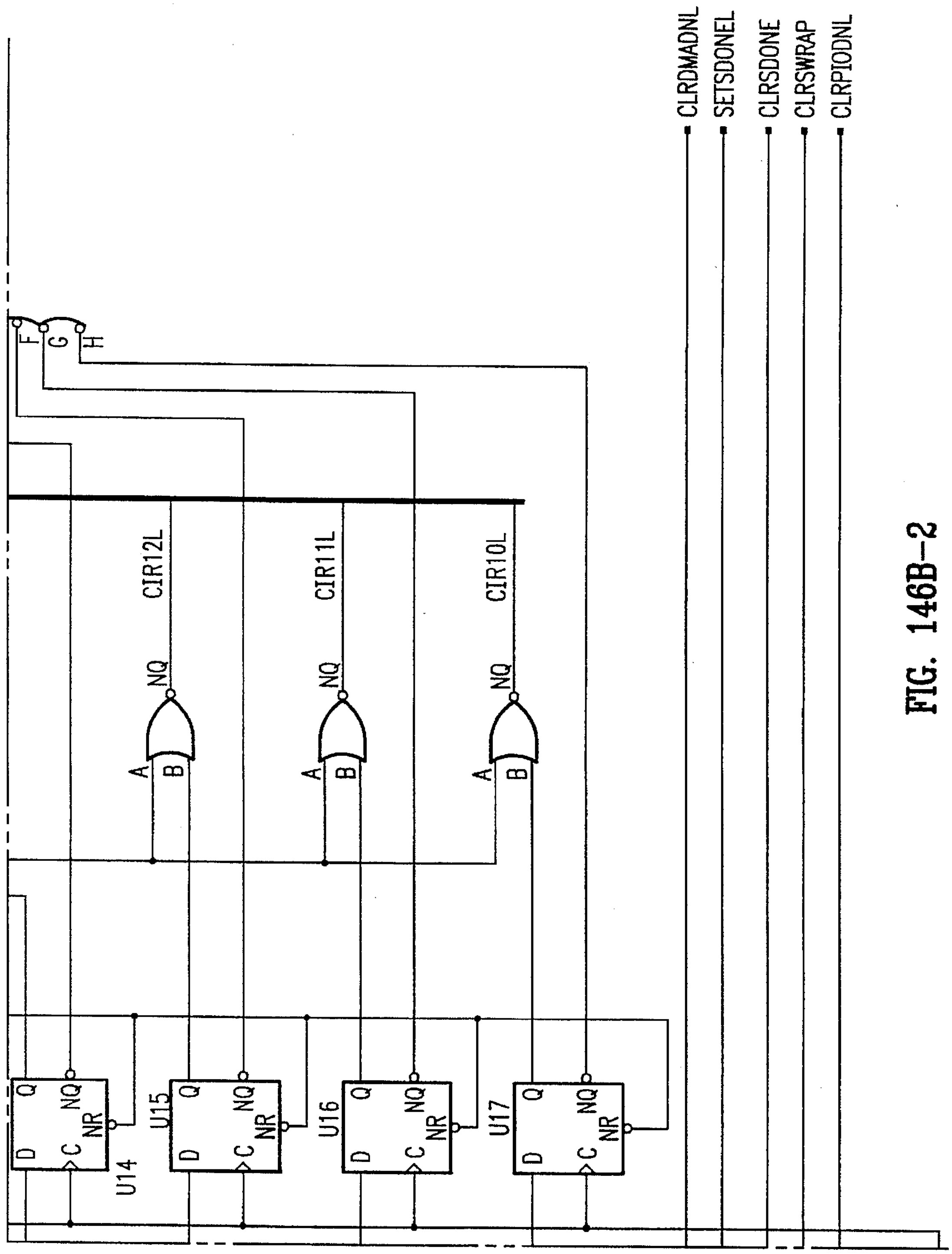
Figure 147A:
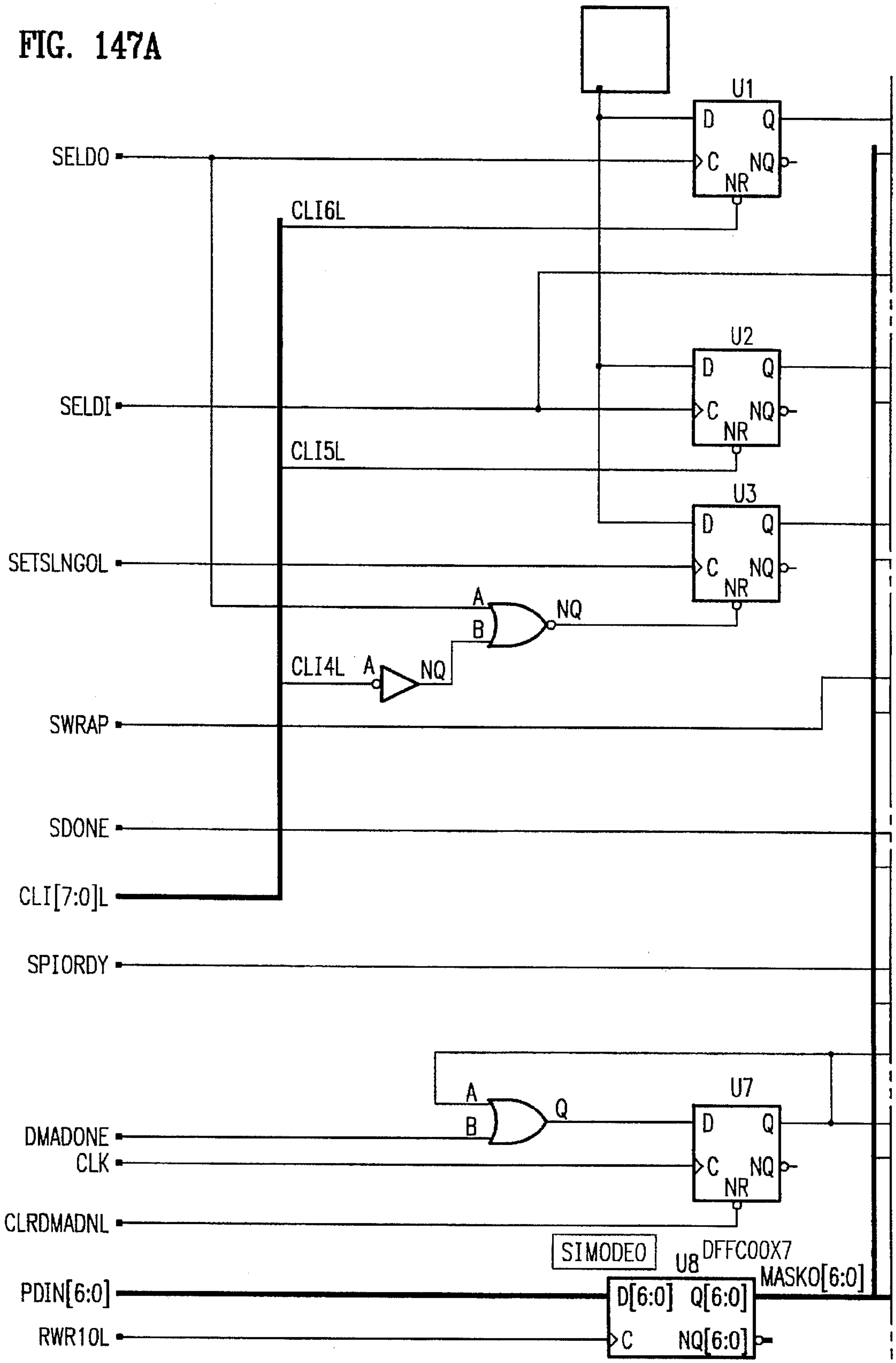
Figure 147B:
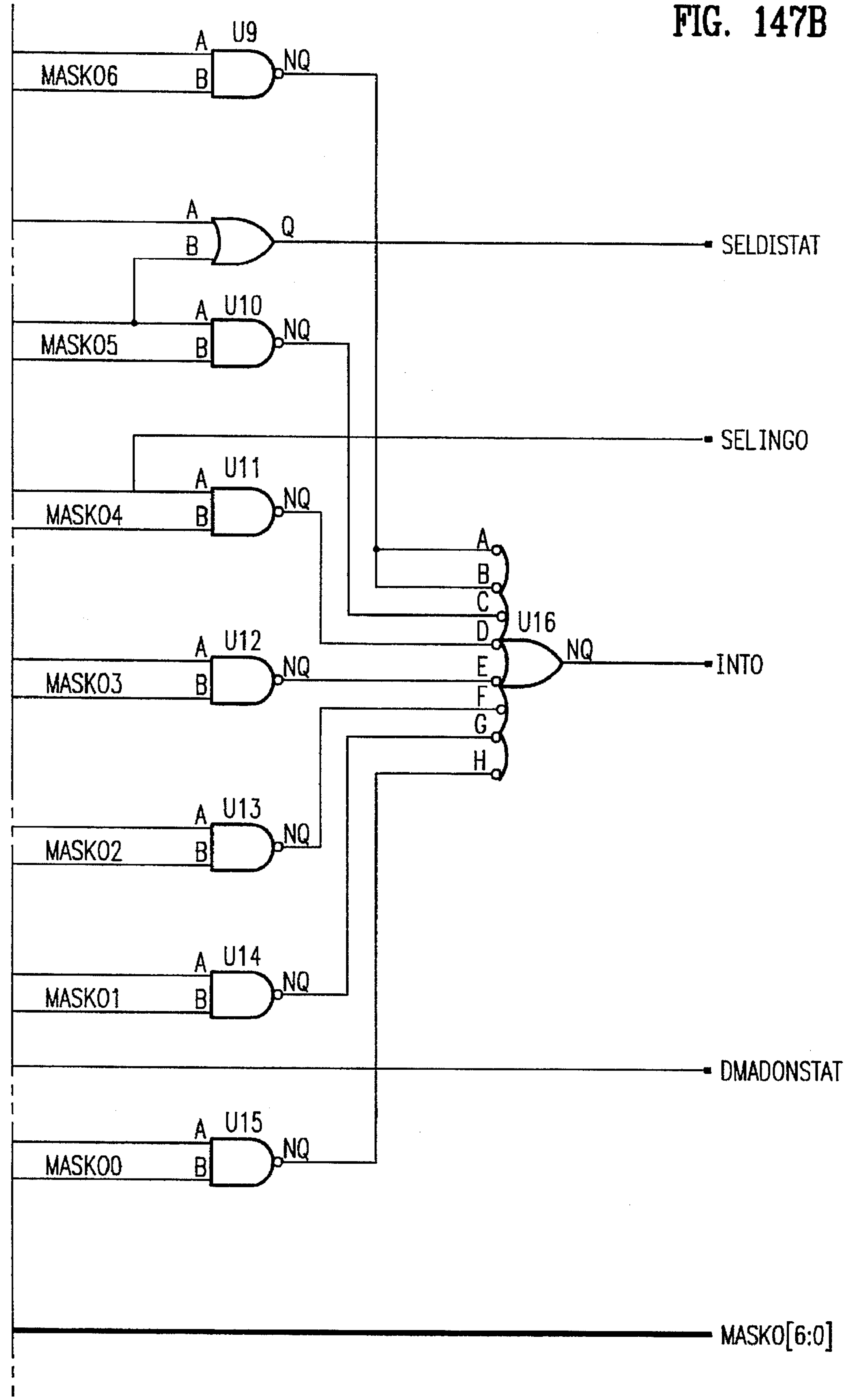
Figure 148:
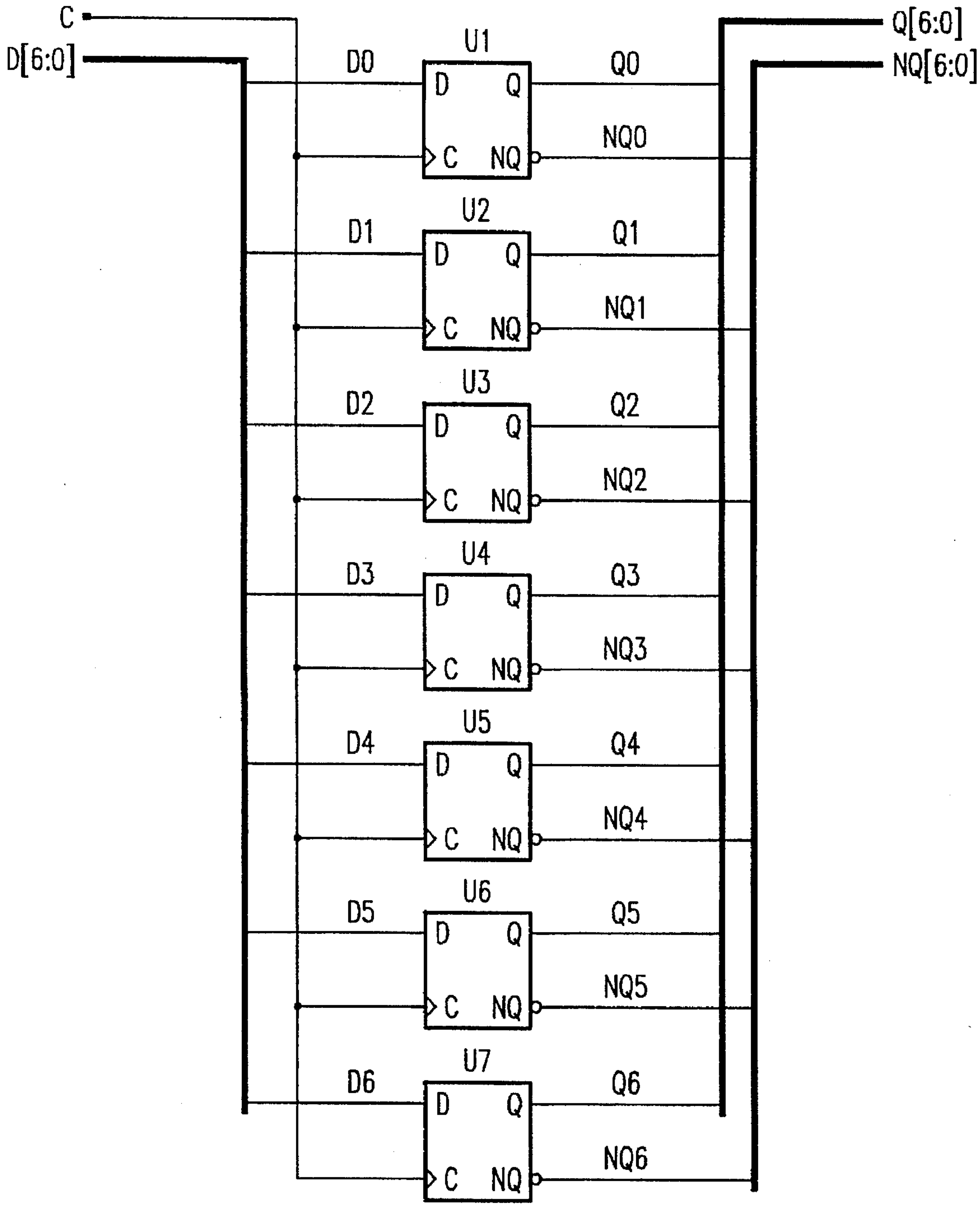
Figure 149A:
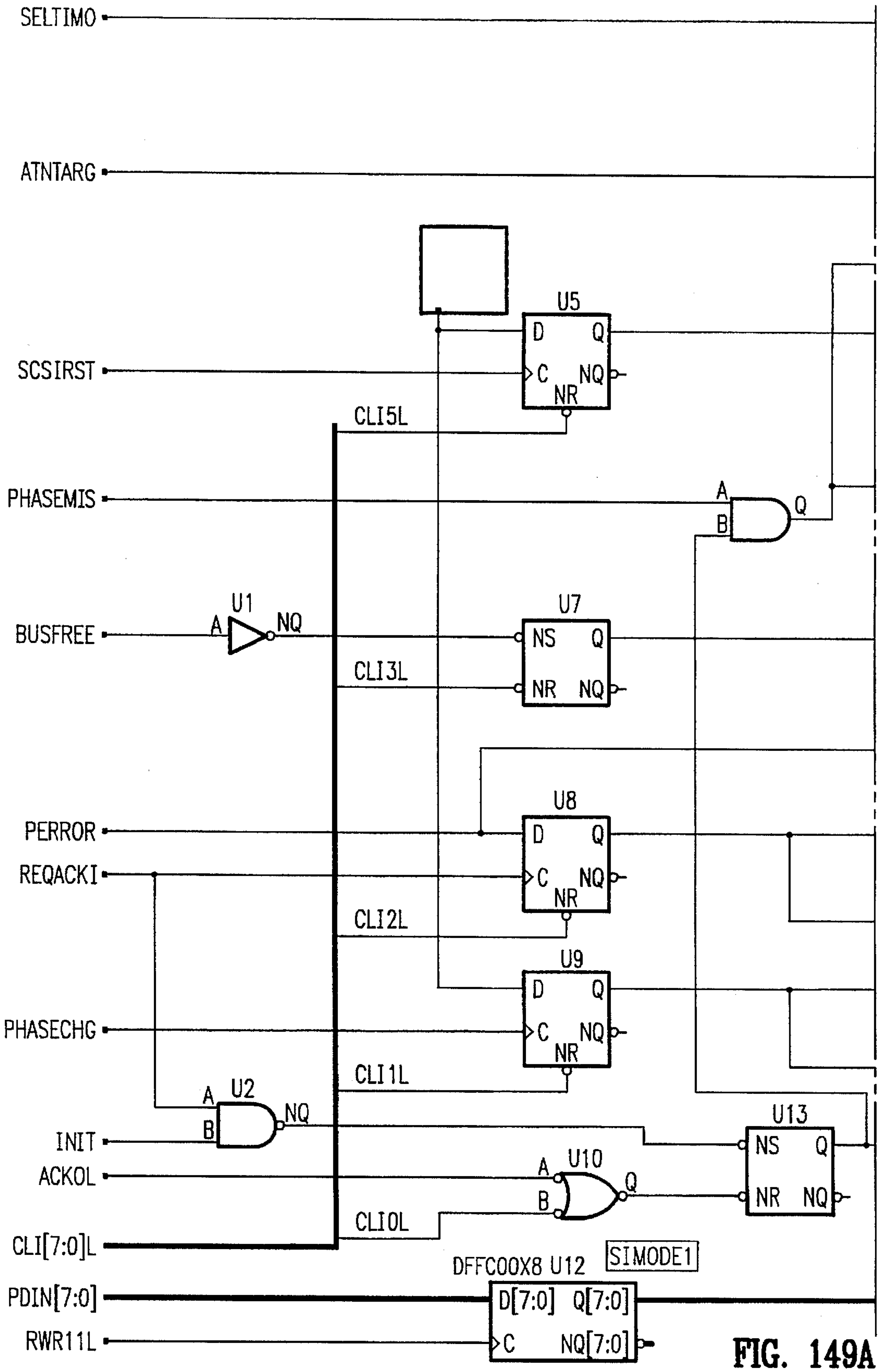
Figure 149B:
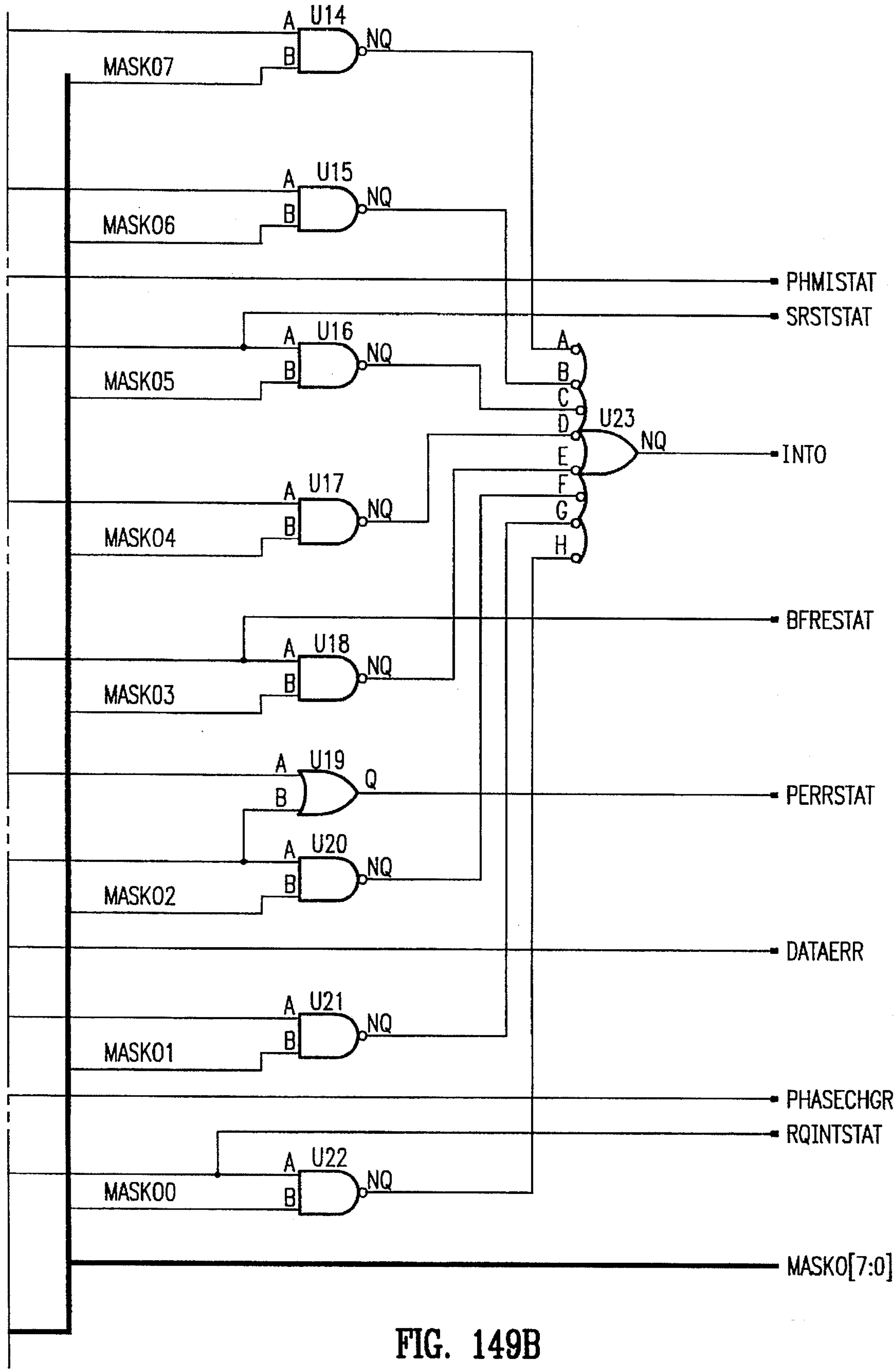
Figure 150:
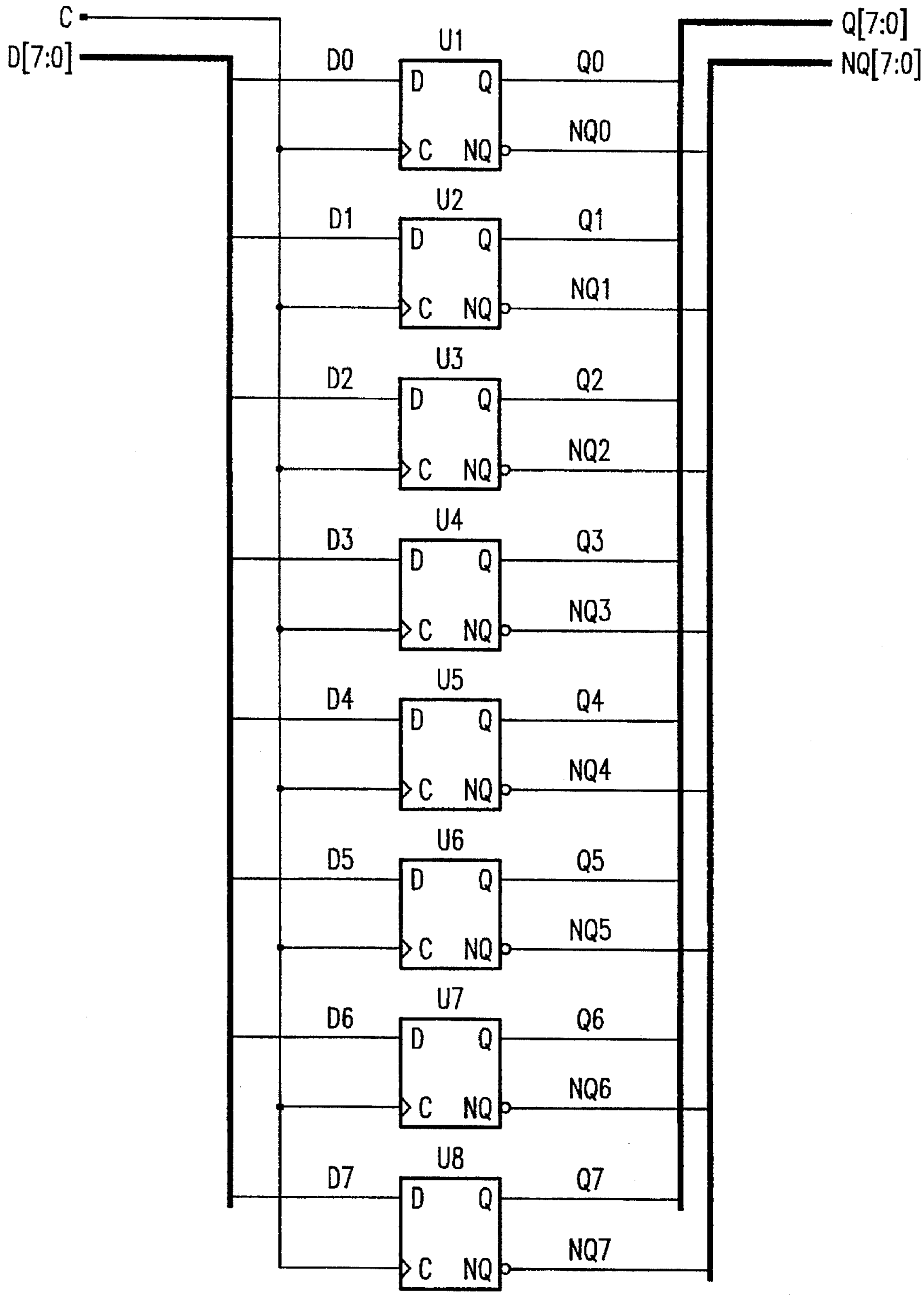

A more detailed schematic diagram of the circuitry in FIG. 9 is presented in the detailed schematics described below. In particular, FIGS. 146A and 146B are a schematic diagram of registers CLRINT0 and CLRINT1. Register SIMODE0 is illustrated in FIG. 147A and FIG. 148. Register SIMODE1 is illustrated in FIG. 149A and FIG. 150. FIGS. 145A, 145B and 145C include circuits SCSIINT0 (FIGS. 147A and 147B) and SCSIINT1 (FIGS. 149A and 149B) that are the equivalent to the register and logic gates of FIG. 9.

Figure 95:
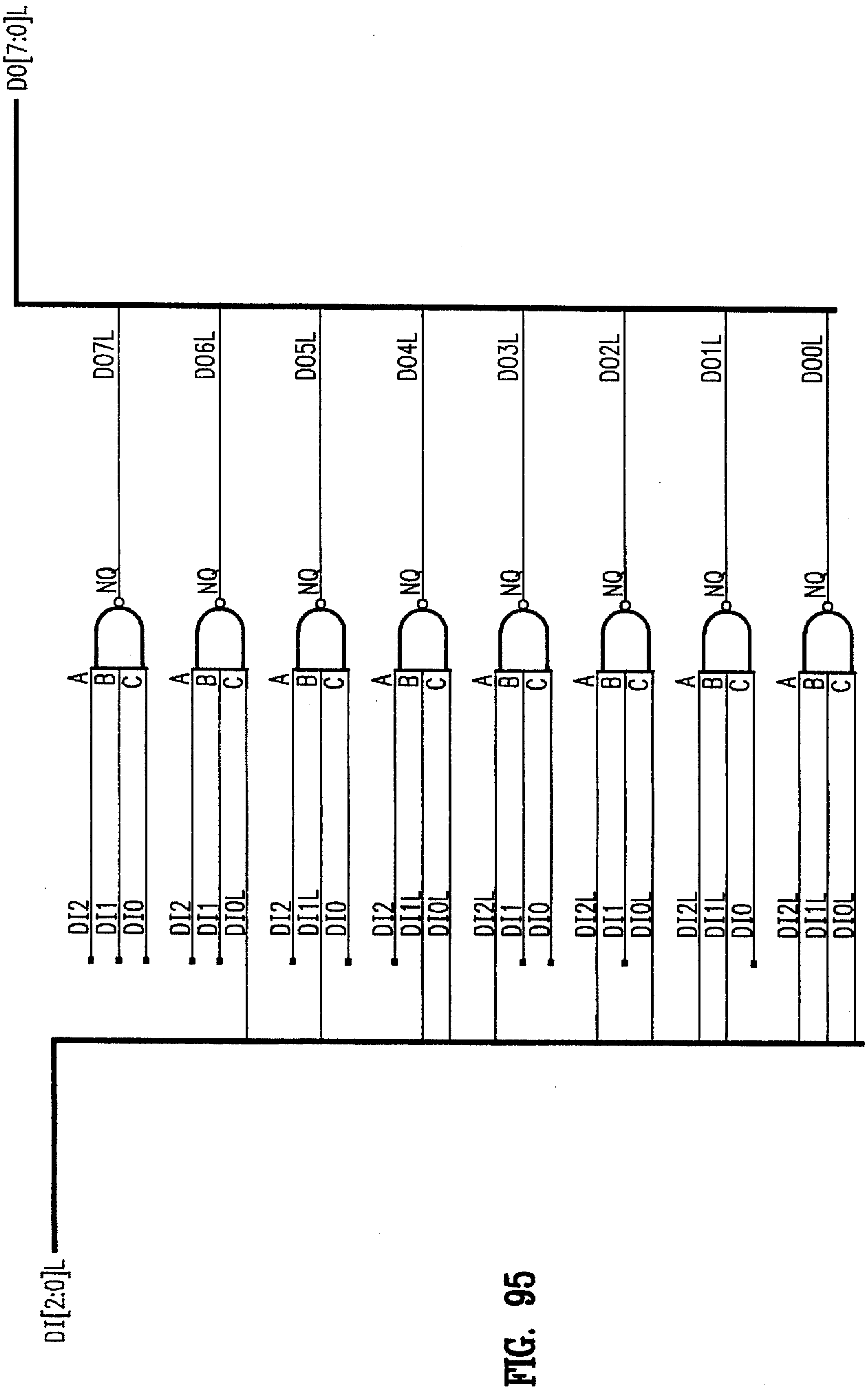
FIG. 95 illustrates a 3 to 8 decoder circuit DCDR3B8.
Figures 1, 96A:
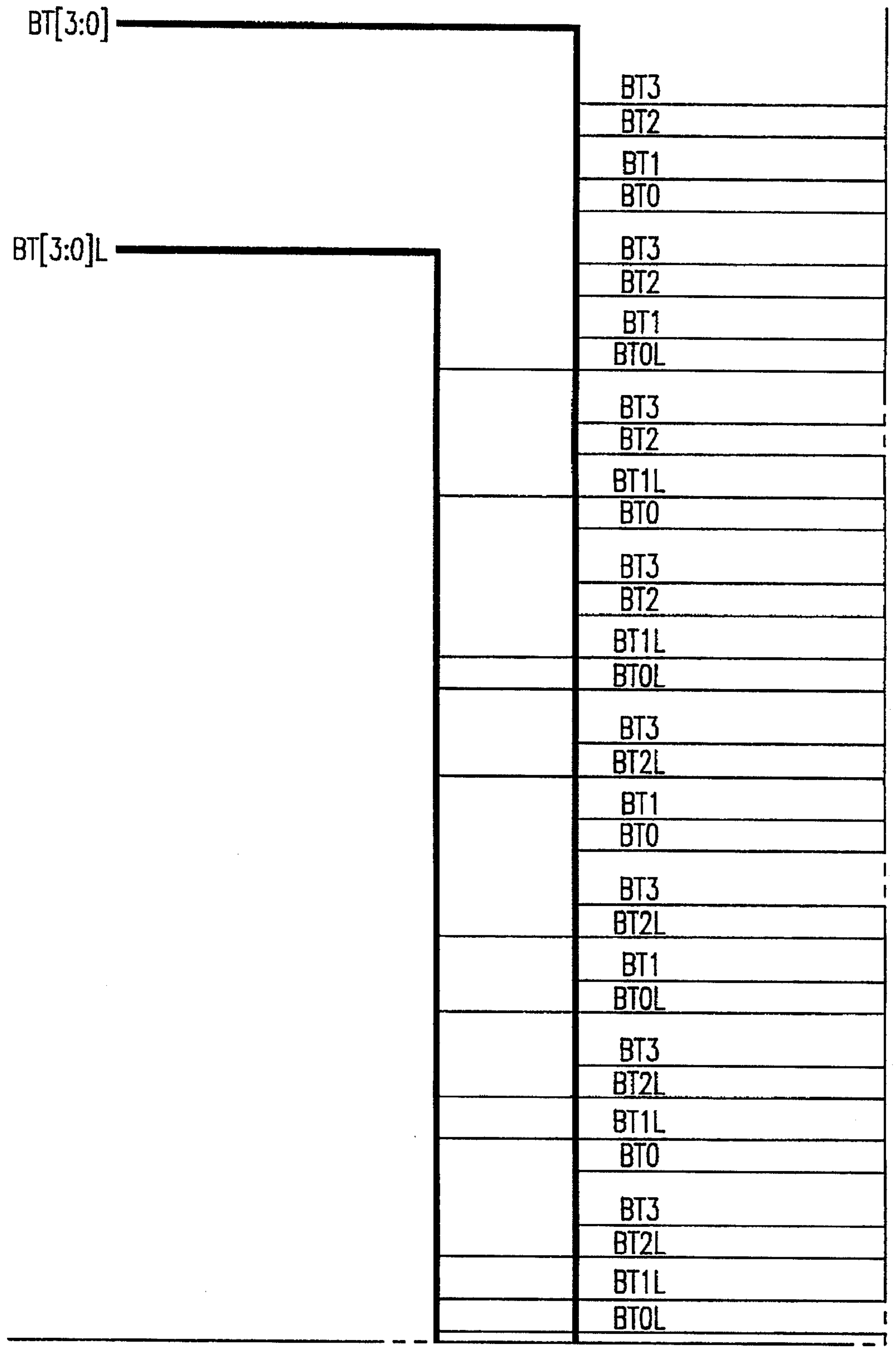
FIGS. 96A and 96B illustrate circuit DCDR4B16.
Figure 96A:
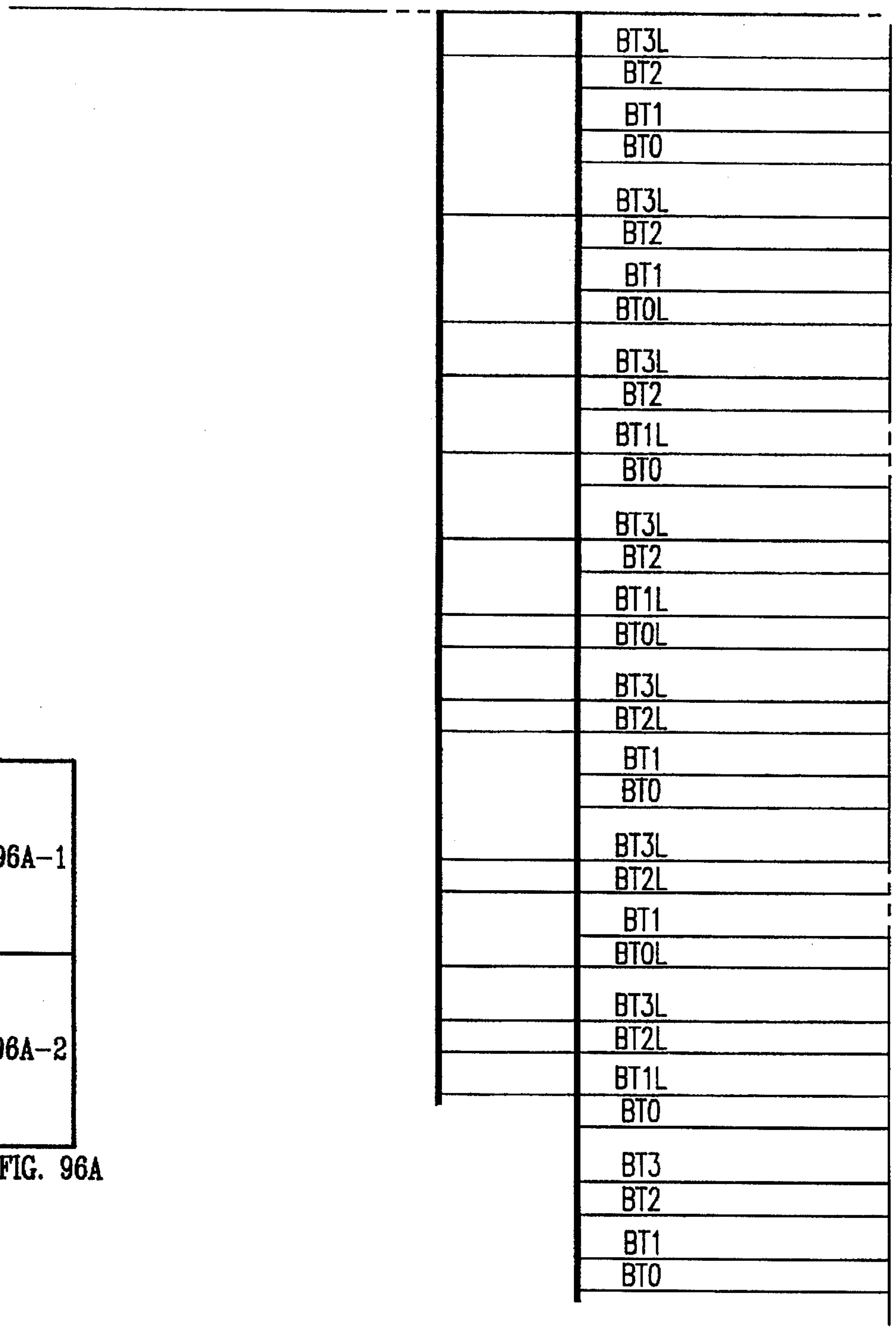
Figure 2:
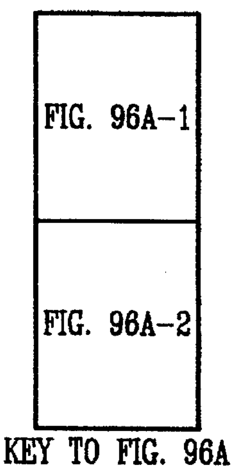
Figures 1, 96B:
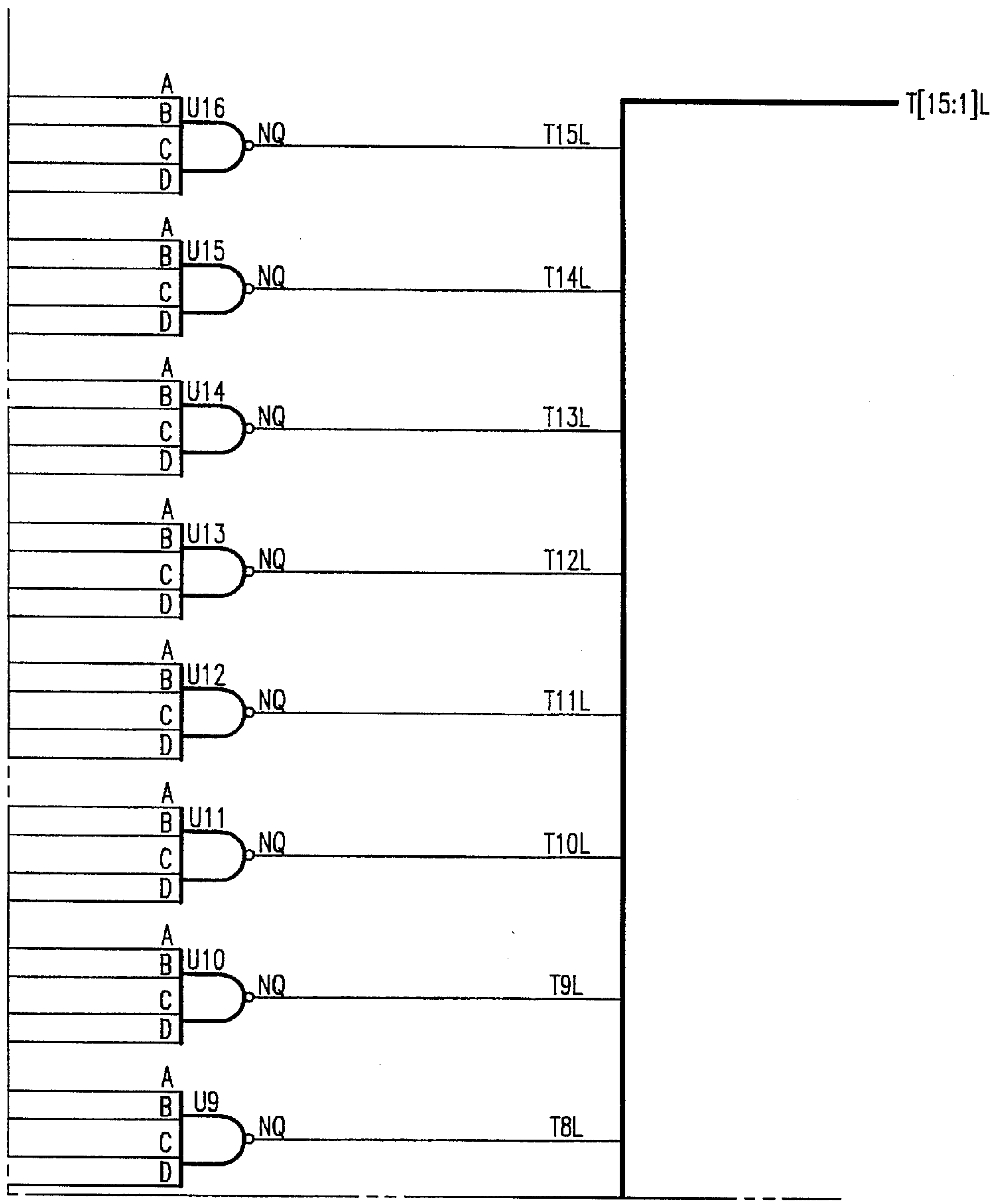
Figure 96B:
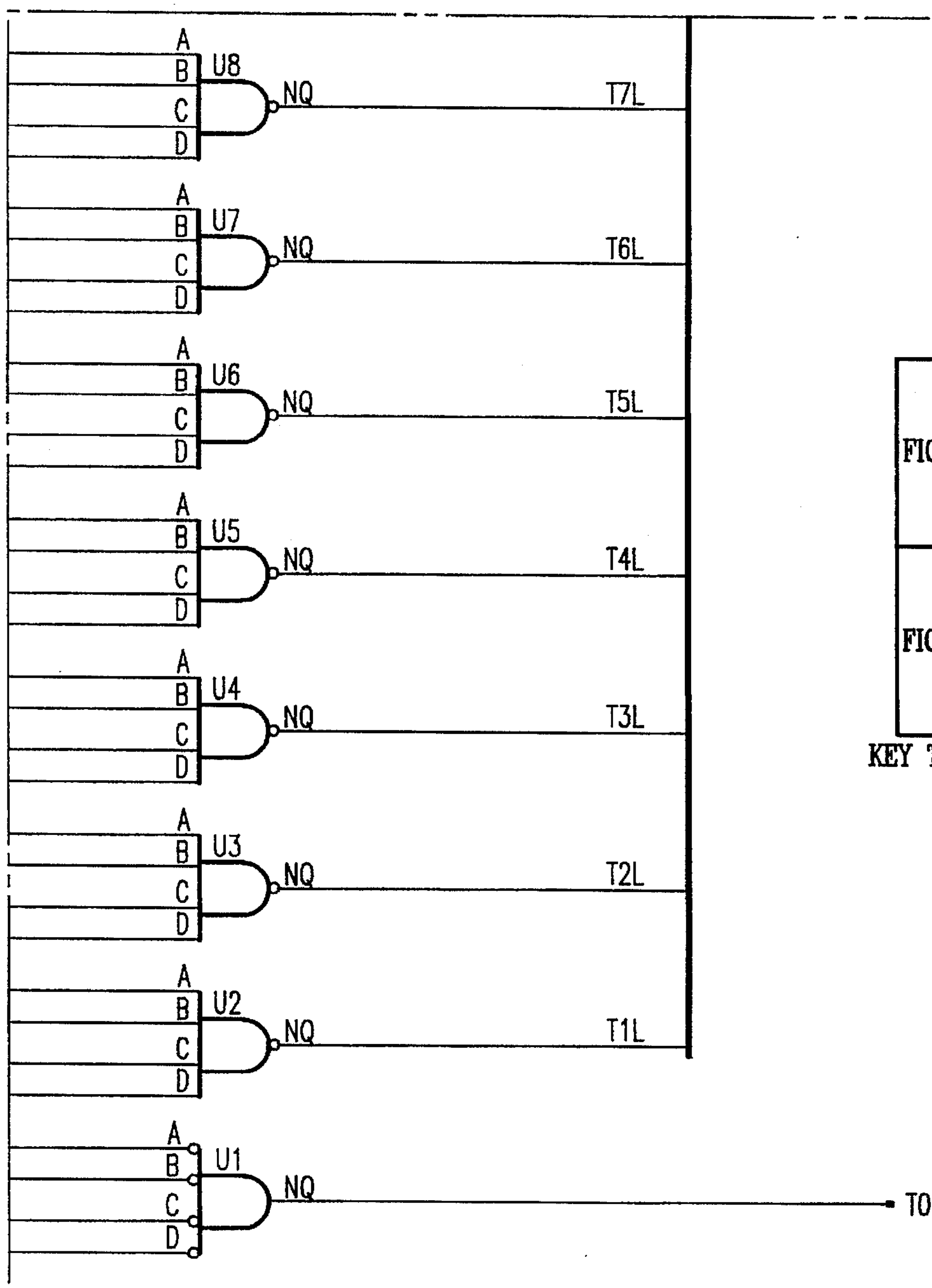
Figure 2:
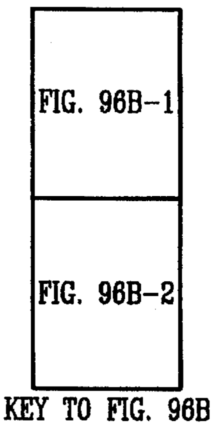
Figure 97A:
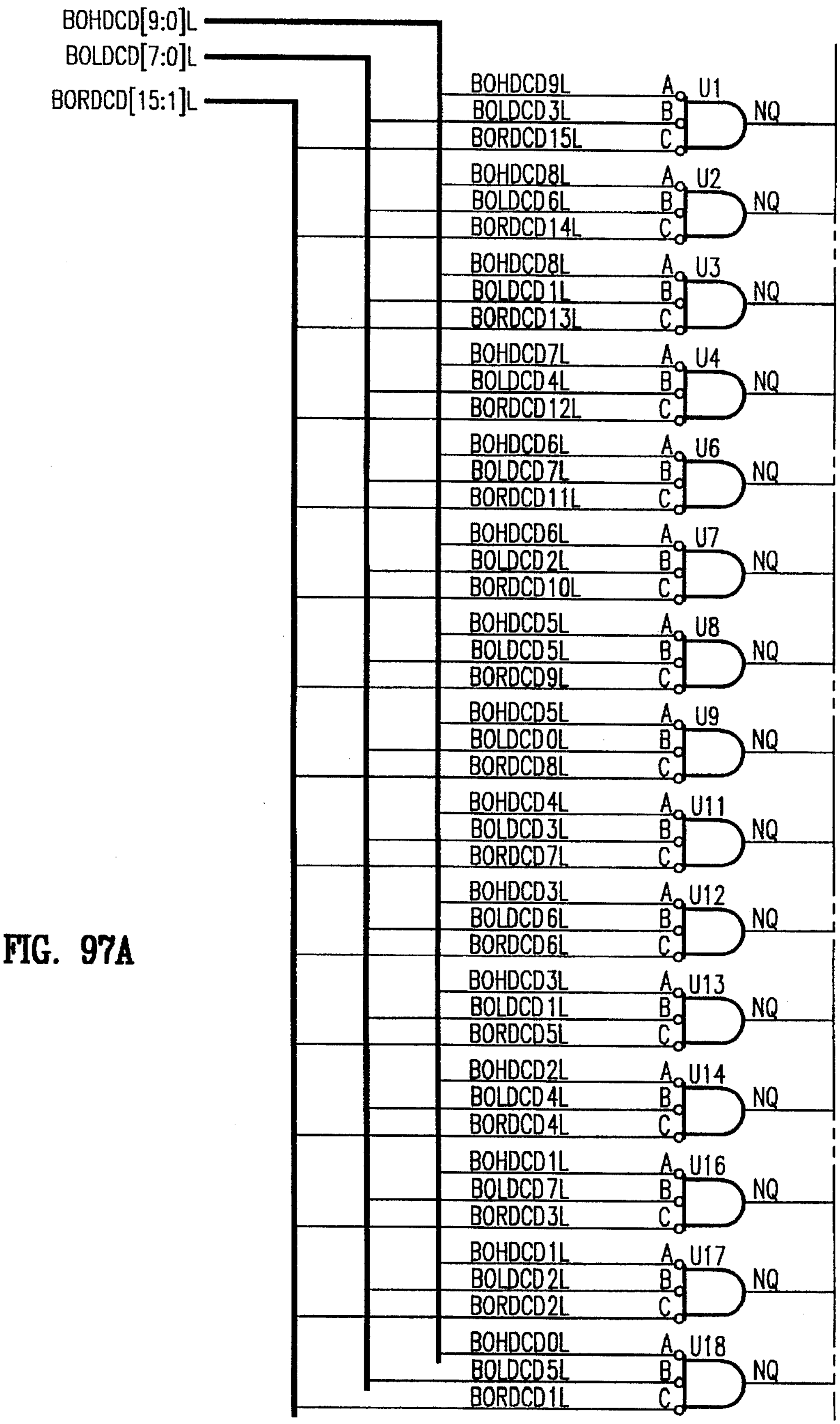
FIGS. 97A and 97B illustratebus timer circuit BOTDCDR.
Figure 97B:
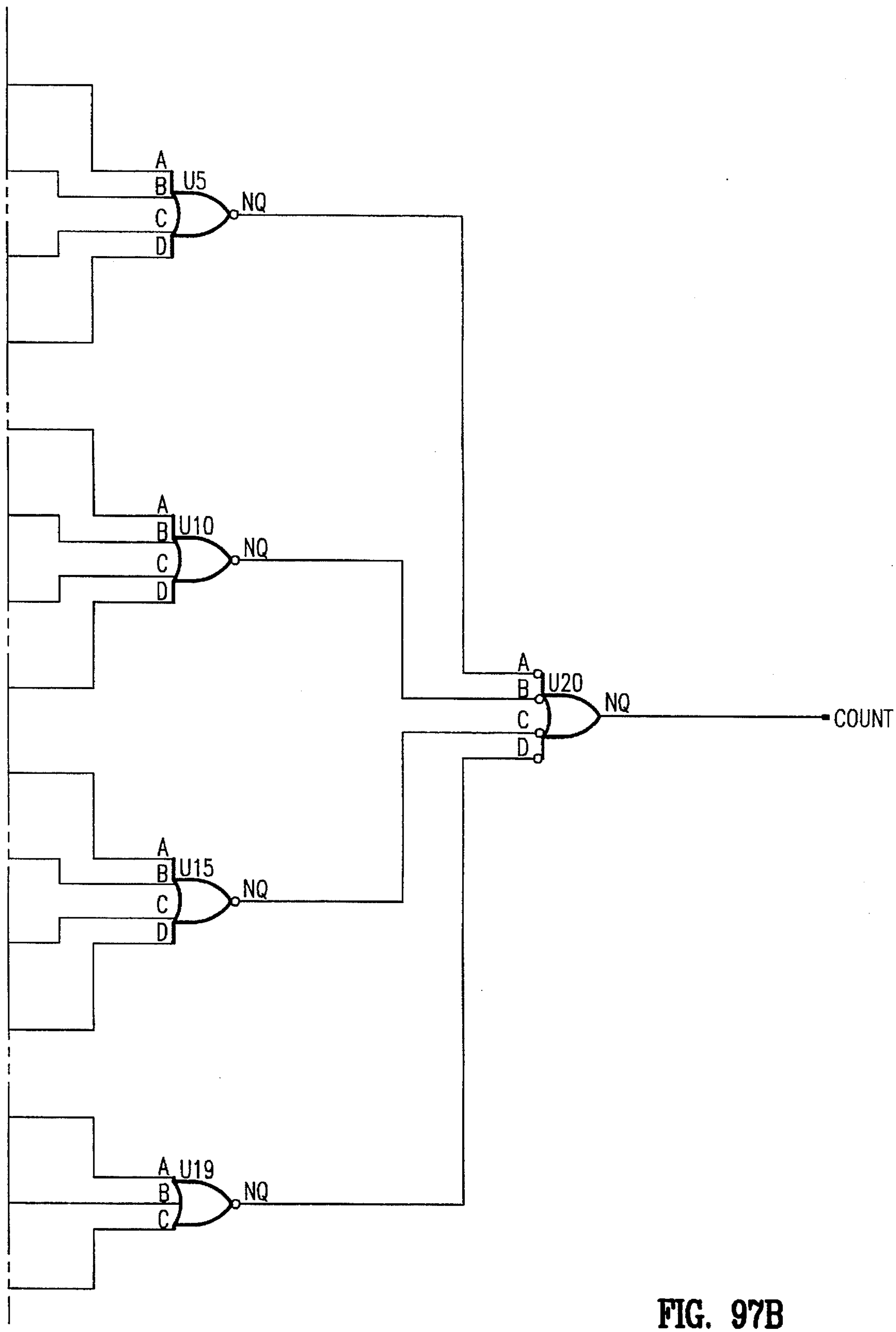
Figure 122A:
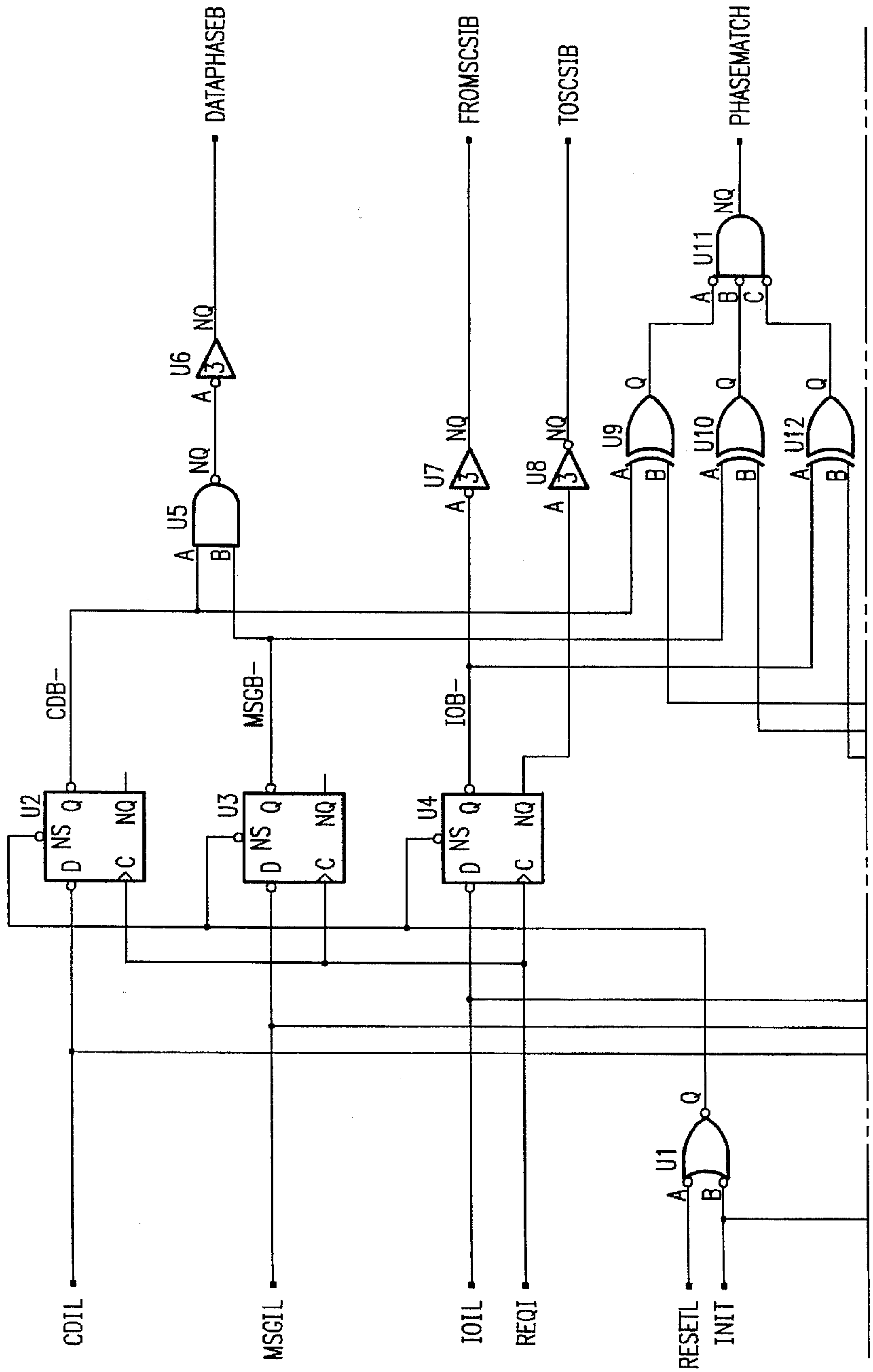
FIG. 122 illustrates SCSI phase control circuit PHASECTL of FIG. 113B.
Figure 122B:
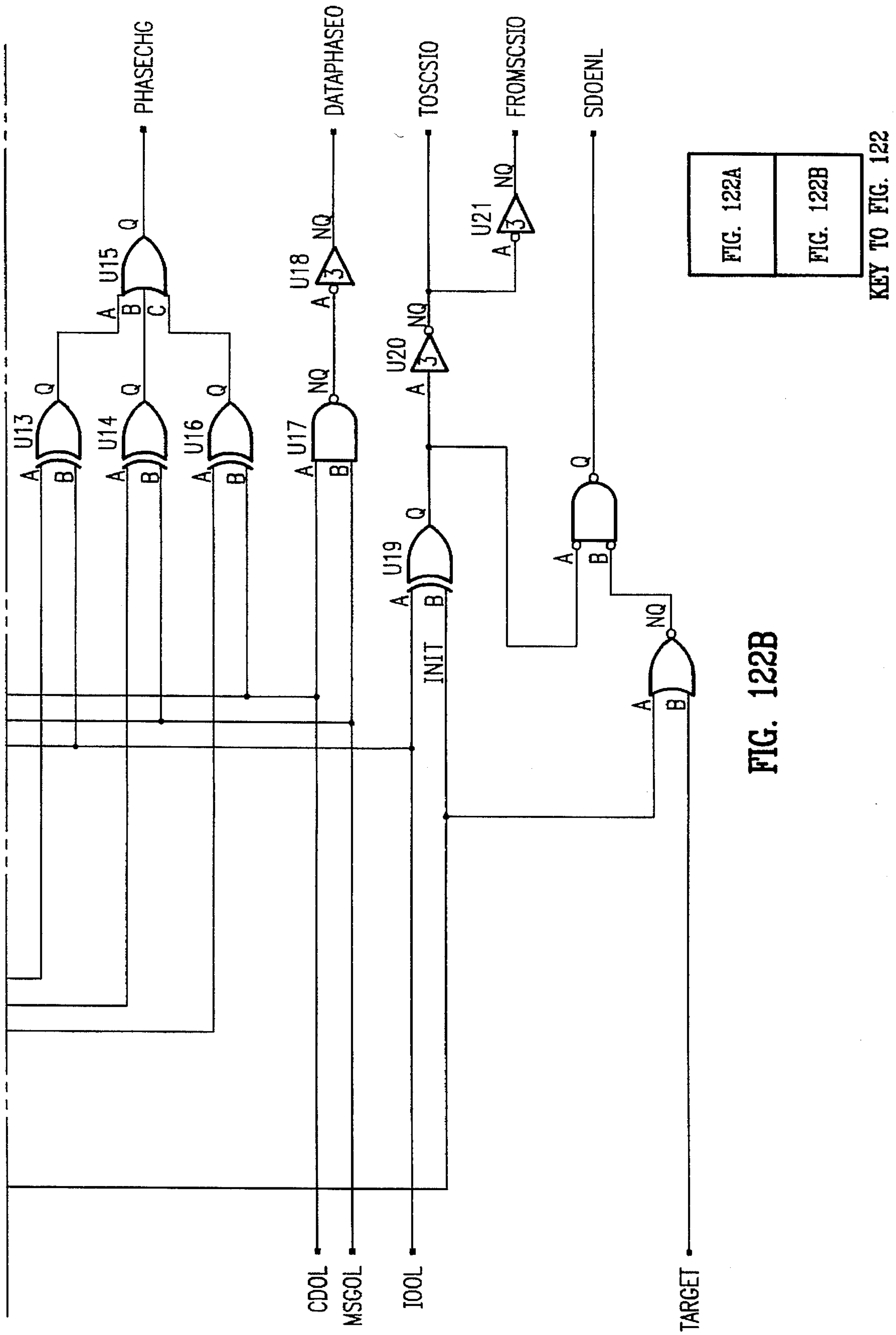
Figure 138A:
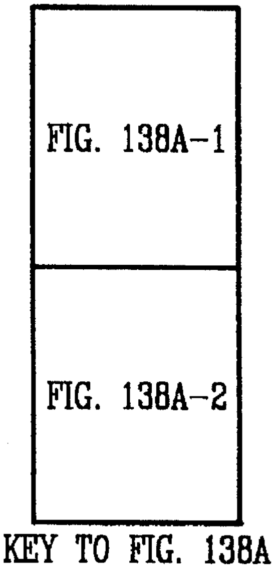
FIGS. 138A, 138B, and 138C illustrate circuit AUTOCON that includes circuits DEL400N and SEQUENCE as well as circuit IDLOGIC.
Figure 1:
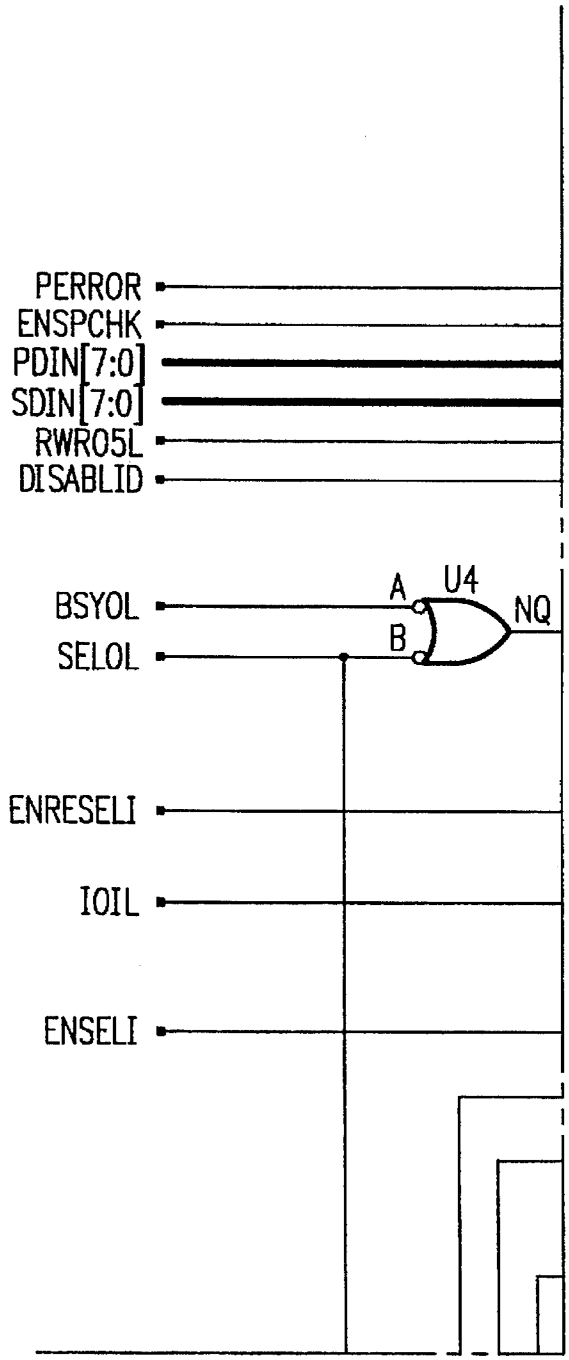
Figures 2, 138A:
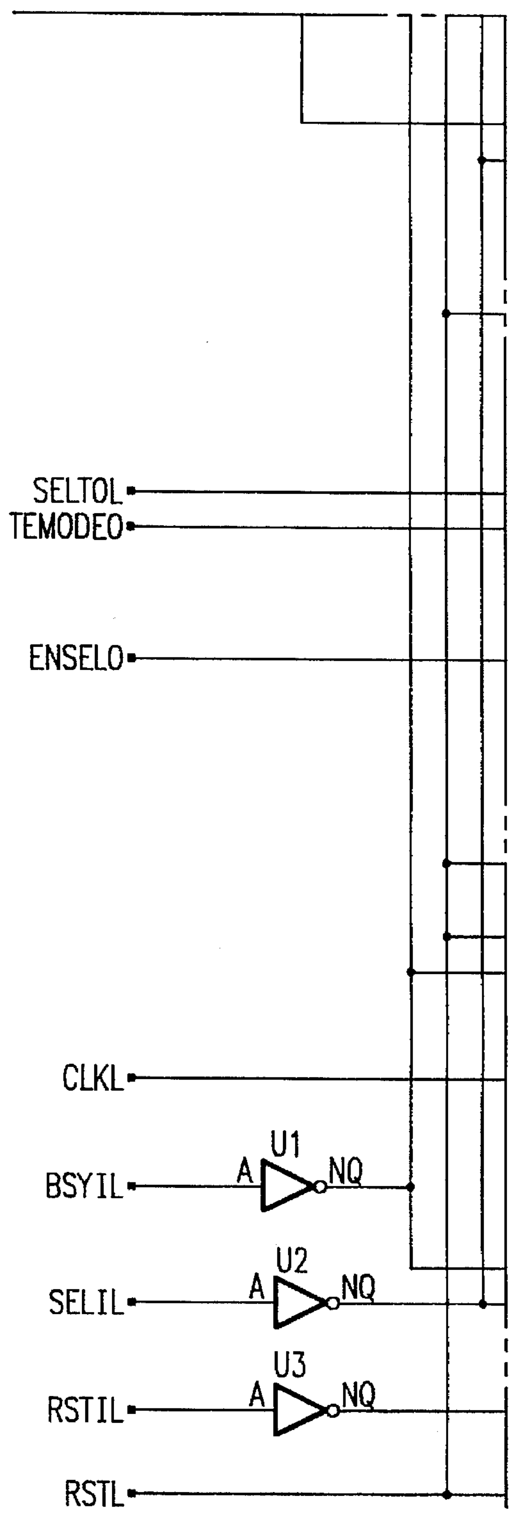
Figure 138B:
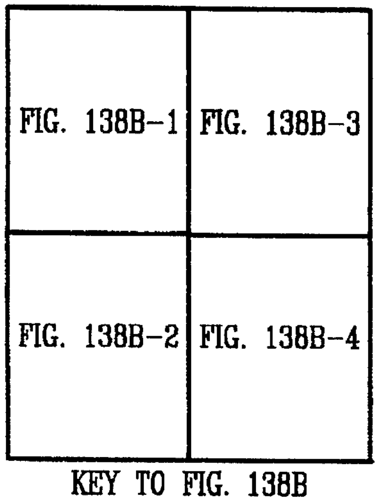
Figure 1:
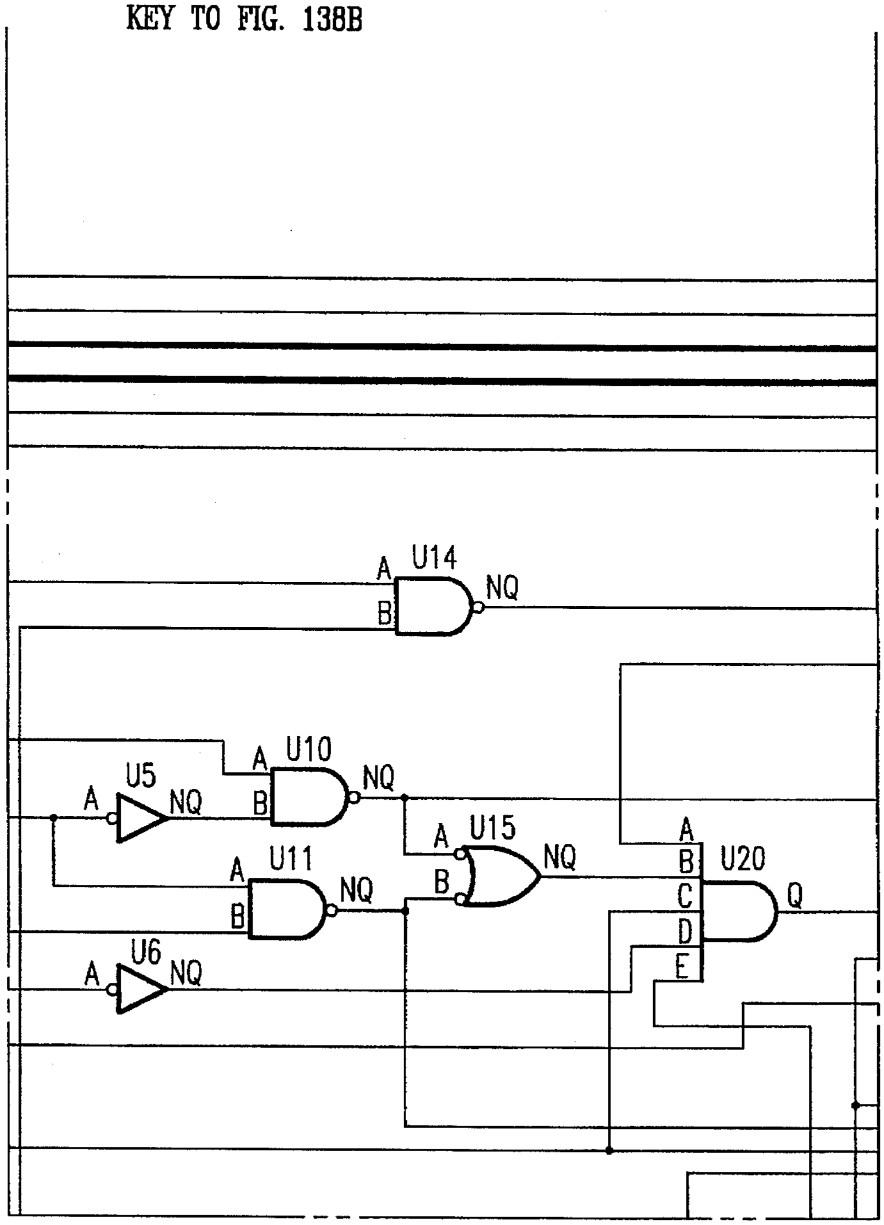
Figures 2, 138B:
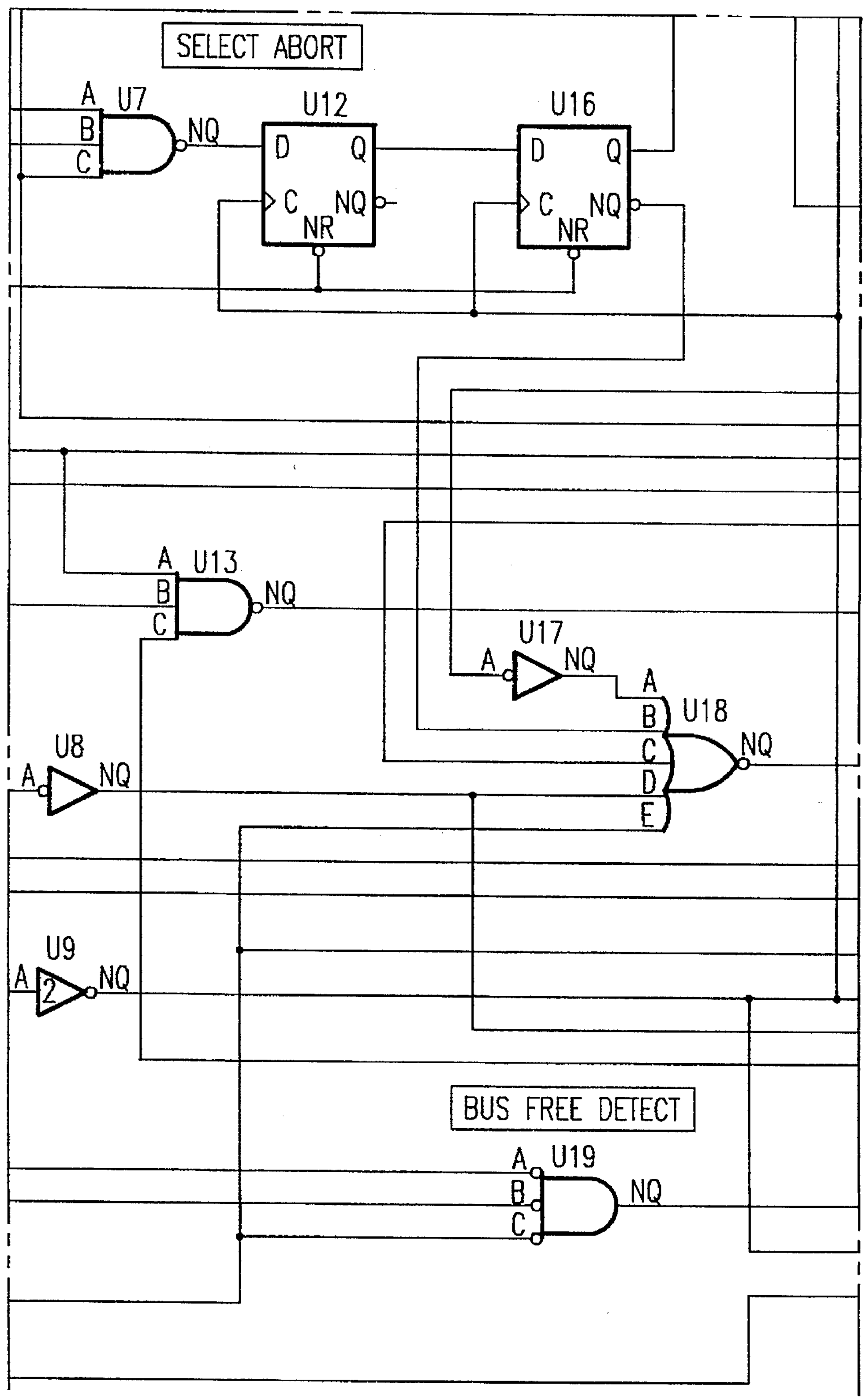
Figures 3, 138B:
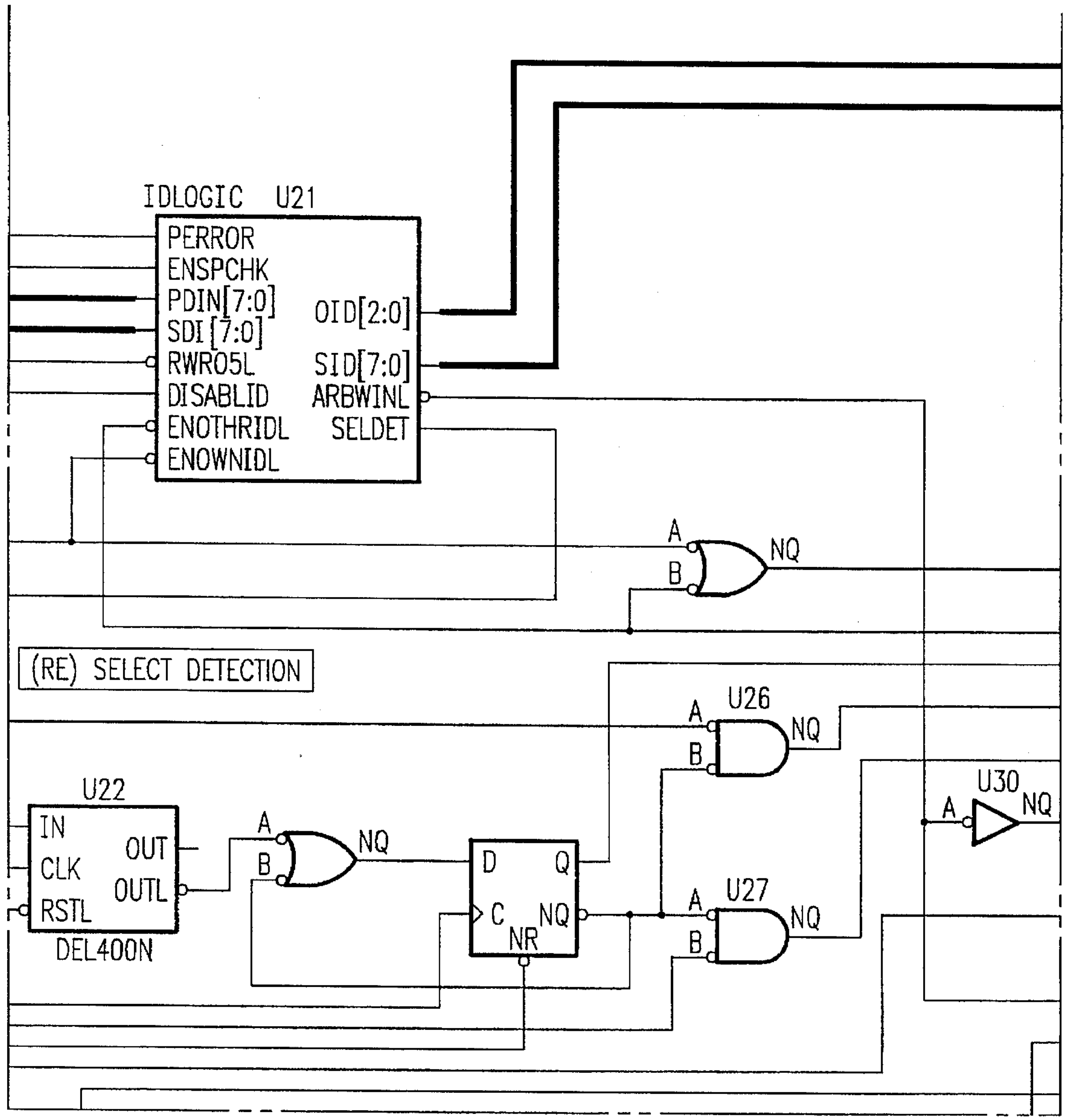
Figures 4, 138B:
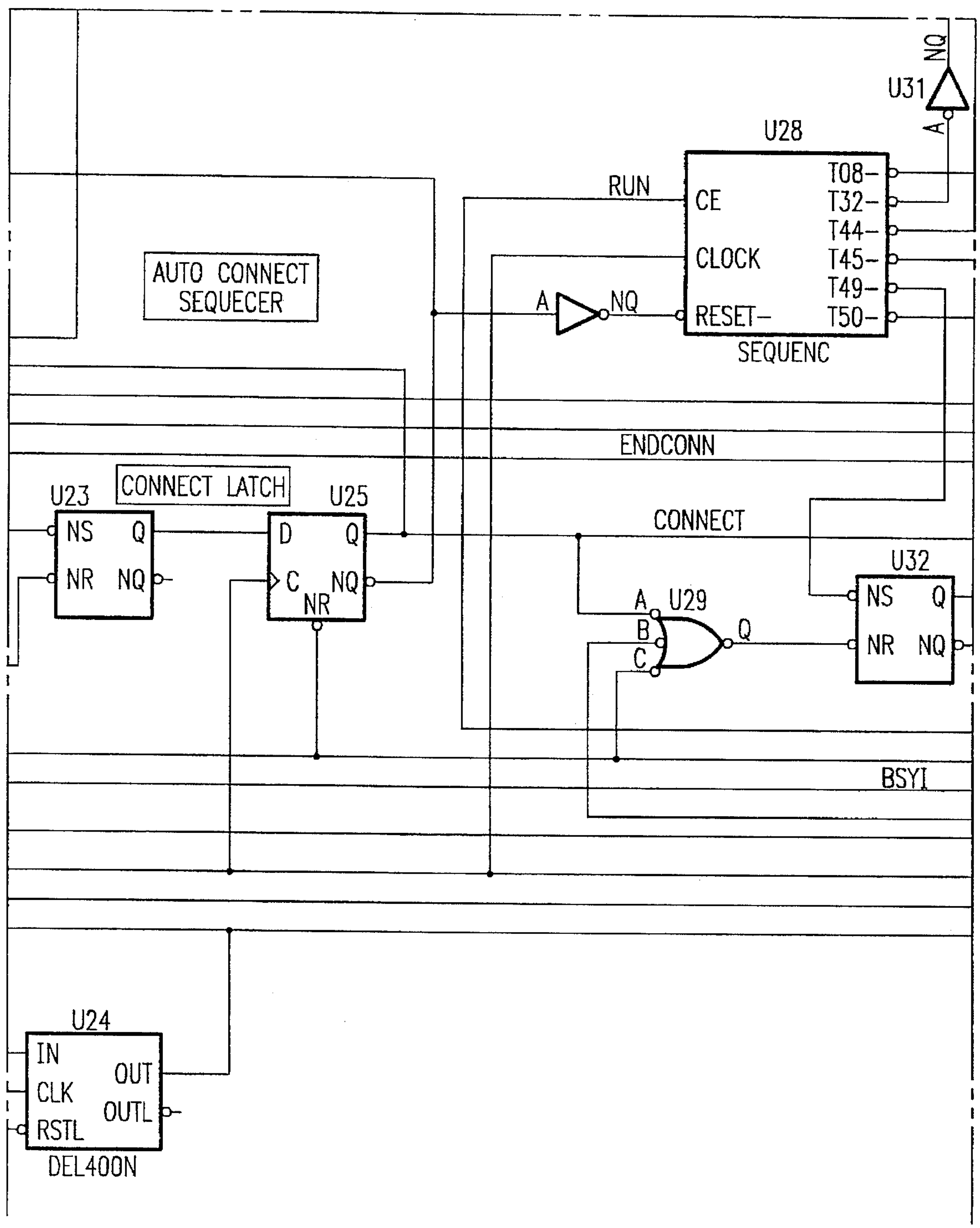
Figure 138C:
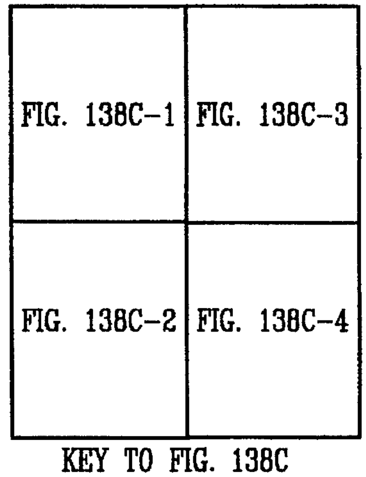
Figure 1:
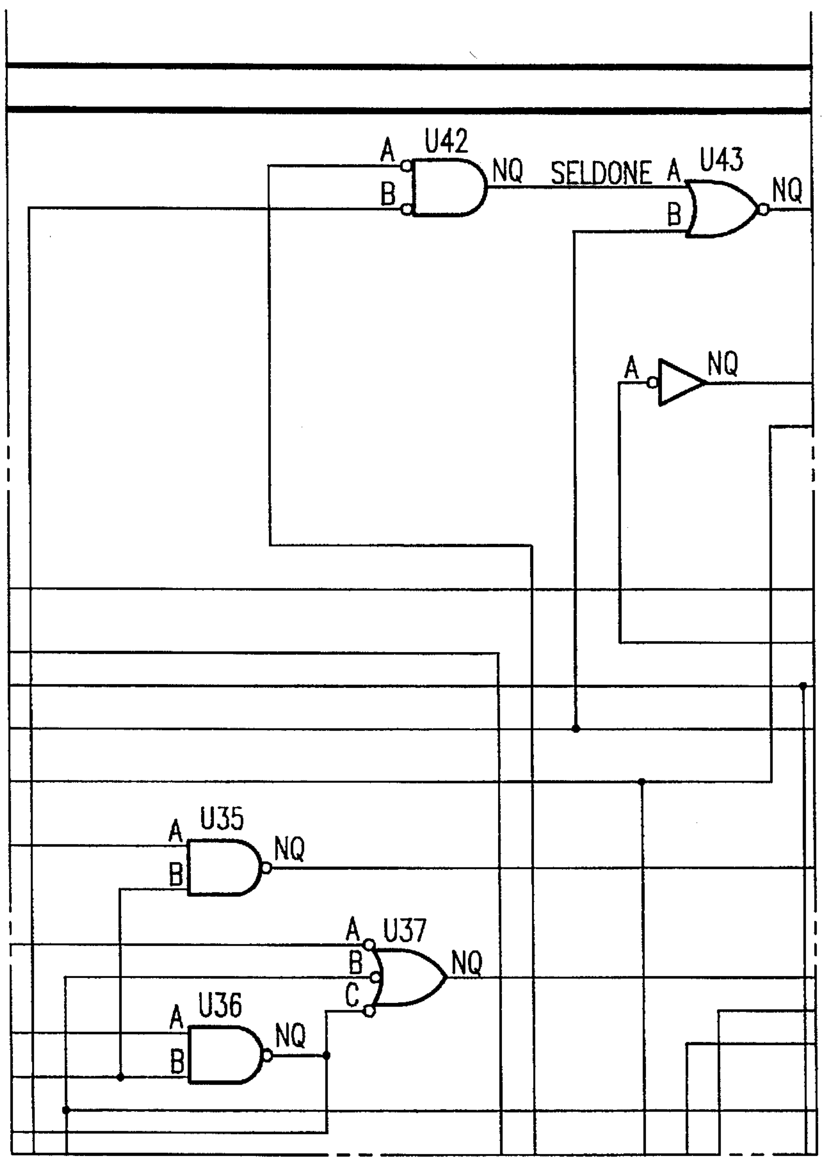
Figures 2, 138C:
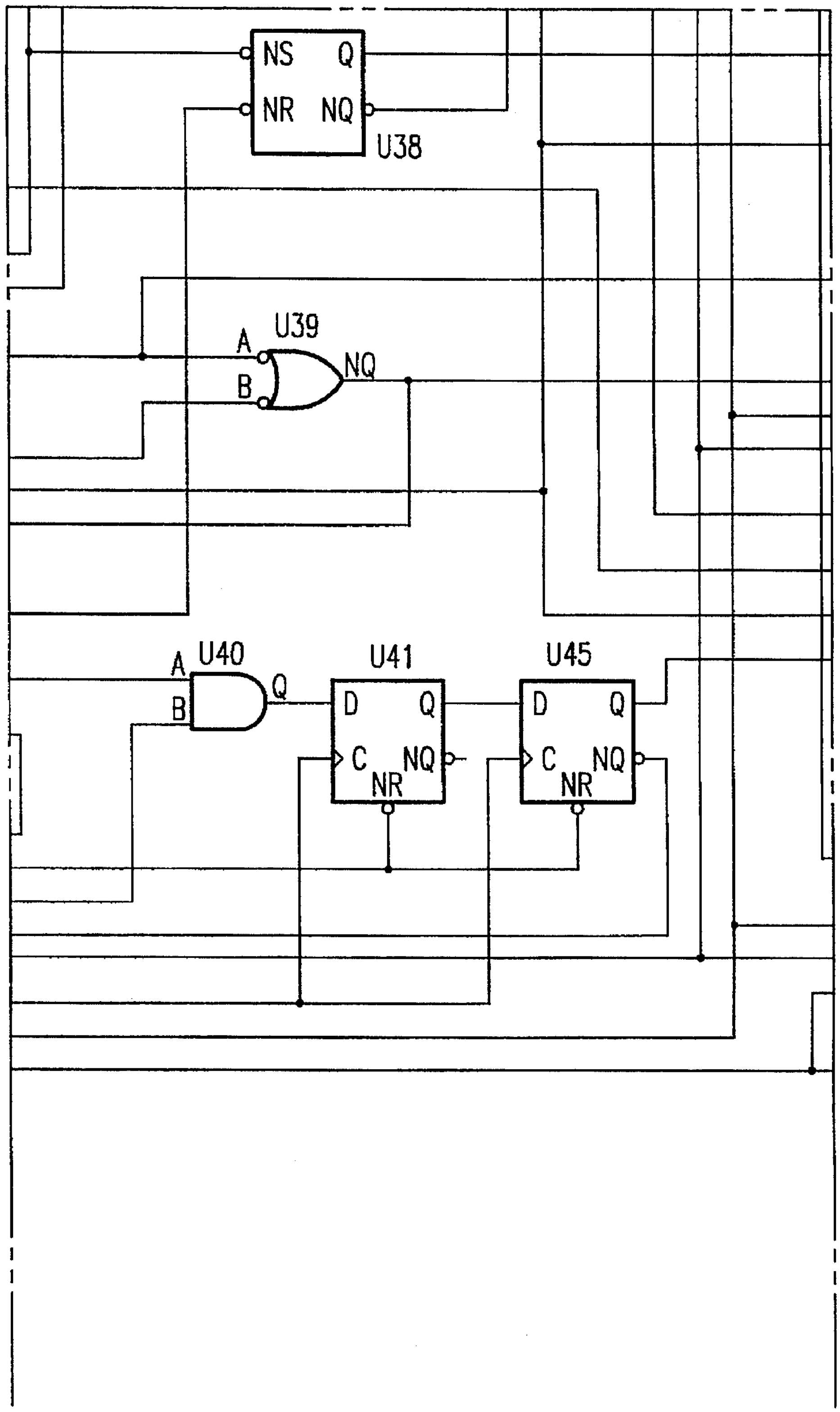
Figures 3, 138C:
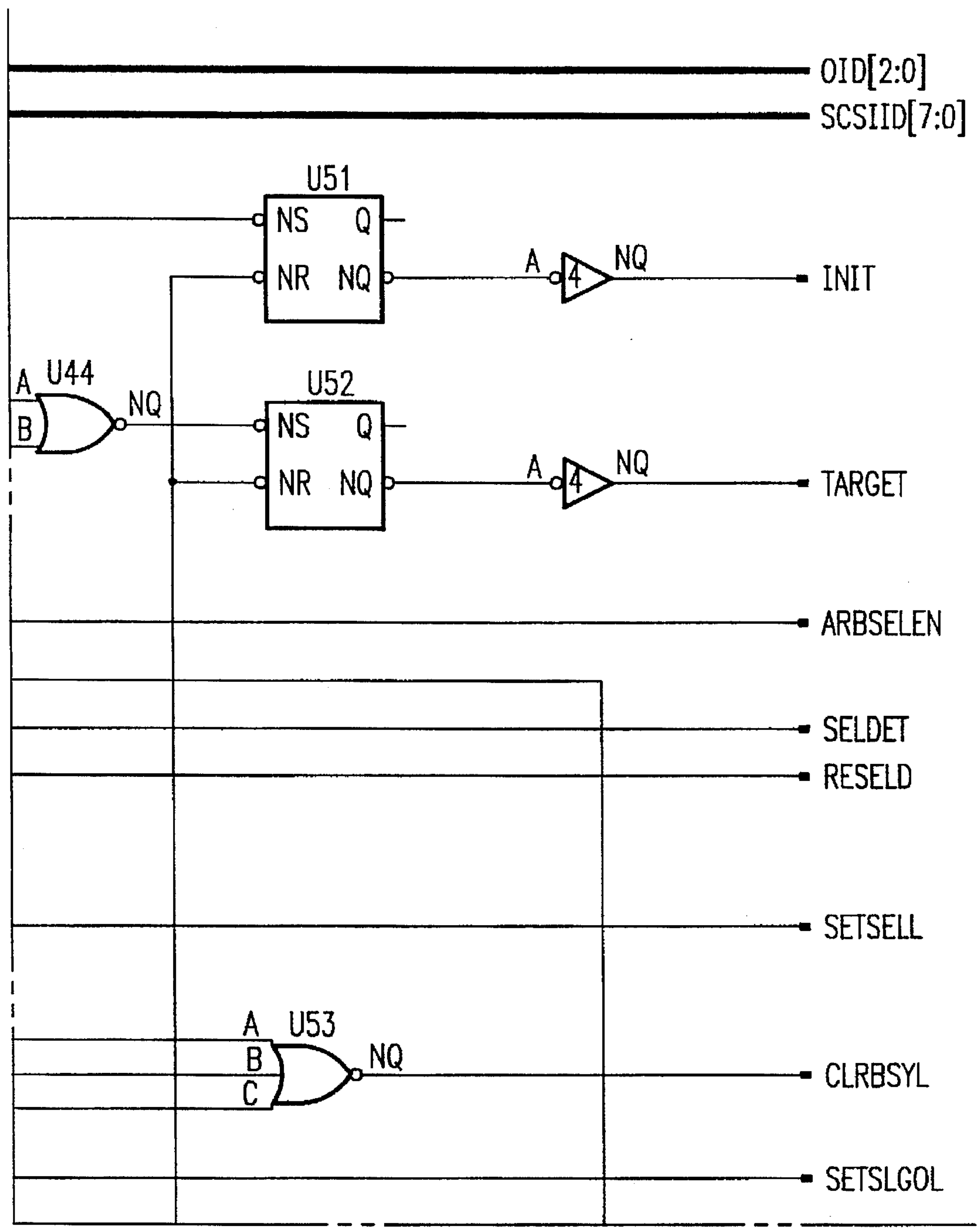
Figures 4, 138C:
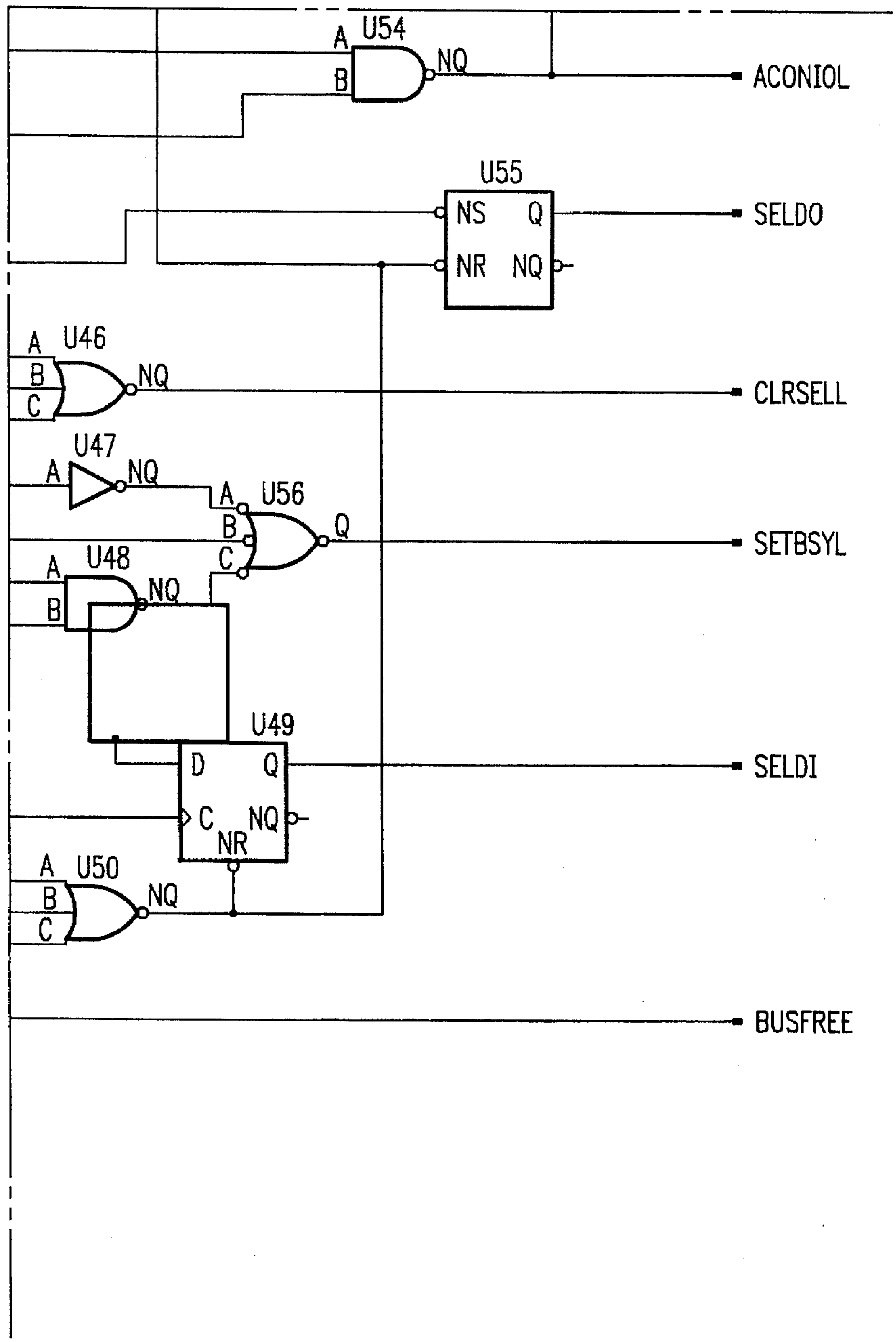
Figure 154A:
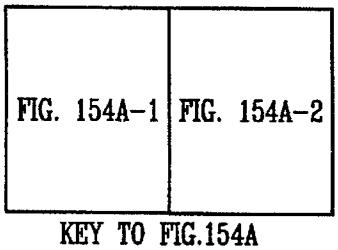
Figure 1:
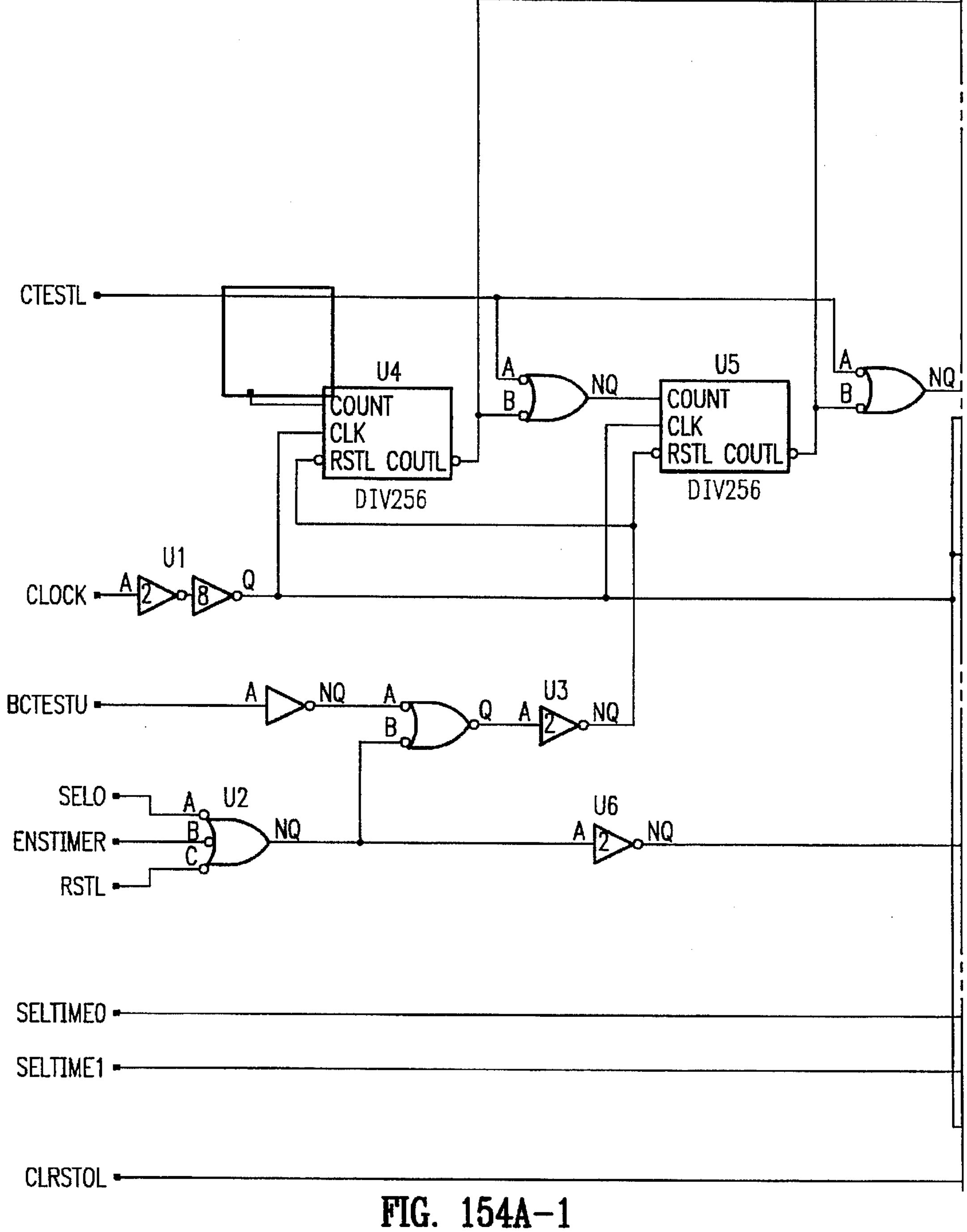
Figures 2, 154A:
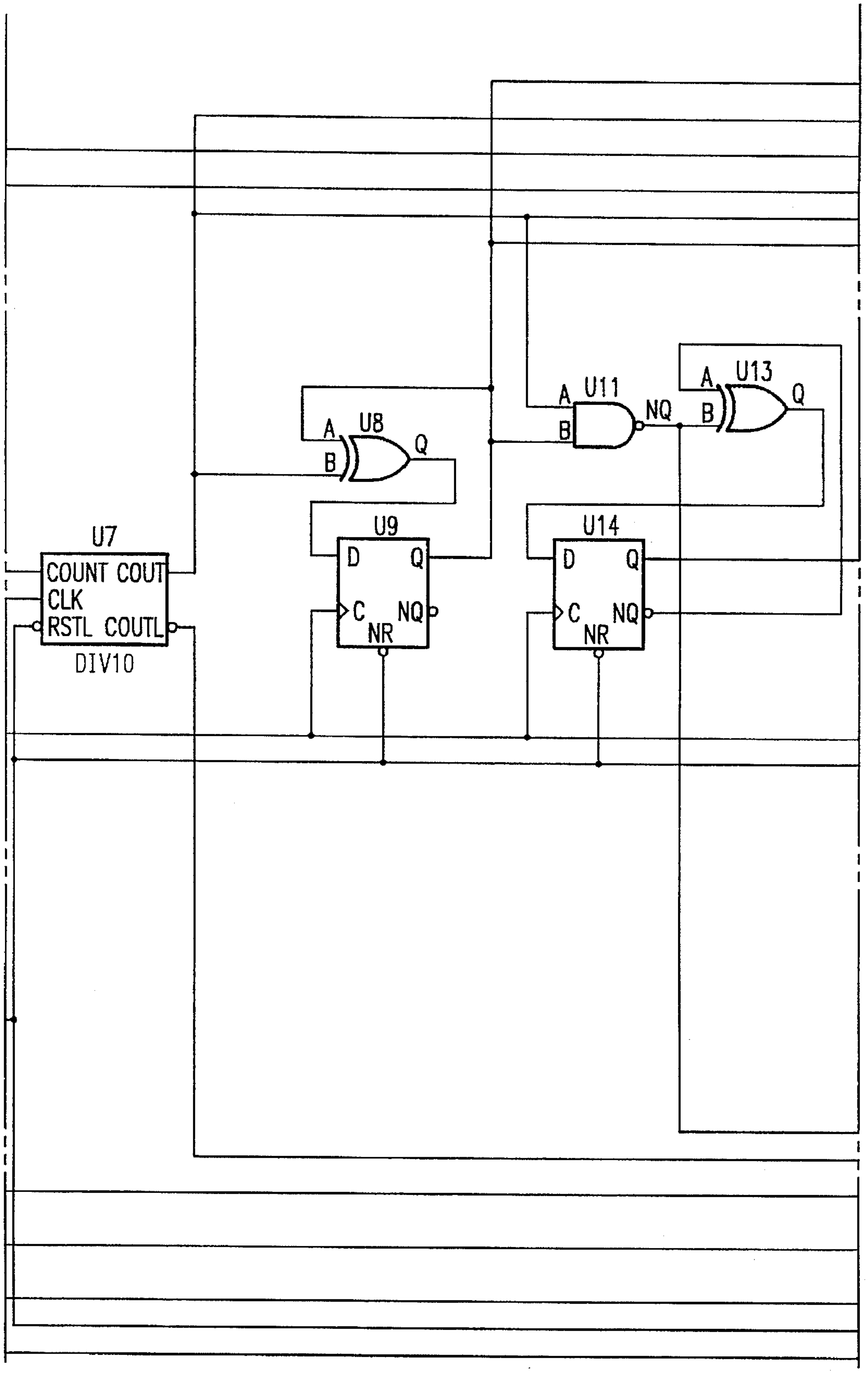
Figures 1, 154B:
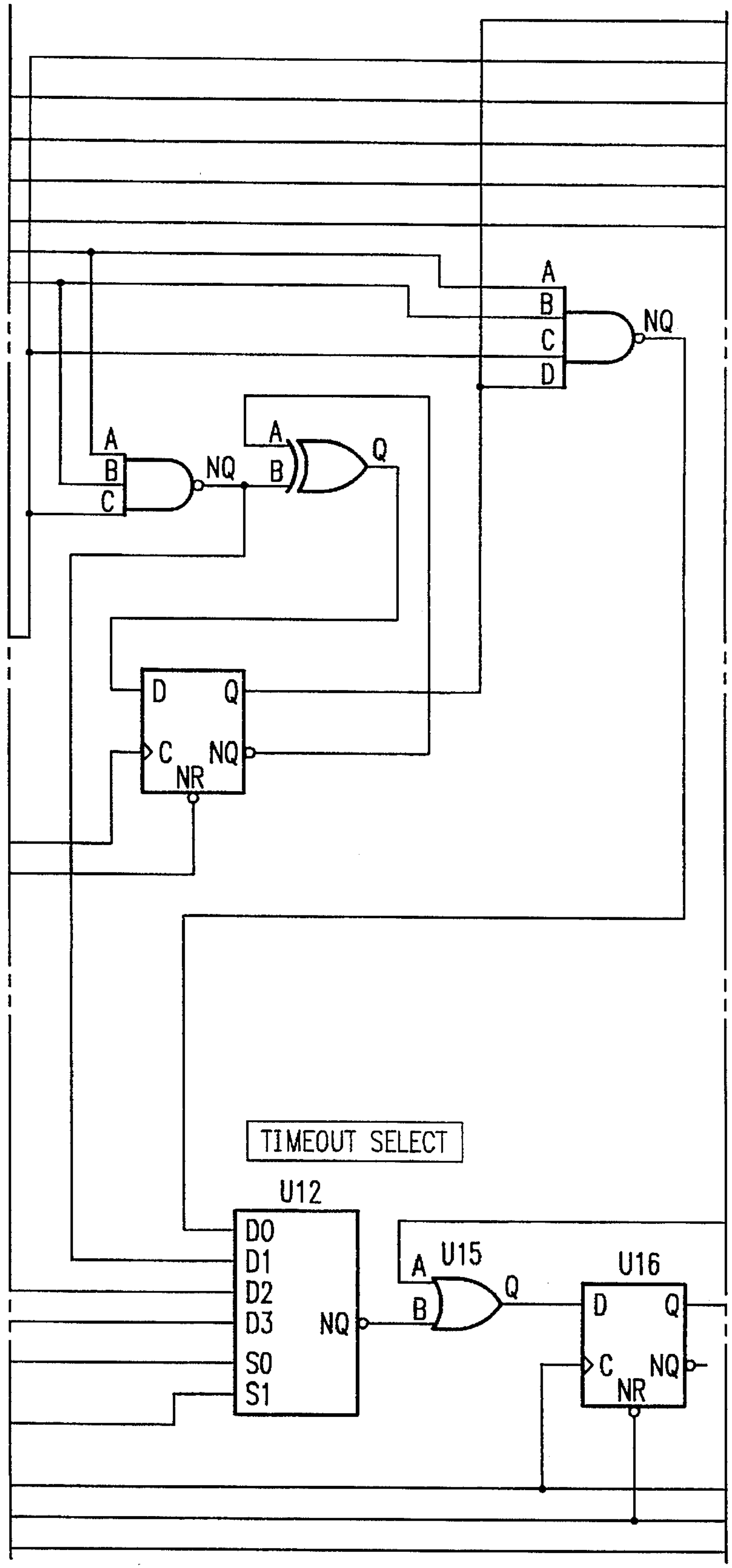
Figure 154B:
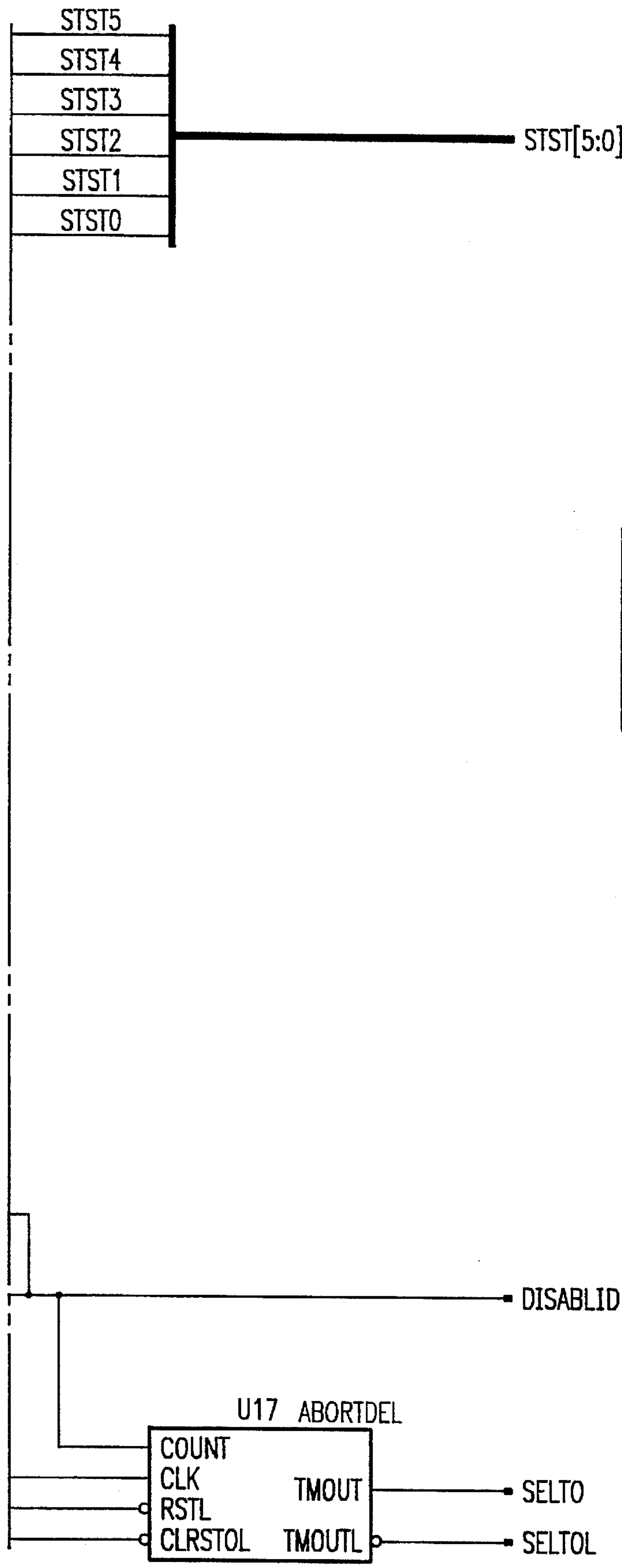
Figure 2:
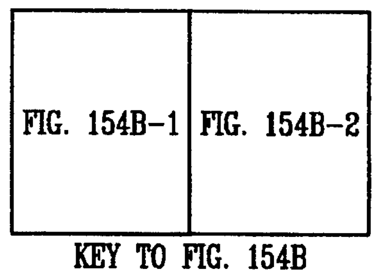

Interrupts SELDO, SELDI, SELINGO, and BUSFREE are generated by circuit AUTOCON illustrated in FIGS. 138A, 138B and 138C. Interrupts SWRAP, SDONE are generated by circuit STCOUNT illustrated in FIGS. 123A and 123B. Interrupt SPIORDY is generated by circuit PIOCTL illustrated in FIG. 131. Interrupts DMADONE, ATNTARG, and SCSIRST are generated by the portion of circuit SCSI illustrated in FIGS. 145A, 145B and 145C. Interrupt SCSIPERR is generated by circuit PARCHECK (FIG. 95). Interrupts PHASEMIS and PHASECHG are generated by circuit PHASECTL (FIG. 122). Interrupt SELTO is generated by circuit SELTIMER (FIGS. 154A and 154B). Interrupt REQINIT is generated by circuit SCSIINT1 (FIGS. 149A and 149B).

As previously described in general terms, Sparrow driver 302 and H/A integrated circuit 6260 automatically perform the SCSI selection out phase. Initially, Sparrow driver 302 programs H/A integrated circuit 6260. Sparrow driver 302 uses data in a ready SCB 303 to obtain the SCSI target ID/LUN (byte 2 of SCB 303) and sets the target ID and the H/A integrated circuit ID in register SCSIID (FIG. 8A). Next, Sparrow driver 302 configures register SCSIRATE (FIG. 8A) for the data transfer. The expected phase is set in register SCSISIG-write. All other controls in that register are set to 0. Bit CRLSTCNT in register SXFRCTL0 is set to clear the transfer counter and bit CLRCH1 is set to clear channel 1. In addition, either bit DMAEN or bit SCSIEN is set to indicate the data transfer mode specified in byte 3 of the SCB 303. If the SCSI transfer mode is selected and the mode is SCSI PIO, the channel selects and clears are not necessary. However, since the target may respond with an unexpected phase, e.g. phase MSGOUT is expected but DATAIN synchronous is received, the channel selects and clears are preferred.

Next register SCSISEQ (FIG. 8A) has bit ENSELO set to enable a selection out sequence. Optionally, enable auto attention out bit ENAUTOATNO in register SCSISEQ may be set so that a SCSI attention is asserted when the selection out sequence is executed. If bit ENAUTOATNO is set, the expected phase written in register SCSISIG write above should be a MSGOUT out phase although the target determines whether this phase sequence is in fact supported.

Bit ENSELD0, ENSELDI and ENSELINGO in register SIMODE0 (FIG. 8B) are also set. Specifically, interrupt SELINGO is enabled to signal the completion of a successful arbitration and an initiation of the selection phase. Status bit SELDO is set to 1 when either a selection out has successfully been completed if bit TEMODEO is cleared or a reselection out has successfully been completed if bit TEMODEO is set. Conversely, bit SELDI is set when the selection in phase has been processed. Bit TARGET is a one if H/A integrated circuit 6260 has been selected and is a zero if H/A integrated circuit 6260 has been reselected. An attempt to select out or reselect out may be preempted by a select in or reselect in. Thus, both interrupts are enabled. This completes the programming of the registers in H/A integrated circuit 6260 and Sparrow driver 302 returns control of microprocessor 221 to system 220. H/A integrated circuit 6260 first performs the arbitration phase and then the selection out phase while microprocessor 221 performs operations for user application 201.

SCSI Arbitration Phase

Figure 10:
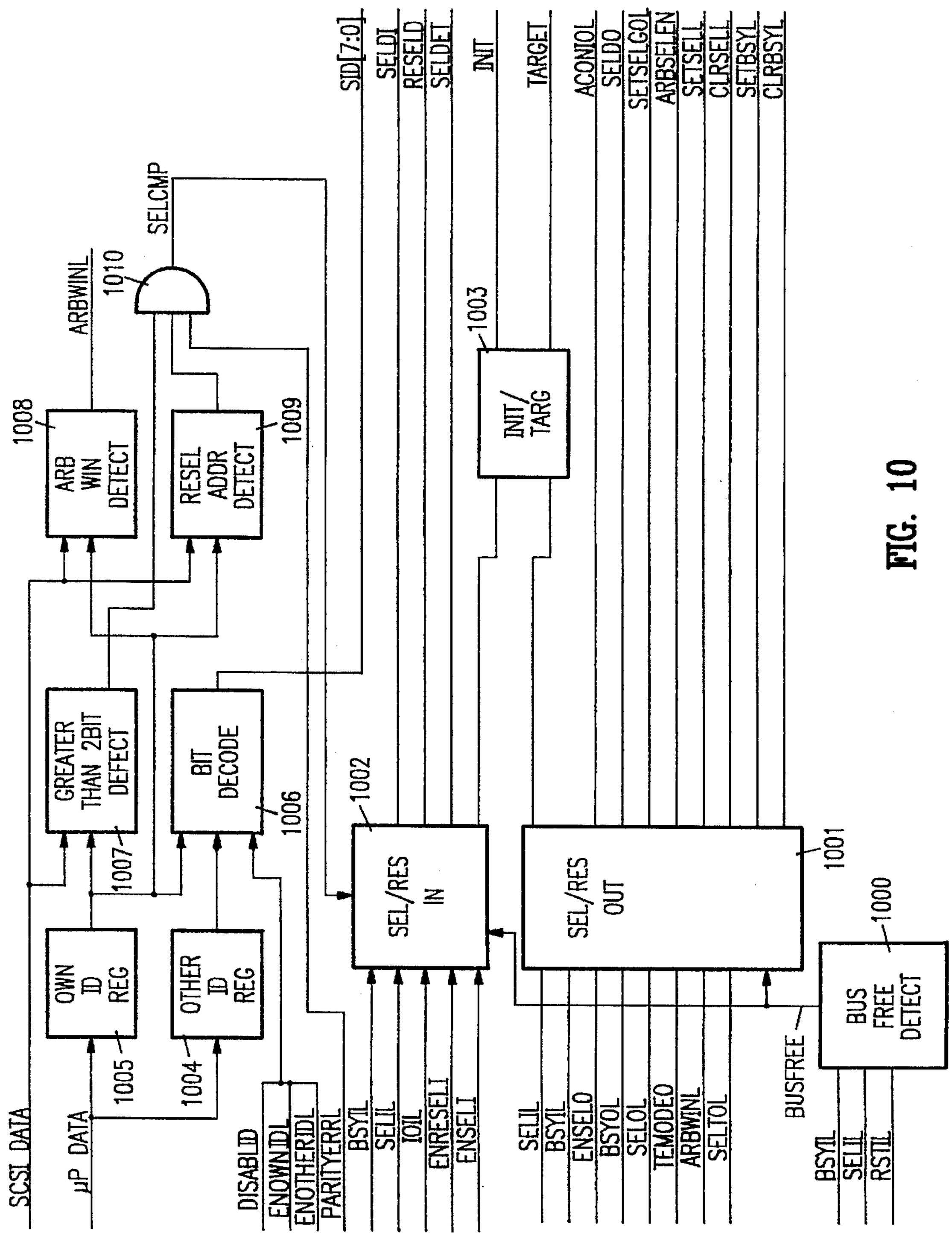
FIG. 10 is a diagram of the hardwired sequencers of this invention that automatically perform SCSI arbitration, select and reselect phases.

The subsequent operation of H/A integrated circuit 6260 is illustrated by the block diagram of FIG. 10. In FIG. 10, signal SELIL corresponds to the SCSI bus signal SEL. Signal BSYIL corresponds to the SCSI bus signal BSY. And signal IOIL corresponds to the SCSI bus signal I/O. A SCSI bus free occurs when the SCSI bus conditions of signals BSY and SEL are both false for 400 nanoseconds. Herein, reference to a line being driven means that the signal on the line is active or true. Also, a device ID refers to a unique bit significant ID assigned to every device on SCSI bus 110.

In response to setting bit ENSELO in register SCSISEQ (FIG. 8A), SCSI arbitration phase is started. This occurs independent of the state of bit TEMODEO in register SCSISEQ (FIG. 8A) which is used to indicate whether a selection or reselection is desired by Sparrow driver 302.

When bus free detect circuit 1000 (FIG. 10) detects that signals BSYIL and SELIL from SCSI bus 110 are both false for 400 nanoseconds, bus free detect hardware 1000 provides a bus free signal to selection/reselection out circuit 1001. When bit ENSEL0 is set so that the signal on line ENSEL0 is driven and a bus free signal is on line BUSFREE, the signal on line SETBSYL from selection/reselection out circuit 1001 goes true after 8 clock ticks which in turn causes a SCSI bus signal BSY on SCSI bus 110.

Signal BSY drives the signal on line BSYOL to select/reselect out hardware 1001 active. The active signal on line BSYOL in turn drives the signal on line ARBSELEN active. The signal on line ARBSELEN in combination with the signal on line ENOWNIDL to bit decode circuit 1006 causes circuit 1006 to drive on lines SID [7:0] H/A integrated circuit 6260 ID, i.e., bits OID in register SCSIID, from OWN ID register 1005. Arb-win detect logic 1008 processes data on the SCSI bus data lines. If H/A integrated circuit 6260 has the highest priority, Arb-win detect logic 1008 drives line ARBWINL active which in turn provides an active signal to selection/reselection out circuit 1001. After 32 clock ticks, the signal on line SETSELL goes high causing SCSI bus signal SEL to be driven on SCSI bus 110. Consequently, the signal on line ENOTHERID to bit decode circuit 1006 goes active causing circuit 1006 to drive on SCSI bus 110 the data in other device ID register 1004, i.e., the ID in bits TIO of register SCSIID (FIG. 8A).

If, after 32 clock ticks, circuit 6260 does not have the highest priority, or alternatively SCSI bus select signal SEL is driven by another device, i.e., the signal on line SELIL goes active, the signal on line CLRBSYL goes active causing SCSI bus busy signal BSY to be released. The signal on line ENOWNIDL goes inactive with the signal on line ARBSELEN causing the ID bit to be released. If circuit 6260 drives the SCSI bus select signal SEL, i.e., the signal on line SELOL is active, circuit 6260 has control of the SCSI bus and proceeds to Selection out or Reselection out depending on the state of bit TEMODEO in register SCSISEQ.

SCSI Selection Out Phase

Since selection out as an initiator is being considered, bit TEMODEO in register SCSISEQ is cleared and so integrated circuit 6260 attempts a selection as an initiator after the SCSI arbitration phase. After 44 clock cycles, the signal on line INIT is driven active by init/targ hardware 1003. The active signal on line INIT is used to enable only certain parts of integrated circuit 6260 in the initiator mode. After line SEL is driven active by the active signal on line SELOL, the signal on line ENOTHERID goes active and the ID of the target device is driven on SCSI bus 110, as detailed above. After 45 clock ticks, the signal on line CLRBSYL goes active causing H/A integrated circuit 6260 to release the SCSI bus busy signal BSY which in turn signals the start of the SCSI selection phase.

Next, the signal on line SETSELGOL goes active causing bit SELINGO in register SSTAT0 to be driven active to indicate that the selection phase has started. After 49 clock ticks, logic is enabled in hardware 1001 to look for an active signal on line BSYIL while SCSI bus select signal SEL stays active. The target device drives SCSI bus signal busy BSY upon matching the target device ID on SCSI bus 110 with its own ID when SCSI bus select signal SEL is active. The signal on line BSYIL going active causes bit SELDO in register SSTAT0 to go active after three clock ticks to indicate that the selection phase has been completed.

The signal on line CLRSELL goes active one clock tick later which releases the SCSI bus select signal SEL. Then, the signals on lines ENOWNID and ENOTHERID go inactive to release the IDs from the SCSI bus and at this time SCSI bus 110 is under control of the target.

However, returning to FIG. 9, when the signal SELDO is set in register SSTAT0, an active signal is also supplied to AND gate 902. Since bit ENSELDO was set in register SIMODE0, the output signal of AND gate 902 goes high. Consequently, the output signal from OR gate 903 goes high. The high output from OR gate 903 drives bit INSTAT in register DMASTAT high. Also, as previously explained, after programming H/A integrated circuit 6260 and prior to returning control to SCSI manager 301, bit INTEN in register DMACNTRL0 was set. Thus, the high output signal from OR gate 903 and the setting of bit INTEN drives AND gate 904 active so that a system hardware interrupt signal is generated on line IRQ.

Thus, Sparrow driver 302 is called and determines that bit SELDO in register SSTAT0 is set so that a target has been selected and Sparrow driver 302 may continue with an information transfer as described more completely below.

Figures 11A, 11B:
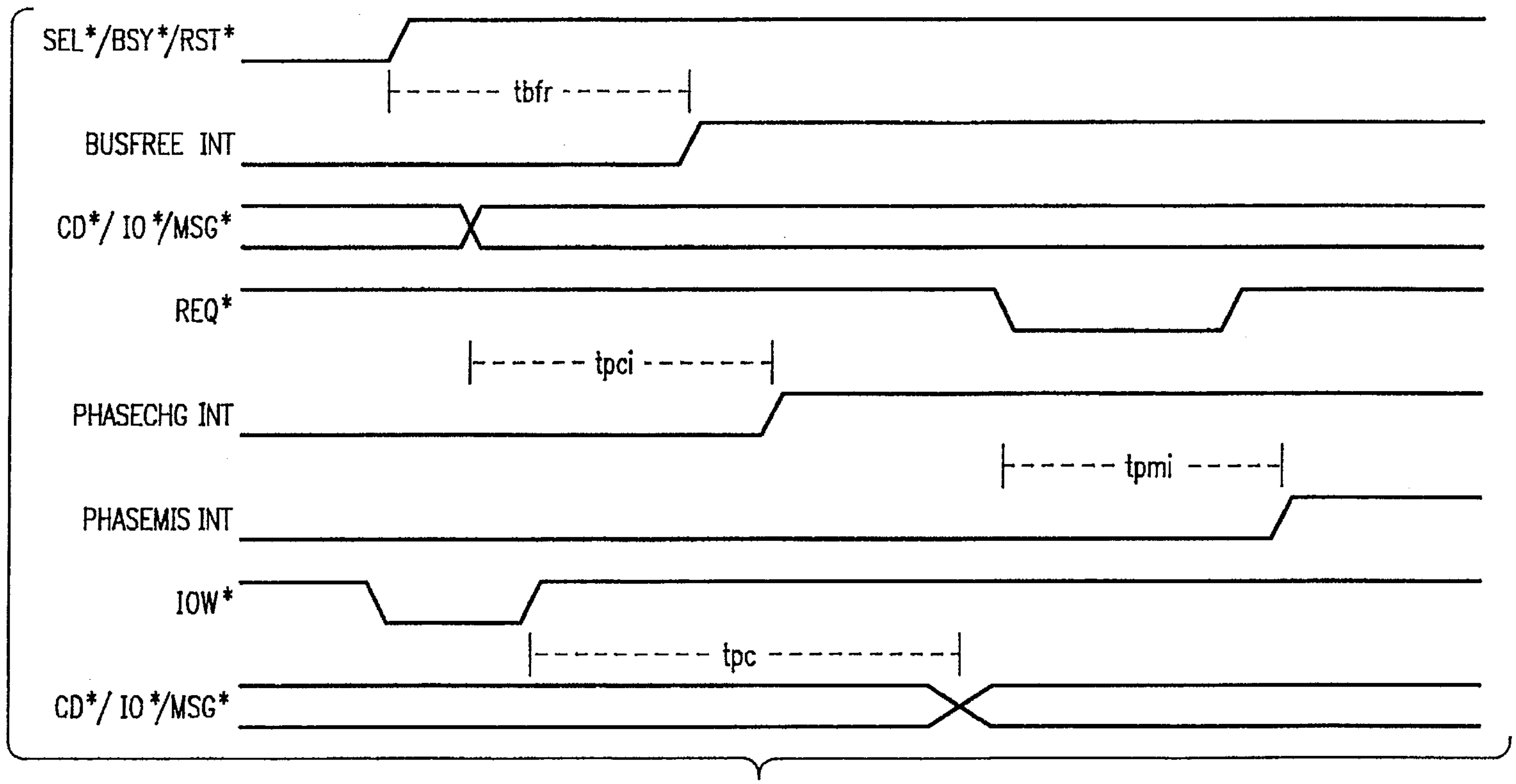
FIGS. 11A and lib are a timing diagram for bus free detection and phase change interrupts for the integrated circuit of this invention.

FIG. 11A illustrates the timing of bus free detection and the timing phase change interrupts in response to signals on SCSI bus 110. Labels such as "SEL*", "BSY*", and "RST*" are SCSI bus signals and appear on the corresponding pin of circuit 6260 (FIG. 5). "Busfree Int" is the signal described above from bus free detect circuit 1000. FIG. 11B defines the preferred maximum values in nanoseconds of the times in FIG. 11A.

Figures 12A, 12B:
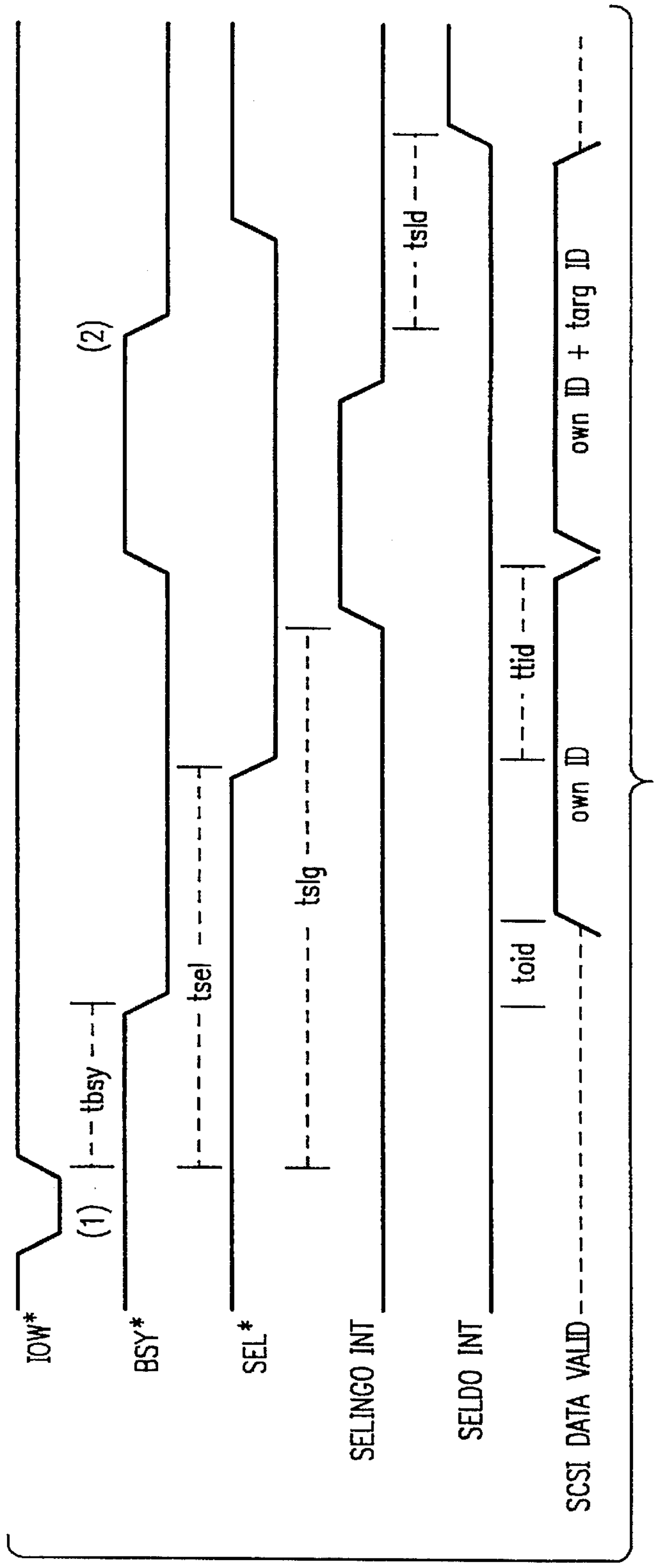
FIGS. 12A and 12B are a timing diagram for SCSI arbitration/selection for the integrated circuit of this invention.

FIGS. 12A and 12B illustrate the timing of the arbitration and selection phases. Again, the times in FIGS. 12A and 12B are in nanoseconds.

SCSI Reselection In Phase

To perform a reselection in, the ID for H/A integrated circuit 6260 is placed in register SCSIID by Sparrow driver 302. Bit ENRESELI in register SCSISEQ is set to enable reselection in. Optionally, bit ENAUTOATNI is set to enable generation of signal ATN upon reselection. After programming H/A integrated circuit 6260, Sparrow driver 302 returns control of microprocessor 221 to system 220 while H/A integrated circuit 6260 performs the reselection in phase.

H/A integrated circuit 6260 is enabled to initiate reselection when bit ENRESELI in register SCSISEQ is set. Hence, H/A integrated circuit 6260 compares the signals on the SCSI data bus 110 against the ID of circuit 6260 as written in bits OID in register SCSIID using reselect address detect circuit 1009. When the comparison is true AND gate 1010 drives the signal on line SELCMP to Selection/Reselection in hardware 1002 active. When the signals on lines SELIL, IOIL and SELCMP are all true and the signal on line BSYIL is false, after a delay of eight clock ticks, selection/reselection in circuit 1002 drives the signal on line SELDI active which in turn sets bit SELDI in register SSTAT0 with bit TARGET in register SSTAT0 cleared. The active signal on line SELDET latches the IDs which are on SCSI bus 110. As explained above, when bit SELDI is set, a system hardware interrupt is sent on line IRQ to microprocessor 221.

Sparrow driver 302 waits for the status bit SELDI to be set to 1 with bit TARGET set to 0. (If SELDI is set to 1 and bit TARGET is set to 1, H/A integrated circuit 6260 has been selected by an initiator.) Upon setting of bit SELDI, control of microprocessor 221 is returned to Sparrow driver 302 and Sparrow driver 302 determines which target is reselecting the host and loads appropriate information in register SCSIRATE. The expected phase is set in register SCSISIG. Sparrow driver 302 continues with an information transfer as described more completely below.

SCSI Selection In Phase

To execute an automatic selection in, Sparrow driver 302 sets bits OID in register SCSIID to the ID of H/A integrated circuits 6260. Next, Sparrow driver sets bit ENSELI in register SCSISEQ to enable the selection in. Optionally, bit ENATNTARG is also set to enable an interrupt on assertion of signal ATN by the initiator. Sparrow driver 302 waits for status bit SELDI to be set to one with bit TARGET set to 1. (If bit TARGET is 0 and bit SELDI is 1, H/A integrated circuit has been reselected by a target.) While Sparrow driver 302 waits, microprocessor 221 performs other tasks for system 220.

H/A integrated circuit 6260 is programmed for selection as a target when bit ENSELI in register SCSISEQ is set. Upon setting of bit ENSELI, signals on SCSI data bus 110 are compared against the ID of H/A integrated circuit 6260 as written in bits OID of register SCSIID. Specifically, the signals on line SCSIDATA and the signals from Own ID Register 1005 are compared by circuit 1009 and if they are the same, the signal on line SELCMP is driven active. When the address on the SCSI bus 110 matches the OID address, and the signal on line SELIL is true, the signal on line IOIL is false and line BSYIL false, after a delay of eight clock ticks, selection/reselection in hardware 1002 drives the signal on line SELDI active which in turn sets bit SELDI in register SSTAT0. Bit TARGET in register SSTAT0 is also set by init/targ circuit 1003. In addition, the signal on line SELDET goes true and latches the IDs which are on the SCSI bus.

When bit SELDI is set to one, a system hardware interrupt is generated by H/A integrated circuit 6260 and microprocessor 221 is returned to the control of Sparrow driver 302. When Sparrow driver 302 detects that bit SELDI is set with bit TARGET equal to one, Sparrow driver 302 determines which initiator is selecting H/A integrated circuit 6260 by examining register SELID. When the initiator is determined, the appropriate information is loaded in register SCSIRATE. Sparrow driver 302 continues with an information transfer as described more completely below.

SCSI Reselection Out Phase

The final sequence performed automatically by circuit 6260 after programming by Sparrow driver 302 is reselection out as a target. For a reselection out, registers SCSIID and SCSIRATE are set up with the appropriate values for the reselection by Sparrow driver 302. The phase that is to be entered after reselection is set in register SCSIG-write. Bits SEL0, BSY0, REQ0, ACK0 and ATN0 are set to 0. Bits ENSELO and TEMODEO in register SCSISEQ are set to 1 to enable the reselection out process. Bit ENSELDO is set to enable interrupt SELDO. Bits ENAUTOATNO and ENAUTOATNP are set to 0. Sparrow driver 302 returns control of microprocessor 221 to computer system 220.

When bit TEMODEO in register SCSISEQ is set, H/A integrated circuit 6260 attempts a reselection as a target after arbitration. After 44 clock cycles, the signal on line ACONIOL from hardware 1001 goes active and drives the SCSI bus IO signal IO. In addition, the signal on line ENOTHERID also goes active and the ID of the device being reselected, i.e., the other ID, is driven on SCSI bus 110 by circuit 1006. The signal on line TARGET from init/targ circuit 1003 is also set to indicate target mode operation. After 45 clock ticks, the signal on line CLRBSYL goes active causing H/A integrated circuit 6260 to release SCSI busy signal BSY, which signals the start of the reselection phase. The signal on line SETSELGOL goes active causing bit SELINGO in register SSTAT0 to be set which indicates that the selection phase has started.

At this point, sequencer 1001 waits for the signal on line BSYIL to go active. The initiating device drives signal BSY active by matching the initiator's ID while the signals on lines SEL and I/O are active. Three clock ticks after this match, bit SELDO in register SSTAT0 goes active and the signals on lines SETBSYL and CLRSELL go active causing H/A integrated circuit 6260 to drive SCSI busy signal BSY and release SCSI select signal SEL. The initiator detects the signal on line SEL as false and releases signal BSY. Since bit ENSELDO was set, when bit SELDO goes active, a system hardware interrupt is sent to microprocessor 221. The reselection is now complete.

When microprocessor 221 receives the hardware interrupt, control of microprocessor 221 is returned to Sparrow driver 302, as previously described. Sparrow driver 302 waits for either the SELINGO or SELDO status in register STAT0 to be set or alternatively monitors the status of bit SELTO in register SSTAT1 if the hardware selection timeout is enabled. Upon sensing that bit SELDO is set, register SXFRCLT1 is set to enable the desired transfer options. Register STCNT is loaded with the transfer count. Register SXFRCTL0 is set to a enable SCSI transfer. The proper channel for the transfer is selected and cleared. If the SCSI transfer mode is SCSI PIO, the channel selects and clears are not necessary. The data transfer proceeds as described more completely below.

Figure 139A:
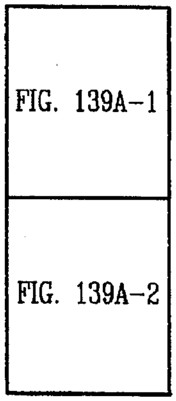
FIGS. 139A, 139B and 139C illustrate corcuit IDLOGIC that includes own ID latch circuit, own ID decode circuit, other ID latch circuit, other ID decode circuit, SCSI ID gates, select address detect, greater than two ID bit detect, and arbitration win detector.
Figure 1:
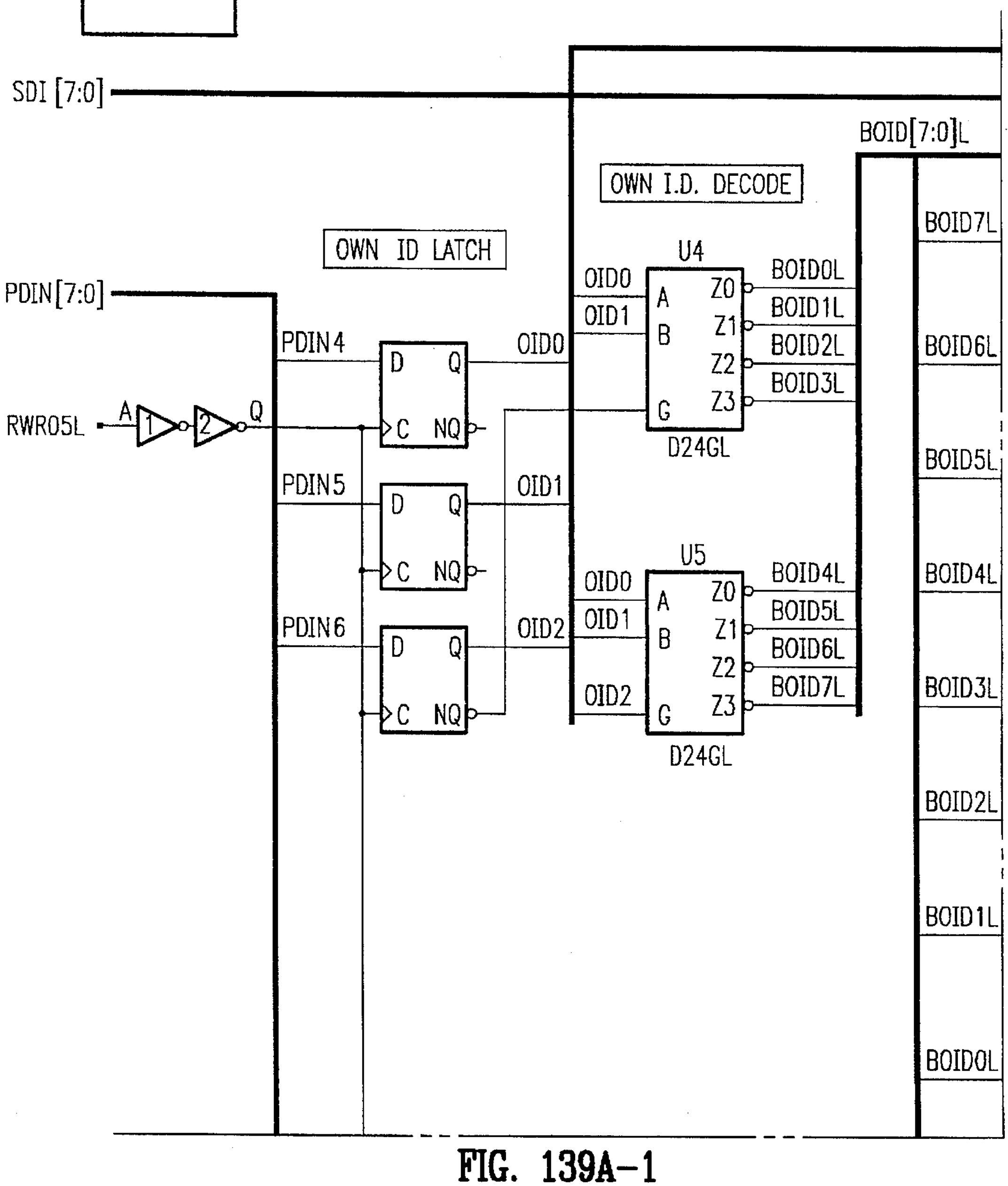
Figures 2, 139A:
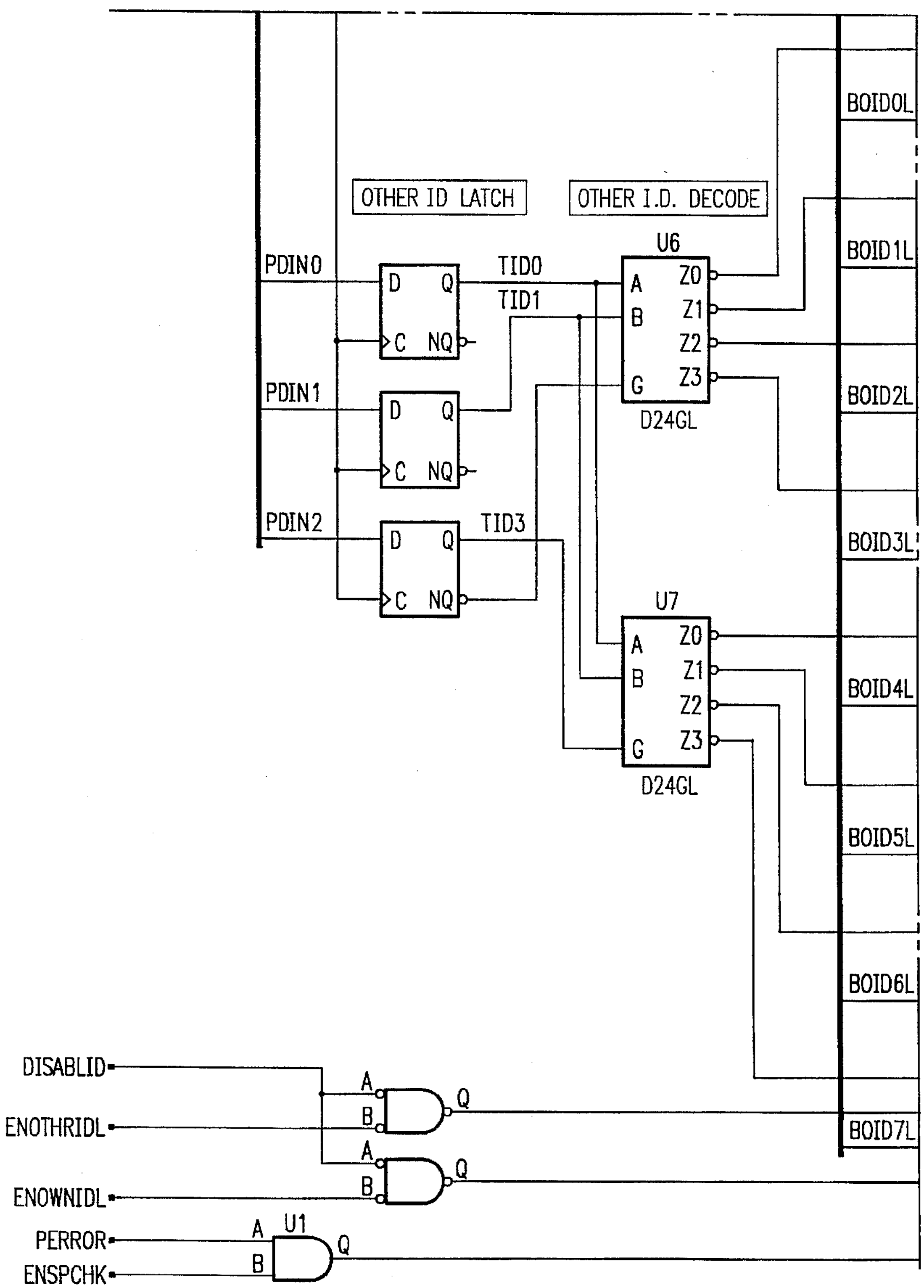
Figure 139B:
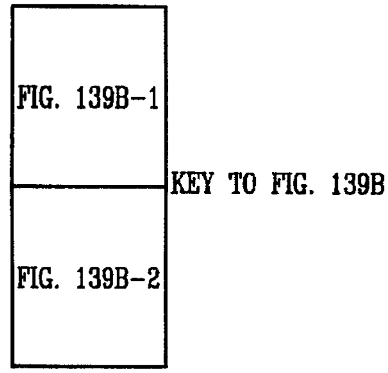
Figure 1:
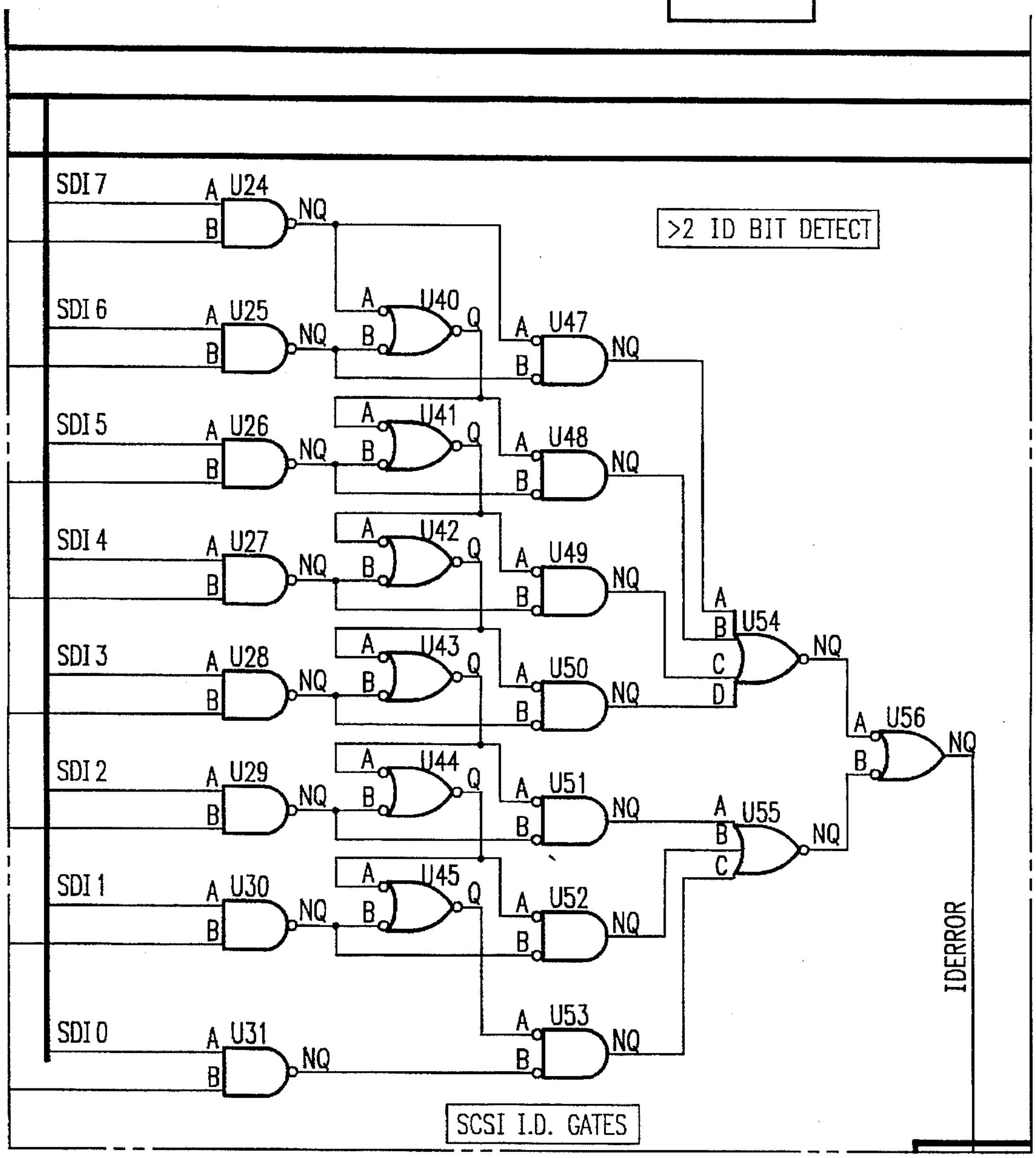
Figures 2, 139B:
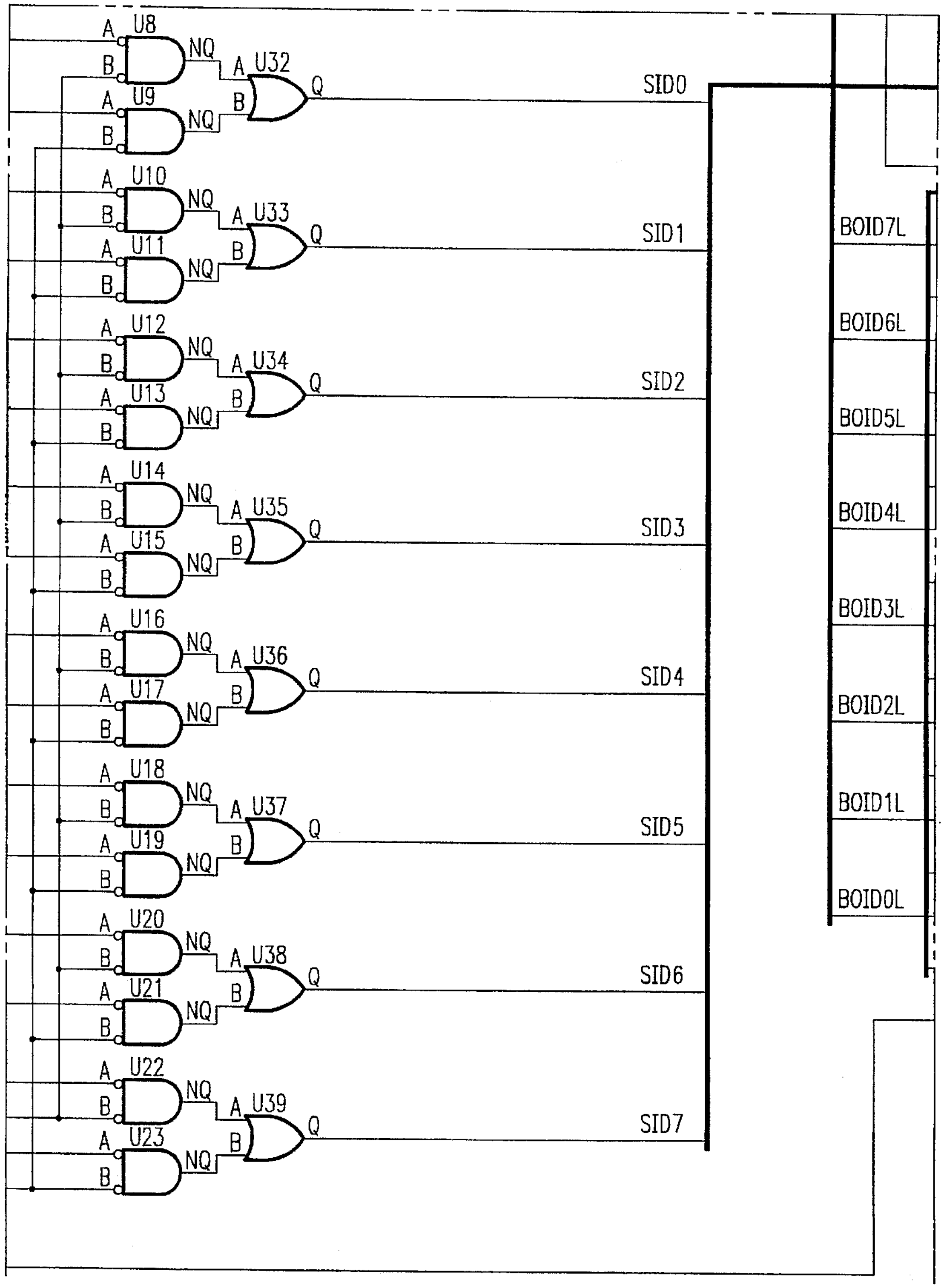
Figure 140A:
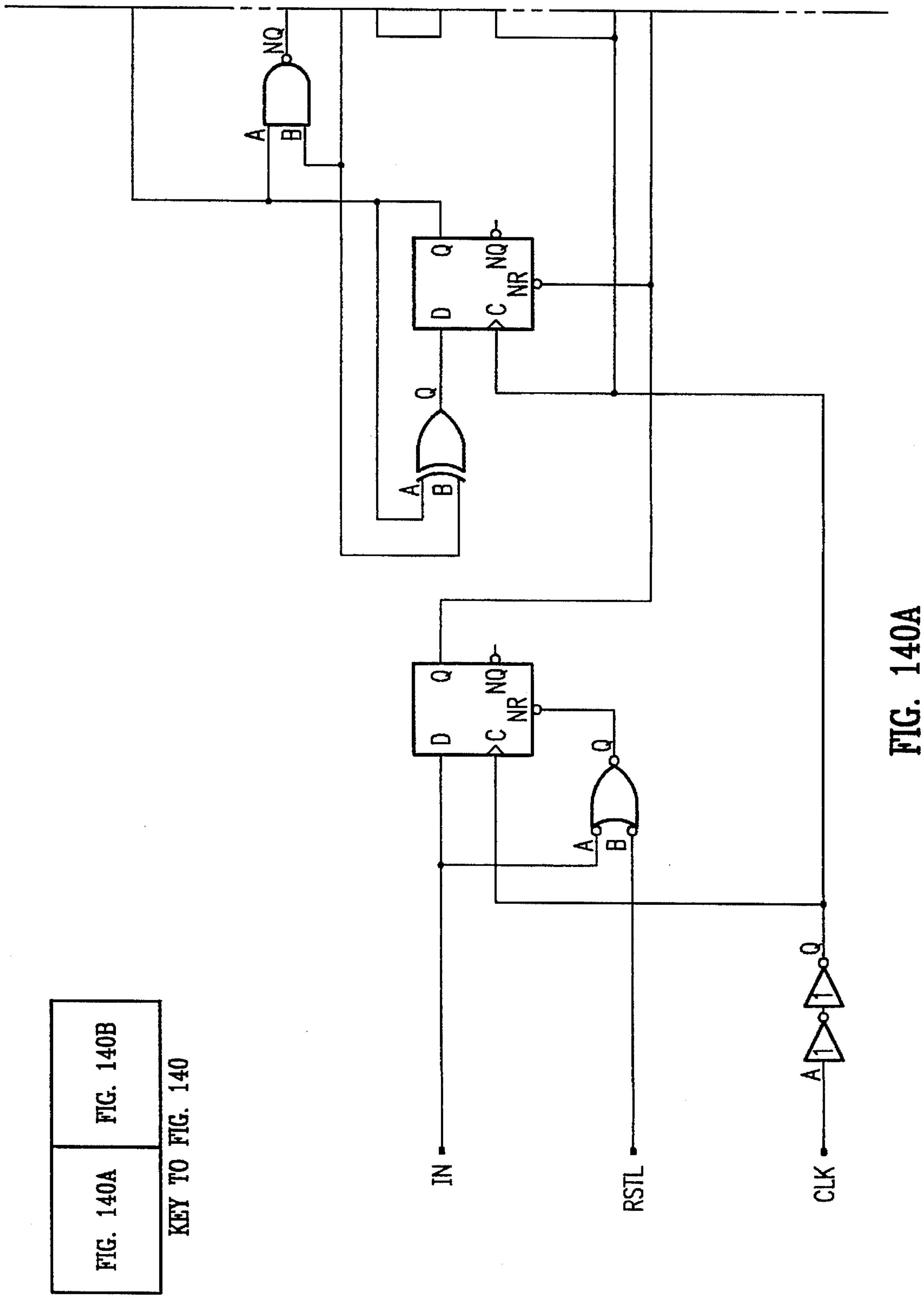
FIG. 140 illustrates circuit DEL400N.
Figure 140B:
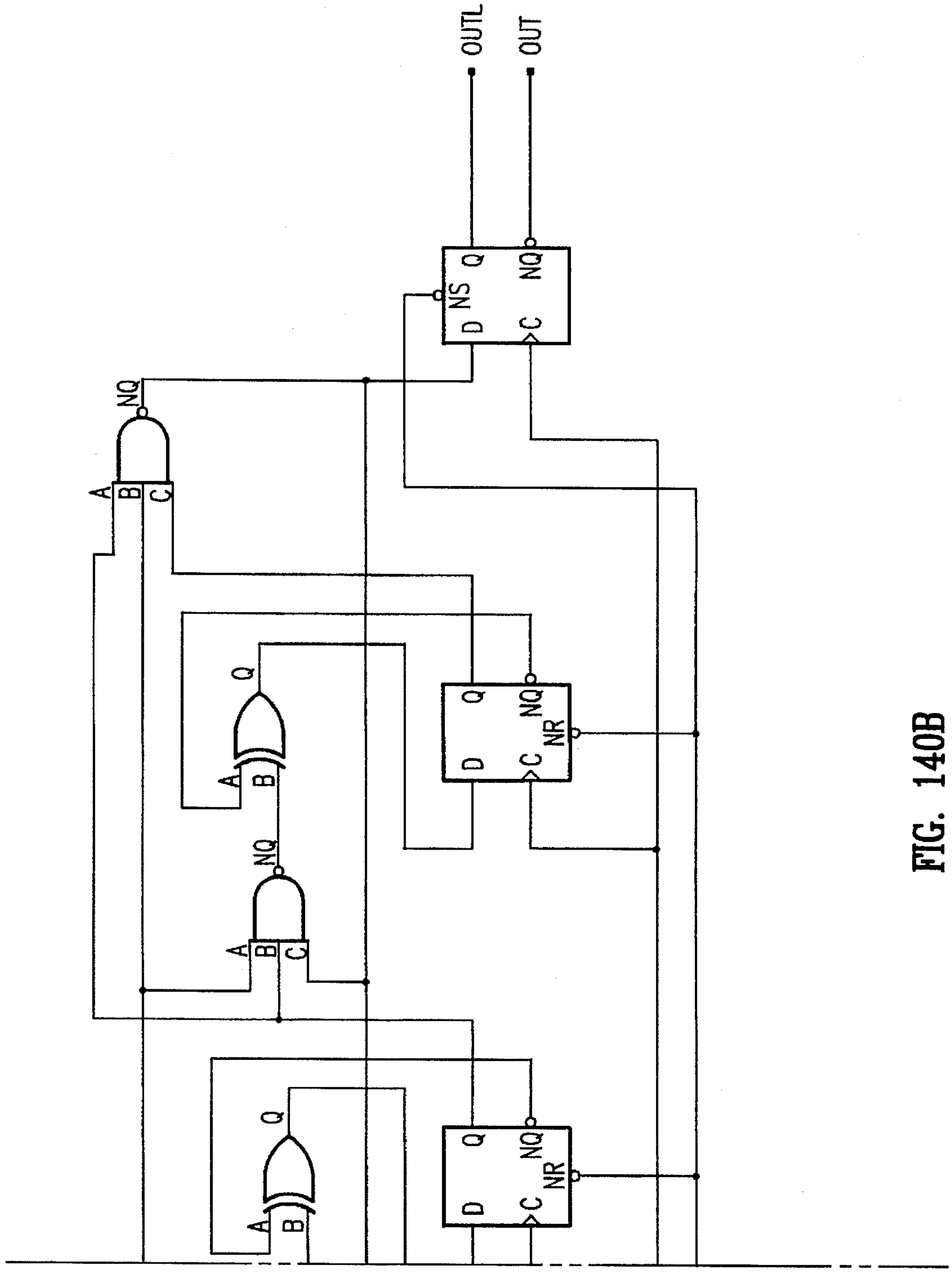
Figure 141A:
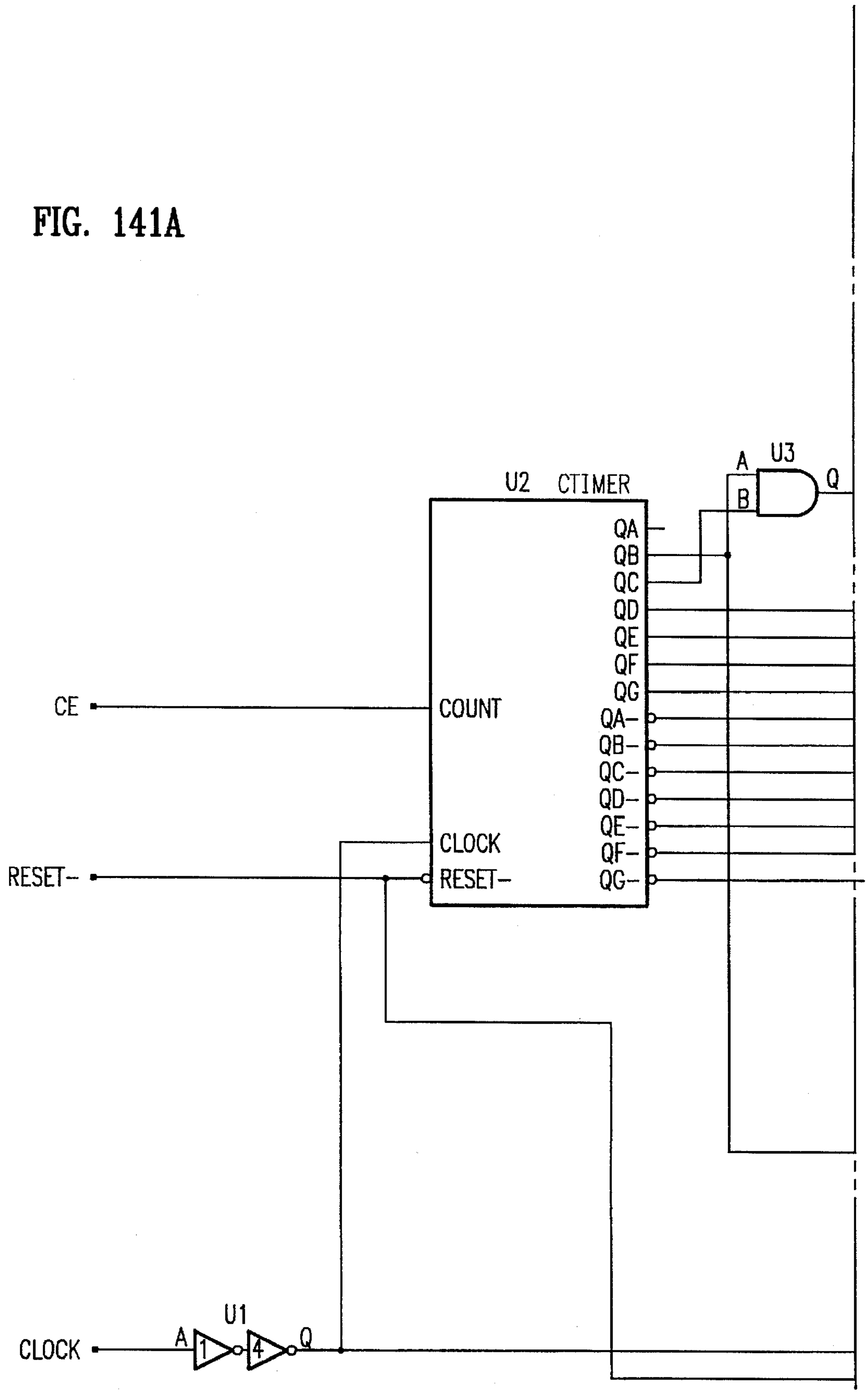
FIGS. 141A and 141B illustrate circuit SEQUENCE and includes circuit CTIMER. 142A and 142B illustrate circuit CTIMER.
Figure 141B:
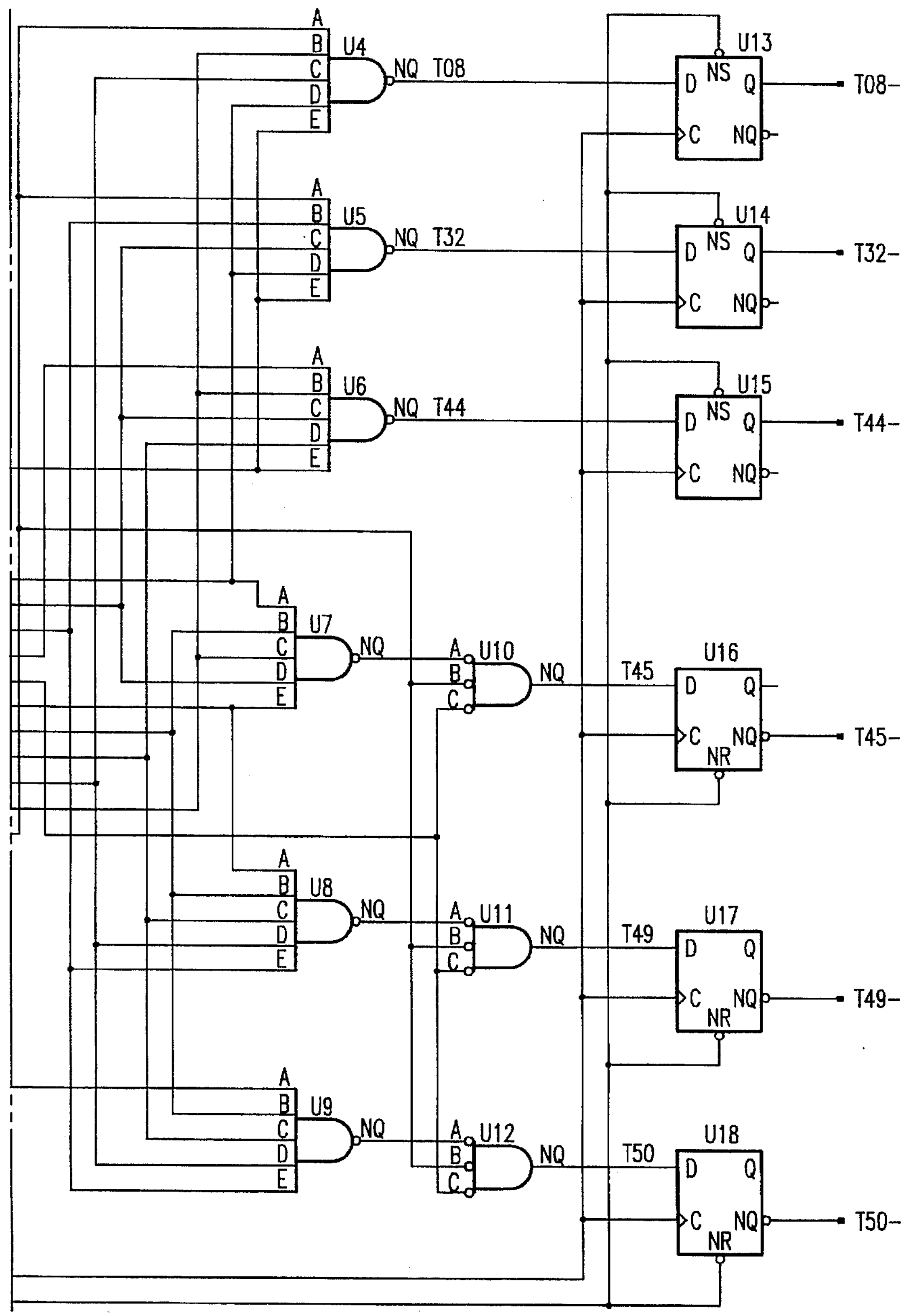

Circuit 1000 is shown in more detail in FIG. 138A and 138B and includes components U1, U2, U3, U19 as well as circuit DEL4DON (FIG. 140). Circuit 1001 is also shown in more detail in FIGS. 138B and 138C and includes components U7, U8, U9, U13, U17, U18, U29, U30, U35–U37, U39, U40, U46, U48, U50, U53 and U54, latches U23, U32, U38 and U55, registers U12, U16, U25, U41, U45 and U49 as well as circuit SEQUENCE (FIGS. 141A and 141B). Circuit 1002 (FIG. 10) is also shown in more detail in FIGS. 138B and 138C and includes components U4, U5, U6, U10, U11, U14, U15, U20, U26 and U27, a register and circuit DEL4DON (FIG. 140). Circuit IDLOGIC (FIG. 138B) includes Circuits 1004–1010 (FIG. 10). Circuit IDLOGIC is shown in more detail in FIGS. 139A and 139B and each of the subcircuits are identified.

Data is moved from and to SCSI bus 110 and to and from computer bus 226 by PIO and DMA transfers. Preferably, information transfers used to configure the host and target for the actual data transfer in the data phase are performed using manual PIO data transfers. The transfer of the actual data may be either a host PIO or a host DMA transfer. Thus, in this embodiment, the modes of data transfer supported are given in Table 9.

TABLE 9

1. SCSI Manual PIO data transfers
   a) SCSI bus to computer bus
   b) Computer bus to SCSI bus
2. Initiator Data Transfer
   a) Computer host PIO data transfers
      i) SCSI bus to computer bus
      ii) Computer bus to SCSI bus
   b) Computer host DMA data transfers
      i) SCSI bus to computer bus
      ii) Computer bus to SCSI bus
3. Target data transfers
   a) Computer host PIO data transfers
      i) SCSI bus to computer bus
      ii) Computer bus to SCSI bus
   b) Computer host DMA data transfers
      i) SCSI bus to computer bus
      ii) Computer bus to SCSI bus In each mode of data transfer, Sparrow driver 302 programs H/A integrated circuit 6260 for the transfer and then waits either for an interrupt or a bit to be set in a control register that indicates H/A integrated circuit 6260 is ready to transfer additional data between the busses or that the data transfer is complete. These modes of transfer are manual in that the signals on SCSI bus 110 are set based upon specific instructions from Sparrow driver 302. This embodiment of Sparrow driver 302 is described more completely below. However, prior to considering this embodiment of Sparrow driver 302, the requirements for automatic SCSI PIO data transfers and initiator and target data transfers are described.

An automatic SCSI PIO transfer is used whenever intervention in the transfer process is required such as during the message phase. An automatic SCSI PIO data transfer can be used only for asynchronous transfers. Accordingly, an automatic SCSI PIO data transfer is typically not used in the SCSI data-in or data-out phases.

In an initiator data transfer from the SCSI bus to the computer bus using an automatic SCSI PIO data transfer, Sparrow driver 302 first sets bit SPIOEN in register SXFRC TLO to enable the automatic SCSI PIO transfer. Sparrow driver then polls bit SPIORDY in register SSTAT0 to ascertain when H/A integrated circuit 6260 is ready to initiate the PIO transfer. When bit SPIORDY is set, the data has been transferred from the SCSI bus to register SCSIDAT. Accordingly, the data is read from register SCSIDAT into computer system 220.

After the data is read, if more data is to be transferred, the bit SPIORDY is cleared and again Sparrow driver 302 waits for that bit to be set by H/A integrated circuit 6260. When bit SPIORDY is set, data is again read from register from SCSIDAT. This loop of waiting for bit SPIORDY to be set and then reading data from register SCSIDAT continues until bit PHASEMIS is set in register SSTAT1. Bit PHASEMIS is set by H/A integrated circuit 6260 when the signals on the SCSI bus indicate that there is no more data. Upon detection of the set bit PHASEMIS, Sparrow driver 302 sets bit SPIOEN to 0 to complete the automatic SCSI PIO transfer from the SCSI bus to the computer bus.

The automatic SCSI PIO initiator data transfer from the computer bus to the SCSI bus is similar to that just described for the read. However, in this data transfer data is written to register SCSIDAT. When there is no more data to write, bit SPIOEN is set to zero.

Figures 13A, 13B:
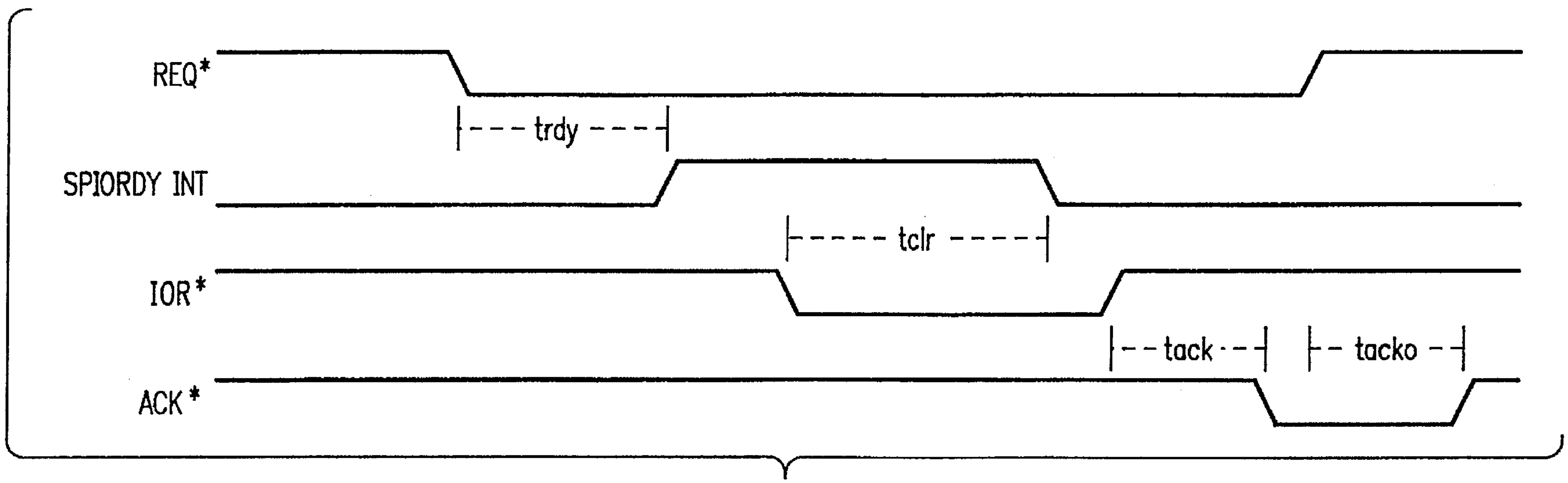
FIGS. 13A and 13B are a timing diagram for SCSI PIO for the integrated circuit of this invention.

The steps in an automatic SCSI PIO transfer for a target data transfer from the computer bus to the SCSI bus are similar to those just described for the initiator data transfer when the change of direction is considered. Initially, the correct phase is written in register SCSISIG in bits CDO/CDEXP, IOO/IOEXP and MSGO/MSGEXP by Sparrow driver. Sparrow driver then sets bit SPIOEN in register XFRCTL0 and again waits for bit SPIORDY to be set in register SSTAT0. When the bit is set, data is written from the computer bus to register SCSIDAT. When the data is in register SCSIDAT, H/A integrated circuit 6260 asserts the SCSI bus request signal REQ on SCSI bus 110. If more data is to be transferred, Sparrow driver clears bit SPIORDY in register SSTAT0 and then waits again for that bit to be set. This process proceeds until all the data has been transferred and then Sparrow driver sets bit SPIOEN to 0 to complete the automatic SCSI PIO transfer from the computer bus to the SCSI bus. The steps in an automatic SCSI PIO transfer for a target data transfer from the SCSI bus to the computer bus are similar to those just described except data is read from register SCSIDAT. FIGS. 13A and 13B illustrate the timing of signals on the SCSI bus with interrupt SPIORDY. FIG. 13B defines the preferred maximum time in nanoseconds between the edges generated on the various signals.

As indicated in Table 9, there are four possibilities when the initiator transfers data during the data phase. The first possibility is a computer host PIO initiator data transfer from either the computer bus to the SCSI bus or from the SCSI bus to the computer bus. Since the operations are similar, steps that are compatible for both operations are described and steps that require different operations depending on the direction of the data transfer are noted.

In the computer bus initiator data transfer, Sparrow driver 302 first sets bit CDOEXP, IOOEXP, and MSGOEXP in register SCSISIG to the expected SCSI phase. Subsequently, registers STCNT0, STCNT1, STCNT2 are cleared along with the SCSI and DMA FIFOs. Next, the microprocessor registers are set up to contain the transfer count and address.

Sparrow driver initialization of H/A integrated circuit 6260 for the computer host initiator PIO data transfer waits for bit REQINIT to be set in register SSTAT1 with bit PHASEMIS in that register inactive. When bit REQINIT is set by H/A integrated circuit 6260, in response to a request signal REQ from the target, Sparrow driver sets bits SCSIEN and DMAEN in register SXFRCTL0 to enable the SCSI logic in H/A integrated circuit 6260. Next, Sparrow driver sets bits ENDMA and PIO in register DMACNTRL0. If the operation is a read, i.e., a transfer from the SCSI bus to the computer bus, bit -READ in register DMACNTRL0 is also reset. Conversely, if the operation is a write, i.e., a data transfer from the computer bus to the SCSI bus, bit WRITE in register DMACNTRL0 is set.

Sparrow driver has now completely programmed H/A integrated circuit 6260 for the data transfer. The next step depends upon whether the operation is a read or a write. If the operation is a read, Sparrow driver 302 waits for bit DFIFOFULL or bit INTSTAT in register DMASTAT to be set. H/A integrated circuit 6260 sets bit DFIFOFULL when the DMAFIFO is full. Bit INTSTAT, as described above with respect to FIG. 9, is set whenever H/A integrated circuit 6260 generates one of the interrupt signals of Table 7. As explained more completely below in a detailed description of Sparrow driver 302, the testing for the interrupt and the full DMA is performed in such a way that the speed of the transfer is optimal. If for some reason a SCSI bus reset or some other interrupt occurred, the bit INTSTAT is set and signals Sparrow driver 302 to investigate why an interrupt occurred during the data transfer.

The computer bus to the SCSI bus initiator PIO data transfer is similar except in this case, Sparrow driver 302 must ascertain when the DMAFIFO is empty so that additional data can be loaded into the FIFO for transfer to the SCSI bus. Accordingly, in this situation, Sparrow driver 302 waits for either bit FIFOEMP or bit INTSTAT in register DMASTAT to be set.

Figures 14A, 14B:
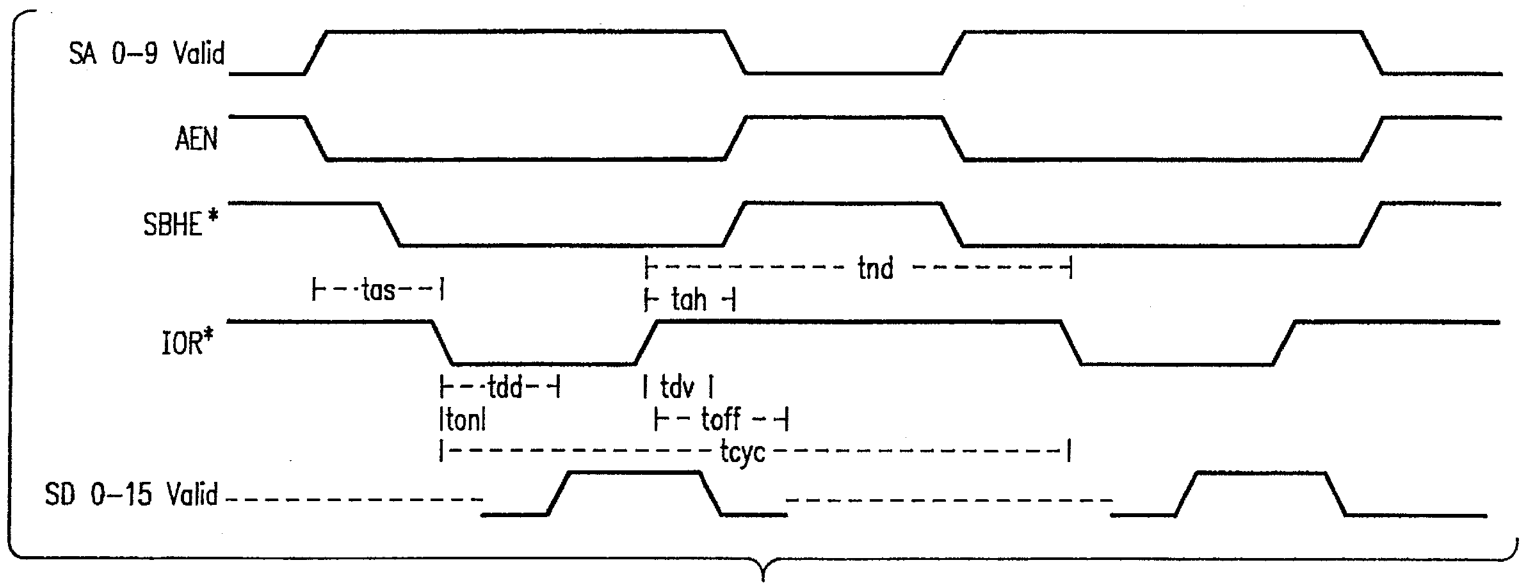
FIGS. 14A and 14B are a timing diagram for SCSI PIO read operations for the integrated circuit of this invention.
Figures 15A, 15B:
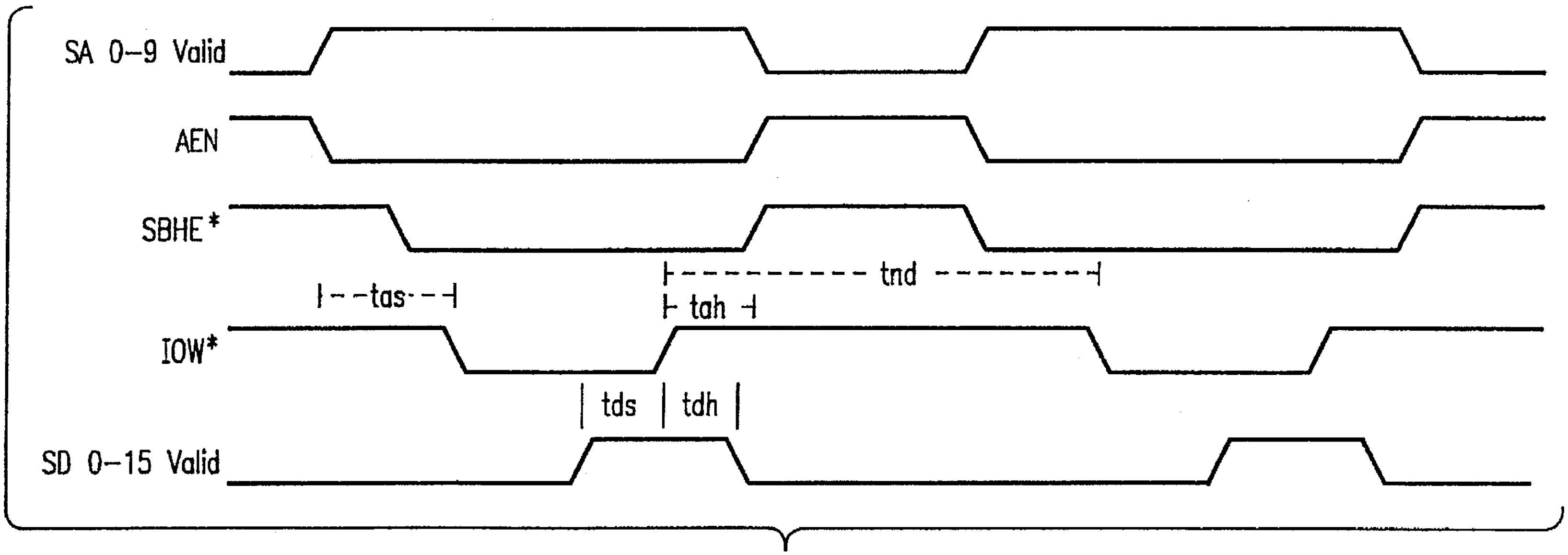
FIGS. 15A and 15B are a timing diagram for SCSI PIO write operations for the integrated circuit of this invention.

When the appropriate DMAFIFO bit is set in register DMASTAT, Sparrow driver 302 transfers the data, using a microprocessor instruction to the appropriate bus and then adjusts the transfer count. Sparrow driver 302 tests for the end of the data and, if more data is to be sent, waits for the appropriate bits to be again set in register DMASTAT and then transfers the data. When all of the data has been transferred, bit ENDMA in register DMACNTRL0 is cleared and this completes the PIO data transfer. FIGS. 14A and 14B demonstrate the timing for the host PIO read operation and FIGS. 15A and 15B are a timing diagram and a description of the relevant times for the host PIO write operation. FIGS. 15B and 14B describe the preferred minimum and maximum times in nanoseconds between the edges in FIGS. 15A and 14A, respectively.

The steps in a host DMA transfer in a DMA initiator data transfer are similar for a transfer from the computer bus to the SCSI bus and from the SCSI bus to the computer bus. Again, the general steps are described and the differences in each general step that are associated with the direction of the data transfer are specifically noted. In the DMA transfer, the expected SCSI phase is set in bits CDOEXP, IOOEXP and MSGEXP in register SCSISIG. Next, Sparrow driver 302 clears the transfer count registers, the SCSI FIFO, and the DMA FIFO. Sparrow driver 302 sets up the DMA controller for address, word count, and transfer mode. Sparrow driver 302 then waits for bit REQINT to be set in register SSTAT1 with bit PHASEMIS a zero. This step is the same as that described above in the PIO data transfer. After bit REQINIT is set to 1, Sparrow driver 302 sets bits SCSIEN and DMAEN in register SXFRCTL0 to enable the SCSI logic in H/A integrated circuit 6260.

The next step performed by Sparrow driver 302 depends upon whether a read operation or a write operation is being performed with the DMA transfer. For a read operation, i.e., a transfer from the SCSI bus to the computer bus, bit ENDMA, bit 8/16, the DMA bit, and the —READ bit are reset in register DMACNTRL0. In the write operation, the same bits are set except the write bit is set. After the bits in register DMACNTRL0 are configured, Sparrow driver 302 sets bits ENDMADONE and ENPHASEMIS in registers SIMODE0 and SIMODE1, respectively. At this point, Sparrow driver 302 has programmed H/A integrated circuit 6260 and the DMA controller in computer system 220 to perform the DMA transfer. Therefore, Sparrow driver 302 returns control of microprocessor 221 to system 220.

When either a phase change or the DMA transfer are done, H/A integrated circuit 6260 generates a system hardware interrupt to microprocessor 221. As previously described, the hardware interrupt results in control being returned to Sparrow driver 302, which then performs operations necessary to conclude the DMA operation. The processing required when a DMA transfer is interrupted prior to completion is described more completely below.

Figures 16A, 16B:
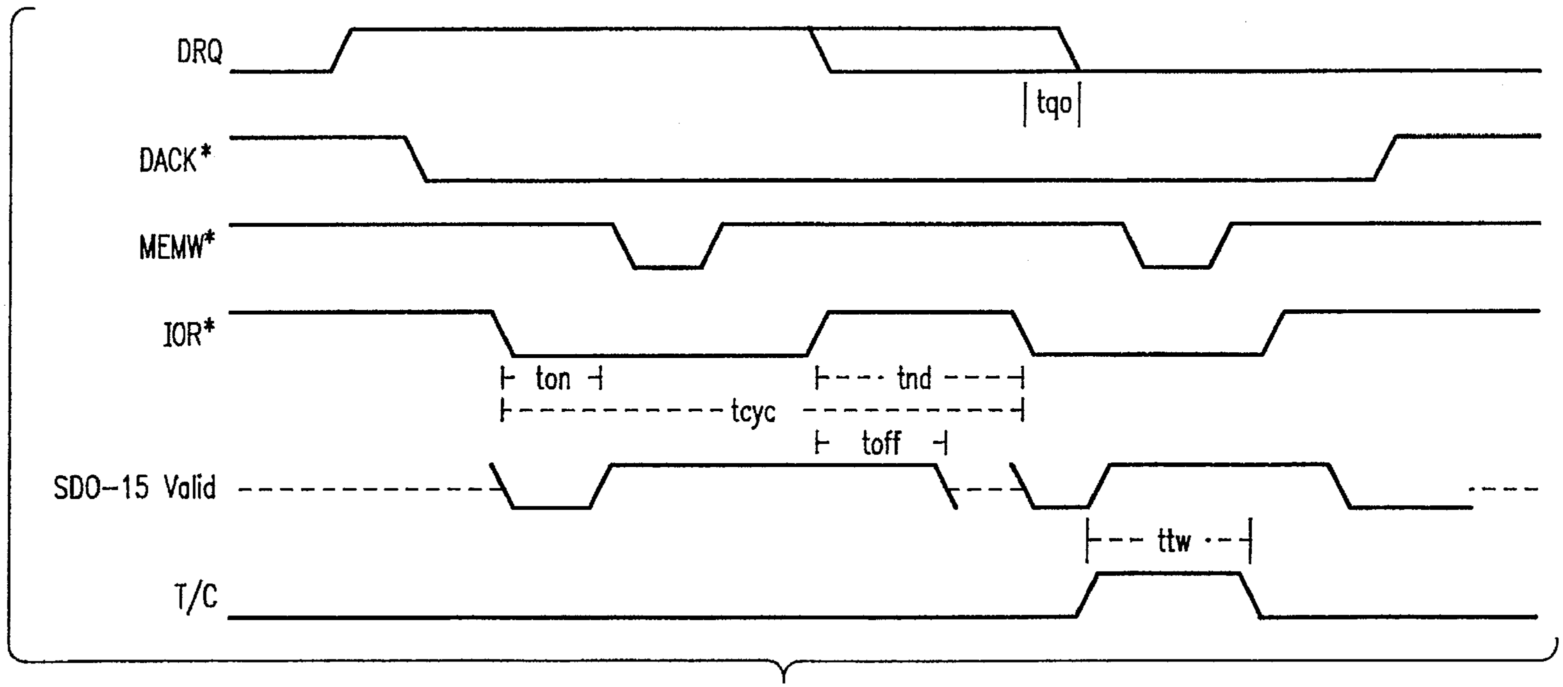
FIGS. 16A and 16B are a timing diagram for DMA read operations for the integrated circuit of this invention.
Figures 17A, 17B:
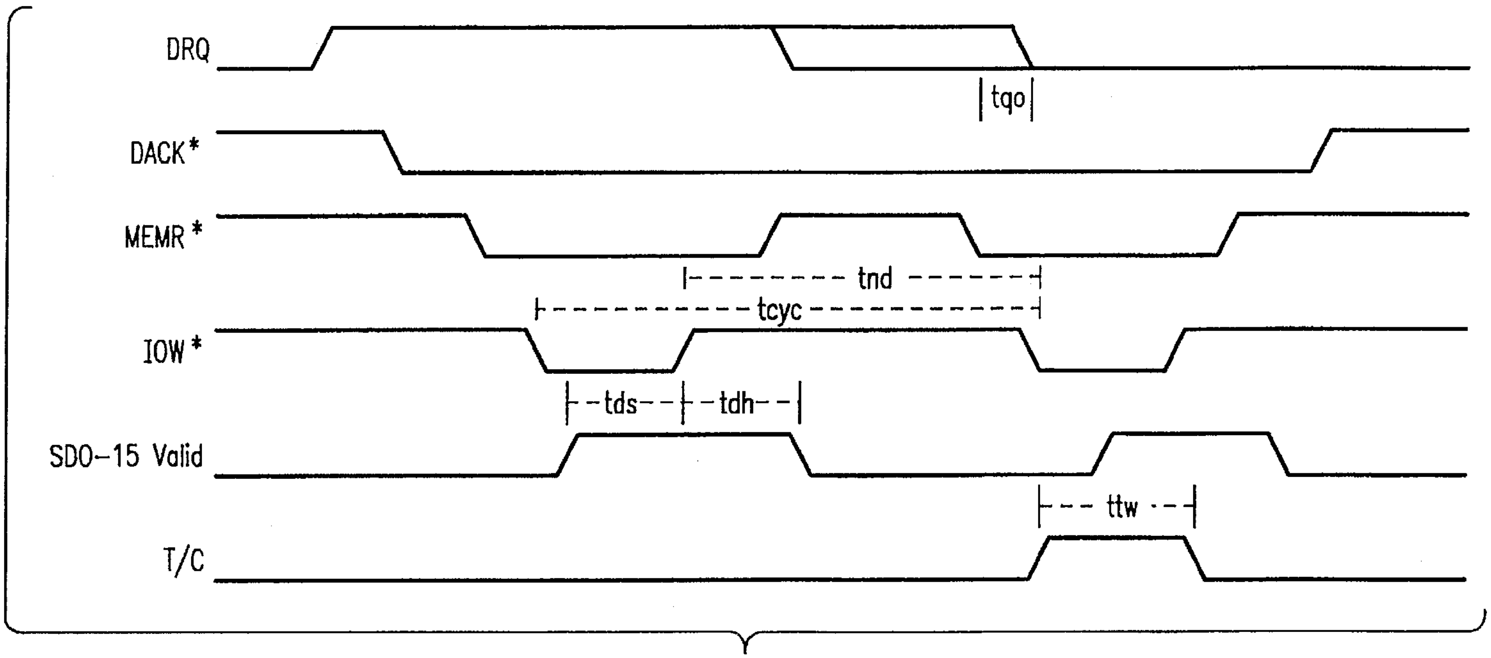
FIGS. 17A and 17B are a timing diagram for DMA write operations for the integrated circuit of this invention.

FIGS. 16A and 16B illustrate the timing for the DMA read operation. Similarly, FIGS. 17A and 17B illustrate the timing for the DMA write operation. The minimum and maximum numbers given in FIGS. 16B and 17B are in nanoseconds.

Computer host PIO target data transfers are similar to the computer host PIO initiator data transfers described above. Briefly, for this data transfer, Sparrow driver 302 sets the phase in register SCSISIG-write. The registers STCNT0-STCNT3 are loaded as required with the transfer data count and then register SXFRCTL1 is loaded with the required option controls. Next, both the SCSI FIFO and the DMA FIFO are cleared. Bits SCSIEN and DMAEN are set in register SXFRCTL0 and bit ENDMA is set. Bit DMA/-PIO is set to zero in register DMACNTRL0. Bit write/read in register DMACNTRL is either set or reset, depending on the direction of control.

Sparrow driver 302 waits for either bit INTSTAT to be set or the appropriate FIFO bit in DMASTAT to be set. When the FIFO bit is set, Sparrow driver 302 uses a microprocessor instruction to transfer the data in the appropriate direction. After the data transfer is complete, Sparrow driver 302 adjusts the transfer count, tests to determine whether all the data has been transferred, and then takes the steps to transfer data until all of the data has been transferred. When the PIO data transfer is complete, bit ENDMA in register DMACTRL0 is cleared.

Computer host DMA target data transfers from the SCSI bus to the computer bus or from the computer bus to the SCSI bus are similar to DMA initiator data transfers when the difference in direction of the data is considered. Specifically, in the DMA target data transfer, the phase is set in register SCSISIG write, and then registers STCNT0-STCNT3 are loaded with the transfer count. Next, register SXFRCTL1 is set with the option controls, and the DMA and SCSI FIFOs are cleared. Next, Sparrow driver 302 sets up the DMA controller for address, word count, and transfer mode. The steps after the set-up of the DMA controller are identical to those described above for the automatic DMA initiator data transfer and are incorporated herein by reference.

Regarding a 16-bit DMA data transfer, a SCSI device may disconnect from the SCSI bus after an odd number of bytes have been transferred across the SCSI bus. In this case, H/A integrated circuit 6260 changes mode of operations from a DMA data transfer to a PIO data transfer and back again without loss of data. The general steps in this operation are outlined below.

Read Operation

1. Check that only one byte is left.
2. Switch to PIO mode leaving bit ENDMA in register DMACNTRL0 set to one.
3. Read byte from port 356h and save the byte.
4. To continue transfer, set circuit 6260 for PIO write.
5. Write byte to port 356h.
6. Change direction in DMACNTRL0 to read.
7. Change mode to DMA.
8. Enable SCSI transfers.

Write Operation

1. Check that an odd number of bytes has been transferred across the SCSI bus.
2. Save the DMA address pointer and word counter minus 2.
3. To continue transfer, set the bit BYTEALIGN in register SXFRCTL1.
4. Enable DMA transfer, and throw away the first byte.

Figures 18A, 18B:
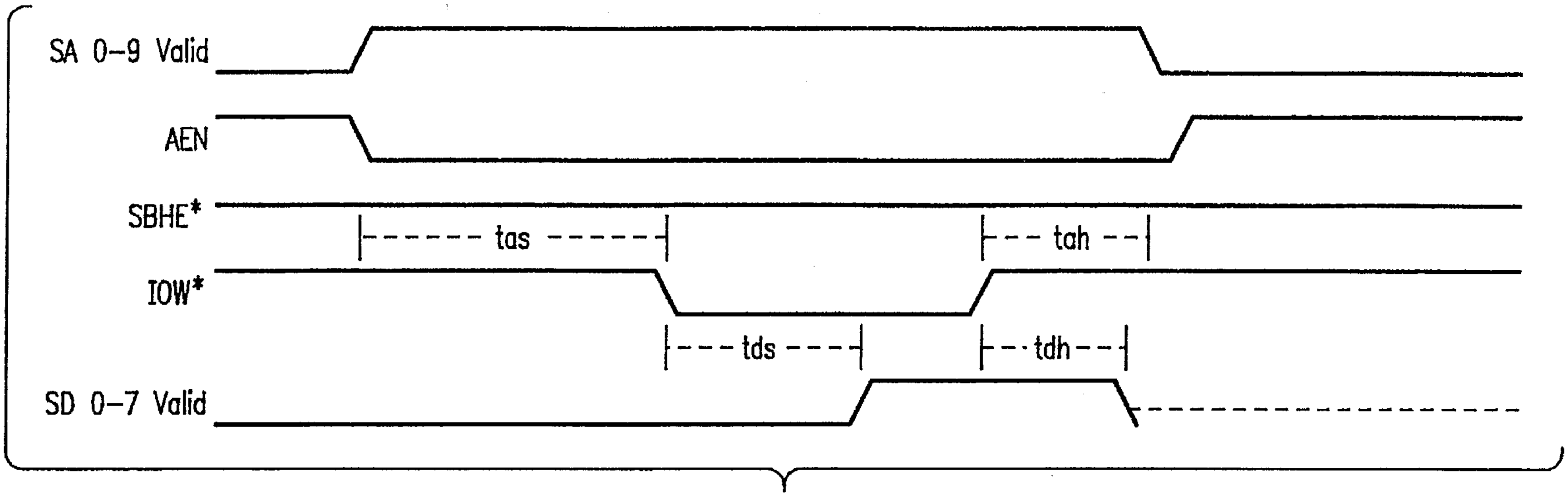
FIGS. 18A and 18B are a timing diagram for I/O write operations for the integrated circuit of this invention.
Figures 19A, 19B:
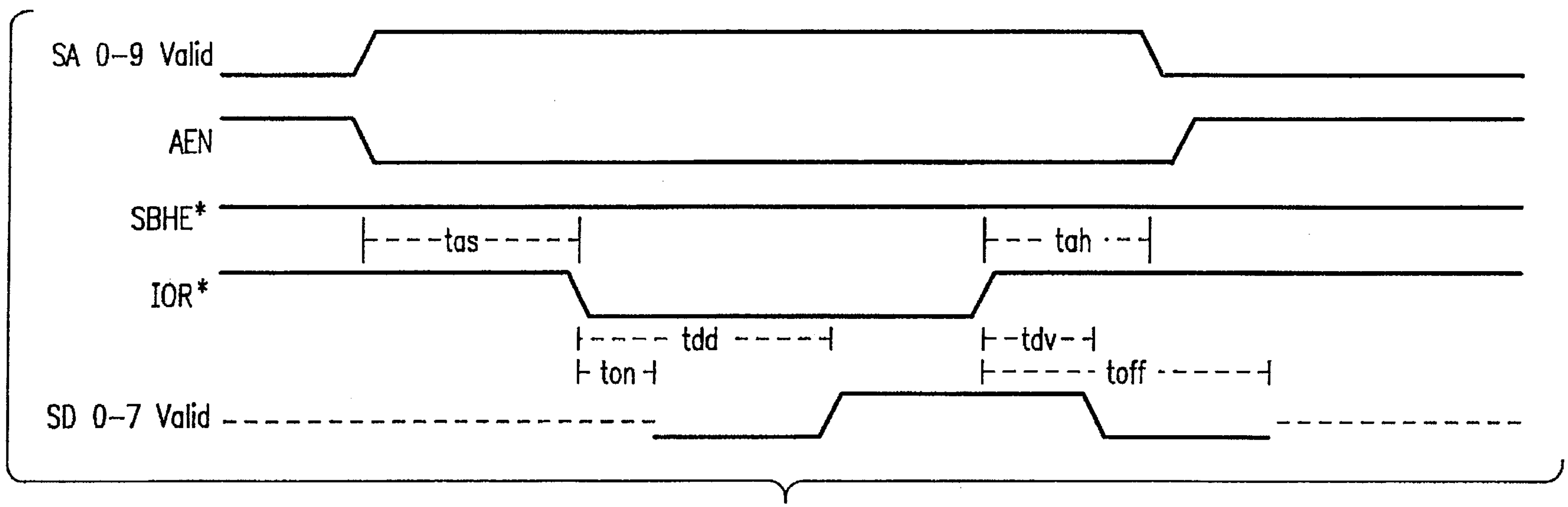
FIGS. 19A and 19B are a timing diagram for I/O read operations for the integrated circuit of this invention.

FIGS. 18A, 18B, 19A, 19B, 20A, and 20B are further timing diagrams for integrated circuit 6260 with SCSI bus. All times are in nanoseconds. Specifically, FIGS. 18A and 18B are a timing diagram for an I/O write from the host computer bus to a register set in H/A integrated circuit 6260. FIGS. 19A and 19B are a timing diagram for an I/O read from the register set in H/A integrated circuit 6260 to the host computer bus. FIGS. 20A and 20B are a timing diagram for data setup and hold, latched data and PIO. In FIG. 20B, note 1 means that the initiator mode uses the leading edge of signal REQ to latch data and the target mode uses leading edge of signal ACK. The times given in FIG. 20B apply to synchronous, asynchronous, and automatic PIO modes of operation. Note 2 means that the times apply to program I/O when reading port 347h.

The discussion above describes in general terms the operation of Sparrow driver 302. One embodiment of Sparrow driver 302 for an IBM-AT compatible computer with an Intel microprocessor is disclosed in Microfiche Appendix A and incorporated herein by reference.

Process diagrams for Sparrow driver 302 of this invention are shown in more detail in FIGS. 21A through 43. Upon a call to Sparrow driver 302, save configuration 2101 (FIG. 21A) saves the current values of the registers AX, CX, DX, BX, SP, BP, SI, DI, as well as the stack pointer. As used herein register names, e.g., AX (sometimes used as two registers called AH and AL), BX (sometimes used as two registers called BH and BL), CX (sometimes used as two registers called CH and CL), DX (sometimes used as two registers called DH and DL), SP, BP, SI, DI, SC, DS, SS, and ES, are those associated with the Intel Corporation of Santa Clara, Calif., 80×86 family of microprocessors. However, these examples are illustrative only of the principles of this invention and are not intended to limit the scope of this invention to the specific embodiment described. In view of this disclosure, those skilled in the art can use H/A integrated circuit 6260 of this invention with other microprocessors and other operating systems. Moreover, the microprocessors are illustrative of a processing unit in a computer system.

Figure 21A:
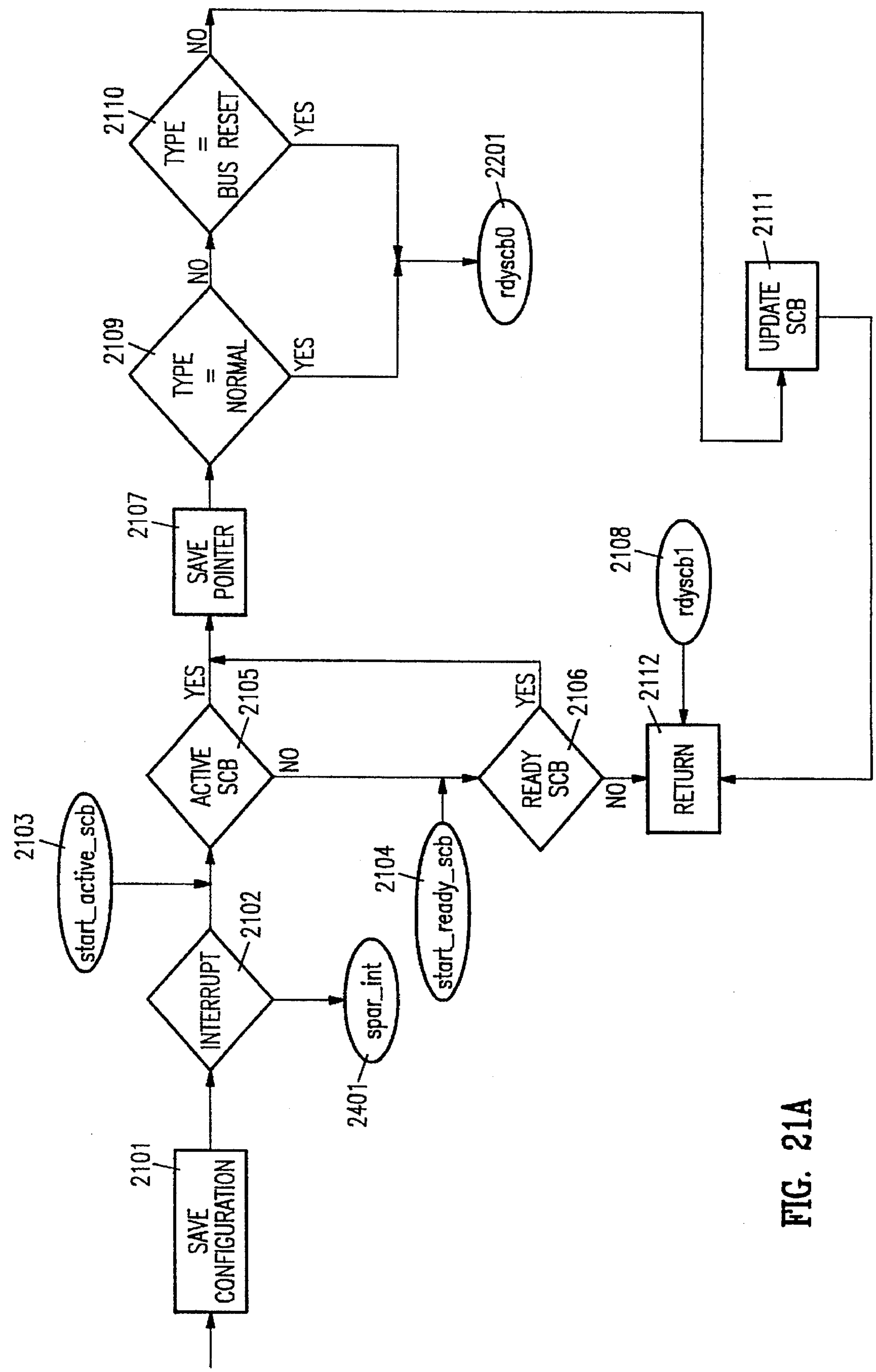
FIGS. 21A through 43 are a detailed process diagram for one embodiment of Sparrow driver of this invention.
Figure 24:
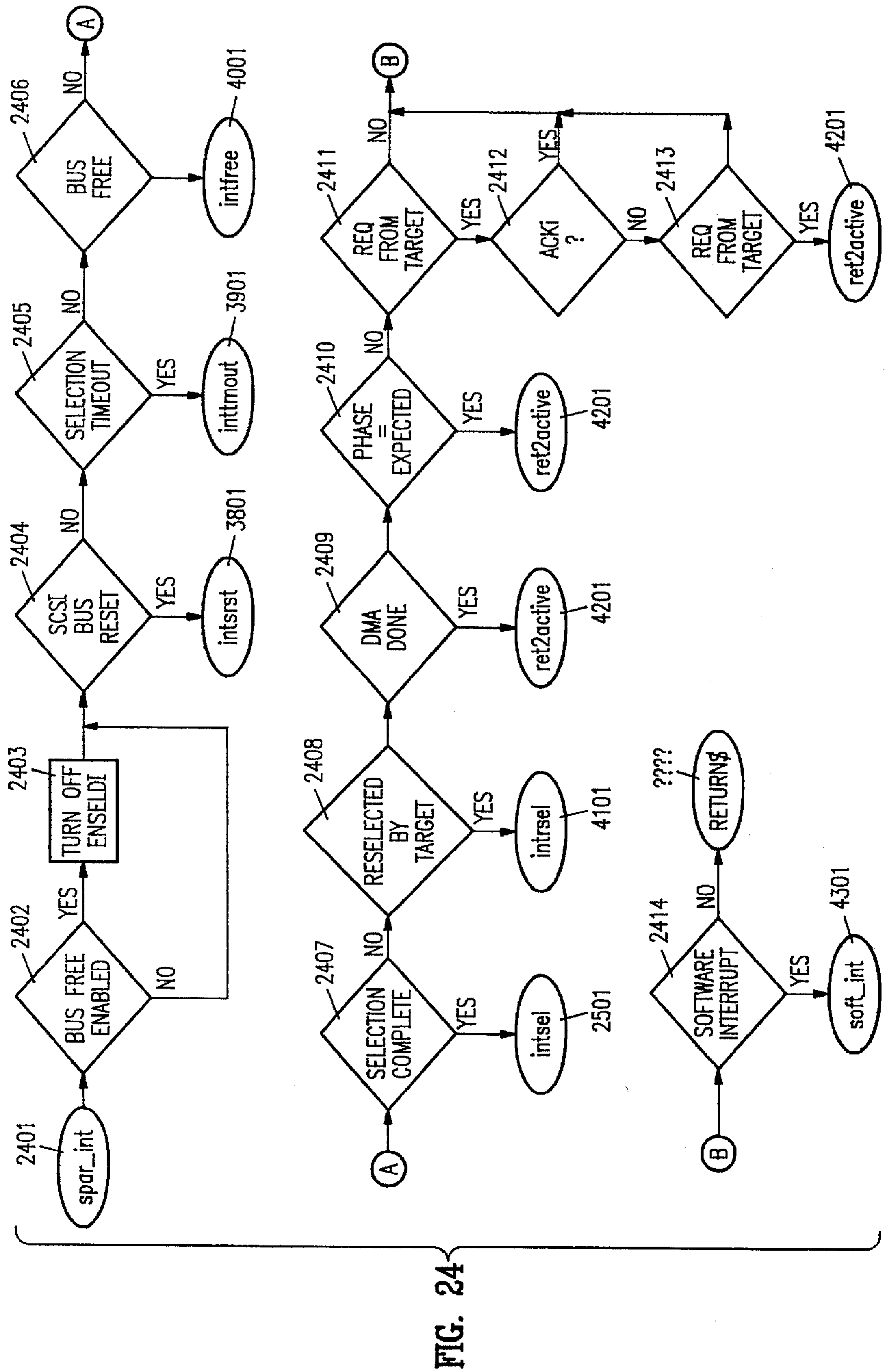

Save configuration 2101 (FIG. 21A) also turns on an LED to indicate that H/A integrated circuit 6260 is operative. Processing then transfers to interrupt check 2102 which examines bit INTSTAT in register DMASTAT (FIG. 8C) to ascertain whether H/A integrated circuit 6260 generated a hardware interrupt. If an interrupt occurred, processing branches to label SPAR_INT 2401 (FIGS. 21A and 24). If a hardware interrupt has not occurred, processing transfers to active SCB check 2105 (FIG. 21A). If there is an active SCB but no hardware interrupt has occurred, SCSI manager 302 is starting the next link in a chain of commands.

Figure 21B:
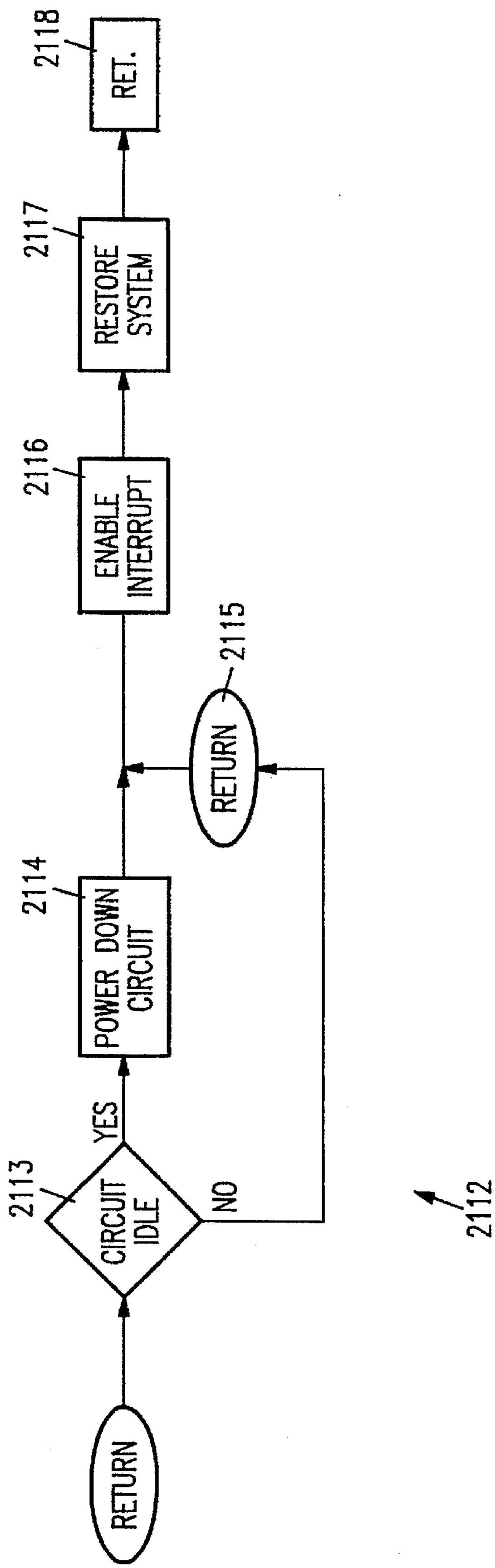

As explained previously, a round-robin pointer should already point to an active SCB so that the search time to locate an active SCB is usually short. If an active SCB is not found, processing transfers to ready SCB check 2106 which looks for a SCB with a command status of ready. If a ready SCB is not found, processing returns to SCSI manager 301 through return 2112 (FIG. 21A and 21B). The operations in return 2112 are illustrated in FIG. 21B.

The operations in return 2112 (FIG. 21B) reconfigure microprocessor for resumption of processing that was active prior to the call to Sparrow driver 302. Initially, circuit idle check 2113 determines whether H/A integrated circuit 6260 clock signal should be gated off. Check 2213 examines the command status of the SCBs in the SCB array to determine whether any of the SCBs have a command status of disconnected, waiting, or active. If any SCB has one of these statuses, processing transfers to enable interrupt 2116. Notice that label RETURN$ 2115 (FIG. 21B) is in this path from check 2213 to enable interrupt 2116. Sparrow driver 302 returns through label RETURN$ 2115 (FIG. 21B) whenever Sparrow driver 302 knows that one of a disconnected, active, waiting SCB exists. Thus, Sparrow driver 302 eliminates the search time associated with examining the SCB array whenever possible.

If neither a waiting, active, nor disconnected SCB is detected by check 2113, processing transfers from check 2113 to power down circuit 2114. Power down circuit 2114 sets bit PWRDWN in register DMACNTRL1 which turns off the clocked components of H/A integrated circuit 6260 by stopping operation of the clock for circuit 6260. This method of powering down takes advantage of a feature of CMOS technology where gates that make repeated transitions use more power than gates which do not. Further, the faster the rate of transitions, the more power is used. Thus, since gating the clock off stops clocked transitions, power is conserved. However, all other operations of H/A integrated circuit 6260 remain operable. Upon completion of power down circuit 2114, processing transfers to enable interrupt 2116.

Enable interrupt 2116 sets bit INTEN in register DMACNTRL1. In one embodiment, bit INTEN is first turned off and then set so as to create an edge. Setting bit INTEN permits H/A integrated circuit to generate any hardware interrupt that has been enabled to microprocessor 221, as explained above.

Restore system 2117 turns off the LED showing that H/A integrated circuit is inactive and restores the registers and stack pointer that were save on entry to Sparrow driver 302. Processing then returns to SCSI manager 301 through ret 2118.

If a ready SCB is found by ready SCB check 2106 (FIG. 21A), processing transfers to save pointer 2107. Similarly, if an active SCB is found by active SCB check 2105, processing also transfers to save pointer 2107. Save pointer 2107 stores the pointer to the current SCB in a register.

Figure 22:
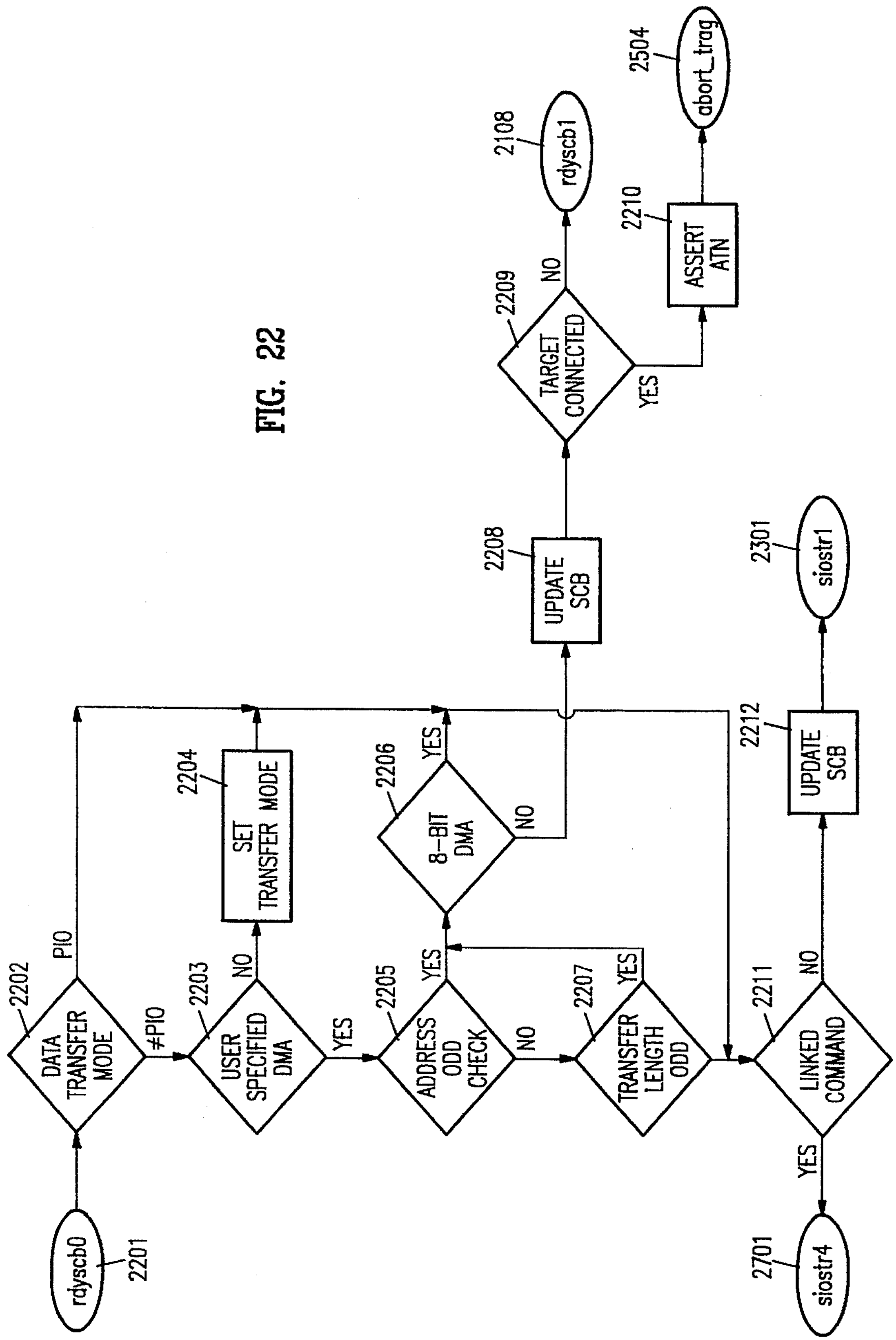

The next sequence of operations in Sparrow driver 302 checks to determine whether the host command type is valid. Specifically, if the host command type equals "normal" or "bus device reset", processing transfers from type equals normal check 2109 or type equals bus reset check 2110 respectively, to label RDYSCB0 2201 (FIGS. 21A and 22). Otherwise, update SCB 2111 (FIG. 21A) sets the SCB status to "done" and the host status to "invalid command error". Sparrow driver 302 then returns processing to SCSI manager 301 via return 2112.

When processing transfers to label RDYSCB0 2201 (FIG. 22), data transfer mode check 2202 transfers to linked command check 2211 if the specified data transfer mode is PIO. Otherwise, processing transfers to user specified DMA check 2203. If the user used a jumper or a command line option to specify the DMA transfer mode, processing transfers to address odd check 2205. Otherwise, user specified DMA check 2203 transfers processing to set transfer mode 2204 which in turn sets the transfer mode to PIO. Upon completion, set transfer mode 2204 transfers processing to linked command check 2211.

Address odd check 2205 determines whether the host data buffer address for DMA (physical address) is odd. If this address is odd, processing transfers to 8-bit DMA check 2206. If 8-bit DMA is specified, this check transfers to linked command check 2211, because DMA is not supported for odd addresses and 16-bit DMA. 8-bit DMA check 2206 transfers to update SCB 2208 if 16-bit DMA is specified.

Figure 25:
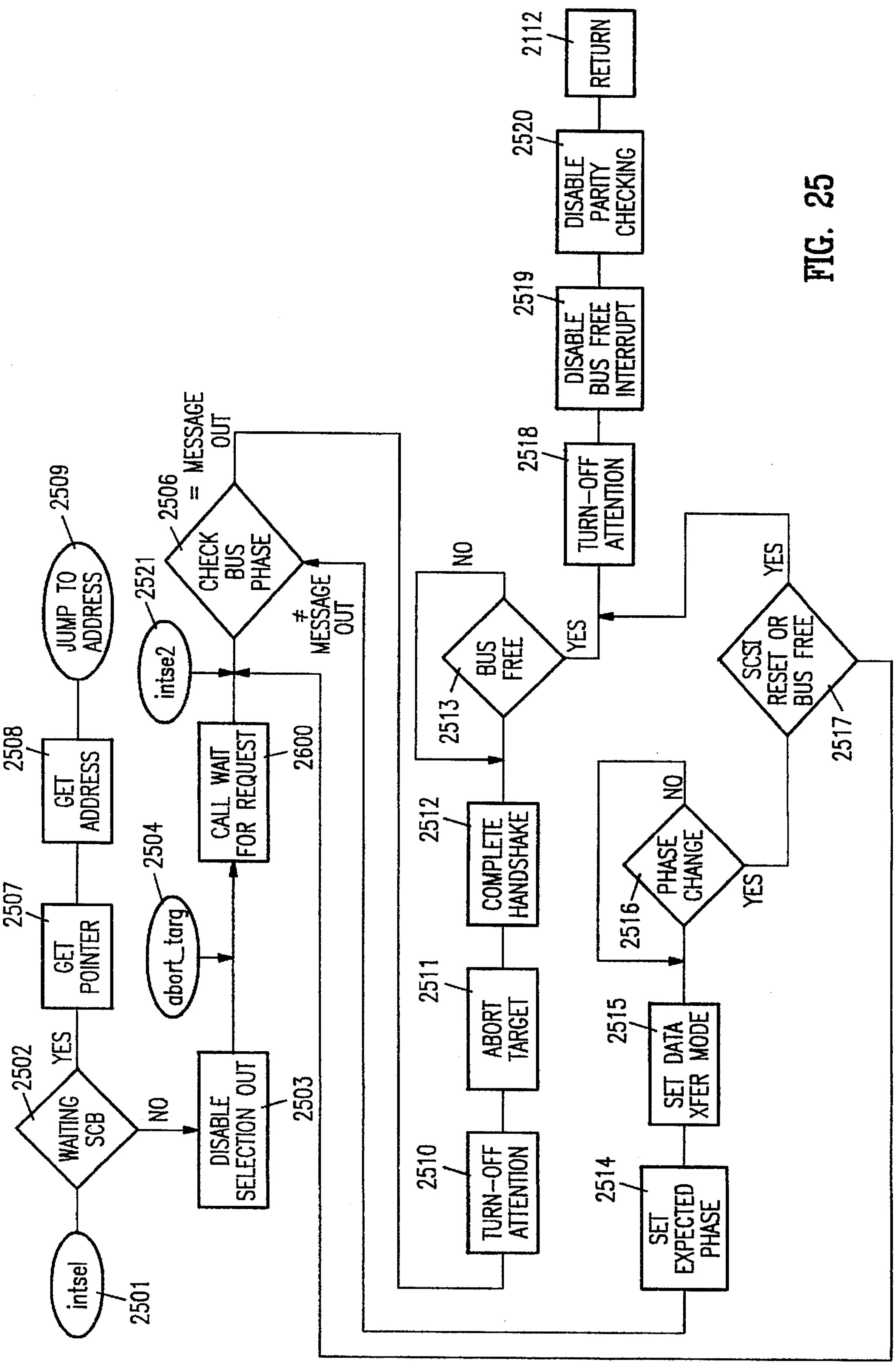

In update SCB 2208, the SCB status is set to "done" and the host adapter status to error 1eh, odd data address or length (see Table 5). Subsequently, target connected check 2209 determines whether the target is connected to SCSI bus 110. If the target is not connected, processing transfers to return 2112 (FIG. 21A) through label RDYSCB1 2108. If the target is connected, Sparrow driver 302 asserts attention using assert ATN 2210 to abort the target. Specifically, bit ATN0 in register SCSISIG is set and then processing transfers to label ABORT_TARG 2504 (FIG. 25).

If the user specified a DMA transfer and the address is not odd, address odd check 2205 passes processing to transfer length odd check 2207. If the information to be transferred has a length that is an odd number of bytes, processing transfers to 8-bit DMA check 2206 which in turn proceeds as described above.

If the length of the information to be transferred is not odd, processing transfers from transfer length odd check 2207 to linked command check 2211. A linked command is defined in the SCSI protocol and therefore well-known to those skilled-in-the-art. If the command is linked, this means that target selection has already been completed and is therefore unnecessary. Accordingly, linked command check transfers processing to label SIOSTR4 2701 (FIGS. 22 and 27) which bypasses the selection process that is described more completely below. If the command is not linked, linked command check 2211 transfers to update SCB 2212 which sets the SCB status to waiting and then transfers processing to label SIOSTRT 2301.

Label SIOSTRT 2301 (FIG. 23A) is the point at which processing of a SCSI command is started. Specifically, a target is selected. Thus, initialize target selection 2302 programs H/A integrated circuit 6260 so that the hard-wired arbitration and selection sequencers, described above with respect to FIG. 10, complete these phases of the SCSI data transfer.

Figure 23A:
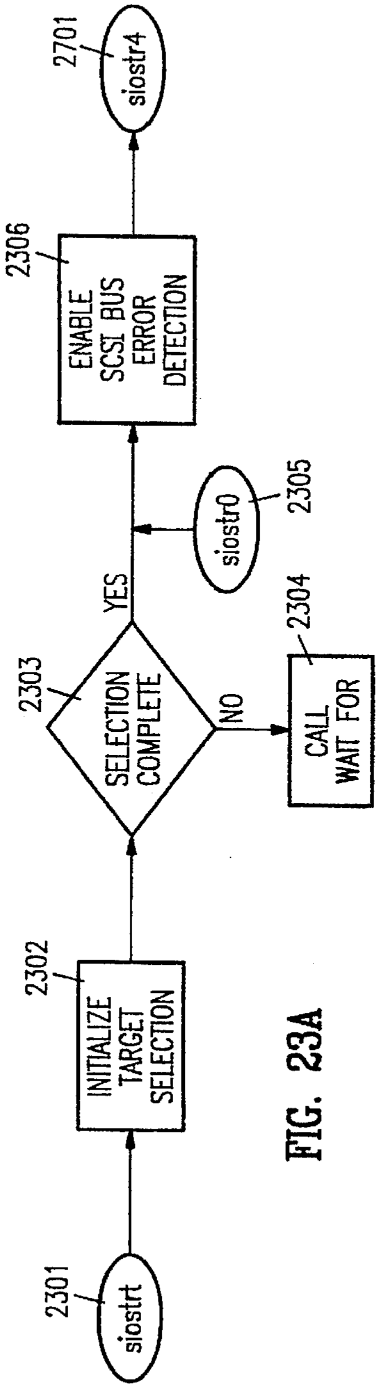
Figure 23B:
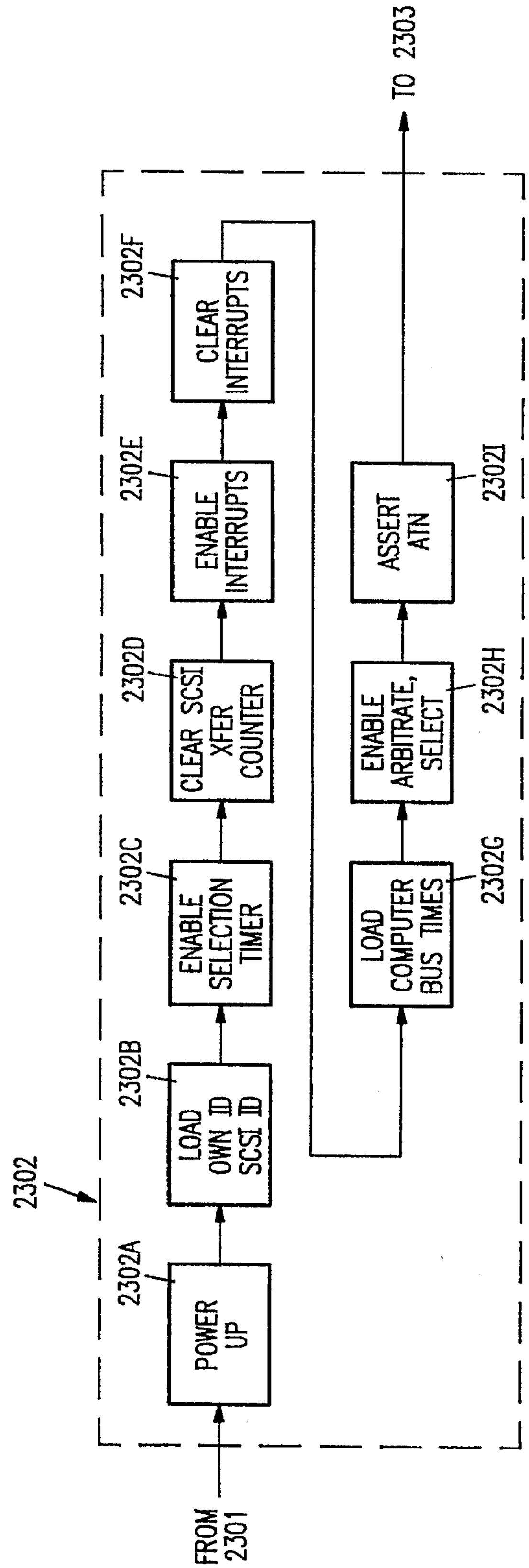

In this embodiment, initialize target selection 2302 first powers up H/A integrated circuit 6260 via power up 2302A (FIG. 23B). Specifically, the clock in H/A integrated circuit 6260 is gated by the signal in bit PWRDWN of register DMACNTRL1 (FIG. 8C). Thus, bit PWRDWN is set to allow the clock signal to pass through the gate. After power up 2302A (FIG. 23B), load OWNID and SCSIID 2302B obtains the pointer to the current SCB and then the SCSIID, the target address/LUN, the target address and H/A integrated circuit 6260 ID from the SCB. This information is loaded in register SCSIID (FIG. 8A). Specifically, the target ID is loaded in bits 0–2 and the H/A integrated circuit 6260 ID in bits 4–6.

Next enable selection timer 2302C (FIG. 23B) sets bit ENSTIMER in register SXFRCTL1 (FIG. 8A) and defines the selection time option. Subsequently, clear SCSI transfer counter 2302D sets bits CH1/CH2 and CLRSTCNT in register SXFRCTL0 (FIG. 8A). Enable interrupt 2302E sets bits ENSELD0 and ENSELDI in register SIMODE0 and bits ENSELTIMO and ENSCSIRST in register SIMODE1 (FIG. 8B). Thus, selection time out interrupt SELTO, SCSI reset interrupt SCSIRSTI, interrupt SELDO and interrupt SELDI are enabled. Clear interrupt 2302F (FIG. 23B) sets each of the bits in registers CLRSINT0 and CLRSINT1 (FIG. 8B) except bit SETSDONE in register CLRSINT0. Load computer bus time 2302G loads the computer bus on/off times into register BRSTCNTL (FIG. 8C). Finally, enable arbitrate, select 2302H sets bits ENSELO and ENRSELI while assert attention 2302I sets bit ENAUTOATNO in register SCSISEQ (FIG. 8A). This completes the initialization for target selection and so processing transfers to selection complete test 2303 (FIG. 23A).

If the selection is very fast, selection complete test 2303 transfers processing to enable bus free and parity error detection 2306. Otherwise, selection complete 2303 transfers to call wait for 2304. Since the selection process takes some time and is automatically handled by H/A integrated circuit 6260, Sparrow driver 302 returns control of microprocessor 221 to computer system 220 while H/A integrated circuit 6260 completes the selection phase. Accordingly, call wait for 2304 accesses wait for module 504 (FIG. 6). Wait for module 504 simply moves the pointer to the active SCB and saves in the SCB the address for execution when Sparrow driver 302 resumes execution. Module wait for 504 returns control to SCSI manager 301 through return 2112 (FIG. 21B), which in turn, as described previously, returns control to computer system 220.

The automatic selection process performed by H/A integrated circuit 6260 was described above and is incorporated herein by reference. As described previously, when selection is complete, a system hardware interrupt is sent by H/A integrated circuit 6260 to CPU 221 which in turn returns processing to SCSI manager 301. SCSI manager 301 calls Sparrow driver 302 and in turn interrupt check 2102 (FIG. 21A) transfers processing to label SPAR_INT 2401 (FIGS. 21A and 24).

Label SPAR_INT 2401 is the start of Sparrow interrupt handler 506 (FIG. 6). Interrupt handler 506 looks at the interrupts in the order of priority as illustrated in FIG. 24. Bus free enabled check 2402 examines bit ENBUSFREE in register SIMODE1 (FIG. 8B). If the bit is not set, processing transfers to SCSI bus reset check 2404. If the bus free interrupt is enabled and the bus free interrupt has not occurred, an active reselection status, i.e., the reselection bit in register SSTAT0 is set, is old. Therefore, the reselection status is ignored at this point and bit ENSELDI is turned off by turn off ENSELDI 2403. If an active reselection status is current, a bus free interrupt will have occurred and therefore step 2403 is skipped.

Figure 38:
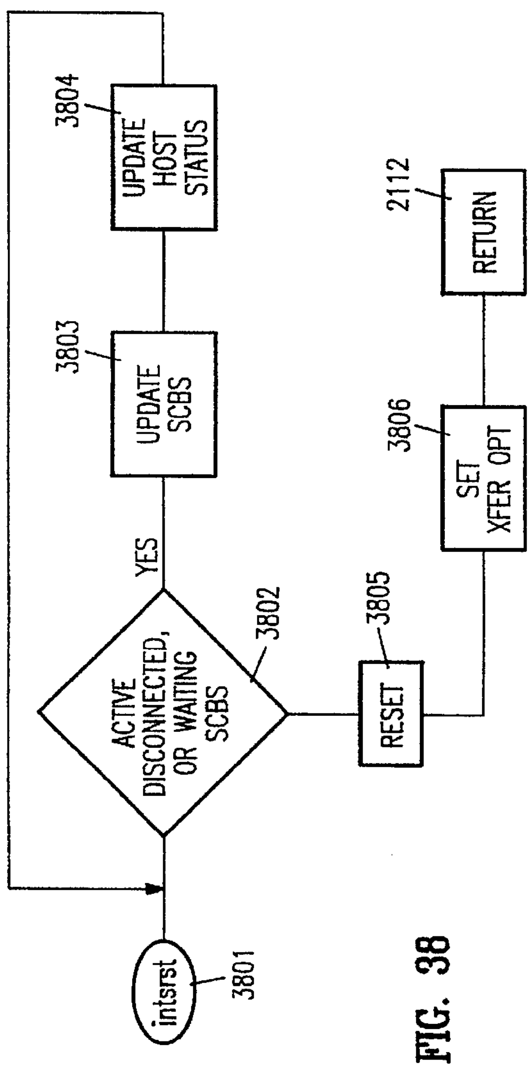
Figure 39:
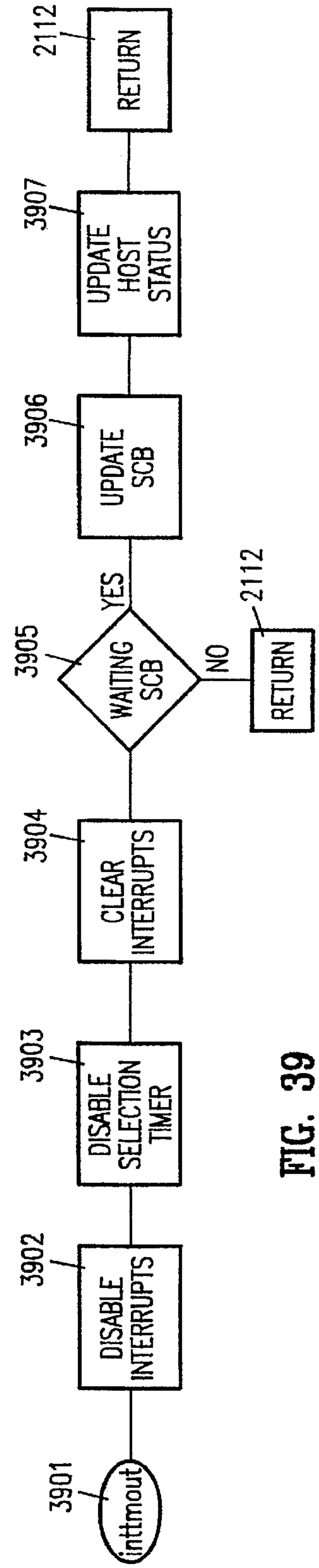

Next, SCSI bus reset check 2404 checks status bit SCSIRSTI in register SSTAT1 (FIG. 8B). If the bus was reset, processing transfers to label INTSRST 3801 (FIG. 38). Otherwise, check 2404 transfers processing to selection time out check 2405.

Selection timeout 2405 passes processing to label INTTMOUT 3901 (FIG. 39) if H/A integrated circuit 6260 has generated hardware interrupt SELTO. If hardware interrupt SELTO has not been issued, selection timeout check 2405 passes processing to bus free check 2406.

Figure 40:
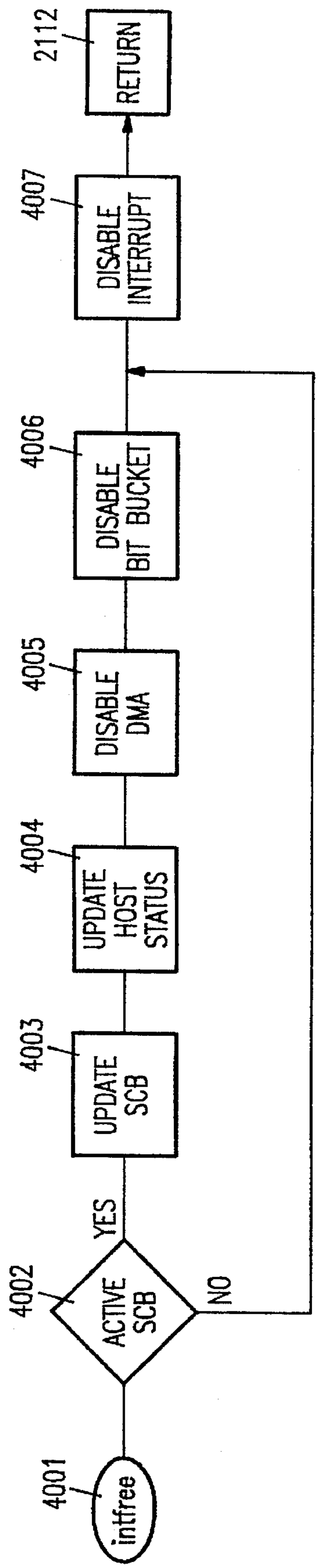

BUS free check 2406 examines bus free bit BUSFREE of register SSTAT1 (FIG. 8B) and if a bus free interrupt has occurred, passes processing to label INTFREE 4001 (FIG. 40). Otherwise, bus free check 2406 passes processing to selection complete test 2407 which in turn examines bit SELDO in register SSTAT0 (FIG. 8B). If the selection is complete, i.e., bit SELDO is set, processing transfers to label INTSEL 2501 (FIG. 25). Conversely, test 2407 transfers processing to reselected by target test 2408.

Recall that in the initial call to Sparrow driver 302, SCSI manager 301 provided a ready SCB for processing by Sparrow driver 302. Sparrow driver had programmed H/A integrated circuit 6260 and returned control of microprocessor 221 to computer system 220. H/A integrated circuit 6260 had completed the selection phase and issued a system hardware interrupt SELDO to microprocessor 221 of computer system 220. In turn, microprocessor 221 had called SCSI manager 301 which in turn called Sparrow driver 302. Sparrow driver 302 detected the interrupt and transferred processing to interrupt handler 506 (FIG. 6) so that selection complete test 2407 (FIG. 24) branches to label INTSEL 2501 (FIGS. 24 and 25). However, prior to considering the operation of interrupt handler 506 (FIG. 6) at label INTSEL 2501 (FIG. 25), the remainder of the interrupt checks (FIG. 24) in interrupt handler 506 are described for completeness. Also, the operations performed at each of the labels from the interrupt checks are described below.

Reselected by target check 2408 (FIG. 24) examines bit SELDI in register SSTAT0. If bit SELDI is set, processing transfers to label INTRSEL 4101 (FIG. 41). Otherwise, check 2408 transfers processing to DMA done check 2409 which in turn examines bit DMADONE in register SSTAT0. If this bit is set, processing transfers to label RET2ACTIVE 4201 (FIG. 42) and otherwise to phase expected check 2410. Phase expected check 2410 checks bit PHASEMIS in register SSTAT1 and if the bit is set transfers processing to label RET2ACTIVE 4201 and otherwise to REQ from target check 2411.

REQ from target check 2411 examines bit REQINIT in register SSTAT1 and if the bit is not set, transfers to software interrupt check 2414. If bit REQINIT is set, REQ from target 2411 passes processing to ACKI check 2412. ACKI check 2412 tests bit ACKI in register SCSISIG (FIG. 8A) to determine whether an acknowledge signal is still active on SCSI bus 110. If the acknowledge signal is active, bit REQINIT is a phantom and processing transfers to software interrupt check 2414. If the acknowledge signal is inactive, processing transfers to request from target check 2413, which operates as described above for check 2411.

Software interrupt check examines bit SWINT in register DMACNTRLO (FIG. 8C). If the bit is set processing transfers to label SOFT_INT 4301 (FIG. 43) and otherwise to label RETURN$ 2115 (FIG. 21B). The operations at label RETURN$ 2115 (FIG. 21B) are illustrated in FIG. 21B.

Thus, Sparrow interrupt handler 506 examines the registers described above to determine whether a SCSI bus reset, selection timeout, bus free, selection complete, reselection by target, DMA done, phase expected, request from target, or software interrupt has occurred. If one of these interrupts is not detected, whatever caused the interrupt has been cleared and processing is returned to SCSI manager via RETURN$ 2115 (FIG. 21B).

Recall that in the example described above, test 2407 passed processing to label INTSEL 2501. At label 2501 (FIG. 25), waiting SCB check 2502 examines the SCB array for an SCB with a command status of "waiting". Since selection is complete, there should be only one SCB with a status of "waiting". When the waiting SCB is found, the pointer to the waiting SCB is obtained by get pointer 2507 and then get address 2508 gets the address for resumption of processing that was stored in the SCB upon the first call to Sparrow driver 302, described above. After obtaining the address, processing jumps to that address 2509. Prior to considering the operations upon the jump back to the SCSI operations, the processing that follows if a waiting SCB is not found by "waiting SCB" check 2502 is described.

When a target has been selected but there is not waiting SCB, the first operation is disable selection out 2503 which turns off bits ENSELO and ENAUTOATNO in register SCSISEQ (FIG. 8A). The subsequent operations send an abort message to the target. Since there are several different operations which want to send the abort message to the target, label ABORT_TARG 2504 is inserted at this point and is referred to in the following description.

Figure 26:
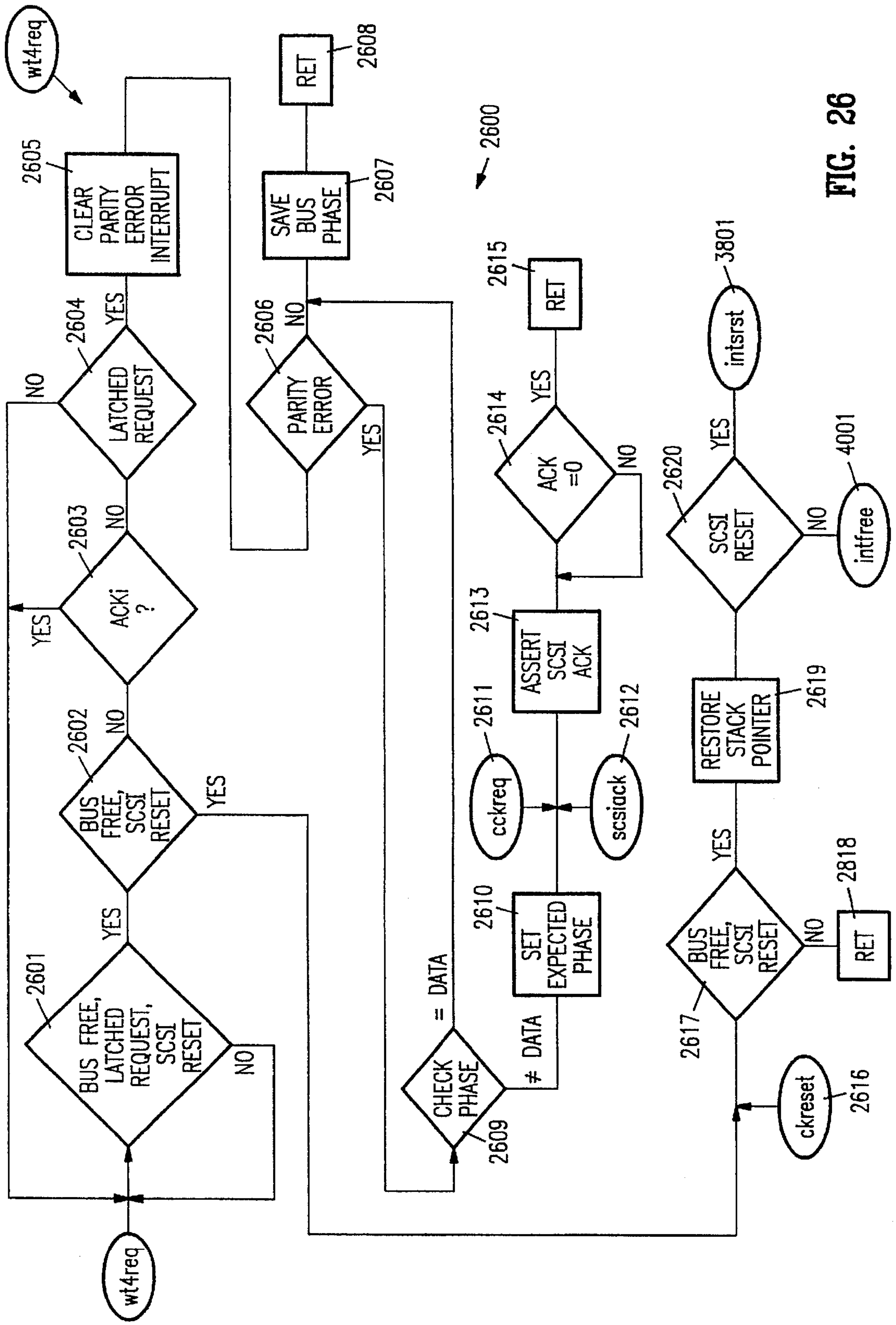

Since attention is asserted, call wait for request 2600 performs the operations illustrated in FIG. 26. Initially, bus free, latched request, or SCSI reset check 2601 examines the register bits BUSFREE, SCSIRSTI, REQINIT in register SSTAT1 (FIG. 8B). If none of these bits are set, processing simply. loops through check 2601 until one of the three bits is set. Next, bus free and SCSI reset check 2602 determines whether either bit SCSIRSTI or bit BUSFREE was set. If neither of these bits is set, processing transfers to ACKI check 2603. If the acknowledge signal is not set on SCSI bus 110, processing transfers to latched request check 2604. Otherwise, check 2603 returns to initial check 2601. If bit REQINIT is set, a latched request has occurred and processing transfers to clear parity error interrupt 2605. Clear parity error interrupt 2605 sets bit CLRSCSIPERR in register CLRSINT1 (FIG. 8B).

If a current or previous parity error exists, attention is asserted. Accordingly, parity error check 2606 examines bit SCSIPERR in register SSTAT1 to ascertain whether a parity error is still on SCSI bus 110 in which case status bit SCSIPERR remains active after the clear. If bit SCSIPERR is set, data phase check 2609 checks bits CDI and MSGI in register SCSISIG to determine whether the SCSI phase is data. If data phase is set, processing transfers to save bus phase 2607 and returns. Similarly, if bit SCSIPERR is not set, processing transfers to save bus phase 2607. The error is handled by interrupt handler 506 upon the return.

If data phase check 2609 does not detect the data phase, attention has automatically been asserted and the current byte from the target is ignored because it has a parity error. Set expected phase 2610 sets the expected phase to the current phase so as to enable the subsequent acknowledge. Processing then transfers to assert SCSI ACK 2613 which first enables a PIO data transfer by setting bits CH1/CH2 and SPIOEN in register SXFRCTL0 (FIG. 8A). Next, the acknowledge signal is asserted and then the PIO data transfer is disabled by resetting bits CH1/CH2 in register SXFRCTL0. "ACK equals 0" check 2614 waits until the ACKI bit in register SCSISIG is 0 and then returns to the calling program.

The previous discussion assumed that bus free or SCSI reset check 2602 failed to detect either of the two interrupts. If either interrupt occurred, processing transfers to busfree or SCSI reset check 2617. If the status bit for neither interrupt is set, processing returns to the calling location in Sparrow driver 302. If either status bit is set, restore stack pointer 2619 restores the stack pointer. SCSI reset 2620 transfers processing to label INTSRST 3801 (FIG. 38) if a SCSI bus reset occurred and otherwise to label INTFREE 4001 (FIG. 40).

Hence, call Wait for request 2600 when called in the handling of interrupt SELDO simply waits until a latched request occurs and then checks for a parity error. If there is no parity error, the bus phase is set and processing returned to check bus phase 2506 (FIG. 25). Check bus phase 2506 determines whether the phase is equal to "message out".

If the phase is not message out, the target cannot be aborted. Accordingly, processing transfers to set expected phase 2514 which sets the expected phase to the current phase. Next, set data transfer mode 2515 sets bit BITBUCKET in register SXFRCTL1 so that if any data is transferred the bit bucket mode of operation of H/A integrated circuit 6260 simply throws the data away.

Phase change check 2516 examines bits SCSIRSTI, PHASEMIS, and BUSFREE in register SSTAT1. If any one of the bits changes, processing transfers to SCSI reset or bus free check 2517. If the bit that has changed is either for SCSI reset or bus free, processing transfers to turn off attention 2518, which is described more completely below. If the SCSI reset or bus free bits are not set, a phase change has occurred. Processing transfers to check bus phase 2506 to determine what has occurred.

The previous description of the processing that originated at label INTSEL 2501 assumed that check bus phase 2506 did not detect the message out phase. If check bus phase 2506 detects the message out phase, processing transfers to turn off attention 2510. Turn off attention 2510 sets bit CLRATN0 in register CLRSINT1 (FIG. 8B). Turn off attention 2510 also sets the expected phase to message out. Next, abort target 2511 sends an abort message to the target. After the abort message is sent, complete handshake 2512 sends a SCSI acknowledge signal ACK to the SCSI bus.

Bus free check 2513 tests if bit BUSFREE in register SSTAT1 is set. Bus free check 2513 provides a wait for the SCSI bus to go free. This wait is needed to assure that bits SELDI and SELDO in register SSTAT0 have been cleared by the bus free interrupt before the next Sparrow interrupt or starting another command. When bit BUSFREE is set, processing transfers to turn off attention 2518. Turn off attention 2518 sets bit CLRATN0 in register CLRSINT1 to deassert the SCSI bus attention signal ATN. Disable bus free interrupt 2519 turns off bits ENBUSFREE, ENPHASEMIS, ENSCSIPERR, ENPHASECHG, and ENREQINIT in register SIMODE1. Subsequently, disable parity checking 2520 turns off bit ENAUTOATNP in register SCSISEQ and bit ENSPCHK in register SXFRCTL1. Processing then returns via return 2112.

Thus, when waiting SCB check 2502 does not find a SCB with a status of waiting, the processing proceeds and eventually returns to SCSI manager 301 after H/A integrated circuit 6260 has been put in the proper state as indicated by the interrupts and the information on the SCSI bus.

Figure 27A:
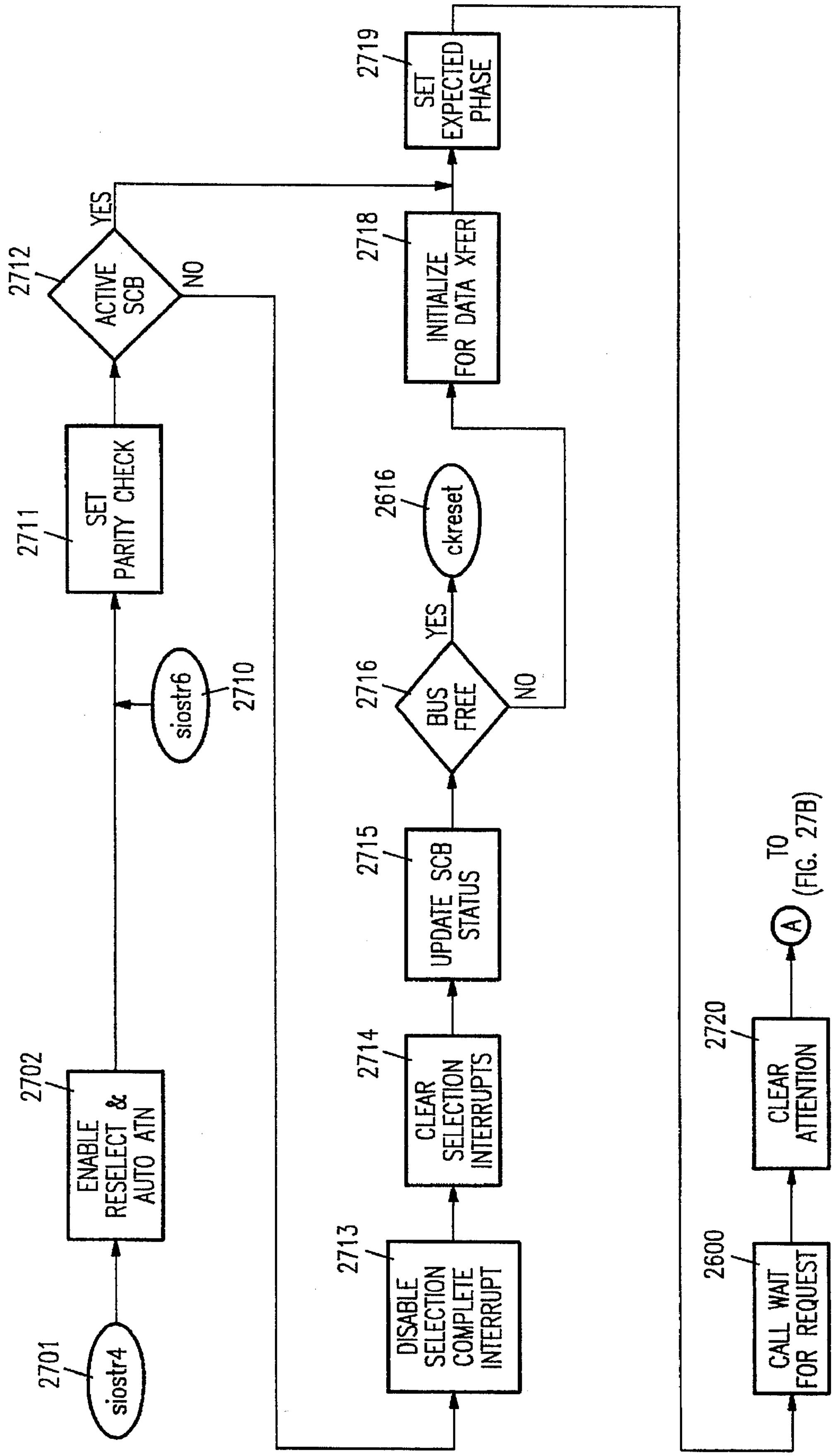

In the example being considered, interrupt handler 506 was called when the interrupt SELDO occurred. The above description of the process at label 2501 when a waiting SCB was not found was included for completeness. Returning to the case when the waiting SCB was found for interrupt SELDO, the interrupt handler 2509 jumps to label SIOSTR0 2305 (FIG. 23A). Enable bus free and parity error detection 2306 sets bits CLRBUSFREE and CLRSCSIPERR in register CLRSINT1 so as to clear the bus free interrupt and the parity error status. Processing then transfers to label SIOSTR4 2701 (FIG. 27A). As described above, linked command check 2211 (FIG. 22) in SCSI operations also branches to label SIOSTR4 2701 so that the following description describes the operations after transfer from either operation.

Upon processing transferring to label SIOSTR4 2701 (FIG. 27A), "enable reselect and auto attention on parity error" 2702 sets bits ENRSELI and ENAUTOATNP in register SCSISEQ (FIG. 8A).

Set parity check 2711 sets bit ENSPCHK in register SXFRCTL1. After the parity check bit is set, active SCB check 2712 obtains a pointer to the current SCB and compares the status of that SCB with "active". If the current SCB is active, processing transfers to set expected phase 2719. Conversely, if the SCB is not active, disable selection complete interrupt 2713 turns off bit ENSELDO in register SIMODE0 (FIG. 8B). Clear selection interrupts 2714 then sets bits CLRSELDO and CLRSELINGO in register CLRSINT0. Subsequently, update SCB status 2715 sets the current SCB status to "active". After the SCB status is updated, bus free check 2716 reexamines bit SELDO in register SSTAT0. If a bus free occurred since the completion of the selection, bit SELDO is zero. If an unexpected bus free has occurred, bus free check 2716 passes processing to label CKRESET 2616 (FIG. 26). If bus free check 2716 fails to detect a free bus, processing transfers to initialize data transfer 2718.

Upon entry to initialize data transfer 2718, the selection has been completed and a pointer is derived to the transfer option in the active SCB. The address for starting the data transfer is also determined. Completion of initialize data transfer places H/A integrated circuit 6260 in the same status as when an active SCB is encountered at active SCB check 2712. Accordingly, both active SCB check 2712 and initialize data transfer 2718 transfer processing to set expected phase 2719, where bits CDEXP, MSGEXP (hereinafter "MOPHASE" refers to bits CDEXP, MSGEXP being set) in register SCSISIG are set to message out, the expected phase. Subsequently, processing transfers to call wait for request 2600 (FIGS. 27A and 26). The operations in call wait for request 2600 (FIG. 26) were described above and are incorporated herein by reference.

Figure 27B:
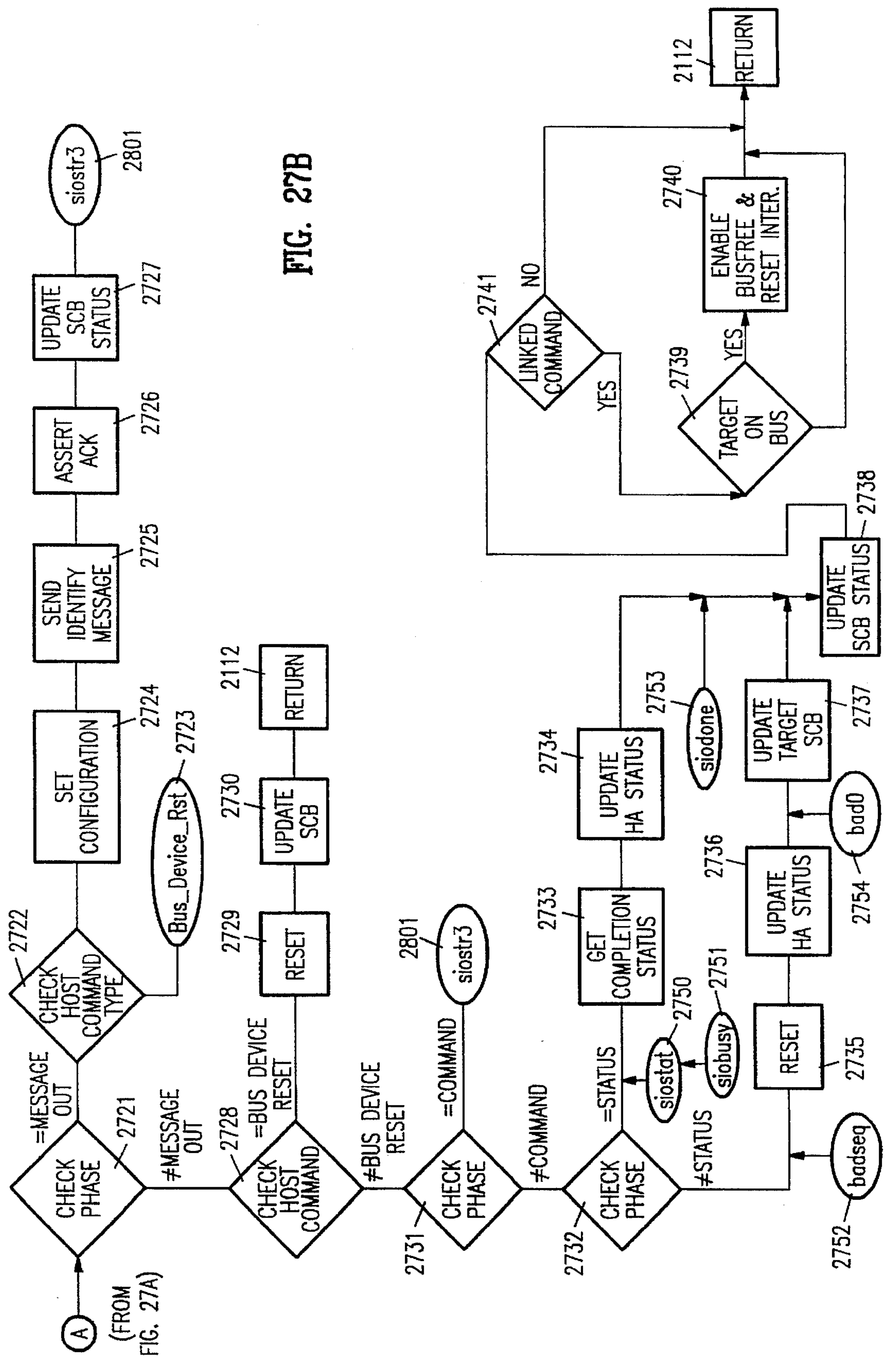
Figure 28:
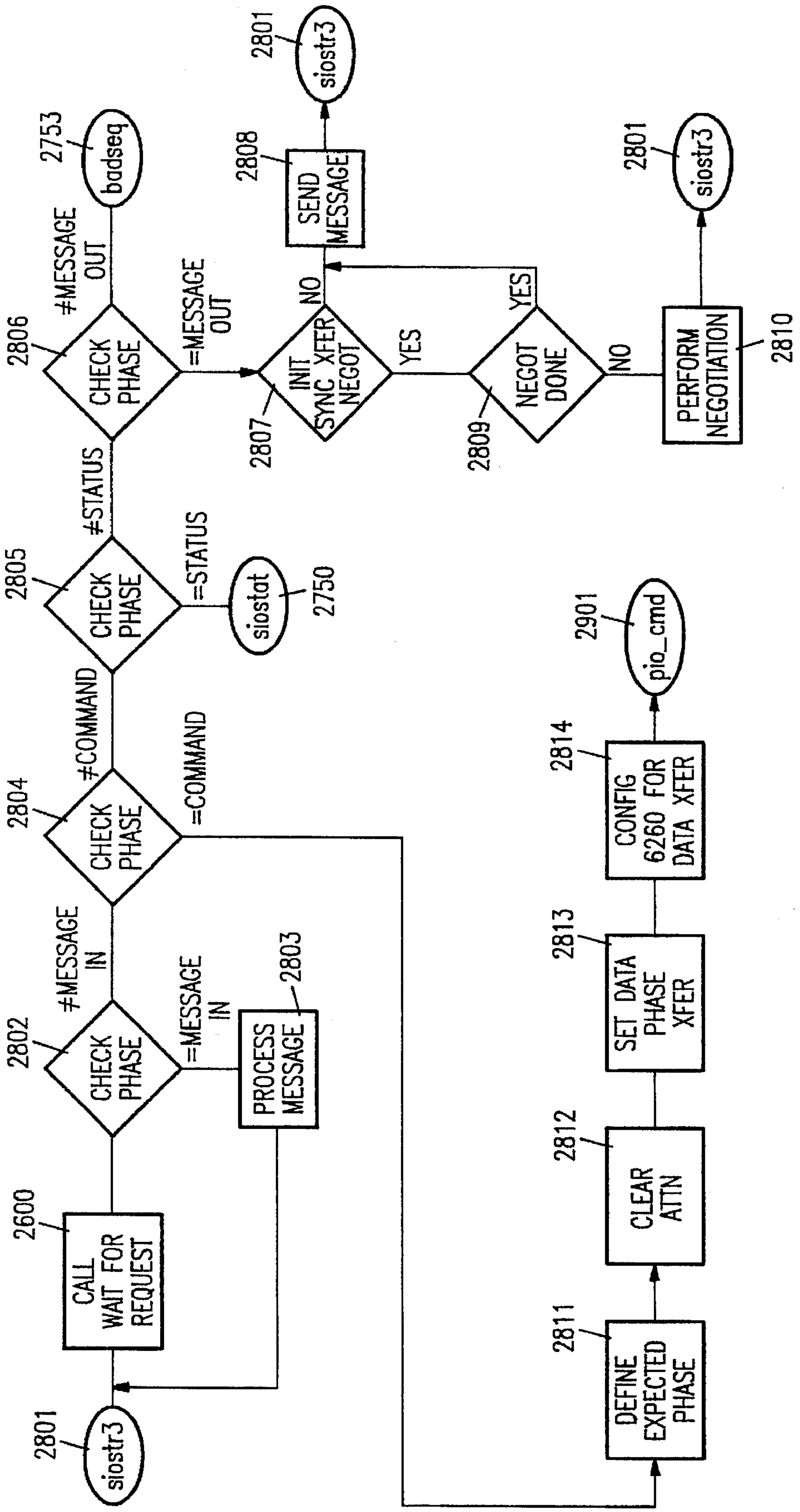

Upon return from call wait for request 2600, clear attention 2720 sets bit CLRATNO in register CLRSINT1. Processing then transfers to check phase 2721 (FIG. 27B). Check phase 2721 determines whether the phase is message out. If the phase is not message out, processing transfers to check host command type 2728. If the host command type is "bus device reset", processing transfers to reset 2729 which resets the target. Following reset 2729, the corresponding SCB is updated by update SCB 2730 to show the reset and then processing returns via return 2112 (FIG. 21B). If the host command type is not equal to "bus device reset", check host command 2728 transfers processing to check phase 2731. If the phase equals "command", processing transfers to label SIOSTR3 2801 (FIG. 28). Conversely, if the phase is not equal to "command", a second check phase 2732 determines whether the phase equals "status". If the phase equals status, processing transfers to get completion status 2733, which calls message handler 501 (FIG. 6) to obtain the completion status and completion message. Also, labels SIOSTAT 2750 and SIOBUSY 2751 transfer processing to get completion status 2733. Update host adapter status 2734 sets the host adapter status to no error and processing goes to update SCB status 2738. Label SIODONE 2753 also transfers processing to update SCB status 2738.

If check phase 2732 fails to detect the phase status, processing transfers to reset 2735 which resets the SCSI bus. Label BADSEQ 2752 also transfers processing to reset 2735 upon a branch to that label, as described below. Update host adapter status 2736 sets the host status to an invalid sequence while subsequent update target SCB 2737 sets the target status to zero. Label BAD0 2754 starts processing at update target SCB 2737 on a jump to that label. Next, update SCB status 2738 sets the current active SCB status to "done".

Subsequently, linked command check 2741 passes processing to return 2112 if a linked command is not being processed. Otherwise, processing transfers from check 2741 to target on bus 2739. Target on bus 2739 checks to determine whether the target is still connected to SCSI bus 110 and waiting for a linked command. If the target is on bus 110, enable bus free and reset interrupts 2740 sets bits ENSCSIRST and ENBUSFREE. Processing then returns to SCSI manager 301 via return 2112.

The above sequence of operations resulted from check phase 2721 failing to detect phase "message out". However, if check phase 2721 detects phase message out, processing transfers to check host command type 2722. If the host command type is bus device reset, processing transfers to label BUS_DEVICE_RST 2723 which results in resetting of the SCSI target and updating the appropriate SCB. If the host command type is other than bus device reset, processing transfers to set configuration 2724. Briefly, set configuration 2724 programs H/A adapter chip 6260 for subsequent operations.

Specifically, in this embodiment set configuration 2724 first reads from the port B section of memory 230 to ascertain whether the bit ENDISCON should be set so as to allow disconnection. Next, the identify message is configured to either include the disconnect option or specifically say without disconnect. After the identify message is configured to reflect the disconnection option, the data is tested to determine whether to initiate a synchronous transfer. If a synchronous transfer is to be negotiated, a check is first made to determine whether the synchronous transfer negotiation is completed. If the synchronous transfer is completed, no action is taken. But if the synchronous transfer has not yet been negotiated, the bits ATNO and MOPHASE in register SCSISIG are set. This completes configuration set up 2724 and processing transfers to send identify message 2725 which sends the message just created to the target.

The identify message sent includes the ID message flag, the disconnect option and the logical unit number for the target. After sending the identify message, assert acknowledge 2726 programs H/A integrated circuit 6260 to assert acknowledge on SCSI bus 110. Update SCB status 2727 changes the active SCB status to include information that the ID identify message was sent to the target and processing then branches to label SIOSTR3 2801 (FIG. 28).

At label SIOSTR3 2801 (FIG. 28), call wait for request 2600 (FIGS. 28 and 26) performs the operations previously described. Check phase 2802 ascertains whether the SCSI phase equals "message in". If the phase equals message in, the message is processed by the message handler through process message 2803 and processing returns to call wait for request 2600. If the phase is not message in, the phase is subsequently checked to determine whether the phase is a command phase, status phase, or message out phase by check phases 2804, 2805, and 2806, respectively. If none of these phases are detected, processing transfers to label BADSEQ 2753 (FIG. 27B). The processing upon transfer to label BADSEQ 2753 was previously described with respect to FIG. 27B, and is incorporated herein by reference.

If check phase 2806 detects phase message out, processing transfers to initiate synchronous transfer negotiation 2807. If synchronous transfer negotiation is desired, processing transfers to negotiation done 2809 which checks to see whether the negotiation has previously been performed. If negotiation has been performed, processing branches to send message 2808. Send message 2808 sends a NOP message to the target and processing transfers to label SIOSTR3 2801. If negotiation has not been performed, perform negotiation 2810 programs H/A integrated circuit 6260 and the negotiation is completed. Upon completion of the negotiation, processing returns to label SIOSTR3 2801.

If check phase 2805 detects status phase, processing transfers to label SIOSTAT 2750 (FIG. 27B) which was described previously. Finally, if check phase 2804 detects phase command, processing transfers to define expected phase 2811 which sets the expected phase to command and then processing transfers to clear attention 2812 which clears bit CLRATNO in register CLRSINT1. Set data phase transfer options 2813 establishes whether the data transfer is synchronous or asynchronous. Configure 6260 data transfer 2814 programs H/A integrated circuit 6260 for the subsequent data transfer.

Figure 29:
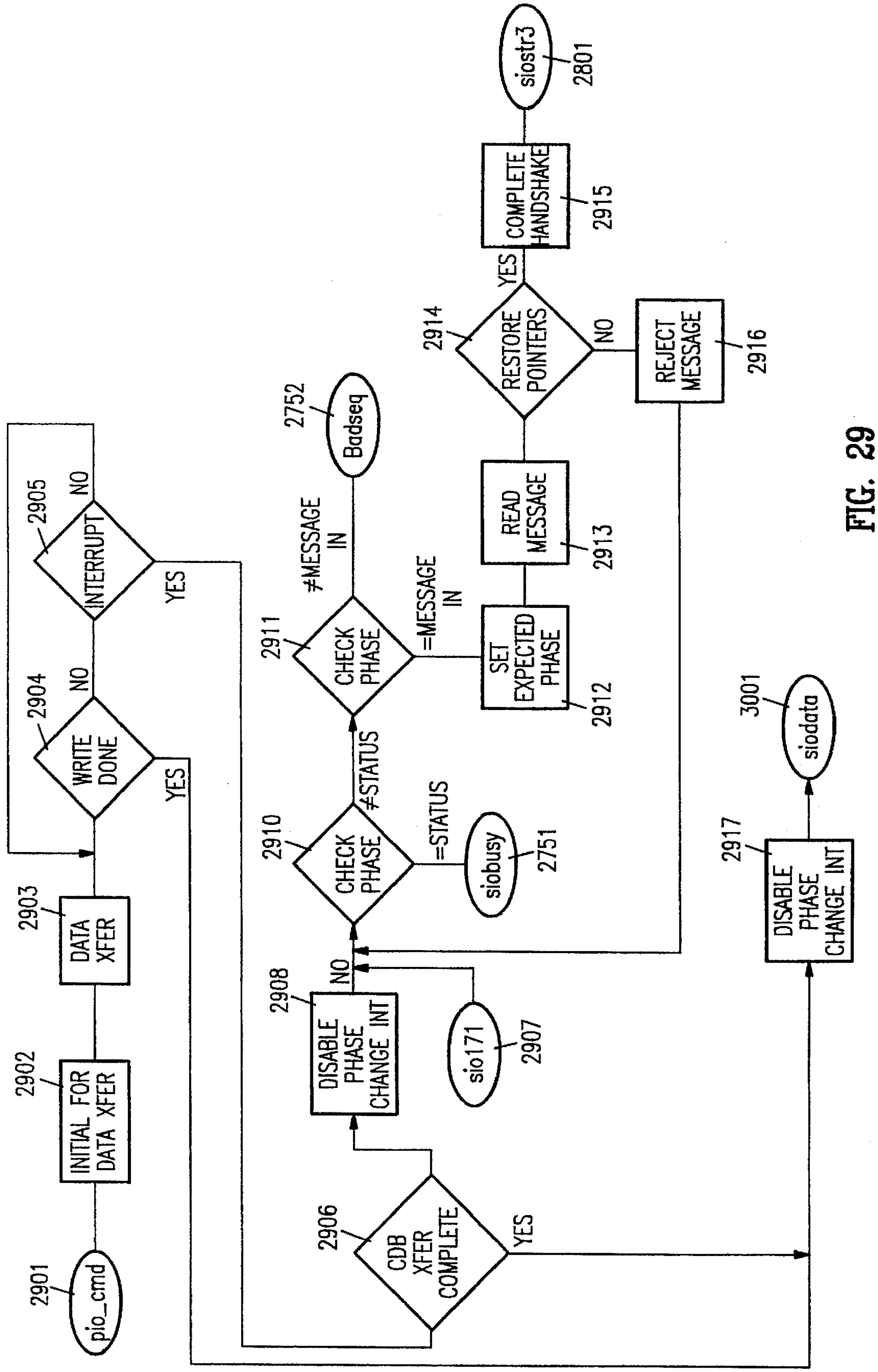

Specifically, in one embodiment configure 6260 data transfer 2814 sets the SCSI transfer rate and then sets bit ENAUTOATNP in register SCSISEQ so as to enable the auto attention on parity error check. Next, channel one and the transfer count are cleared by setting bits CH1/CH2, CLRSTCNT, and CLRCH1 in register SXFRCTL0. Next, the port A region of RAM 230 (FIG. 2) is checked to determine whether the parity check has been enabled and then bit ENSPCHK is appropriately set in register SXFRCLT1. Subsequently, status bit DMADONE is cleared by setting bit CLRDMADONE in register CLRSINT0 (FIG. 8B). The clear parity error status bit CLRSCSIPERR in register CLRSINT1 is set to clear any residual parity error status. Finally, any SCSI errors are cleared by setting bits CLRSYNCERR, CLRFWERR and CLRFRERR in register CLRSERR (FIG. 8B). This completes the operation in configuration of 6260 for data transfer 2814 (FIG. 28), and processing transfers to label PIO_CMD 2901 (FIG. 29).

Operations starting at label PIO_CMD 2901 transfer the CDB in the current SCB to the target. H/A integrated circuit 6260 is first programmed for the PIO data transfer and then the microprocessor instruction "OUTSW" is used to transfer the data through FIFOs 405, 406 (FIG. 4) to SCSI bus 110 and consequently to the target device.

Specifically, in this embodiment, at PIO_CMD 2901 (FIG. 29), initialize for data transfer 2902 performs a series of operations to configure H/A integrated circuit 6260 for transfer of the data during the SCSI command phase. Initially, the bit for the direction of transfer is cleared and then bits RSTFIFO and WRITEREAD in register DMACNTRL0 (FIG. 8C) are set to enable a PIO data transfer and to clear DMA FIFO 405 (FIG. 4). Next bits ENDDMA and WRITEREAD are set to enable the PIO transfer with a direction of write. The next operations in initialize for data transfer 2902 (FIG. 29) set bits CLRSTCNT, CLRCH1, SCSIEN, DMAEN, and CH1/CH2 in register SXFRCTL0 to reset SCSI FIFO 406 (FIG. 4) and to enable a SCSI transfer. Next, a pointer to the current SCB is obtained and a pointer set to the CDB in the current SCB. After establishment of the pointer to CDB, the CDB length is initialized. The bits ENSCSIRST, ENPHASEMIS and ENBUSFREE in register SIMODE1 are set to enable the SCSI reset, phase change and bus free interrupts. The next set of operations loads DMA FIFO 406 port address and the number of words to transfer from the host. After this set of operations, initialize for data transfer 2902 (FIG. 29) transfers processing to data transfer 2903.

Data transfer 2903 uses the microprocessor instruction "OUTSW" to transfer words to FIFO 405 (FIG. 4). For the last byte, the microprocessor instruction "OUTSB" may be used. As explained previously, after data is transferred to DMA FIFO 405, the data is transferred through SCSI FIFO 406 to SCSI bus 110. Hence, write done 2904 and interrupt check 2905 are used to ascertain whether the data transfer is complete. Specifically, write done 2904 checks bit SEMPTY in register SSTAT2 and transfers to disable phase change interrupt 2917 if bit SEMPTY is set.

If write done check 2904 does not detect that bit SEMPTY is set, processing transfers to interrupt check 2905 which examines bit INSTAT in register DMASTAT. If this bit is not set, waiting continues by transferring back to write done check 2904. However, if bit INTSTAT is set, processing transfers to CDB transfer complete 2906.

CDB transfer complete 2906 compares register STCNT0 with the stored command length to ascertain whether the target has taken all the CDB bytes. If the transfer is complete processing transfers to disable phase change interrupt 2917, as described more completely below.

If the processing is not complete, processing transfers to a second disable phase change interrupt 2908. Disable phase change interrupt 2908 turns off bits ENPHASEMIS and ENBUSFREE in register SIMODE1. After completion of disable phase change interrupt 2908, check phase 2910 determines whether the SCSI phase is equal to "status". If the phase is equal to status, processing transfers to label SIOBUSY 2751 (FIG. 27B).

If check phase 2910 does not detect a SCSI phase equal to status, processing transfers to a second check phase 2911 (FIG. 29) which determines whether the SCSI phase is equal to "message in." If the SCSI phase is not message in, processing transfers to label BADSEQ 2752 (FIG. 27B). If check phase 2911 detects SCSI phase message in, set expected phase 2912 sets message in as the expected phase. Read message 2913 reads the message from the target in register SCSIDAT. Restore pointers check 2914 tests the message to determine whether the message is "restore data pointers." If this is the message, a possible parity error has been detected by the target so that complete handshake 2915 performs the necessary operations to complete the transmission and then branches to label SIOSTR3 2801 (FIG. 28) to restart the CDB to target transfer. If the message is not "restore data pointers", restore pointers check 2916 passes processing to reject message 2916 which simply rejects the message and transfers processing to check phase 2910.

Figure 30:
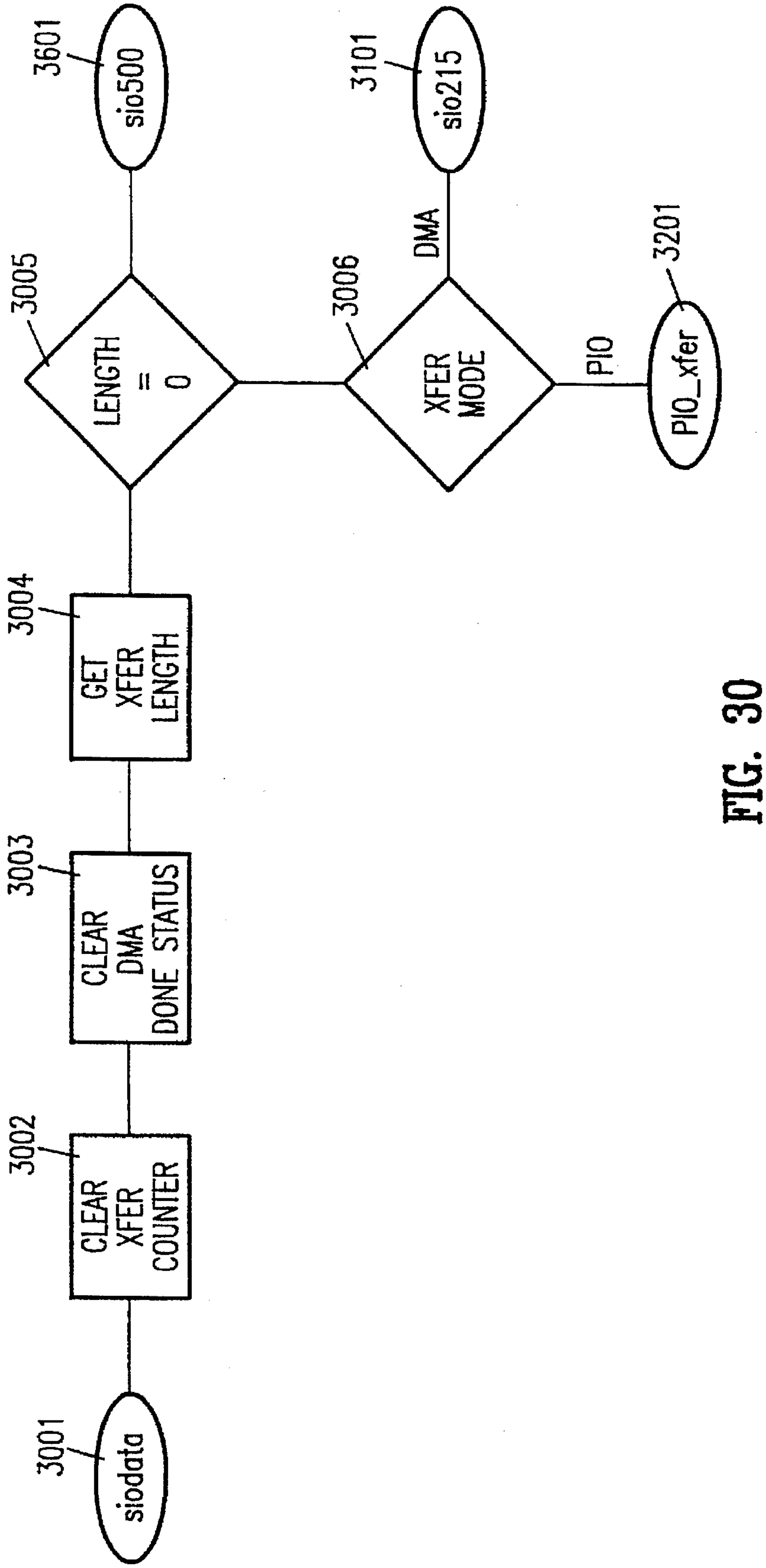

If processing in the transfer of the CDB to the target was complete, processing transfers from check 2906 to disable phase change interrupt 2917 which, as previously described, turns off bits ENPHASEMIS and ENBUSFREE in register SIMODE1. Processing then transfers to label SIODATA 3001 (FIG. 30).

Figure 31A:
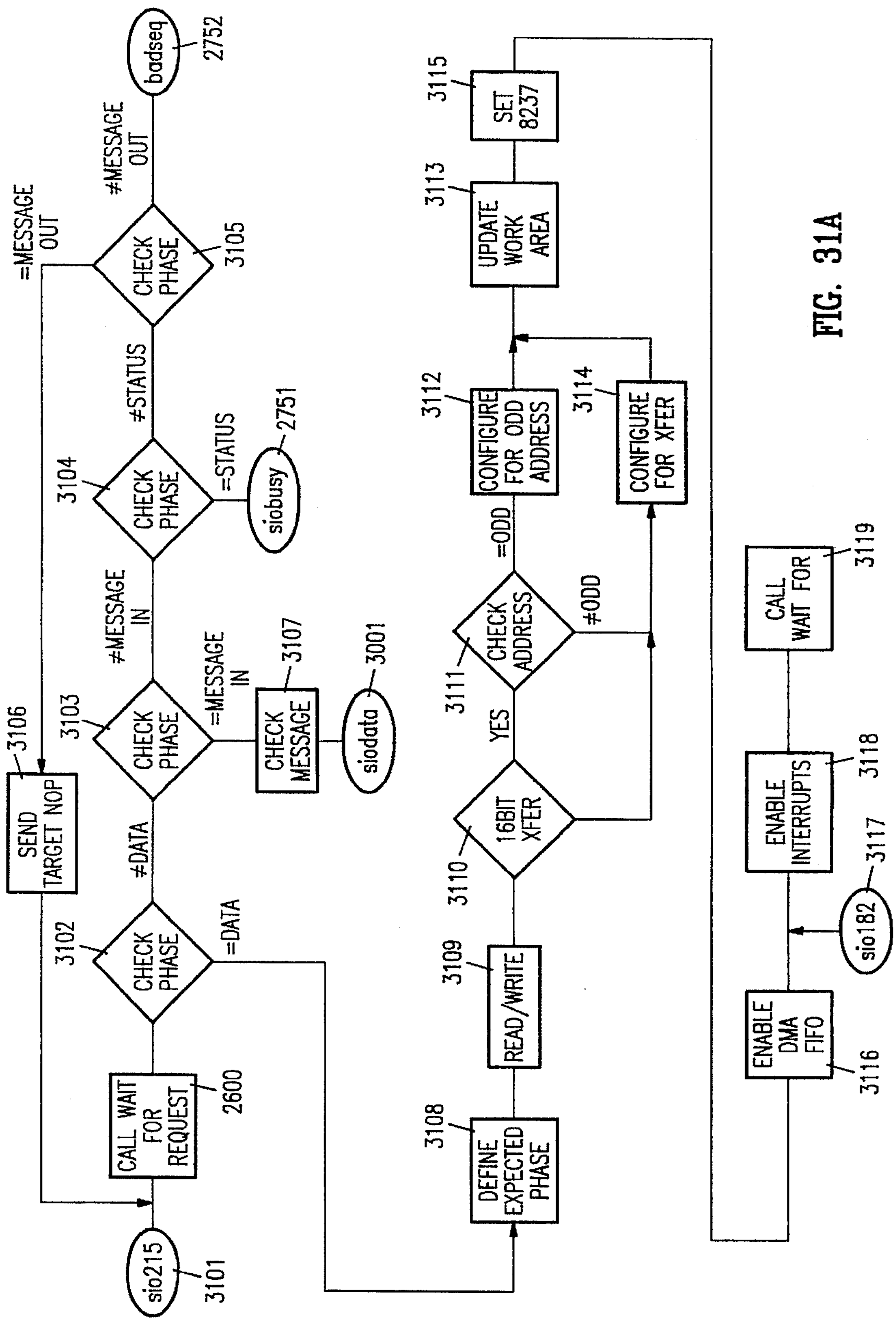
Figure 31B:
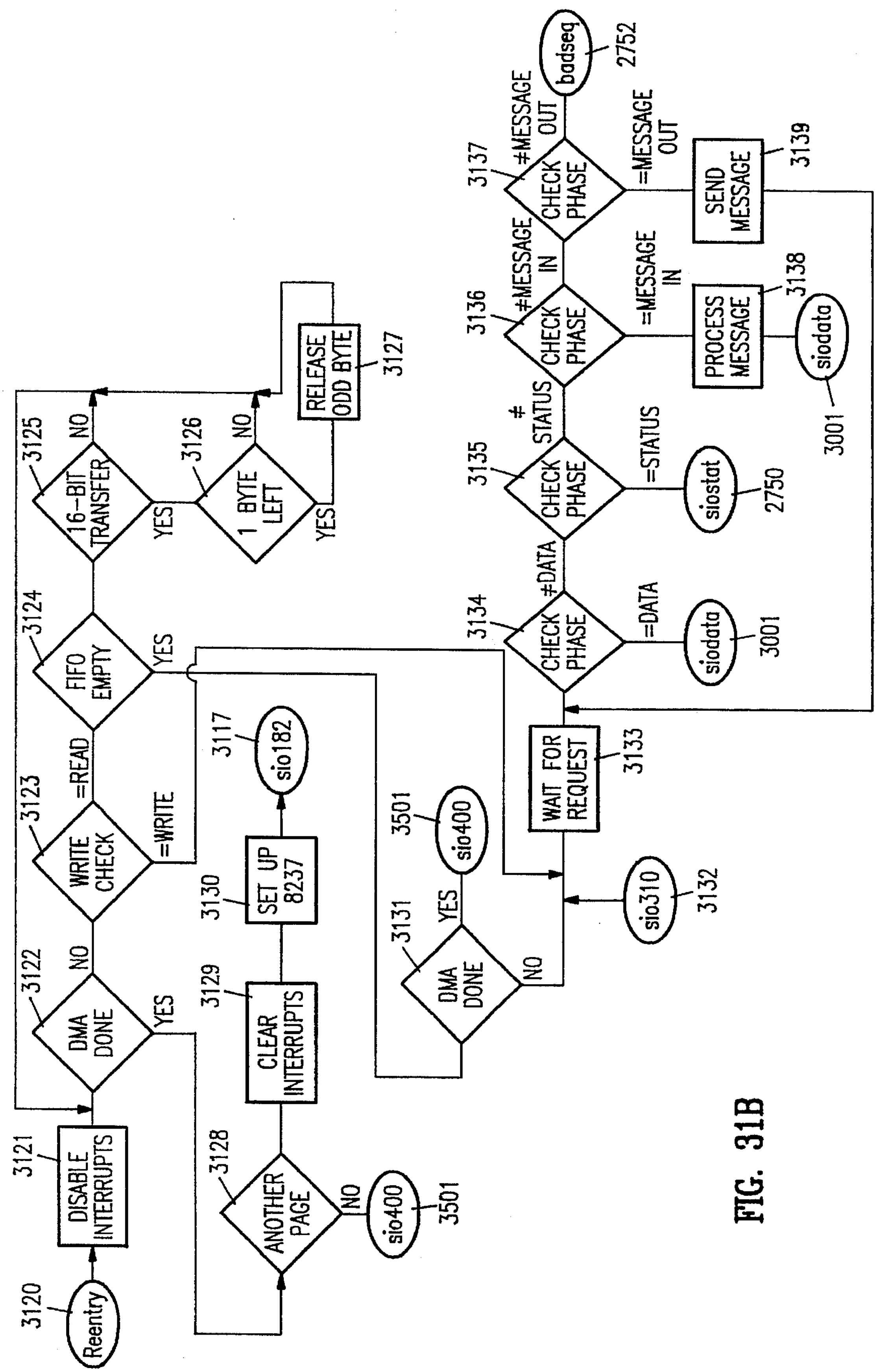
Figure 32:
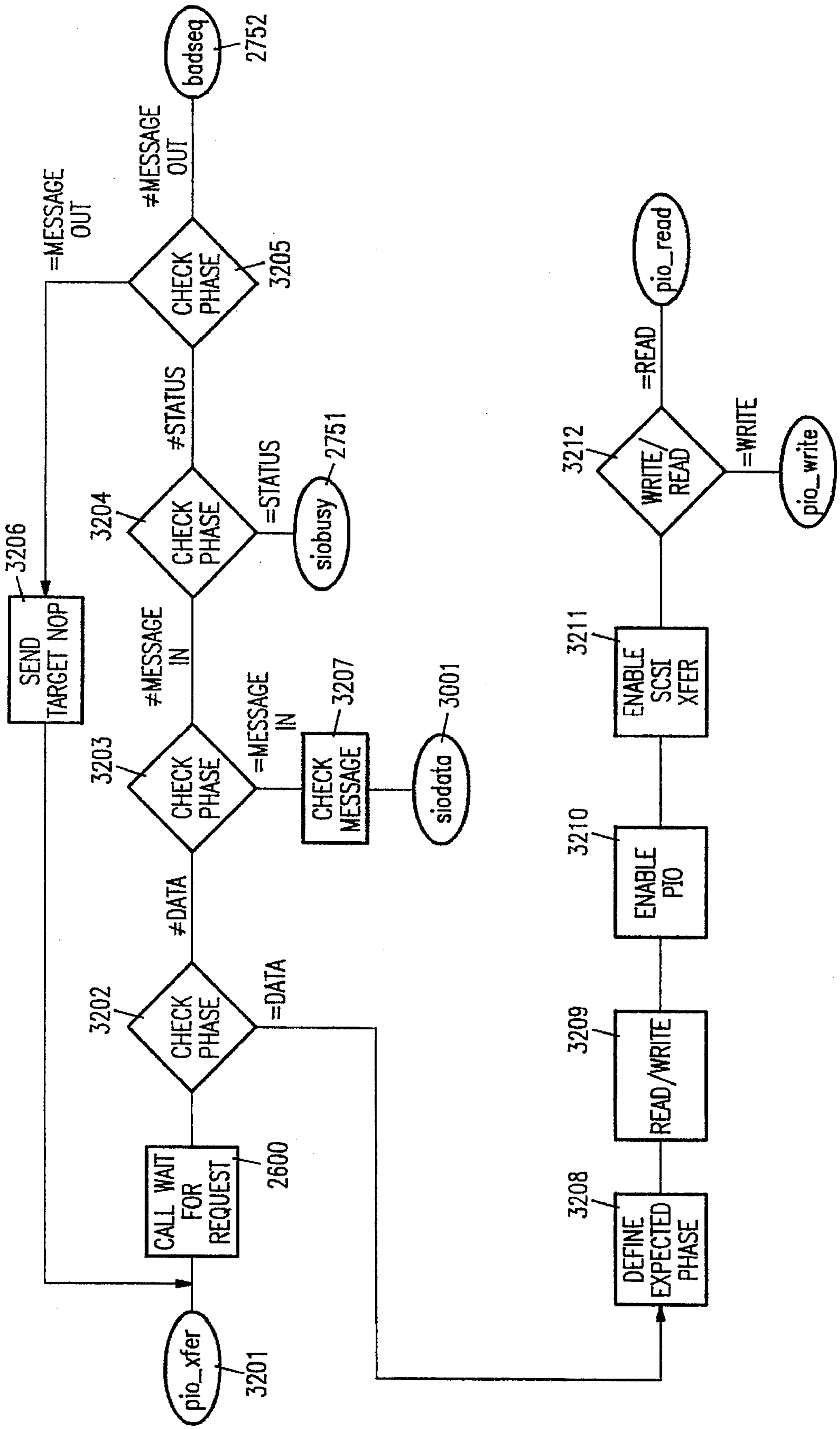
Figure 36:
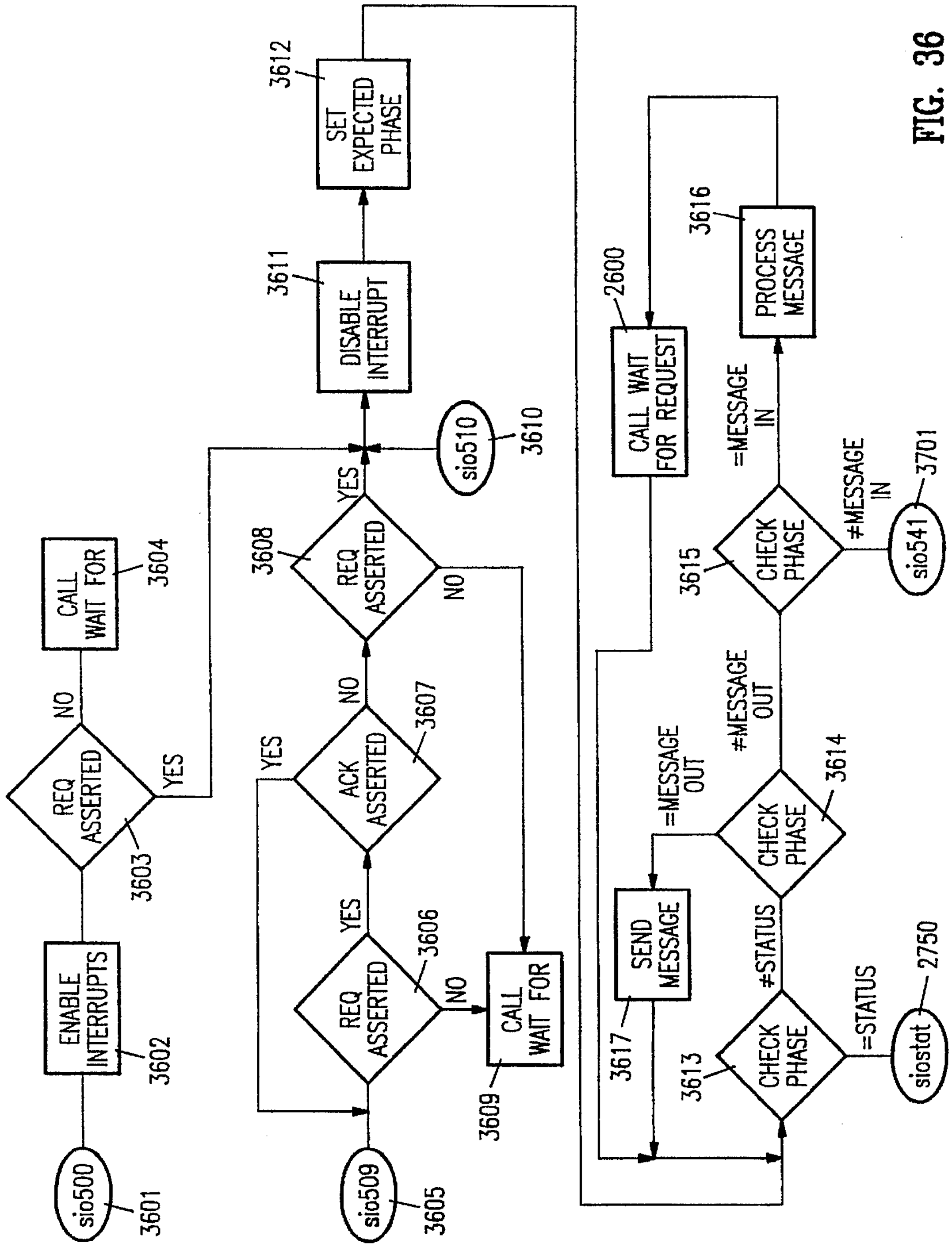

The process beginning at label SIODATA 3001 (FIG. 30) is the initiation of the SCSI phase data wherein data is transferred between the target and the host. Initially, clear transfer counter 3002 sets bits CH1/CH2 and CLRSTCNT in register SXFRCTL0. Clear DMADONE status 3003 sets bit CLRDMADONE in register CLRSINT0. Get transfer length 3004 gets the length of the data to be transferred. If the data transfer length equals 0 processing transfers through check 3005 to label SI0500 3601 (FIG. 36). Otherwise, processing transfers to transfer mode check 3006 (FIG. 30). If the transfer mode specified in the SCB is DMA, processing branches to label SIO215 3101 (FIG. 31). Conversely, if the transfer mode is PIO, processing transfers to PIO_XFER 3201 (FIG. 32).

If a DMA data transfer was specified, at label SI0215 3101 (FIG. 31A), call wait for request 2600 is used to determine the data transfer direction. Next, check phase test 3102 determines whether the phase is equal to the SCSI data phase. If the phase is not equal to data, processing transfers to check phase 3103. If the SCSI phase is not message in, processing transfers from check phase 3103 to check phase 3104. If the phase is not equal to "status", processing passes to a third check phase 3105 where if phase is not equal to message out, processing transfers to label BADSEQ 2752 (FIG. 27B). If the phase is equal to message out, send target NOP 3106 (FIG. 31A) sends a NOP message to the target and processing returns to call wait for request 2600 (FIG. 31A and FIG. 26). If the phase is equal to status, check phase 3104 transfers processing to label SIOBUSY 2751 (FIG. 27B). Similarly, if the phase is equal to message in, check phase 3103 (FIG. 31A) transfers processing to check message 3107 which handles the message using the message handler and then transfers processing to label SIODATA 3001 (FIG. 30).

For a DMA transfer, if the SCSI phase is data, check phase 3102 (FIG. 31A) passes processing to define expected phase 3108 which defines the expected phase as the data phase. Read/write 3109 determines whether data are to be read or written. Next, 16 byte transfer check 3110 determines whether the data transfer is 16 bit or 8 bit transfer. If a 16 bit data transfer is specified, processing transfers to check address 3111.

Check address 3111 passes processing either to configure for odd address 3112 or configure for data transfer 3114 depending on whether the address is odd or even. If the address is odd, this is a special case of a 16 bit transfer with an odd starting address. The first operation in set configuration 3112 is to determine the direction of the data transfer, typically whether a write or a read is required. If the data transfer is a write, the first bit transferred by the host is the last byte previously written to the target. Accordingly, the byte is discarded. Next, bits RSTFIFO, DMAPIO, and WRITEREAD in register DMACNTRL0 are set. Since one byte is going to be discarded the number of bytes for the DMA transfer is increased by one. This completes the operations of configure for odd address 3112 if a write is specified.

If a read is specified, configure for odd address 3112 first disables data word framing. Typically, bit BYTEALIGN in register SXFRCTL1 is turned off. Next, DMA FIFO 405 is reset and configured for a PIO transfer to FIFO 405. Specifically, bits RSTFIFO, ENDMA and WRITEREAD in register DMACNTRL0 are set. Next, bit DMADATA in register DMACNTRL0 is set to enable the DMA transfer. The next operation is to prime the FIFO with the odd data byte previously saved in the SCB, as described more completely below. Finally, H/A integrated circuit 6260 is configured for a 16-bit DMA read by setting bit ENDMA in register DMACNTRL0. Also, in this operation the lower bytes to the DMA is increased by one since the FIFO is primed with the extra byte. This completes operations in configure for odd address 3112 when a read operation is specified.

If check address does not detect an odd address, as described above, processing transfers to configure for data transfer 3114. Here, the first operation is to disable data word framing by turning off bit BYTEALIGN, as described above. Next, DMA to system 220 is enabled by setting bits DMAPIO and RSTFIFO in register DMACNTRL0. Subsequently, the direction of data transfer is defined and the adjustment for the data length is set to zero since an even number of bytes is to be transferred.

Processing from either configure for odd address 3112 or configure for data transfer 3114 upon completion goes to update work area 3113. Update work area 3113 moves the data length and address for the transfer from the SCB to a RAM working area. The next operation is to set up the 8237 DMA controller 235 in system 220 (FIG. 2) for DMA data transfer. The operations required to set up the 8237 DMA controller are well known to those skilled in the art. One embodiment for setting the controller is provided in Microfiche Appendix A as subroutine 8237 which is incorporated herein by reference in its entirety.

After setup of 8237 DMA controller is complete, processing transfers to enable DMA FIFO 3116. Enable DMA FIFO 3116 sets bits ENDDMA and DMAPIO in register DMACNTRL0. Next, enable interrupts 3118 first enables the SCSI transfer by setting bits SCSIEN and DMAEN and CH1/CH2 in register CXFRCTL0. Subsequently, bit ENDMADONE in register SIMODE0 and bits ENSCSIRST, ENPHASEMIS, and ENBUSFREE in register SIMODE1 are set. Thus, the DMADONE, SCSIRESET, BUSFREE, and phase change interrupts have been enabled. At this point, H/A integrated circuit 6260 and system 220 have been programmed so that the DMA process is ready to proceed. As is known to those skilled in the art, the DMA transfer does not require host microprocessor 221. Accordingly, wait for module 504 (FIG. 6) is called by call wait for 3119 and as previously described, processing is returned to microprocessor 221 to proceed with operations for system 220.

H/A integrated circuit 6260 monitors the progress of the DMA data transfer and issues one of the enabled interrupts to microprocessor 221 upon completion of the transfer. As described above, upon receipt of the hardware interrupt, microprocessor 221 stops processing for system 220 and transfers control to SCSI manager 301. SCSI manager 301 subsequently transfers control to Sparrow driver 302 which branches to the interrupt handler as described above. The processing of the various interrupts, other than those described above, is described more completely below. Assuming the DMA data transfer was successfully completed and the DMADONE interrupt occurred, upon receipt of the interrupt, processing returns to the point immediately after call wait for 3119 which is marked as label REENTRY 3120 (FIG. 31B). Label REENTRY 3120 represents the address stored in the SCB and is not a physical label within Sparrow driver 302. Disable interrupts 3121 turns off bits ENPHASEMIS and ENBUSFREE in register SIMODE1 and bit ENDMADONE in register SIMODE0.

DMADONE check 3122 tests bit DMADONE in register SSTAT0. If the DMA transfer is not done, processing proceeds to write check 3123. Write check 3123 ascertains whether the DMA transfer was a read or a write. If the process was a read, the system must wait for the FIFOs to empty and so bit DFIFOEMP in register DMASTAT is checked by FIFO empty check 3124 to ascertain whether the FIFO is empty. If the FIFO is not empty, 16 bit transfer 3125 ascertains whether a 16 bit or 8 bit transfer was requested. If an 8 bit transfer was requested, processing returns to DMADONE check 3122. However, if a 16 bit transfer was requested, H/A integrated circuit 6260 must wait for the DMA done or for one byte in the FIFO. Accordingly, one byte left check 3126 first tests to see whether the FIFO count is quiescent. If the count is quiescent, processing transfers to DMADONE check 3122.

If the counter is still going, one byte left check 3126 ascertains whether only one byte is left to process. If more than one byte is left, processing returns to DMADONE check 3121. If only one byte is left, processing passes to release odd byte 3127.

Release odd byte 3127 first sets bit ENDMA in register DMACNTRL0 to change the mode from DMA/READ to PIO/READ. The odd byte is saved in the SCB for a possible resumption of the data transfer. The mode is changed from PIO/READ to PIO/WRITE by setting bits ENDMA and WRITEREAD in register DMACNTRL0. Next, the odd data byte is written from the SCB to the FIFO. There is a short time delay for the time required for two port operations and then a garbage byte is written to the FIFO to complete the word since the host has allocated space for this byte. Next, release odd byte 3127 changes the mode back to DMA READ by first changing from write to read and then from PIO to DMA. Specifically, bit ENDMA in register DMACNTRL0 is first set and then bits ENDMA and DMAPIO are set. The last word is then transferred from FIFO 405 (FIG. 4) to host system 220 (FIG. 2) and processing returns to DMADONE check 3122 (FIG. 31B).

Figure 35:
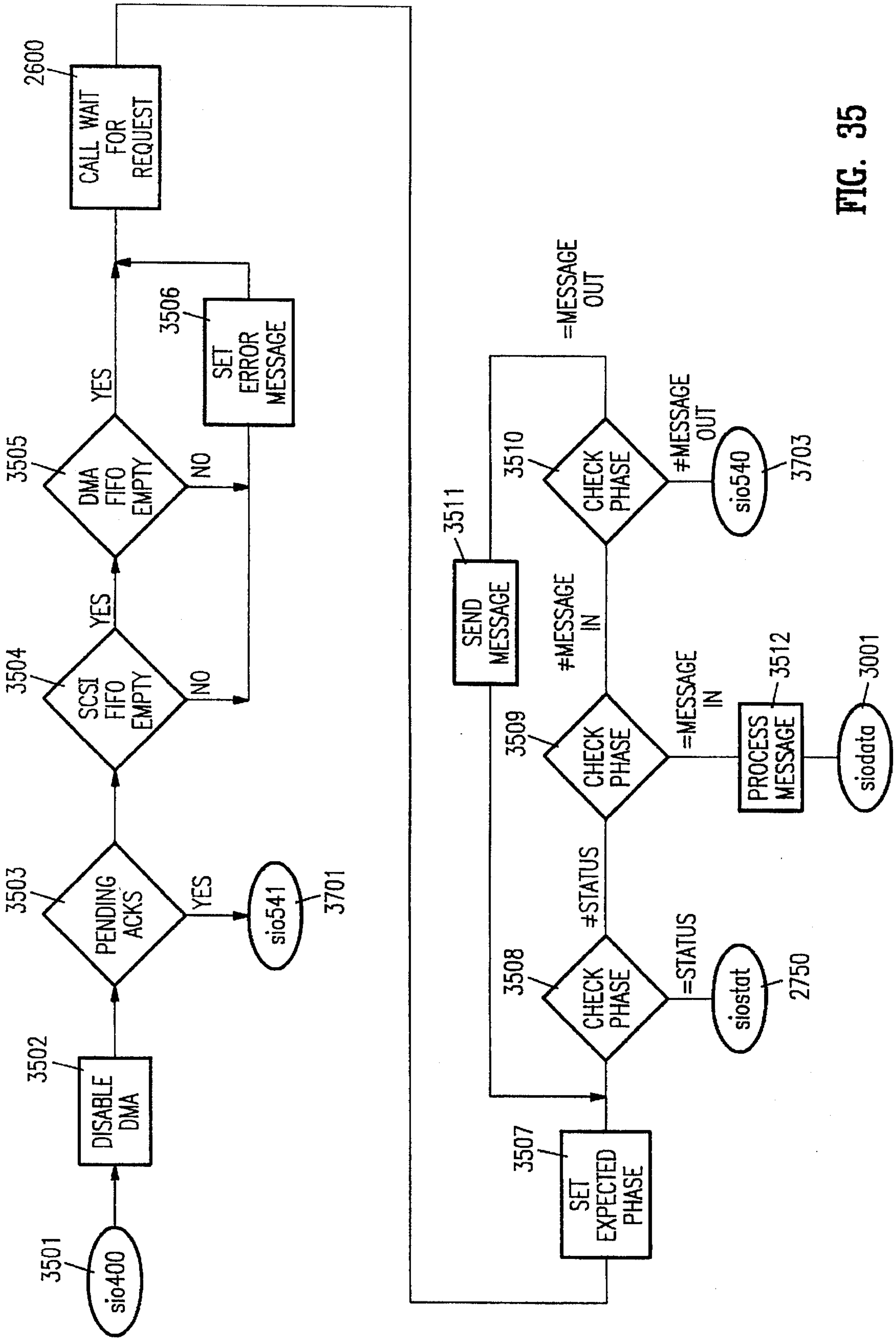

If FIFO empty check 3124 ascertains that FIFO 405 is empty, processing transfers to DMADONE check 3131. DMADONE check 3131 operates as described above for check 3122 and simply checks bit DMADONE in register SSTAT0. If the DMA transfer is done, processing transfers to label SI0400 3501 (FIG. 35). Processing at label SI0400 3501 is described below. If the DMA transfer is not done, processing transfers to call wait for request 2600 (FIGS. 31B and 26).

If write check 3123 ascertains that a write operation is in progress, write check 3123 also transfers processing to call wait for request 2600. The operations in call wait for request 2600 were described more completely above and are incorporated herein by reference.

Upon completion of operations in call wait for request 3133, processing passes through a series of four check phases 3134, 3135, 3136 and 3137. In these four checks, if the data, status, message in or message out phase is not detected, processing transfers to label BADSEQ 2752, which was described above. If the SCSI phase data is detected, processing transfers to label SIODATA 3001 (FIG. 30). If the SCSI phase status is detected, processing transfers to label SIOSTAT 2750 (FIG. 27B). If the phase message in is detected, process message 3138 (FIG. 31B) uses the message handler to handle the incoming message and then transfers processing to label SIODATA 3001. If SCSI phase message out is detected, send message 3139 sends the message and then returns processing to check phase 3134.

These operations were performed when the DMADONE check 3122 detected that the DMA transfer was not yet completed. However, if DMADONE check 3122 determines that the DMA transfer is complete, processing transfers to another page check 3128. If there is not another page to be transferred, processing transfers to label SI0400 3501 (FIG. 35). If another page check 3128 (FIG. 31B) detects additional data for DMA transfer, processing transfers to clear interrupts 3129. Clear interrupts sets bit CLRDMADONE in register CLRSINT0 and turns off bit DMAPIO in register DMACNTRL0. After bit DMAPIO is turned off, the bit is then reasserted. After completion of clear interrupt 3129, setup 8237 3130 is again called and after the setup, processing transfers to label SI0182 3117 (FIG. 31A).

This sequence of operations which started at label SIO215 3101 (FIG. 31A) was entered when transfer mode check 3006 (FIG. 30) detected a DMA transfer. However, if transfer mode check 3006 detects a PIO data transfer, processing transfers to label PIO_XFER 3201 (FIG. 32).

In contrast to a DMA data transfer, a PIO data transfer requires host microprocessor 221. The initial steps at label PIO_XFER are similar to those previously described for the steps at label SIO215. Specifically, call wait for request 2600, check phase 3202, check phase 3203, check phase 3204, check phase 3205, define expected phase 3208 and read/write 3209 are similar to call wait for request 2600, check phase 3102, check phase 3103, check phase 3104, check phase 3105, define expected phase 3108, and read/write 3109, respectively as described above and that discussion is incorporated herein by reference.

After read/write 3209 ascertains whether a read or write is required, enable PIO data transfer 3210 sets bits RSTFIFO in register DMACNTRL0. Also, bit ENDMA is set to define the direction of the data transfer. Enable SCSI transfer 3211 sets bits SCSIEN, DMAEN, CH1/CH2 in registers XFRCTL0. Finally, read/write check 3212 determines whether a PIO read or a PIO write has been requested.

The operations associated with PIO read and PIO write are substantially the same, when the difference in direction is taken into consideration. Accordingly, the operations with respect to PIO read are described herein. In view of the following discussion, the operations in PIO writes will be apparent to those skilled in the art. In particular, Microfiche Appendix A includes embodiments for both a PIO read and a PIO write, which are incorporated herein by reference in their entirety.

In the PIO read operation, which starts at label PIO_READ 3301 (FIG. 33), load registers 3302 is the first operation. Initially, a pointer to the active SCB is obtained and the segment register is saved. Enable interrupts 3303 sets bits ENSCSIRST, ENPHASEMIS, and ENBUSFREE in register SIMODE1 so that SCSI reset, phase change and bus free interrupts may be received from the target.

Convert data length 3304 first stores the length of the data to be transferred in bytes, as given in the SCB, in register CX. The data transfer length is changed to words and stored in register BX. Register AH is loaded with the FIFO size in words, and register CH is set to zero.

Figure 33:
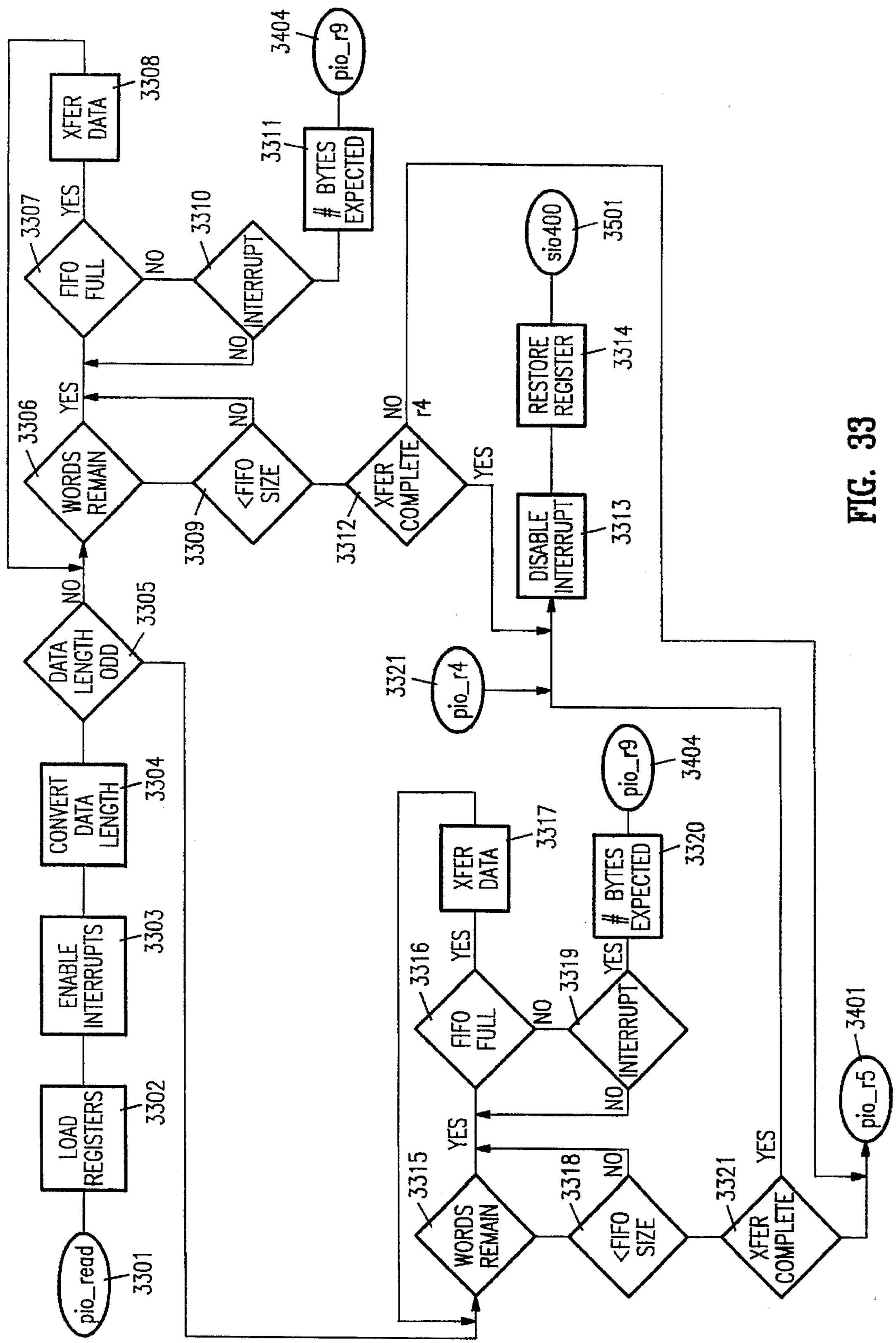

Prior to considering the remaining operations in a PIO read, the structure and operations just described are considered in more detail. First, as noted, the bytes were changed to words. H/A integrated circuit 6260 provides a 16 bit data path, i.e., a word length data path between FIFO 405 and computer bus 226. This 16 bit wide data path allows transferring a word at a time using microprocessor instruction "INSW". If only an 8 bit path were available, as was typically done in the prior art, only the microprocessor "INSB" instruction could have been used. Accordingly, the data transfer in H/A integrated circuit 6260 is substantially faster than that obtained with the 8 bit path in the prior art devices. As shown in FIG. 33, after convert data length 3304, the operations branch at data length odd check 3305 to one of two loops. The first loop consists of operations 3306, 3307, 3308, 3310 and the second loop consists of operations 3315, 3316, 3317, 3319. These loops were structured to minimize execution time delays during the data transfer. Also, recall that to minimize delays during data transfer, FIFO size was first selected to minimize the number of times either of these loops is executed during a PIO data transfer. A FIFO size of 128 bytes was a good compromise between the loop induced delay and the integrated circuit chip area required to implement FIFO 405.

Further, the two loops were implemented to provide the required functionality with a minimum number of instruction cycles. Specifically, two adds are required within a loop. These adds would normally require an input carry, the state of which depends on whether the data transfer count is even or odd. Instead of spending time determining the carry state within the loop, a branch is taken prior to executing the loop, if the data length is odd. Thus, in loop 3306, 3307, 3308 and 3310 the data transfer count is even and in loop 3315, 3316, 3317, and 3319 the data transfer count is odd. Therefore, in the first loop, the carry state must be zero while in the second state, the carry state must be 1. Thus, the use of the two loops eliminates the need to monitor the carry state.

In each loop, words remaining check 3306, 3315 checks the transfer count to ascertain whether more than 64 words remain for transfer. If sufficient words remain, processing transfers to FIFO full check 3307, 3316 that examines bit DFIFOFULL in register DMASTAT (FIG. 8C). If bit DFIFOFULL is set, processing transfers to transfer data 3308, 3317. Transfer data 3308, 3317 uses microprocessor instruction "REP INSW" to transfer the 128-byte block of data in FIFO 405 to system 220.

If bit DFIFOFULL is not set, FIFO full check 3307, 3316 passes processing to interrupt check 3310, 3319. Interrupt check 3310, 3319 examines bit INTSTAT in register DMASTAT to determine whether an interrupt occurred. Thus, while waiting for FIFO 405 to fill, Sparrow driver 302 checks for an interruption of data flow across SCSI bus 110. If a SCSI bus reset occurs or the target changes bus phase, bit INTSTAT is set. Typically, bit DFIFOFULL is expected to be set and bit INTSTAT is not expected to be set. Further, for a very fast target, bit DFIFOFULL may be set when reentering the loop at words remain check 3306, 3315. Therefore, FIFO full check 3307, 3316 is performed prior to interrupt check 3310, 3319. For a very fast target, when minimum execution time is most important, interrupt check 3310, 3319 may never be executed. Organizing the two checks in this manner, therefore, saves unnecessary delay.

When bit DFIFOFULL is set, all registers, except register DL have been initialized for the microprocessor instruction "REP INSW" transfer to the host. Also the operations fall through a jump after testing bit DFIFOFULL rather than taking a jump which further saves time. Fewer execution cycles are required to fall through rather than take a jump.

In monitoring the number of bytes remaining after transferring a 128 byte block, the remaining transfer count is decremented by 128. This count is maintained in a register rather than memory because operations on a register are faster than operations on memory. Also, the constant 128 is saved in a register. When the subtraction updates the transfer count, it is faster to subtract a register from the count than an immediate which would have to be fetched from memory.

Also prior to each block move from FIFO 405 to system 220, a register must be loaded with the block size. Since a register to register move is faster than an immediate to register move, the register containing the constant is moved to the other register. During the data transfer loop, the DMASTAT and the DMADATA registers (FIG. 8C) in H/A integrated circuit 6260 are accessed. A pointer to these registers is used.

Before accessing a register in H/A integrated circuit 6260, a microprocessor register DX must be loaded with the 2-byte constant equaling the 6260 register address. When the PIO read routine is embodied in a BIOS ROM, this constant much be fetched from the ROM one byte at a time. Since the high byte of the constant is always the same, the high byte is loaded into register DX only once ahead of the data transfer loop. During the loop, only the low byte is fetched from the ROM to load register DX, thereby saving time. Finally to minimize the register accesses within H/A integrated circuit 6260, status bits DFIFOFULL and INTSTAT are located within the same 6260 register. This organization minimizes the number of times a constant has to be loaded into a pointer thereby saving time. The previous discussion described in general terms how the processing for a PIO read is optimized for speed.

If a SCSI interrupt is detected during the PIO read, processing transfers from interrupt check 3310, 3319 to number of bytes expected 3311, 3320, which in turn loads in register BX the number of bytes expected from the target and transfers processing to label PIO_R9 3404. If the number of bytes left after a transfer is less than FIFO 405 size, processing transfers from less than fifo size check 3309, 3321 to transfer complete check 3312, 3321. If all the data has been transferred, processing goes to disable interrupts 3313. In disable interrupts 3313, bits ENPHASEMIS and ENBUSFREE in register SIMODE1 are cleared and processing transfers to restore register 3314 which restores the segment register and transfers processing to label SIO400 3501. However, if transfer complete check 3312, 3321 determines that not all the bytes have been sent, processing transfers to label PIO_R5 3401.

The first operation at label PIO_R5 3401 is FIFO full check 3402. Bit DFIFOFULL in register DMASTAT is checked, and if the bit is set, processing transfers to transfer data 3412. If the bit is not set, processing transfers to interrupt check 3403. Interrupt check 3403 tests bit INTSTAT in register DMASTAT. If bit INSTAT is not set, interrupt check 3403 passes processing back to FIFO full check 3402. However, if bit INTSTAT is set, processing transfers to label PIO_R9 3404 at which FIFO quiescent check 3405 is located. In this check, register FIFOSTAT is read twice, and the two readings are compared. If the readings are the same, processing transfers to number of bytes in SCSI FIFO 3406. Otherwise, the reading and comparison is repeated by FIFO quiescent check 3405.

Number of bytes in SCSI FIFO 3406 processes bits SFULL, SFCNT2, SFCNT1, and SFCNT0 in register SSTAT2. Total bytes 3407 adds the number of bytes in the SCSI FIFO to the number of bytes in the DMA FIFO. Data underrun check 3408 compares the number of bytes to determine whether all the data has been transferred. If a data underrun has not occurred, processing transfers to transfer data 3412. Transfer data transfers the data in the FIFOs and processing returns to label PIO_R4 3321. If a data underrun is detected, processing transfers to a second data transfer 3409, which also transfers the data from FIFOs to system 220. Disable interrupts 3410 turns off bits ENPHASEMIS and ENBUSFREE in register SIMODE1. Restore register 3411 restores the segment register to the value upon entry of Sparrow driver 302 and then processing transfers to label SIO310 3132.

Figure 34:
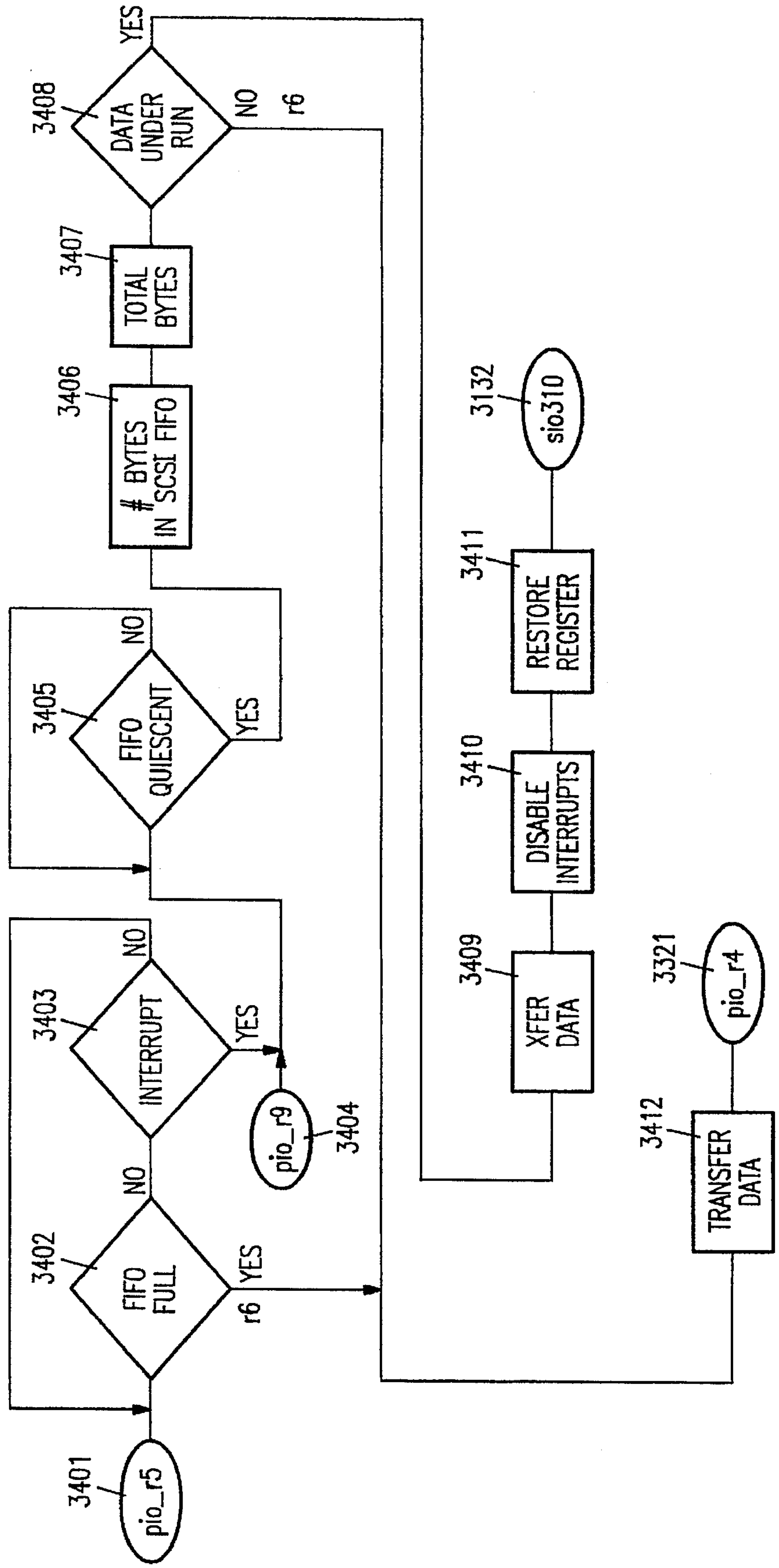

The PIO write operation is similar to the operations illustrated in FIGS. 33 and 34. In view of the above disclosure and the information in Microfiche Appendix A, the operations in the PIO write will be apparent to those skilled in the art.

Figure 37:
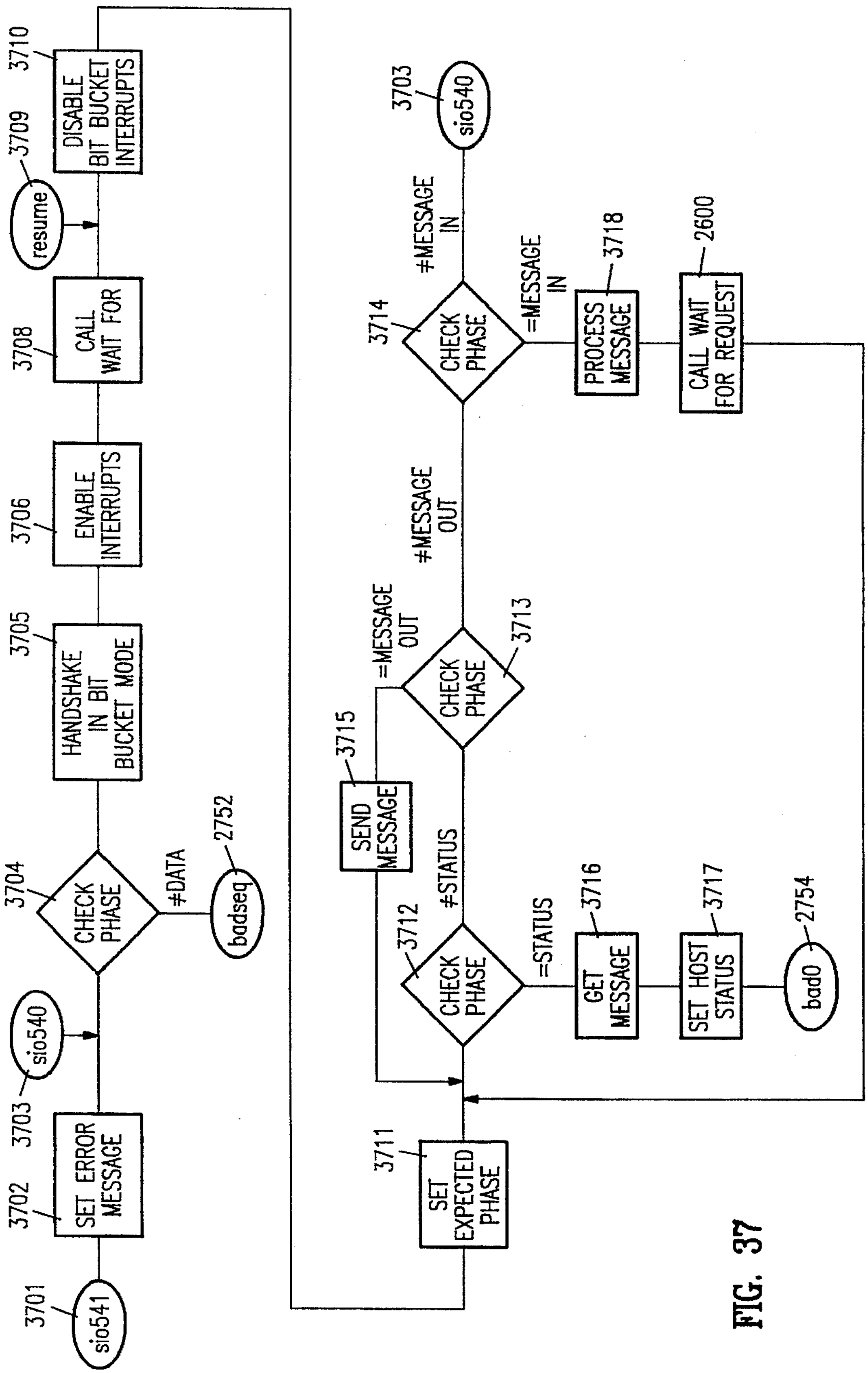

At the end of either a DMA or a PIO data transfer when all bytes have been transferred to or from system 200, processing branches to label SIO400 3501 (FIG. 35). Disable DMA 3502 sets bit CH1/CH2 in register SXFRCTL0 and resets all bits in register DMACNTRL0. Pending acknowledge check 3503 tests bit SOFFSET in register SSTAT2. If acknowledge signals are pending, processing transfers to label SIO541 3701 (FIG. 37). Conversely, if no acknowledge signals are pending, processing transfers to SCSI FIFO empty test 3504 (FIG. 35). SCSI FIFO empty test 3504 checks bit SEMPTY in register SSTAT2. If bit SEMPTY is set, processing transfers to DMA FIFO empty check 3505. Otherwise, processing transfers to set error message 3506. DMA FIFO empty check 3505 examines bit DFIFOEMP in register DMASTAT. If bit DFIFOEMP is set processing transfers to call wait for request 2600. If bit DFIFOEMP is not set, processing transfers to set error message 3506. Set error message 3506 sets the host adapter status to data overrun/underrun.

Call wait for request 2600 (FIGS. 35 and 26) operates as previously described. Upon completion of call wait for request 2600, processing transfers to set expected phase 3507 which defines the expected phase as being equal to the current phase. Next, three check phases 3508, 3509, 3510 ascertain whether the current phase is status, message in, or message out, respectively. If the phase is status, processing transfers to label SIOSTAT 2750 (FIG. 27B). If the SCSI phase is message in, processing transfers to process message 3512 (FIG. 35) which handles the incoming message and then transfers processing to label SIODATA 3001 (FIG. 30). If the SCSI phase is message out, the message is sent by send message 3511 (FIG. 35) and processing returns to first check phase 3508. If the SCSI phase is not status, message in, or message out, processing transfers to label SIO540 3703 (FIG. 37).

Prior to considering the operations at label SIO540 3703, recall that processing that started at label SIODATA 3001 (FIG. 30) transferred to label SIO500 3601 when the transfer length was equal to zero. Since processing at label SIO500 3601 leads to label SIO540 3703, the processing at label SIO500 3601 is considered first.

Initially, enable interrupts 3602 (FIG. 36) sets bits ENREQINIT, ENSCSIRST and ENBUSFREE in register SIMODE1. REQ asserted test 3603 checks bit REQINIT in register SSTAT1. If bit REQINIT is set, processing transfers to disable interrupt 3611. If bit REQINIT is not set, processing transfers to call wait for 3604. As previously described, call wait for accesses module 504 (FIG. 6) which in turn saves the address at which to continue processing, i.e., label SIO509 3605, and returns operations to SCSI manager 301. When a system hardware interrupt is generated and microprocessor 221 returns control to SCSI manager 301 which in turn returns control to Sparrow driver 302, processing returns to label SIO509 3605.

Request asserted 3606 checks bit REQINIT in register SSTAT1. If bit REQINIT is not set, processing returns to call wait for 3609 which at this point saves the address at label SIO510 3610 and then returns processing as previously described. If the REQINIT bit is set, processing transfers to ACK asserted check 3607. ACK asserted check 3607 tests bit ACKI in register SCSIIG. If the bit is set, processing returns to request asserted 3606. However, if the bit is not set, processing transfers to a second request asserted check 3608 which again examines bit REQINIT. If the bit is not set, call wait for 3609 is processed and if the bit is set, processing transfers to disable interrupt 3611.

Disable interrupt 3611 turns off bits ENREQINT and ENBUSFREE in register SIMODE1 to disable the latched request interrupt. Set expected phase 3612 defines the expected phase as the current phase.

Next, three check phases 3613, 3614, 3615 ascertain whether the current phase is status, message out, or message in, respectively. If the phase is status, processing transfers to label SIOSTAT 2750 (FIG. 27B). If the SCSI phase is message in, processing transfers to process message 3616 which handles the incoming message and then transfers to call wait for request 2600. Upon completion of call wait for request 2600, processing returns to check phase 3613. If the SCSI phase is message out, the message is sent by send message 3617 and processing returns to first check phase 3613. If the SCSI phase is not status, message in, or message out, processing transfers to label SIO541 3701.

The first operation at label SIO541 3701 is set error message 3702 (FIG. 37). Set error message 3702 sets the host status as data overrun/underrun. After the error message is set, check phase 3704 determines whether the current SCSI phase is data. If the current phase is not data, processing transfers to label BADSEQ 2752 (FIG. 27B). However, if the current phase is data, processing transfers to handshake and bit bucket mode 3705. As previously described, in the bit bucket mode, H/A integrated circuit 6260 accepts data and immediately throws it away. Enable interrupts 3706 sets bit ENPHASEMIS, ENSCSIRST and ENBUSFREE in register SIMODE1. Hence, an interrupt is enabled upon a phase mismatch.

Upon completion of enable interrupts 3706, processing transfers to call wait for 3708. As described previously, call wait for accesses wait for module 504 (FIG. 6) which stores the address for label RESUME 3709 and then returns microprocessor 221 to the control of system 220. As previously explained, label RESUME 3709 is not a physical label but rather simply used to indicate the address that is stored in the SCB and at which processing resumes after a generation of a system hardware interrupt by H/A integrated circuit 6260.

Call "wait for" returns microprocessor 221 to control of system 220 to wait for the end of the data phase. When the data phase is completed, H/A integrated circuit 6260 generates a system hardware interrupt and processing returns to disable bit bucket and interrupts 3710. Disable bit bucket and interrupts 3710 turns off bit BITBUCKET in register SXFRCTL1 and bits ENPHASEMIS and ENBUSFREE in register SIMODE1.

Upon completion of disable bit bucket and interrupts 3710, processing transfers to set expected phase 3711 which defines the expected phase as being equal to the current phase. Next, three check phases 3712, 3713, and 3714 ascertain whether the current phase is status, message out, or message in respectively.

If the phase is status, processing transfers to get message 3716 which obtains the completion status and message from the target. Processing then transfers to set host status 3717 which sets the host status in the SCB to data overrun. Processing then branches to label BAD0 2754 (FIG. 27B). If the SCSI phase is message in, processing transfers from check 3714 to process message 3718, which in turn handles the incoming message and transfers to call wait for request 2600. Upon completion of call wait for request 2600, processing transfers to first check phase 3712. If the SCSI phase is message out, the message is sent by send message 3715 and processing returns to first check phase 3712. If the SCSI phase is not status, message out or message in, processing transfers to label SIO540 3703.

The above description of Sparrow driver 302 is only one embodiment of this invention and is not intended to limit the invention to the embodiment described. In view of this disclosure, those skilled in the art will be able to implement an H/A integrated circuit 6260 and an operating system independent driver wherein the driver controls all of the SCSI operations of the integrated circuit.

Recall that interrupt handler 506, as presented in FIG. 24, branches to a number of different labels. In the above discussion only the branch for the selection complete interrupt to label INTSEL 2501 was described. Accordingly, the operations at each of the remaining labels in interrupt handler 506 are now considered.

SCSI bus reset 2403 (FIG. 24) transfers processing to label INTSRST 3801 (FIG. 38) when status bit SCSIRSTI is set in register SSTAT1 indicating that a SCSI bus reset occurred. Upon transfer to label INTSRST 3801, active, disconnected, or waiting SCBs 3802 finds all active, disconnected and waiting SCBs. If no active, disconnected, or waiting SCBs are found, processing transfers to reset 3805. Reset 3805 clears all interrupts and initializes H/A integrated circuit 6260. Next, set transfer options 3806 sets all transfer options to asynchronous and then processing returns to SCSI manager 301 via return 2112 (FIG. 21B).

If an active disconnected or waiting SCB is found, check 3802 transfers processing to update SCBs 3803. Update SCBs 3803 marks each of the found SCBs done and then transfers processing to update host status 3804. Update host status 3804 sets the host status in each of the SCBs to SCSI reset error and returns processing to check 3802.

Selection time out check 2405 (FIG. 24) transfers processing to label INITMOUT 3901 (FIG. 39) when a selection time out interrupt occurs. At label INITMOUT 3901, disable interrupts 3902 turns off bits ENSELO and ENAUTOATNO in register SCSISEQ. Disable selection timer 3903 turns off bit ENSTIMER in register SXFRCTL1. Clear interrupt 3904 sets bit CLRSELTIMO in register CLRSINT1 to clear the time out interrupt.

Waiting SCB check 3905 finds the waiting SCB and transfers processing to update SCB 3906. However, if no waiting SCB is found, check 3905 transfers processing to return 2112 (FIG. 21B).

Update SCB 3906 (FIG. 39) changes the SCB status from waiting to done and then update host status 3907 sets the host status to selection time out. Processing then returns to SCSI manager 301 via return 2112.

Bus free check 2406 (FIG. 24) passes processing to label INTFREE 4001 (FIG. 40) after a bus free interrupt occurs. At label INTFREE 4001, active SCB check 4002 passes processing to update SCB 4003 if an active SCB is found. If an active SCB is not found, processing transfers to disable interrupt 4007.

Update SCB 4003 sets the command status of the active SCB to done and transfers processing to update host status 4004 which in turn sets the host status to unexpected bus free. Disable DMA 4005 resets all bits except bit CH1/CH2 in register SXFRCTL0 and resets all bits in register DMACNTRL0. Disable bit bucket 4006 turns off bit BITBUCKET in register SXFRCTL1. Next, disable interrupt 4007 turns off bit ENBUSFREE in register SIMODE1 and then sets bit CLRBUSFREE in register CLRSINT1. Processing then transfers to return 2112.

Reselected by target check 2408 (FIG. 24) passes processing to label INTRSEL 4101 (FIG. 41A) when the reselection interrupt is detected. At label 4101, clear interrupts 4102 turns off bit ENRSELI in register SCSISEQ. Next, bit CLRSELDI is set in register CLRSINT0. Bit CLRBUSFREE in register CLRSINT1 is also set. Thus, the reselection interrupt was disabled while the bus free interrupt was cleared. Enable reselection 4103 sets bit ENRSELI in register SCSISEQ and transfers processing to reselection check 4104. If bit SELDI is set, processing transfers to process IDs 4105. However, if bit SELDI is not set processing returns through RETURN$ 2115 (FIG. 21B) to wait for another reselection.

Figure 41A:
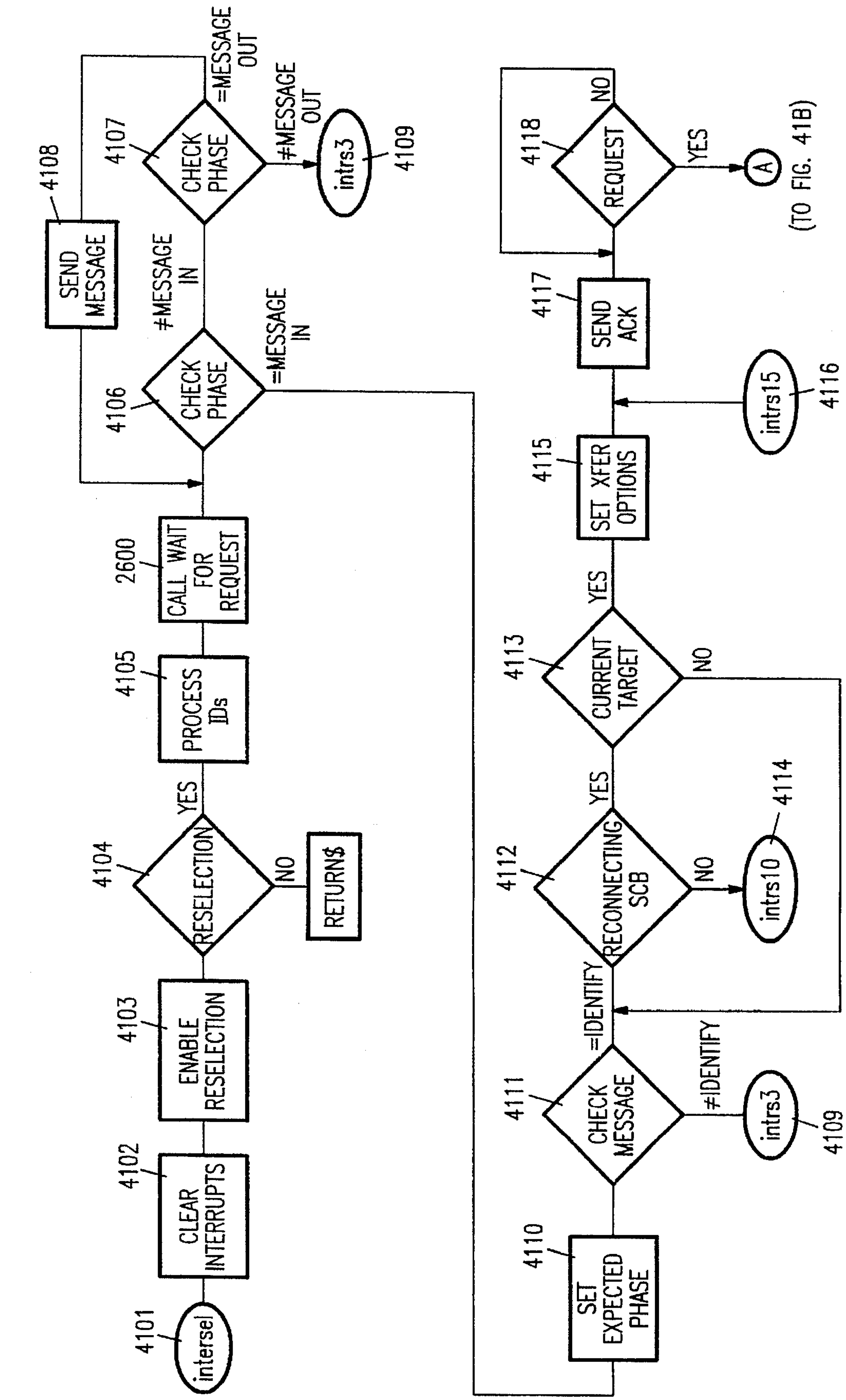
Figure 41B:
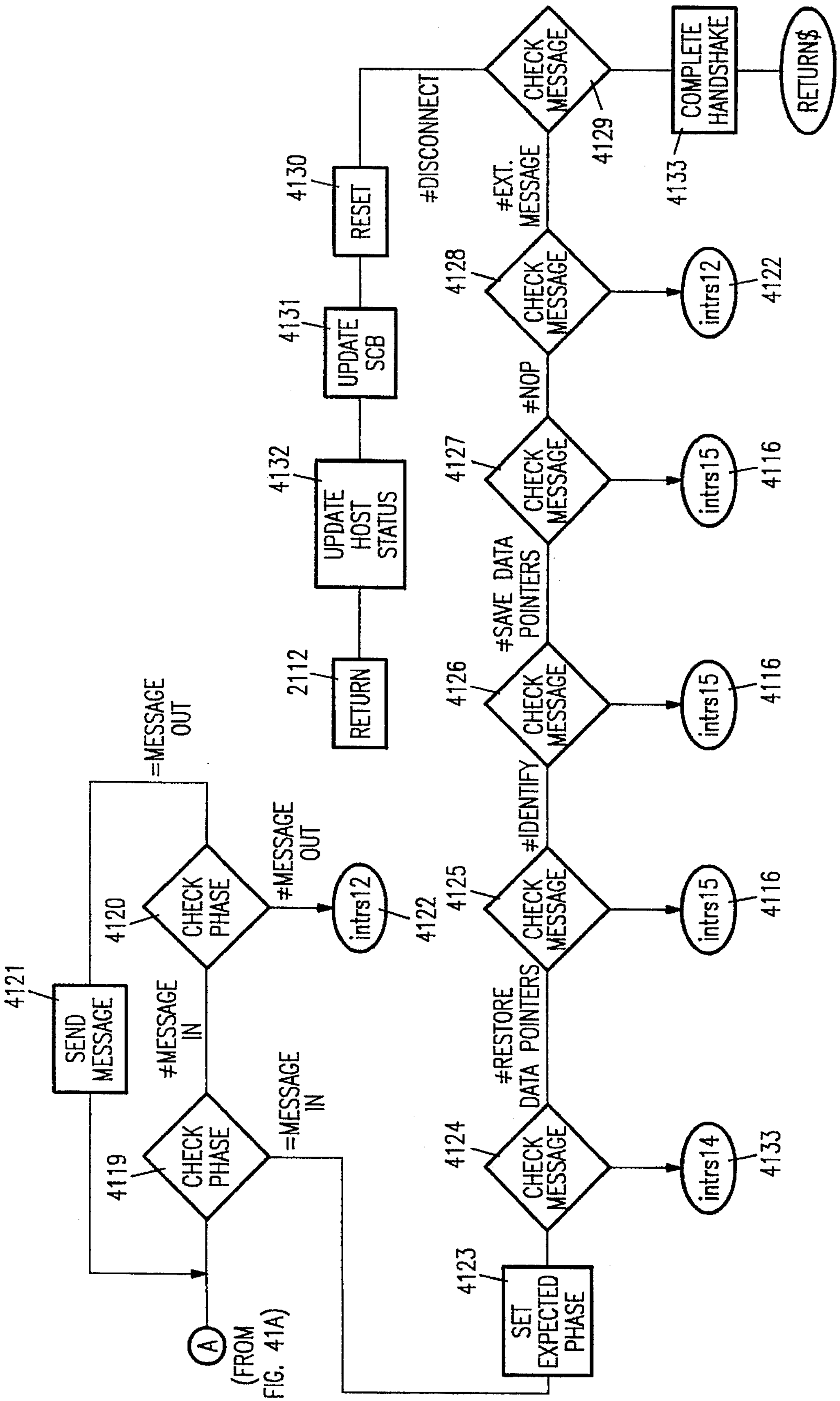
Figure 41C:
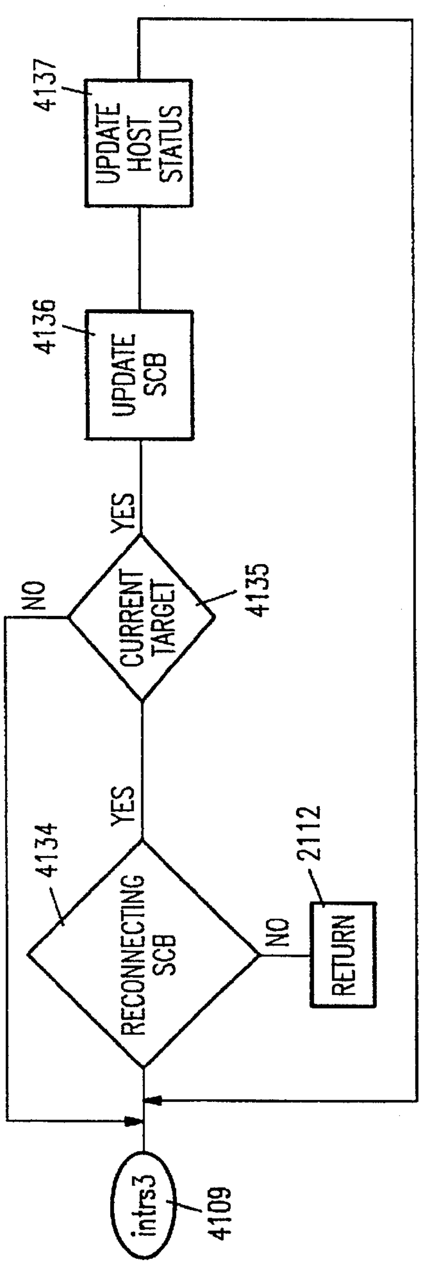

Process IDs 4105 first obtains the IDs from the SCSI bus and then masks the ID for H/A integrated circuit 6260. Next the target ID is converted to a binary number. After the conversion, processing transfers to call wait for request 2600 which performs the operations described above. Upon receipt of the first request, processing transfers to check phase 4106. If the SCSI phase is not message in, processing transfers to check phase 4107. If the SCSI phase is not message out, processing transfers to label INTRS3 4109 (FIG. 41A, 41C). If the phase is equal to message out, check phase 4107 transfers processing to send message 4108. Send message 4108 sends the message and returns processing to check phase 4106.

Figure 41D:
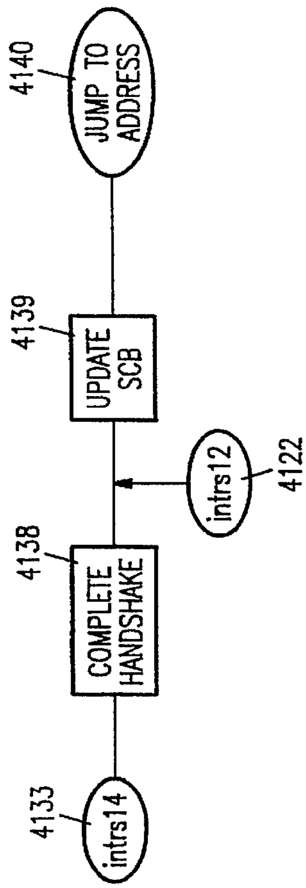
Figure 41E:
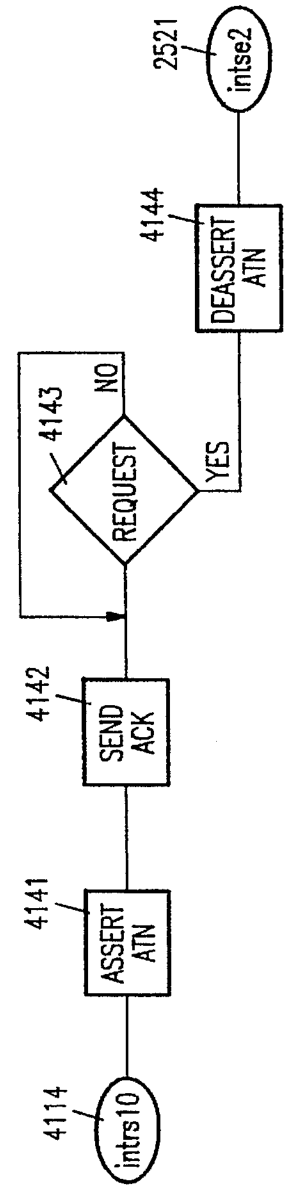

If check phase 4106 detects phase message in, processing transfers to set expected phase 4110 which in turn sets the expected phase to message in. Message check 4111 gets the message byte from the target in register SCSIDAT and tests the message to determine whether it is "identify." If the message is not identify, processing transfers to label INTRS3 4109 (FIG. 41C). If the message is identify, the logical unit number for the target is saved and processing goes to reconnecting SCB check 4112. Reconnecting SCB 4112 scans the SCB array to find an SCB which has a command status of disconnected. If an SCB with status of disconnected is not found, processing transfers to label INTRS10 4110 (FIG. 41E). If the reconnecting SCB is found, current target 4113 checks the target ID in the SCB with the current target which was just saved. If the reconnecting SCB is for the current target, processing transfers to set transfer options 4115. However, if the reconnecting SCB is not for the current target, processing returns to reconnecting SCB 4112.

At set transfer options 4115, the reconnecting SCB has been found and the pointer to the current SCB is saved. The transfer speed option is loaded from the SCB and then a pointer is derived to the data transfer option in the SCB. The transfer option is obtained and integrated circuit H/A 6260 is configured for the specified transfer option.

After configuration of H/A integrated circuit 6260, send ACK 4117 sends the SCSI acknowledge signal and then integrated circuit H/A 6260 waits for request signal REQ from the target. When request signal REQ is received, request check 4118 transfers processing to check phase 4119 (FIG. 41B). If the current phase is not message in, processing transfers to check phase 4120. If the current phase is also not message out, processing transfers to label INSTR12 4122 (FIG. 410). If the current phase is message out, processing transfers from check phase 4120 to send message 4121 which in turn sends the message. After completion of send message 4121, processing transfers to check phase 4119.

If check phase 4119 detects phase message in, processing transfers to set expected phase 4121 which in turn sets the expected phase to message in. Next, check messages 4124, 4125, 4126, 4127, 4128, and 4129 check to see if the incoming message is restore data pointers, identify, save data pointers, NOP, extended message, or disconnect, respectively. If none of these messages are received, there is an invalid message in and the reselection failed. Accordingly, check message 4129 transfers to reset 4130. Reset 4130 resets the SCSI bus only if the bus is not free. Update SCB 4131 sets the SCB status to done and update host status 4132 sets the host status to SCSI bus sequence error. Processing is then returned to SCSI manager 301 through return 2112 (FIG. 21B).

If the message in is disconnect, check message 4129 (FIG. 41B) transfers processing to complete handshake 4113 which completes communications with the target and then transfers to label RETURN$ 2115 (FIG. 21B). If check message 4128 detects an extended message, processing transfers to INTRS12 4112 (FIG. 41D). If check message 4125 (FIG. 41B) detects the identify message, or check message 4126 detects the save data pointers message, or check message 4127 detects the message NOP, processing transfers to label INTRS15 4116 (FIG. 41A). If check message 4124 detects the message restore data pointers, processing transfers to label INTRS14 4133 (FIG. 41D).

At label INTRS14 4133 (FIG. 41D), complete handshake 4138 completes the handshake and then transfers processing to update SCB 4139. Label INTRS12 4122 (FIG. 41D) also transfers processing to update SCB 4139. Update SCB 4139 changes the SCB command status from disconnected to active and obtains from that SCB the address at which to resume processing. Jump to address 4140 transfers processing to the address obtained from the SCB.

At label INTRS10 4115 (FIG. 41E), assert attention 4141 sets bits ANTO and MIPHASE in register SCSISIG. In response, H/A integrated circuit 6260 asserts the attention signal on the SCSI bus. Next, send ACK 4132 causes H/A integrated circuit 6260 to send an acknowledge signal and then Sparrow driver 302 waits for a signal REQ from the target. When the signal REQ is received, request check 4143 transfers processing to deassert attention 4144. Deassert attention 4144 sets bit CLRATNO in register CLRSINT1. Processing subsequently transfers to label INTSE2 2521 (FIG. 25).

Recall that check message 4111 (FIG. 41A) transferred processing to label INTRS3 4109 when the message was not equal to identify. At label INTRS3 4109 (FIG. 41C), reconnecting SCB searches for an SCB with the command status of disconnected. If such an SCB is not found, processing returns to SCSI manager 301 through return 2112 (FIG. 21B). However, if a SCB with a command status of disconnected is obtained, current target 4135 checks the target specified in that SCB with the current target. If the disconnected SCB is for the current target, processing transfers to update SCB 4136 which in turn sets the SCB status to done. Update host status sets the host status to phase sequence error, and then processing returns to reconnecting SCB check 4134. If current target check 4135 determines that the disconnected SCB is not for the current target, processing also returns to reconnecting SCB check 4134. These operations complete the possible sequence of steps when the reselection interrupt is detected and processing transfers to label INTRSEL 4101 (FIG. 41A).

Figure 42:
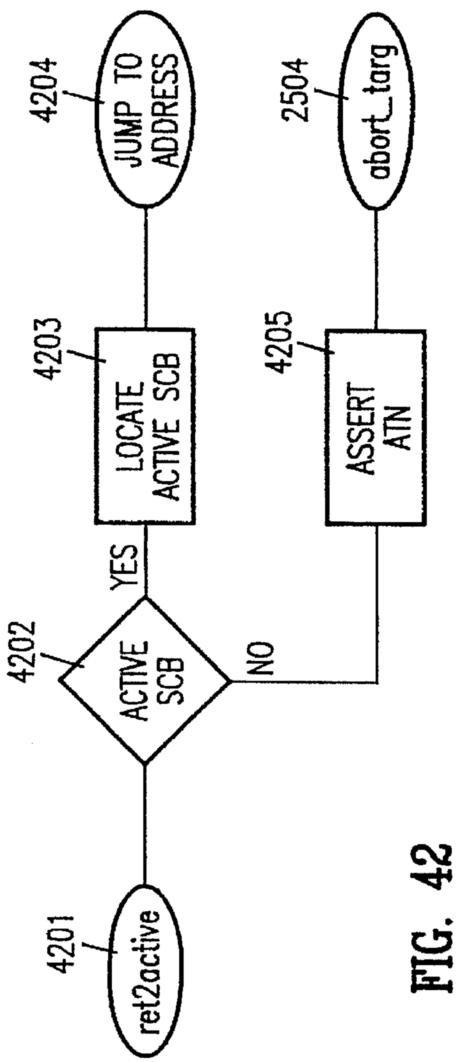

If DMA done check 2409 (FIG. 24), phase expected check 2410, or request from target check 2411 detect an interrupt, processing transfers to label RET2ACTIVE 4201 (FIG. 42). At label RET2ACTIVE 4201, active SCB 4202 checks the SCB array to find an SCB with a command status of active. If an active SCB is found, locate active SCB 4203 obtains the pointer to that SCB and then the address to resume processing that is stored in the SCB. Jump to address 4204 transfers processing to the address obtained from the active SCB. If active SCB check 4202 does not find an active SCB, processing transfers to assert attention 4205. Assert attention sets bit ATNO in register SCSISIG and then processing transfers to a label ABORT_TARG 2504.

Figure 43:
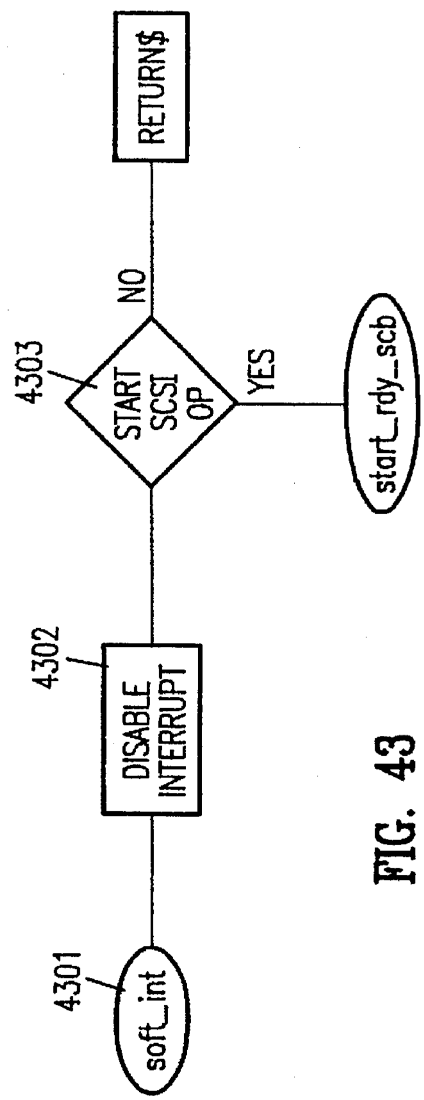

The final interrupt check in the interrupt handler is software interrupt check 2414. If a software interrupt occurs, processing transfers to label SOFT_INT 4301 (FIG. 43). At label SOFT_INT 4301, processing transfers to disable interrupt 4302. Disable interrupt turns off bit SWINT and then transfers processing to start SCSI OP check 4303. If a SCSI operation can be started, processing transfers from check 4303 to label START_RDY_SCB 2401 (FIG. 21A). If a SCSI operation cannot be initiated, processing transfers to RETURN$ 2115 (FIG. 21B).

Figure 44A:
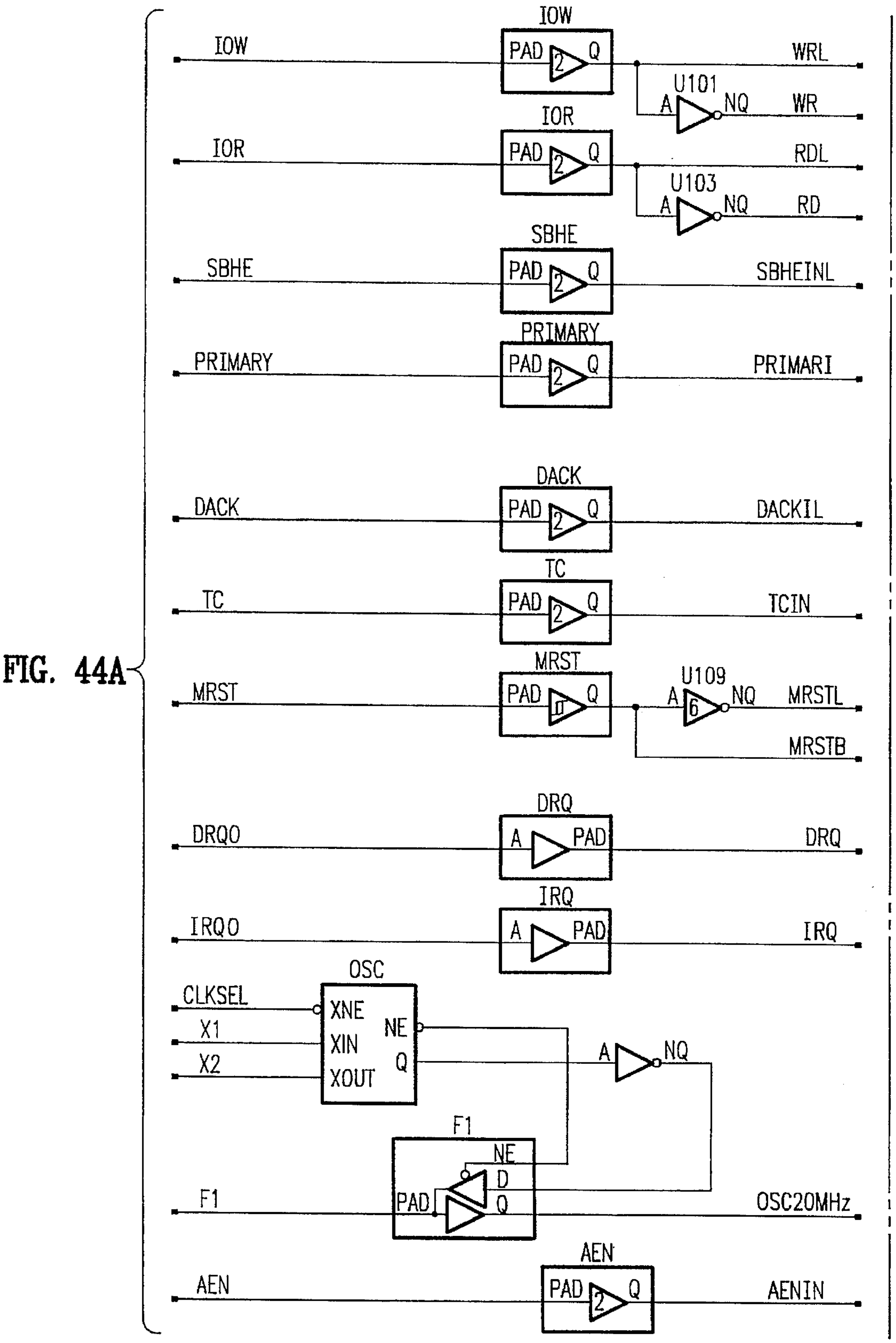
FIGS. 44A, 44B, 45A, 45B, 46A and 46B illustrate the circuits used to receive signals from the pins of the integrated circuit 6260 and to provide signals to the pins of integrated circuit 6260.
Figure 44B:
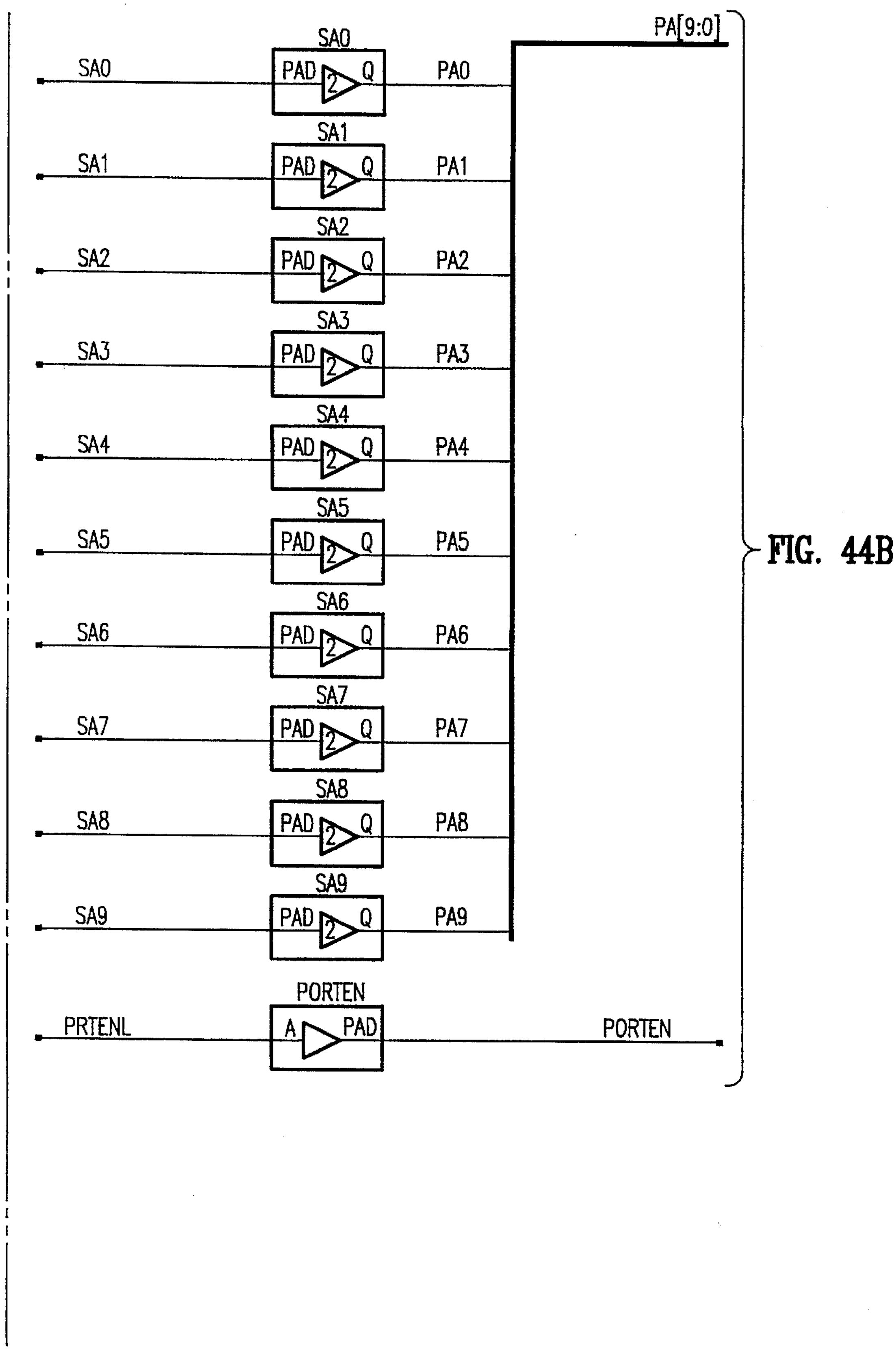
Figure 45A:
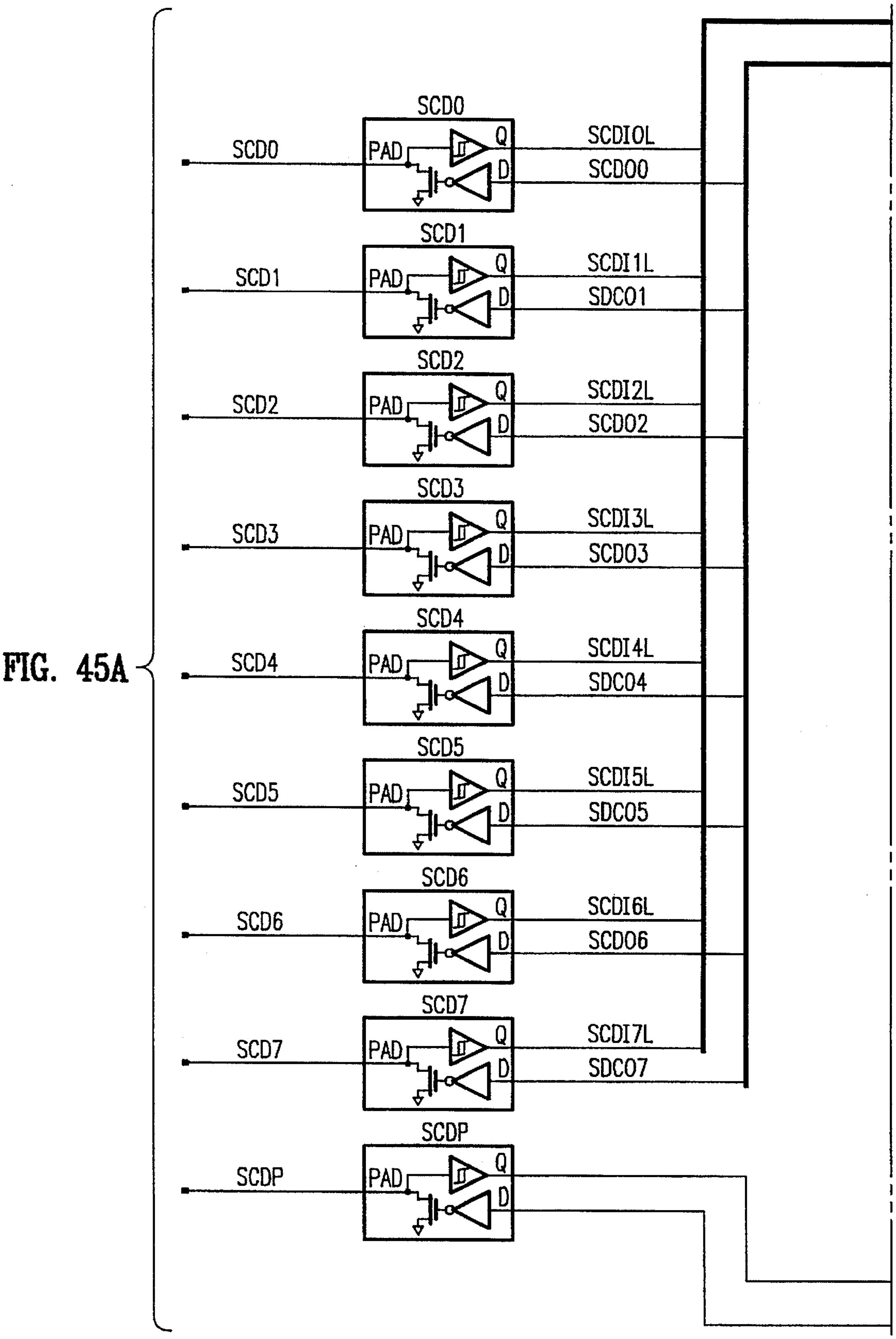
Figure 45B:
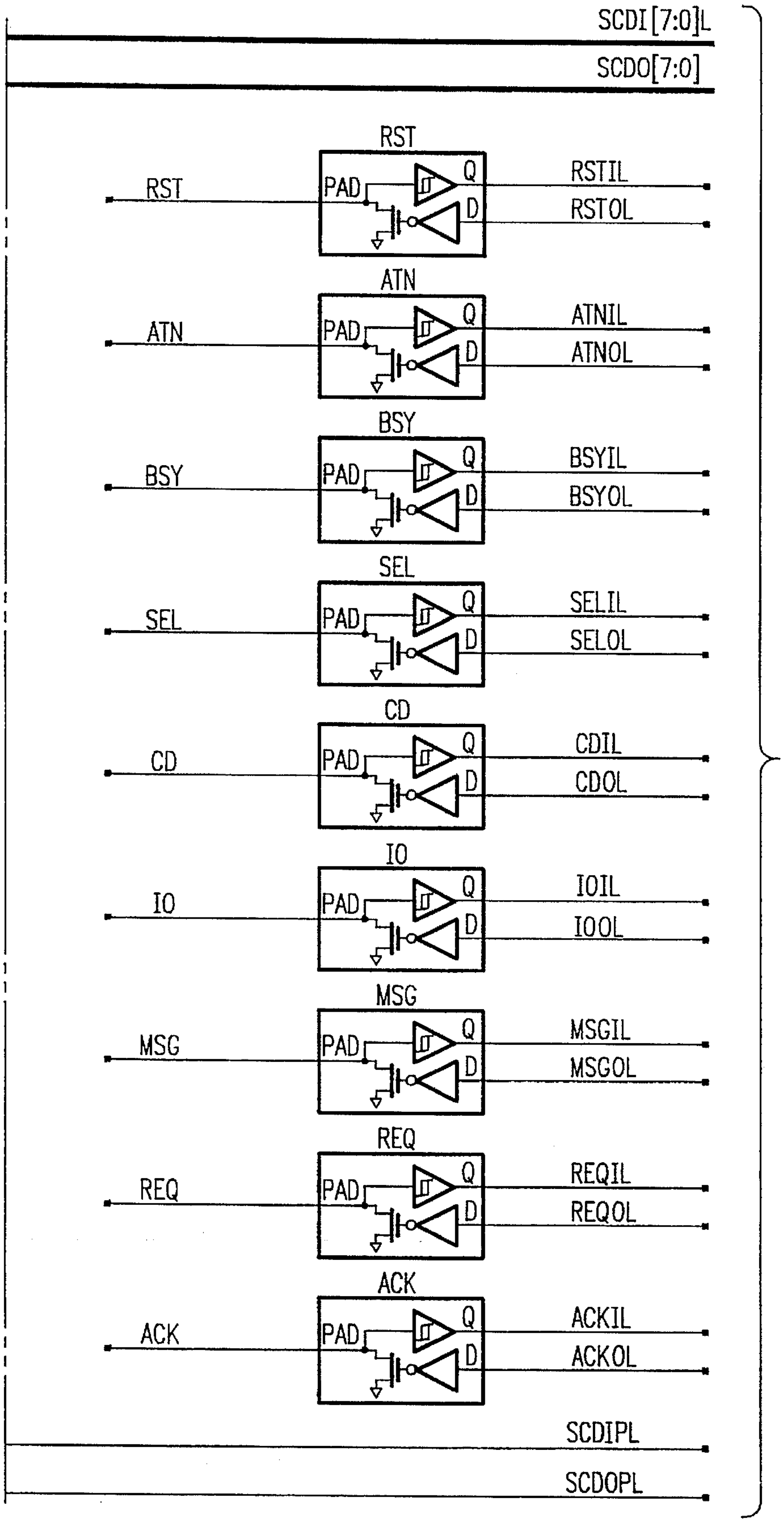

FIG. 44A through FIG. 177 are a detailed schematic diagram of one embodiment of H/A integrated circuit 6260. Certain boxes in the schematic diagram are labelled with a sequence of capital letters, usually contained in quotation marks, another schematic defines the circuit within that box.

Figure 46A:
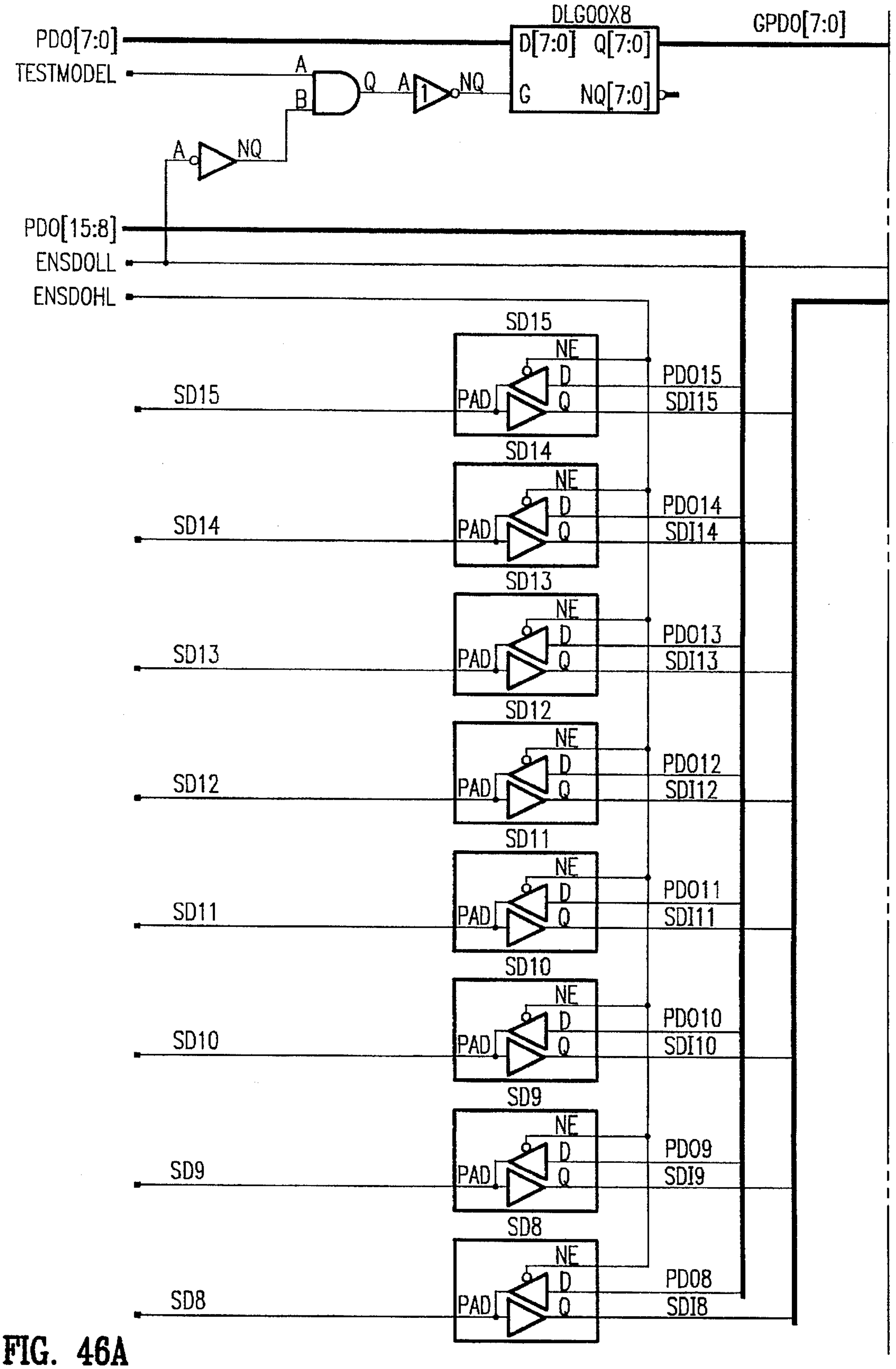
Figure 46B:
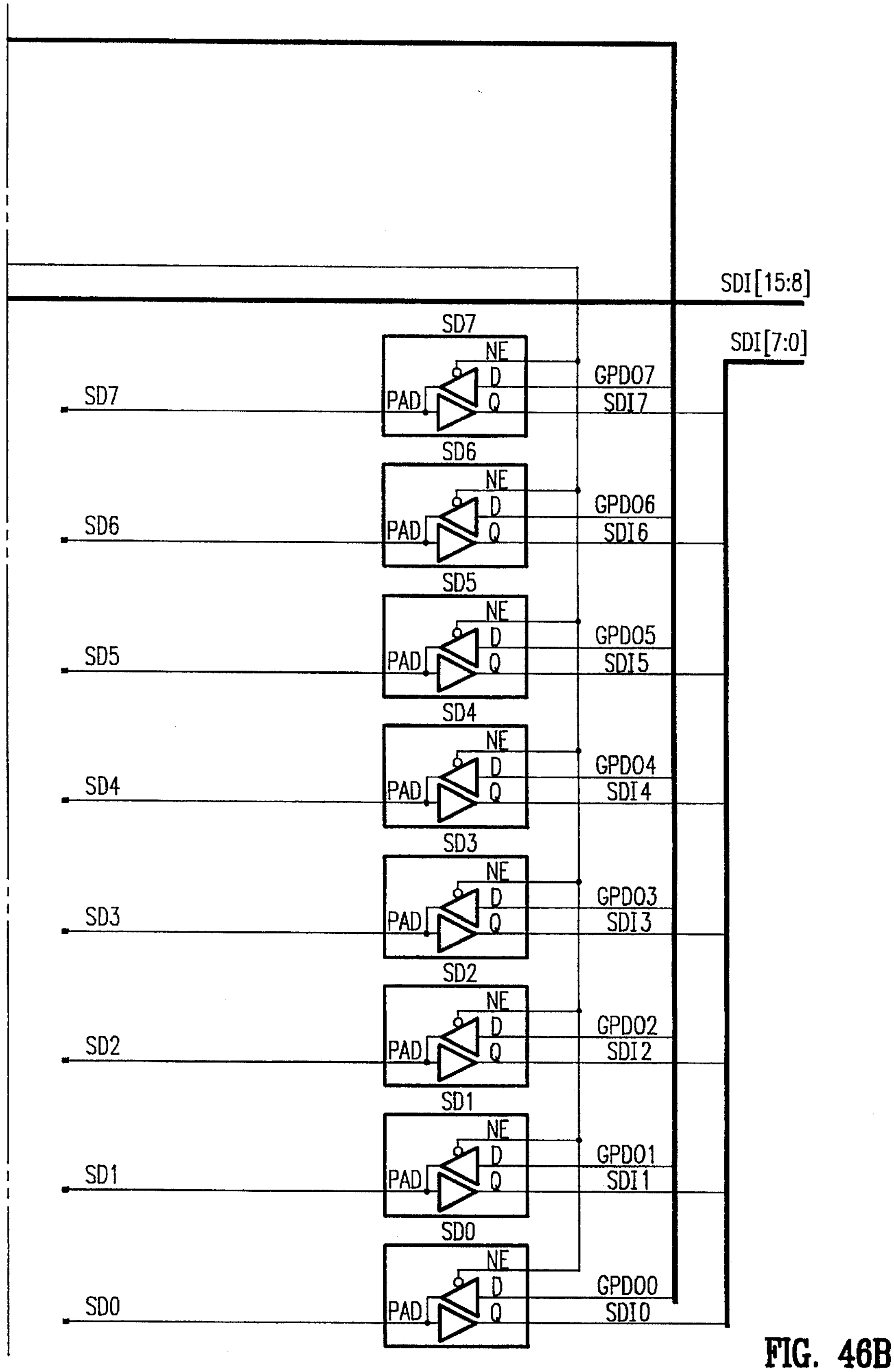

FIGS. 44A, 44B, 45A, 45B, 46A, 46B, 47A, 47B, 47C, 163A and 163B comprise the general schematic diagram of H/A integrated circuit 6260. The remaining figures simply further define circuits within these figures. FIGS. 44A, 44B, 45A, 45B, 46A and 46B illustrate the circuits used to receive signals from the pins of the integrated circuit 6260 and to provide signals to the pins of integrated circuit 6260. In FIG. 46A, block DLG00X8 represents eight level sensitive latches which are illustrated in more detail in FIG. 108.

Figures 1, 47A:
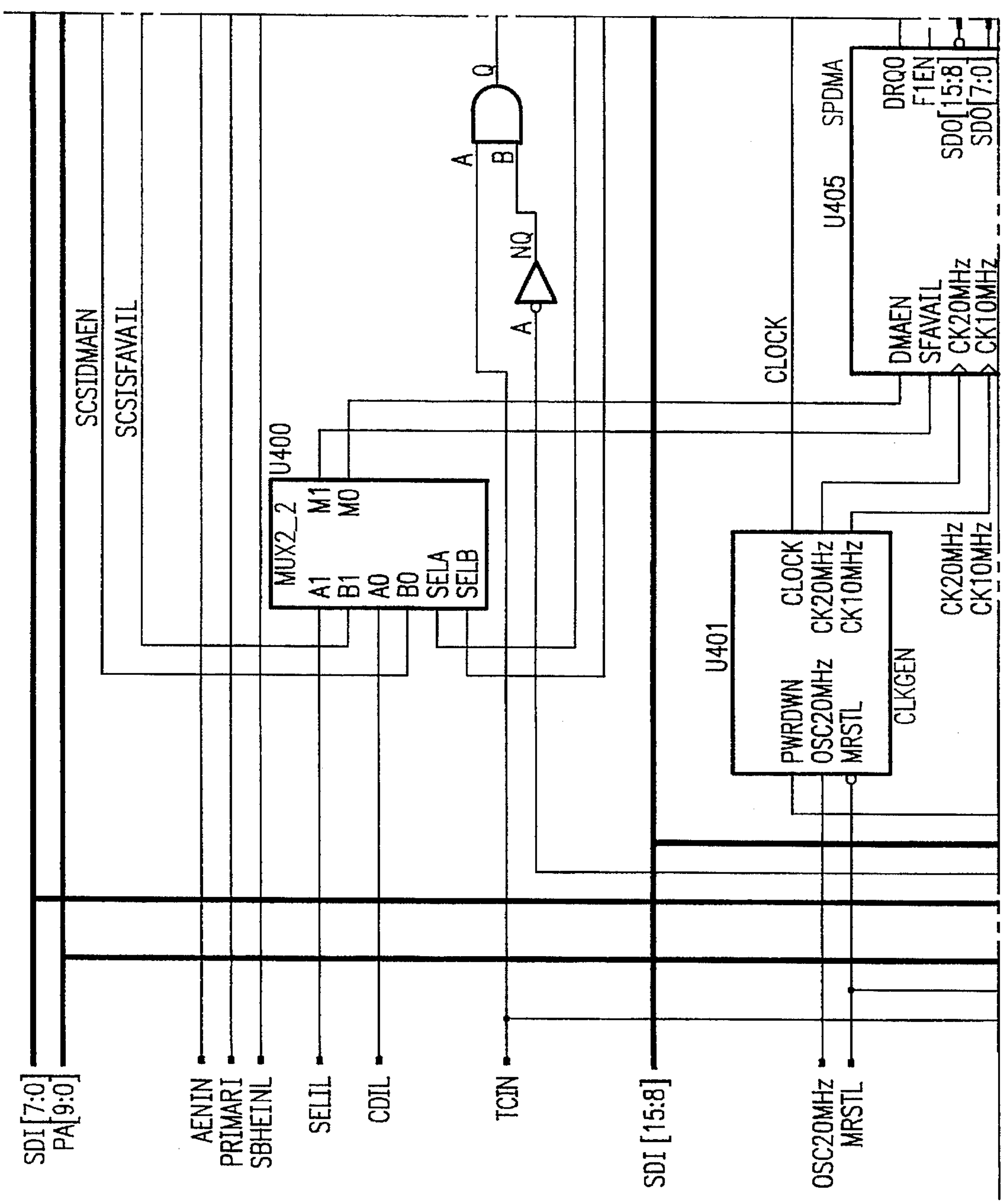
FIGS. 47A, 47B, and 47C shows that H/A integrated circuit 6260 includes two components SPDMA and SCSI as well as circuits CLKGEN, INTRP, INVX8, MUX2_1, MUX2_2, MUX3_8, MUX2_8, and MUX2_3.
Figures 2, 47A:
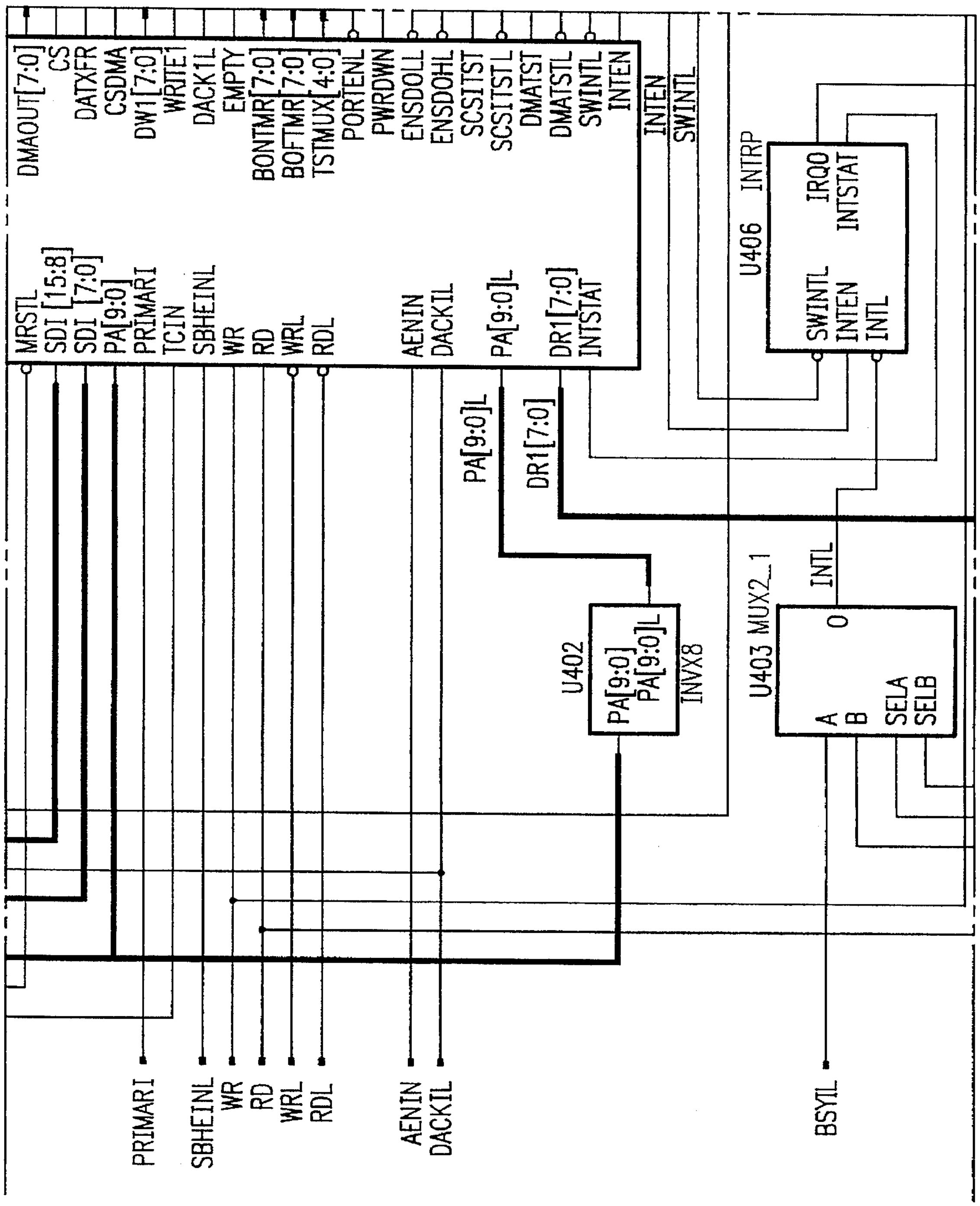
Figure 47A:
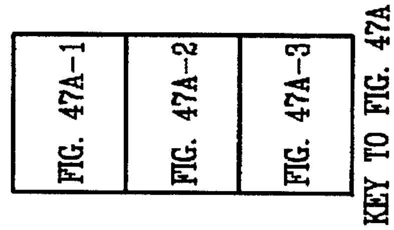
Figure 3:
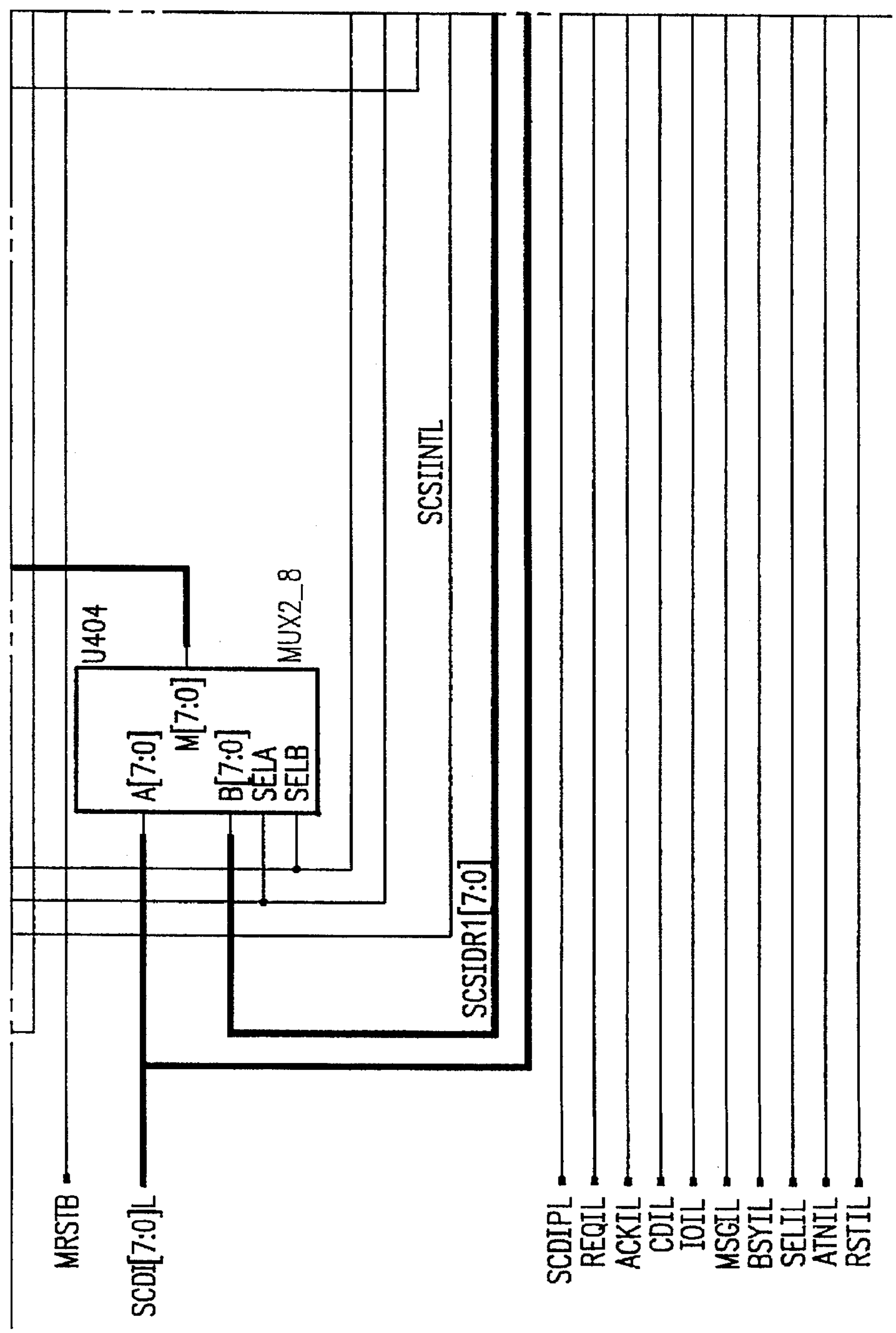
Figures 1, 47B:
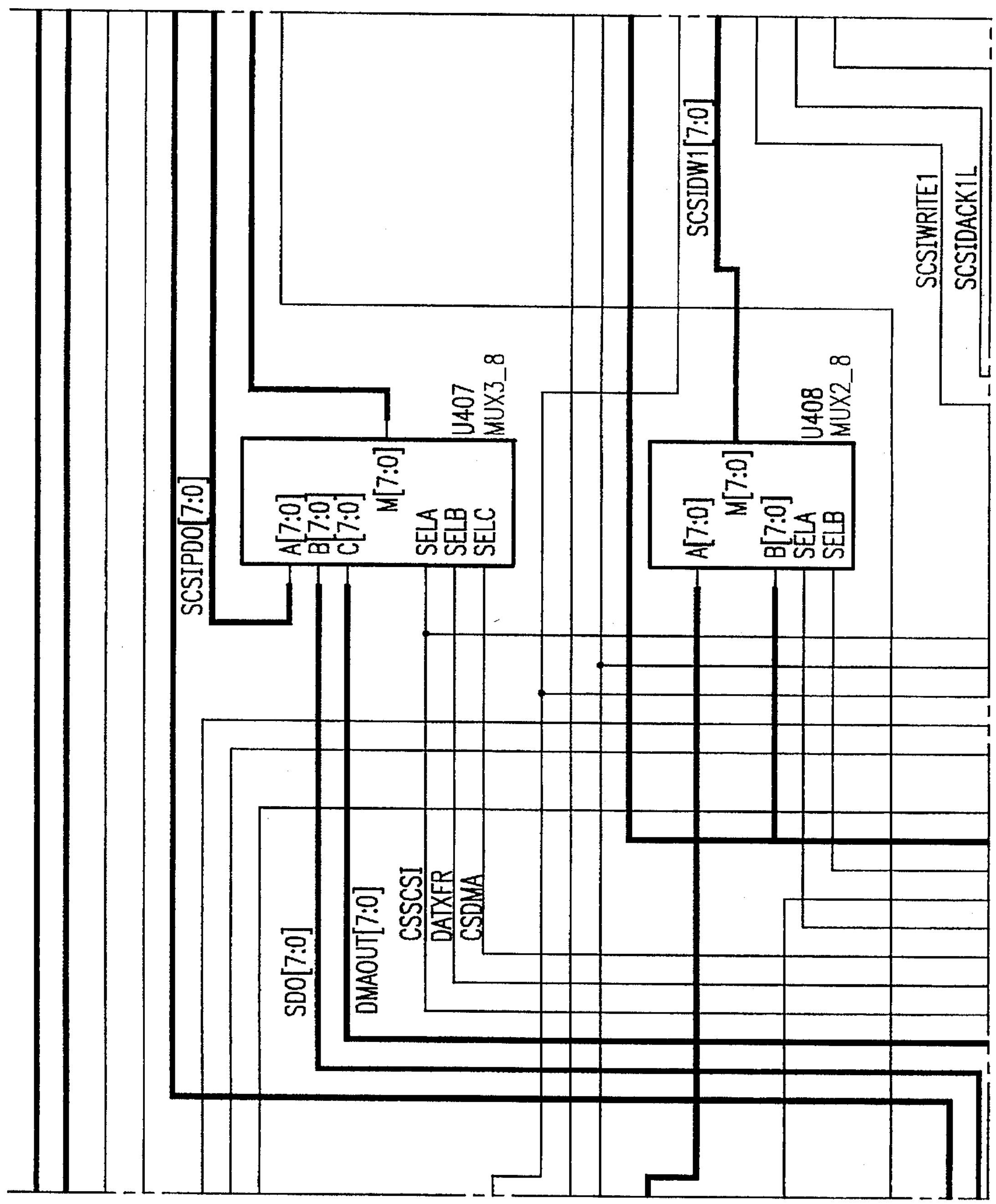
Figures 2, 47B:
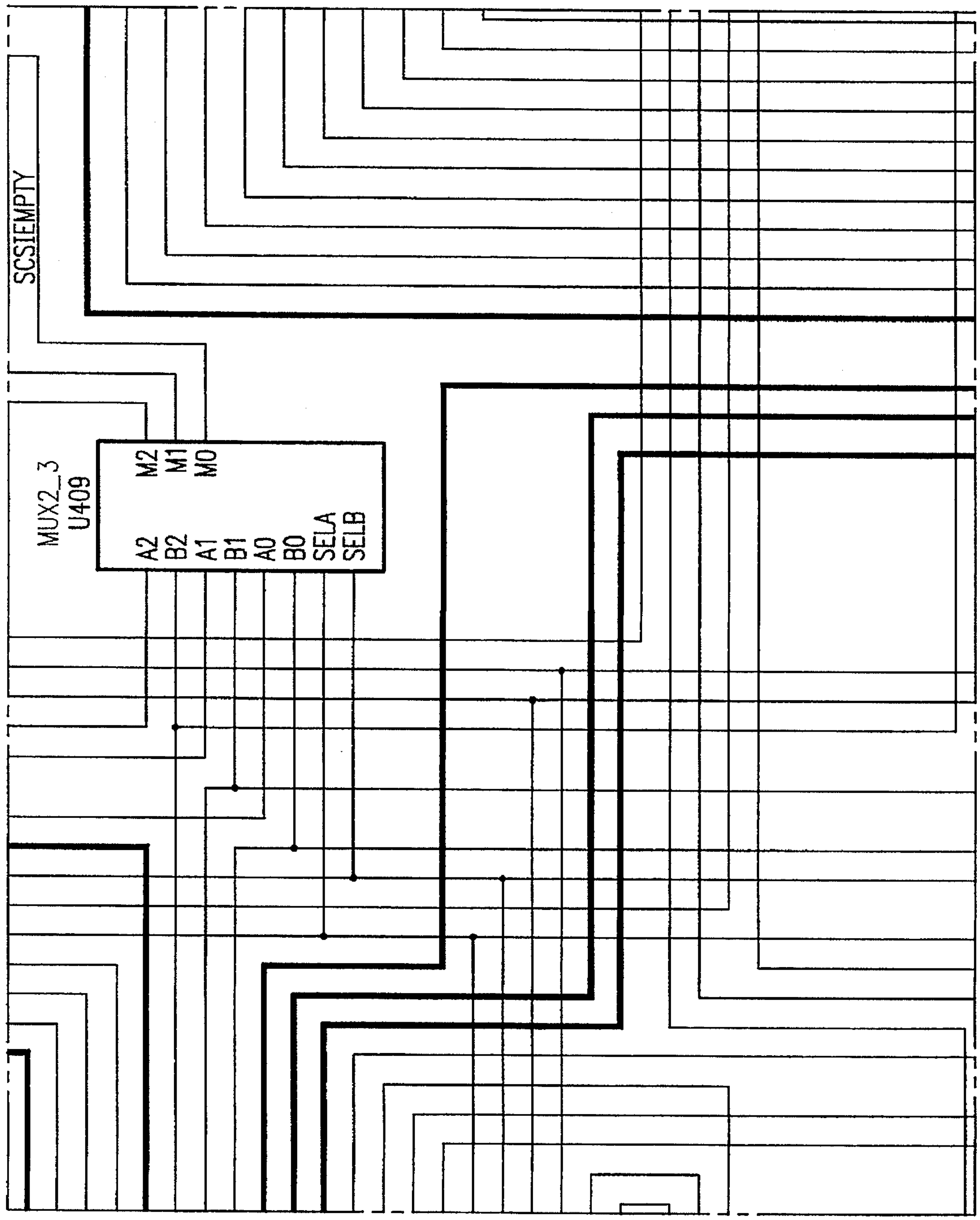
Figure 47B:
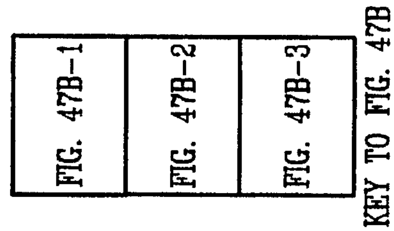
Figure 3:
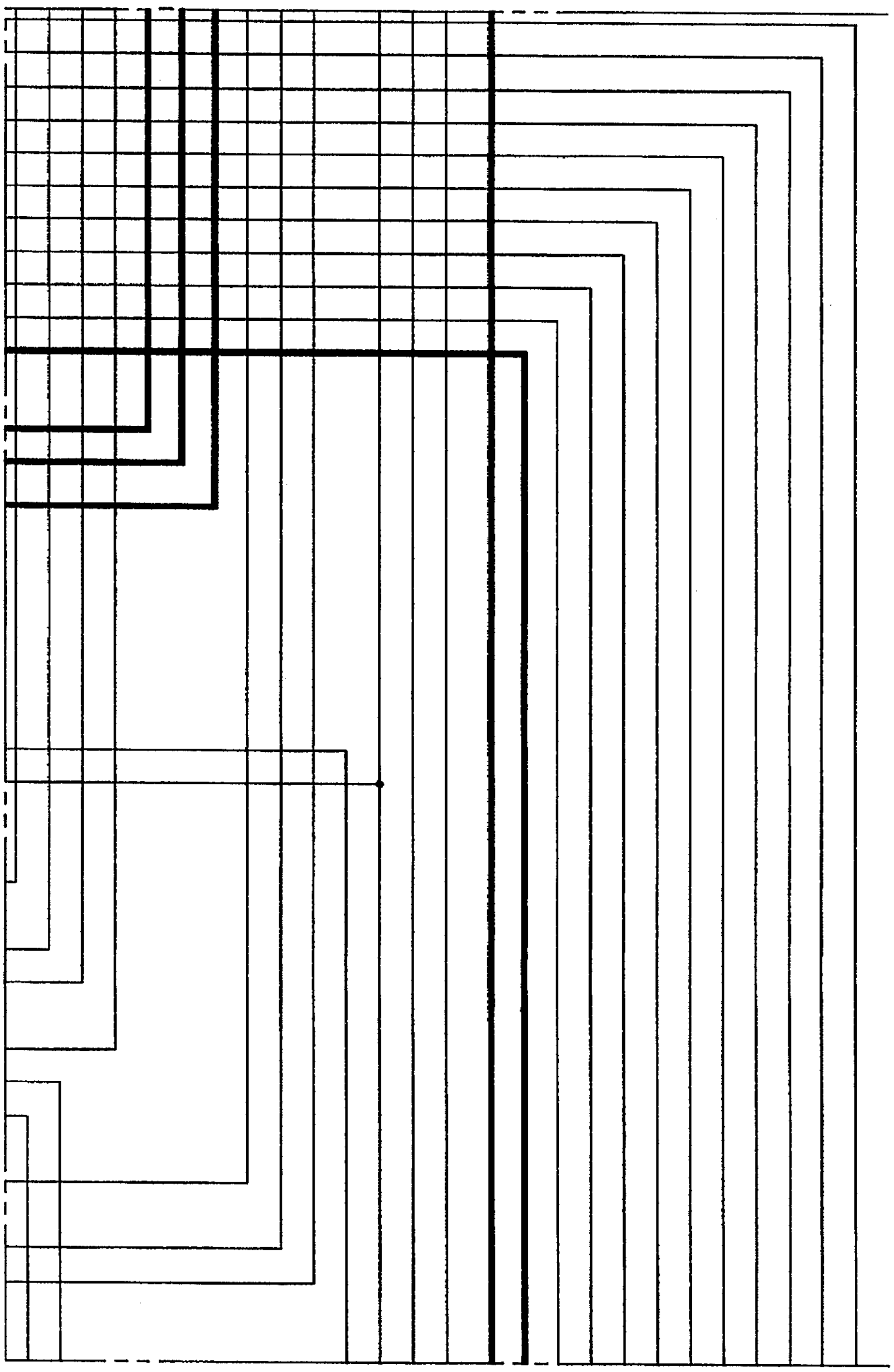
Figures 1, 47C:
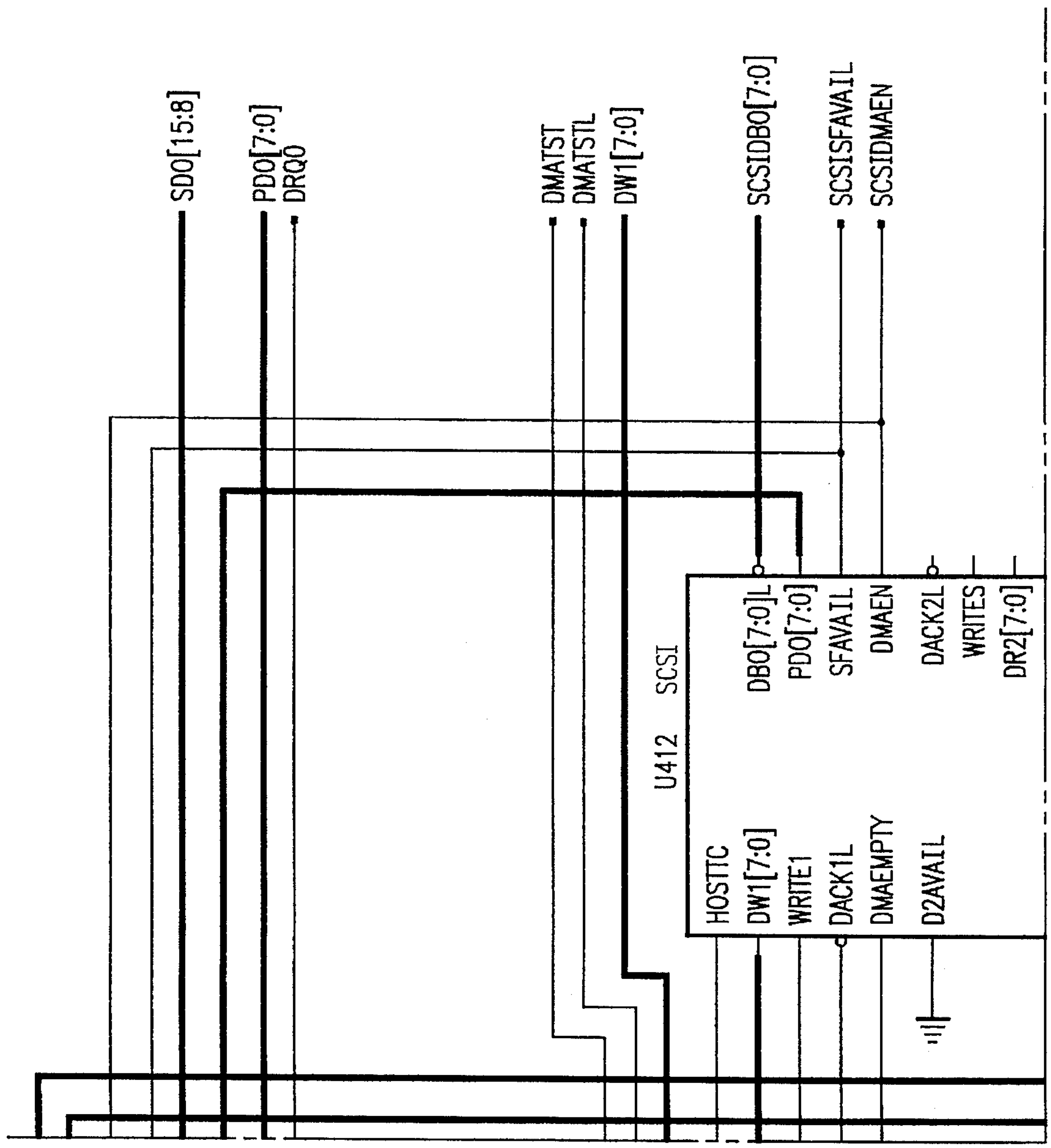
Figures 2, 47C:
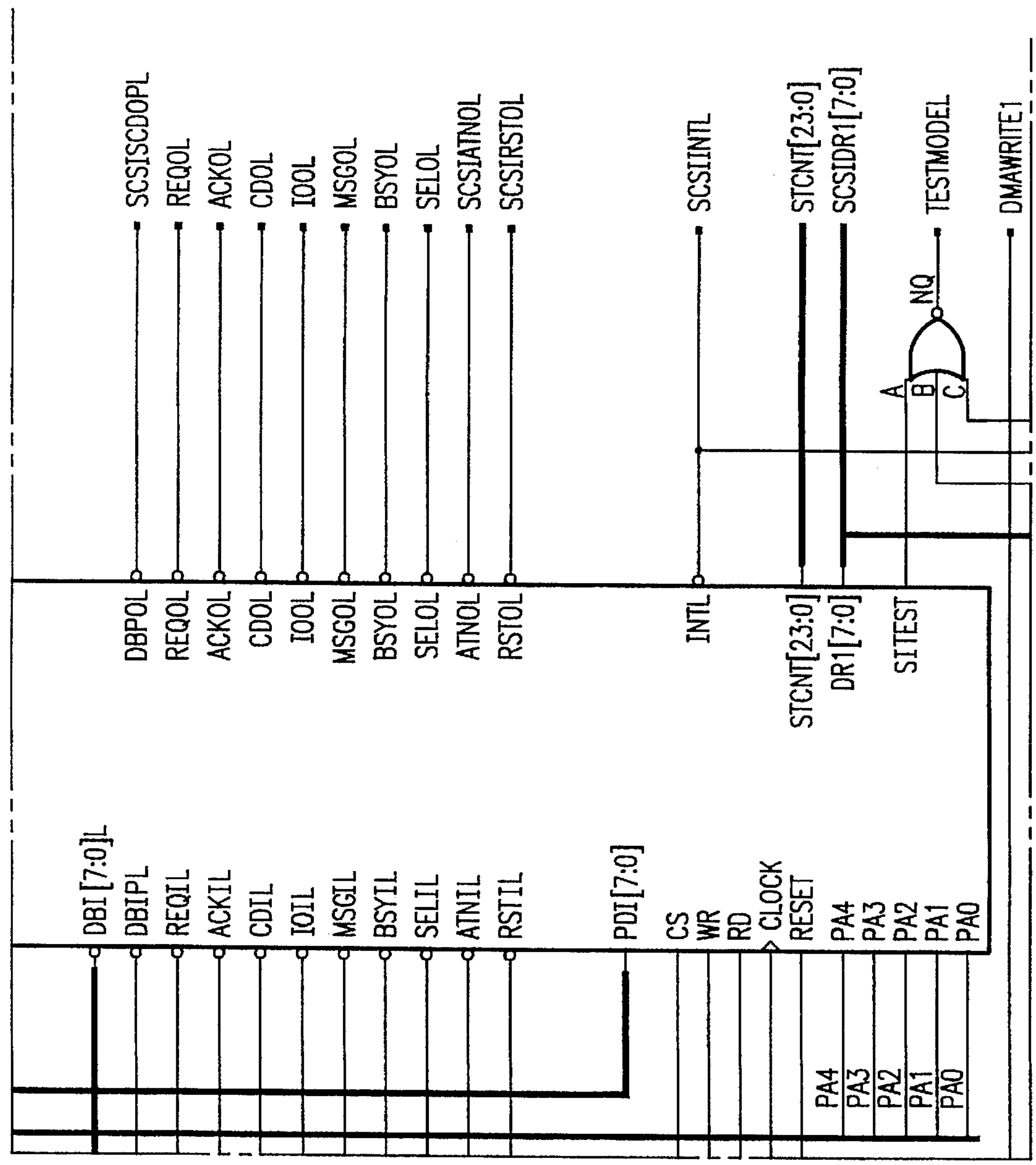
Figure 47C:
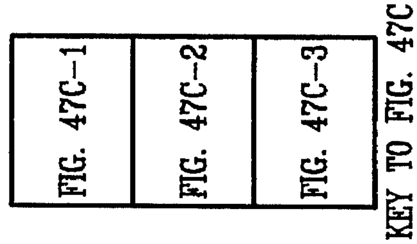
Figure 3:
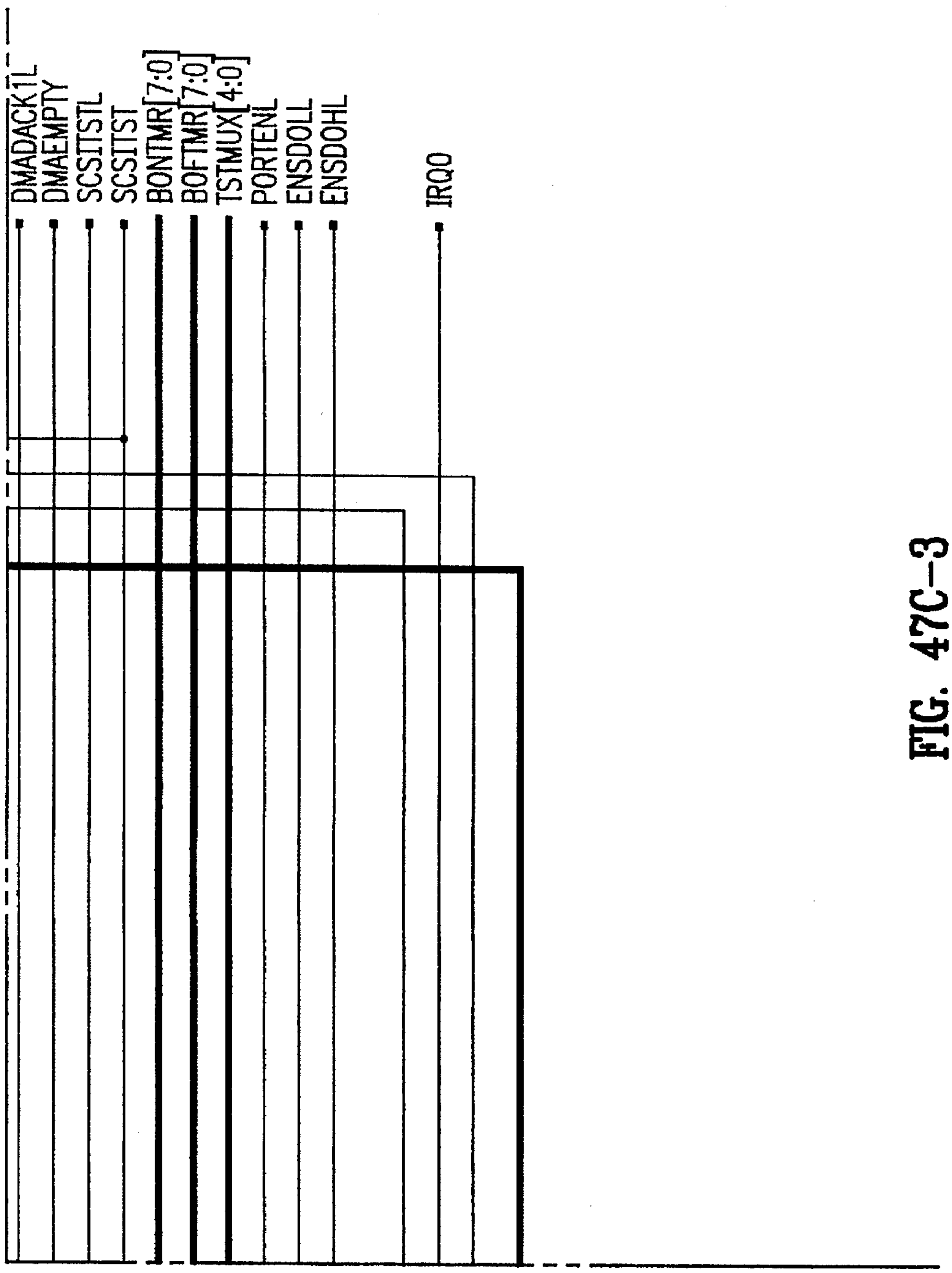
Figure 48:
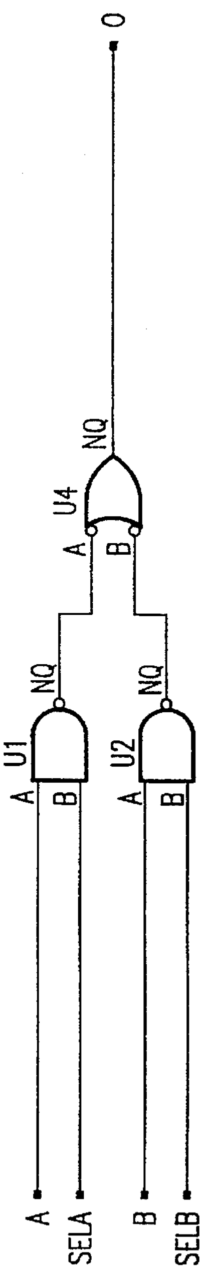
FIG.48 illustrates one embodiment of circuit MUX2_1, a two to one multiplexer.
Figure 49:
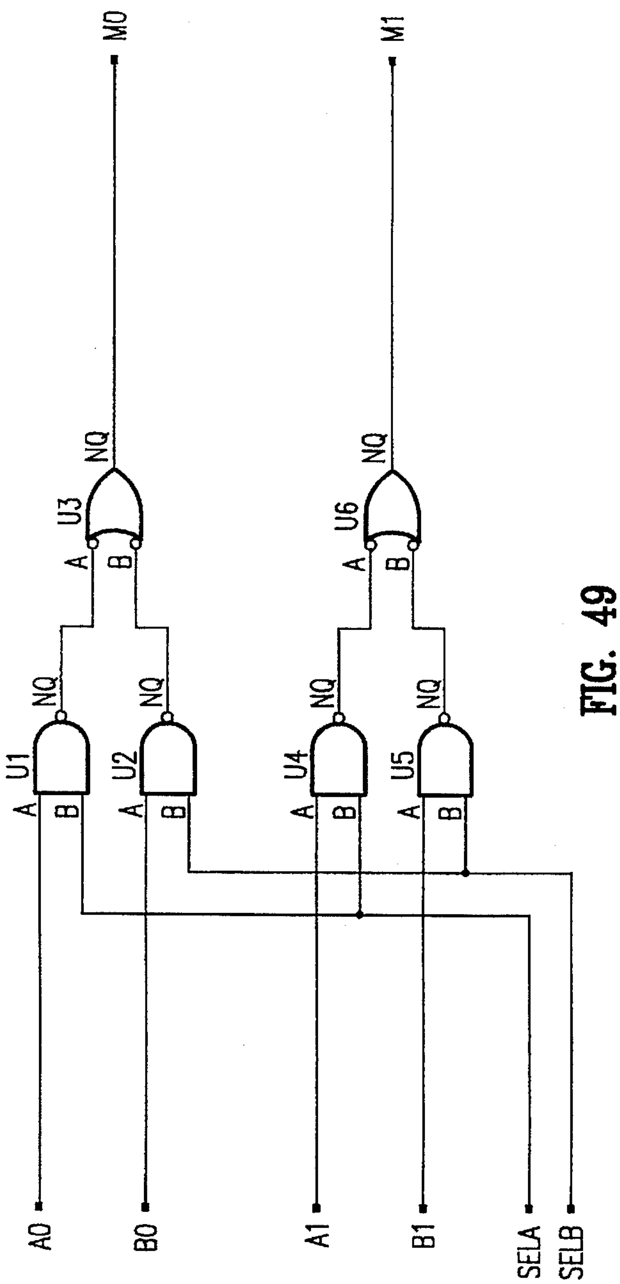
FIG. 49 illustrates one embodiment of circuit MUX2_2.
Figure 50:
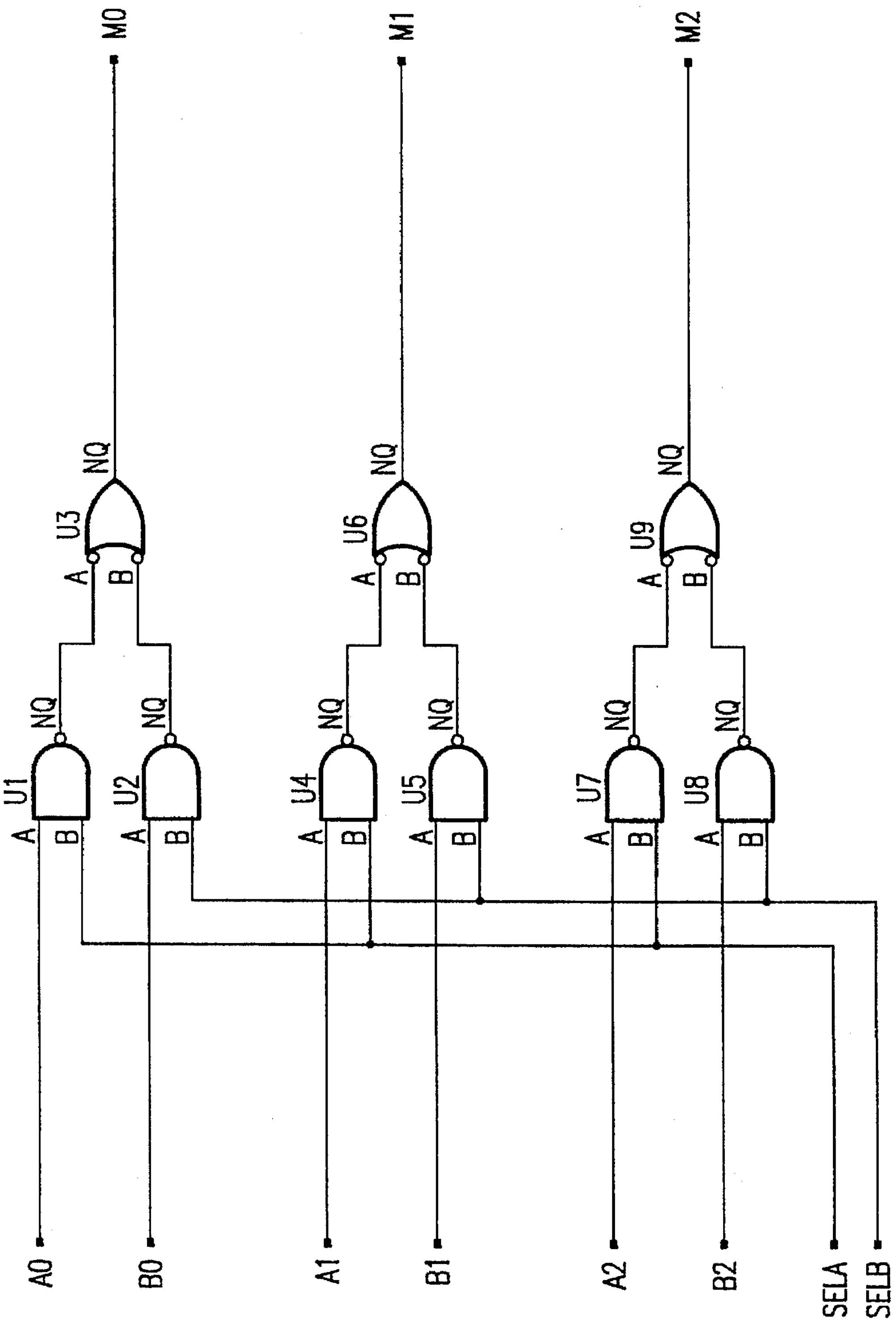
FIG. 50 illustates one embodiment of circuit MUX2_3.
Figure 51:
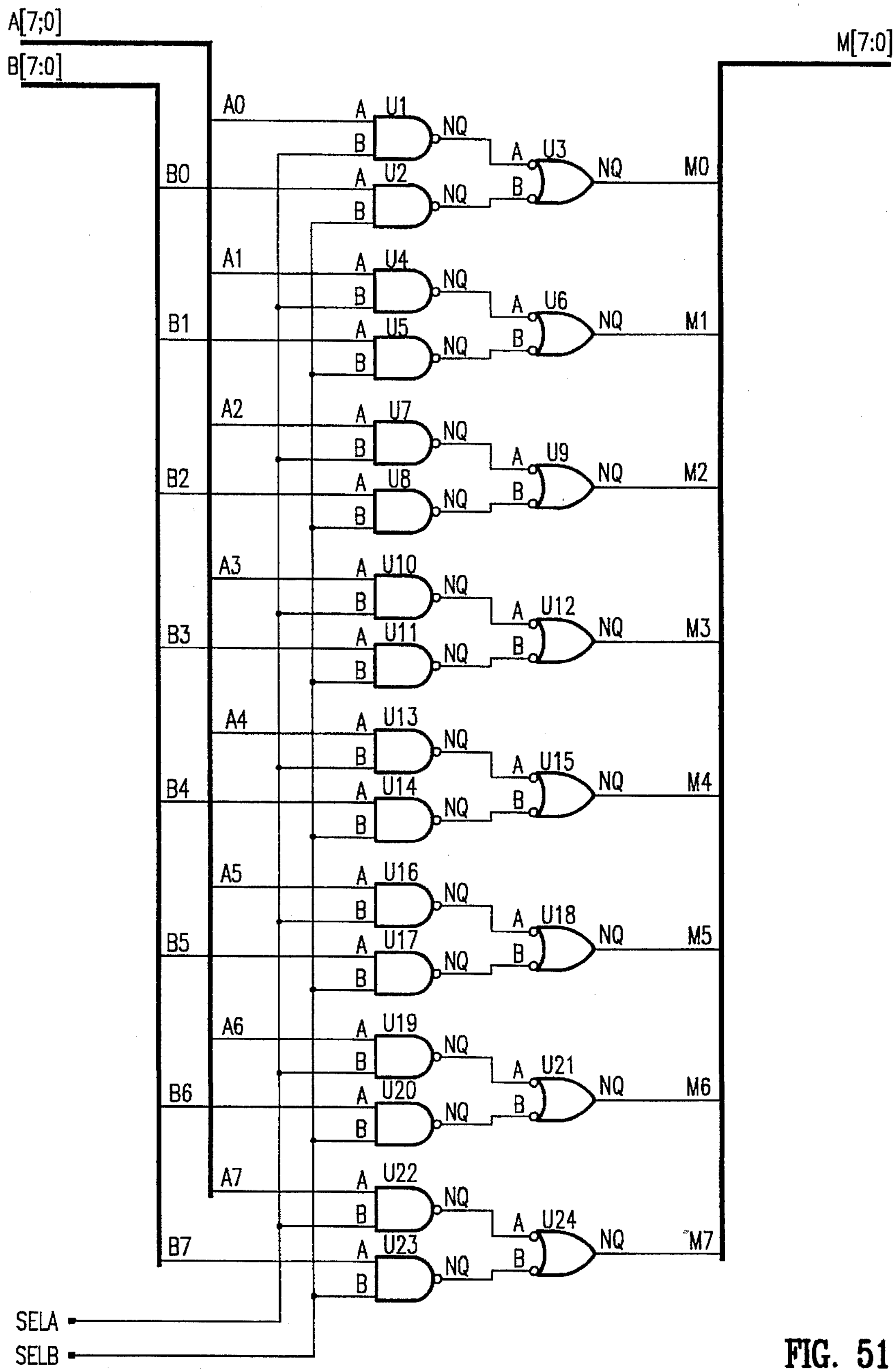
FIG. 51 illustrates one embodiment of circuit MUX2_8.
Figure 52A:
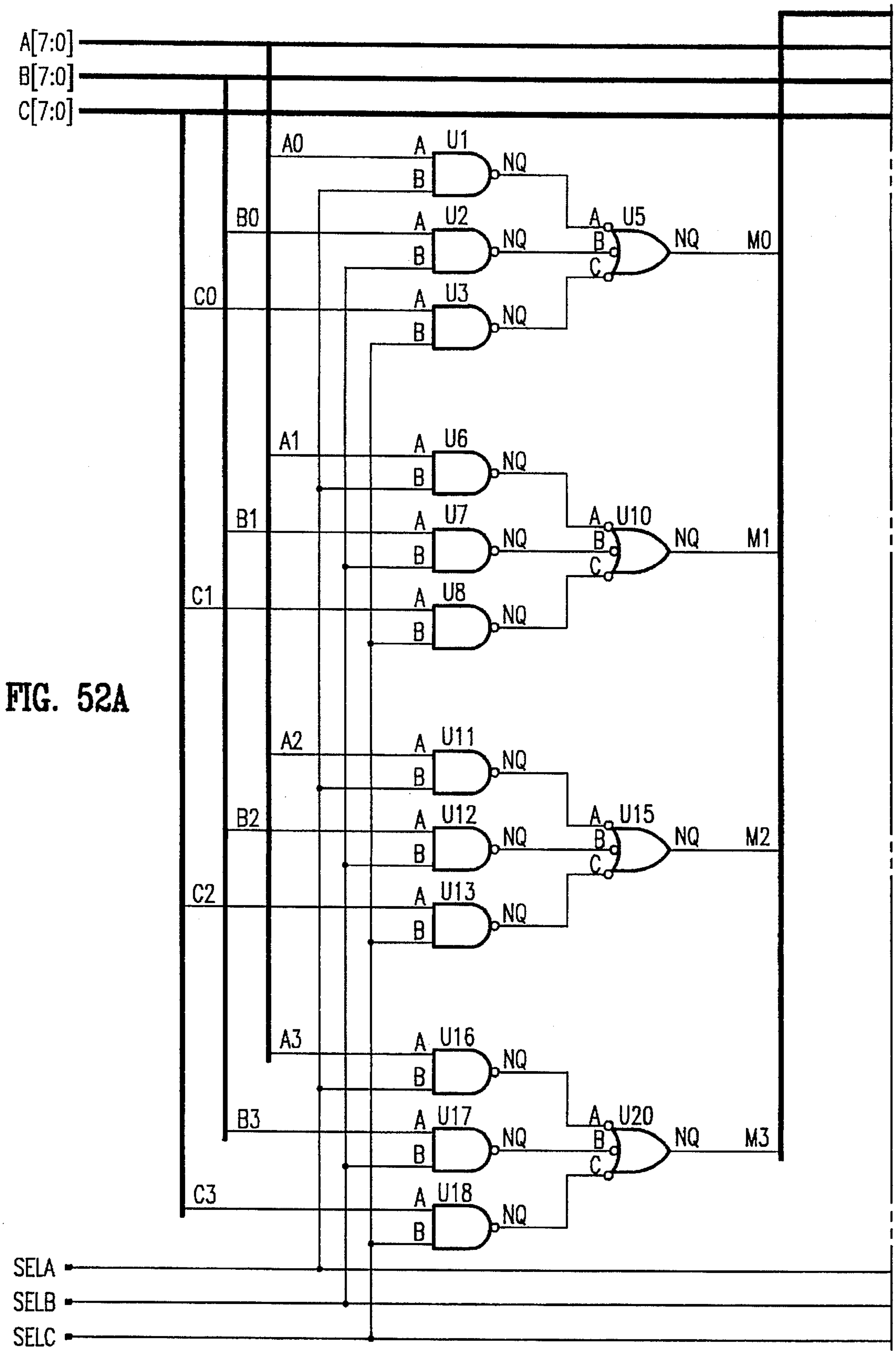
FIGS. 52A and 52B illustrates one embodiment of circuit MUX3_8.
Figure 52B:
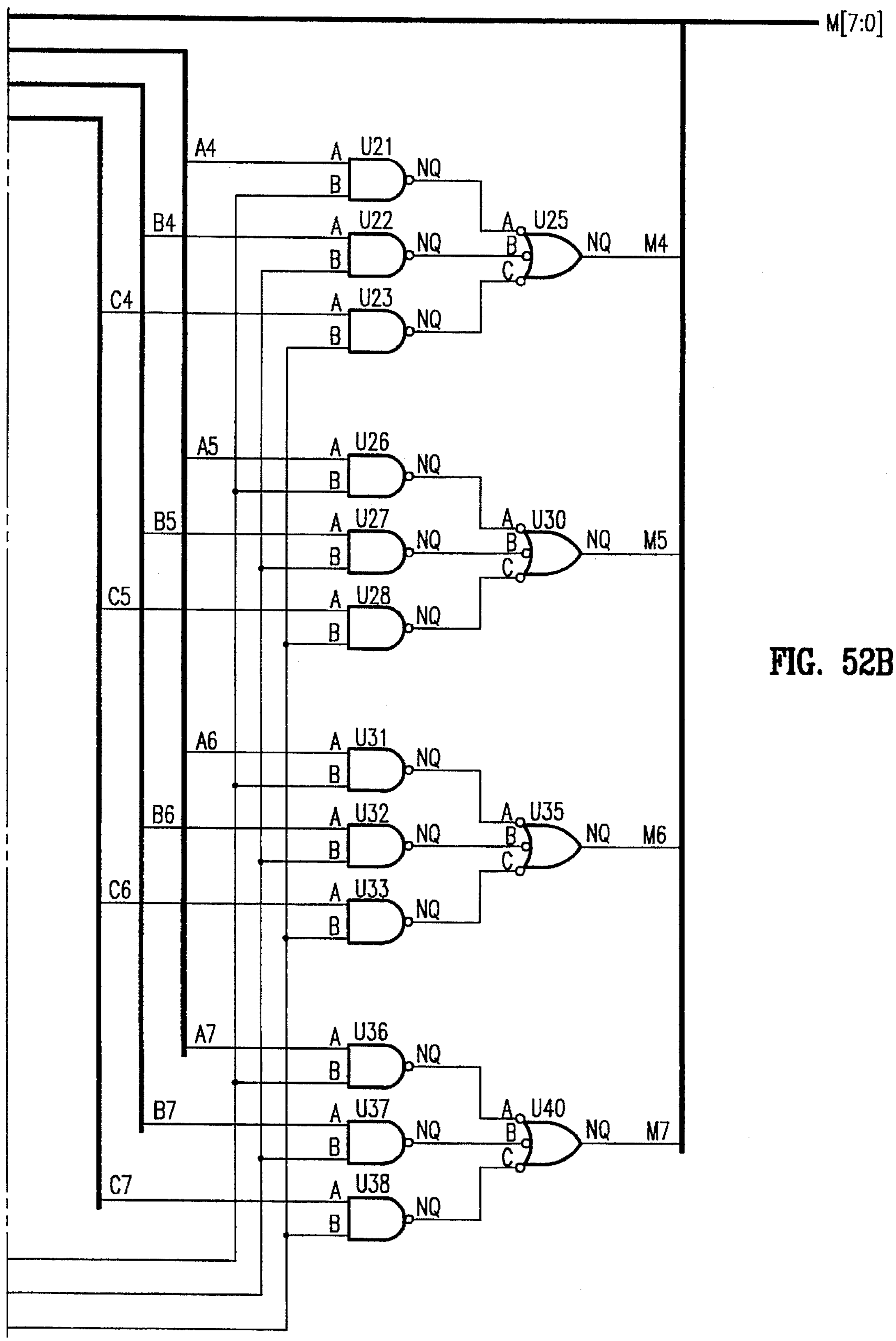

FIGS. 47A, 47B and 47C show that H/A integrated circuit 6260 has two major components SPDMA and SCSI. In addition, integrated circuit 6260 includes circuits CLKGEN, INTRP, INVX8, as well as circuits MUX2_I, MUX2_2, MUX3_8, MUX2_8, MUX2_3. FIG. 48 illustrates one embodiment of circuit MUX2_1, a two to one multiplexer. FIG. 49 illustrates one embodiment of circuit MUX2_2. FIG. 50 illustrates one embodiment of circuit MUX2_3. FIG. 51 illustrates one embodiment of MUX2_8 circuit. Similarly, FIGS. 52A and 52B illustrate one embodiment of MUX3_8 circuit.

Figure 53:
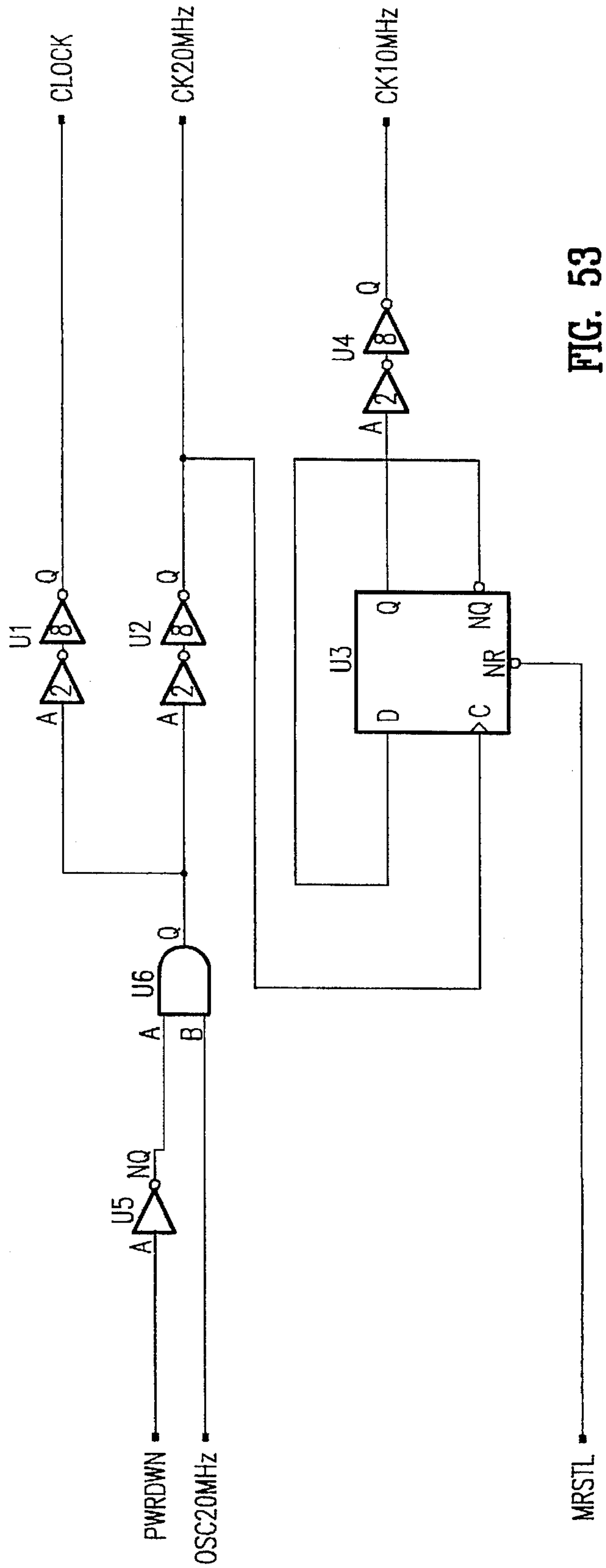
FIG. 53 illustrates one embodiment of circuit CLKGEN.
Figure 55:
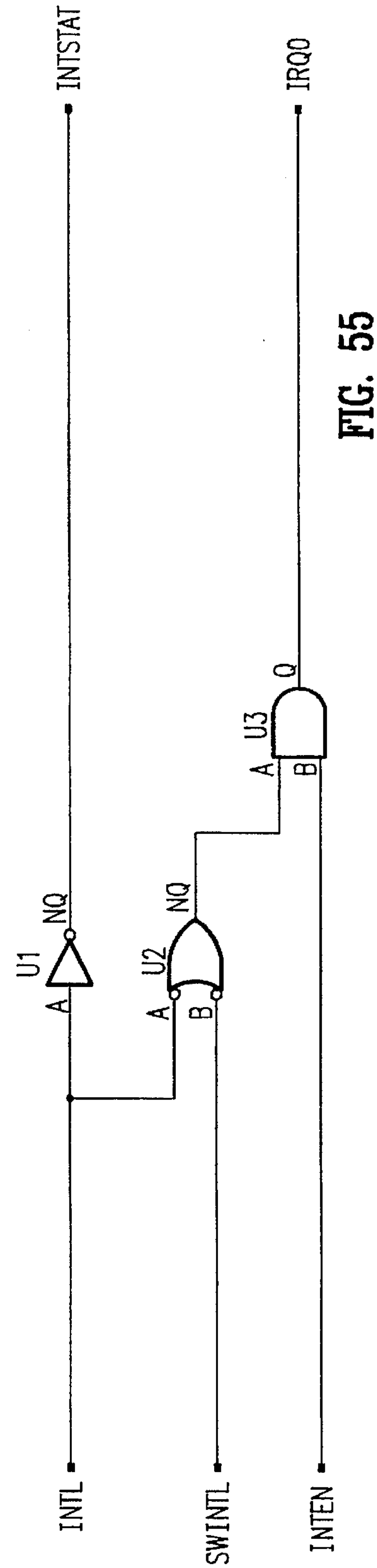
FIG. 55 illustrates circuit INTRP and is the driving circuit for line IRQ0 and bit INSTAT.
Figure 54:
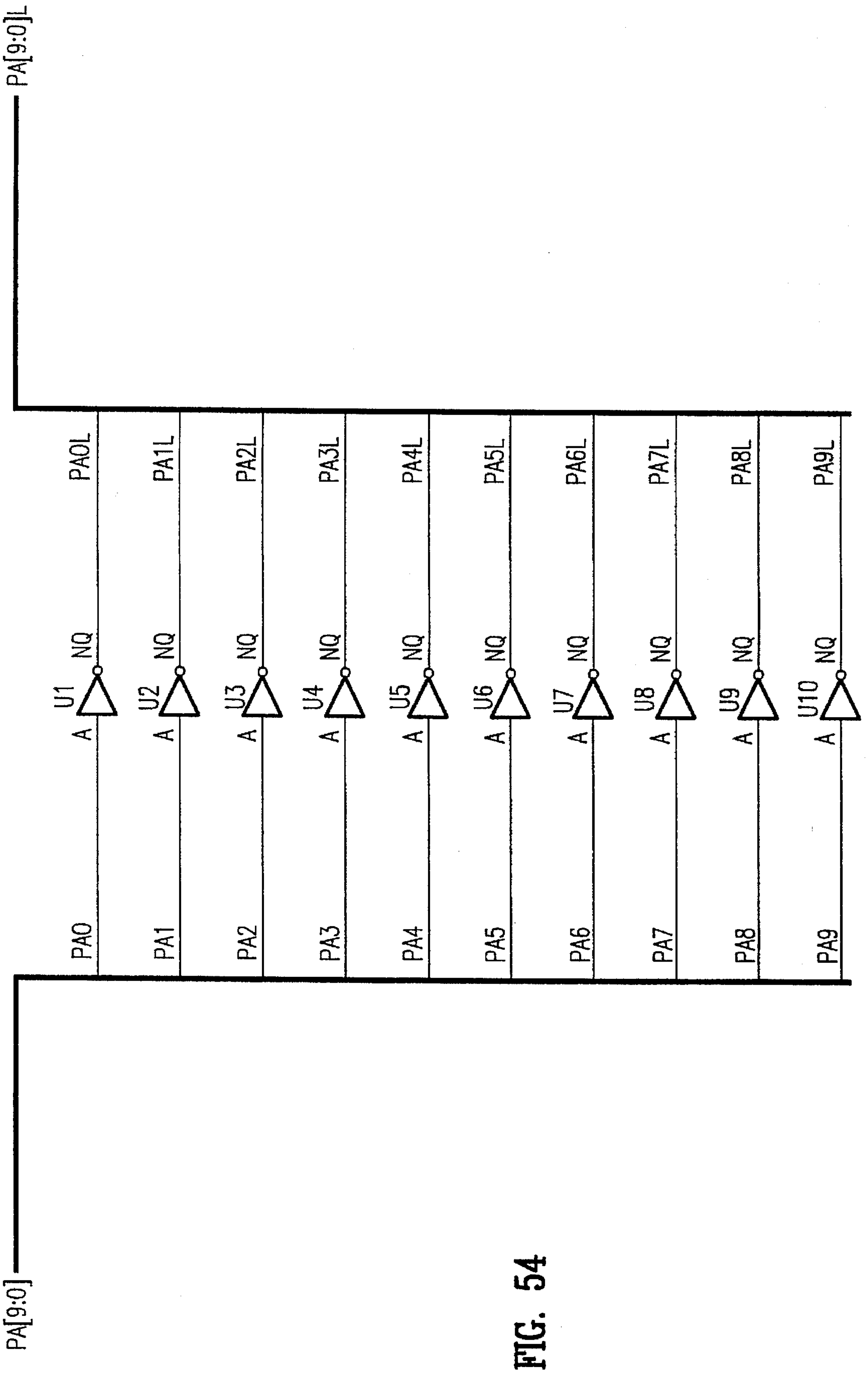
FIG. 54 illustrates one embodiment of circuit INVX8.

FIG. 53 is one embodiment of circuit CLKGEN. Notice that signal PWRDWN is used to gate signal OSC20MHZ through AND gate U6. This is the power down feature previously described. FIG. 54 is one embodiment of circuit INVX8 and is simply ten inverters connecting to ten-bit buses. FIG. 55 illustrates circuit INTRP and is the driving circuit for line IRQ0 and bit INSTAT. AND gate U3 is the same as gate 904 in FIG. 9.

Figures 2, 56A:
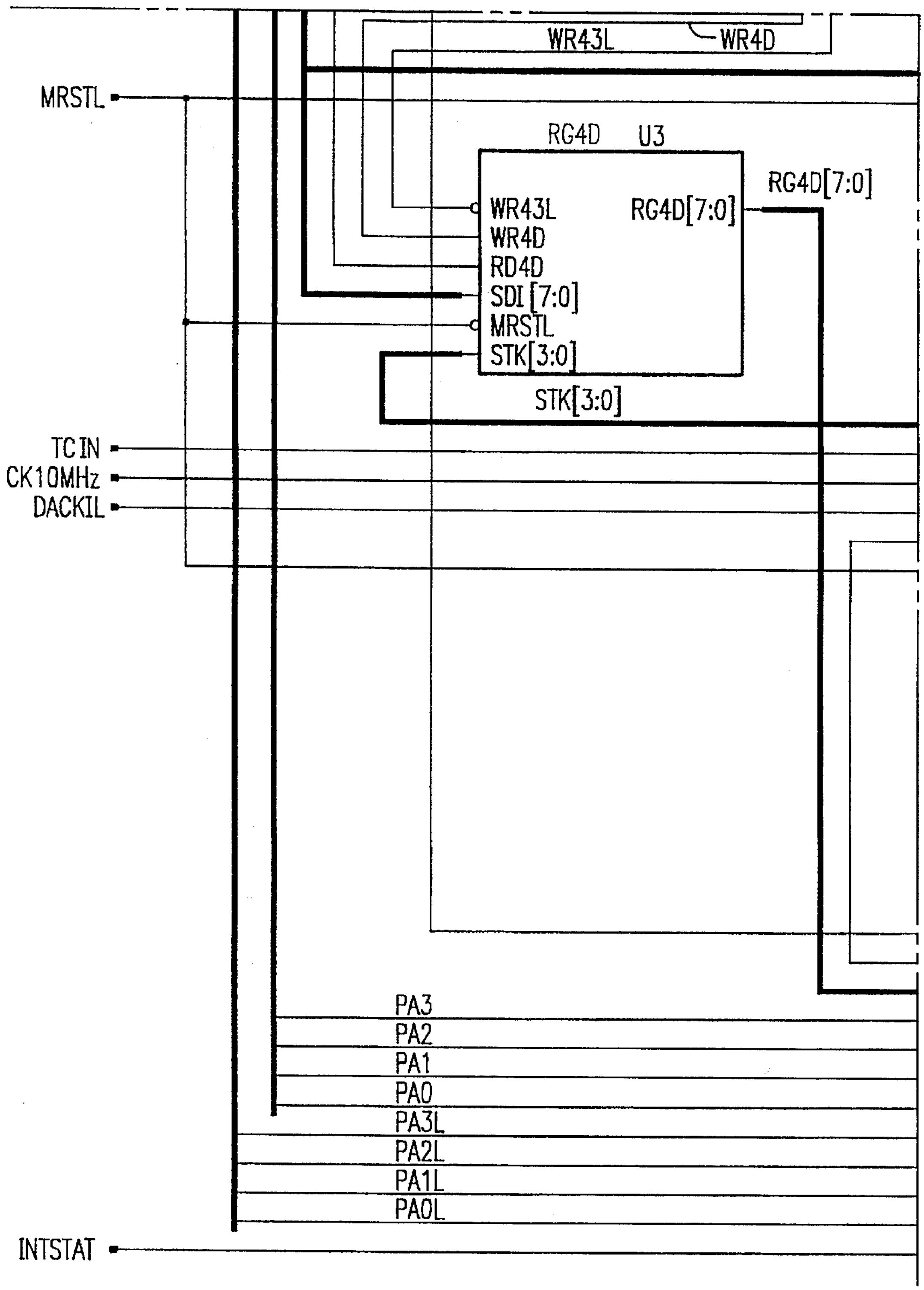
FIGS. 56A, 56B, and 56C are a more detailed diagram of circuit SPDMA of FIG. 47A that includes circuits SREQGEN, ATIFDMA, RG4D, DMAREAD, FIFO, and DMACTRL.
Figures 2, 56B:
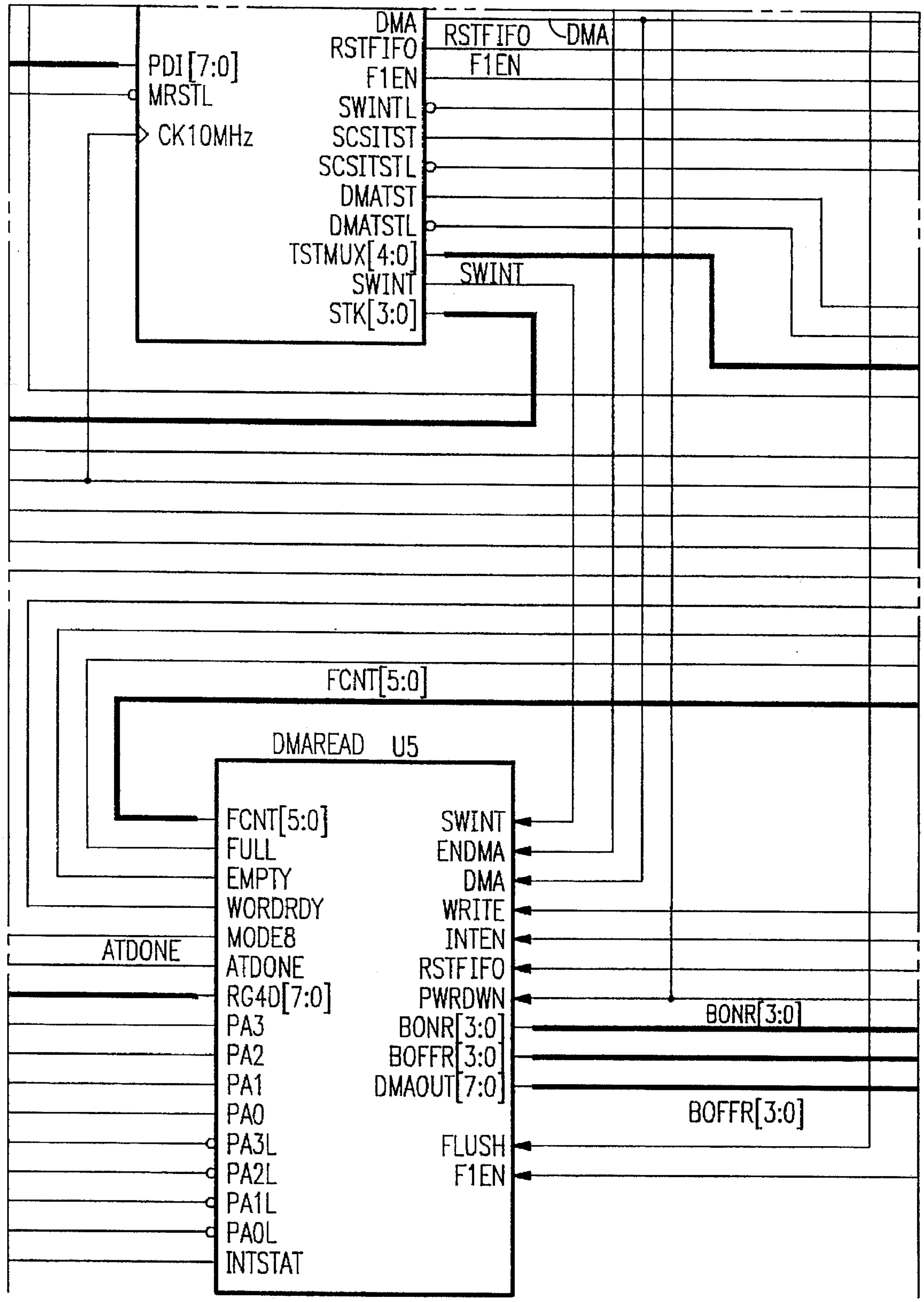
Figures 2, 56C:
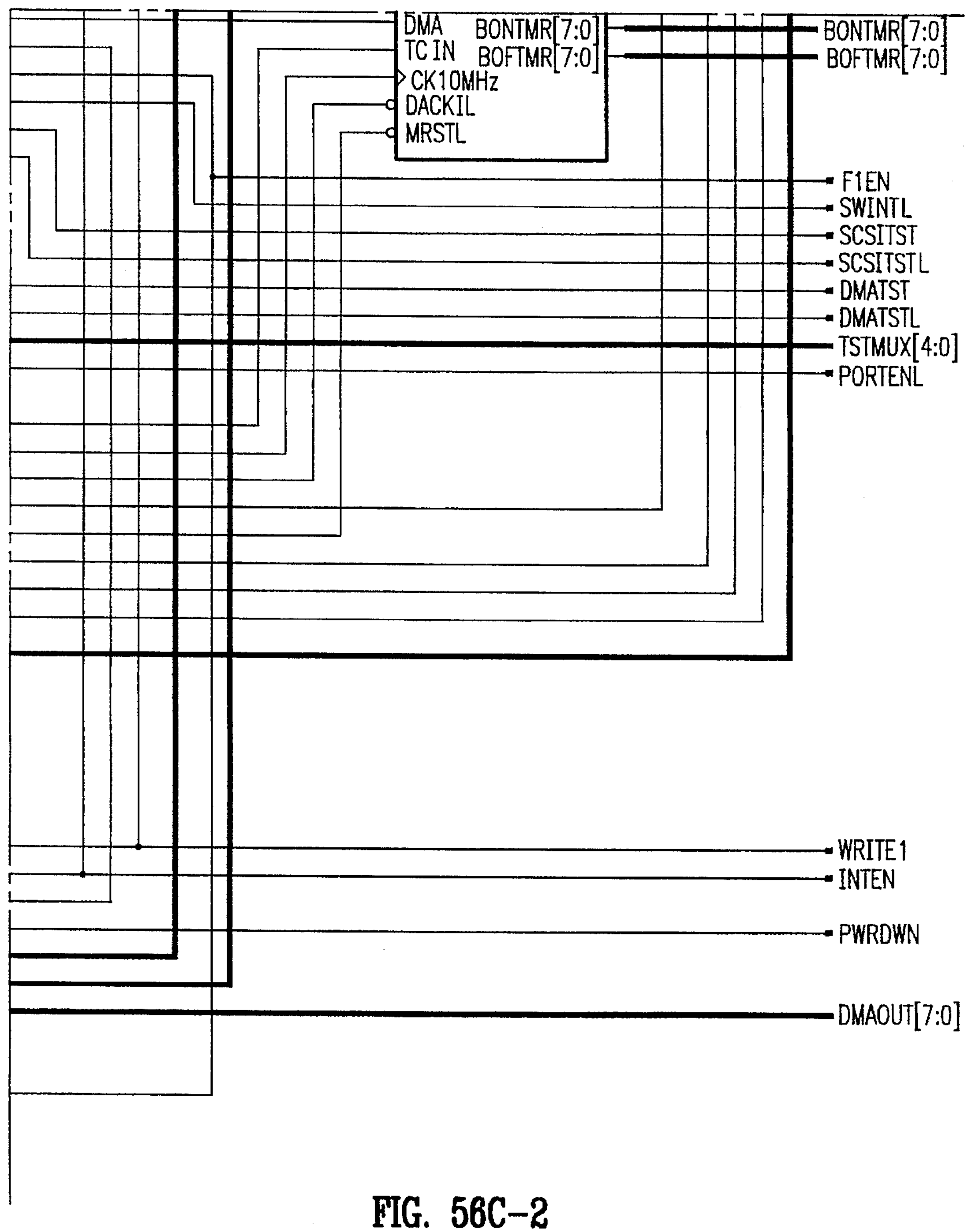

Circuit SPDMA (FIG. 47A) is shown in more detail in FIGS. 56A, 56B, and 56C. Circuit SPDMA includes circuits SREQGEN, ATIFDMA, RG4D, DMAREGS, DMAREAD, FIFO, and DMACTRL.

Figure 57:
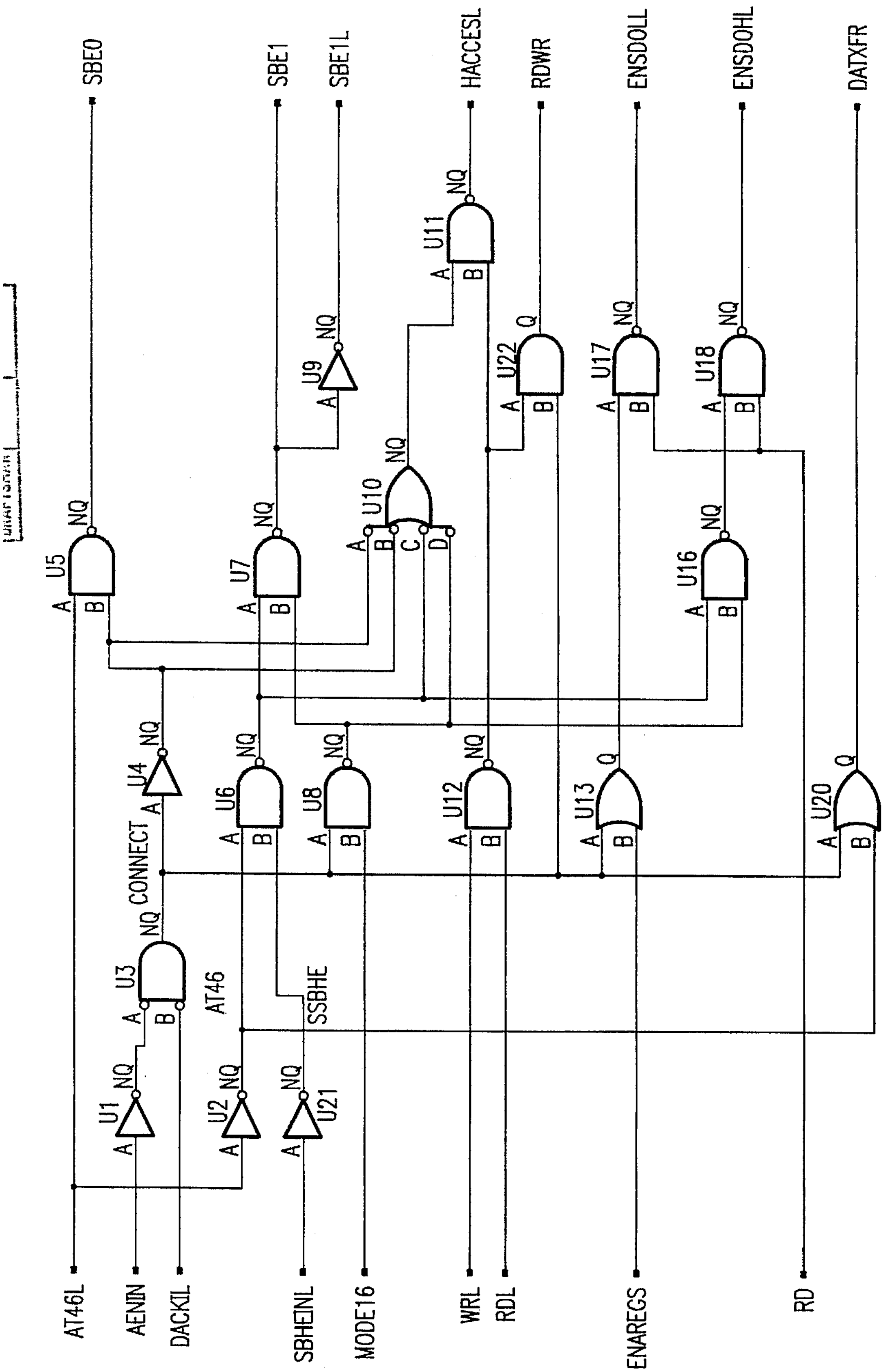
FIG. 57 illustrates circuit SREQGEN, which is the system request generation circuit.
Figure 58A:
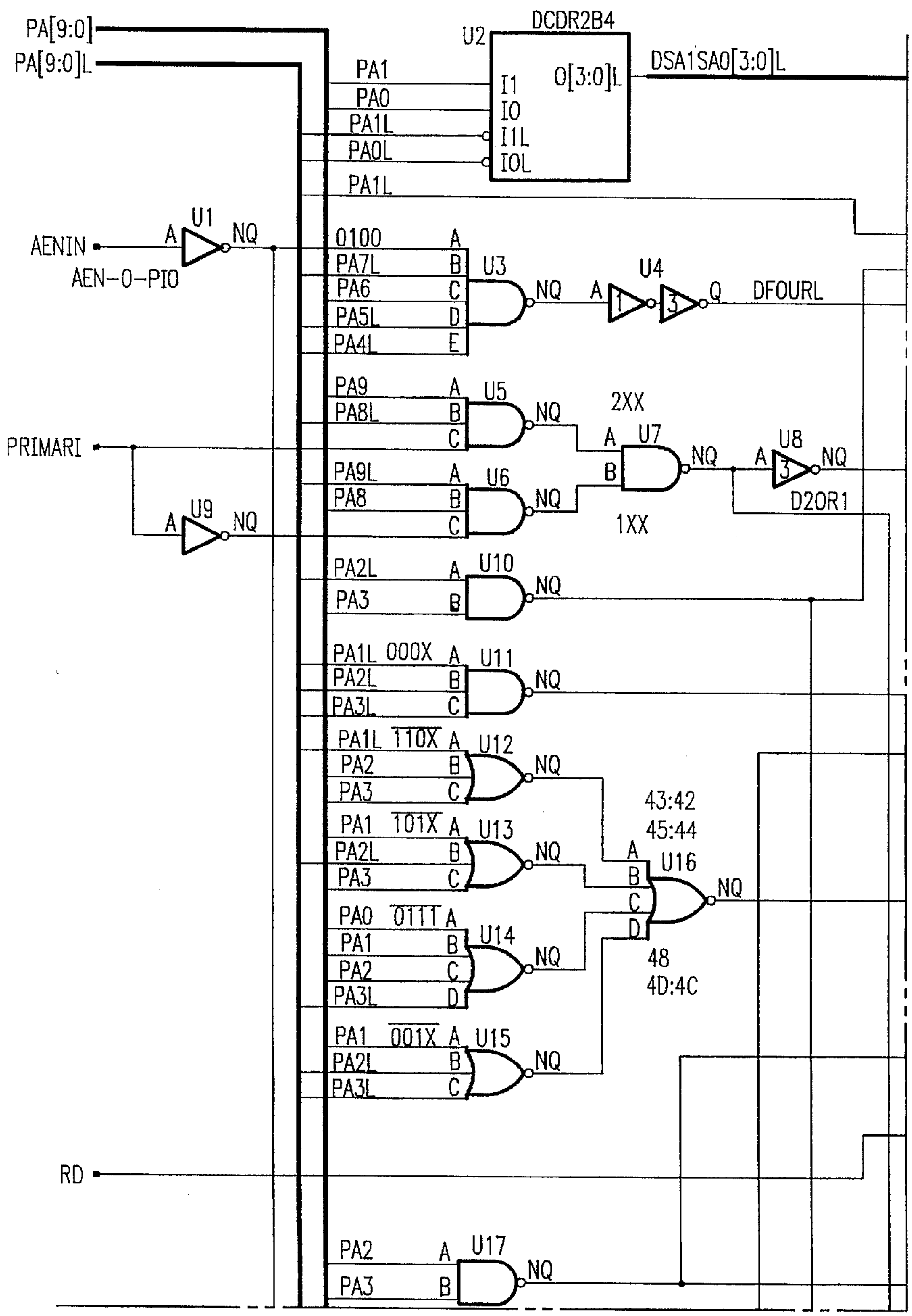
FIGS. 58A, 58B, 58C and 58D illustrate circuit ATIFDMA of FIG. 56A that includes circuit DCDR2B4.
Figure 58B:
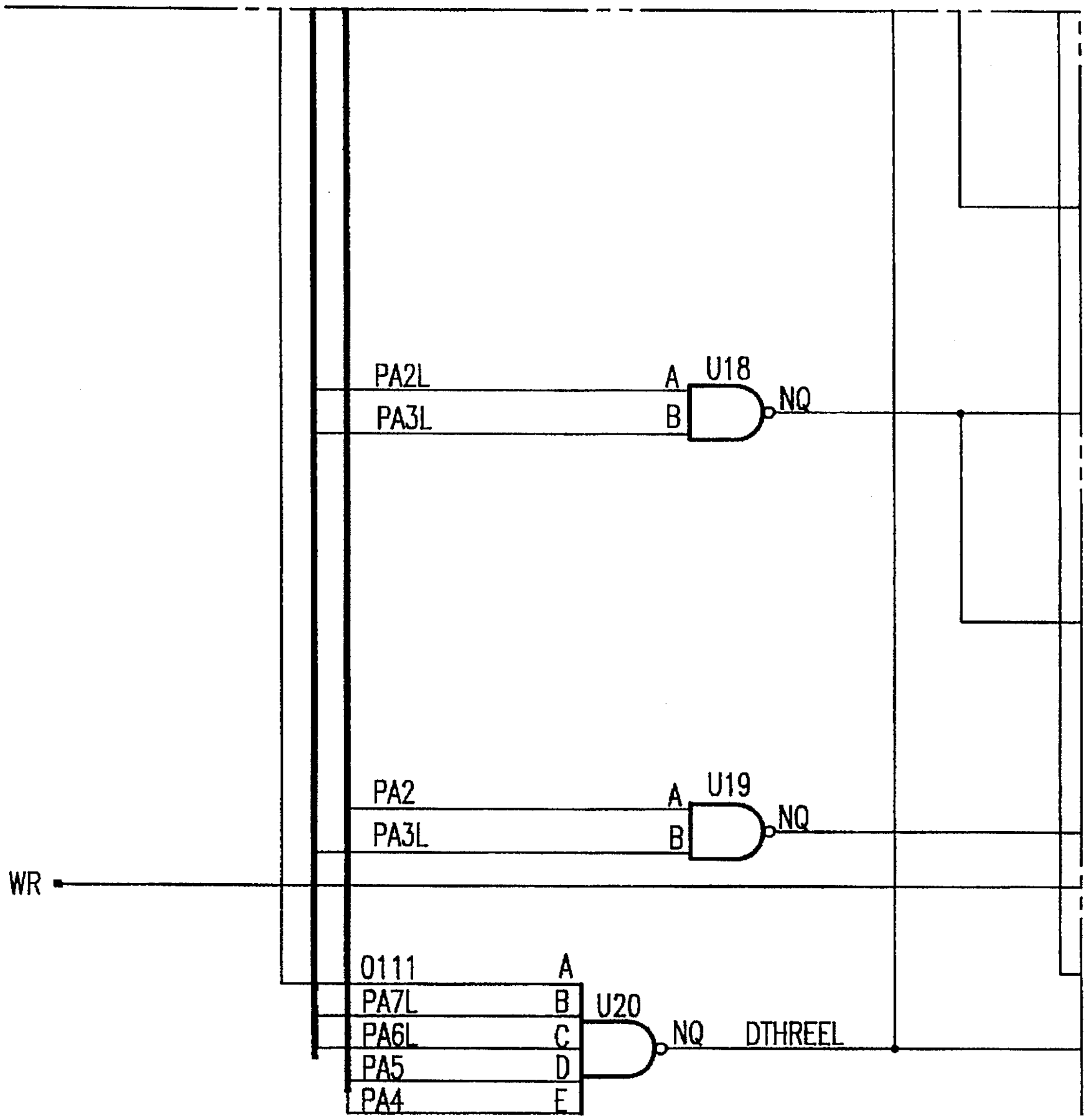
Figure 58C:
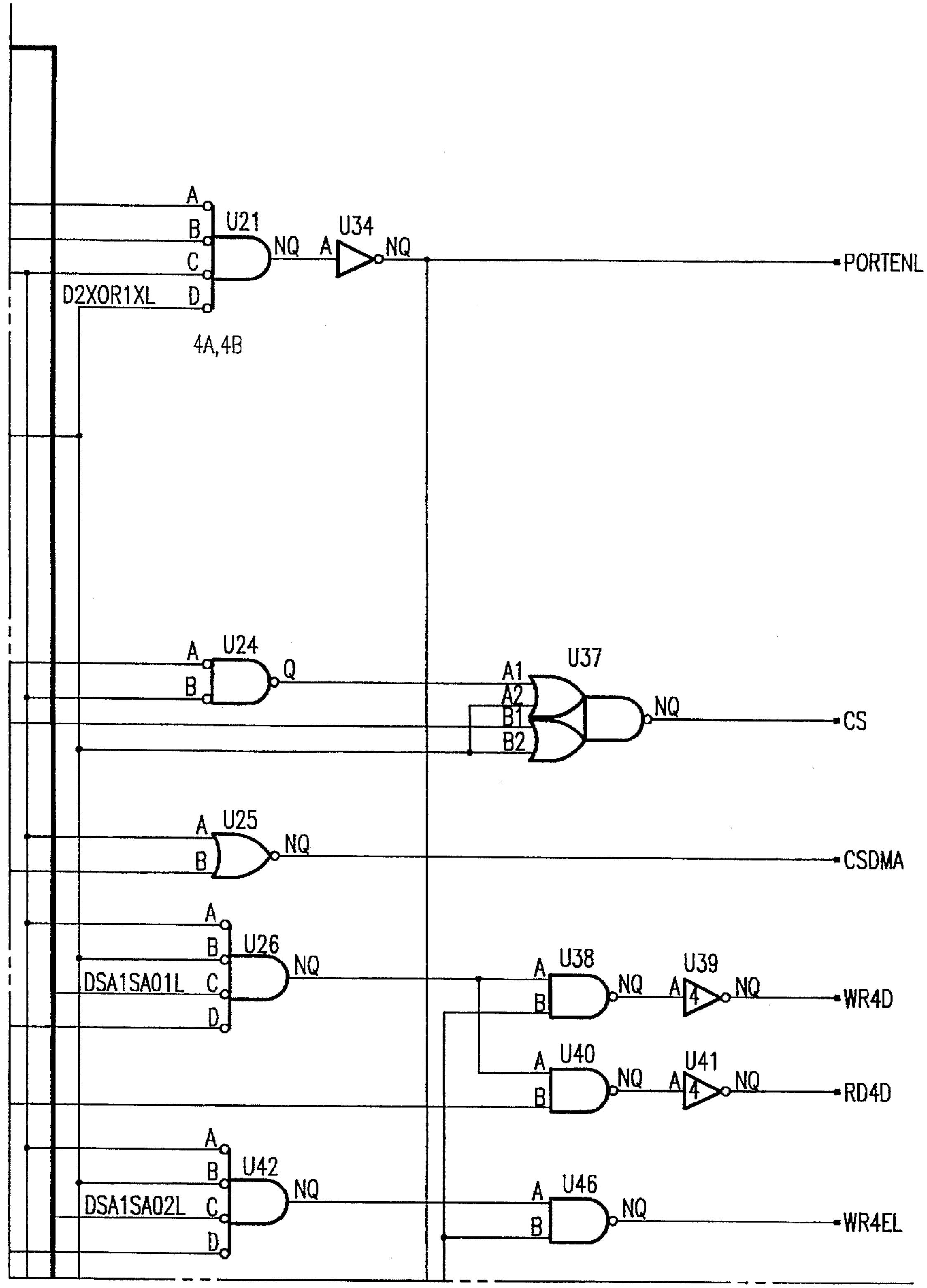
Figure 58D:
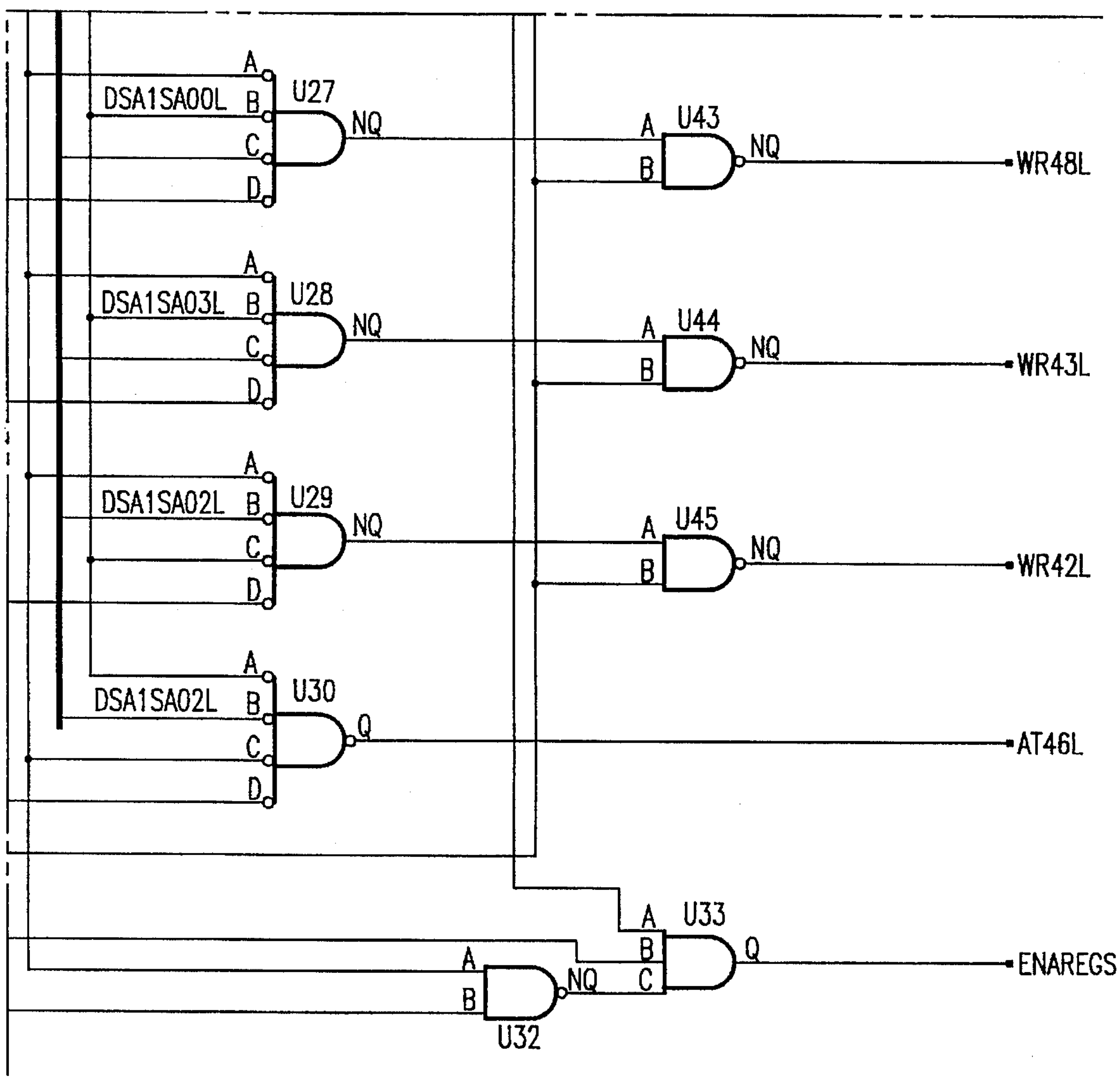
Figure 59:
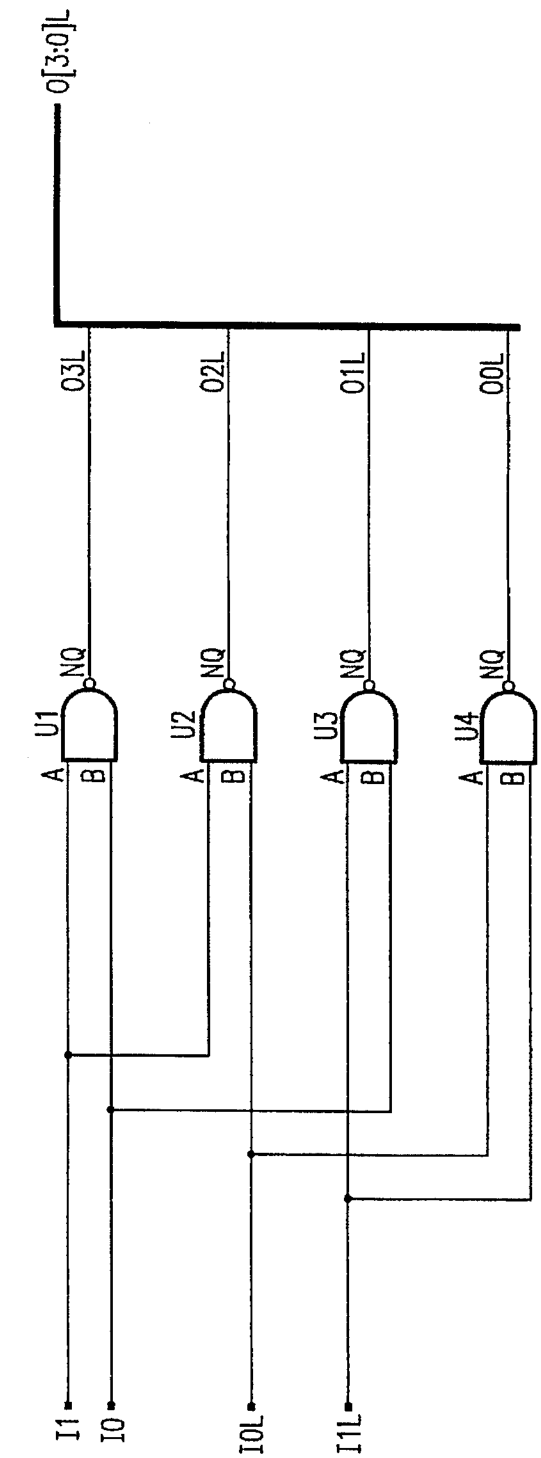
FIG. 59 illustrates circuit DCDR2B4.
Figure 60:
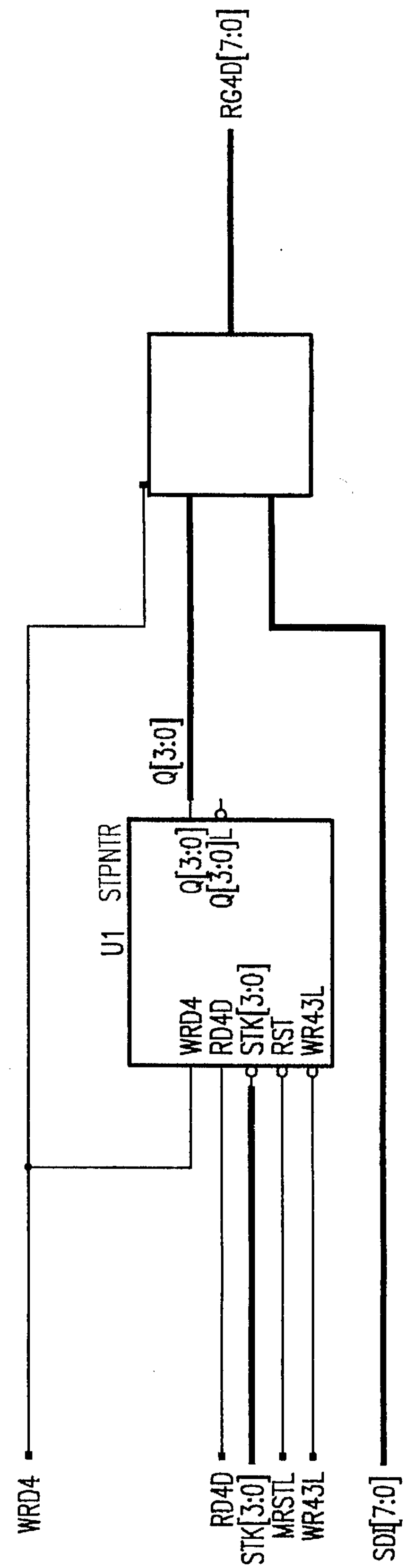
FIG. 60 is a more detailed diagram of circuit RG4D of FIG. 56A, which, in turn, is stack 401 (FIG. 4).
Figure 61A:
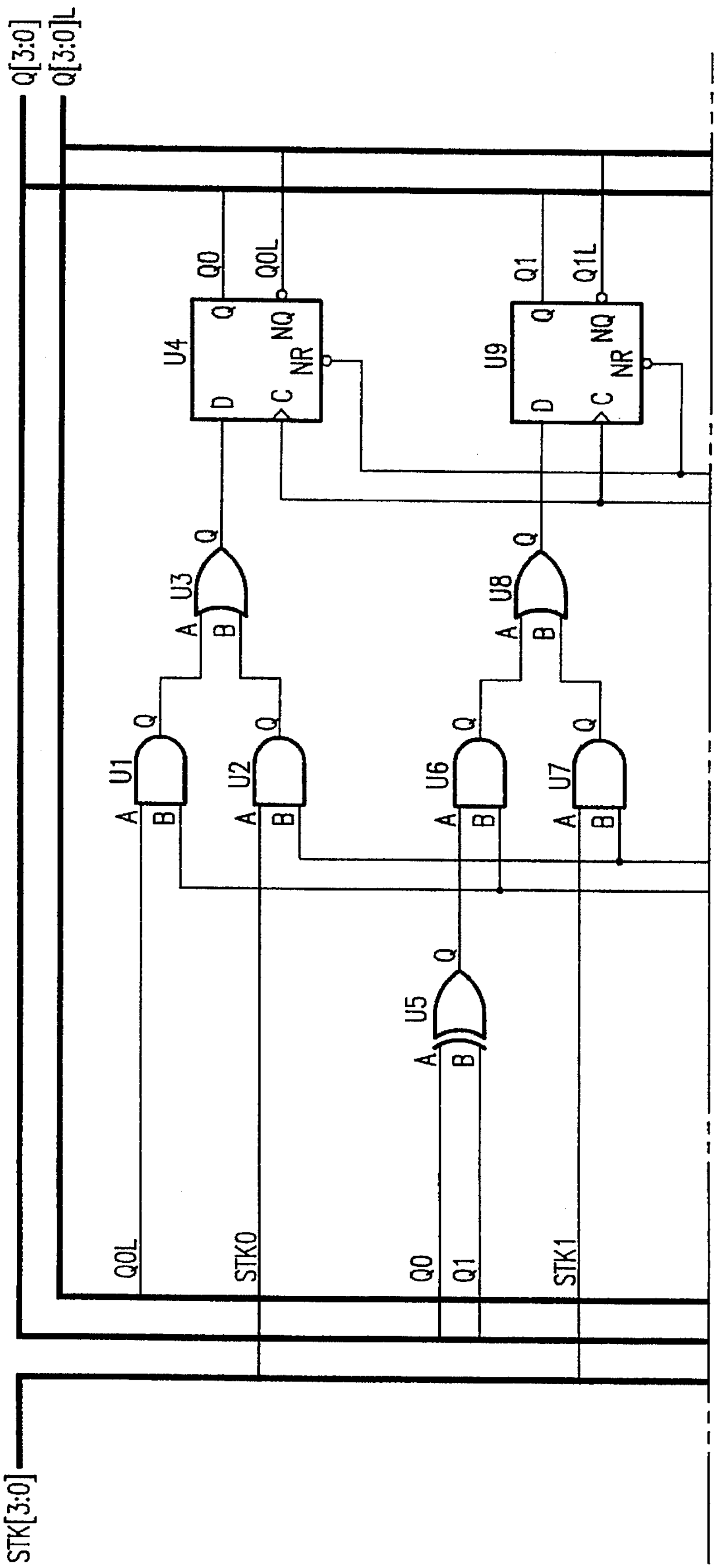
FIGS. 61A and 61B illustrate circuit STPNTR of circuit RG4D in more detail.
Figure 61B:
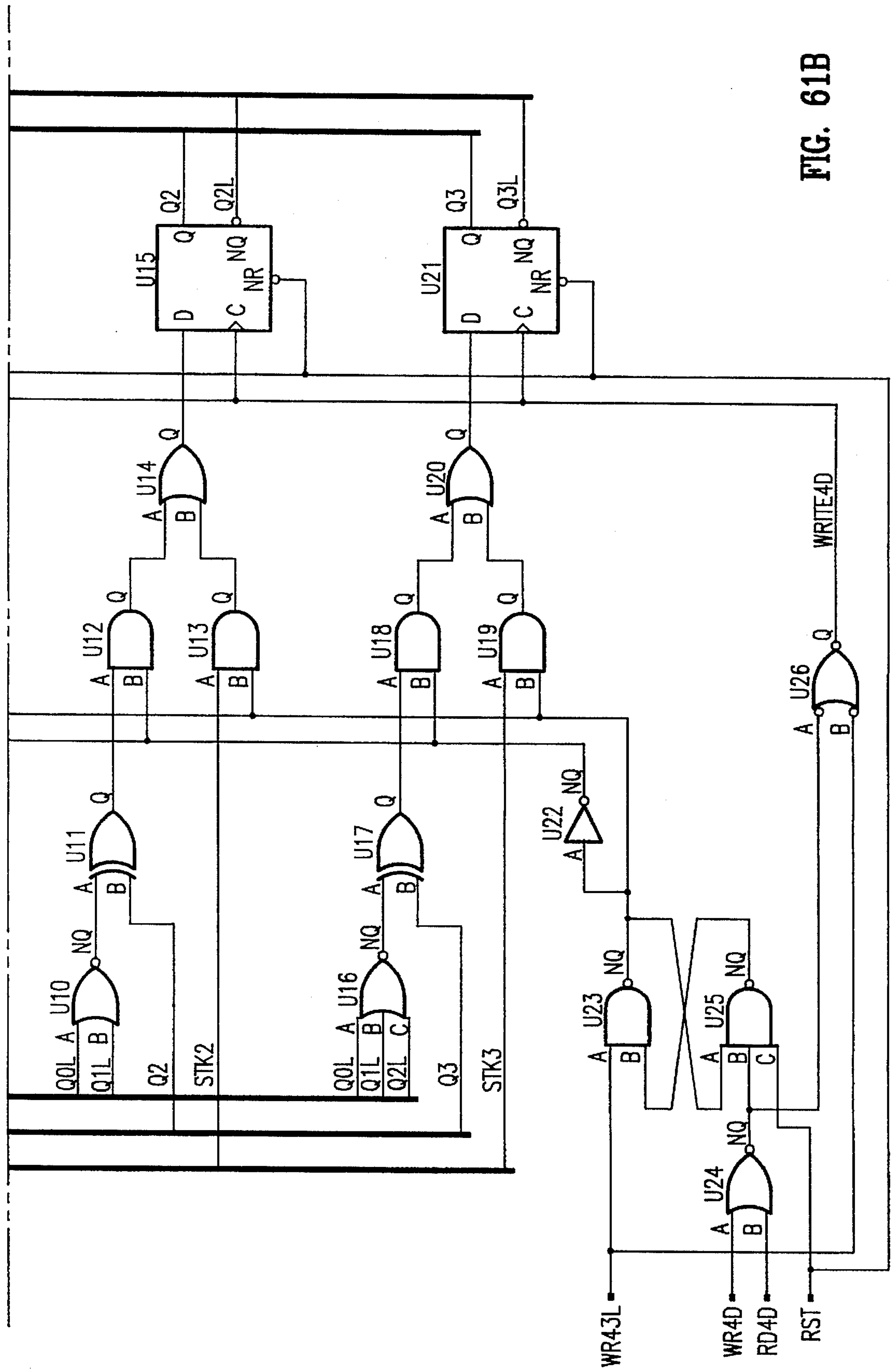

FIG. 57 illustrates circuit SREQGEN which is the system request generation circuit. FIGS. 58A, 58B, 58C and 58D illustrate circuit ATIFDMA (FIG. 56A). Circuit ATIFDMA (FIG. 58A) includes circuit DCDR2B4. FIG. 59 illustrates circuit DCDR2B4 that consists of four NAND gates U1–U4. Circuit RG4D (FIG. 56A), which is stack 401 (FIG. 4), is shown in more detail in FIG. 60. Circuit RG4D includes circuit STPNTR which is the stack pointer circuit. FIGS. 61A and 61B illustrate circuit STPNTR in more detail.

Figures 1, 62A:
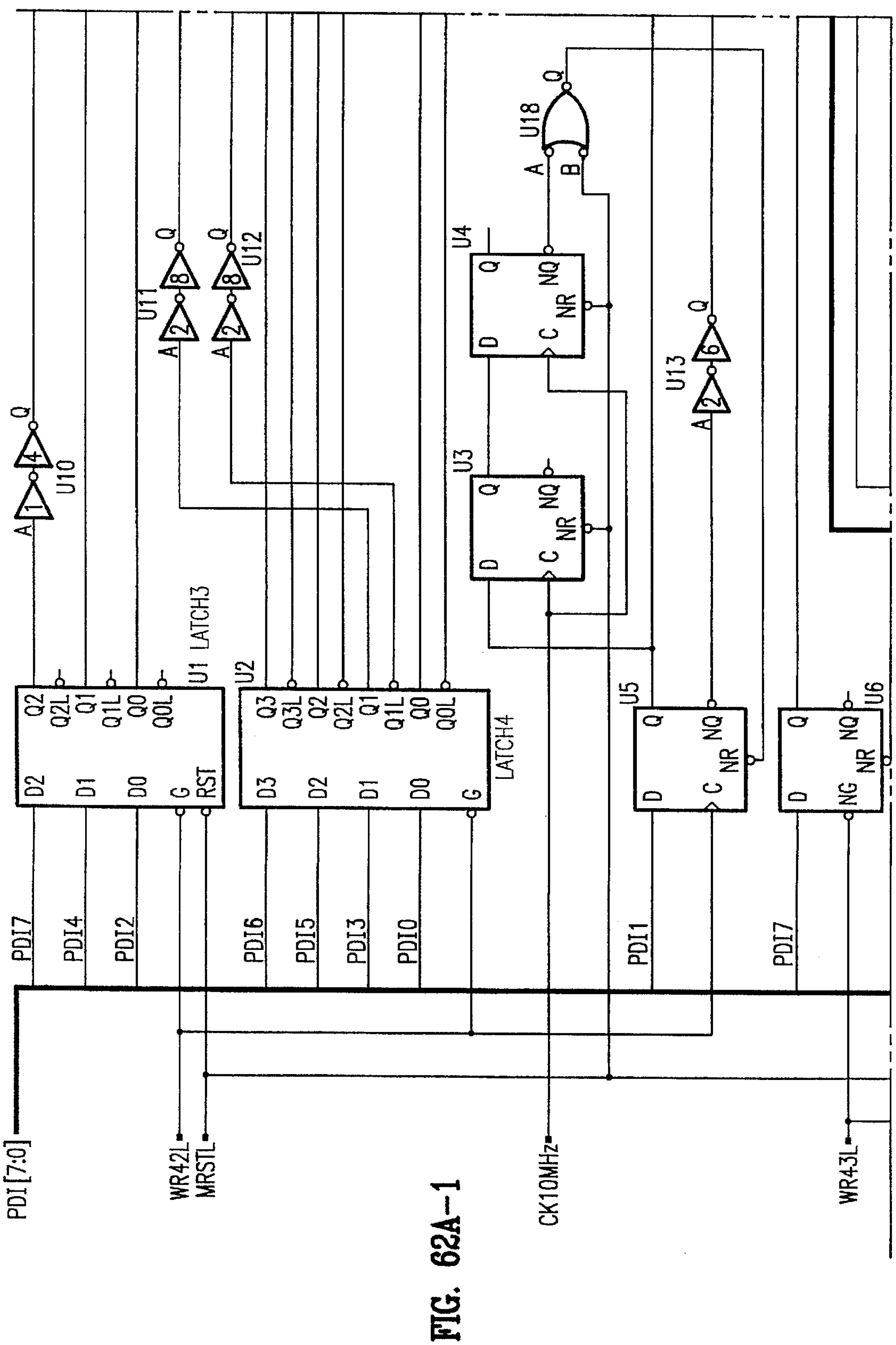
FIGS. 62A and 62B illustrate in more detail circuit DMAREGS of FIG. 56B that includes circuits LATCH3, LATCH4, RG48 and LATCH7R.
Figures 2, 62A:
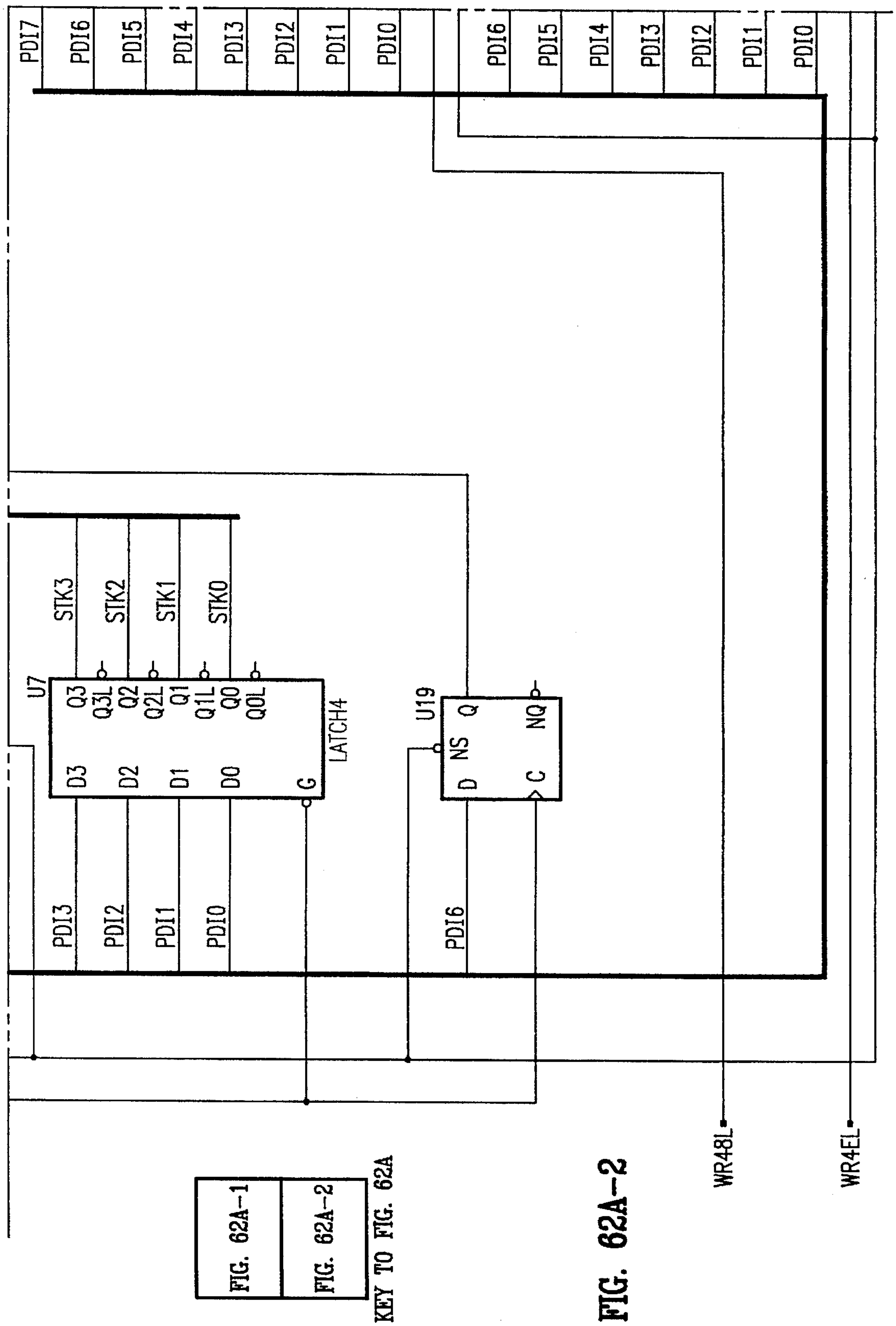
Figures 1, 62B:
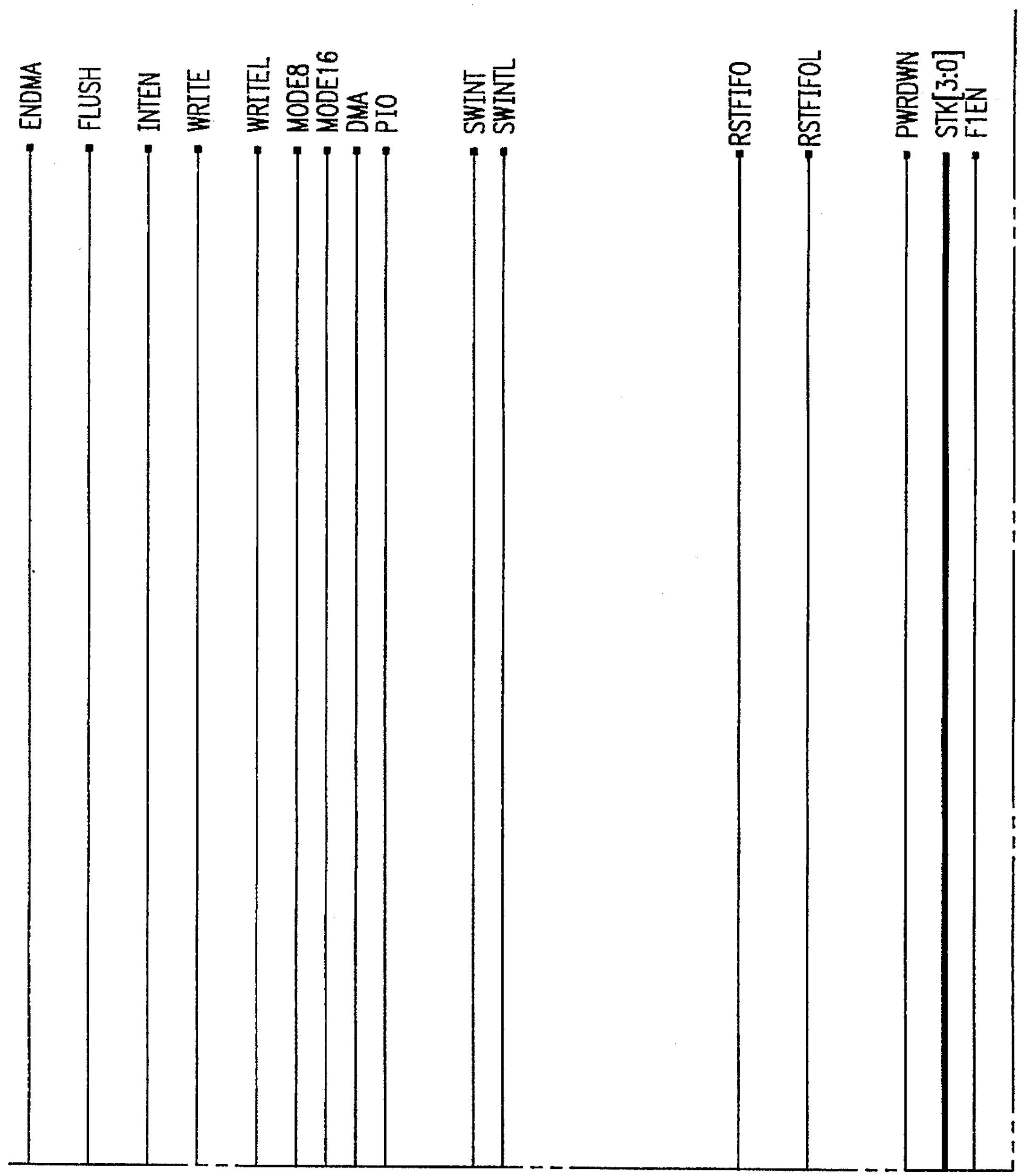
Figure 62B:
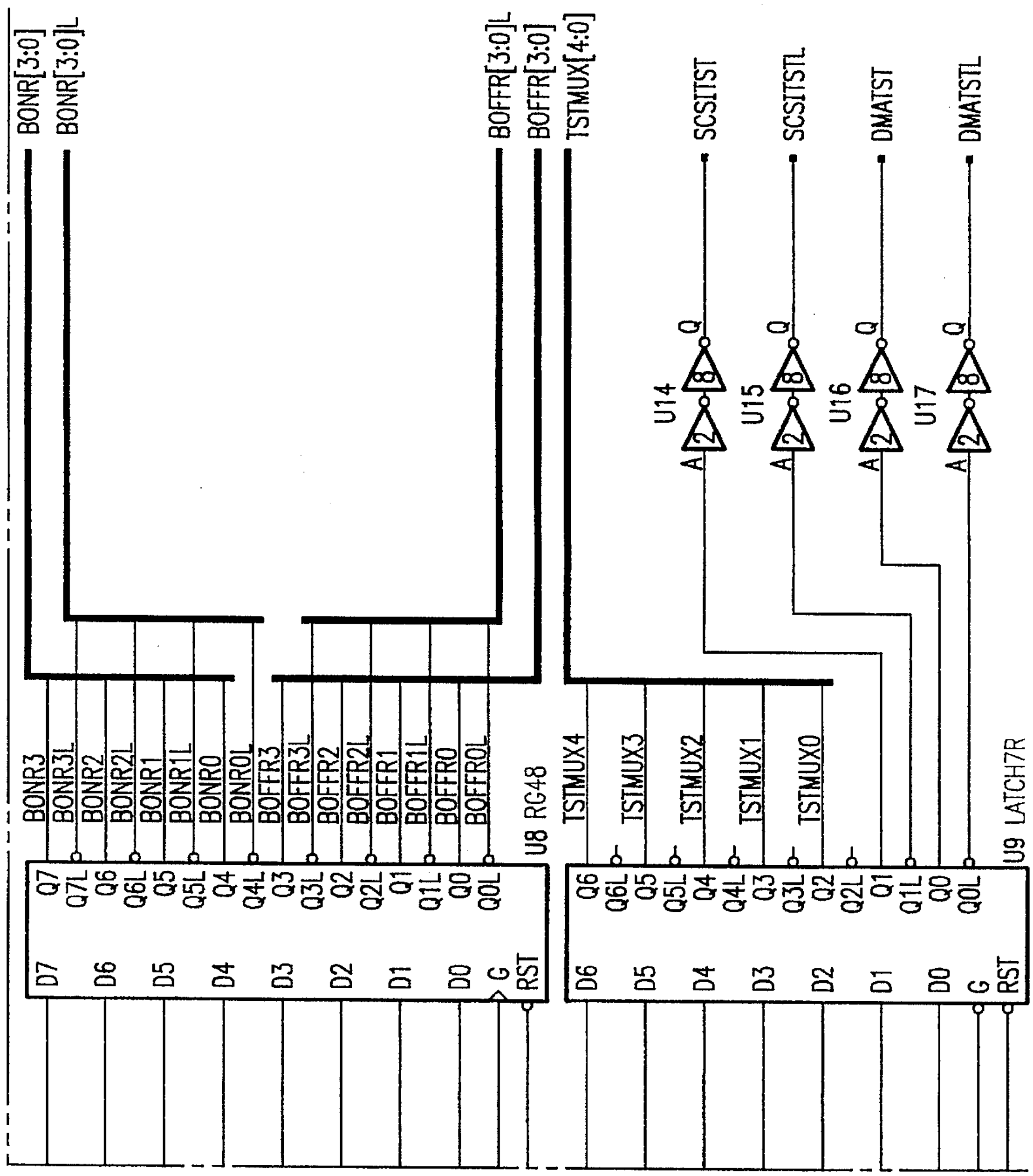
Figure 2:
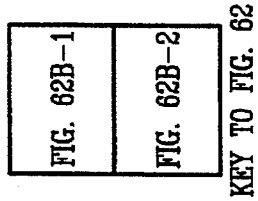
Figure 64:
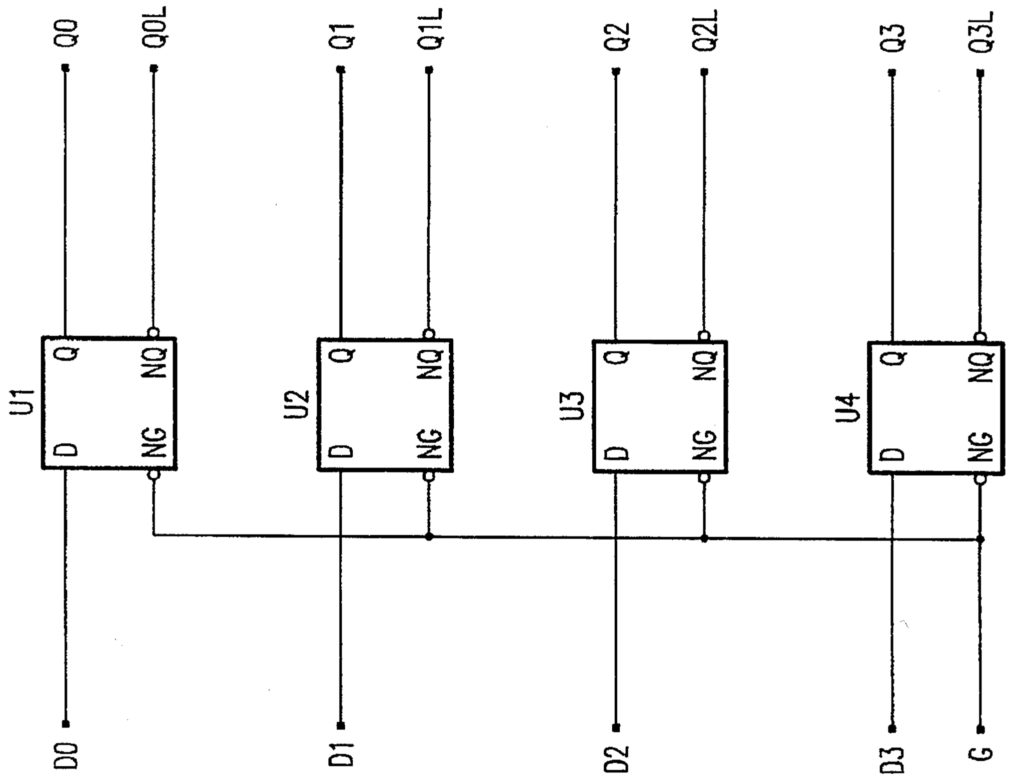
FIG. 64 illustrates circuit LATCH4.
Figure 63:
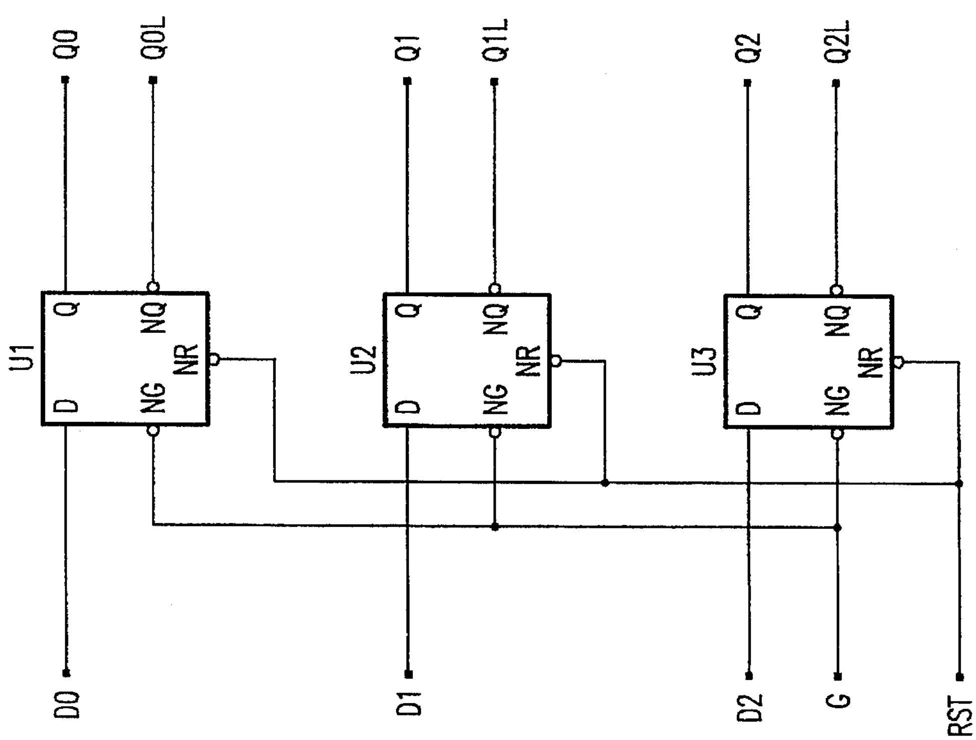
FIG. 63 illustrates circuit LATCH3.
Figure 65:
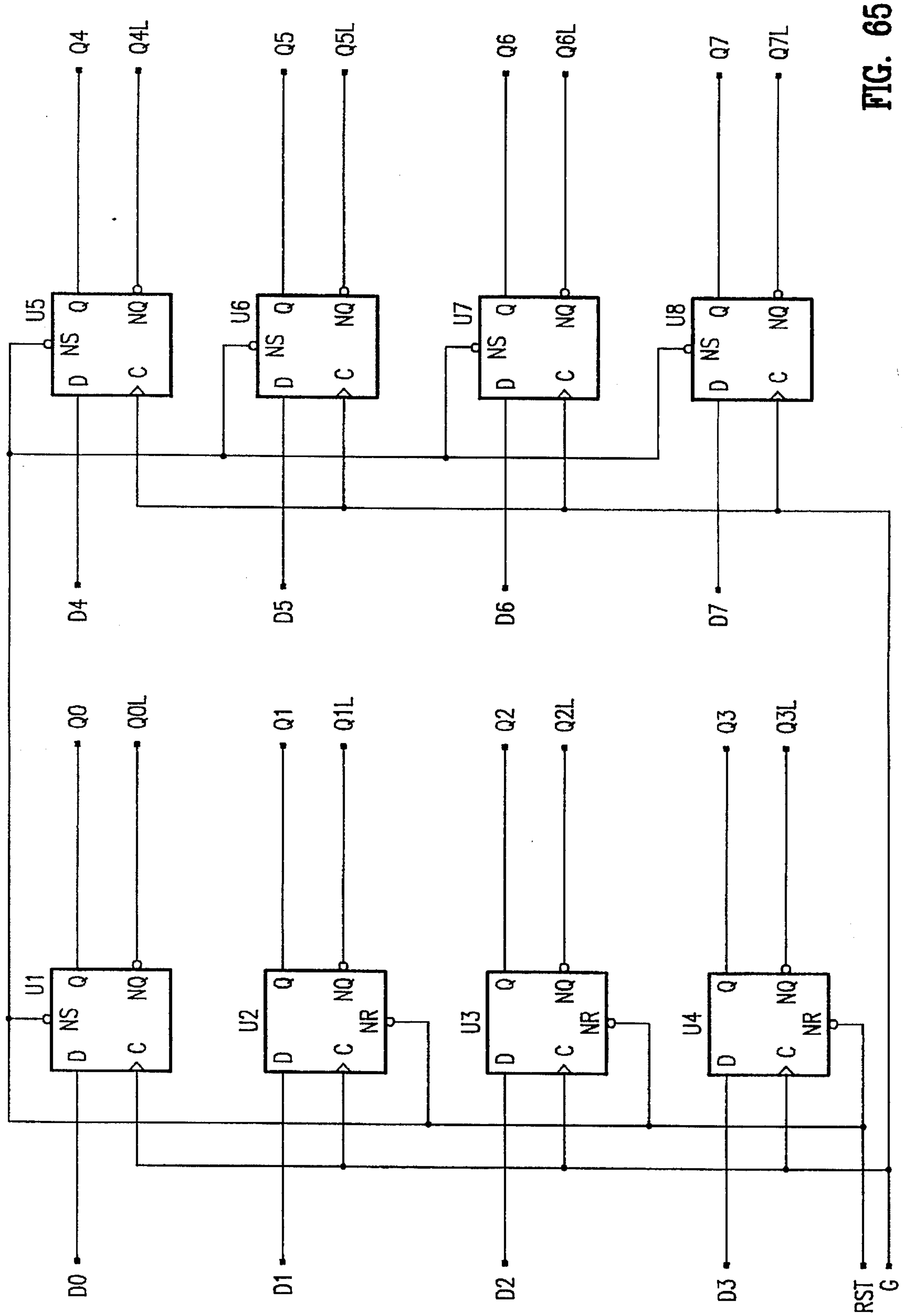
FIG. 65 illustrates circuit RG48.
Figure 66:
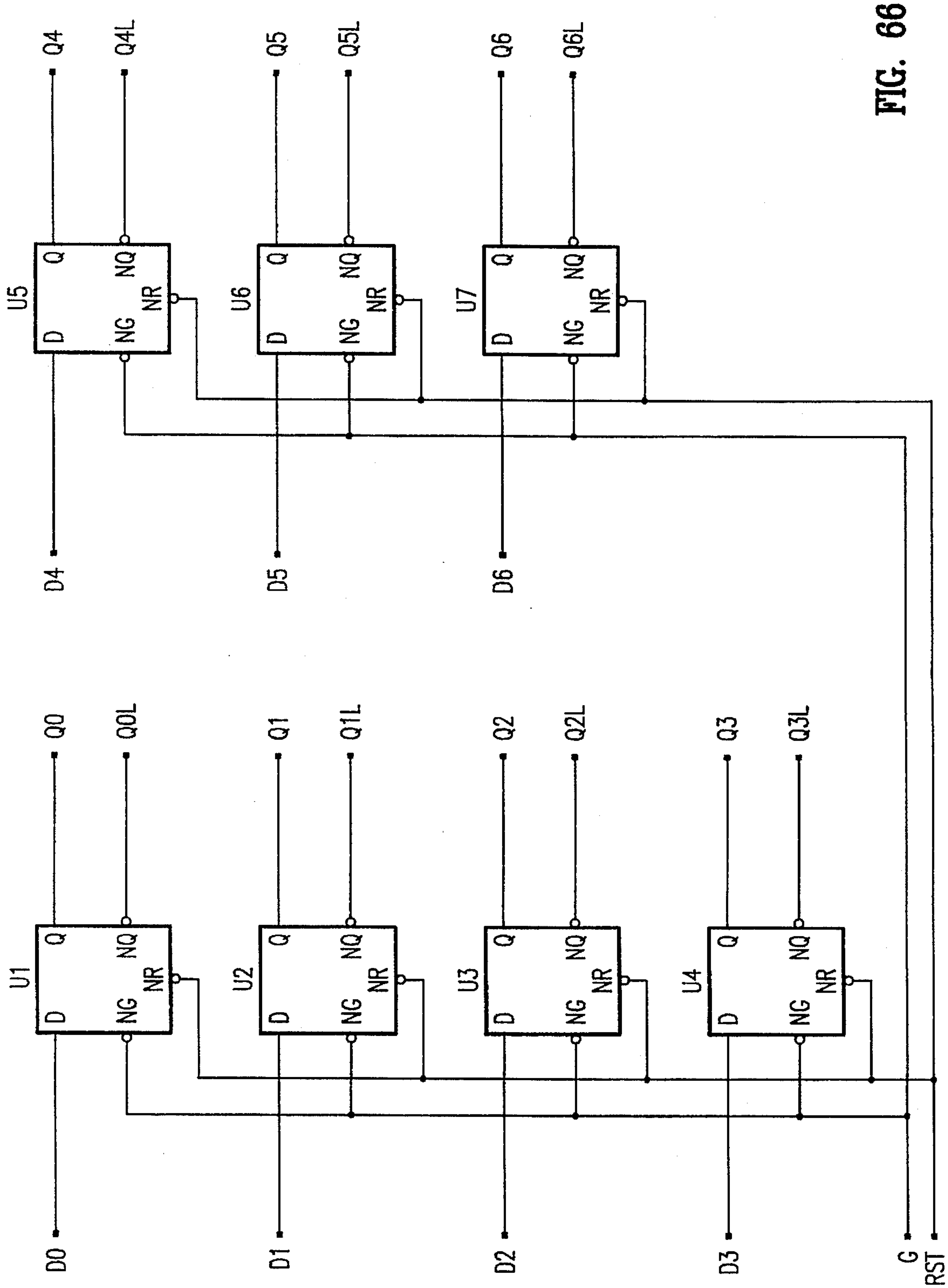
FIG. 66 illustrates circuit LATCHR7.
Figure 67A:
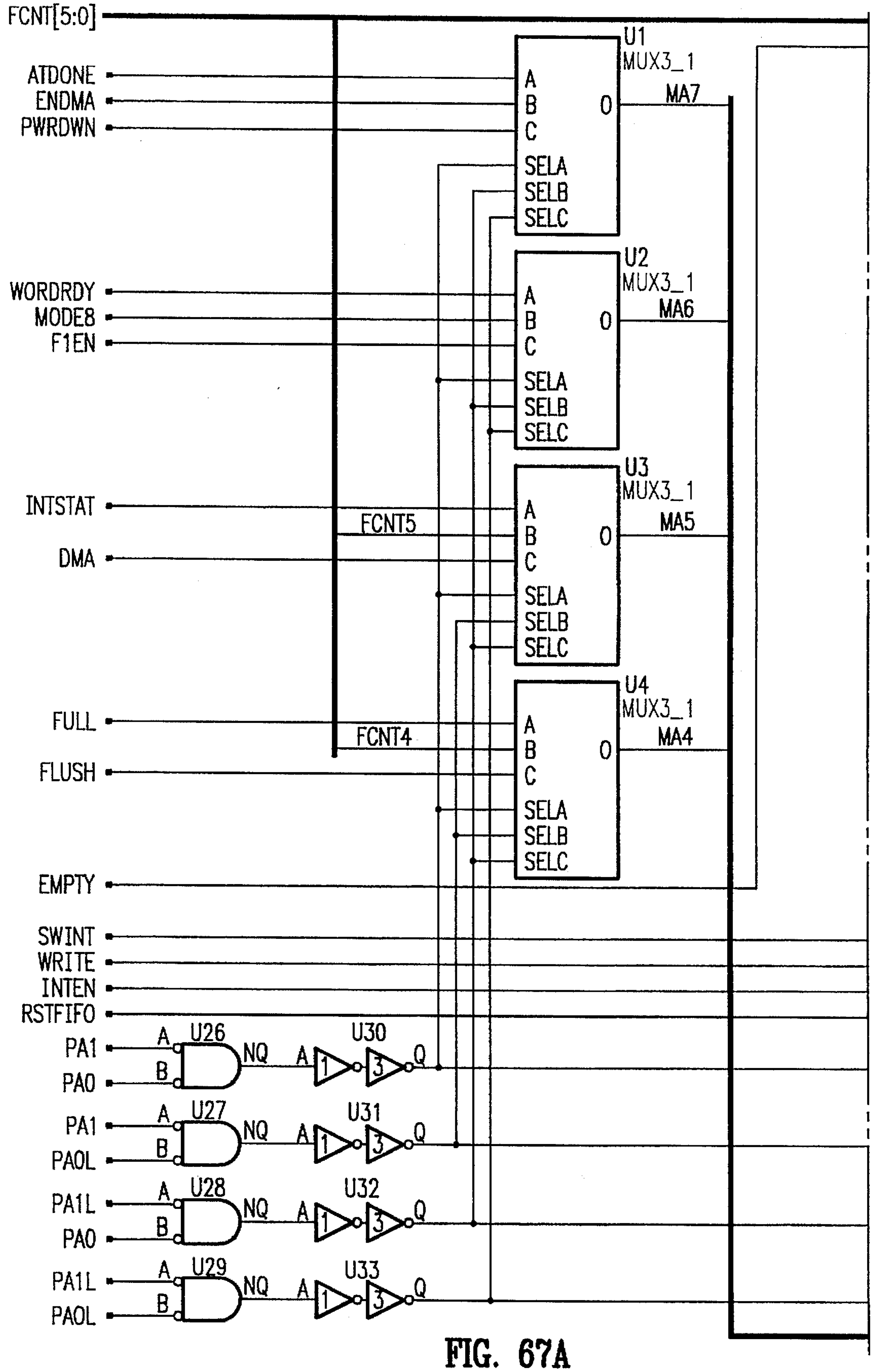
FIGS. 67A, 67B, 68A and 68B illustrate circuit DMAREAD of FIG. 56B that includes circuits MUX3_1, MUX2_1, MUX1_5, MUX2_4 and MUX2_8.
Figure 67B:
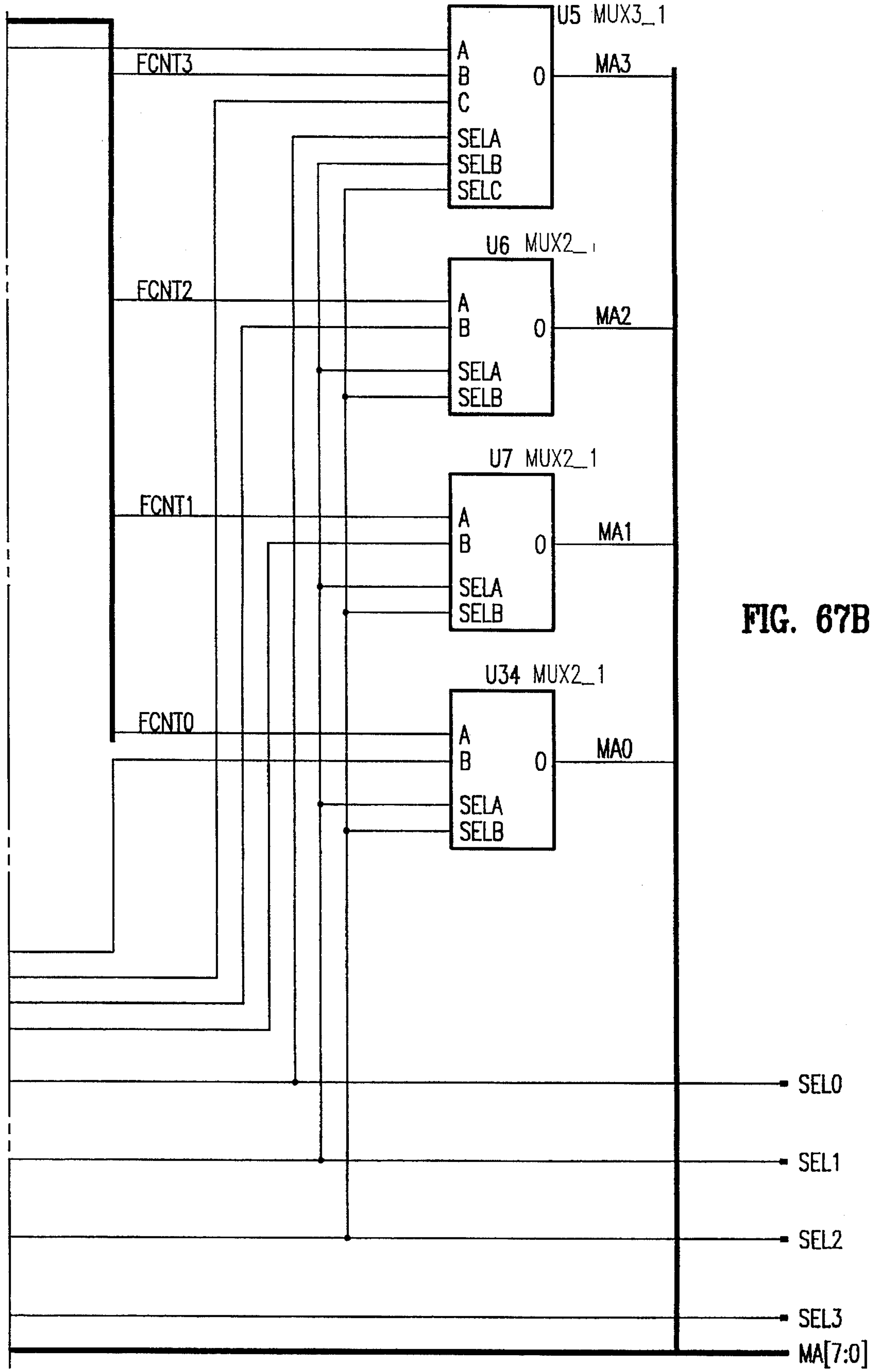
Figures 1, 68A:
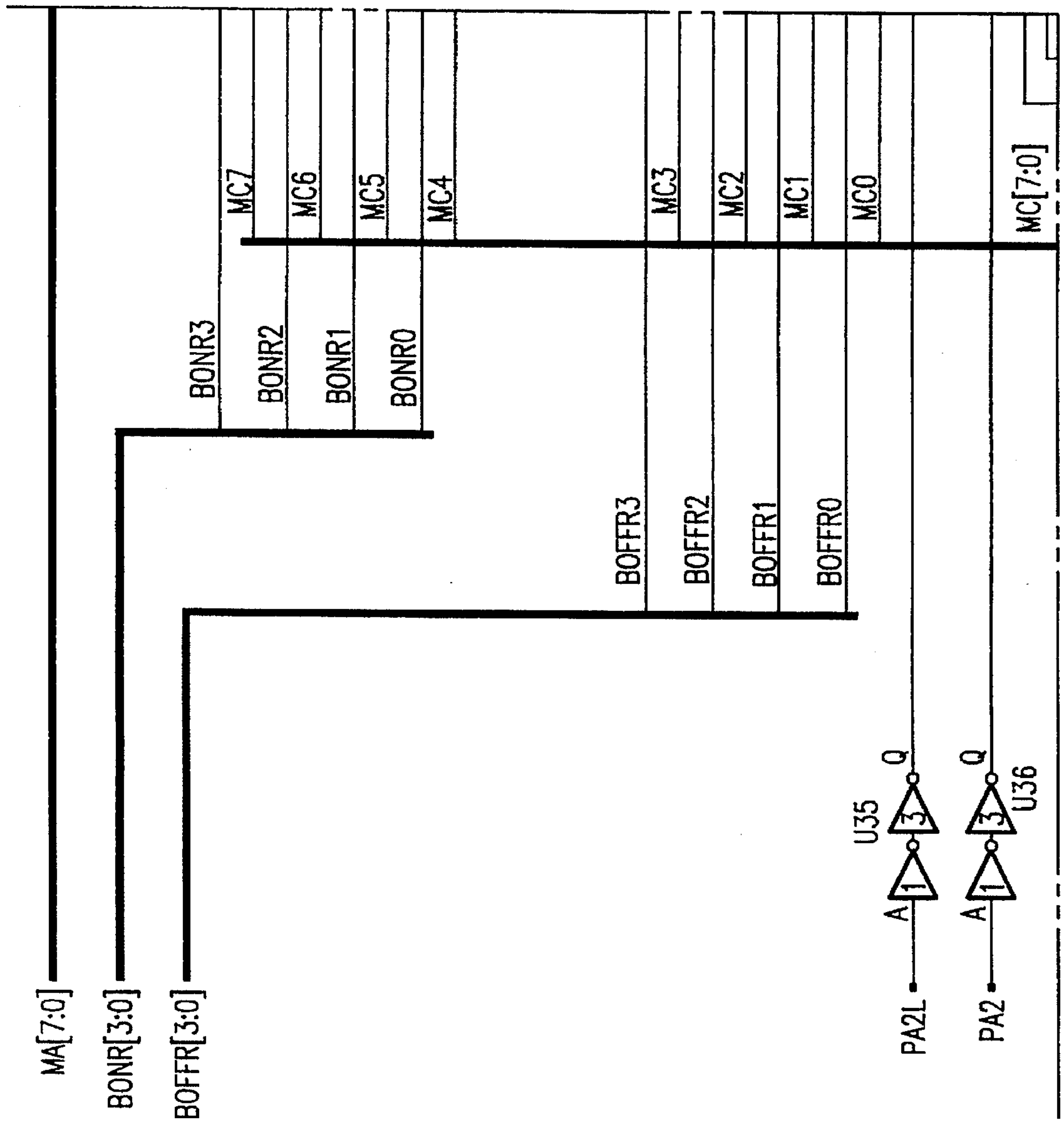
Figure 68B:
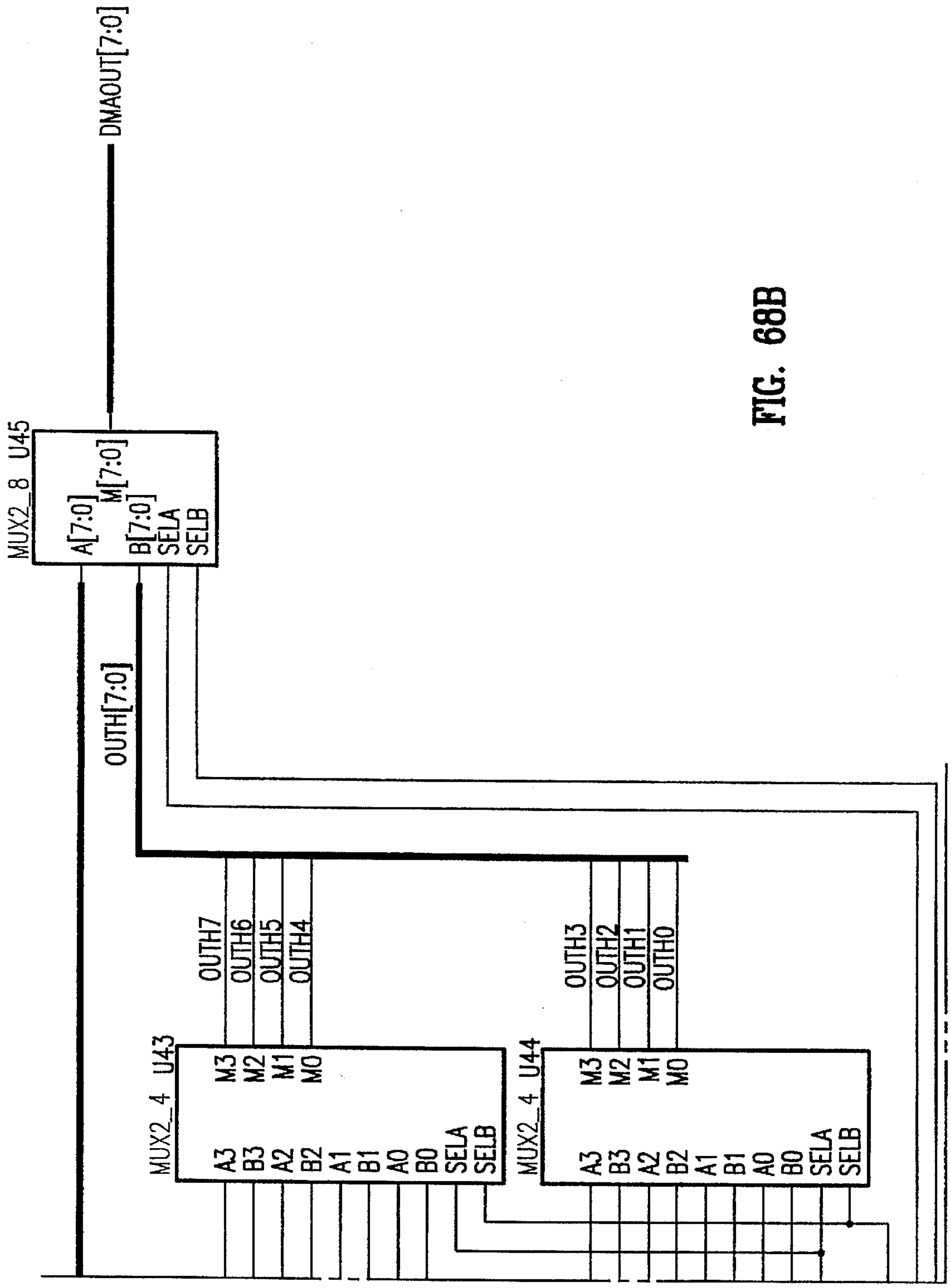

Circuit DMAREGS (FIG. 56B) is shown in more detail in FIGS. 62A and 62B. Circuit DMAREGS (FIGS. 62A, 62B) includes circuits LATCH3, LATCH4, RG48 and LATCH7R. FIG. 63 illustrates circuit LATCH3 while FIG. 64 illustrates circuit LATCH4. Circuit RG48 is illustrated in FIG. 65. Circuit LATCH7R is illustrated in FIG. 66 and consists of seven latches with reset.

Figure 69:
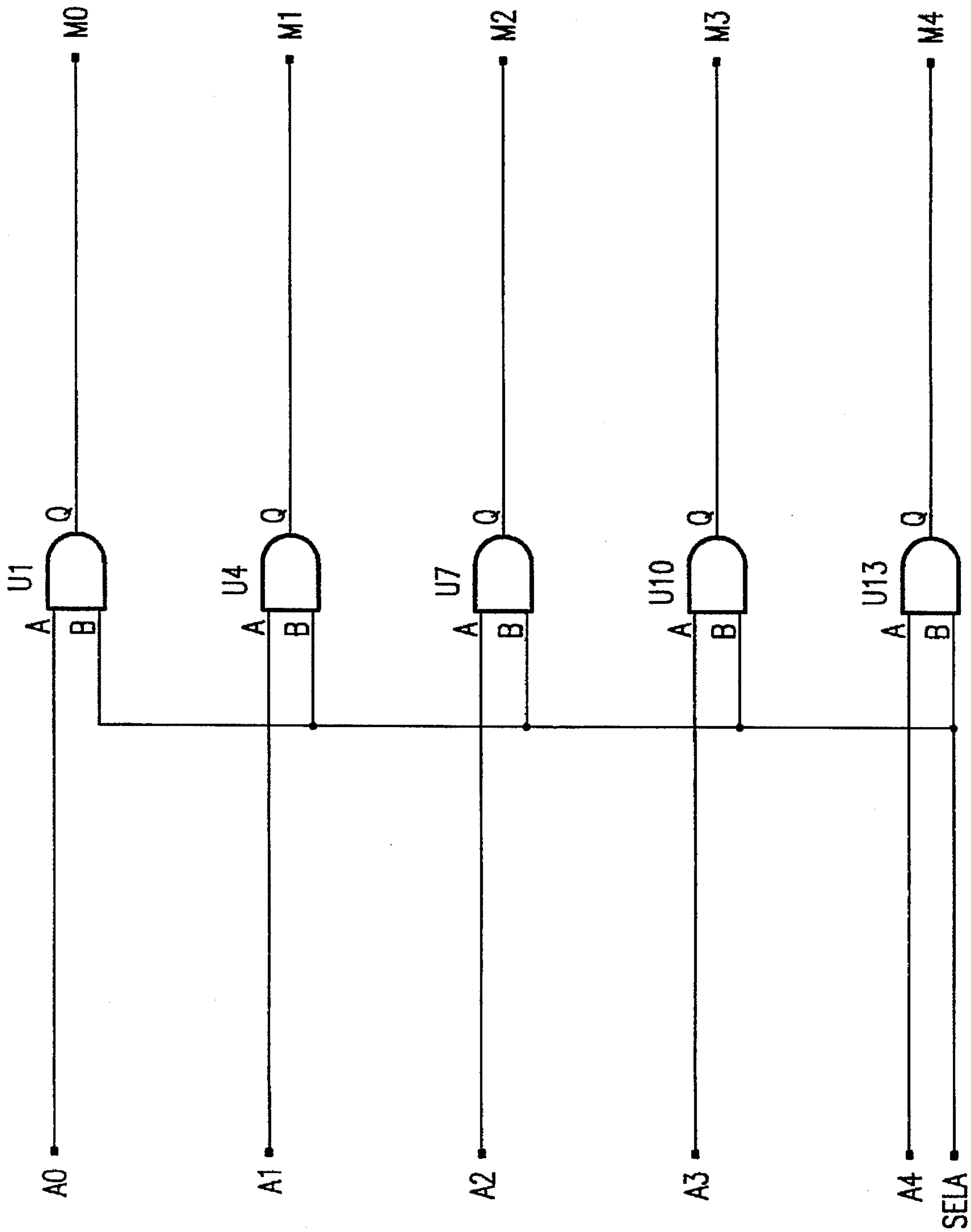
FIG. 69 illustrates circuit MUX1_5.
Figure 70:
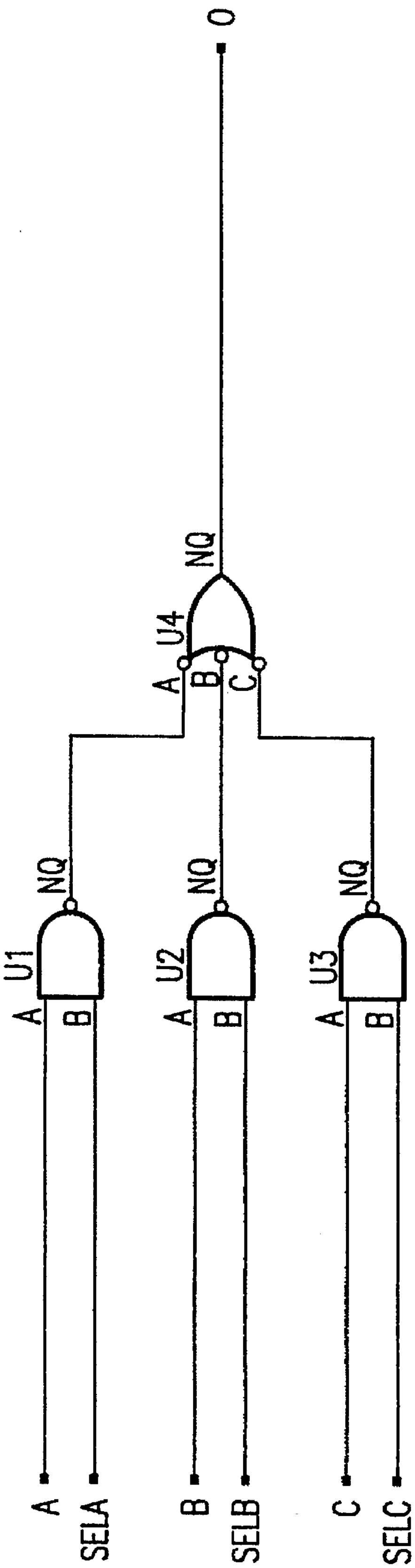
FIG. 70 illustrates circuit MUX3_1.
Figure 71:
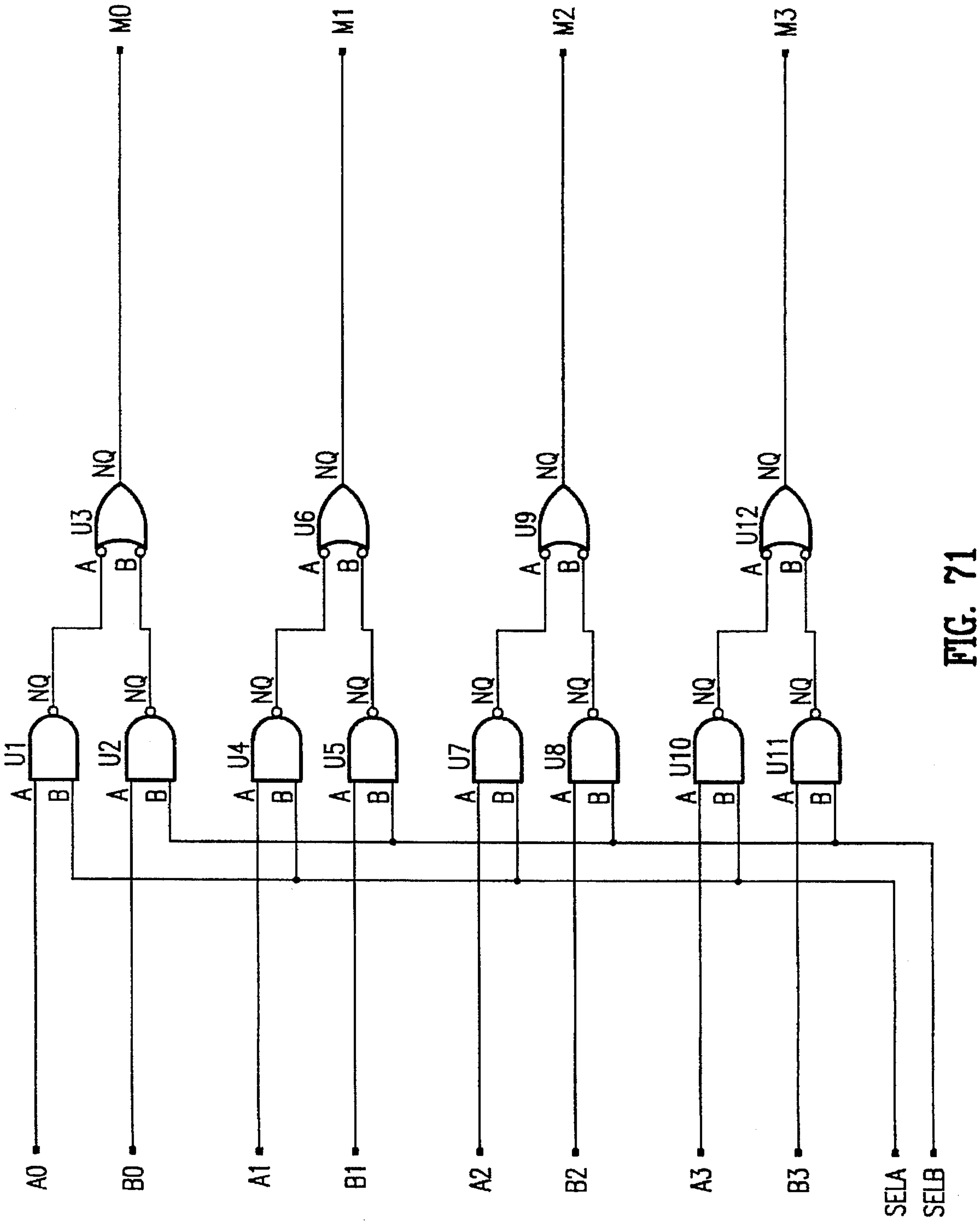
FIG. 71 illustrates circuit MUX2_4.

Circuit DMAREAD (56B) is illustrated in more detail in FIGS. 67A, 67B, 68A and 68B. Circuit DMAREAD comprises a multiplicity of three to one multiplexers and two to one multiplexers, as well as a one to one multiplexer. Specifically DMAREAD includes circuits MUX3_1, MUX2_1, MUX1_5, MUX2_4 and MUX2_8. Circuits MUX1_5, MUX3_1, and MUX2_4, are illustrated in FIGS. 69, 70 and 71 respectively. The other multiplexers were described above.

Figures 1, 72A:
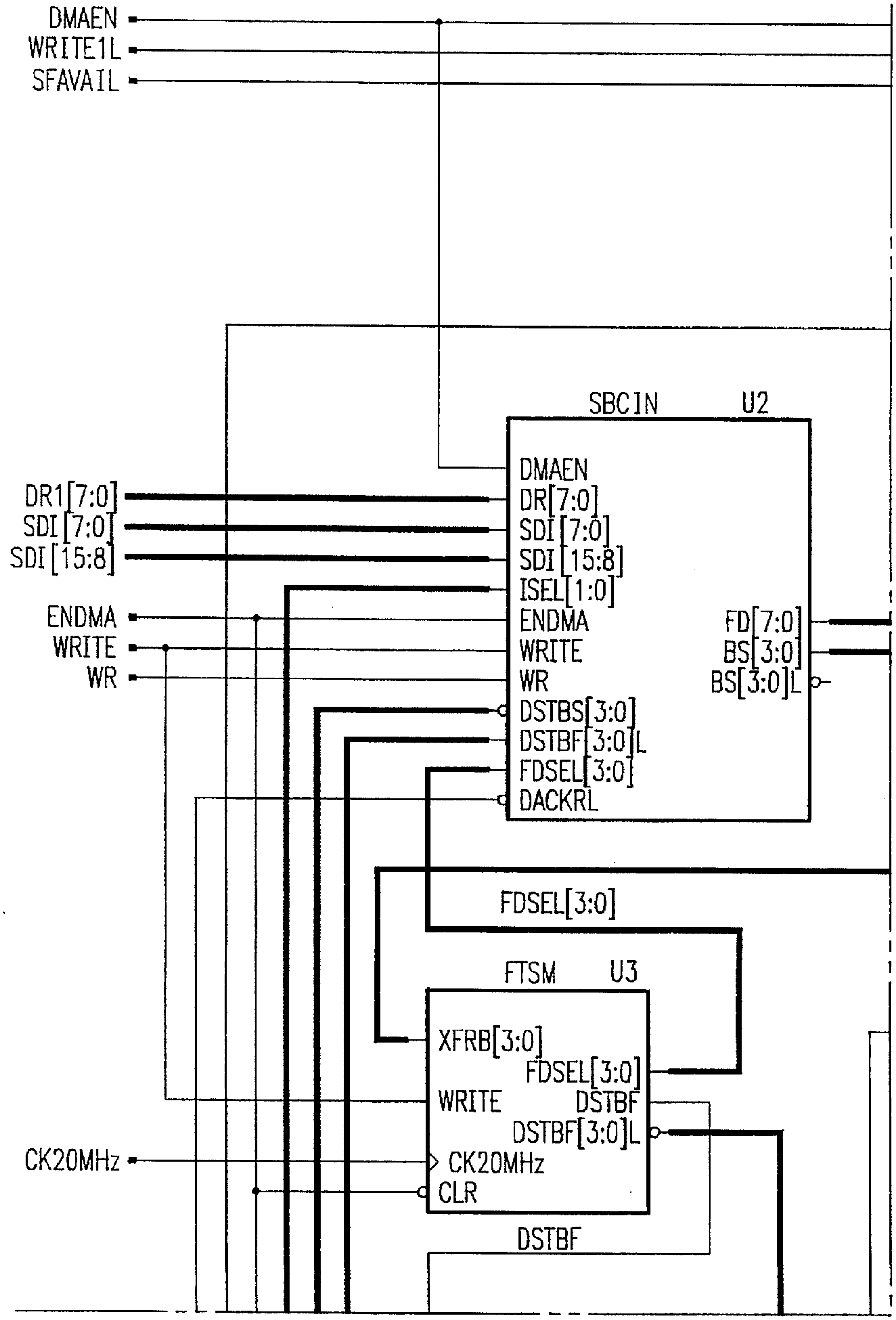
FIGS. 72A, 72B and 72C illustrate in more detail circuit FIFO of FIG. 56C that includes register FIFOSTAT of FIGS. 8C and 72C and includes circuits SBCIN, FTSM, FIFOCTL (FIG.72A), CTR5R (FIG. 72B), UDCTTR6R, RAMF2, FFCNT, FIFO2CMP (FIG. 72B), DTSM1 (FIG. 72C), and SBCOUT.
Figures 1, 72B:
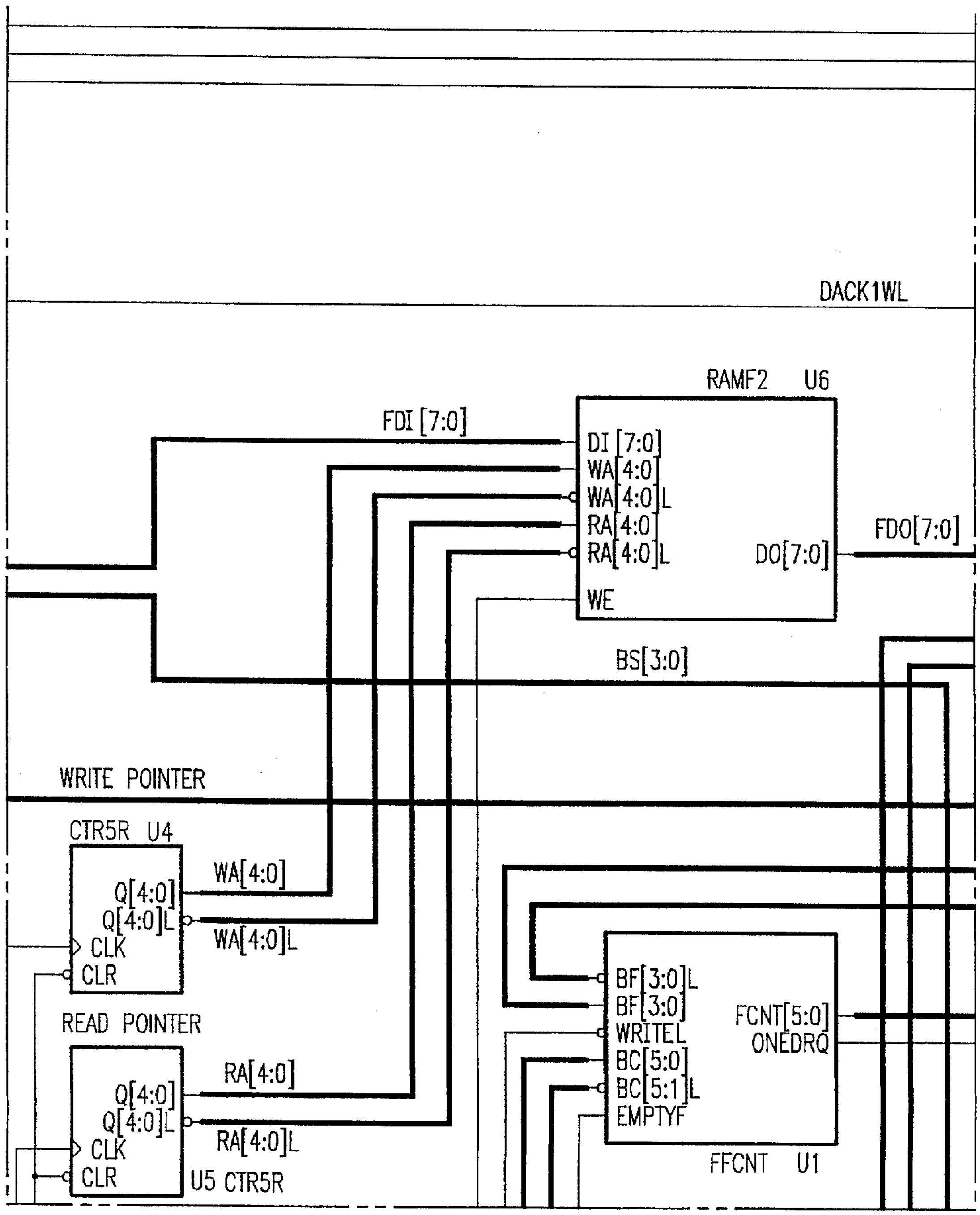
Figures 1, 72C:
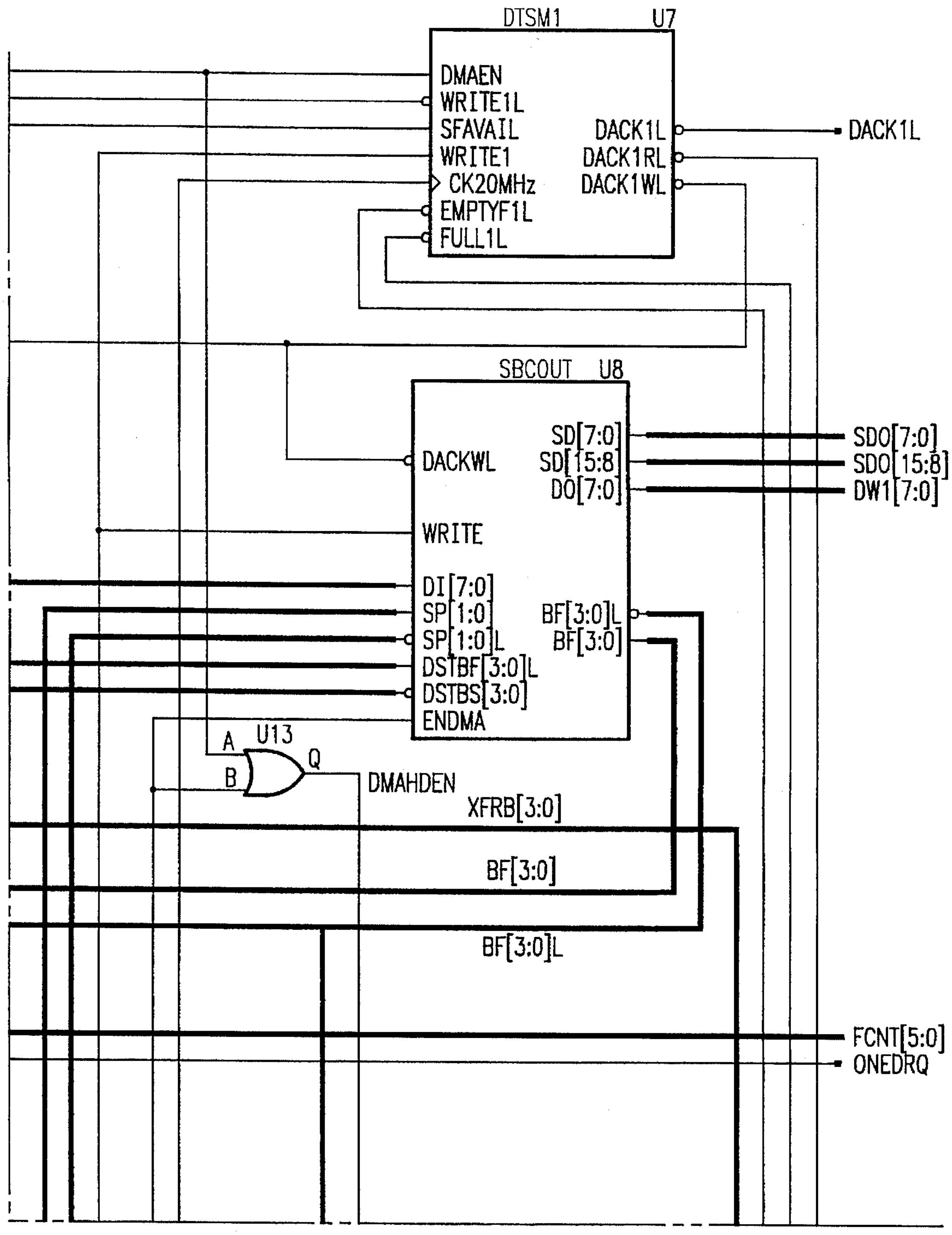

Circuit FIFO (FIG. 56C) is shown in more detail in FIGS. 72A, 72B and 72C. Circuit FIFO includes register FIFOSTAT (FIGS. 8C and 72C). Circuit FIFO includes circuits SBCIN, FTSM, FIFOCTL (FIG. 72A), CTR5R (FIG. 72B), UDCTR6R, RAMF2, FFCNT, FIFO2CMP (FIG. 72B), DTSM1 (FIG. 72C), and SBCOUT.

Figures 1, 73A:
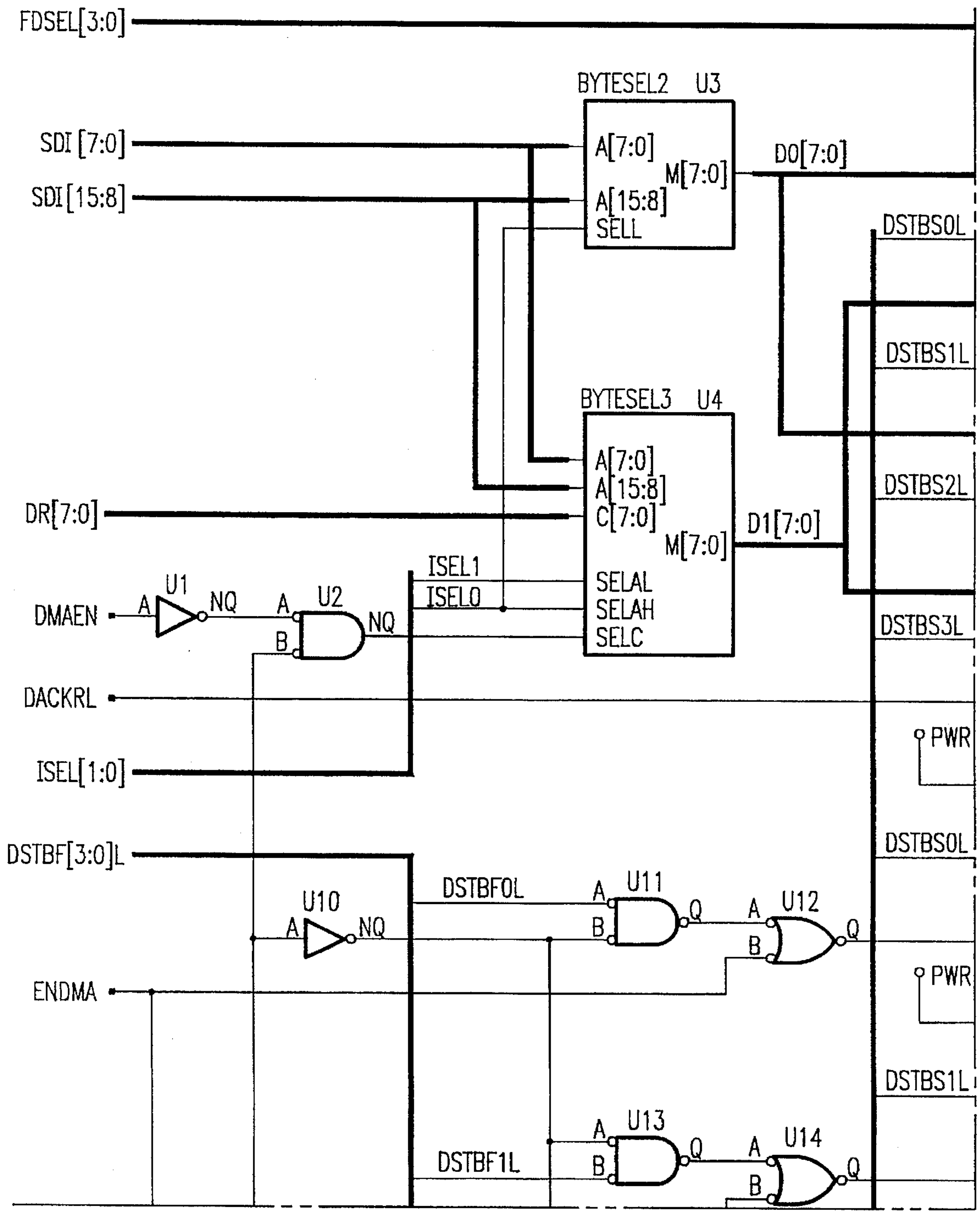
FIGS. 73A and 73B illustrate in more detail circuit SBCIN of FIG. 72A that includes circuits BYTESEL2, BYTESEL3, LATCH8H, LATCH8HB, andMUX4_8.
Figures 1, 73B:
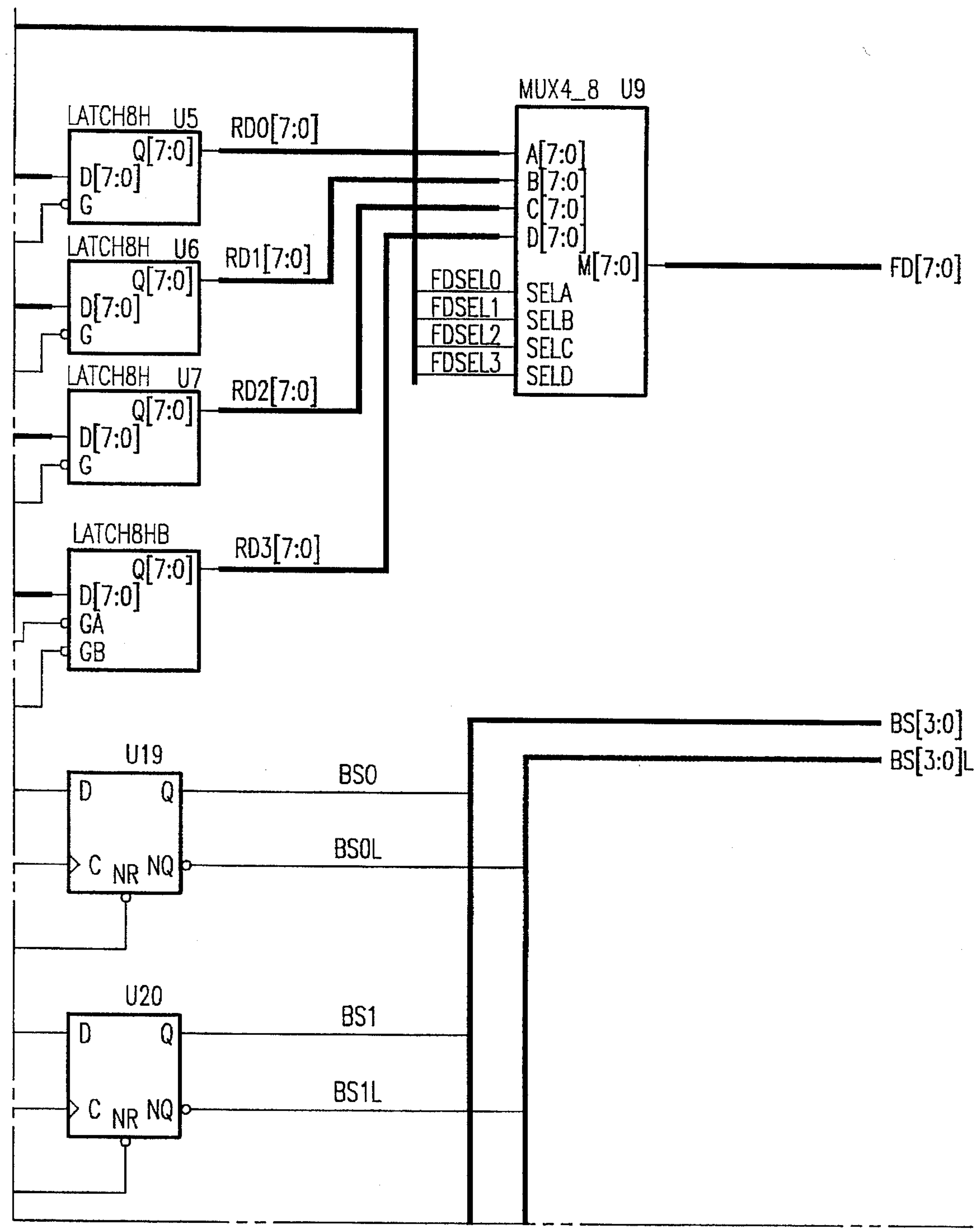
Figure 74:
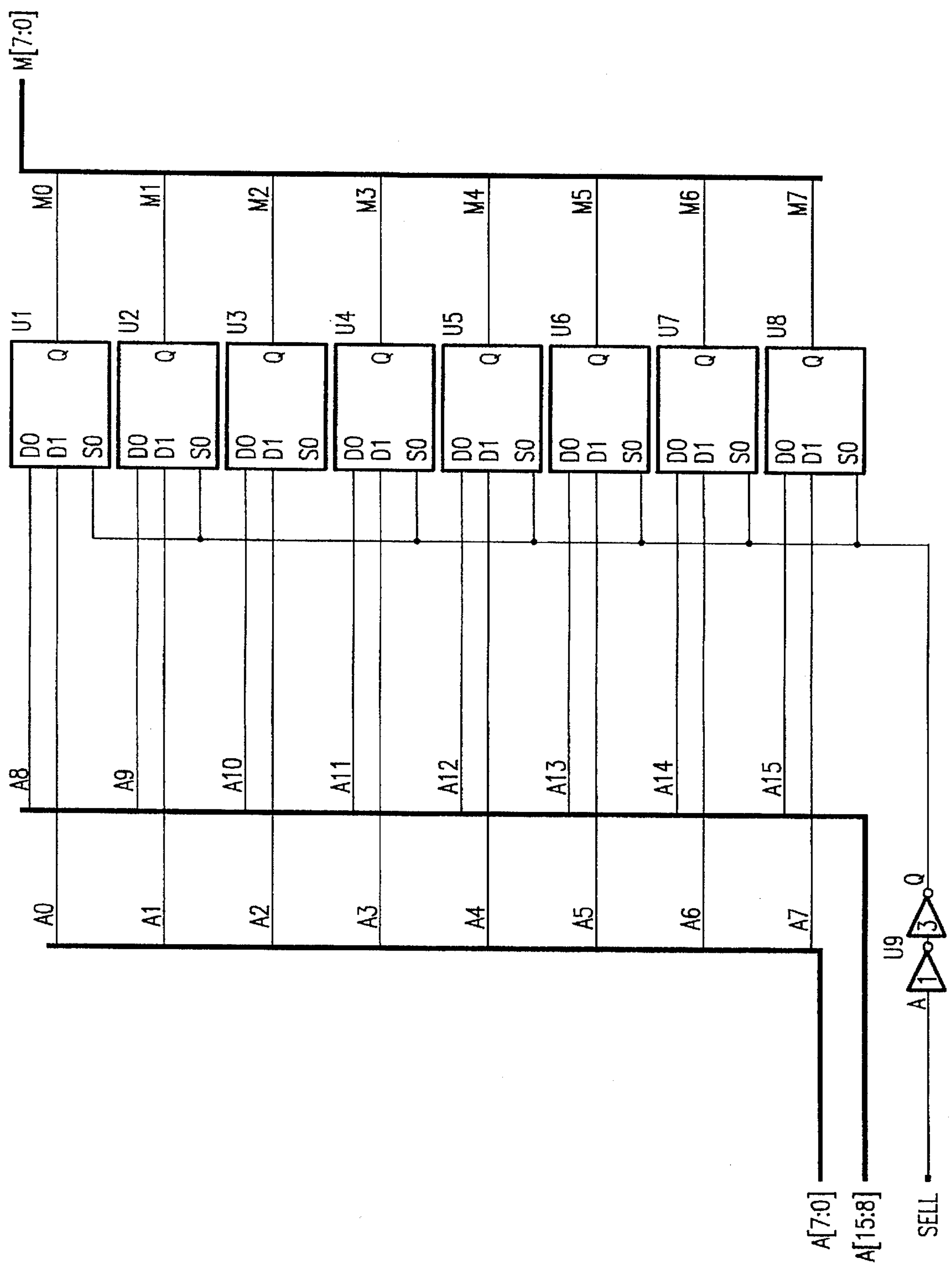
FIG. 74 illustrates circuit BYTESEL2.
Figure 75A:
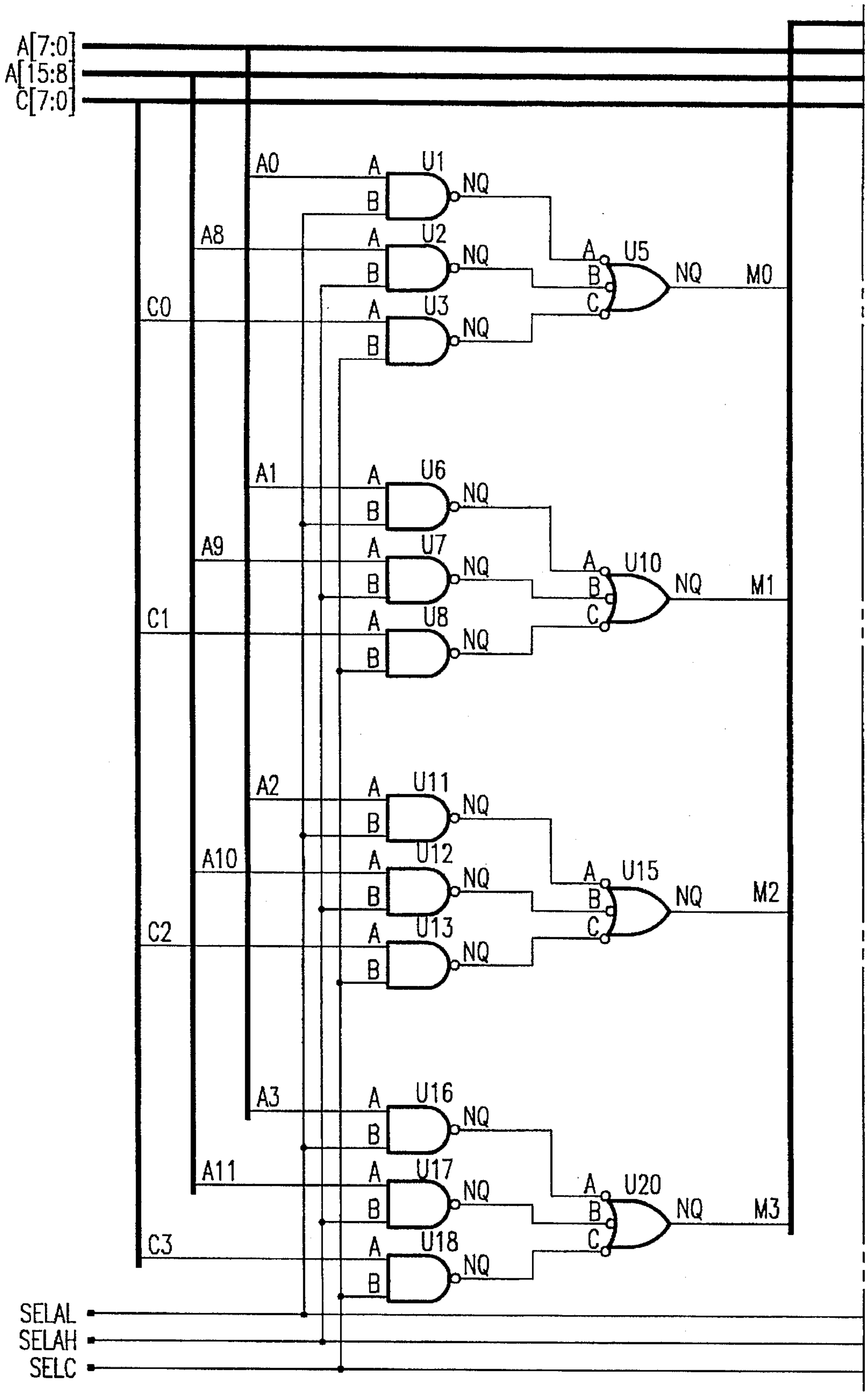
FIGS. 75A and 75B illustrate circuit BYTESEL3.
Figure 75B:
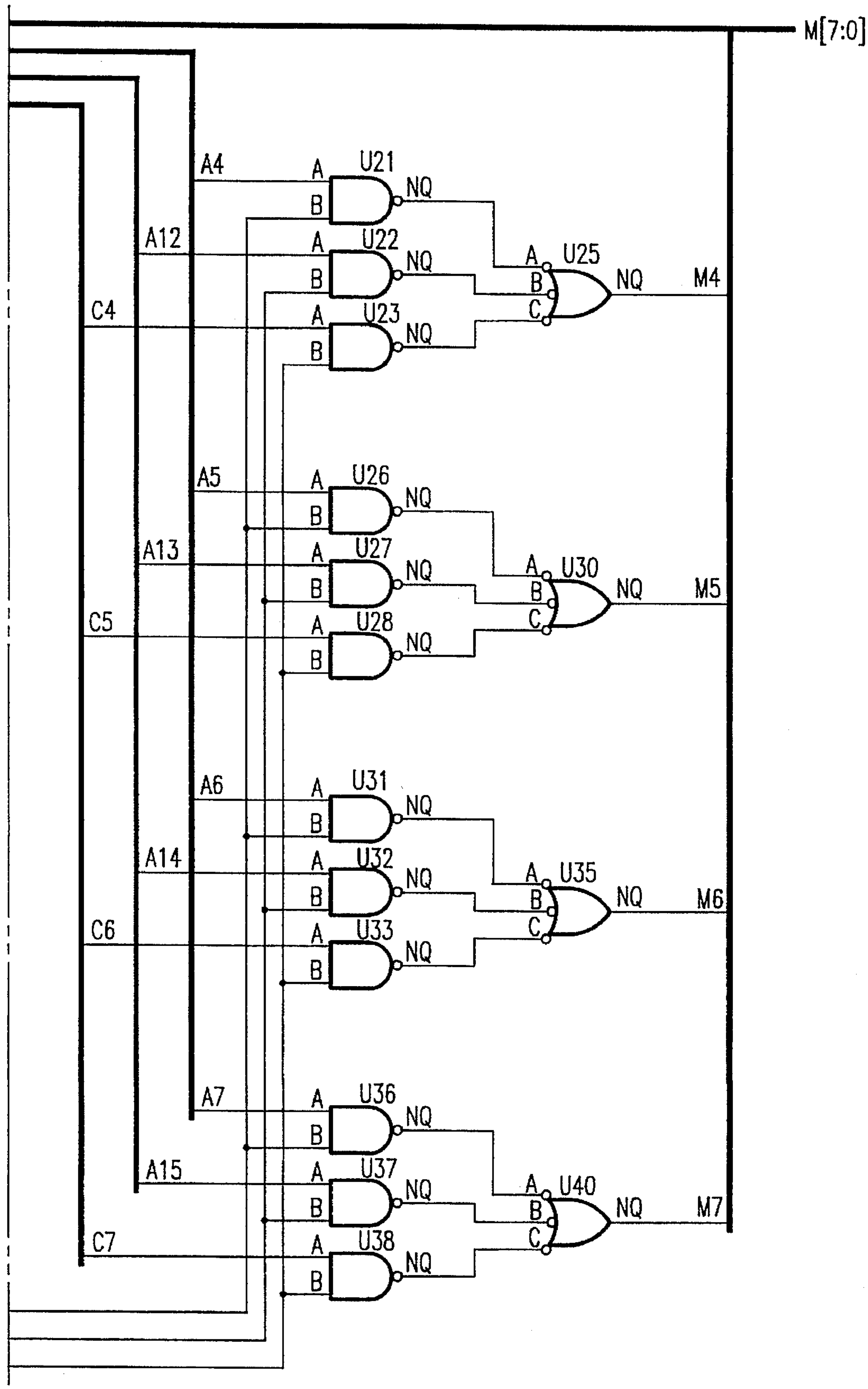
Figure 76A:
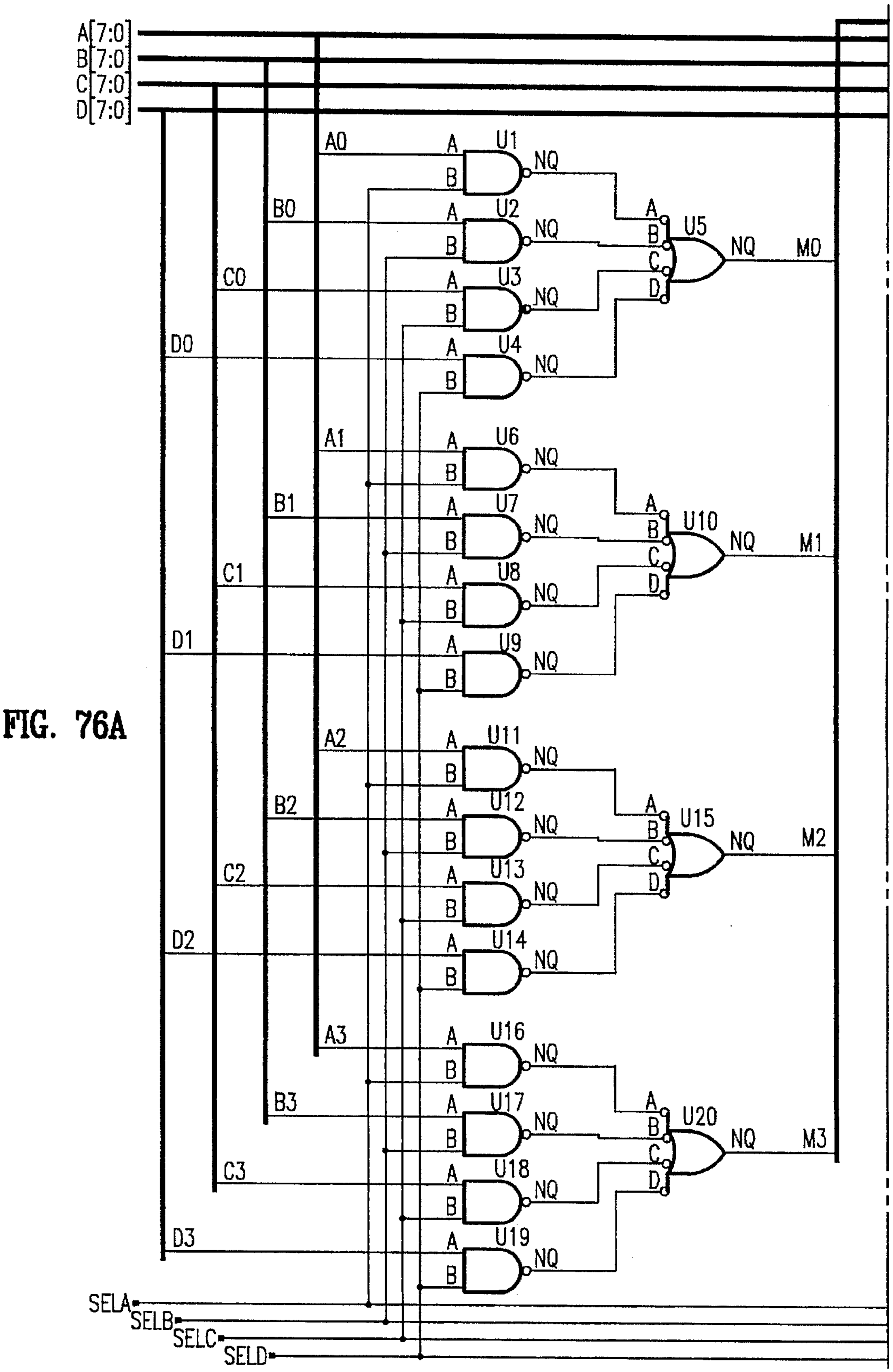
FIGS. 76A and 76B illustrate circuit MUX4_8.
Figure 76B:
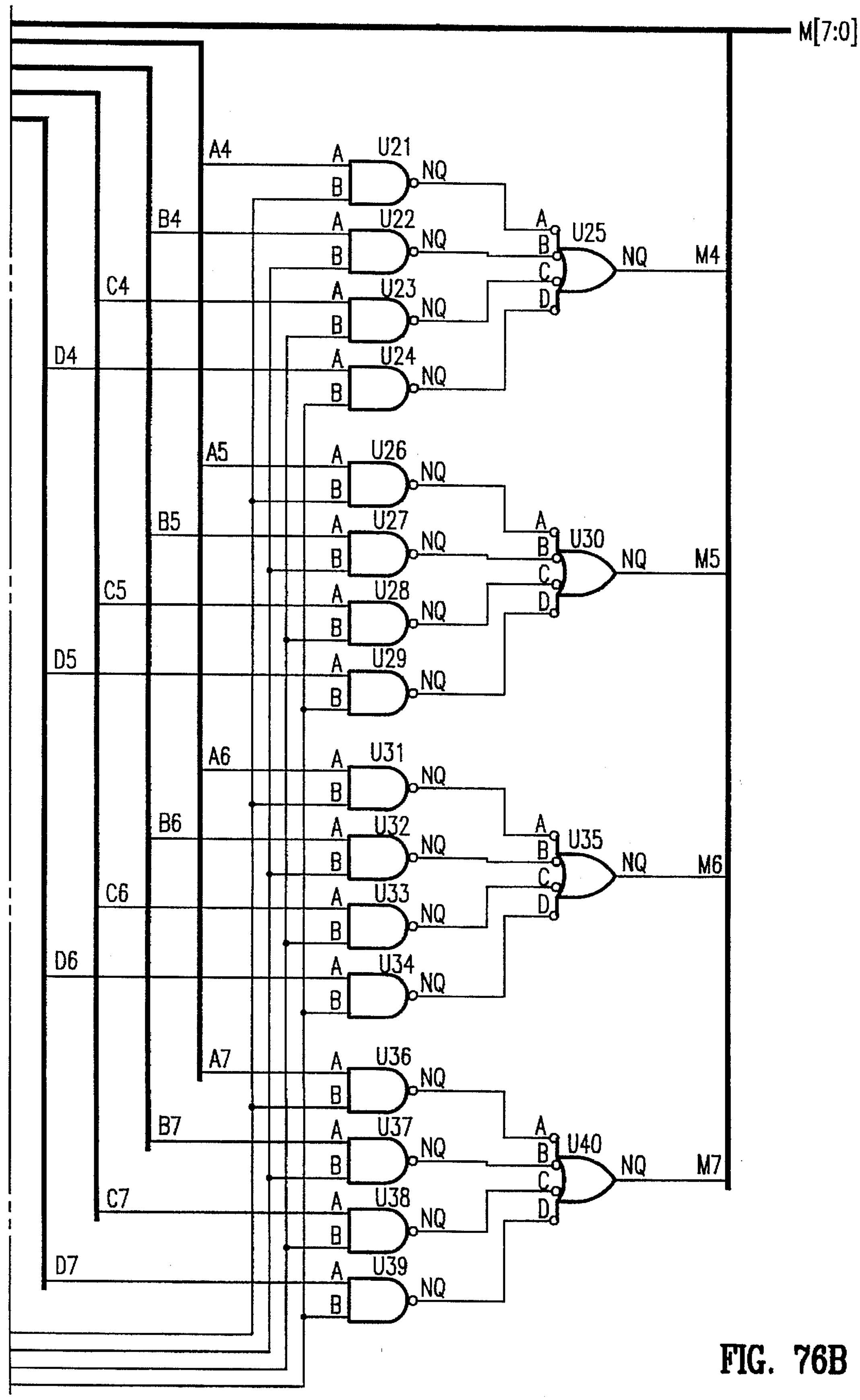
Figure 77A:
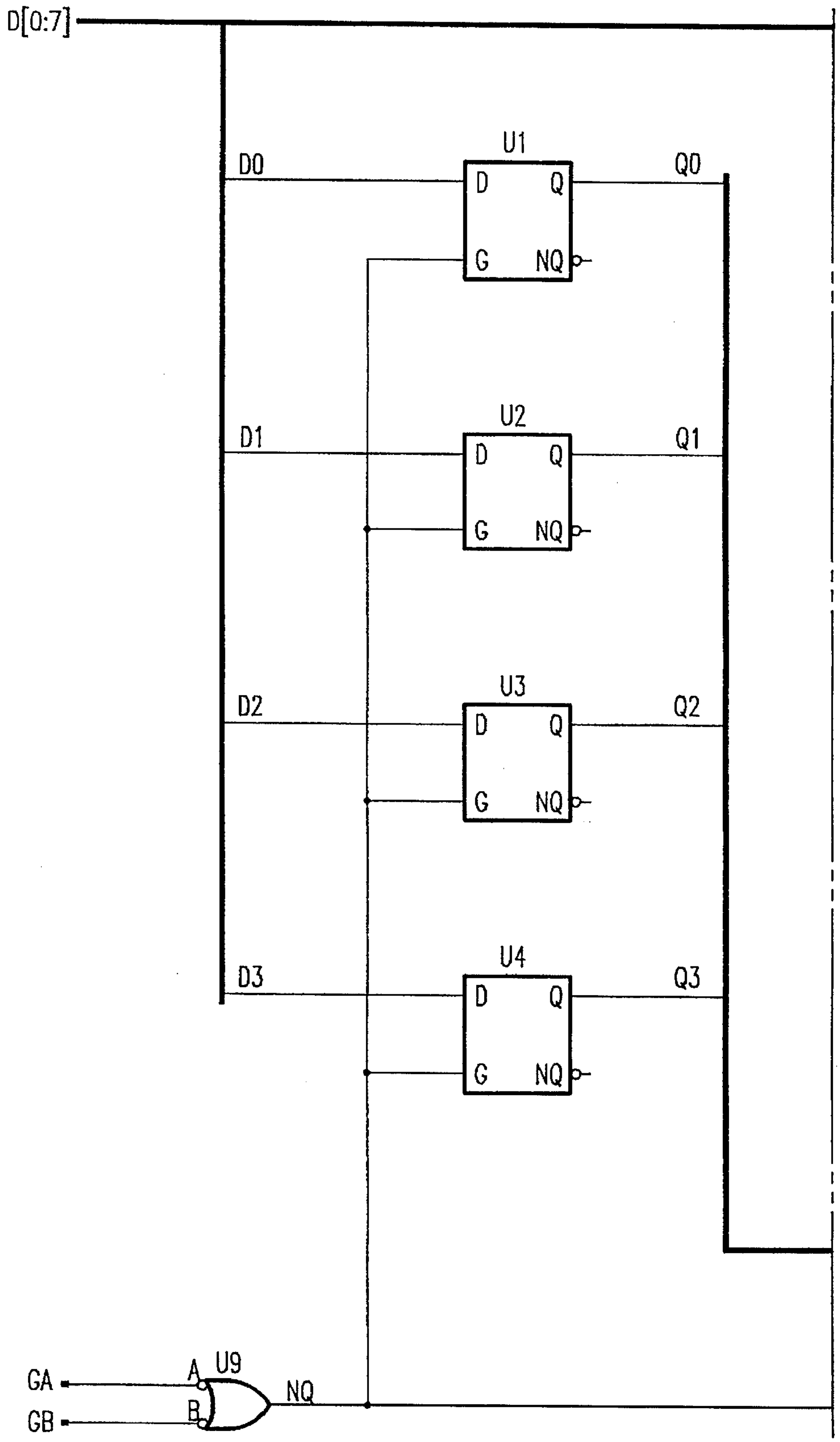
FIGS. 77A and 77B illustrate circuit LATCH8HB.
Figure 77B:
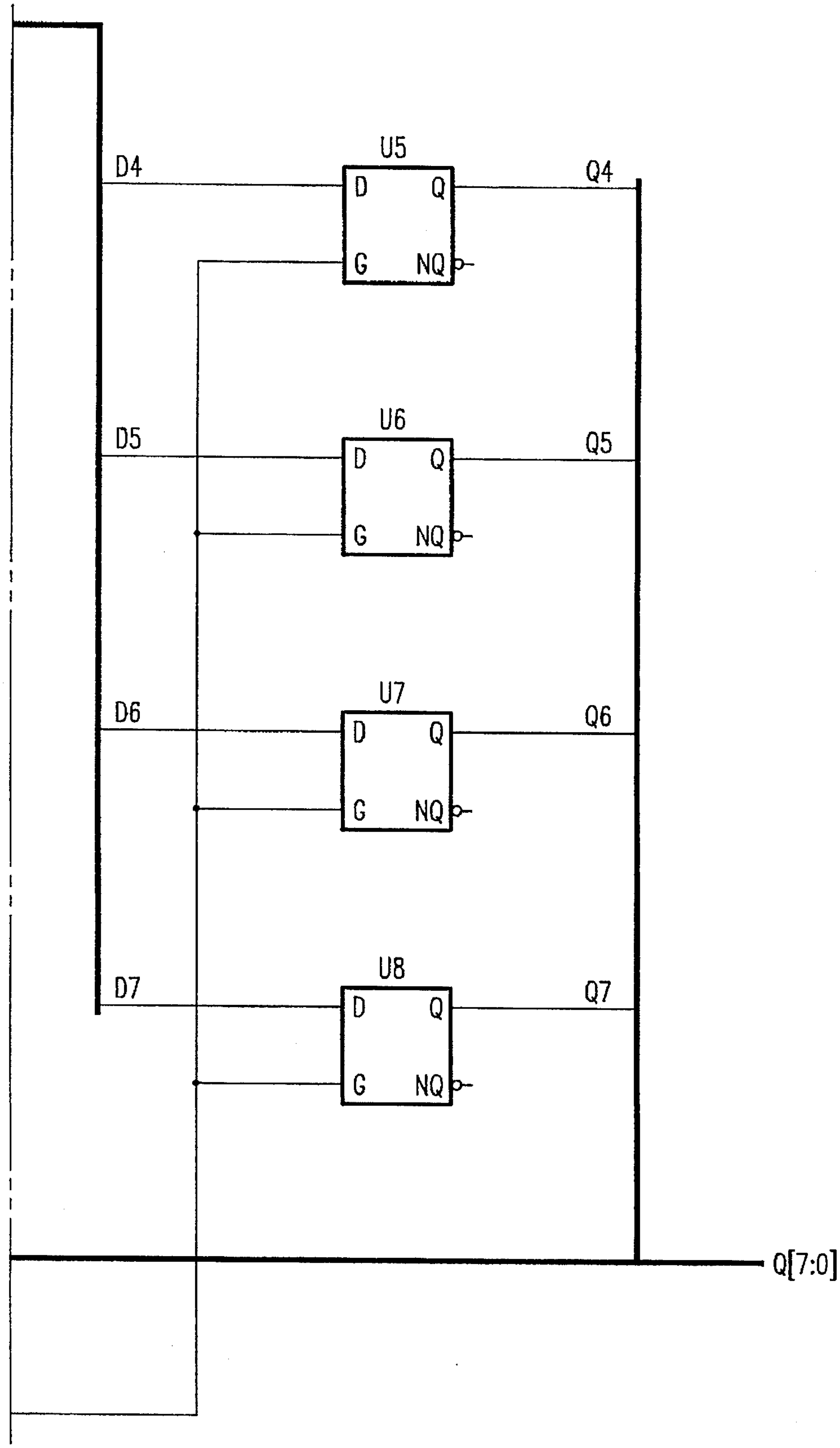
Figure 78A:
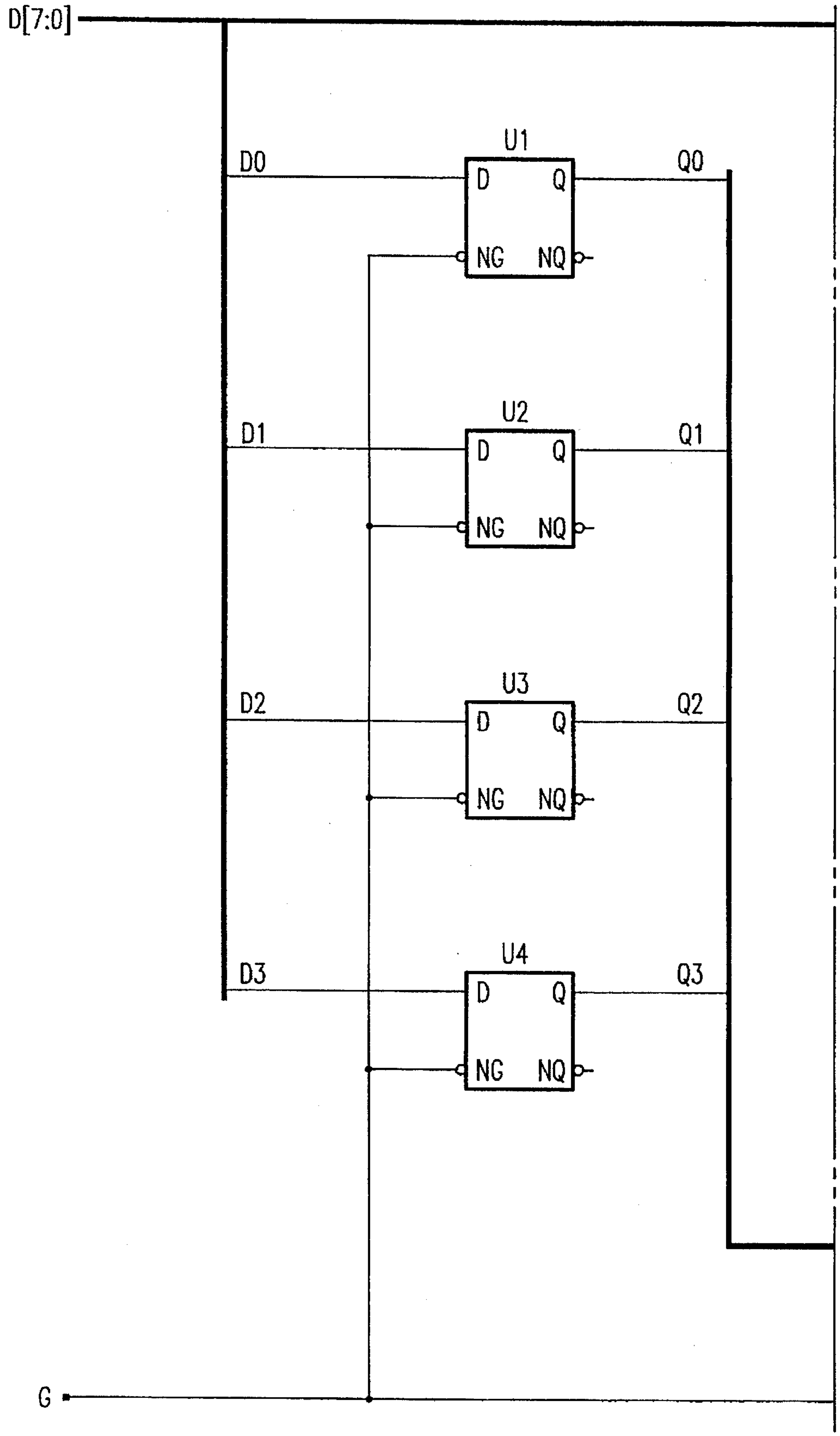
FIGS. 78A and 78B illustrate circuit LATCH8H.
Figure 78B:
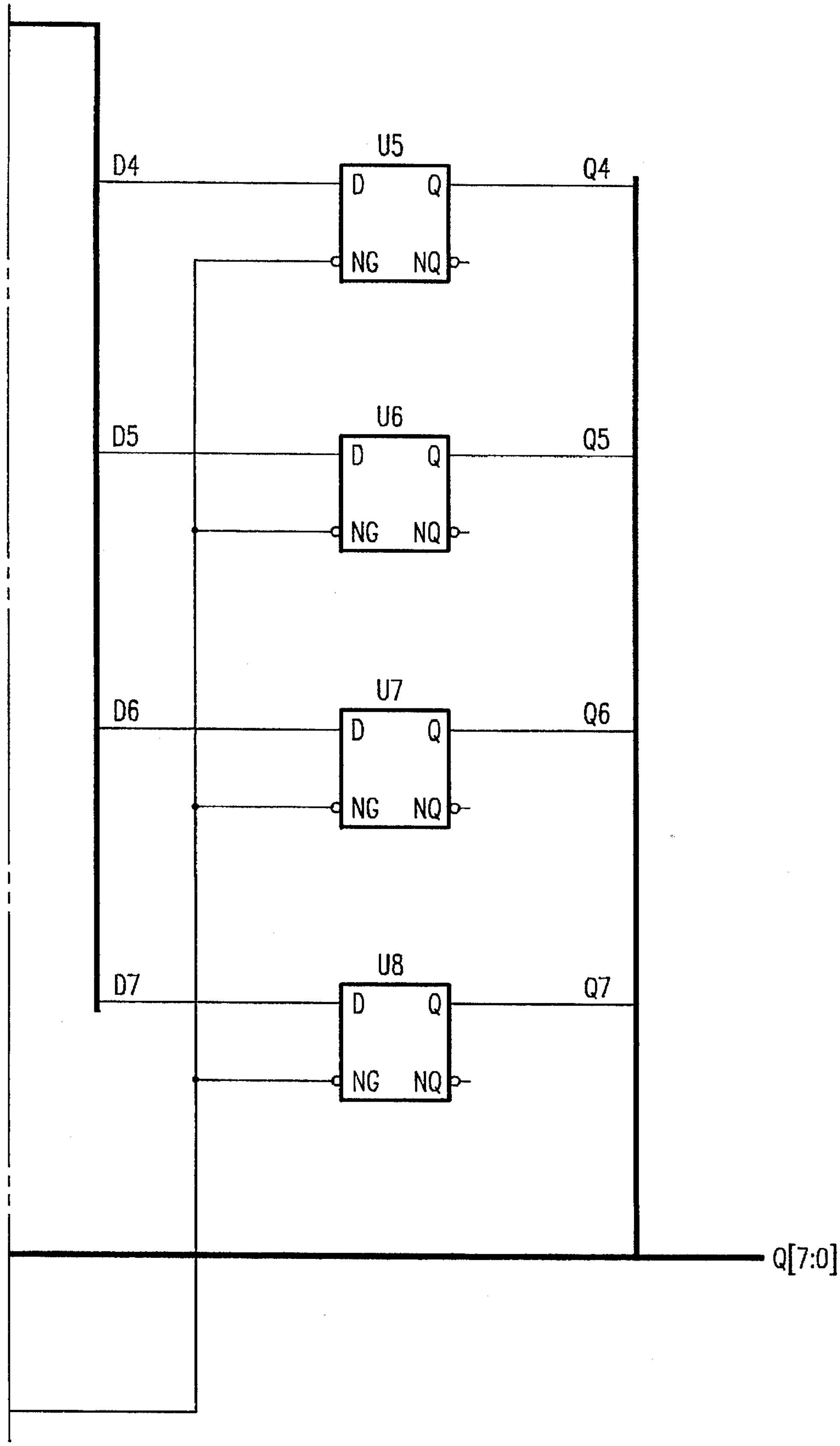
Figure 79A:
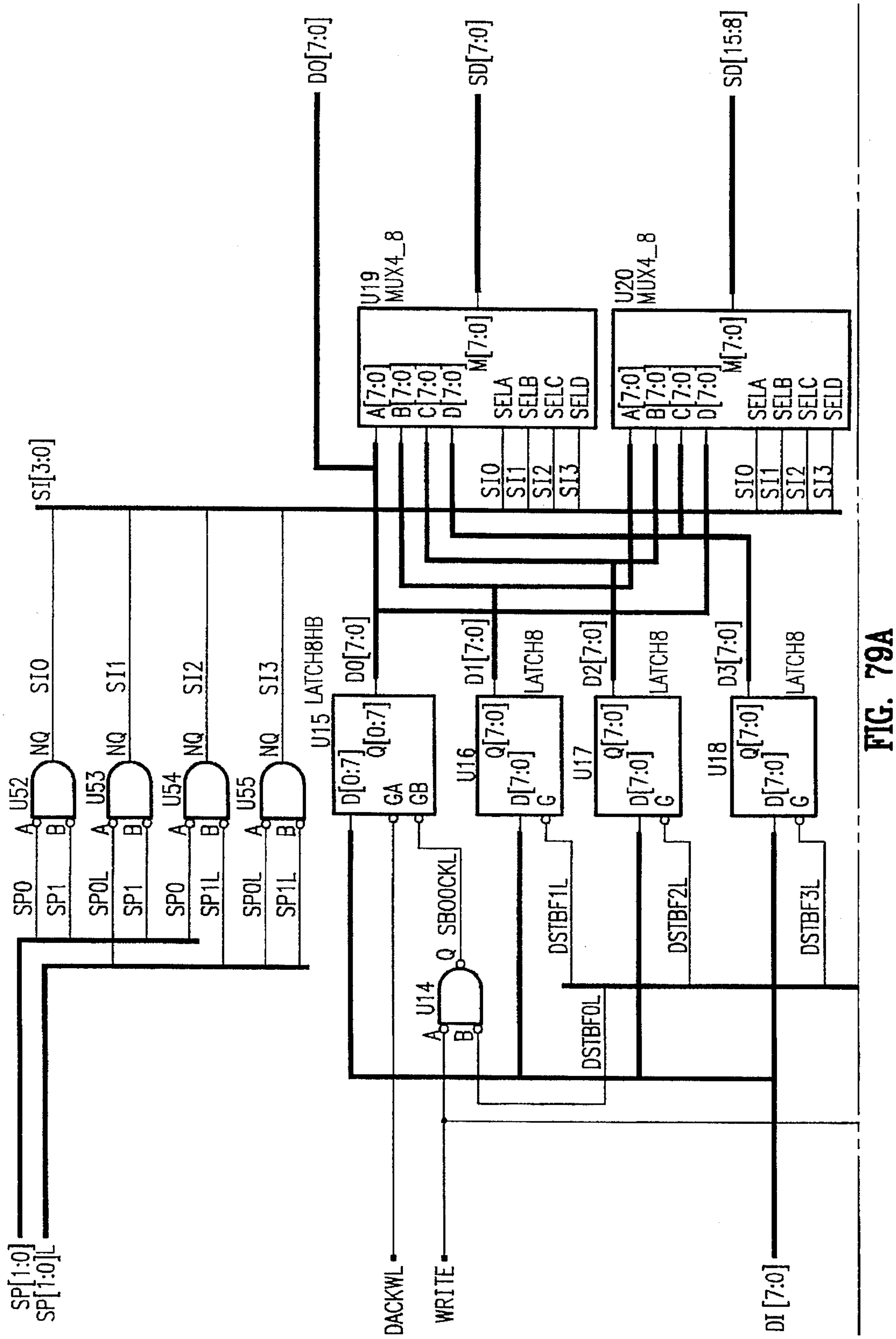
FIGS. 79A and 79B illustrate in more detail circuit SBCOUT of FIG. 72C that include circuits LATCH8B and LATCH8H as well as circuit MUX$_8.
Figure 79B:
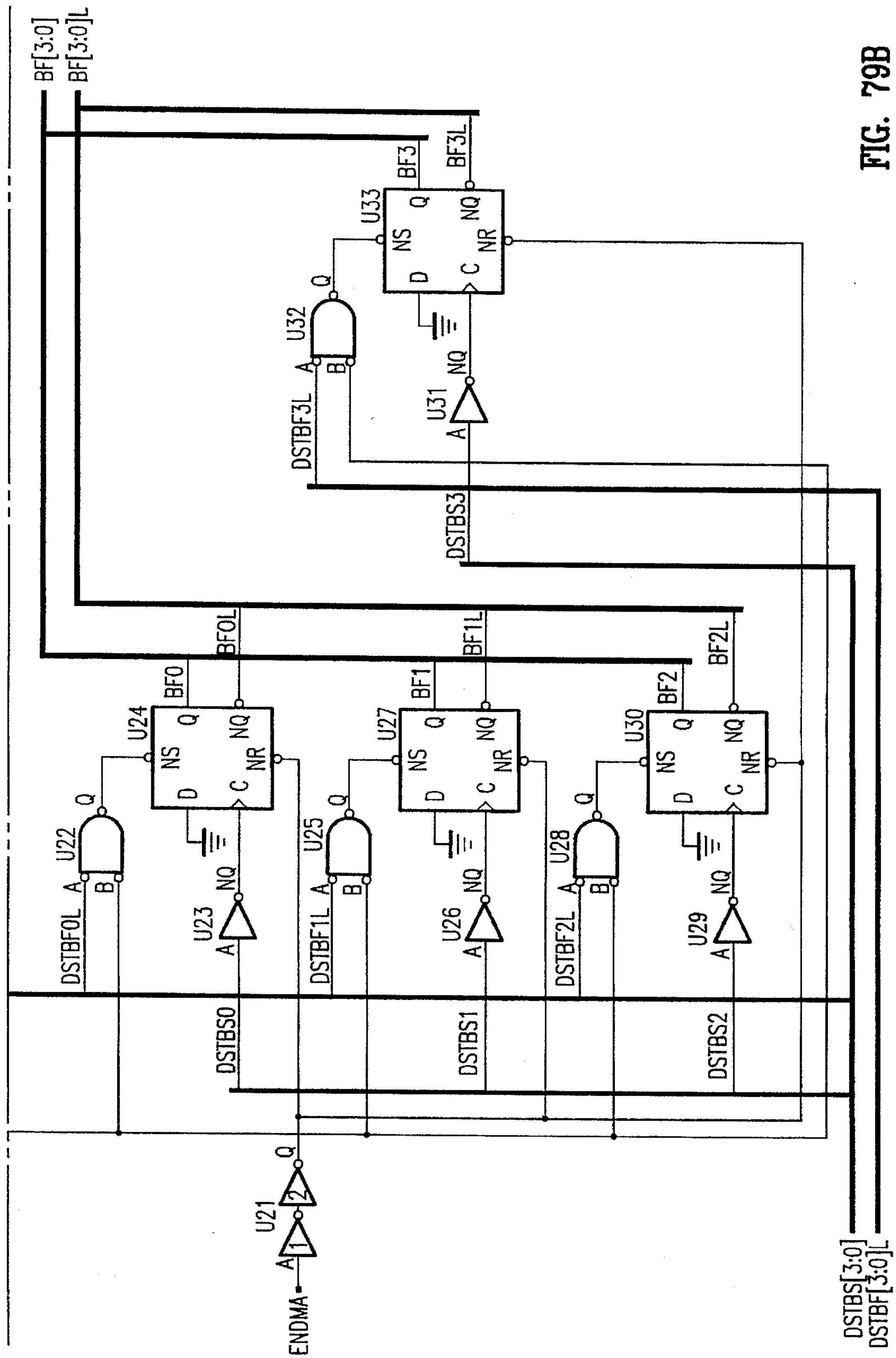

Circuit SBCIN, which is the bus in converter, (FIG. 72A) is shown in more detail in FIGS. 73A and 73B and includes circuits BYTESEL2, BYTESEL3, LATCH8H, LATCH8HB, and MUX4_8. FIG. 74 illustrates circuit BYTESEL2 and FIGS. 75A and 75B illustrate circuit BYTESEL3. Circuit MUX4_8 is illustrated in FIGS. 76A and 76B. FIGS. 77A and 77B illustrate circuit LATCH8HB while FIGS. 78A and 78B illustrate circuit LATCH8H. Circuit SBCOUT (FIG. 72C) is illustrated in more detail in FIGS. 79A and 79B. Circuits SBCIN and SBCOUT provide the 16-bit wide data path described above. FIGS. 79A and 79B also include circuits LATCH8B and LATCH8H as well as circuit MUX4_8 which were just described.

Figure 80A:
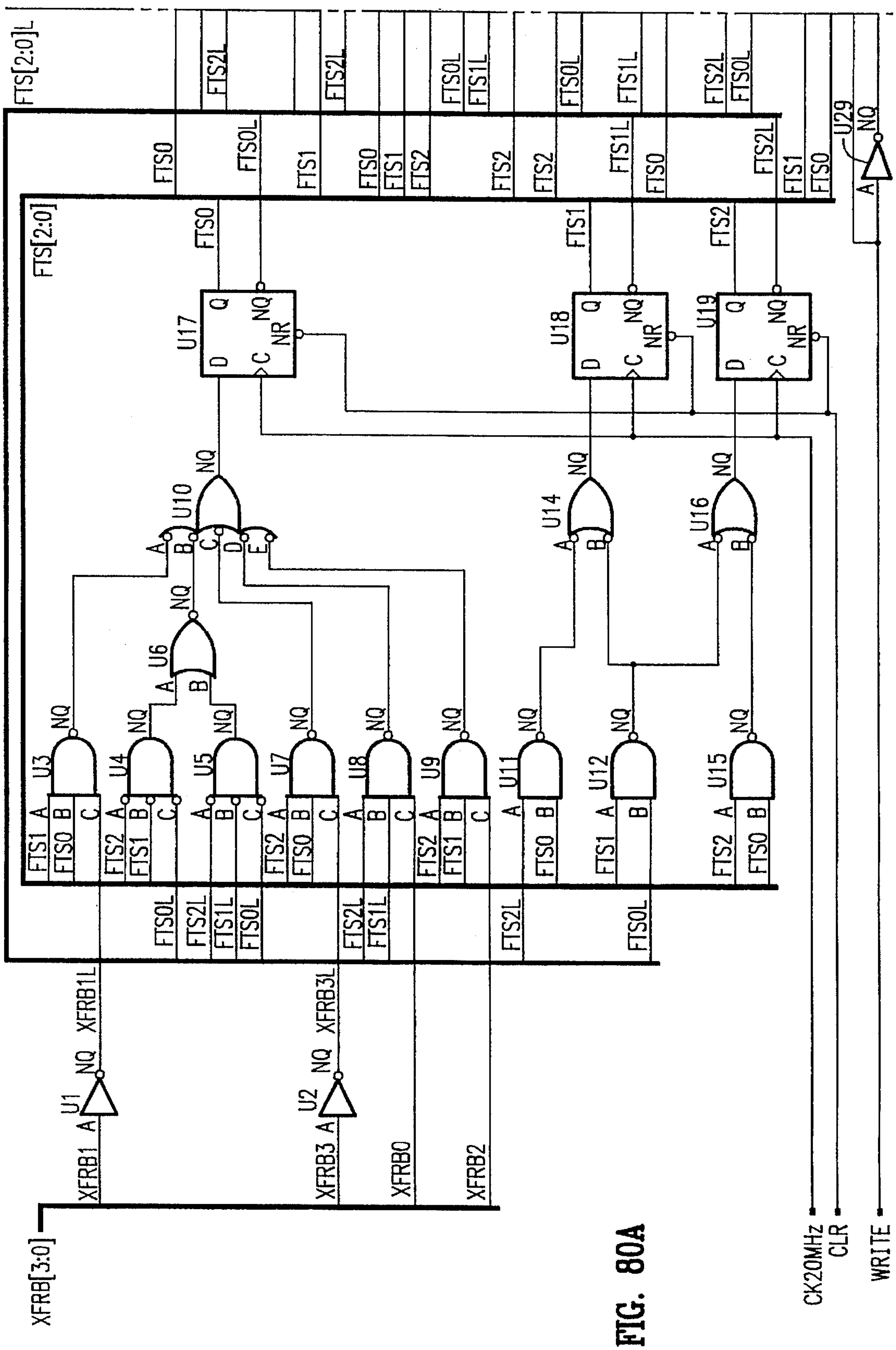
FIGS. 80A and 80B illustrate in more detail circuit FTSM of FIG. 72A.
Figure 80B:
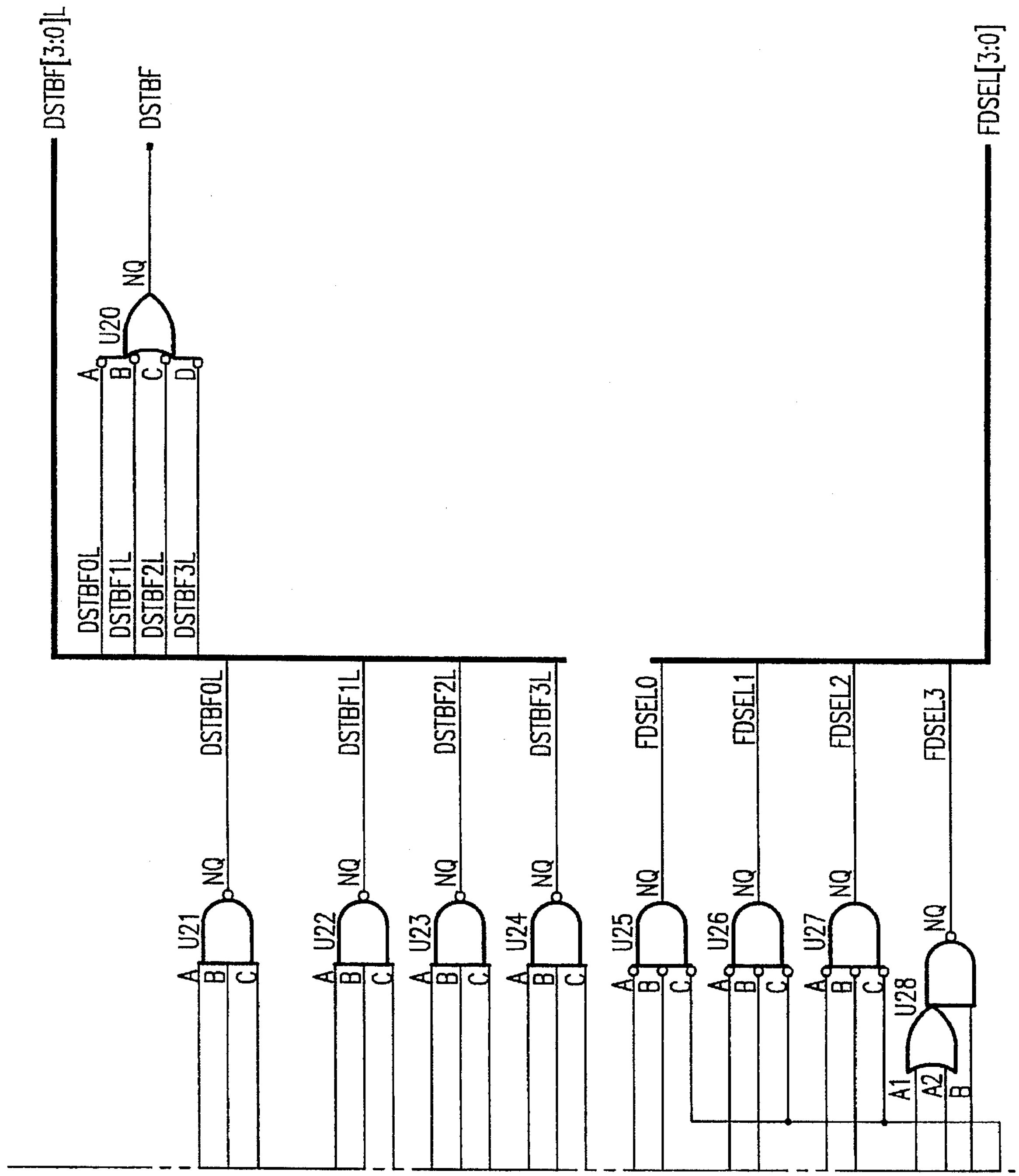
Figure 81A:
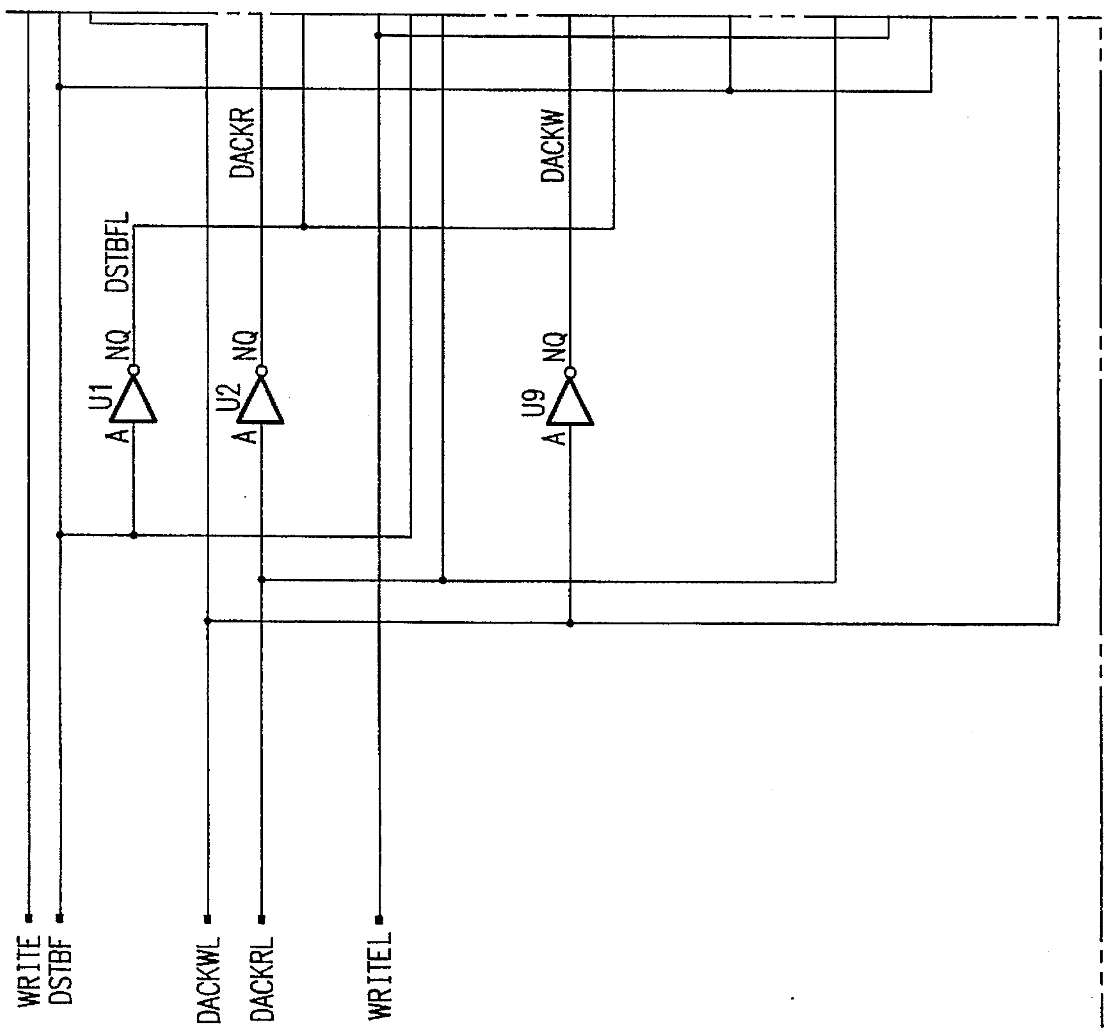
FIGS. 81A, 81B, 81C, and 81D illustrate in more detail circuit FIFOCTL of FIG. 72A.
Figure 81B:
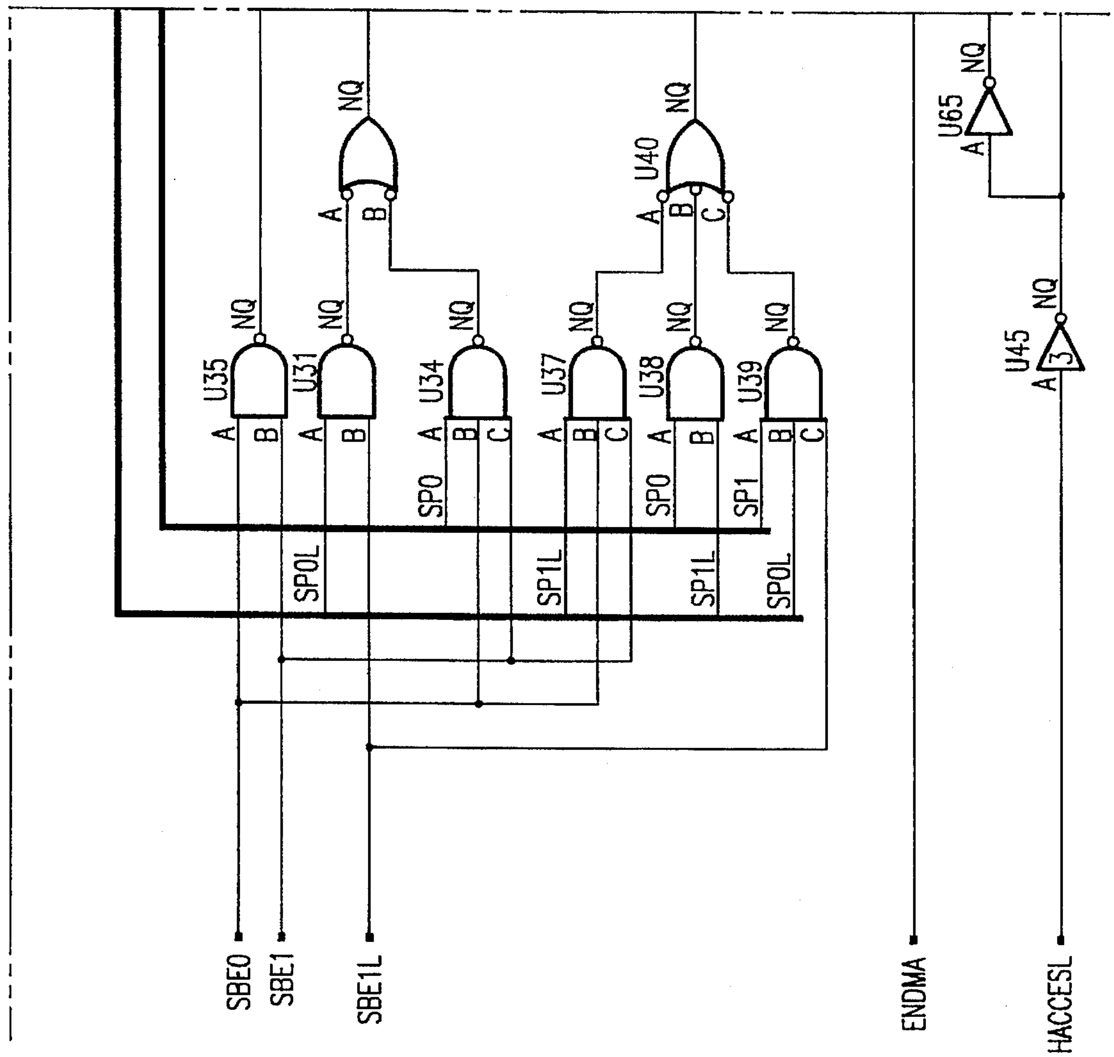
Figure 81C:
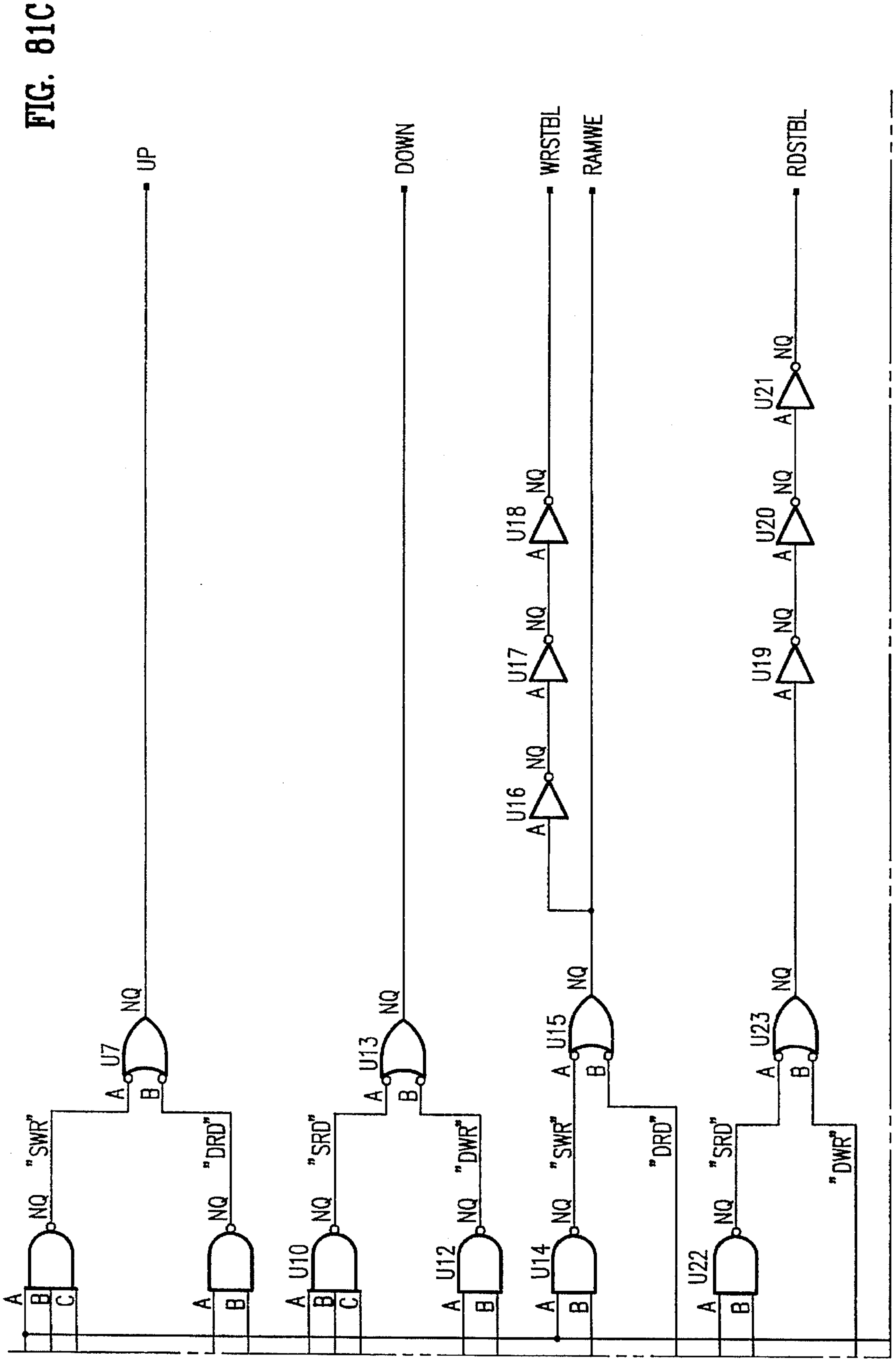
Figure 81D:
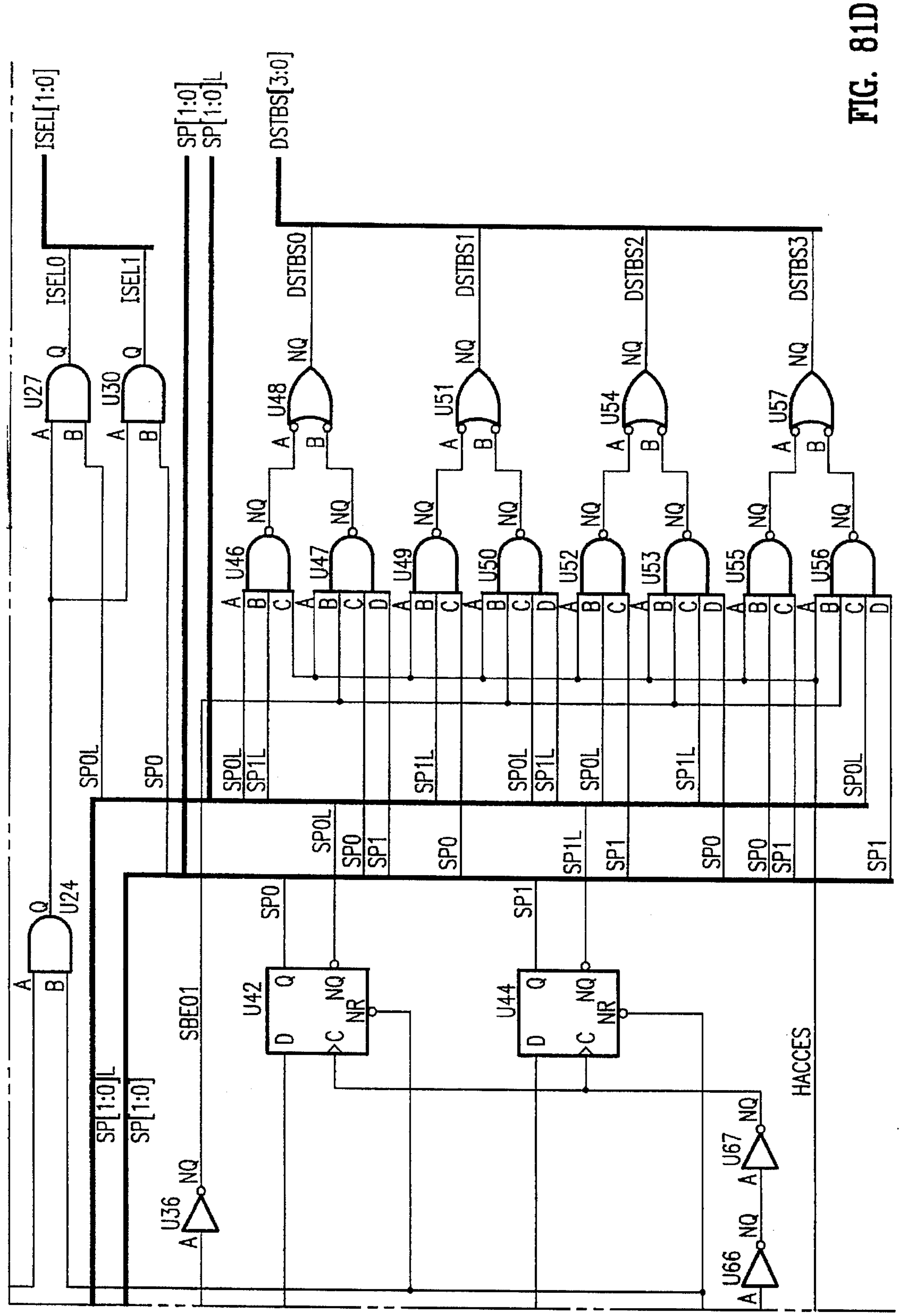

Circuit FTSM (FIG. 72A) is shown in more detail in FIGS. 80A and 80B.

Figure 82A:
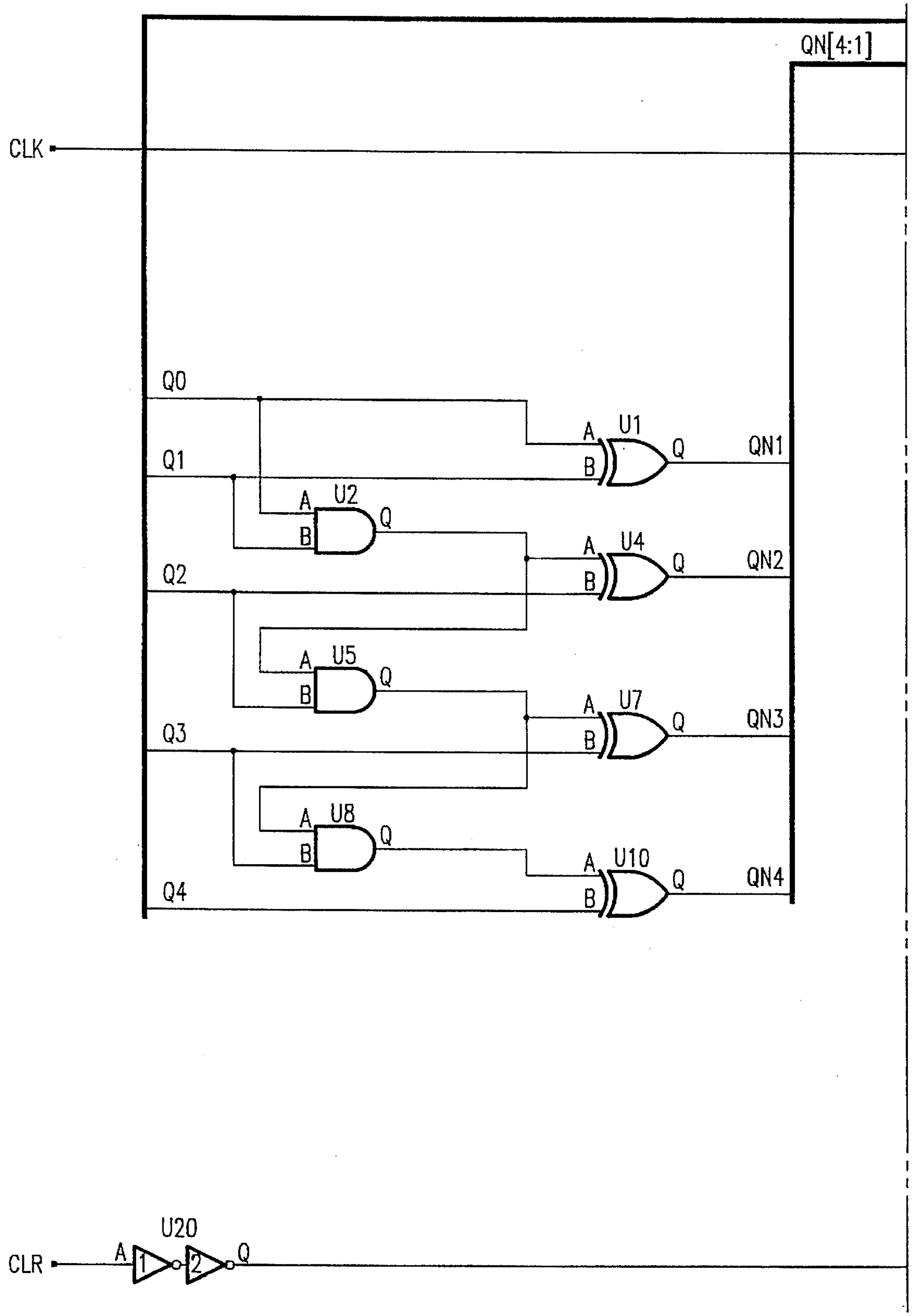
FIGS. 82A and 82B illustrate circuit CTR5r of FIG. 72B.
Figure 82B:
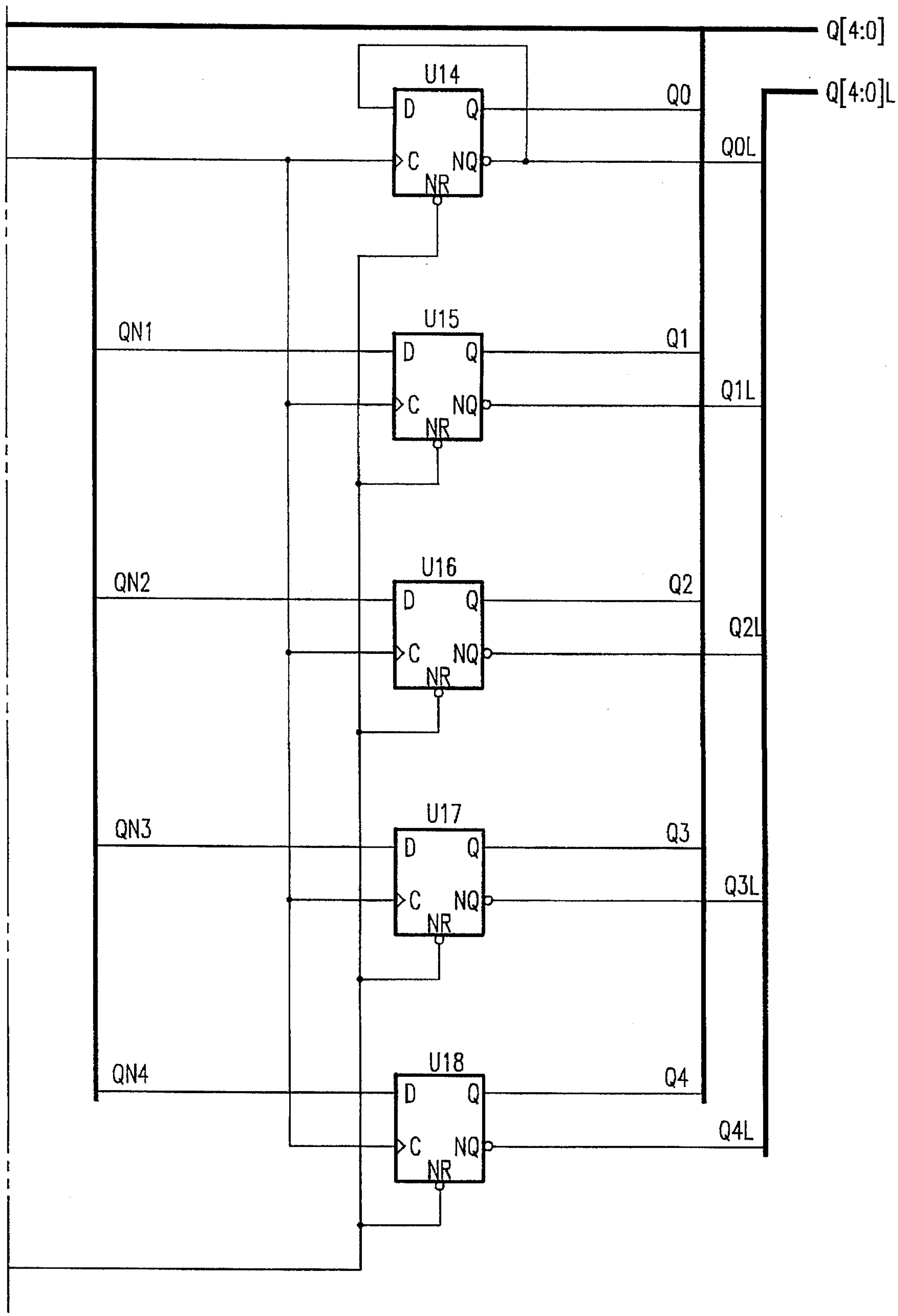
Figure 83A:
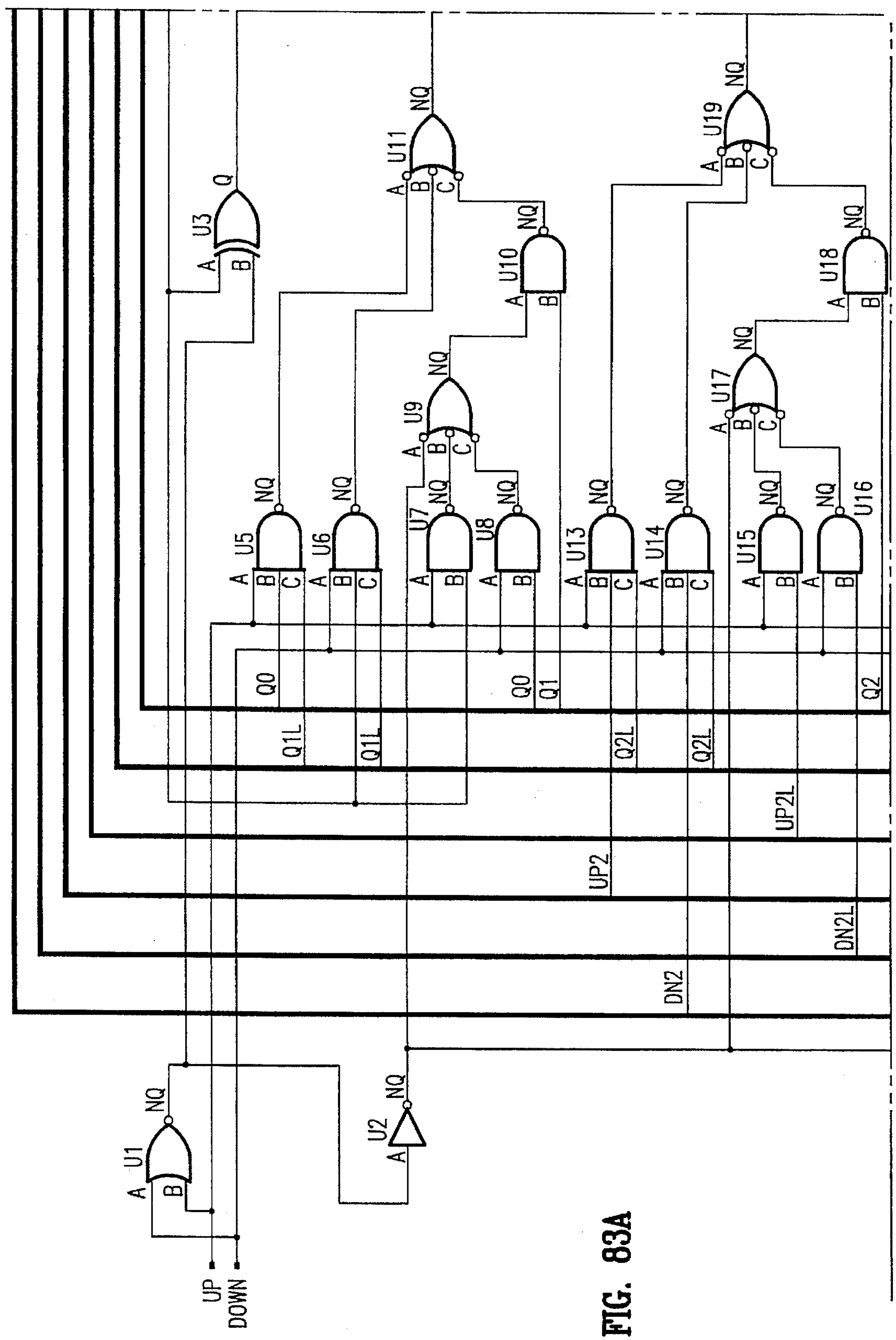
FIGS. 83A, 83B, 83C and 83D and FIGS. 84A and 84B illustrate in more detail six bit up/down counter UDCTR6R of FIG. 72B.
Figure 83B:
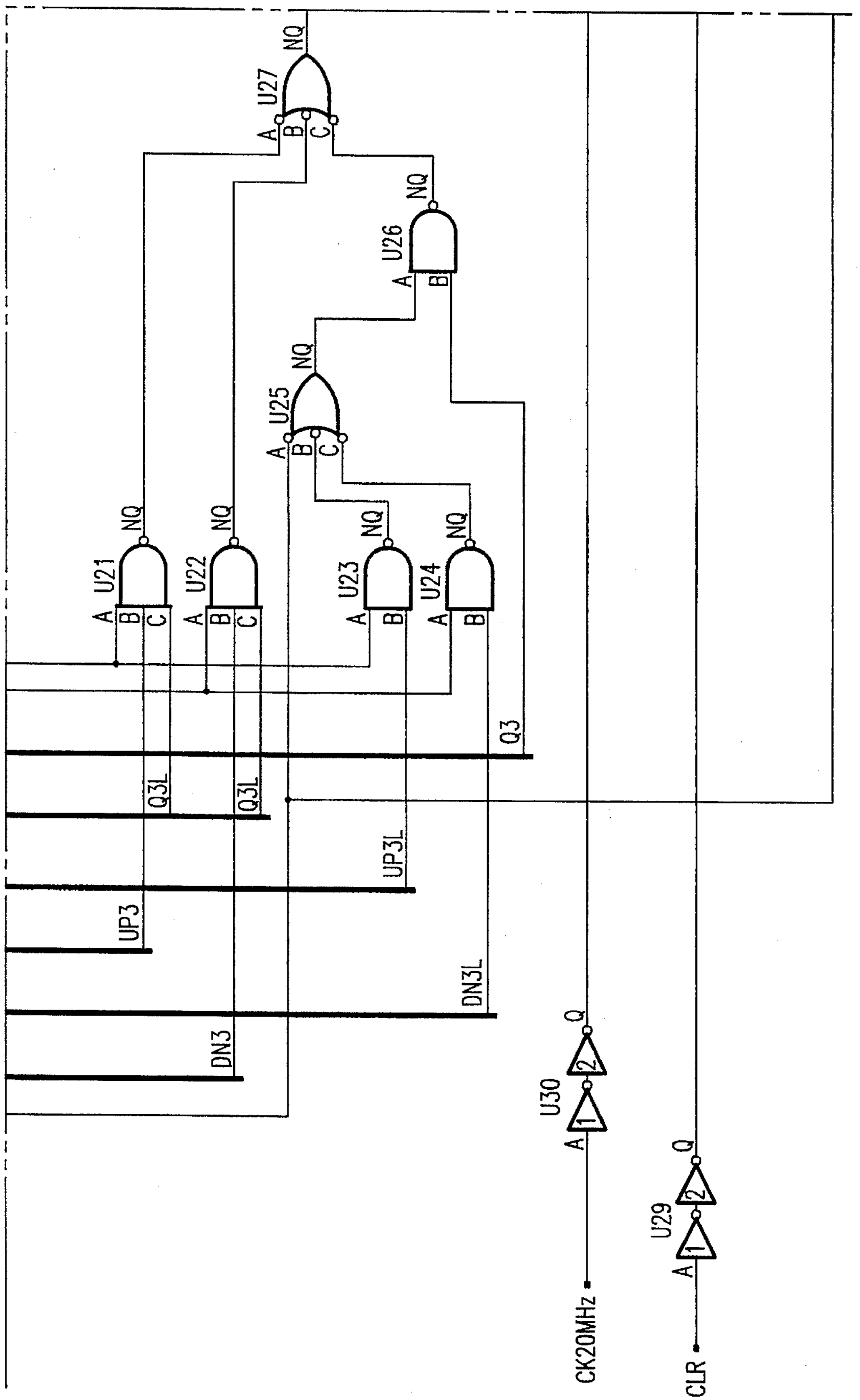
Figure 83C:
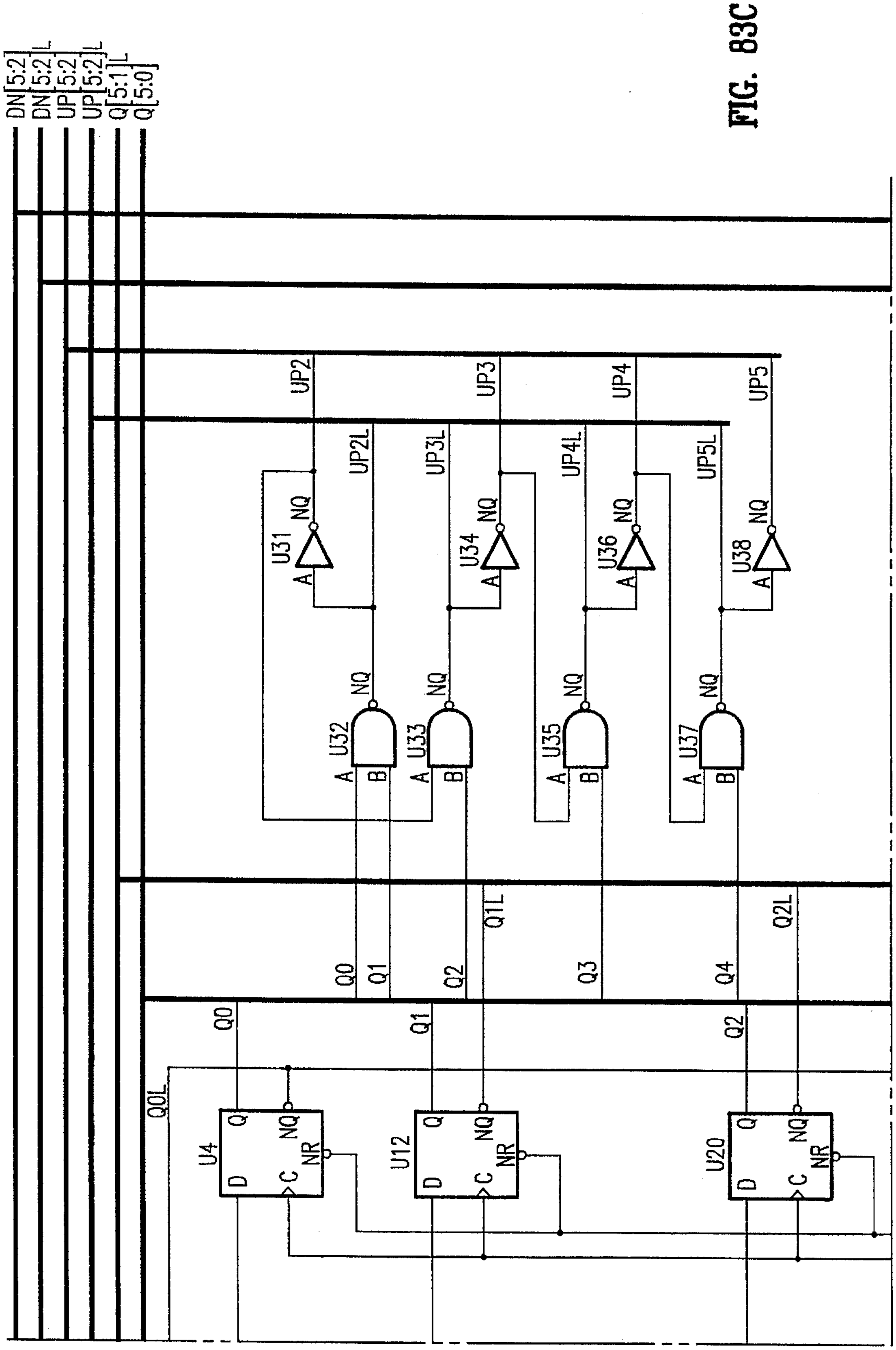
Figure 83D:
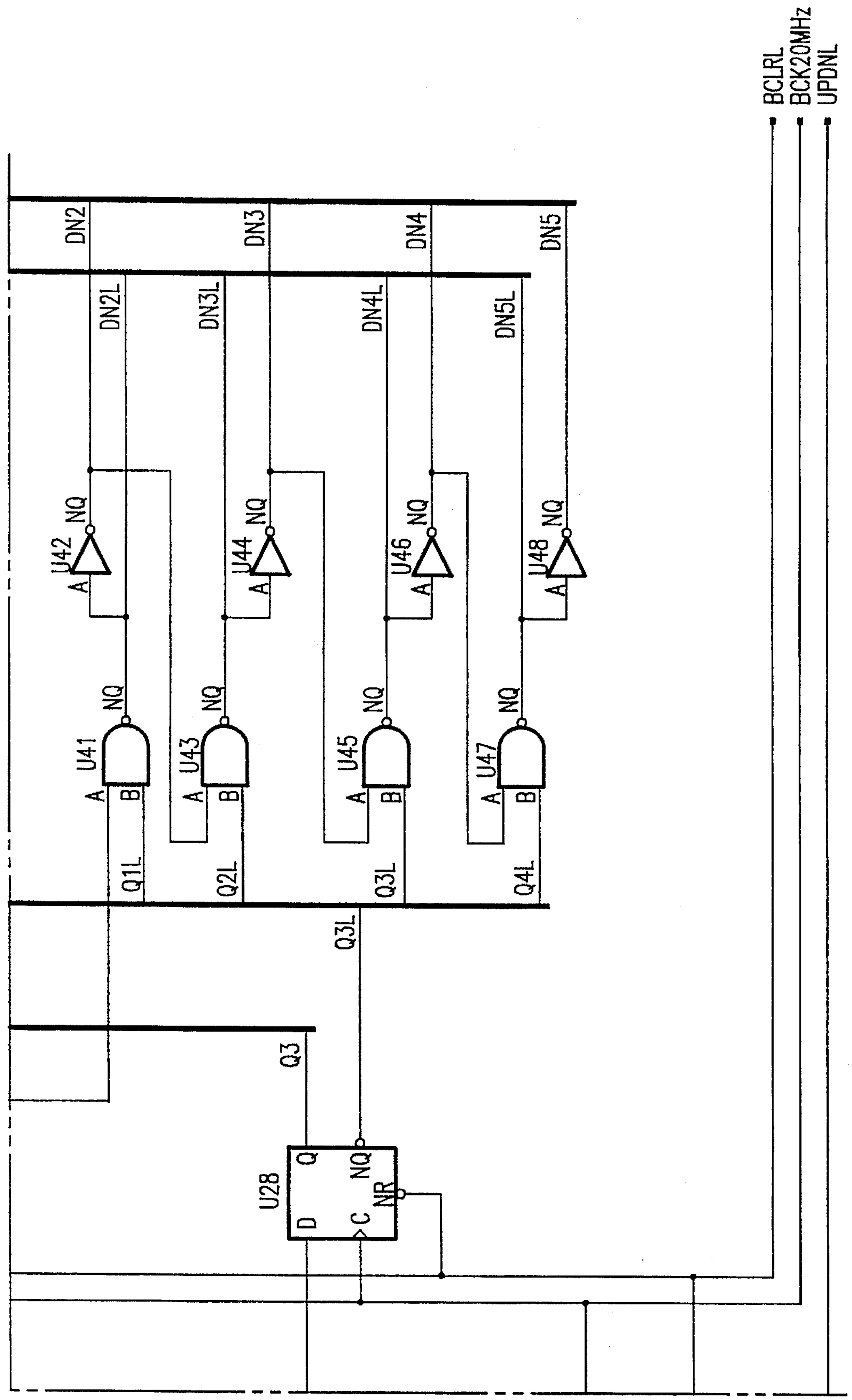
Figure 84A:
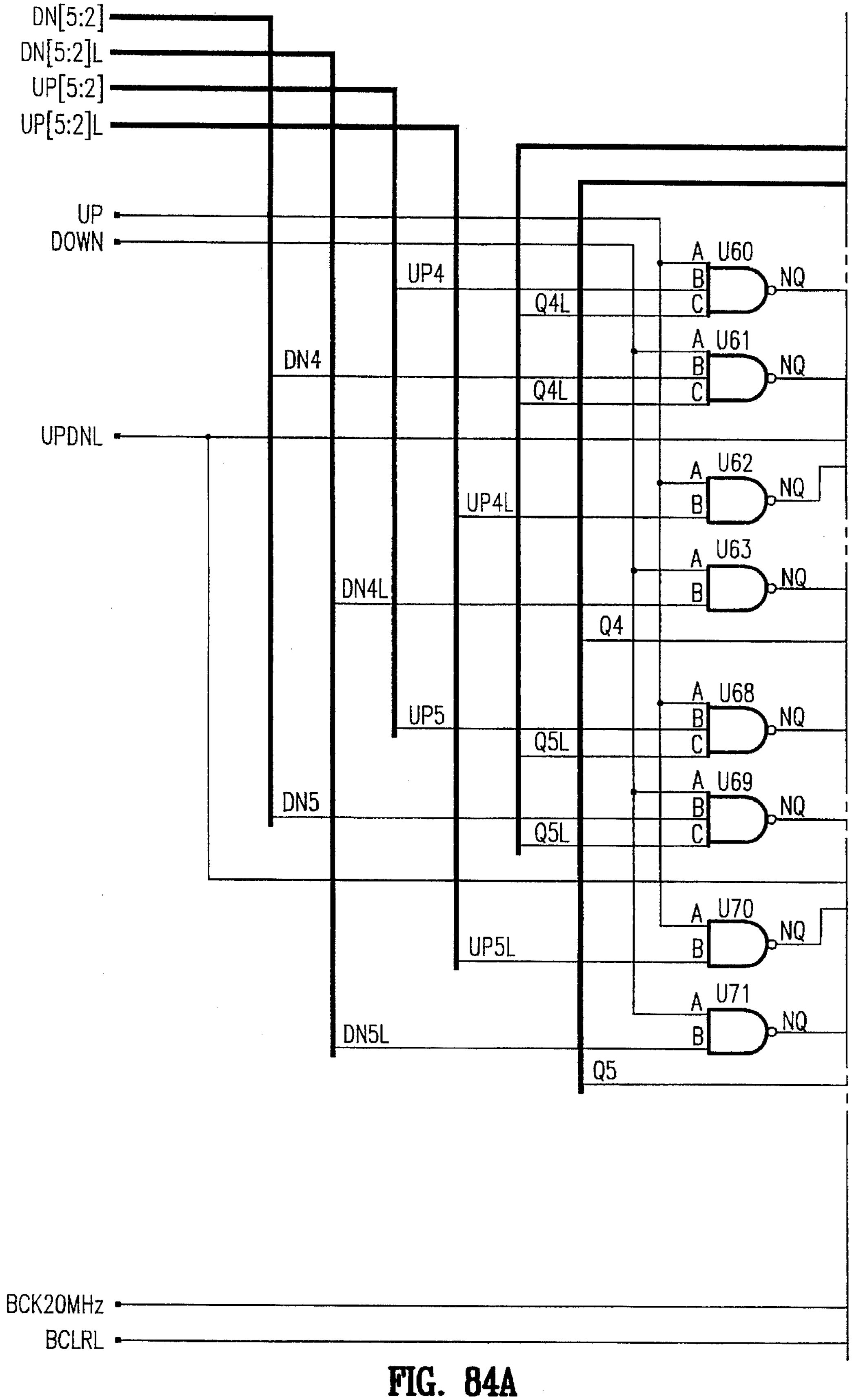
Figure 84B:
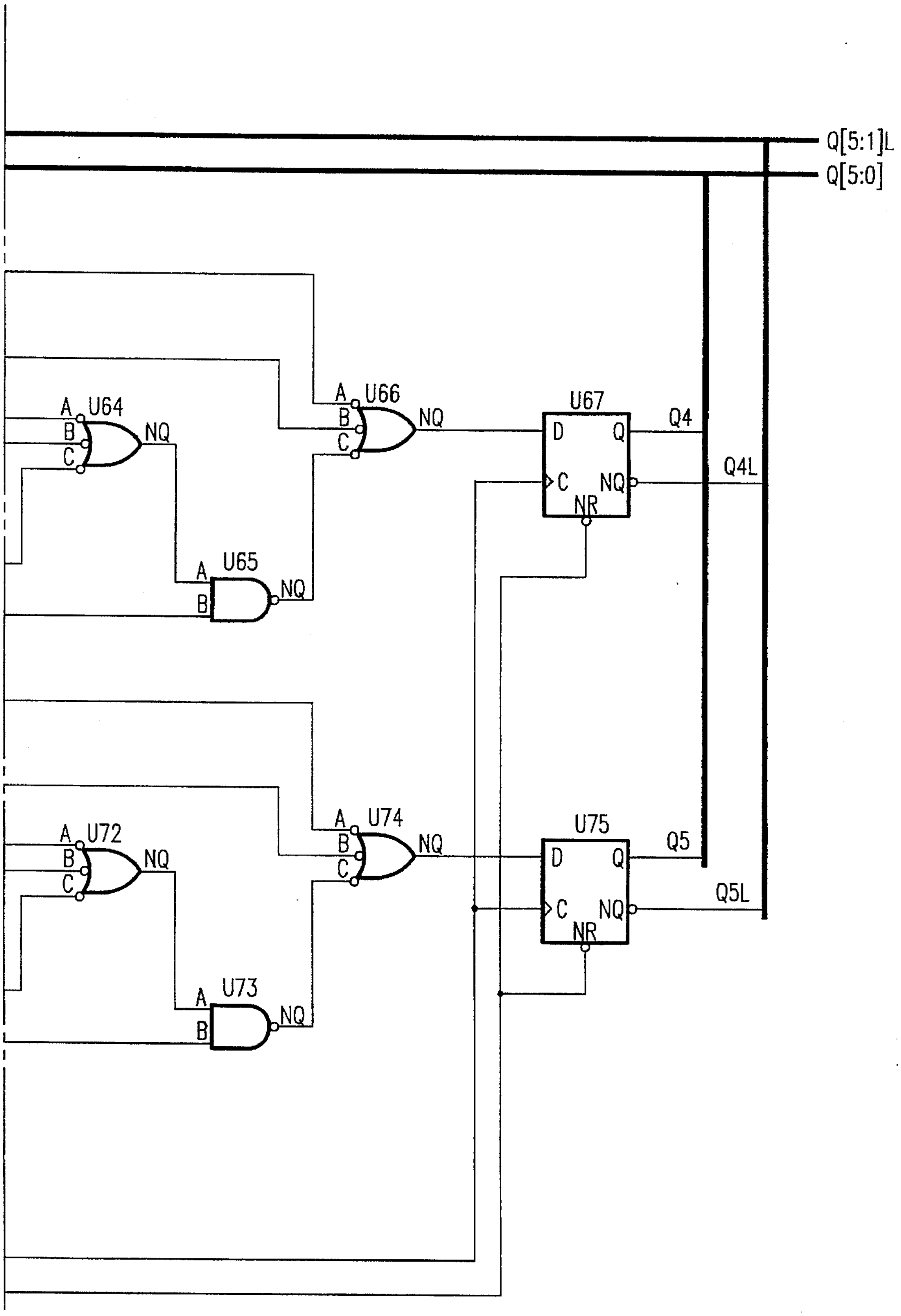
Figures 1, 85A:
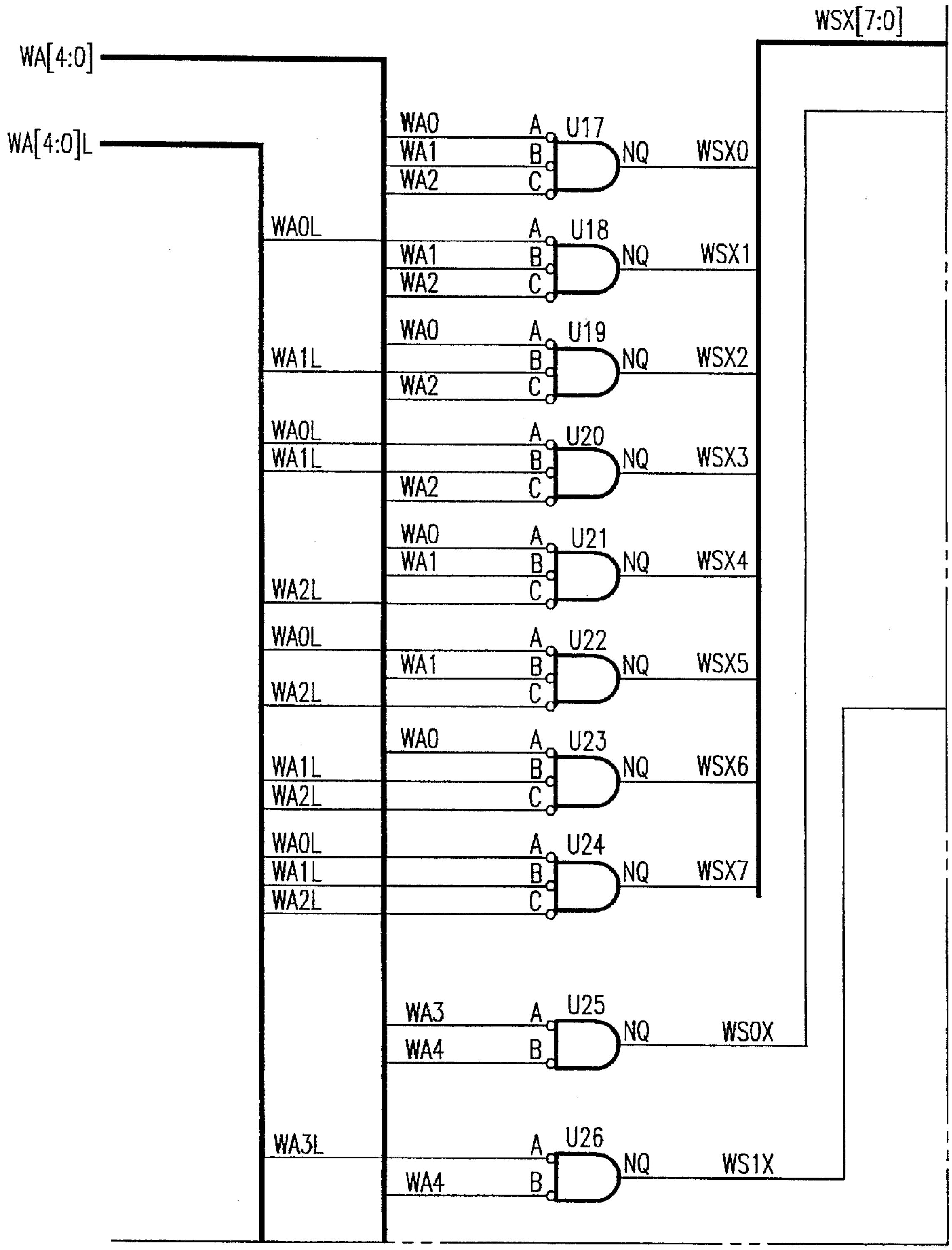
FIGS. 85A, 85B, 86A and 86B illustrate FIFO RAM module circuit RAMF2 of FIG. 72B.
Figures 2, 85A:
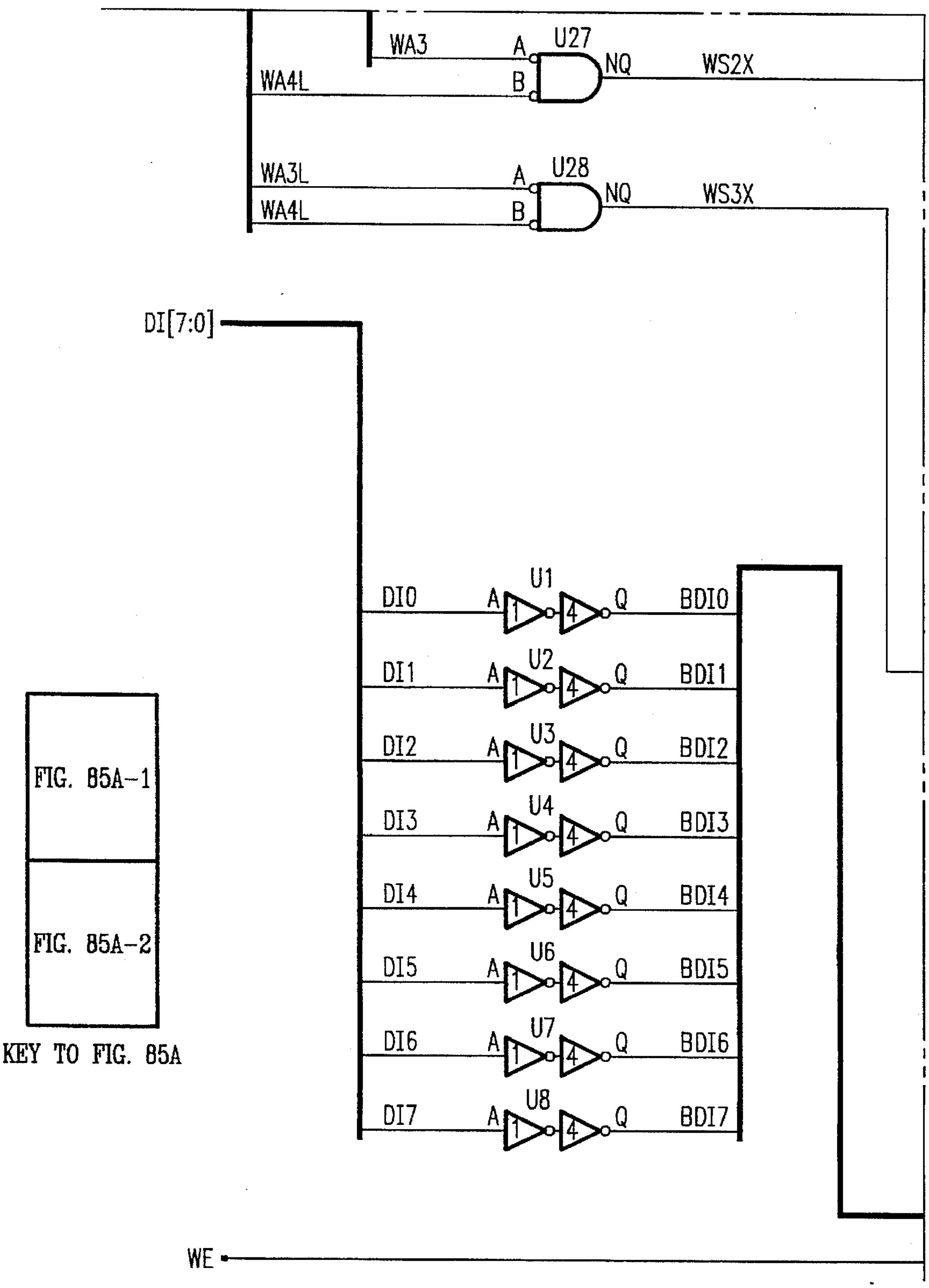
Figures 1, 85B:
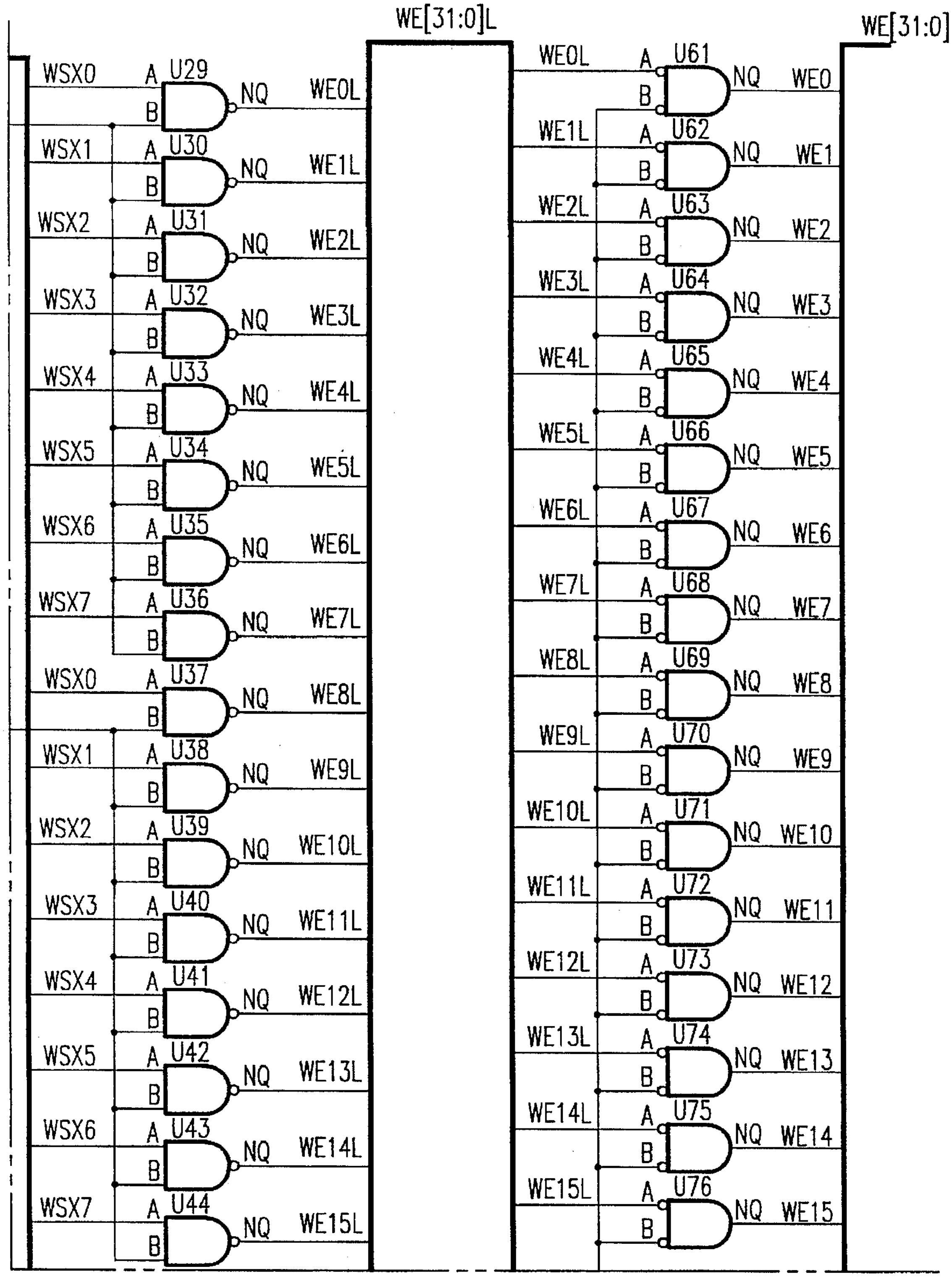
Figures 2, 85B:
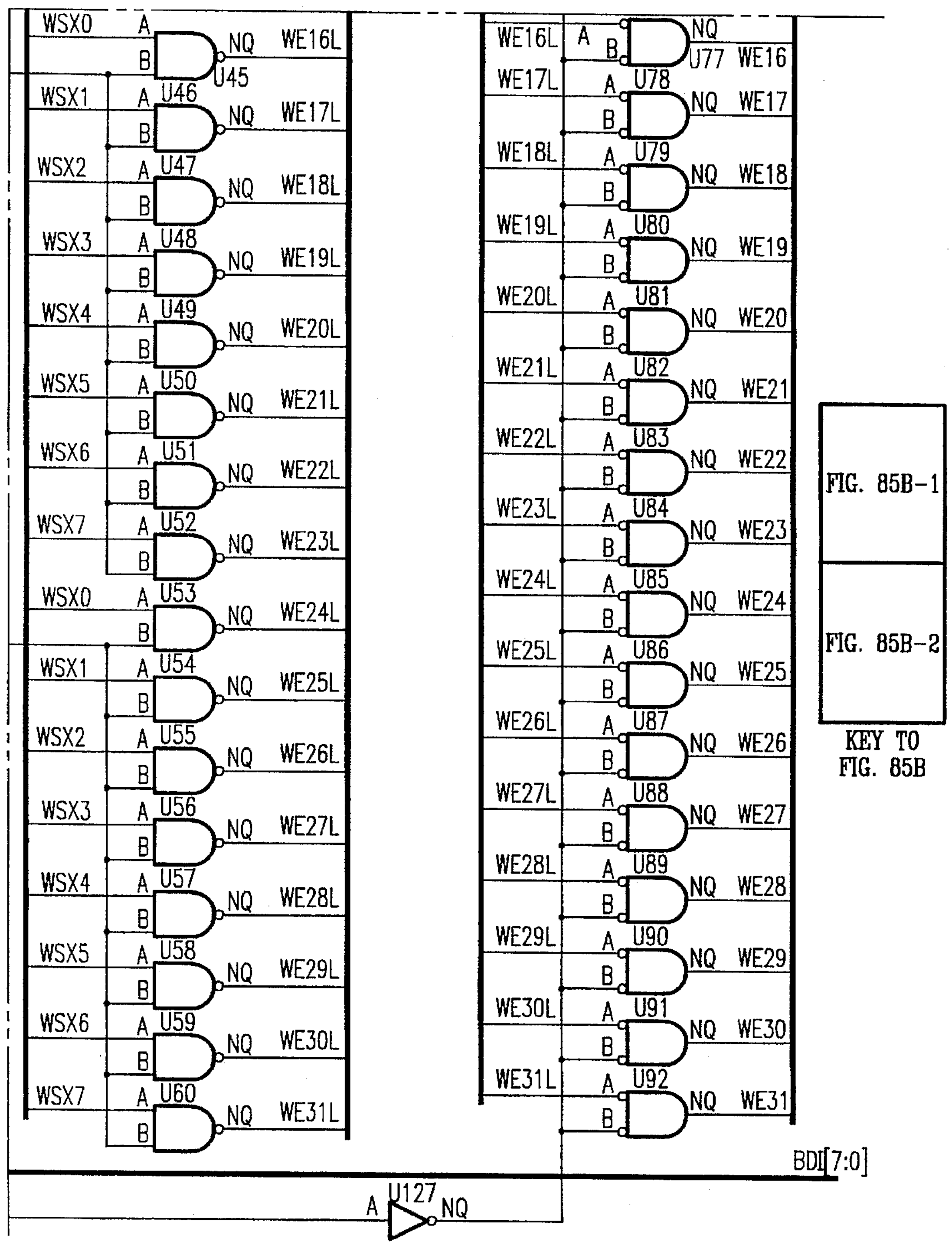
Figures 1, 86A:
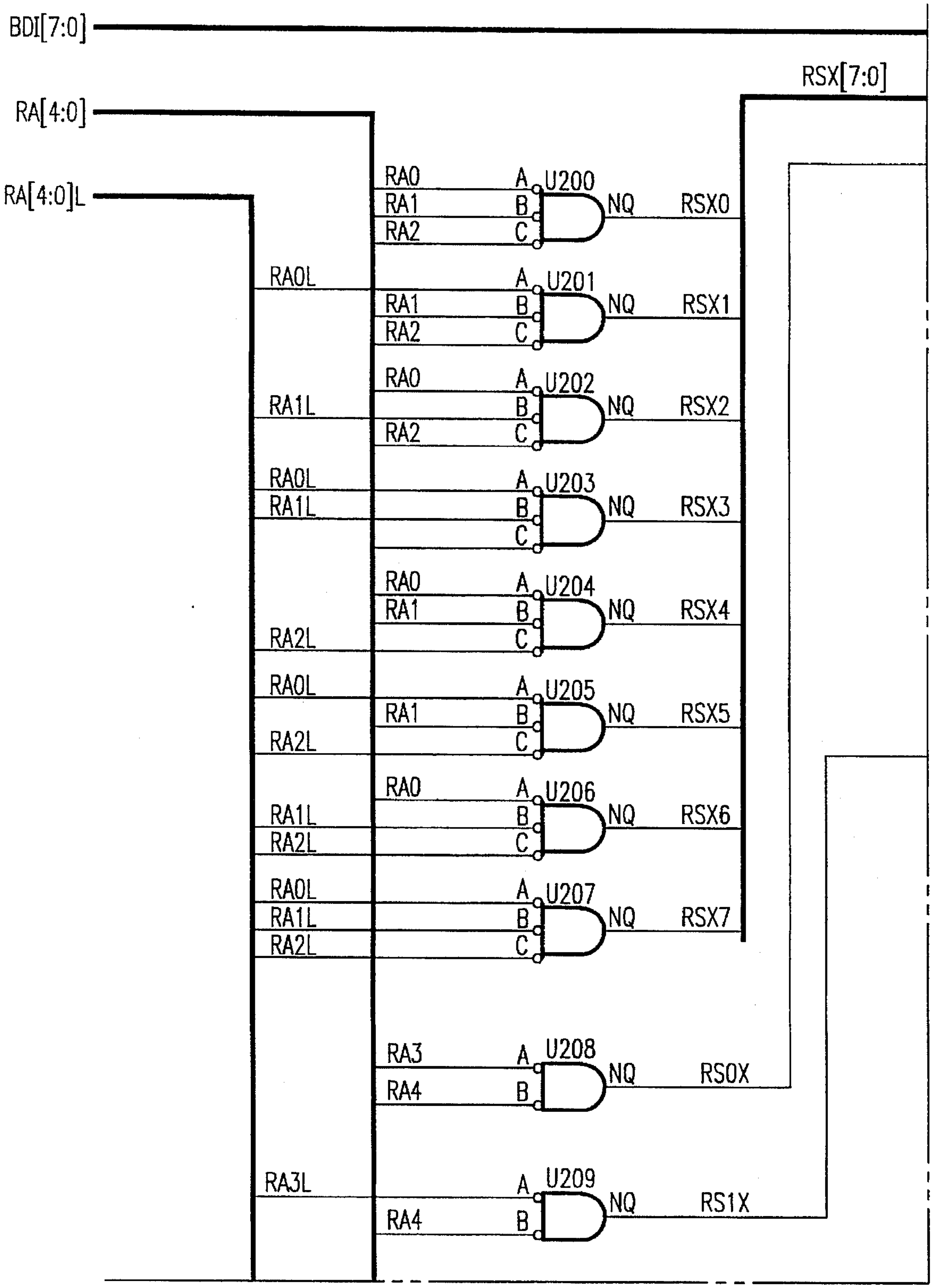
Figure 86A:
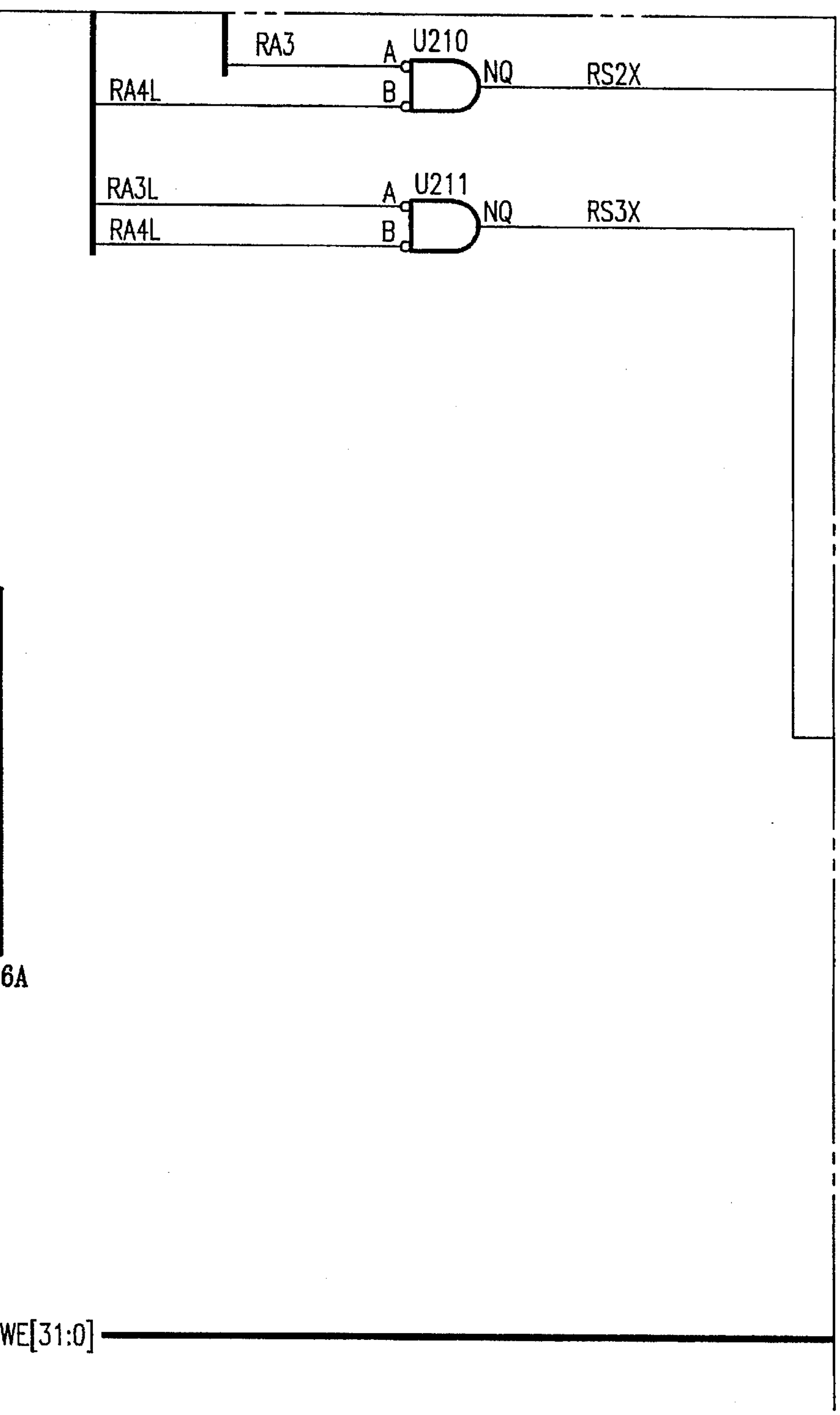
Figure 2:
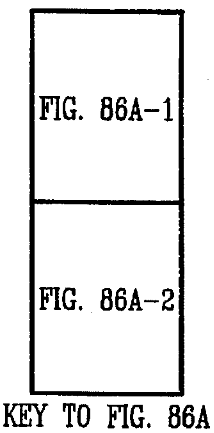
Figures 1, 86B:
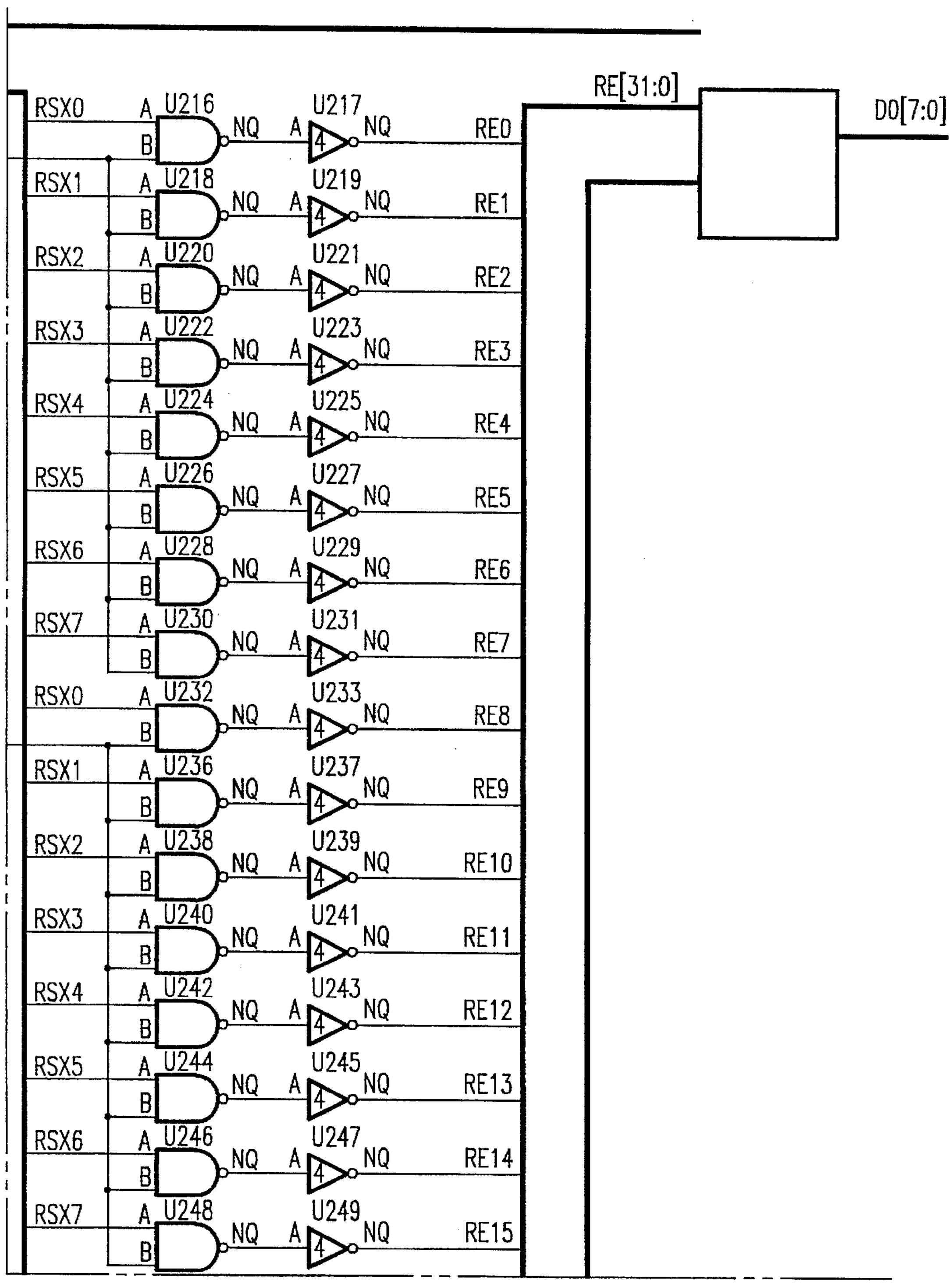
Figure 86B:
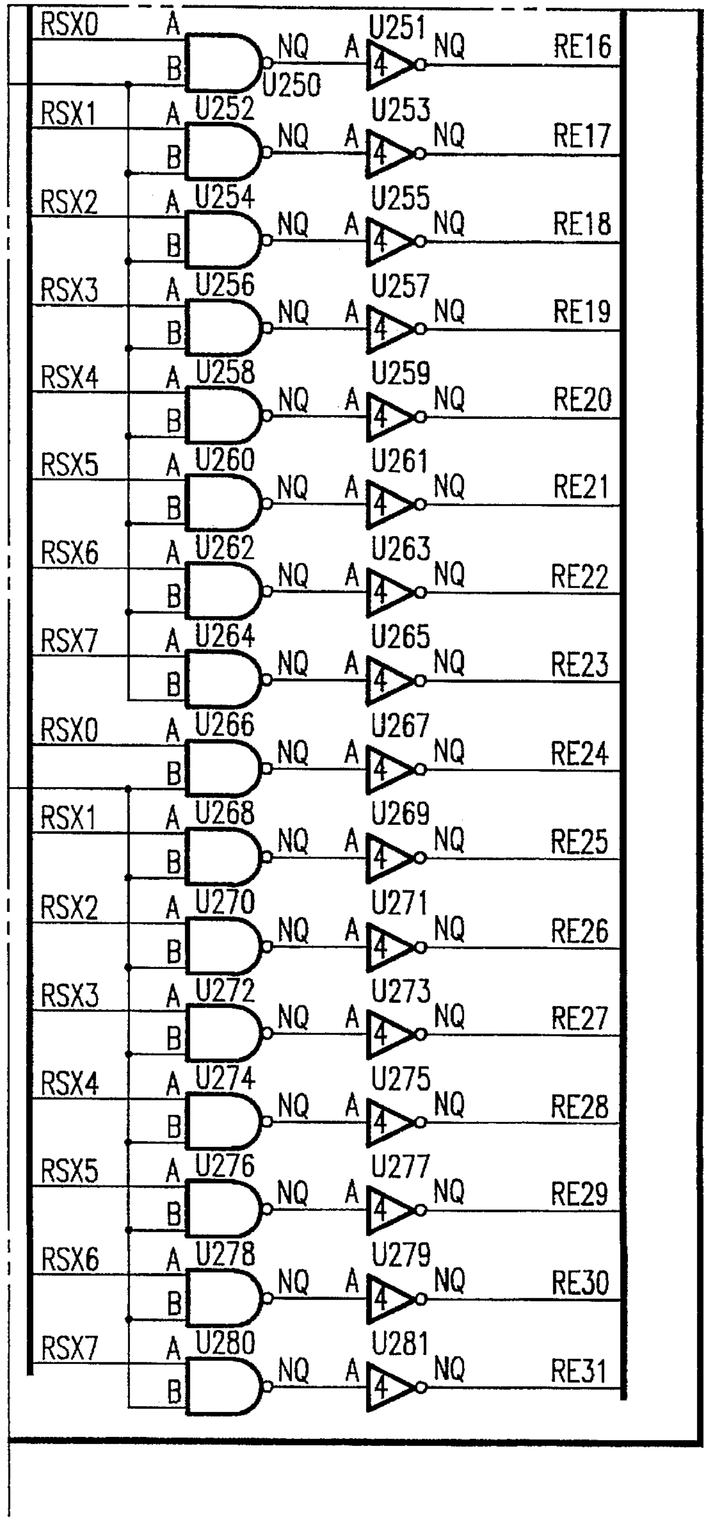
Figure 2:
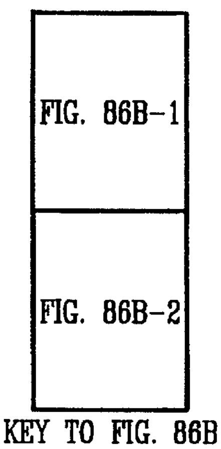

Circuit FIFOCTL (FIG. 72A), which is the FIFO control circuit, is shown in more detail in FIGS. 81A through 81D. Circuit CTR5R (FIG. 72B) is illustrated in FIGS. 82A and 82B. Circuits CTR5R (FIG. 72B) are read and write pointers.

Figures 1, 87A:
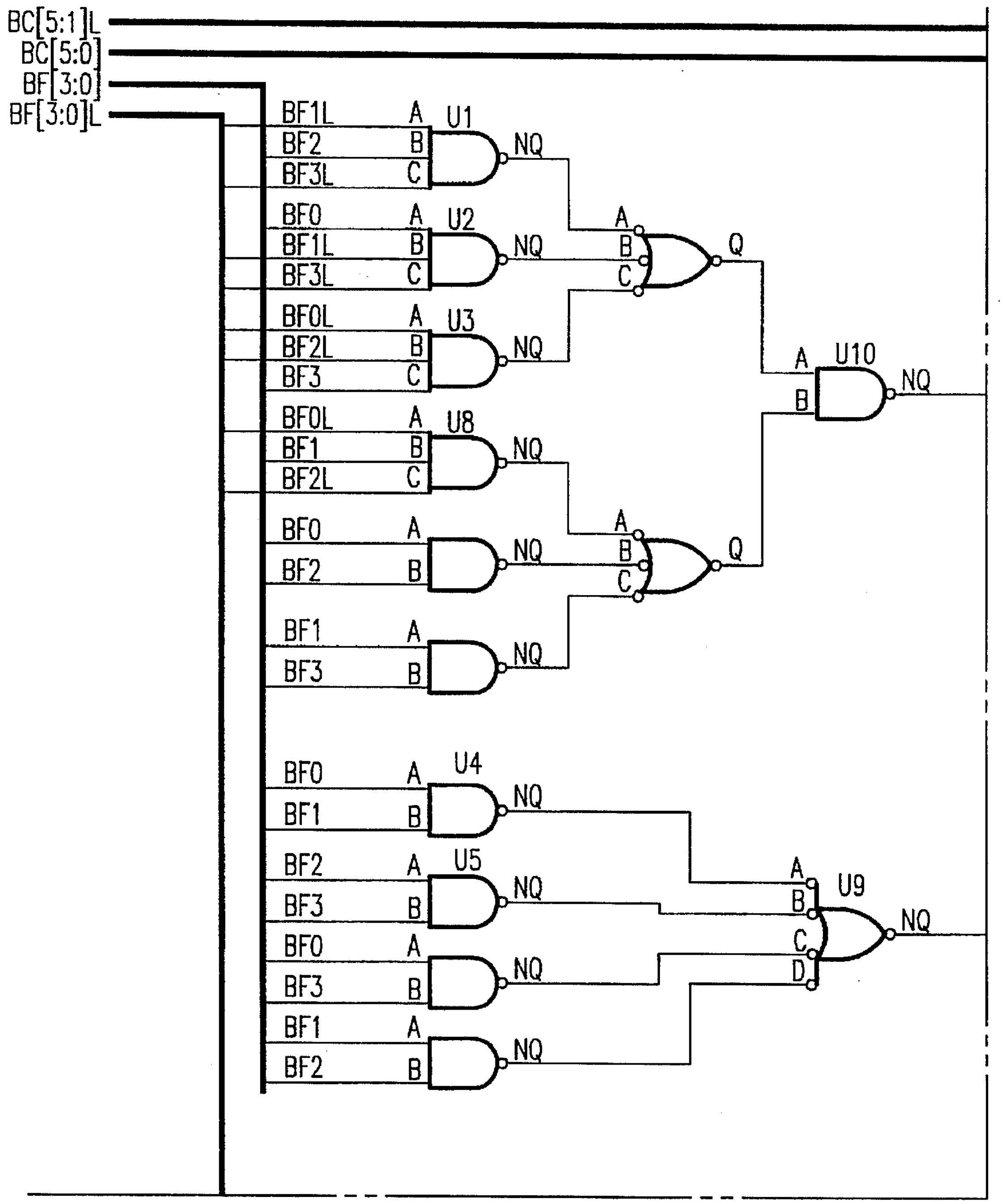
FIG. 87A and 87B illustrate circuit FFCNT of FIG. 72B.
Figures 1, 87B:
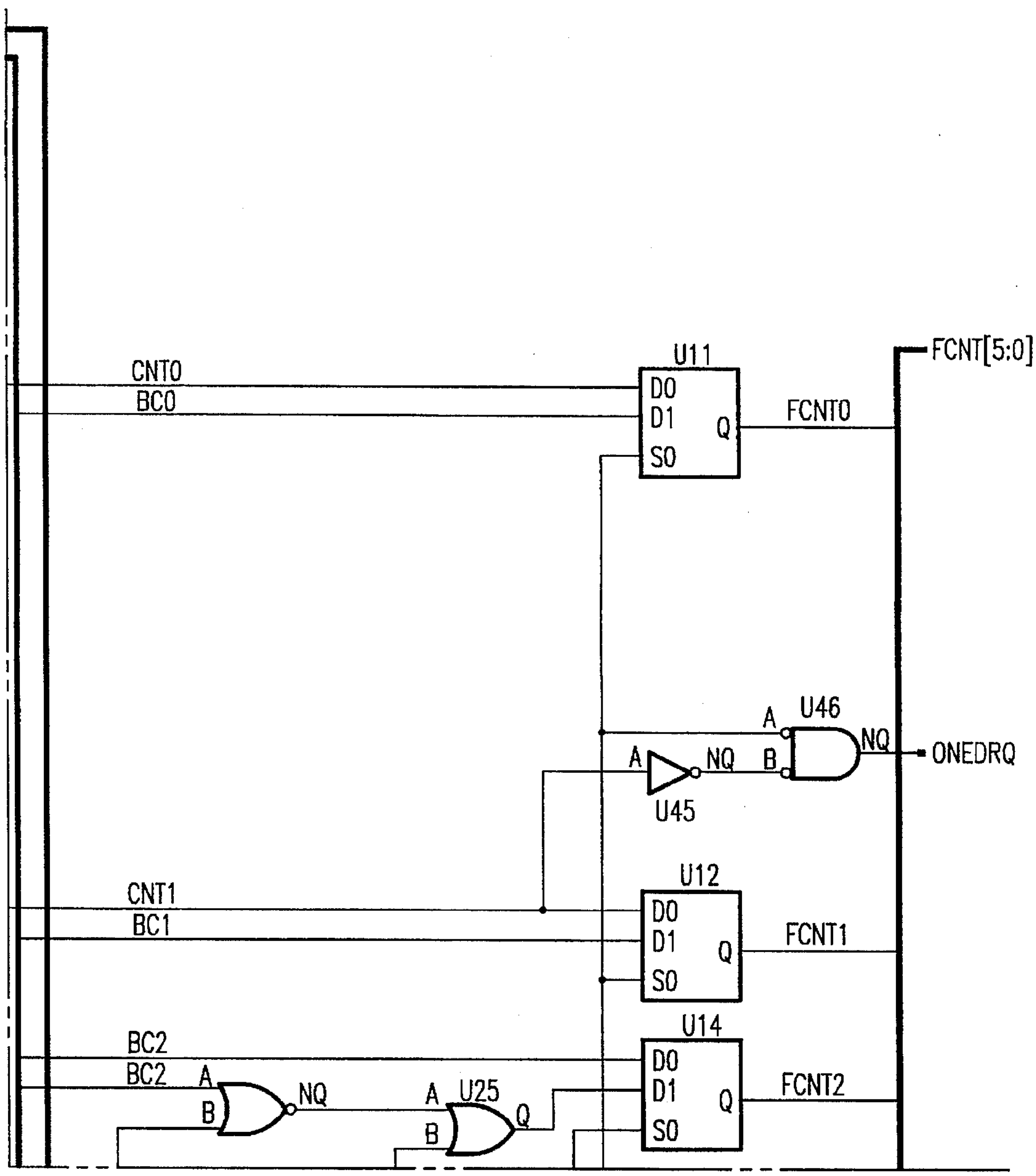
Figure 88:
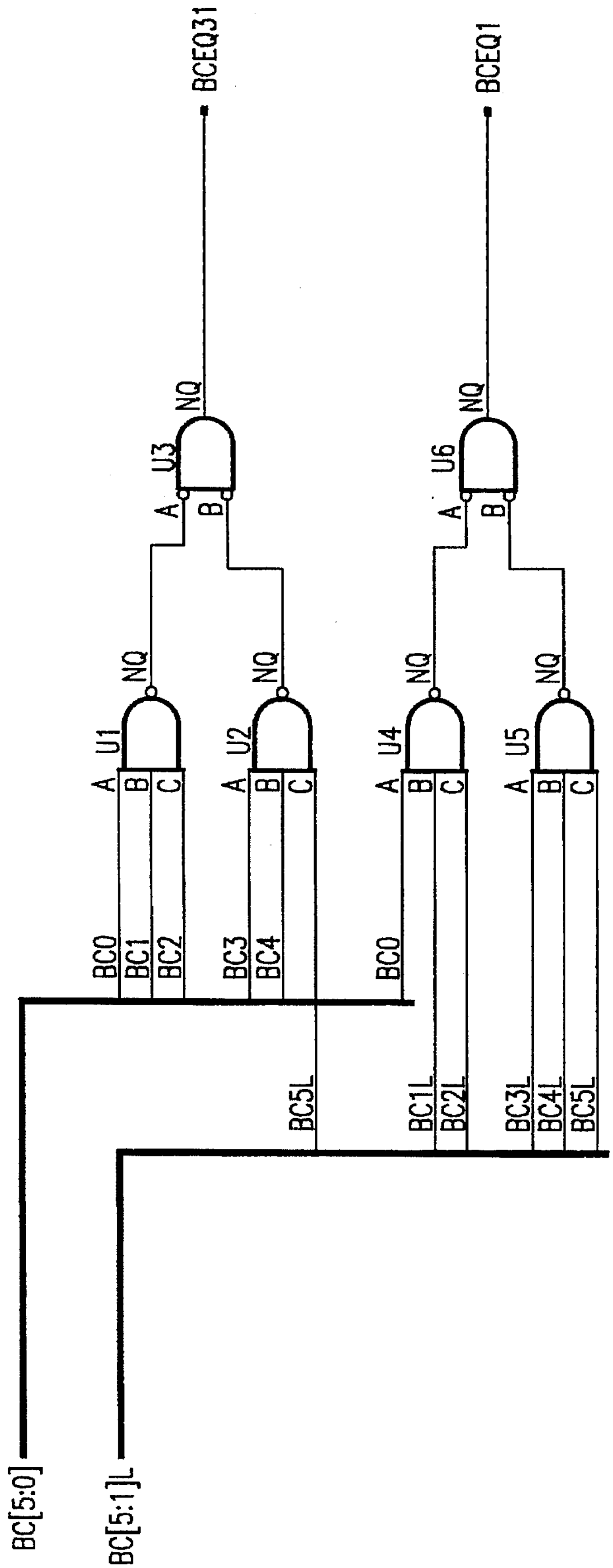
FIG. 88 illustrates circuit FIFO2CMP of FIG. 72B.
Figure 89:
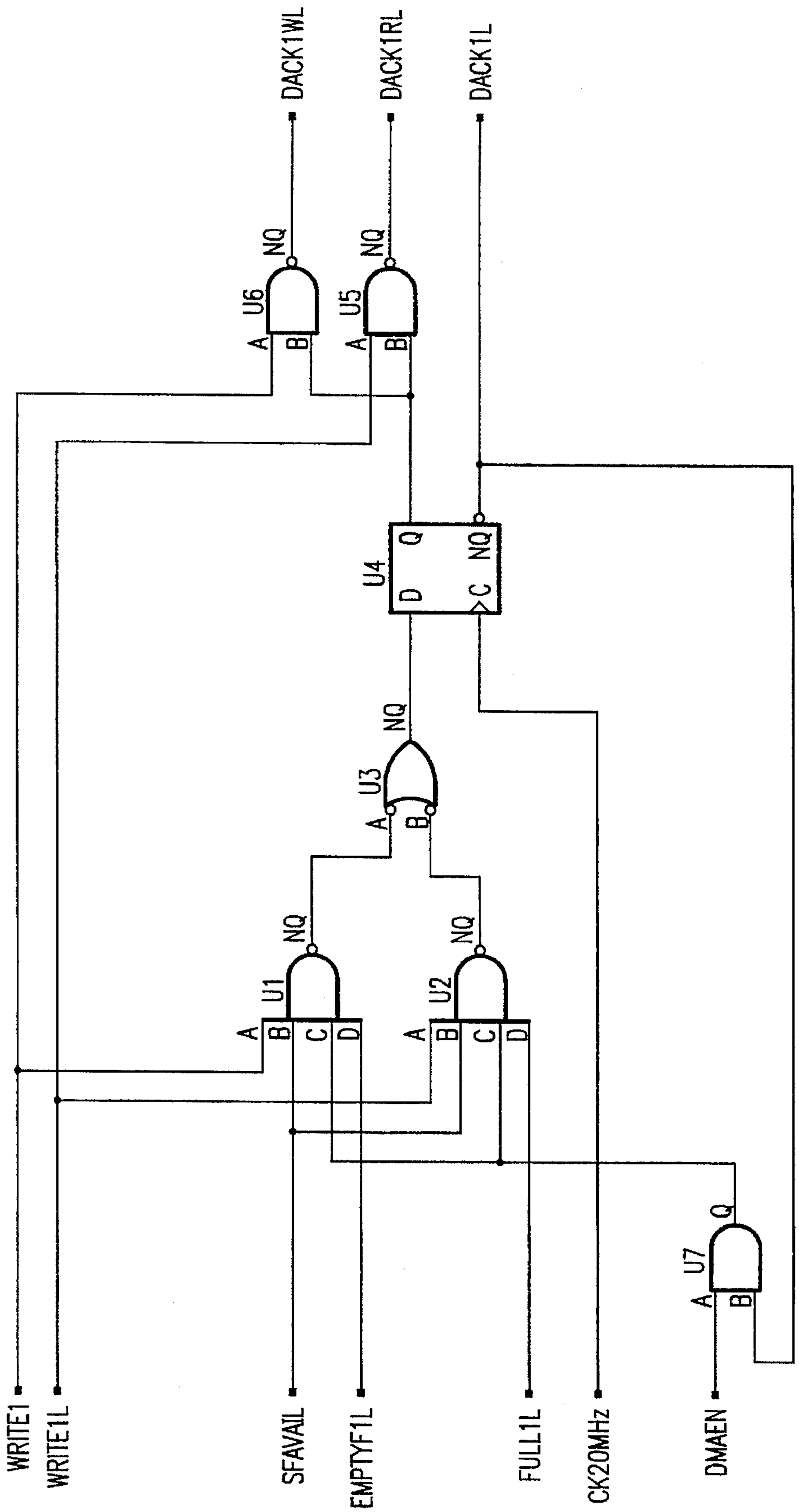
FIG. 89 illustrates circuit DTSM1.
Figure 90A:
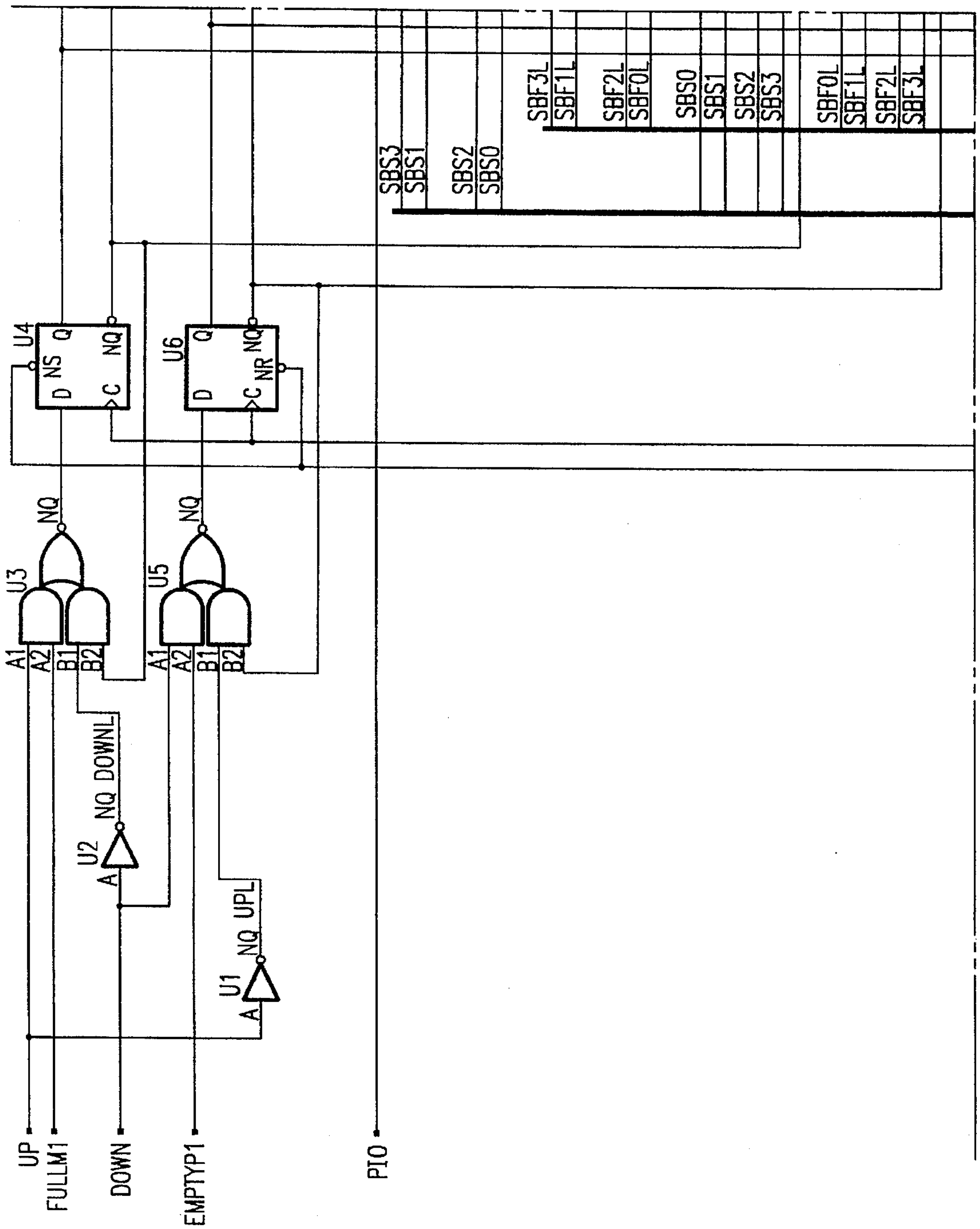
FIGS. 90A, 90B, 90C and 90D illustrate register FIFOSTAT circuitDTSM1 of FIG. 72C.
Figure 90B:
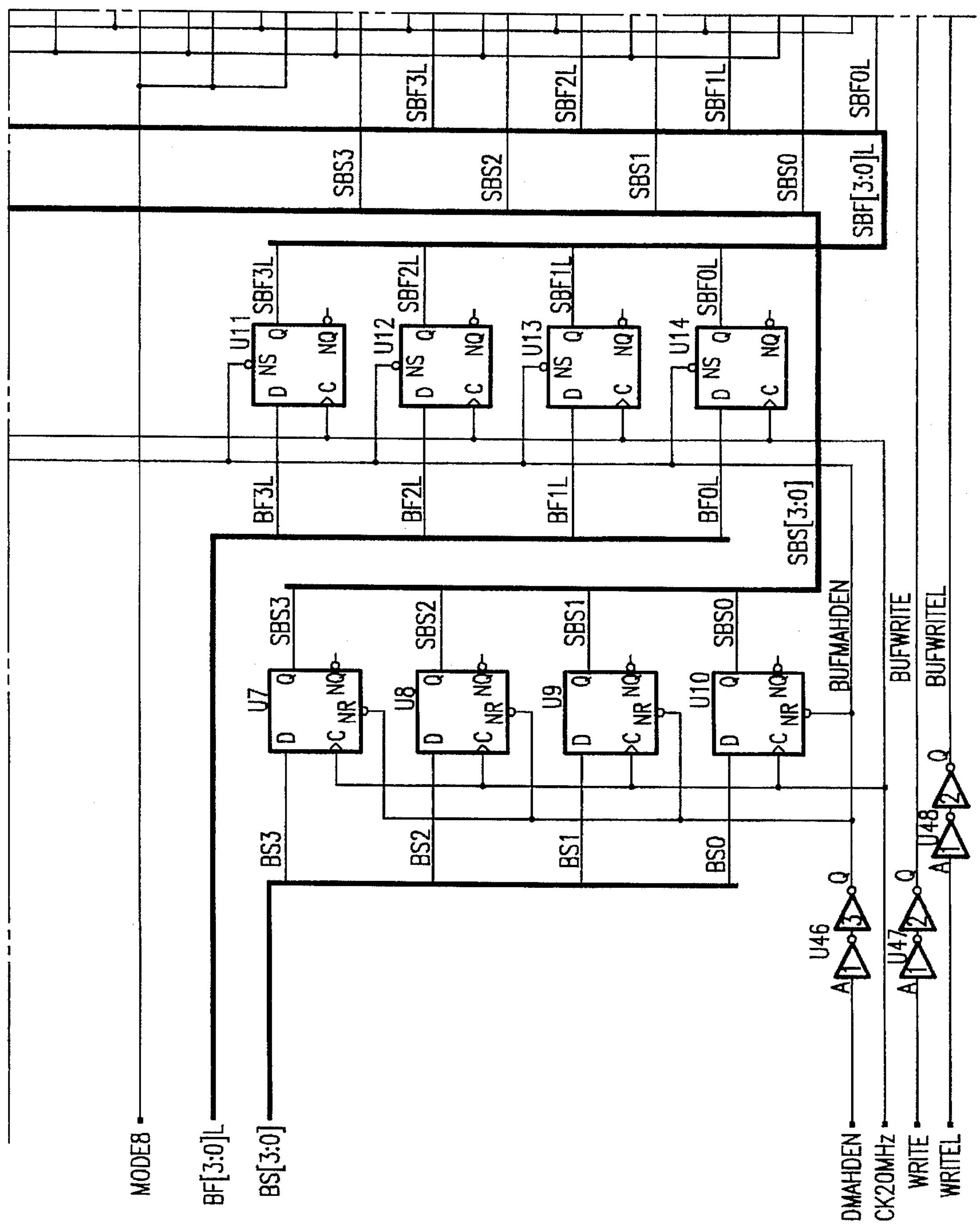
Figure 90C:
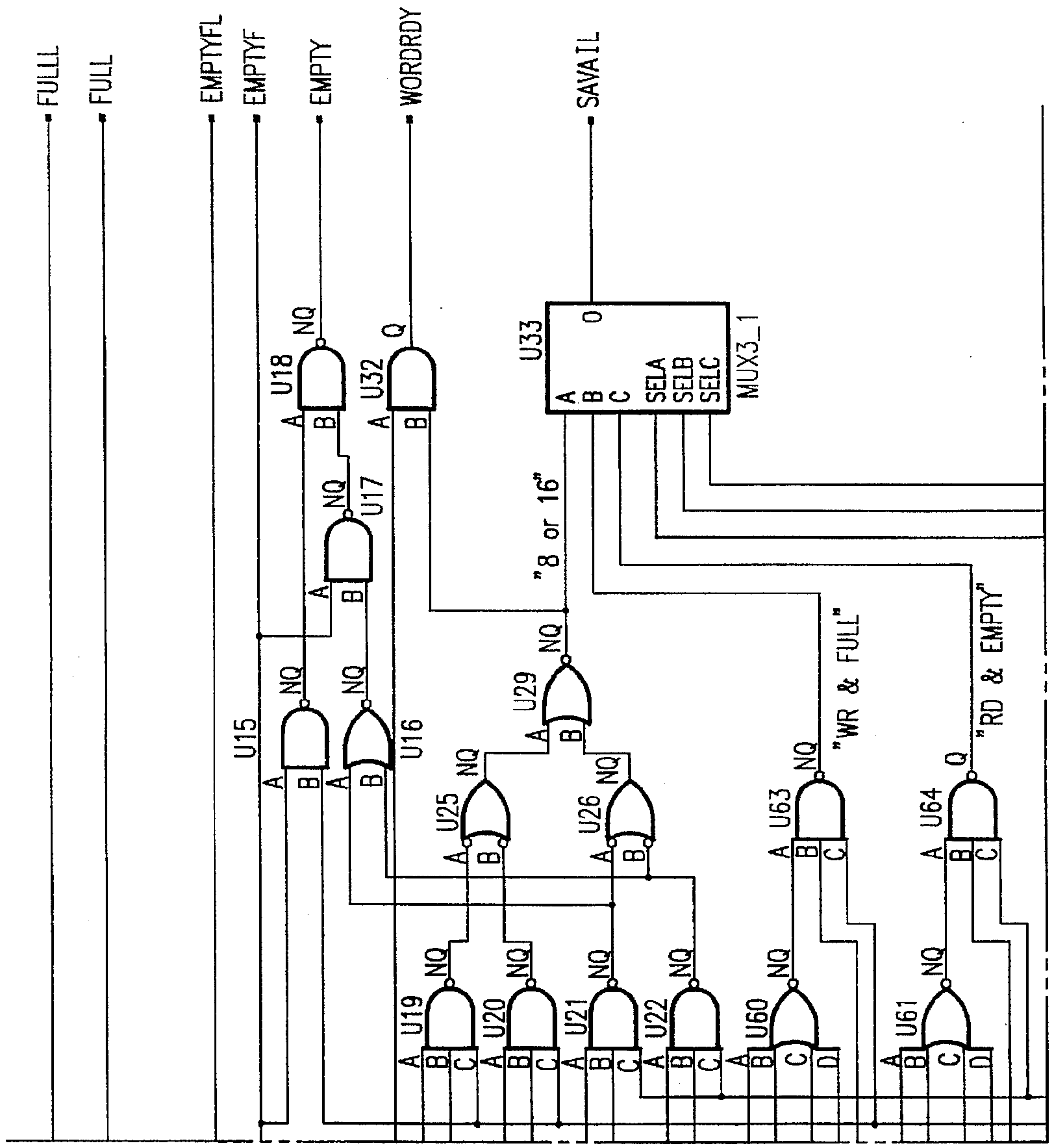
Figure 90D:
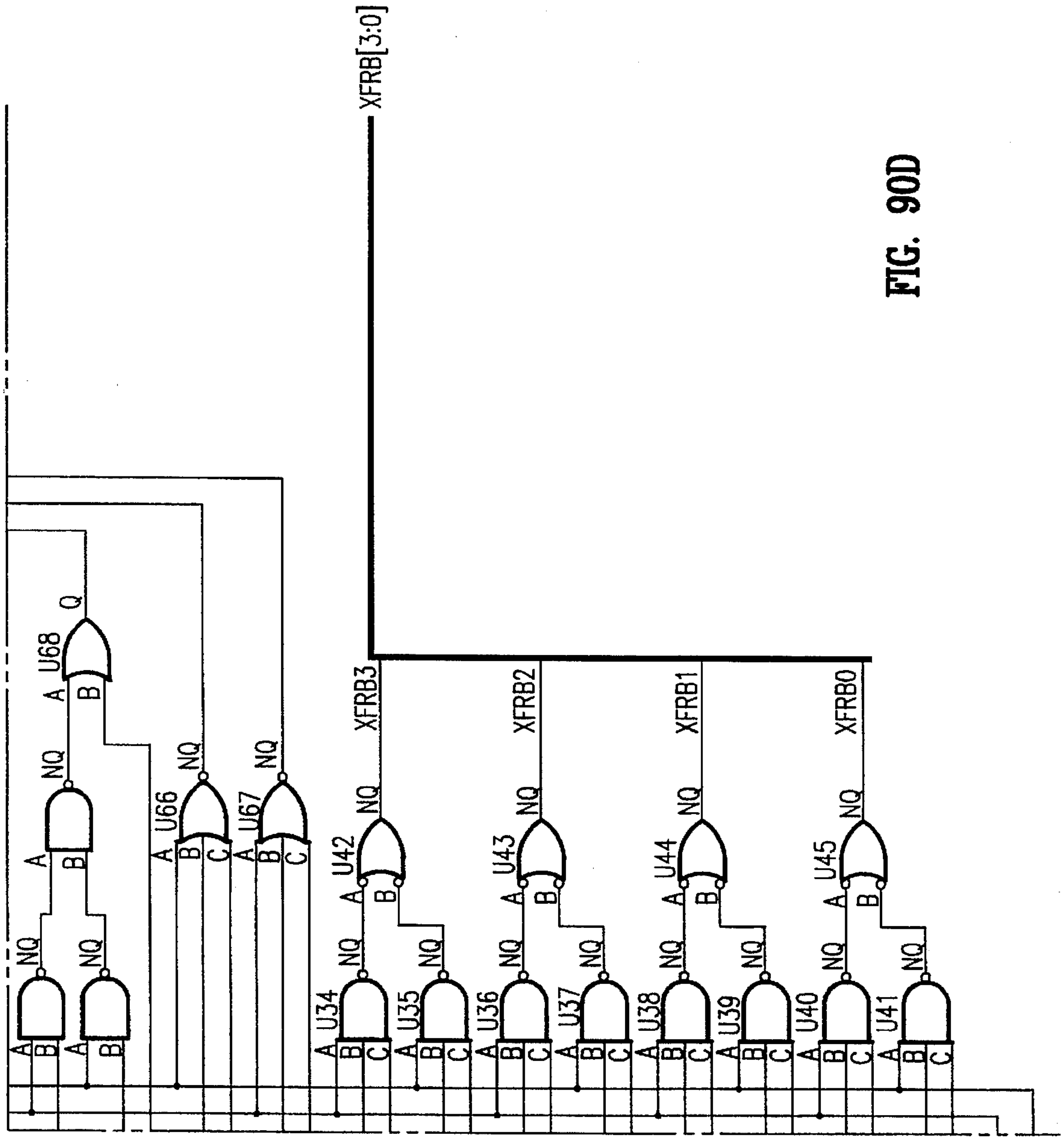
Figure 91A:
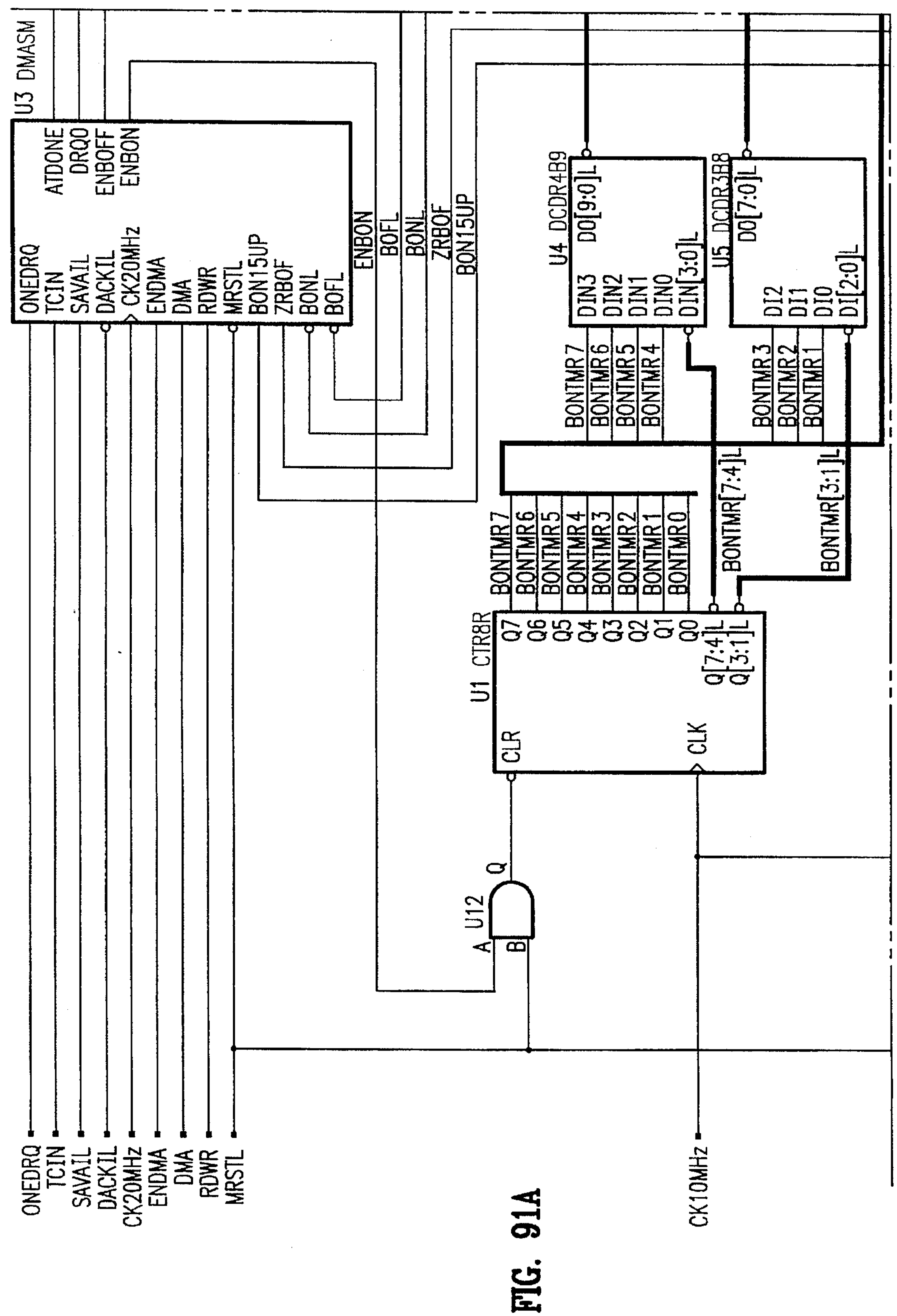
FIGS. 91A, 91B, 91c and 91D illustrate DMA control circuit DMACTRL of FIG. 56C that includes circuits DMASM, CTR8R, DCDR4B9, DCDR3B8, DCDR4B16, and BOTDCDR.
Figure 91B:
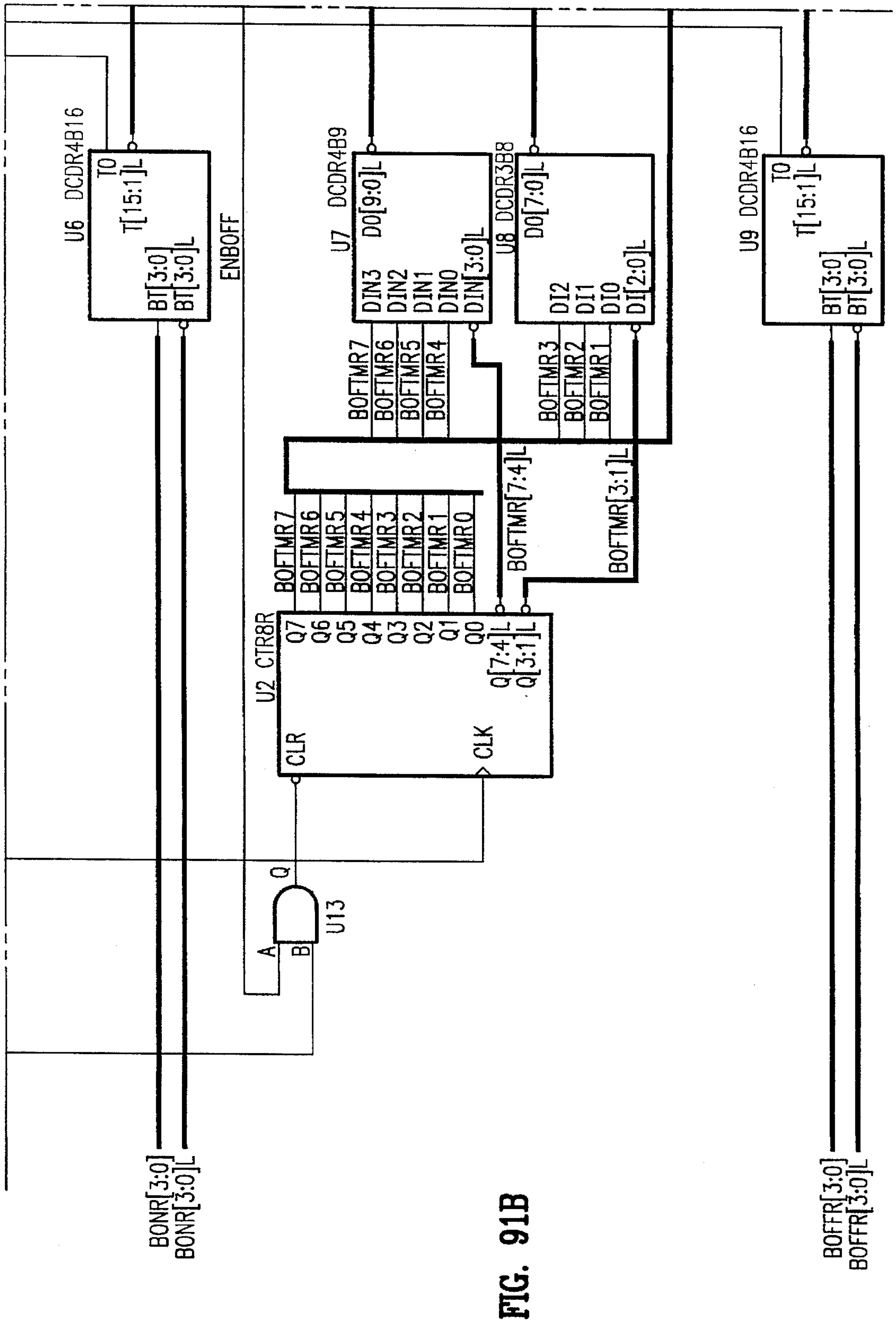
Figure 91C:
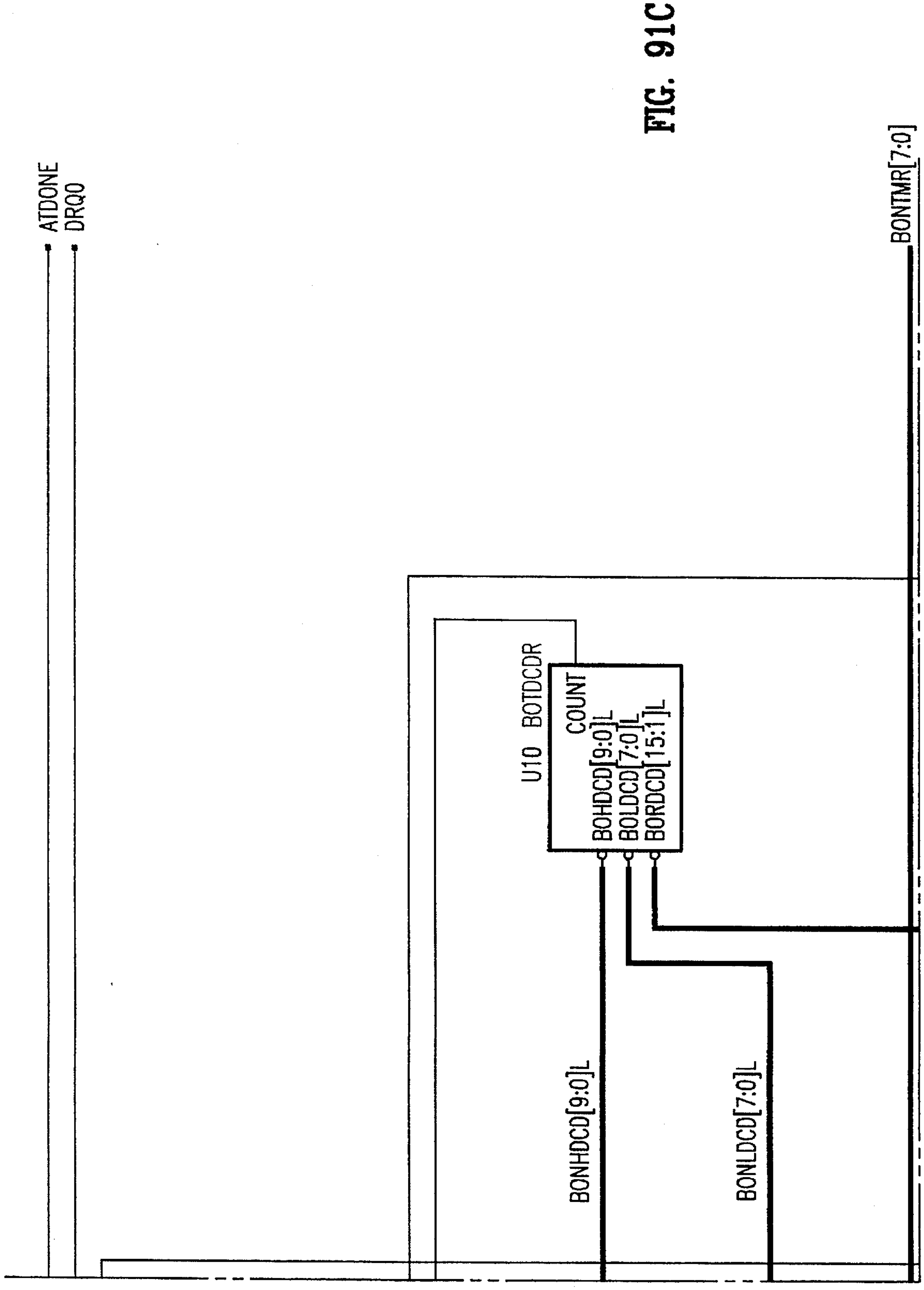
Figure 91D:
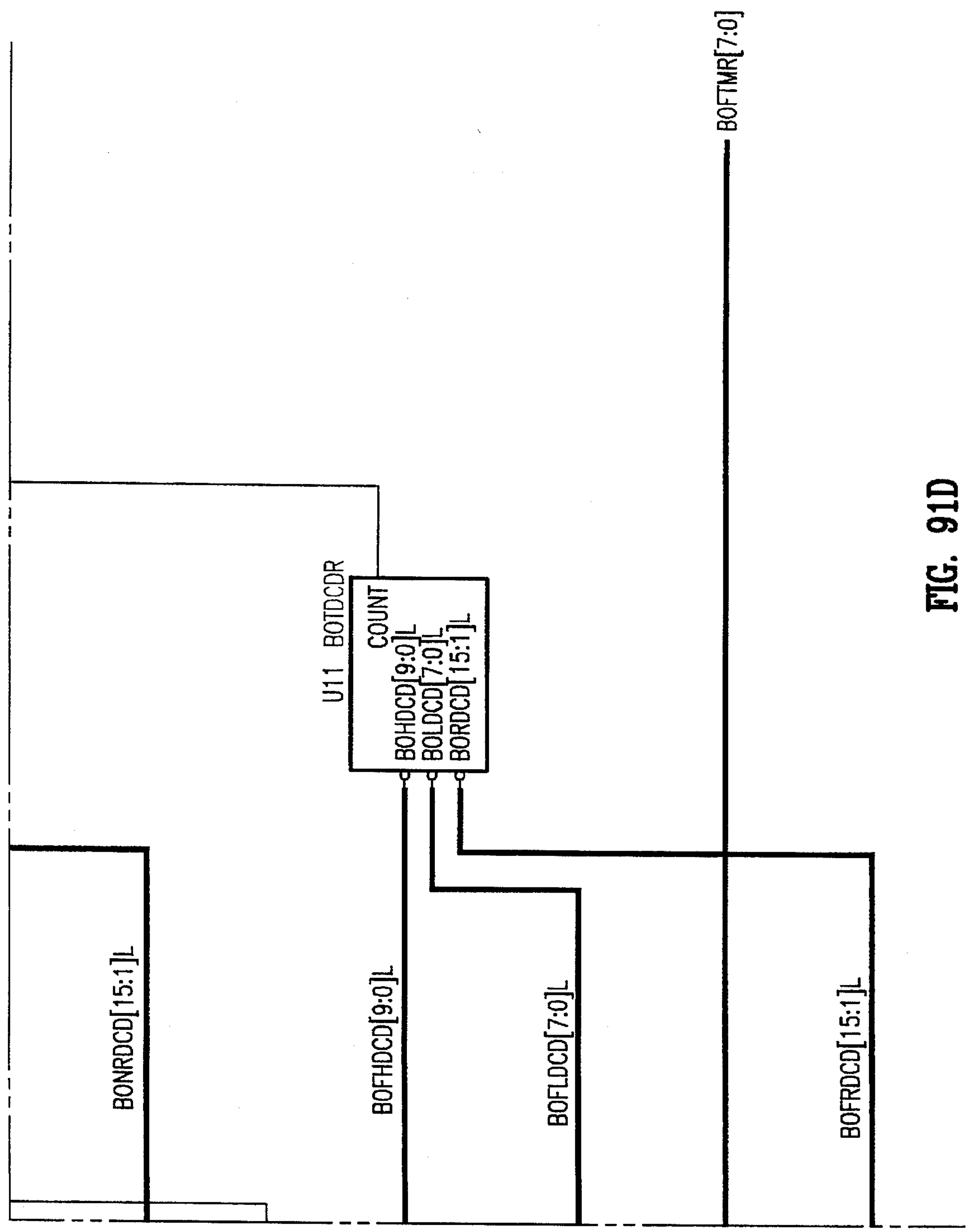
Figure 92A:
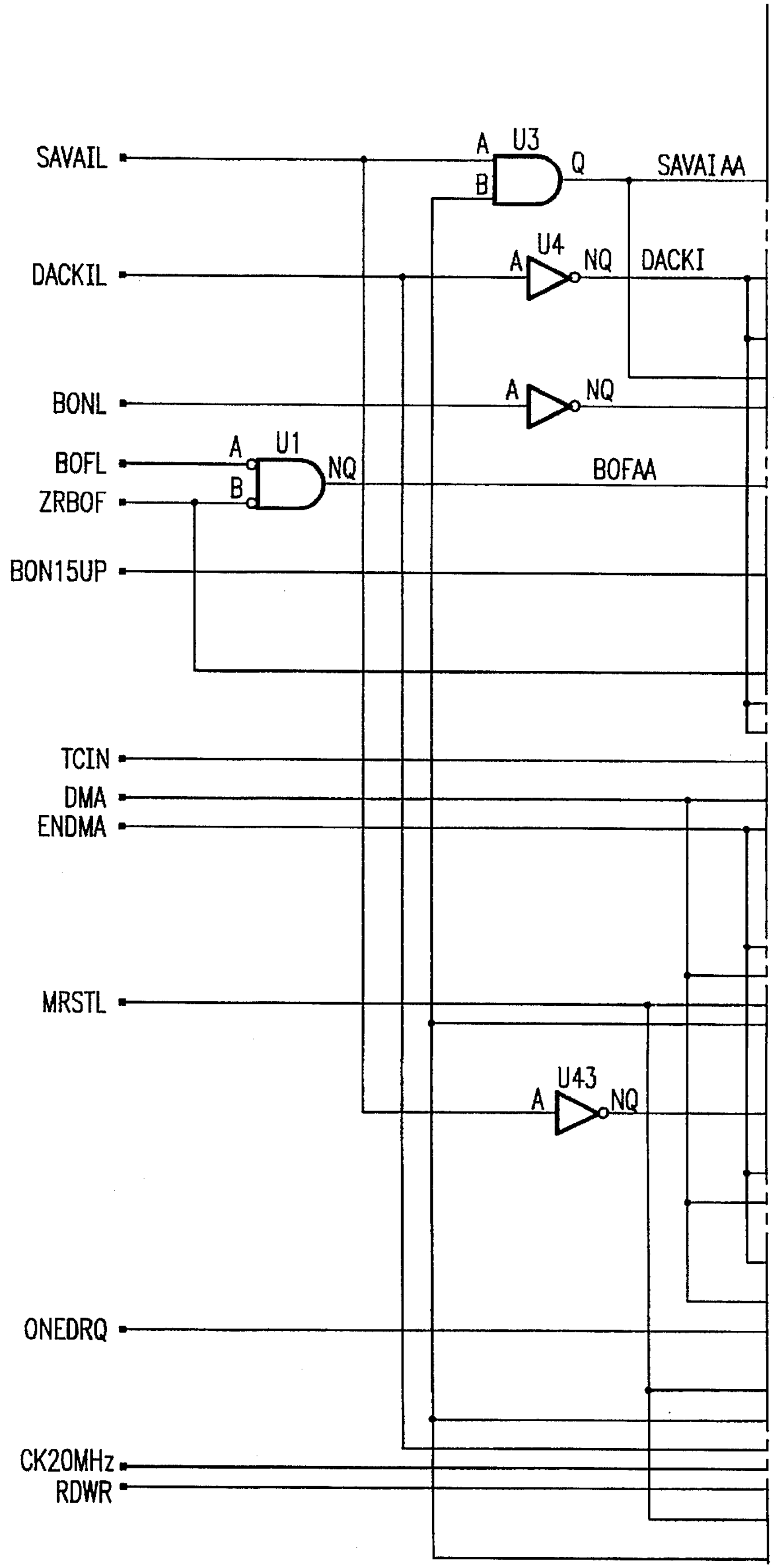
FIGS. 92A, 92B and 92C illustrate circuit DMASM.
Figure 92B:
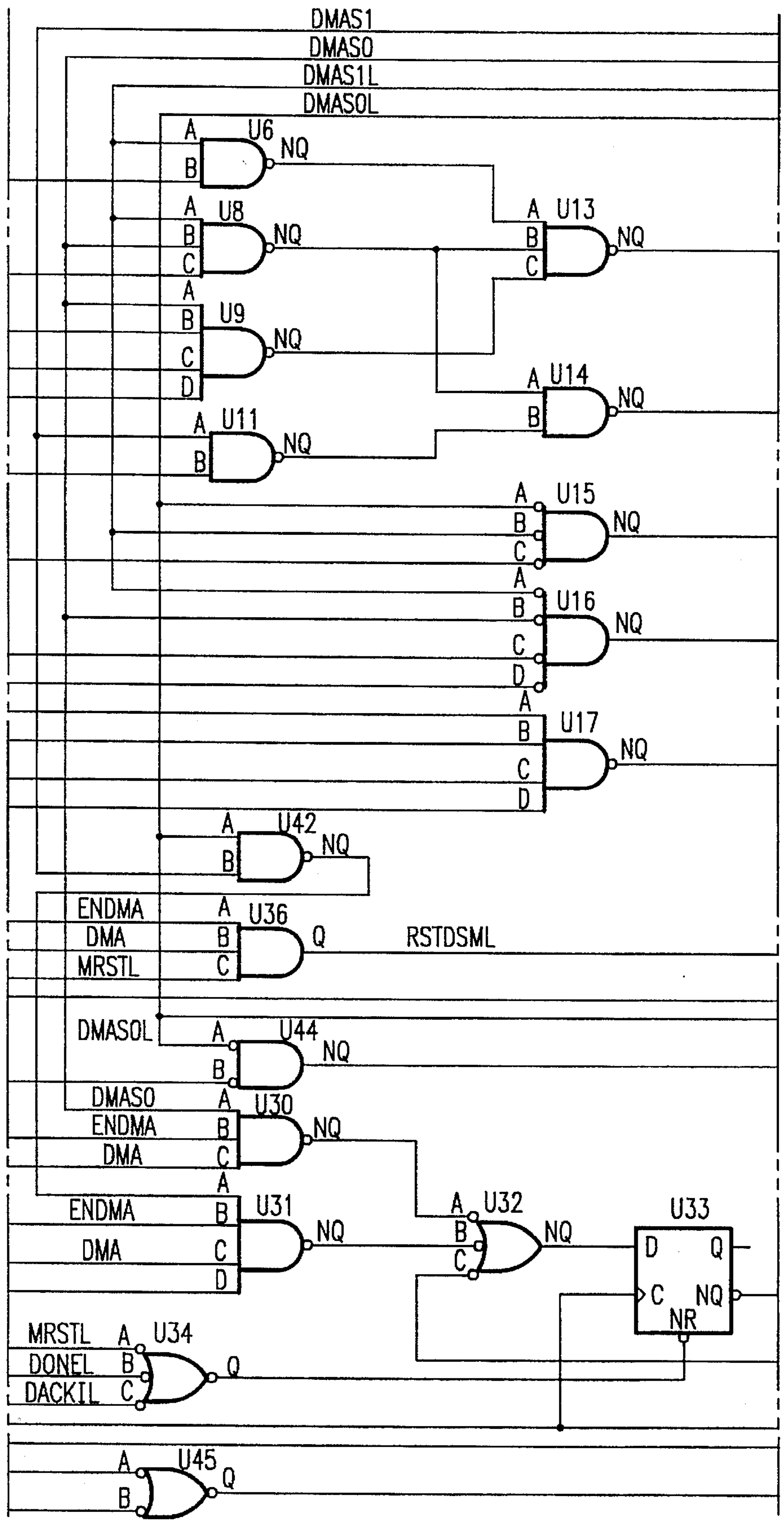
Figure 92C:
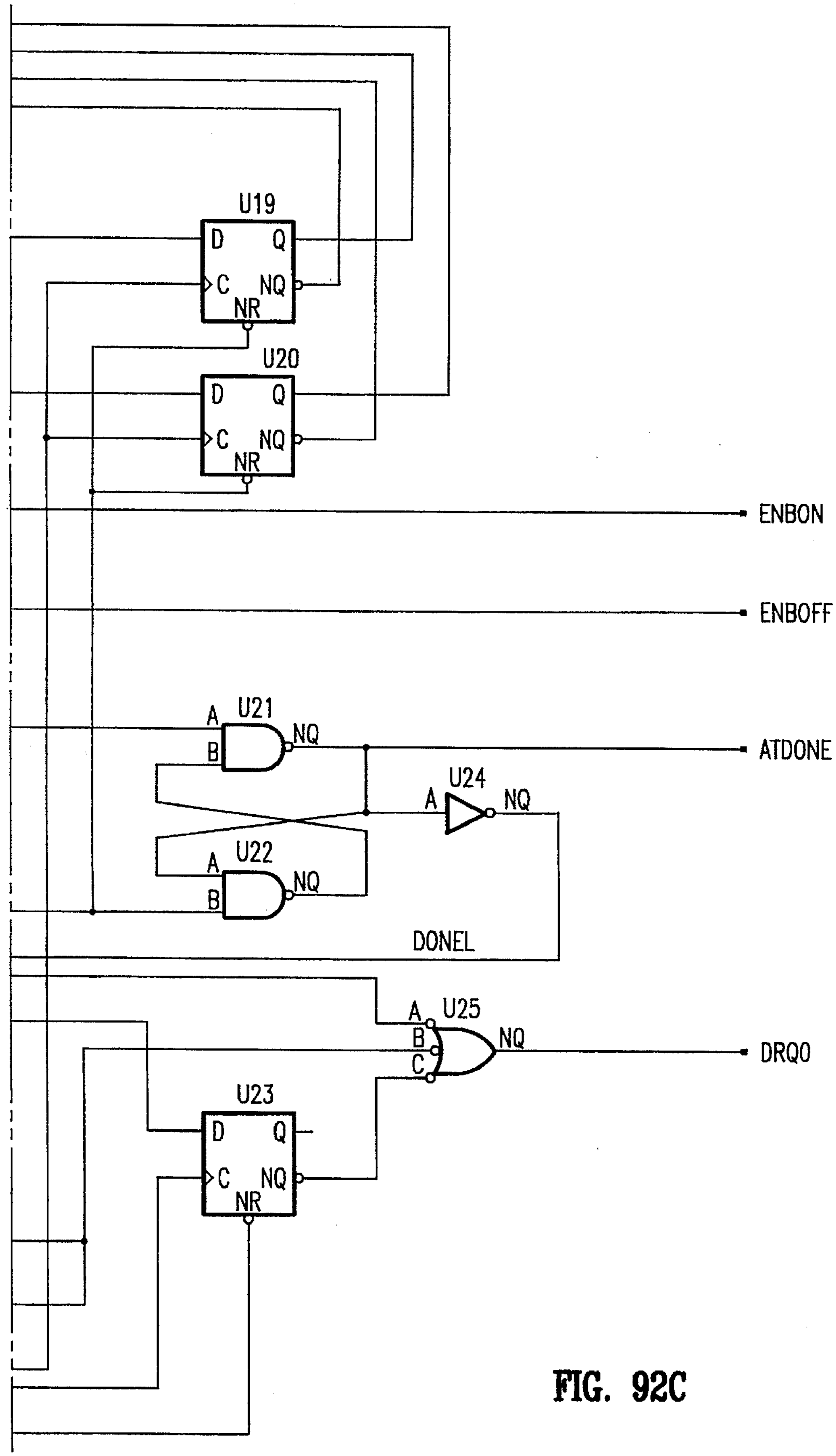
Figure 93B:
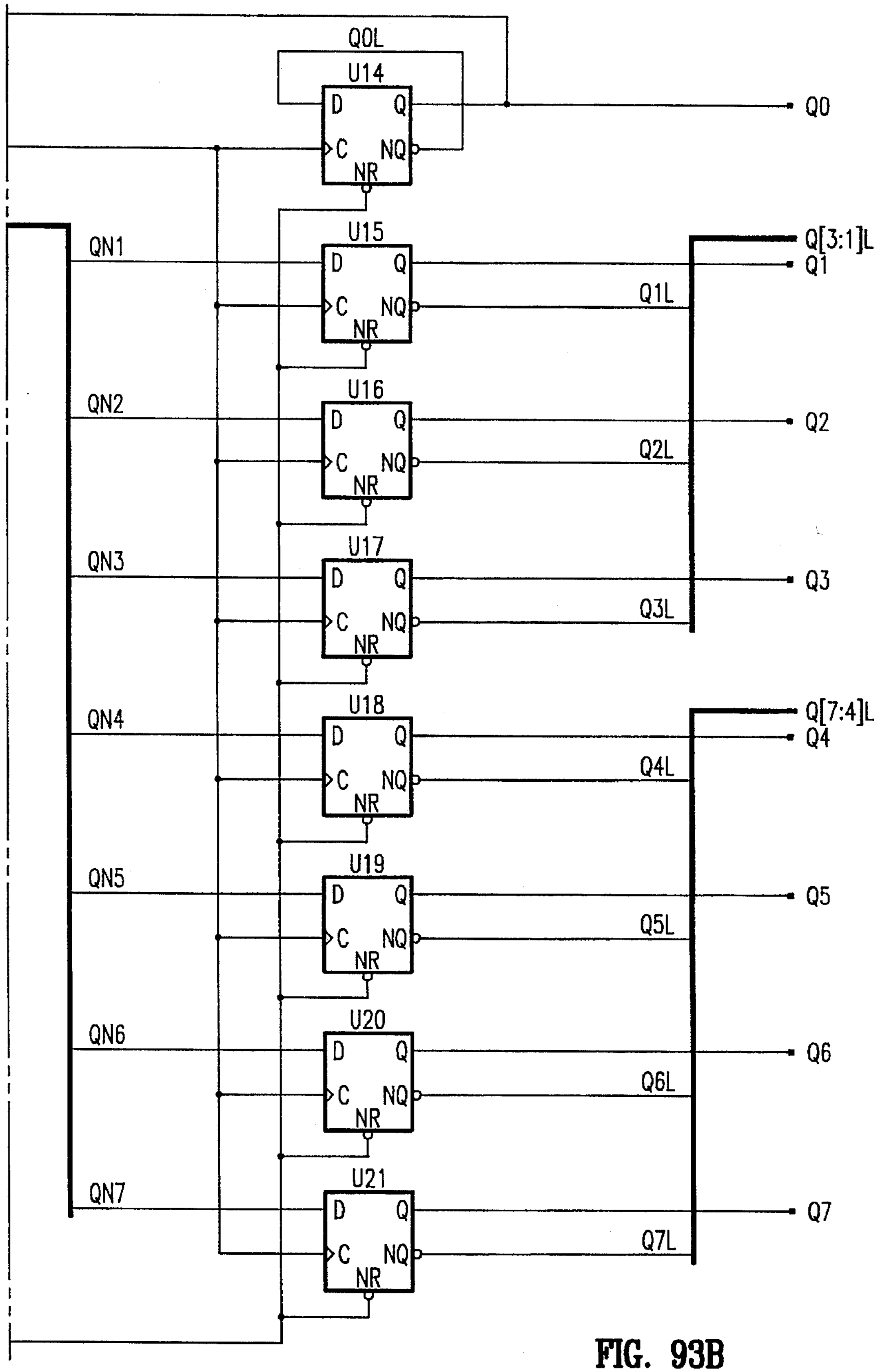
Figure 94:
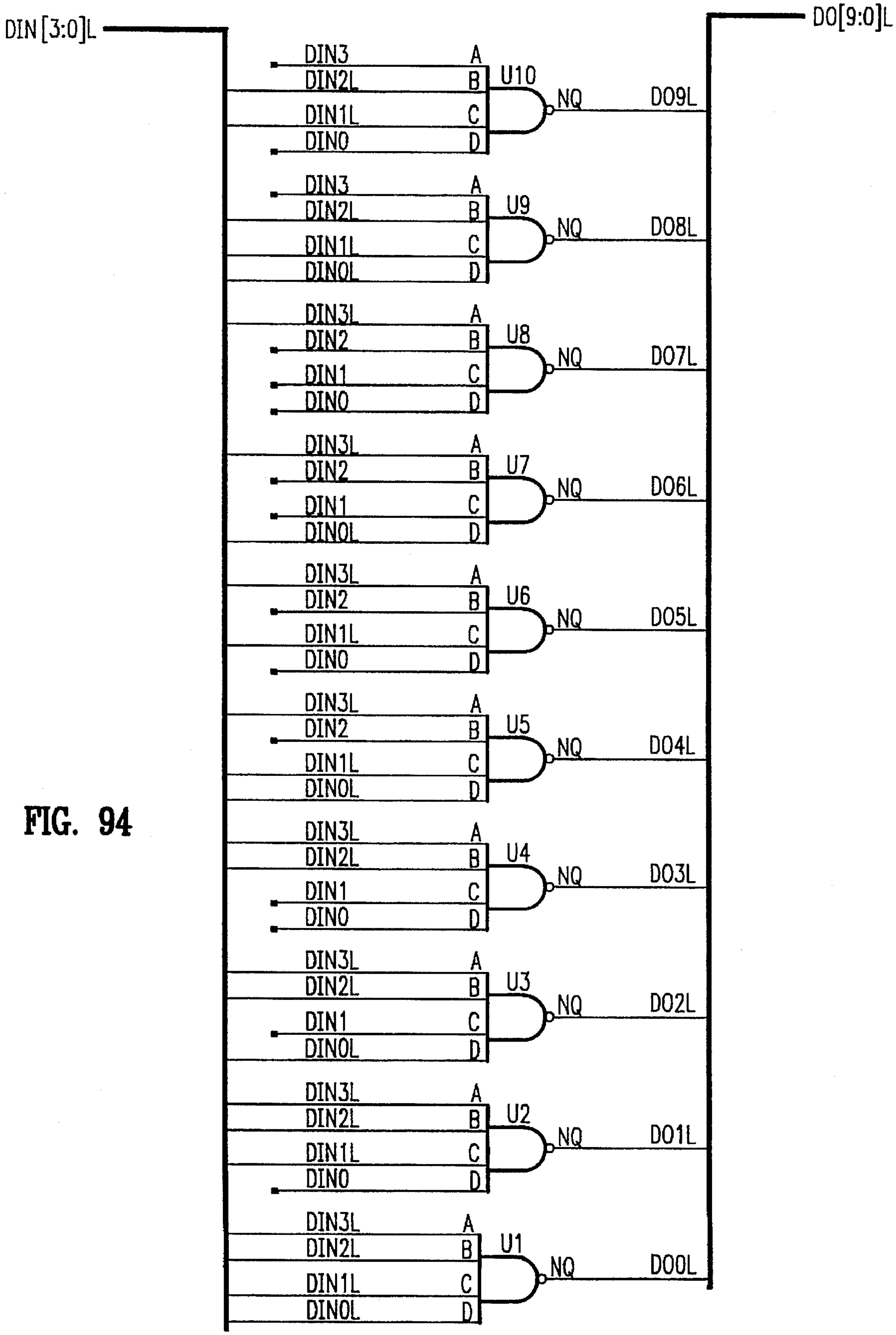
FIG. 94 illustrates a 4 to 10 decoder circuit DCDR4B9.

Circuit UDCTR6R (FIG. 72B) is illustrated in more detail in FIGS. 83A through 83D and FIGS. 84A and 84B. Circuit UDCTR6R is a six bit up/down counter. FIGS. 85A, 85B, 86A and 86B illustrate circuit RAMF2 (FIG. 72B). Circuit RAMF2 is the FIFO RAM module. In another embodiment, not shown, circuit RAMF2 is a 128×8 RAM module. Circuit FFCNT (FIG. 72B), the FIFO count circuit, is illustrated in FIGS. 87A and 87B and generates bits 0 through 5 which are stored in register FIFOSTAT. FIG. 88 illustrates circuit FIFO2CMP (FIG. 72B). Circuit DTSM1 (FIG. 72C) is illustrated in FIG. 89. Register FIFOSTAT is illustrated in FIGS. 90A through 90D.

Circuit DMACTRL (FIG. 56C), the DMA control circuit, is illustrated in more detail in FIGS. 91A through 91D. Circuit DMACTRL includes circuits DMASM, CTR8R, DCDR4B9, DCDR3B8, DCDR4B16, as well as circuit BOTDCDR. FIGS. 92A, 92B, and 92C, FIGS. 93A and 93B, FIG. 94, FIG. 95, FIGS. 96A and 96B, and FIGS. 97A and 97B illustrate circuits DMASM, CTR8R, DCDR4B9, DCDR3B8, DCDR4B16, and BOTDCDR, respectively. Circuit CTR8R is an 8 bit counter. Circuit DCDR4B9 is a 4 to 10 decoder and circuit DCDR3B8 is a 3 to 8 decoder. Circuit BOTDCDR is the bus timer. Thus, FIGS. 56A through 97B complete circuit SPDMA of FIG. 47A.

Circuit SCSI (FIG. 47C) is further defined by FIGS. 98A, 98B, and 98C, FIGS. 113A and 113B, FIGS. 127A and 127B, FIG. 133, FIGS. 136A, 136B and 136C, FIGS. 145A, 145B and 145C, and FIGS. 157A and 157B. Each of the circuits in these figures are considered in turn.

Figure 98A:
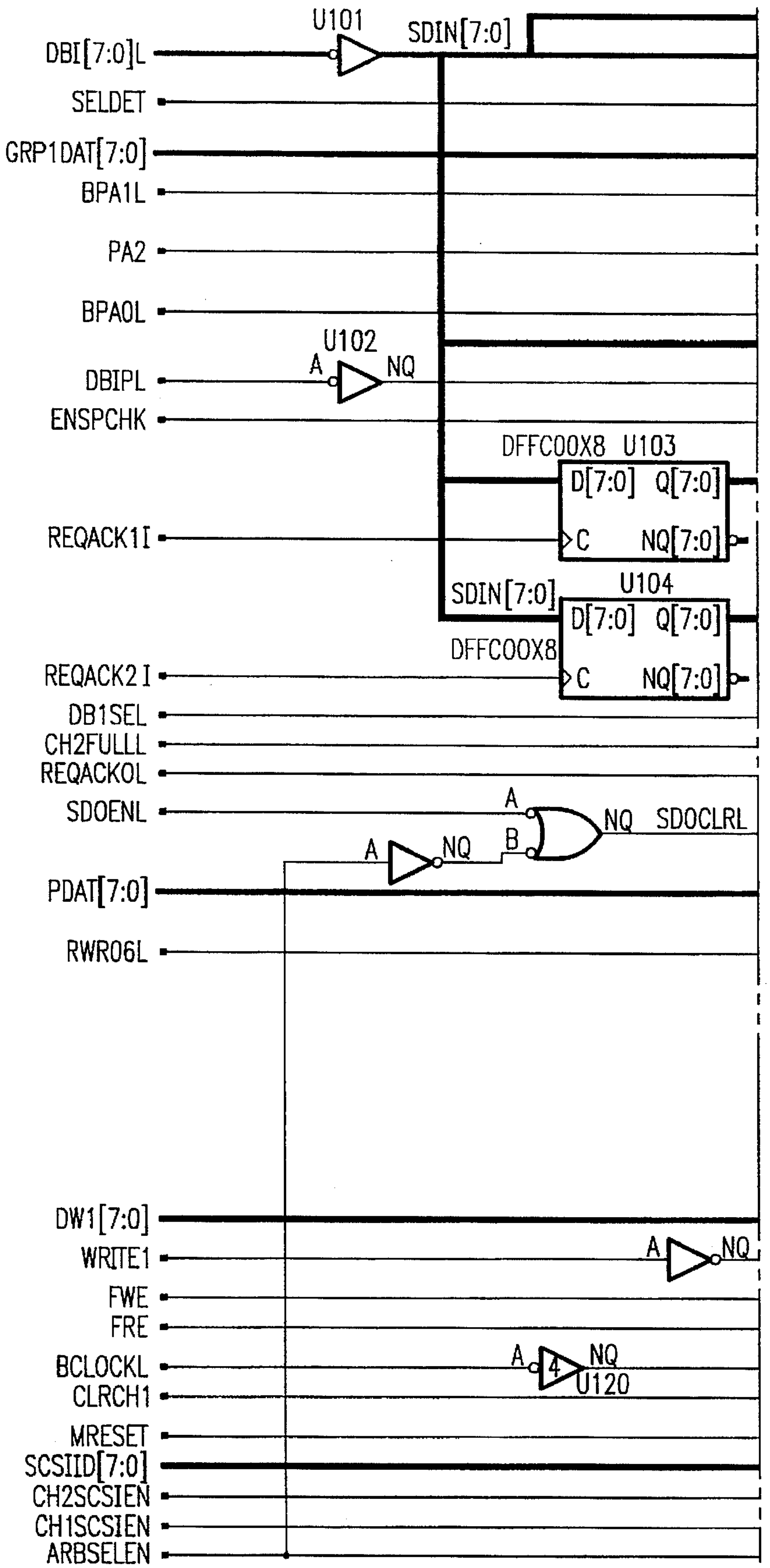
FIGS. 98A, 98B and 98C illustrates circuit SCSI that includes circuits DFFC00X8, PARCHECK, MUX21X8, MUX41X8, DLG00X8, SCSIFIFO, ODDPAR, NDLGORX8, and MUX41EX8.
Figure 98B:
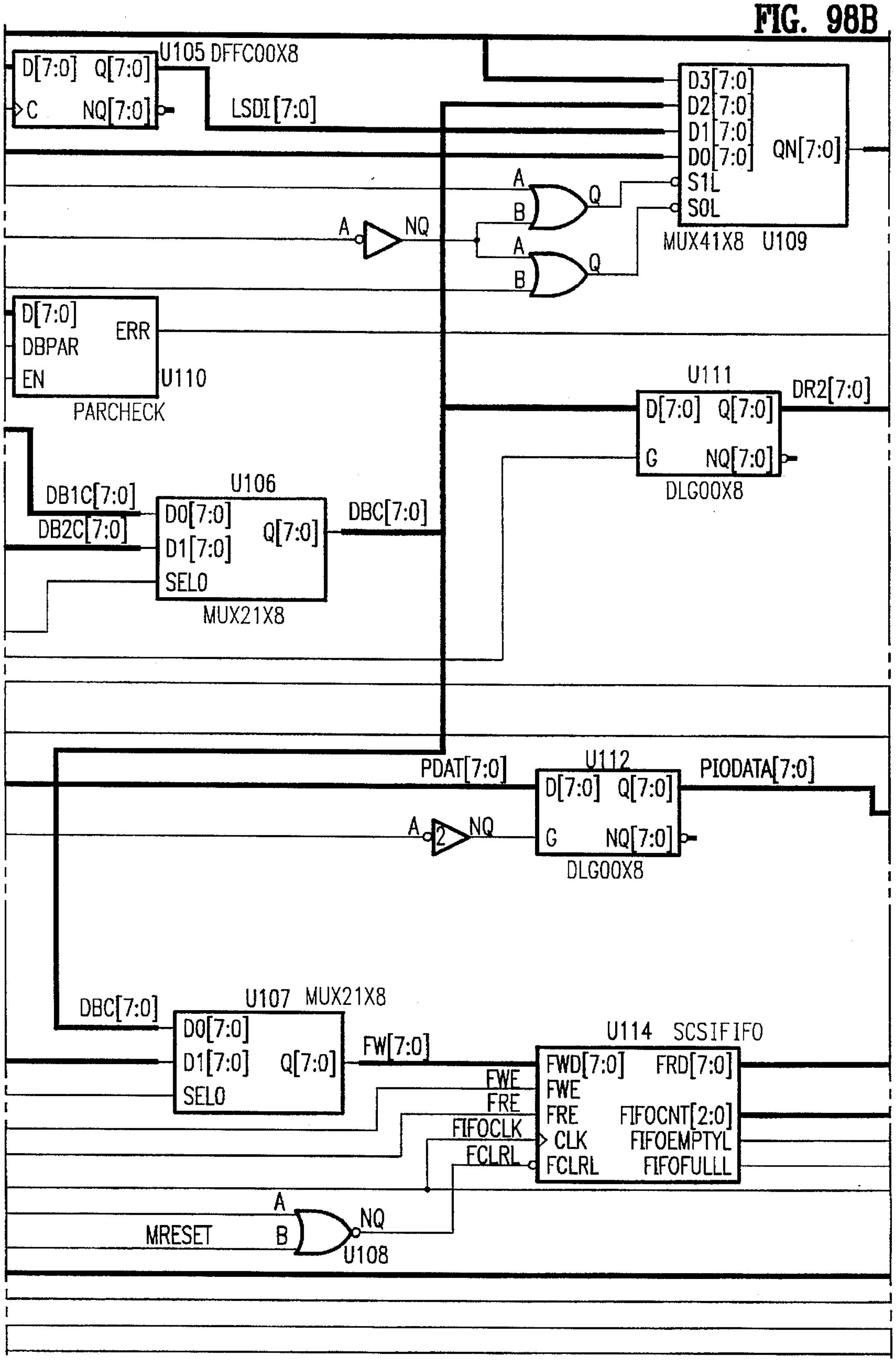
Figure 98C:
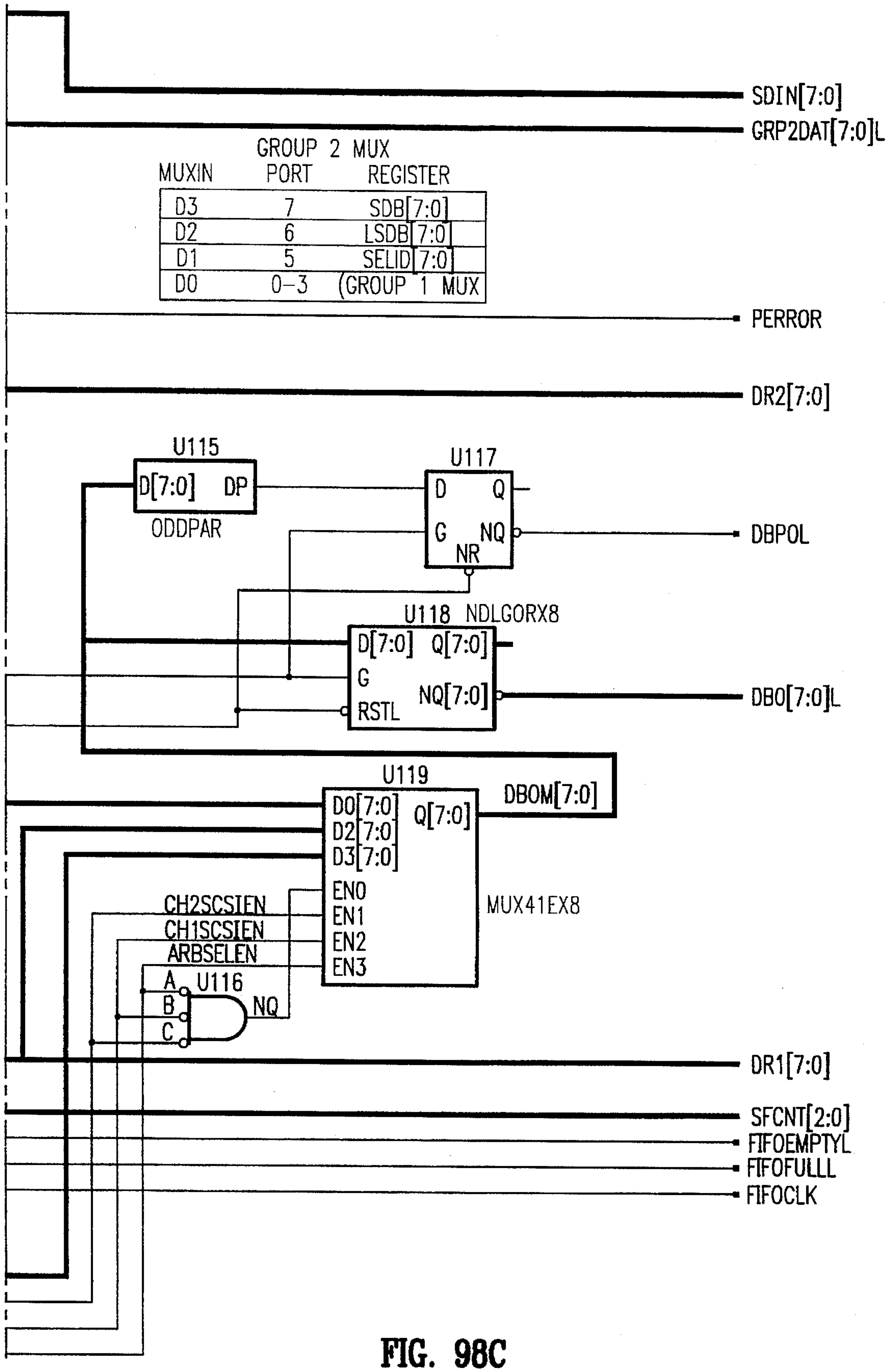
Figure 99:
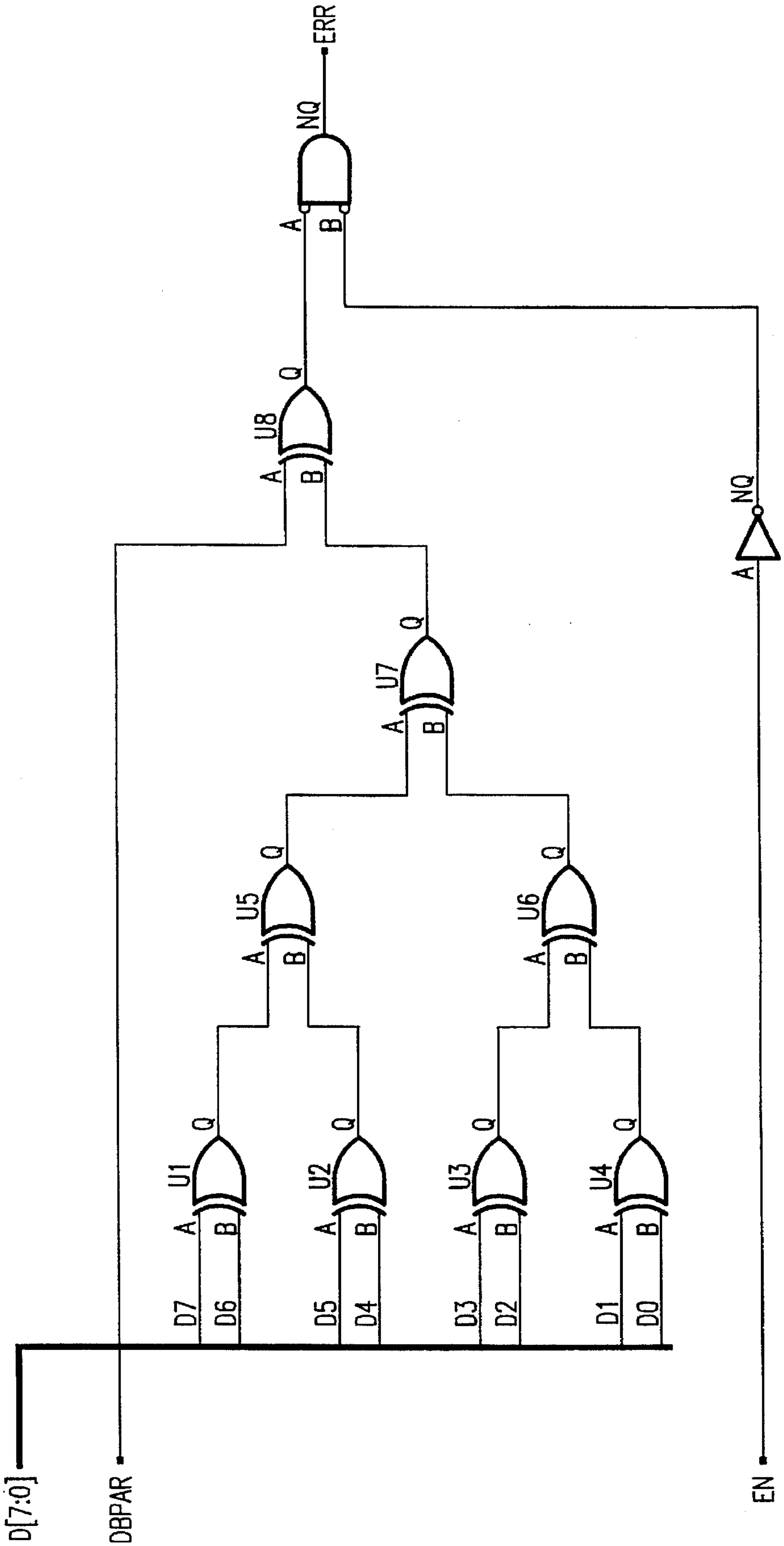
FIG. 99 illustrates parity check logic circuit PARCHECK.
Figure 100:
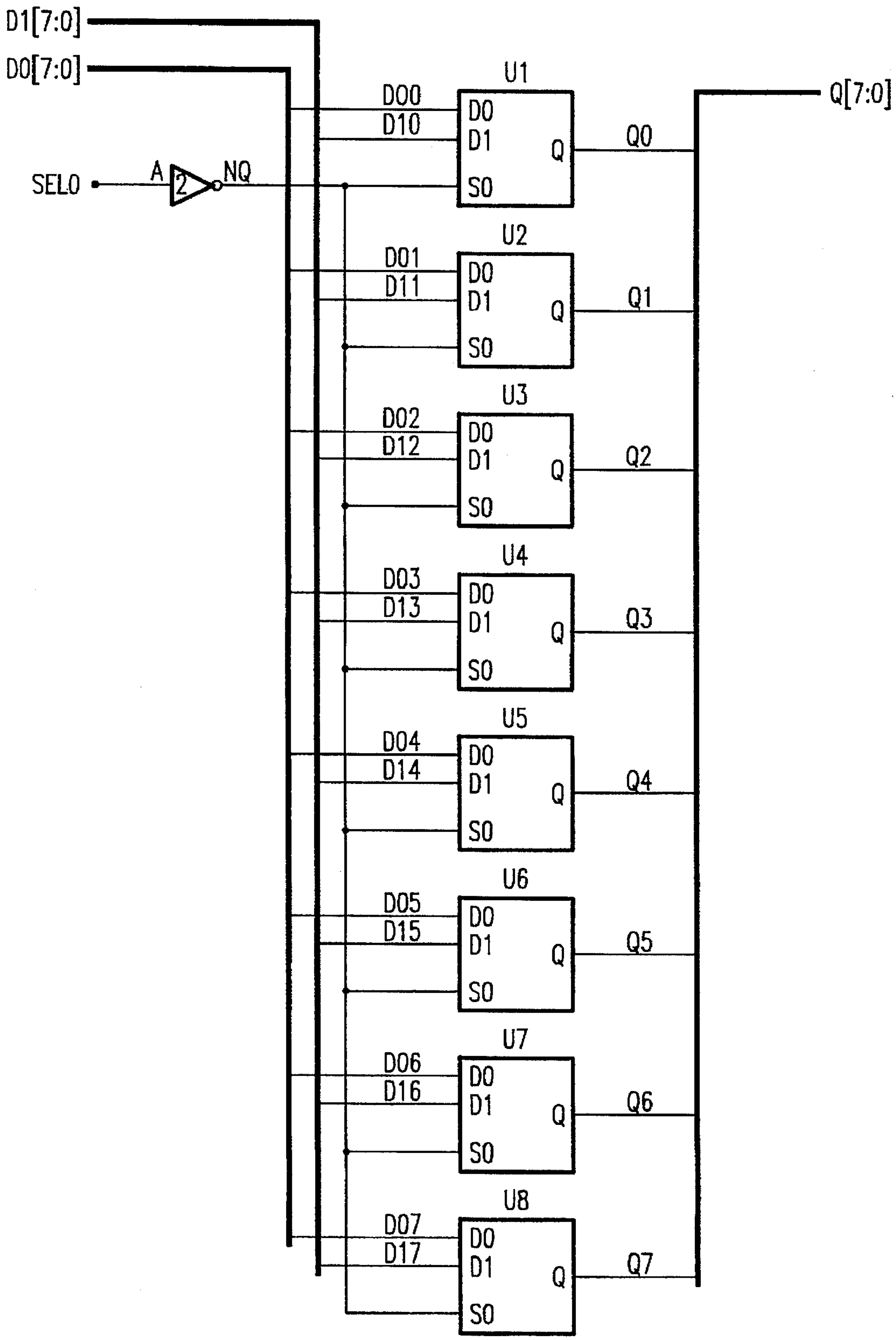
FIG. 100 illustrates circuit MUX21X8, which is comprised of eight MUX21 circuits which are the same as circuits MUX2_1.

As shown in FIGS. 98A, 98B and 98C, circuit SCSI includes circuits DFFC00X8, PARCHECK, MUX21X8, MUX41X8, DLG00X8, SCSIFIFO, ODDPAR, NDLGORX8, and MUX41EX8. Parity check logic circuit, PARCHECK, is shown in more detail in FIG. 99. FIG. 100 illustrates circuit MUX21X8, which is comprised of eight MUX21 circuits which are the same as circuits MUX2_1.

Figure 101:
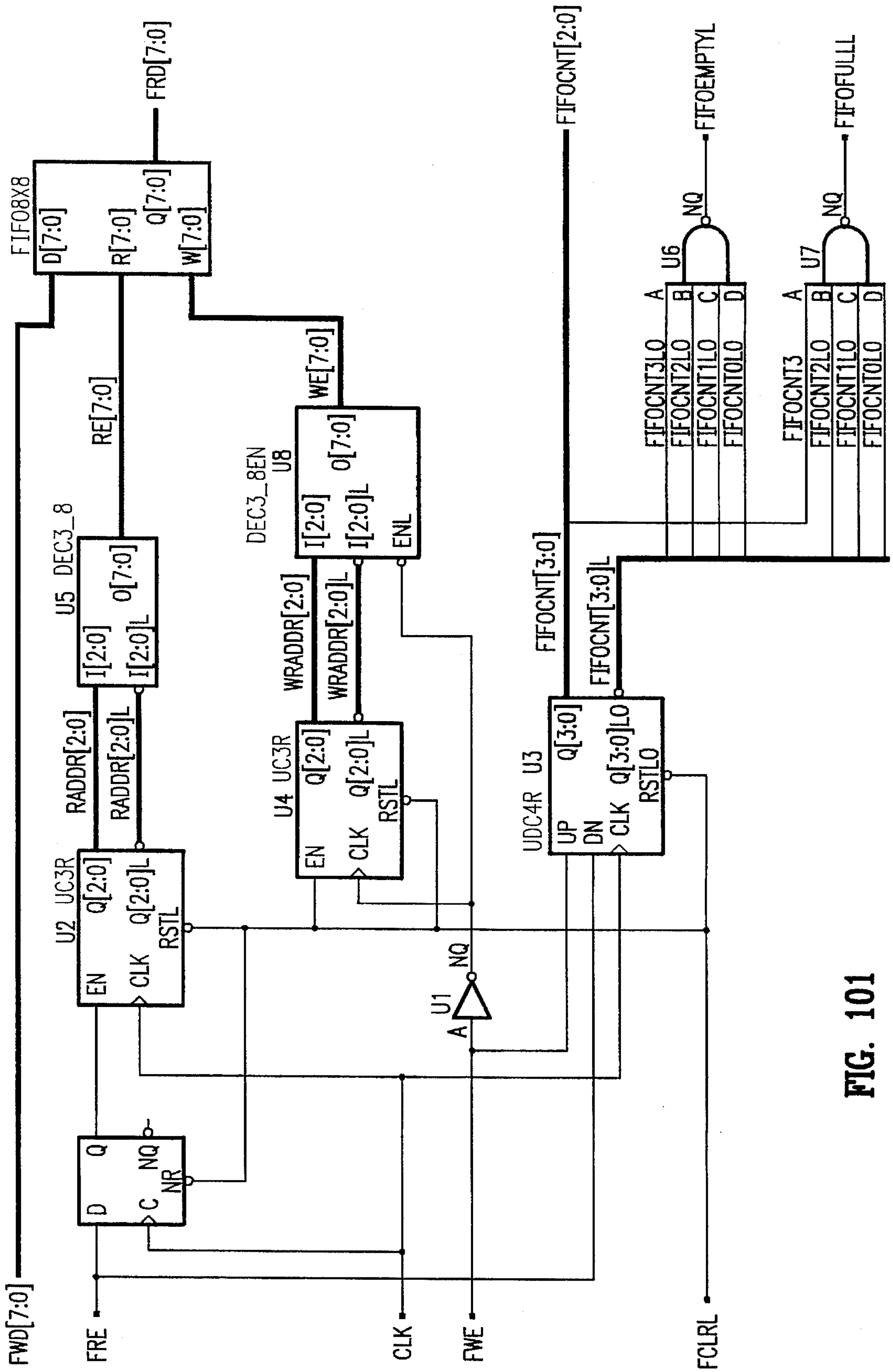
FIG. 101 illustrates circuit SCSIFIFO that includes circuits UC3R, UDC4R, DEC3_8, and DEC3_8EN.
Figure 102:
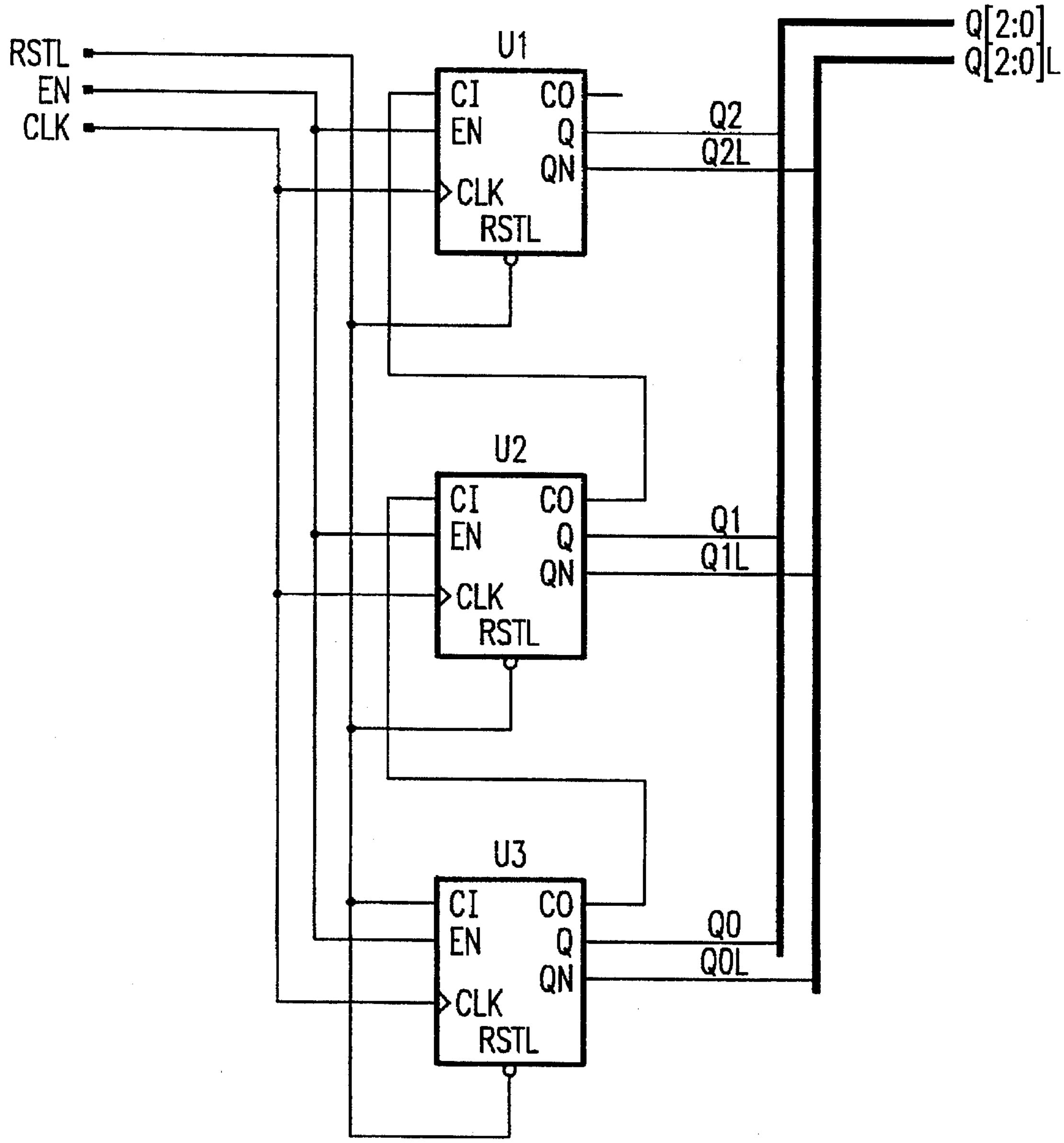
FIG. 102 illustrates a 3-bit up counter UC3R with enable and reset.
Figure 103:
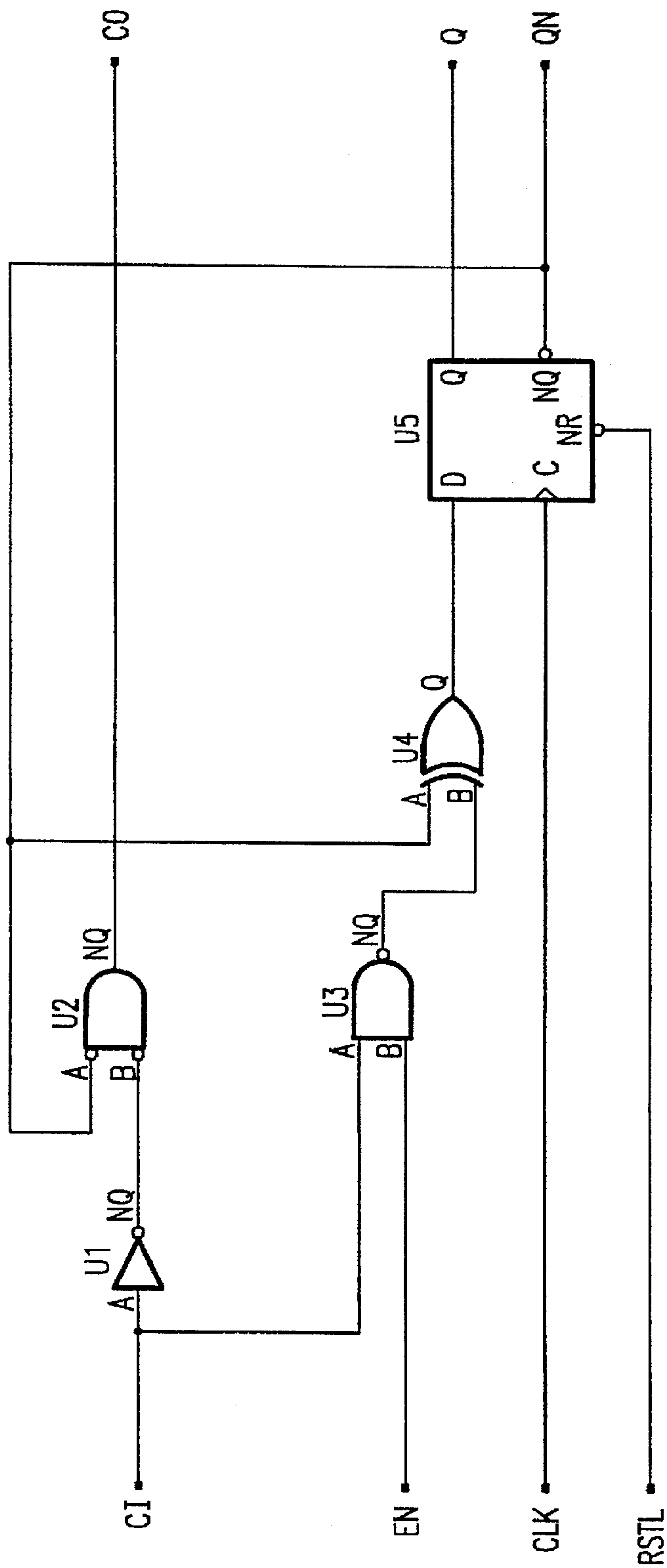
FIG. 103 illustrates a 4-bit up/down counter circuit UBCITR of circuit UC3R.
Figure 104:
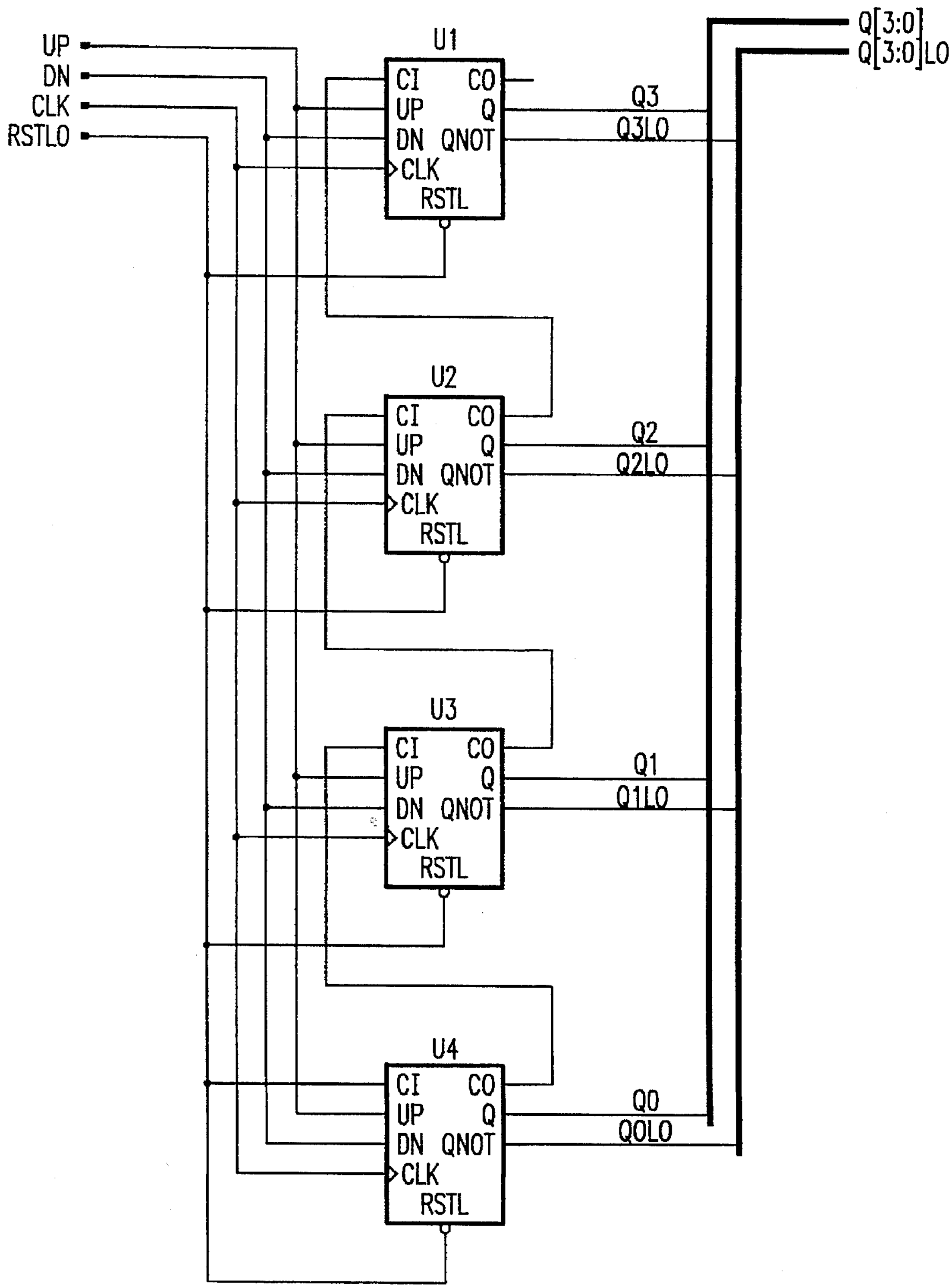
FIG. 104 illustrates circuit UDC4R is with reset.
Figure 105:
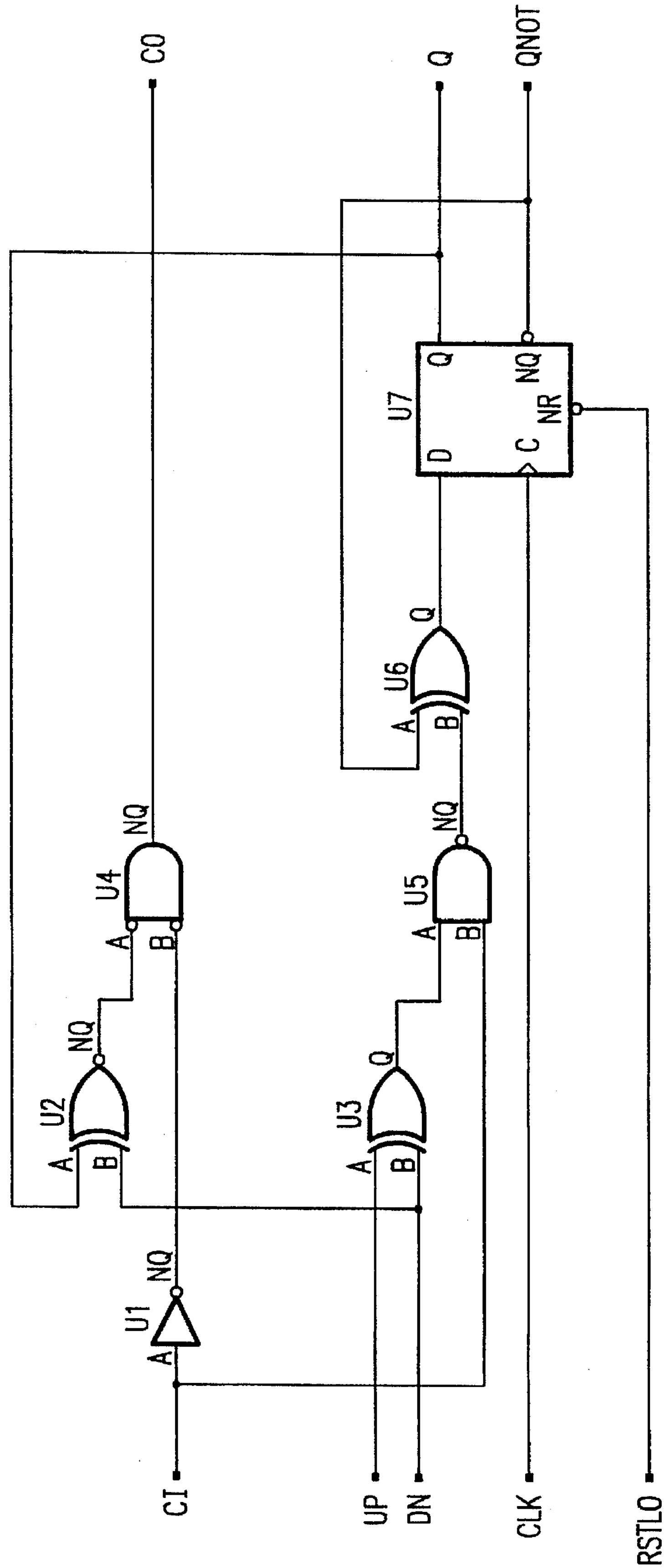
FIG. 105 illustrates an up/down counter bit circuit UDCBITR with reset.
Figure 106:
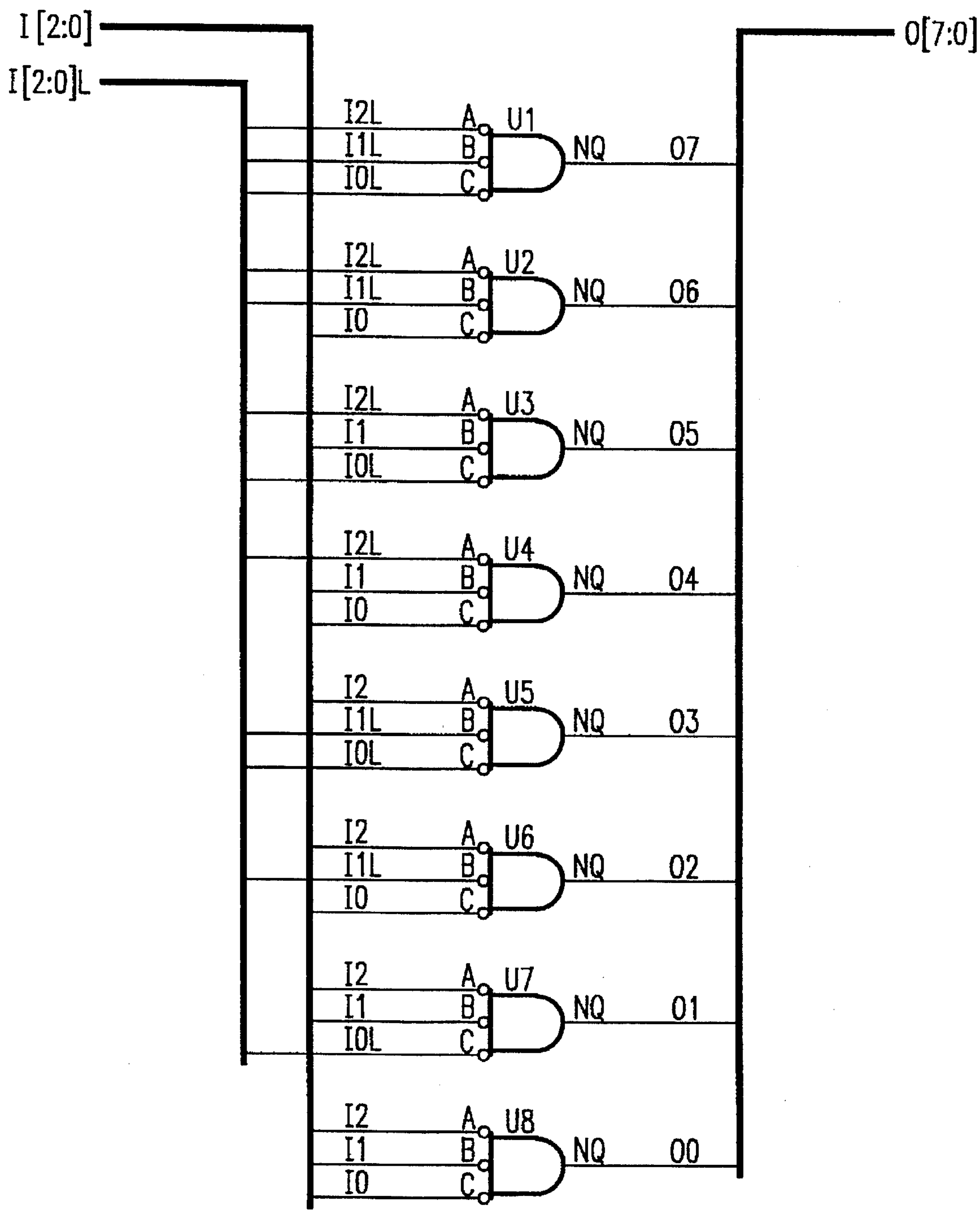
FIG. 106 illustrates three-to-eight decoder circuit DEC3_8.
Figure 107:
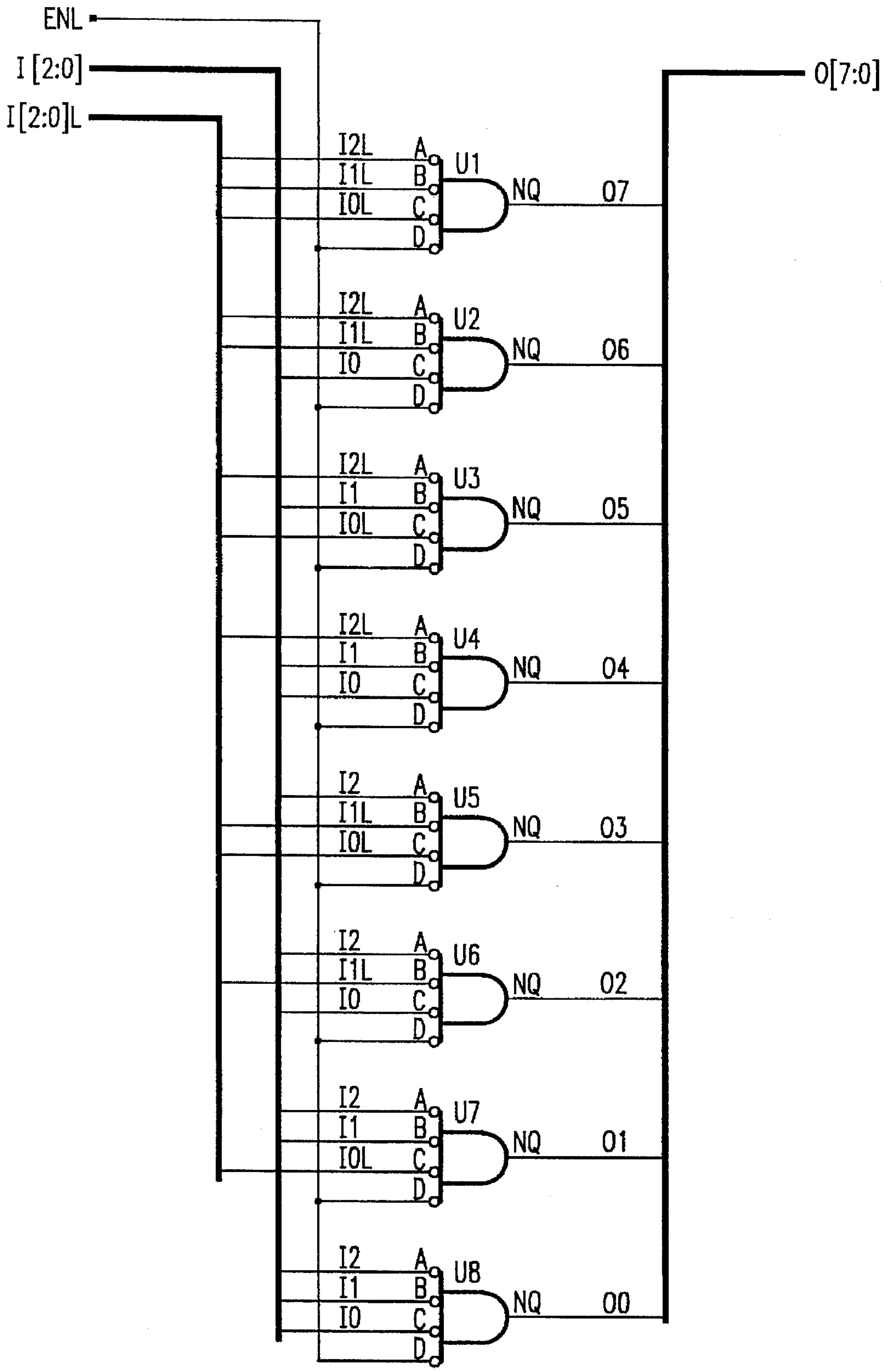
FIG. 107 illustrates a three-to-eight decoder circuit with enable DEC3_8EN.

Circuit SCSIFIFO is illustrated in more detail in FIG. 101 and includes circuits UC3R, UDC4R, DEC3_8, and DEC3_8EN. Circuit UC3R is a 3-bit up counter with enable and reset, as illustrated in FIG. 102. Circuit UCBITR of circuit UC3R is illustrated in FIG. 103. Circuit UDC4R is a 4-bit up/down counter with reset, as illustrated in FIG. 104. Circuit UDCBITR (FIG. 104) is illustrated in more detail in FIG. 105. Circuit UDCBITR is an up/down counter bit with reset. Circuit DEC3_8 is a three-to-eight decoder (FIG. 106) and circuit DEC3_8EN is a three-to-eight decoder with enable (FIG. 107).

Figure 108:
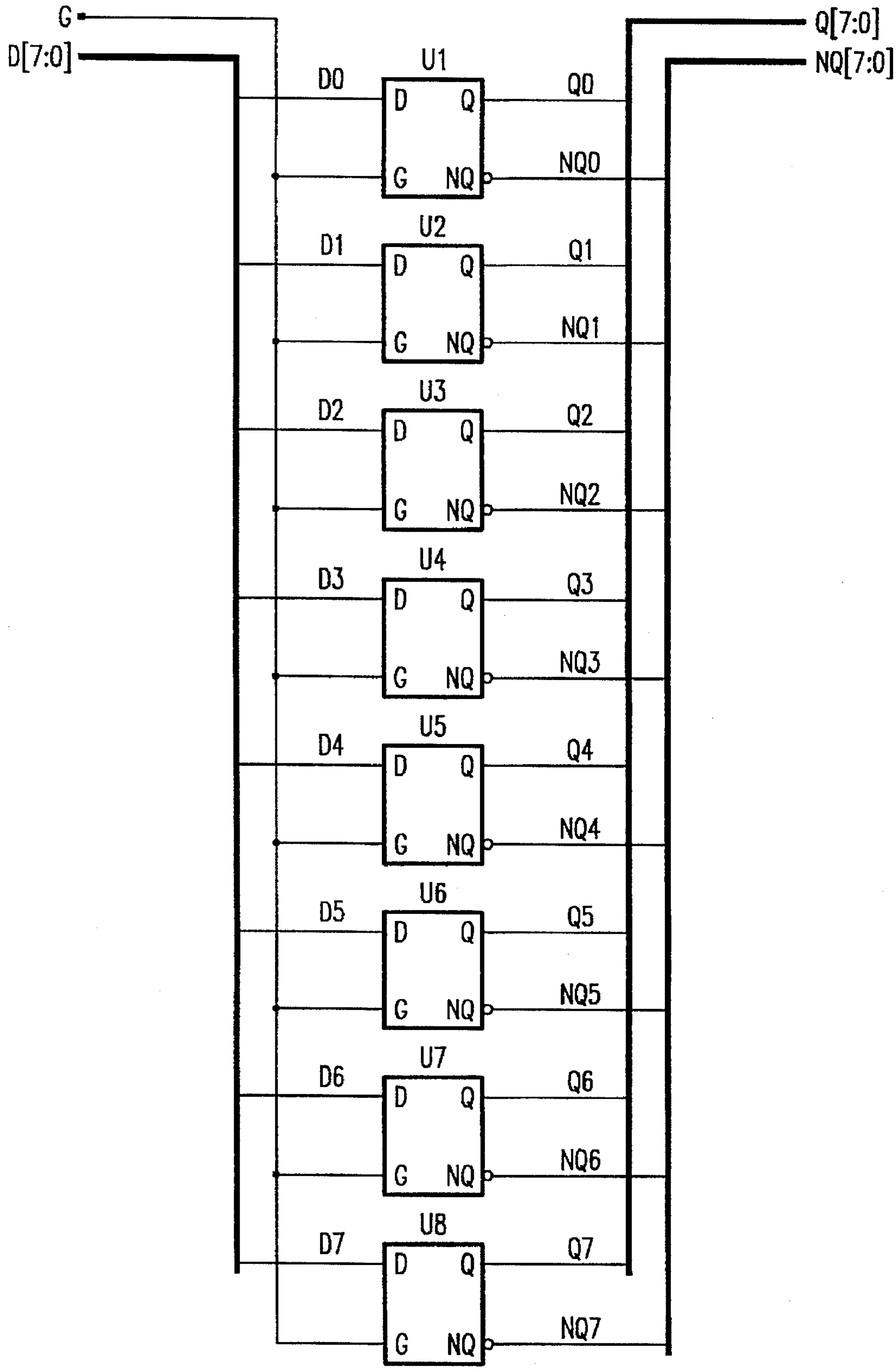
FIG. 108 illustrates an octal latch circuit DLG00X8.
Figure 109:
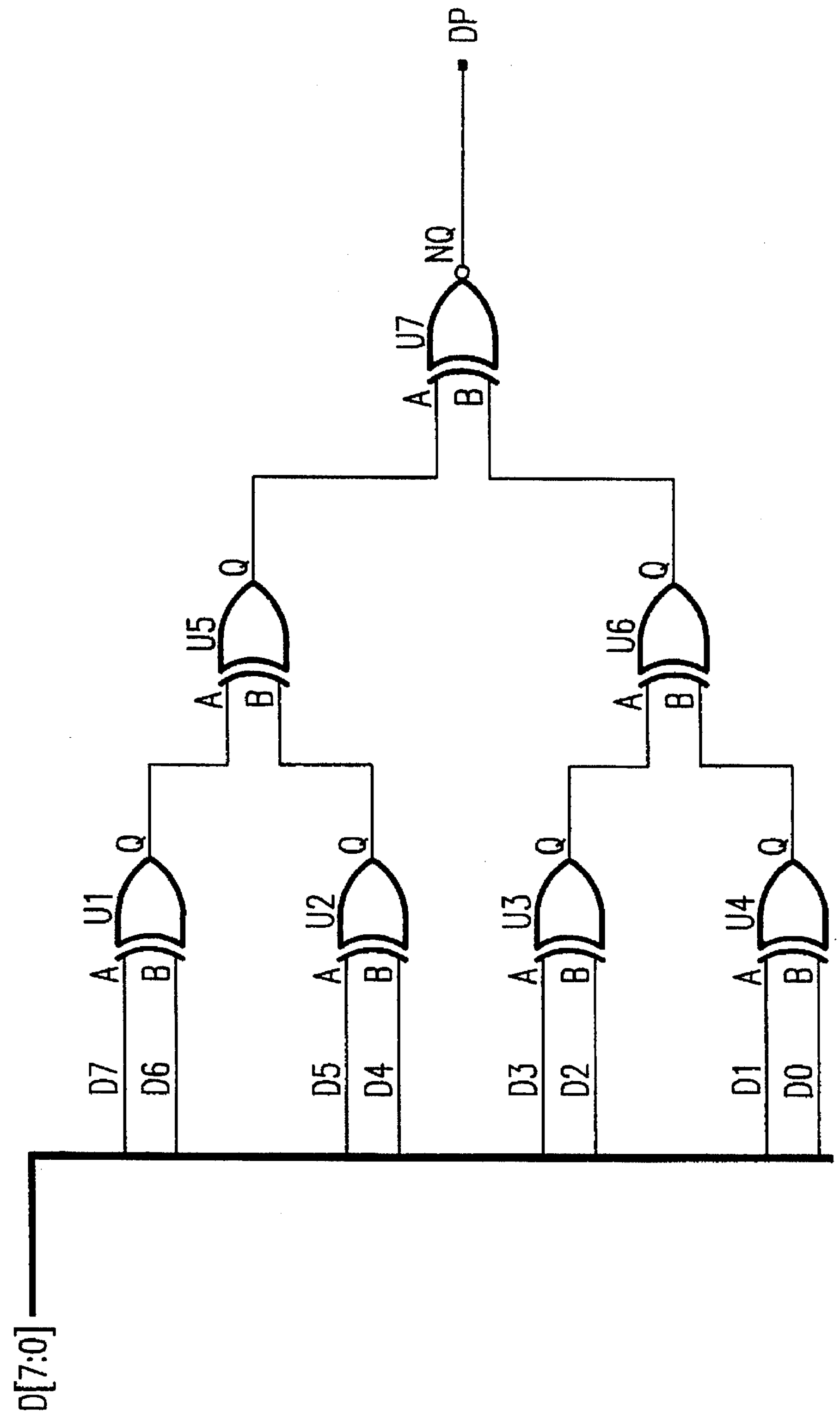
FIG. 109 illustrates an odd parity generator circuit ODDPAR.
Figure 110:
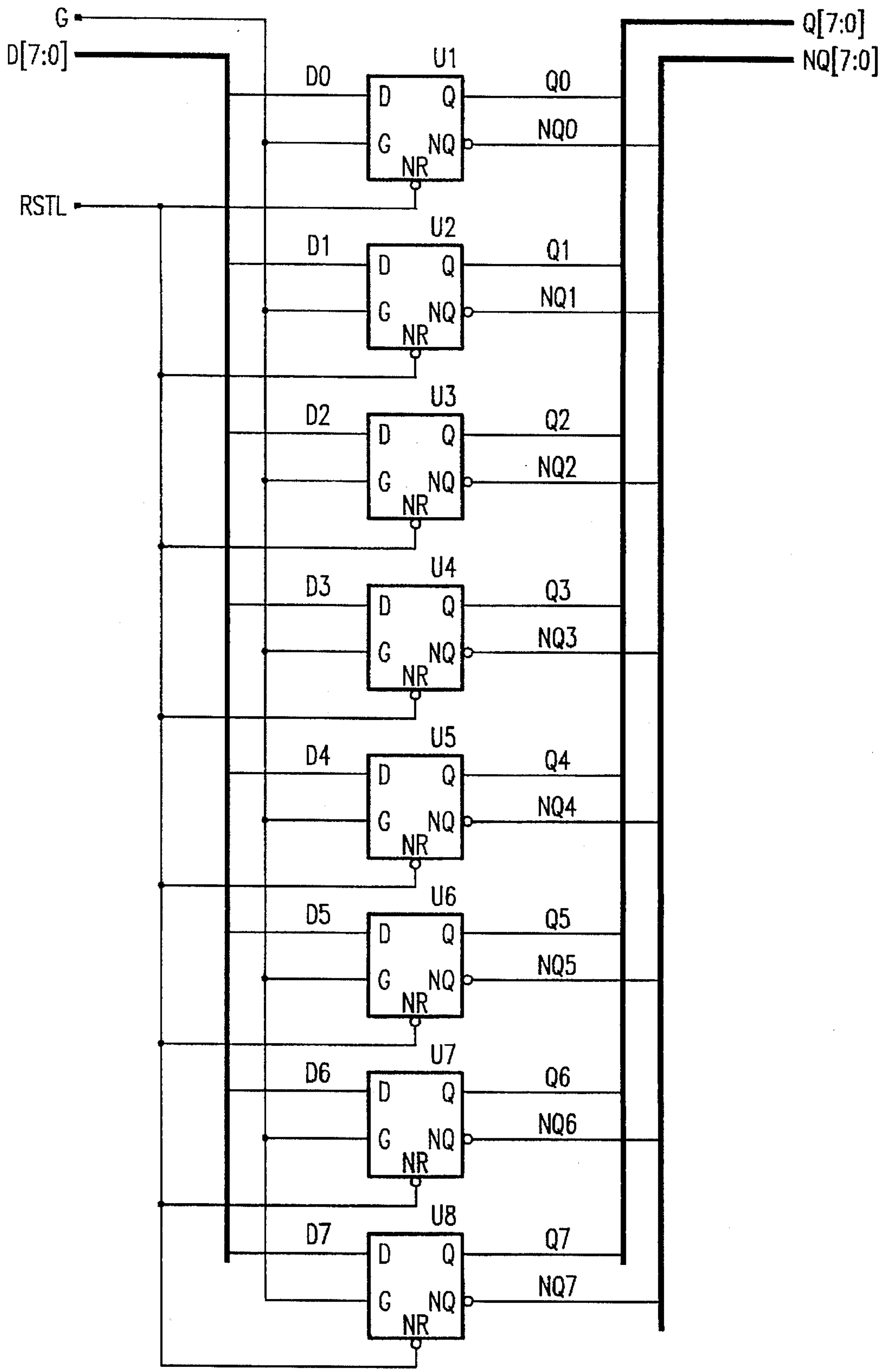
FIG. 110 illustrates circuit NDLGORX8.
Figure 111A:
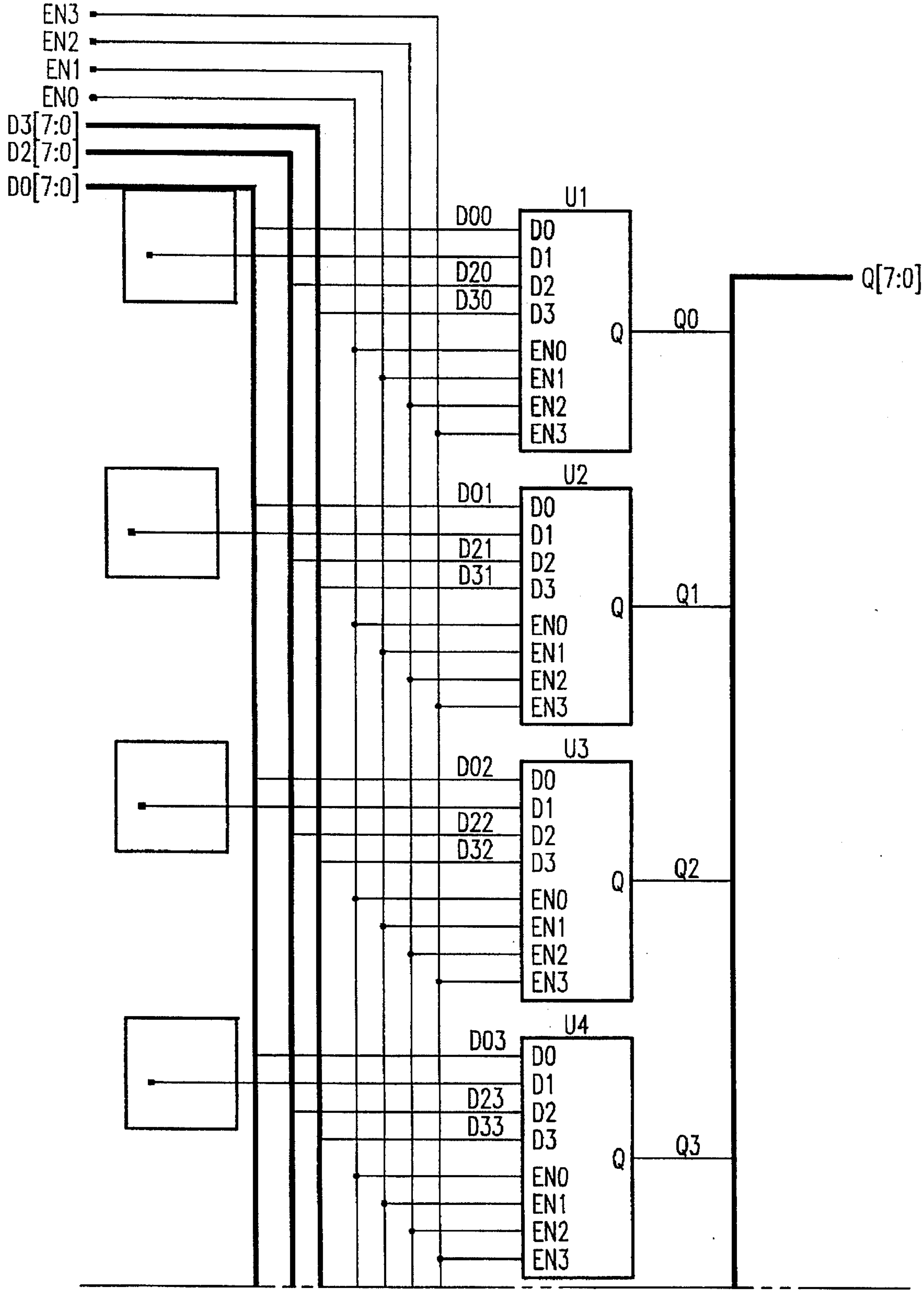
FIG. 111 illustrates an octal MUX41E circuit MUX41EX8.
Figure 112:
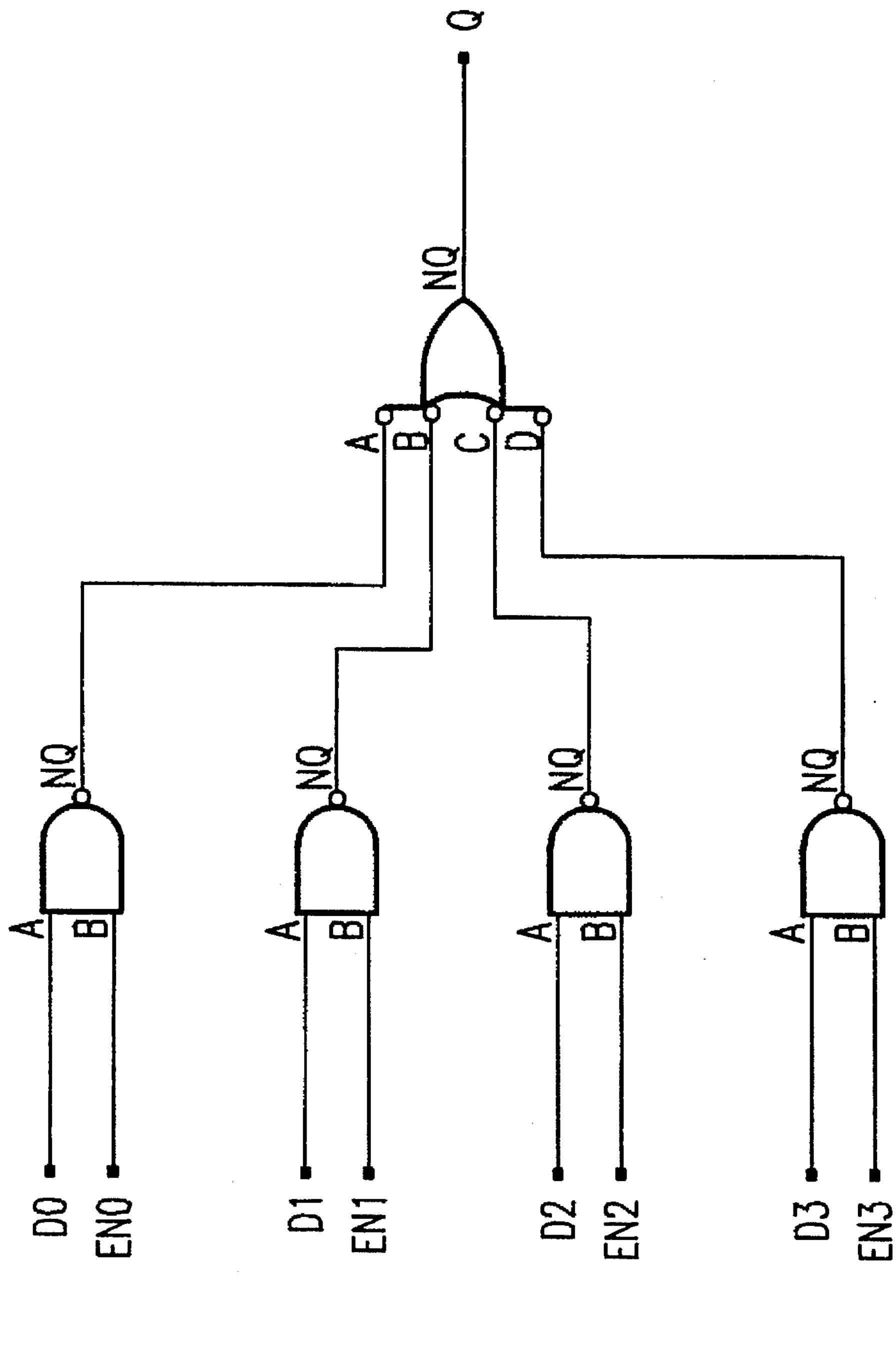
FIG. 112 illustrates a four-to-one enabled multiplexer circuit MUX41E.
Figure 113A:
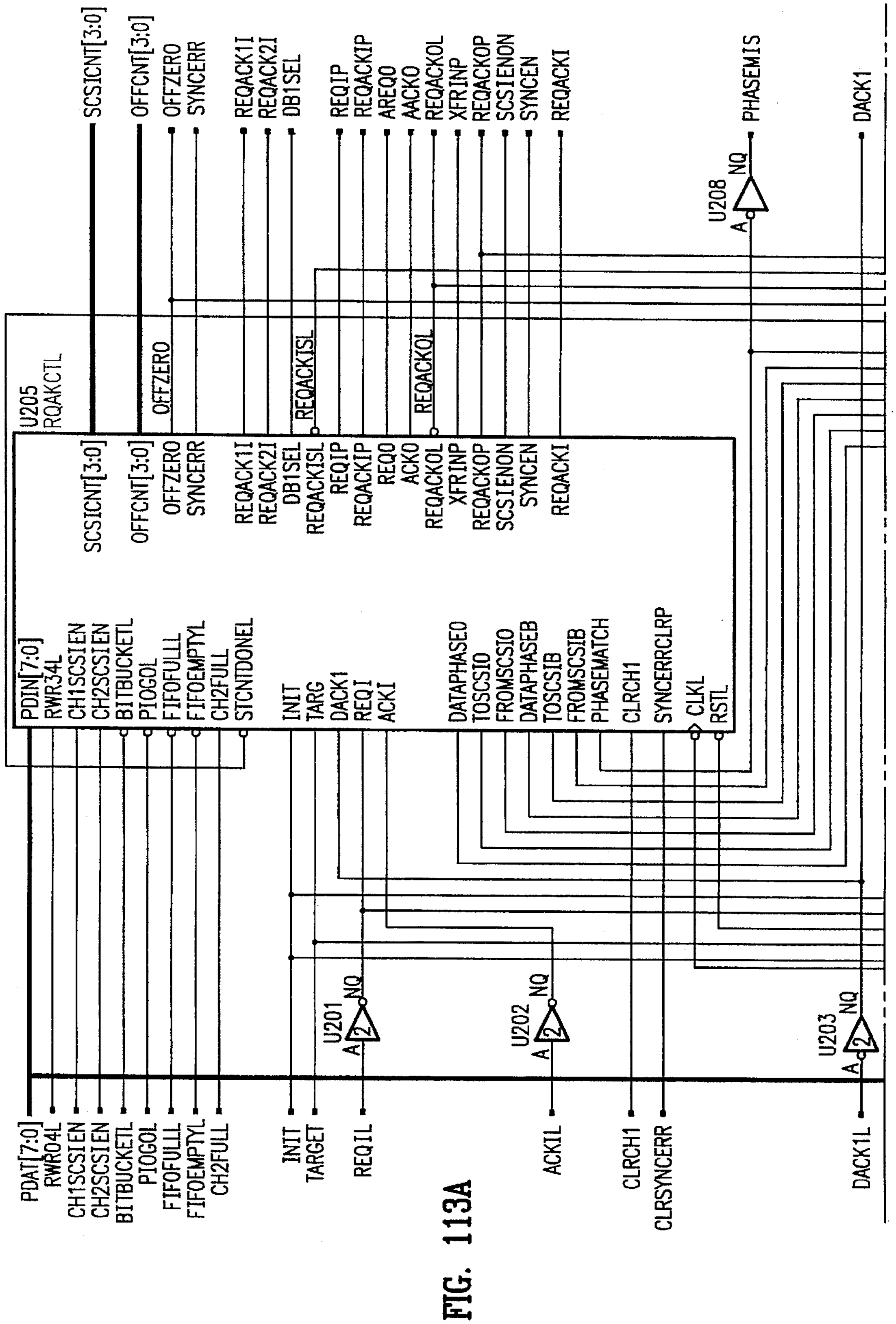
FIGS. 113A and 113B are a second part of circuit SCSI and include SCSI REQ/ACK, phase and transfer controls. Specifically, circuits RQAKCTL, PHASECTL and STCOUNT are illustrated.
Figure 113B:
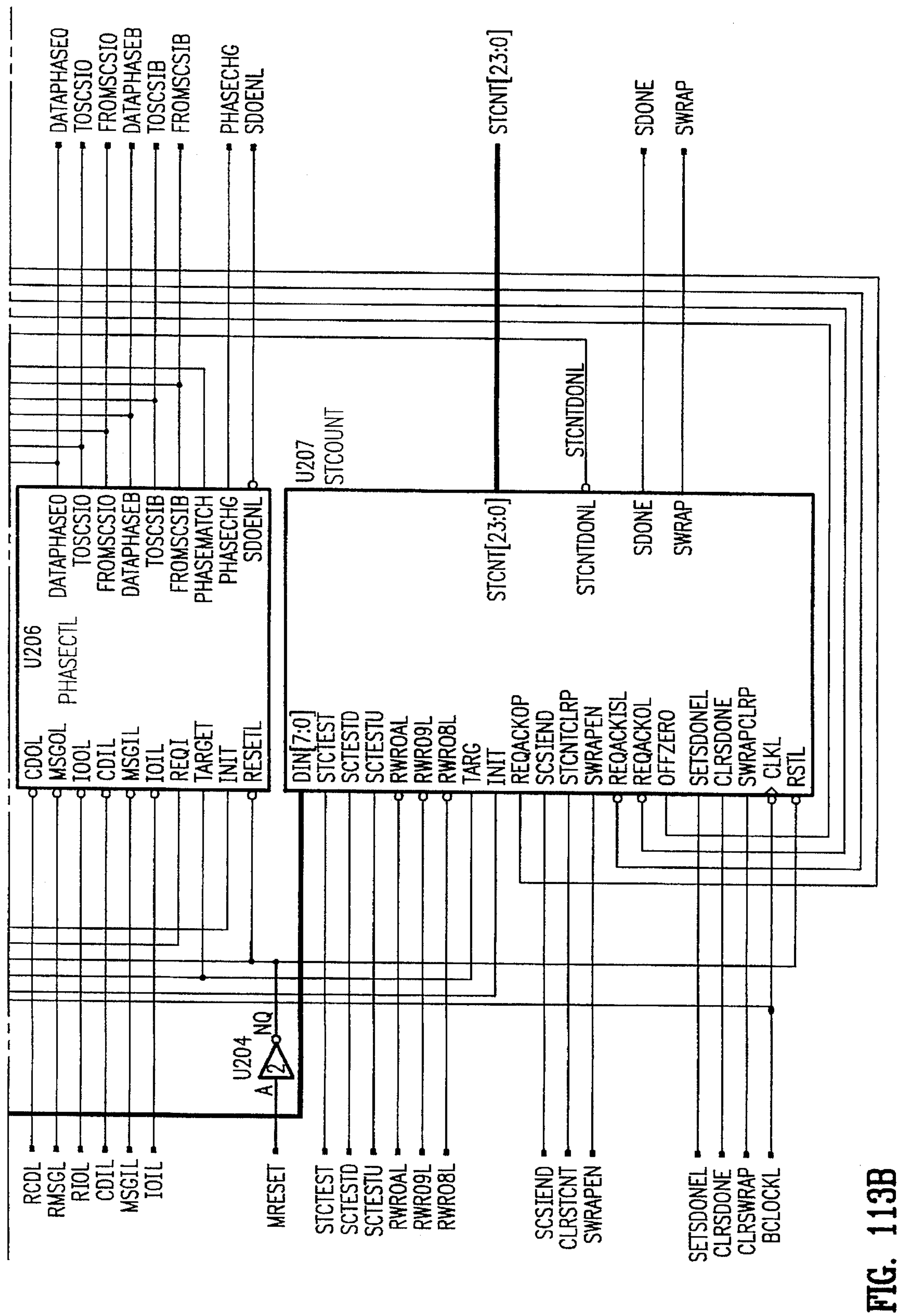
Figure 114A:
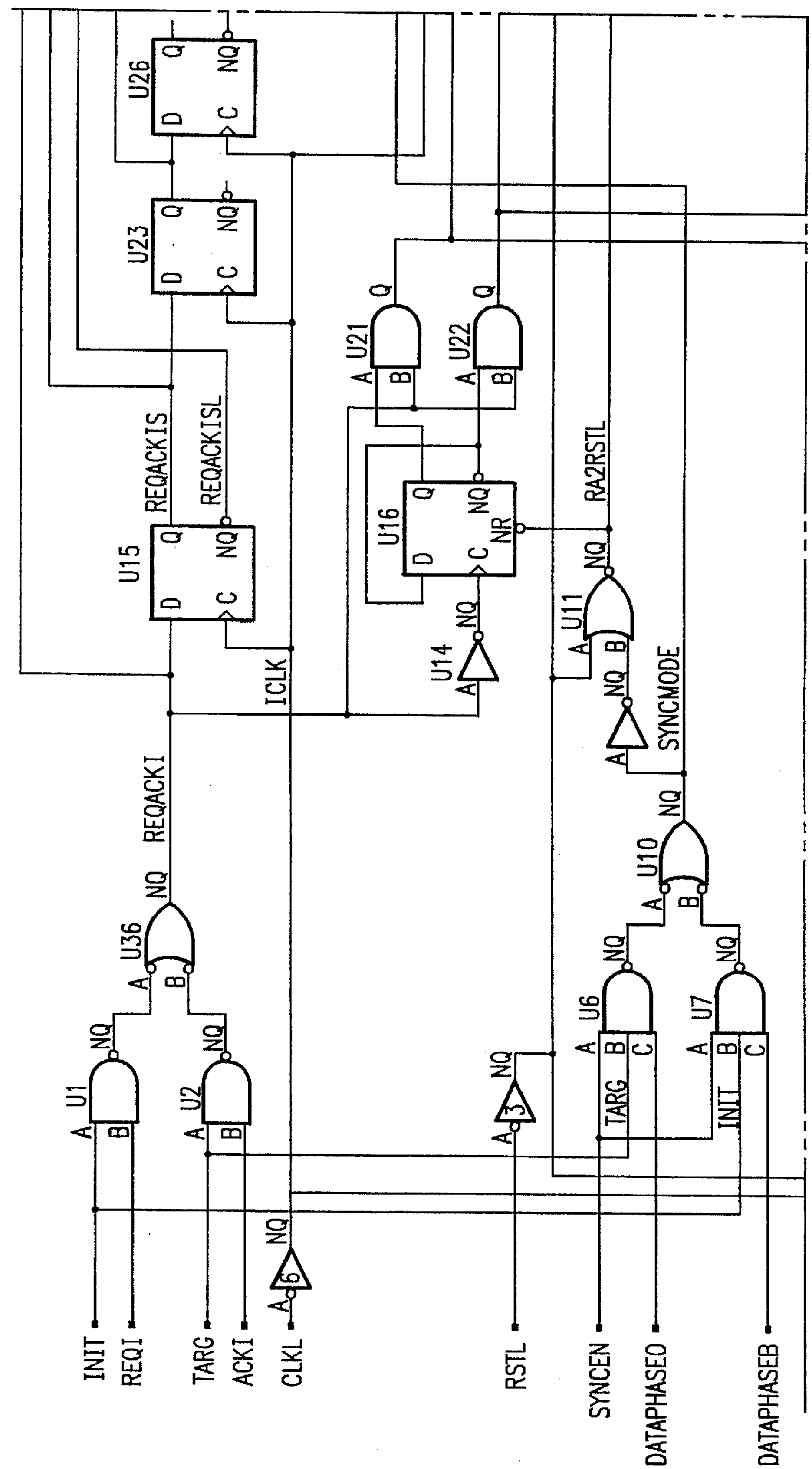
FIGS. 114A, 114B, 114C and 114D illustrate circuit RQAKCTL.
Figure 114B:
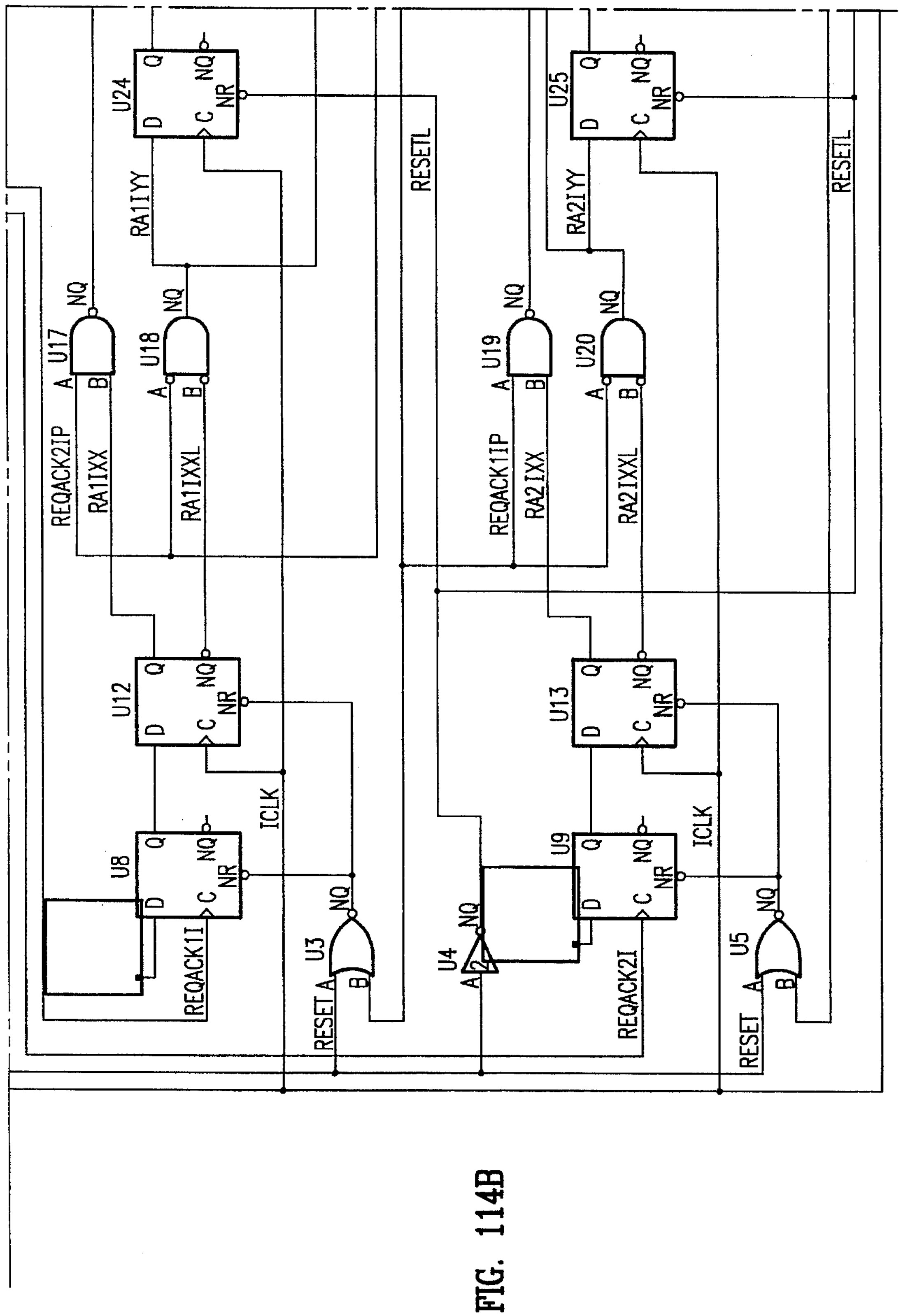
Figure 114C:
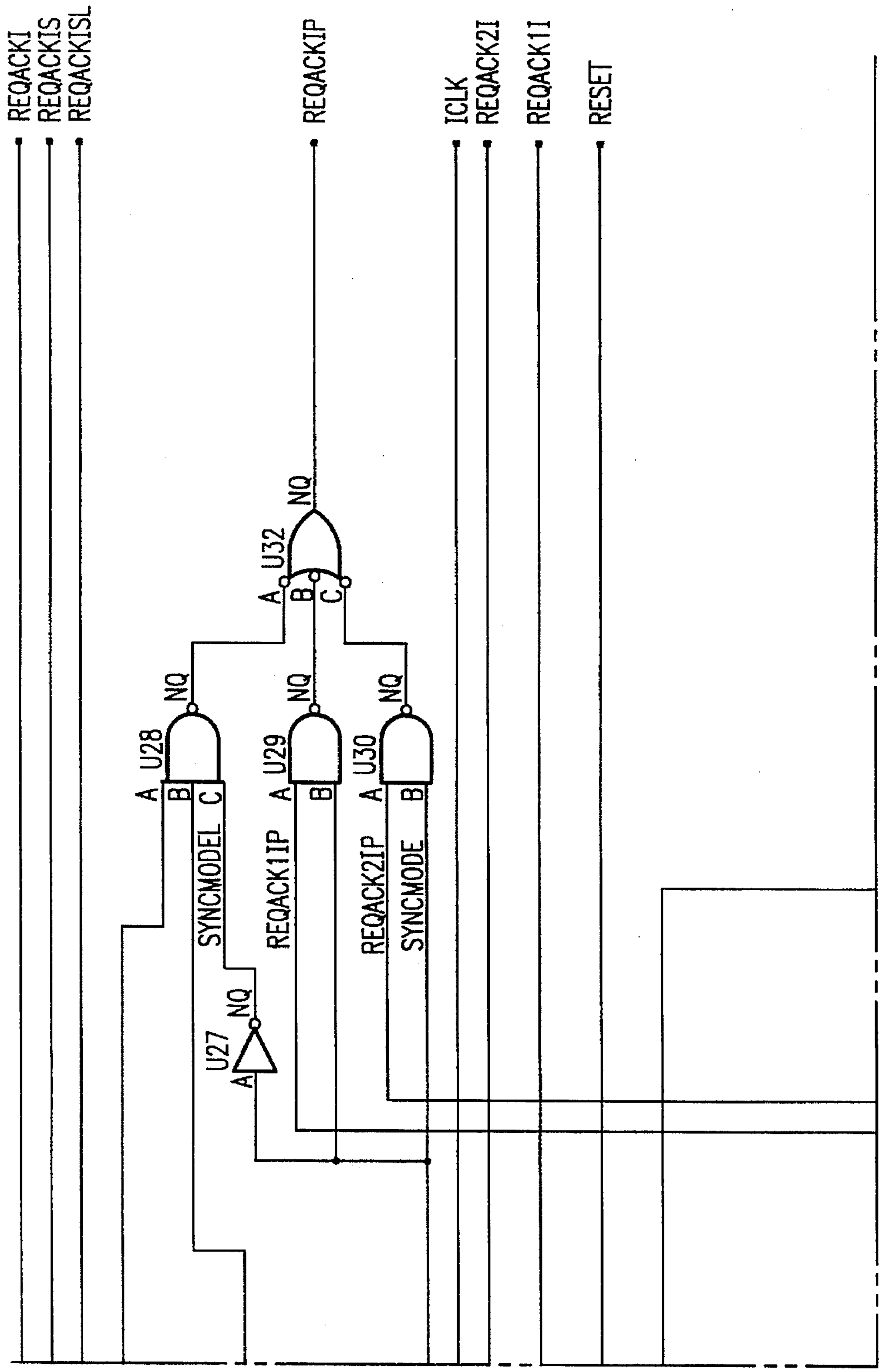
Figure 114D:
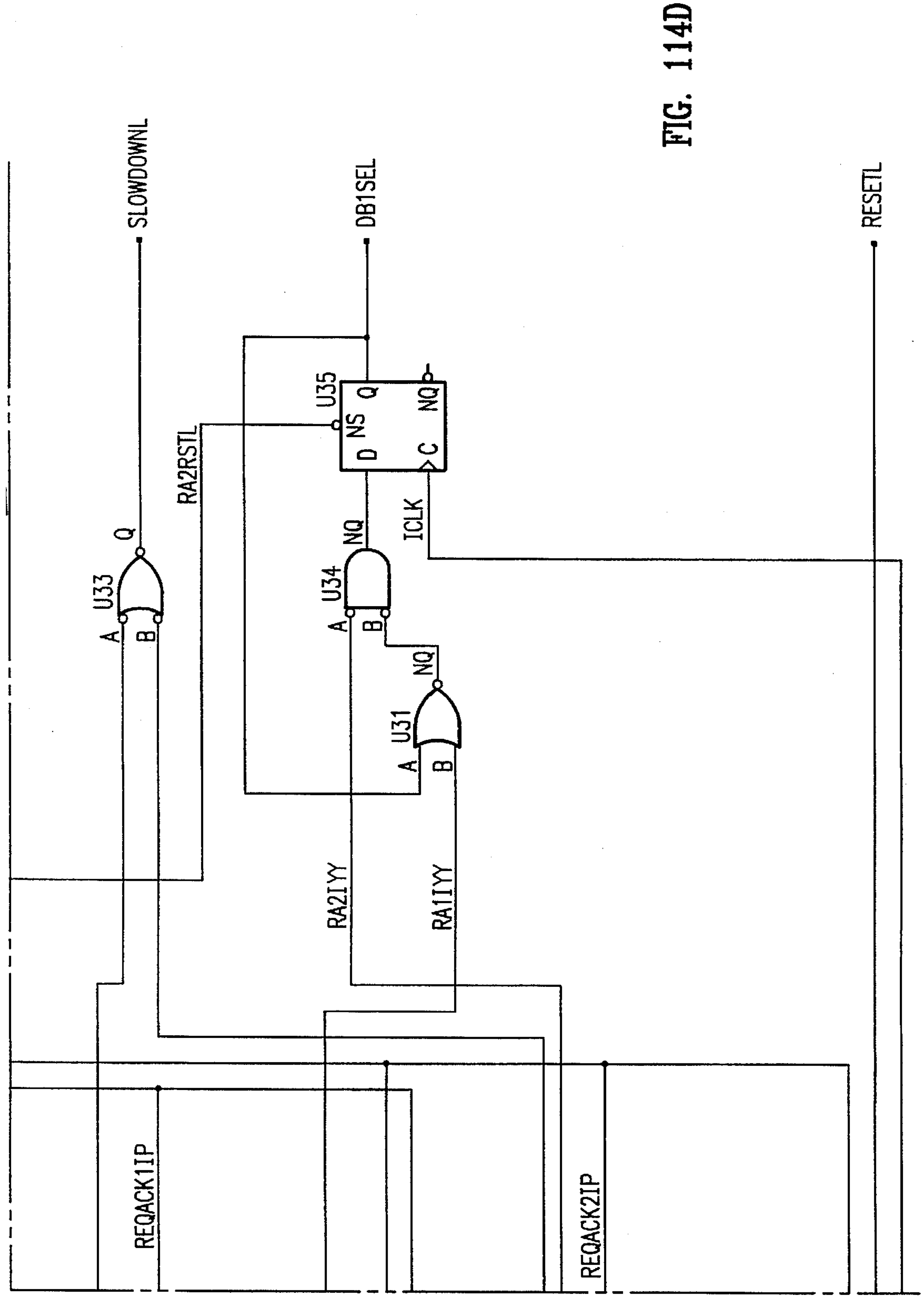

Circuit DLG00X8 is an octal latch (FIG. 108). Circuit ODDPAR is an odd parity generator (FIG. 109). Circuit NDLGORX8 is illustrated in FIG. 110. MUX41EX8 is an octal MUX41E circuit, as illustrated in FIG. 111. Circuit MUX41E is a four-to-one enabled multiplexer (FIG. 112).

As described above, FIGS. 113A and 113B are a second part of circuit SCSI and include SCSI REQ/ACK, phase and transfer controls. Specifically, circuits RQAKCTL, PHASECTL and STCOUNT are illustrated. Circuit RQAKCTL is illustrated in more detail in FIGS. 114A, 114B, 114C and 114D, FIGS. 115A and 115B, FIGS. 116A and 116B, FIGS. 118A, 118B and 118C, and FIG. 121.

Figure 115A:
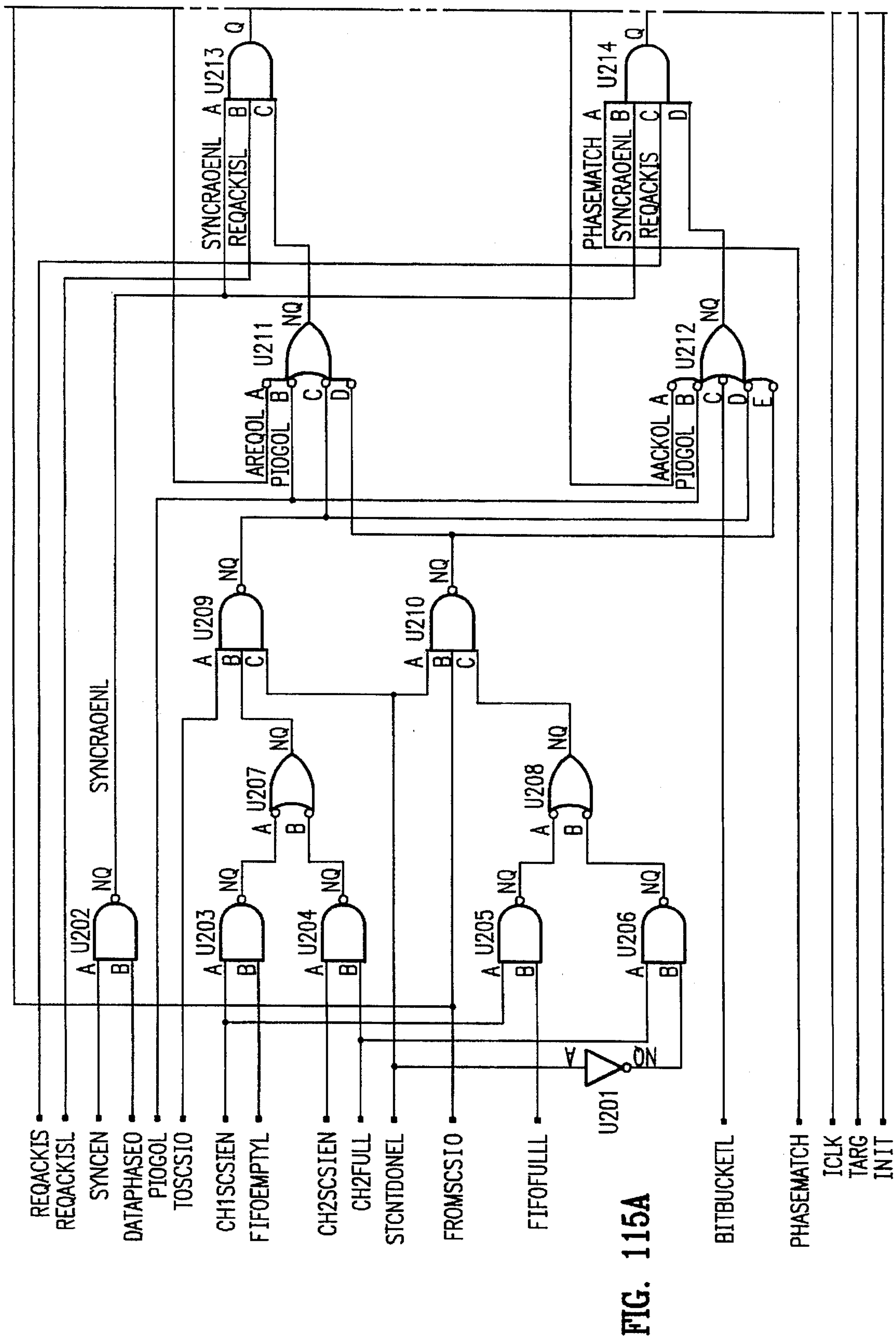
FIGS. 115A and 115B illustrate asynchronous SCSI REQ/ACK out logic.
Figure 115B:
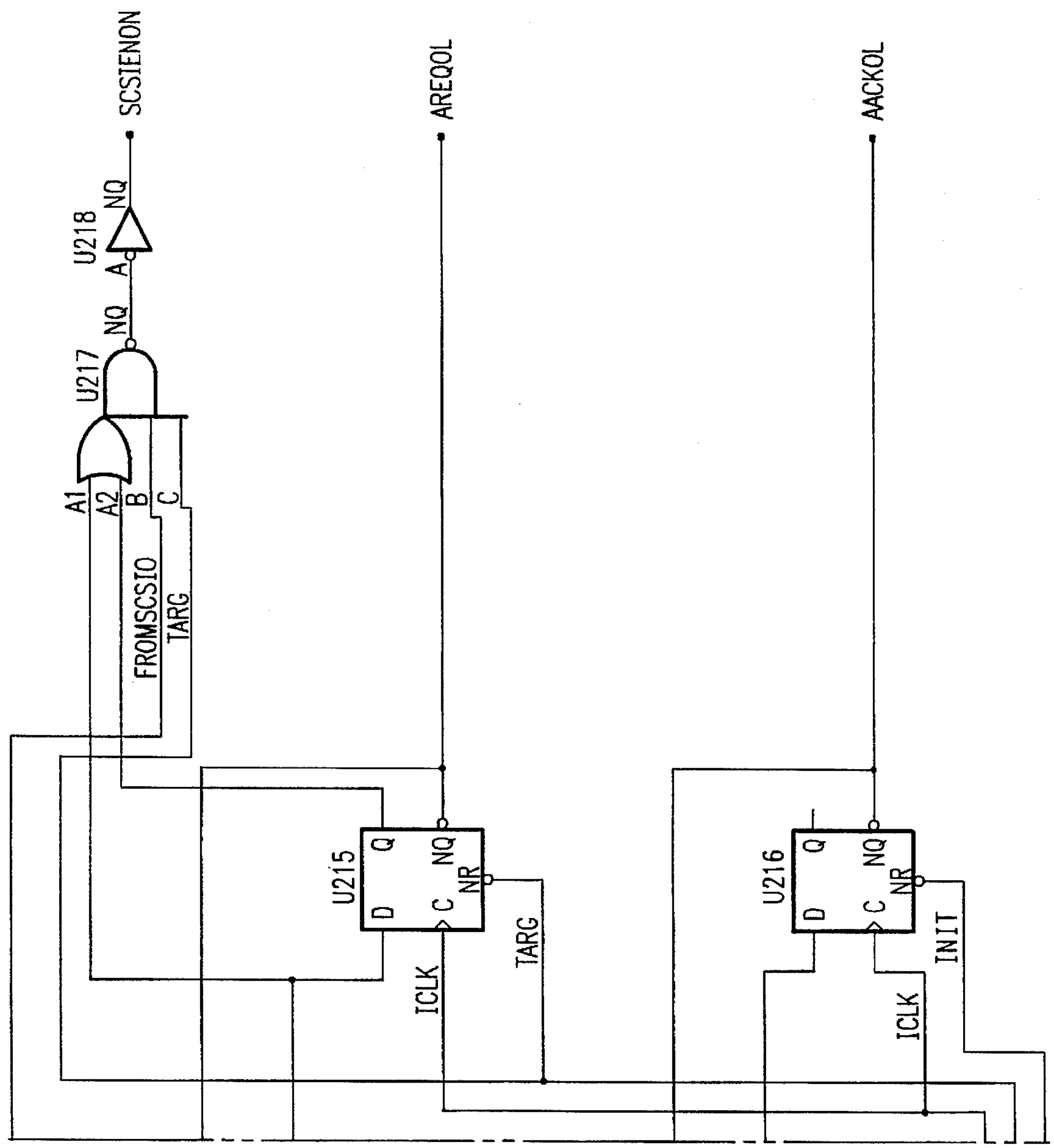
Figures 1, 116A:
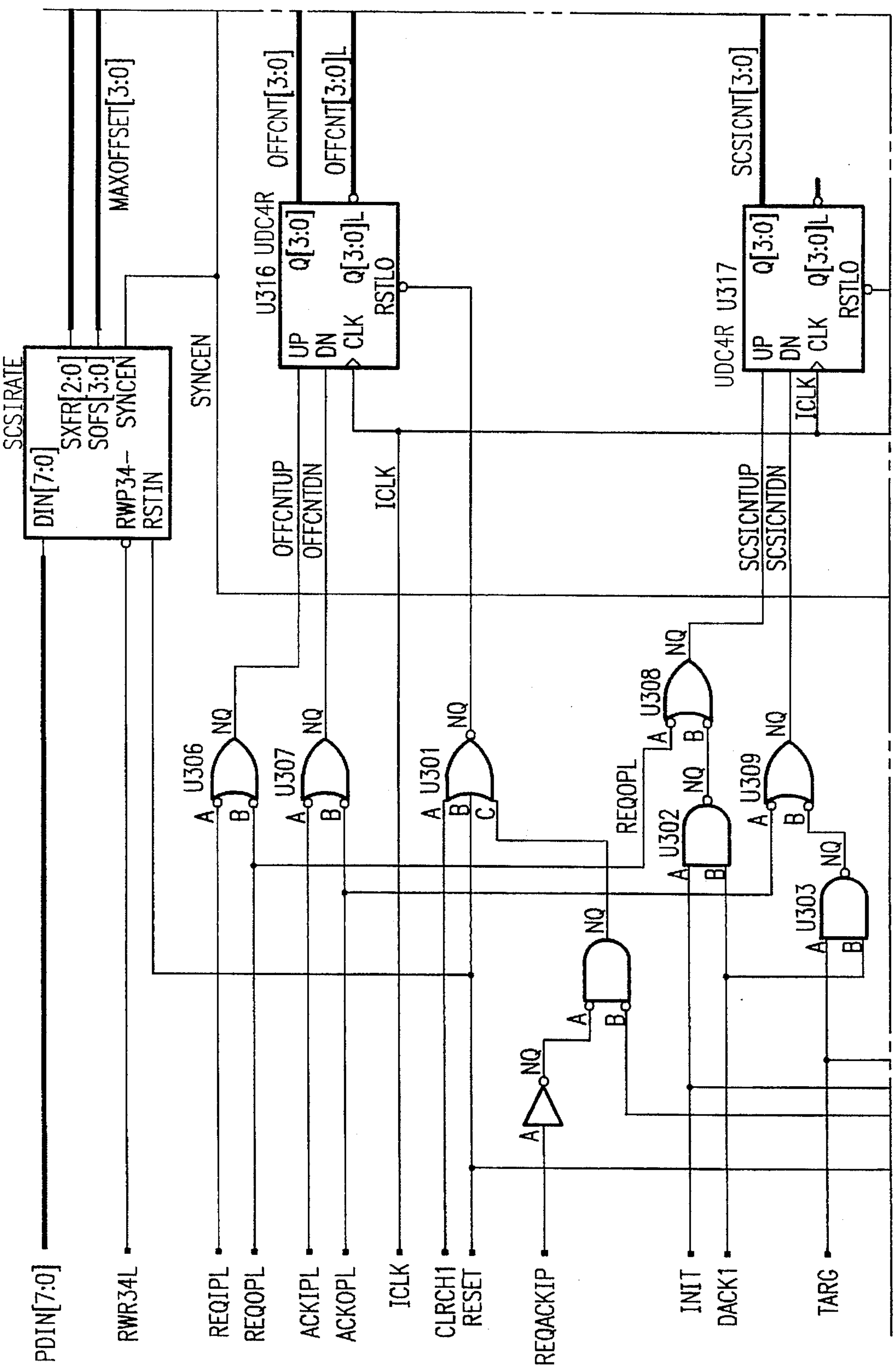
FIGS. 116A and 116B illustrate offset count and SCSI count logic and include circuits SCSIRATE and UDC4R.
Figures 2, 116A:
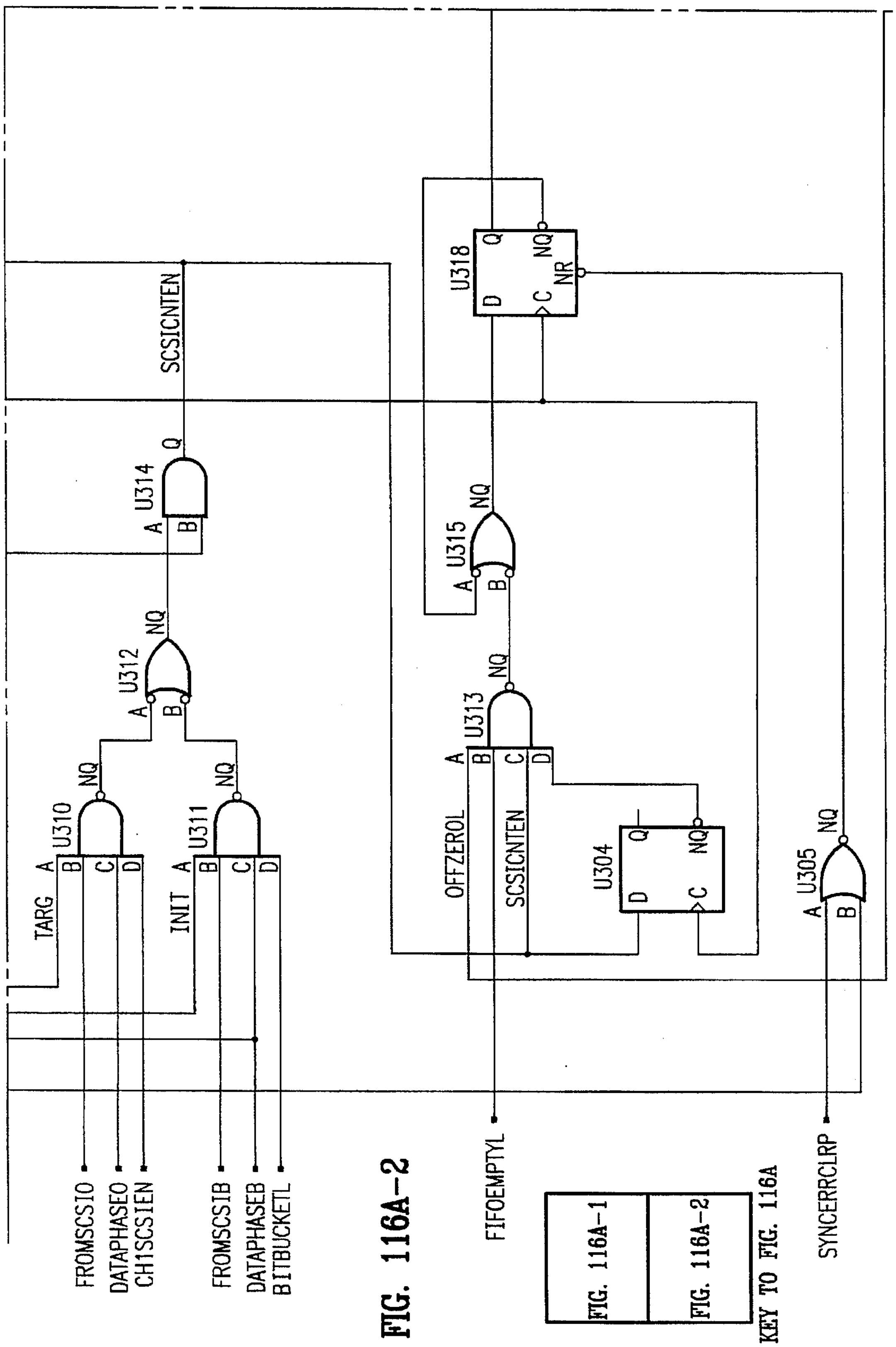
Figures 1, 116B:
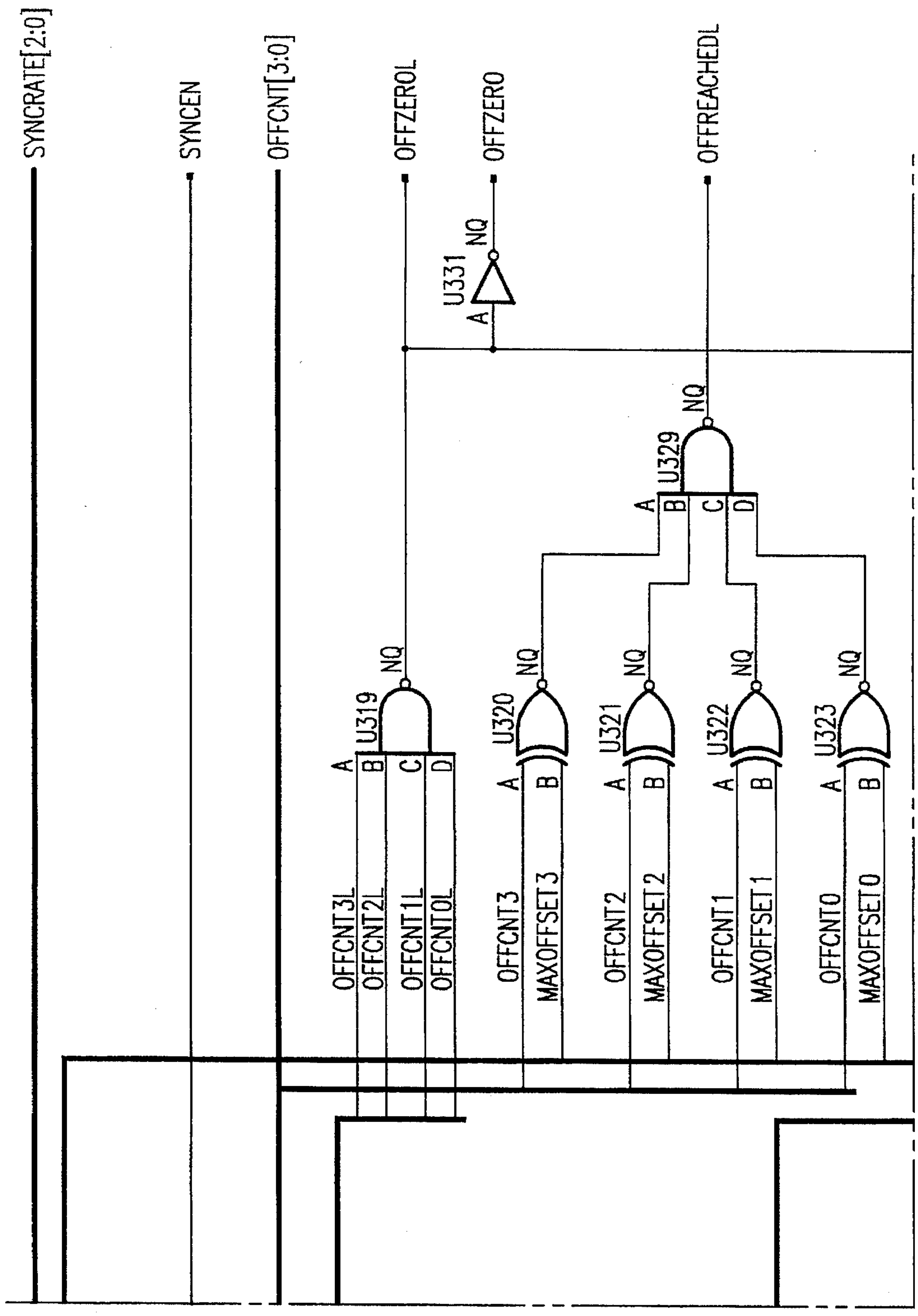
Figures 2, 116B:
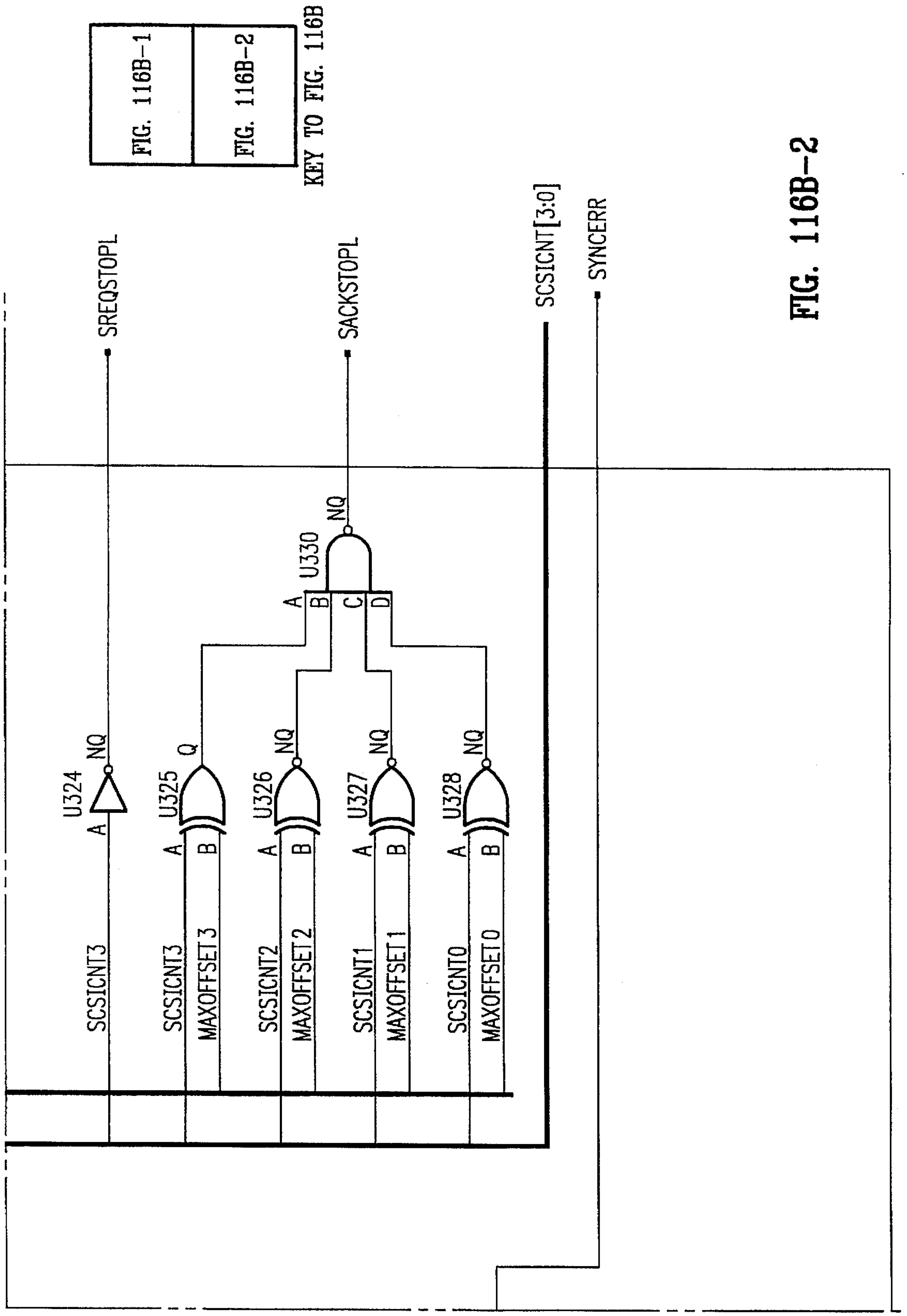
Figure 117A:
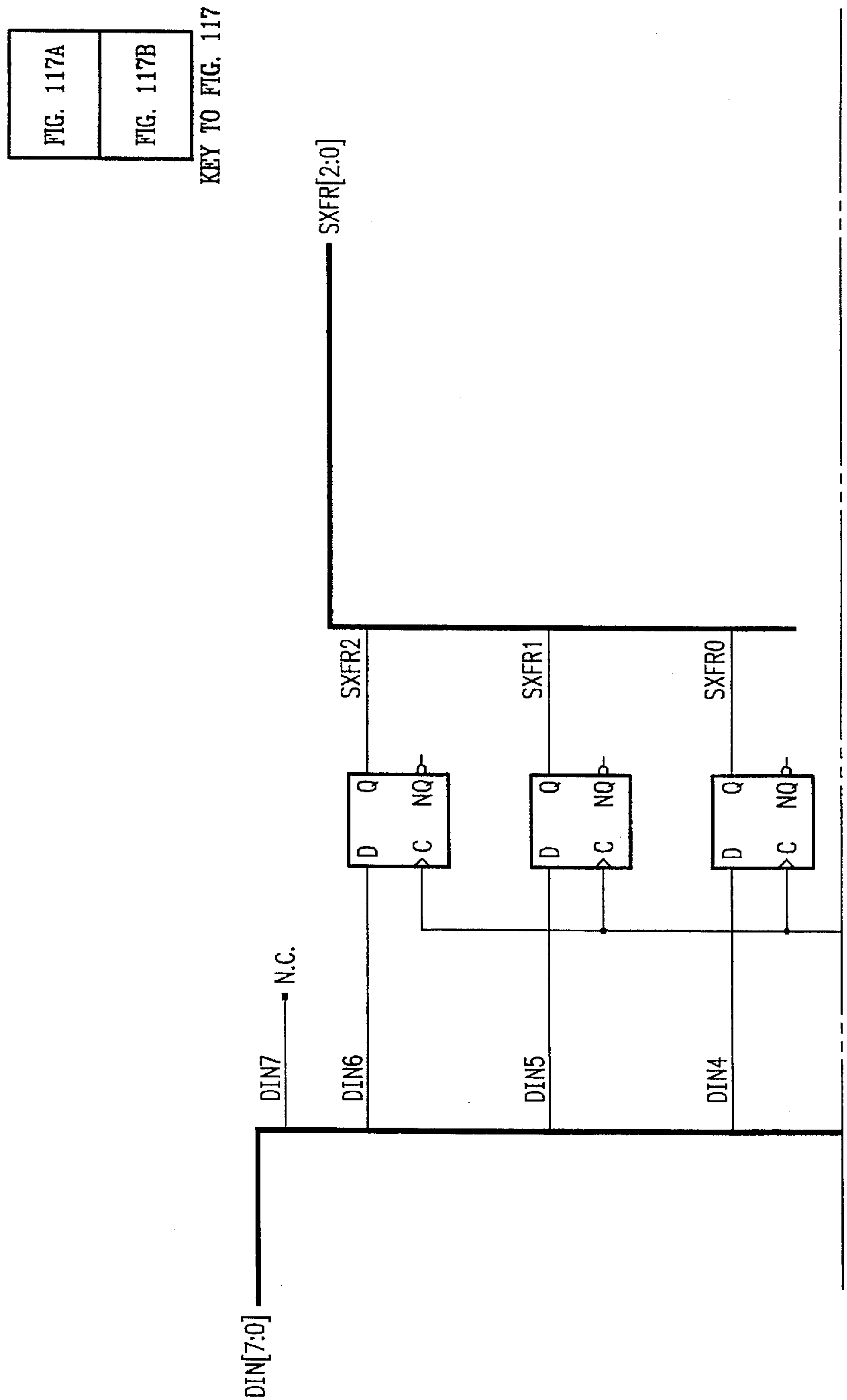
FIG. 117 illustrates circuit SCSIRATE.
Figure 117B:
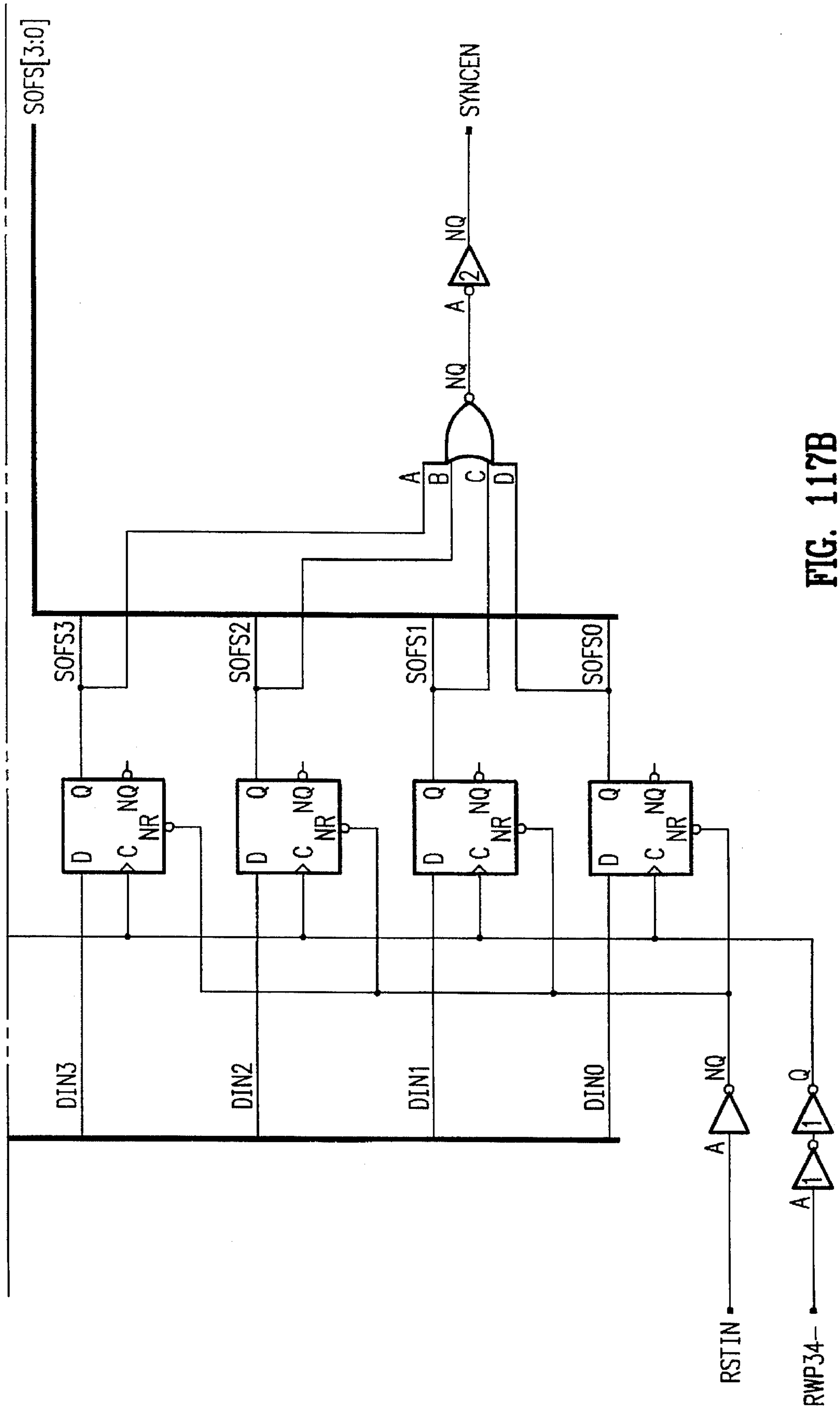
Figure 118A:
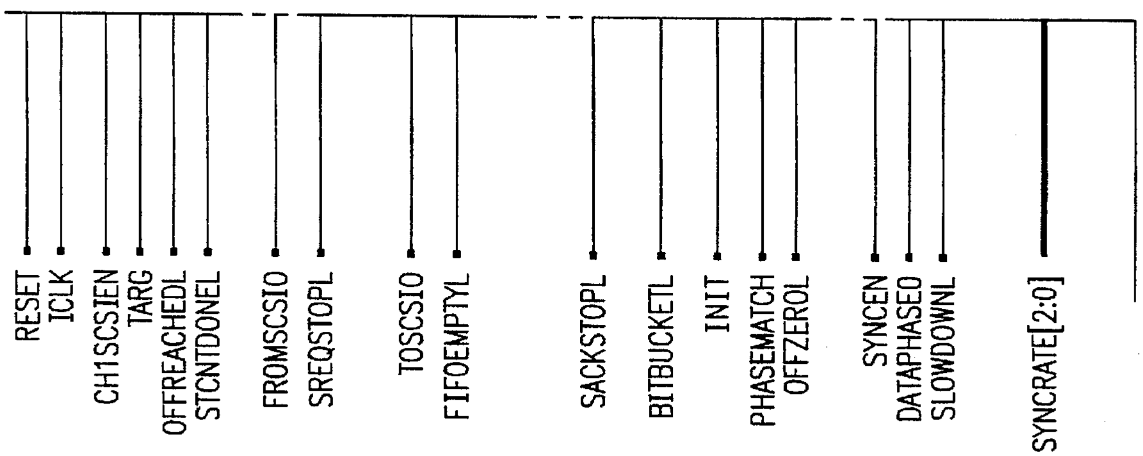
FIGS. 118A, 118B and 118C are the synchronous SCSI REQ/ACK logic that includes circuit DEC3_7M and circuit SHIFT6R.
Figures 1, 118B:
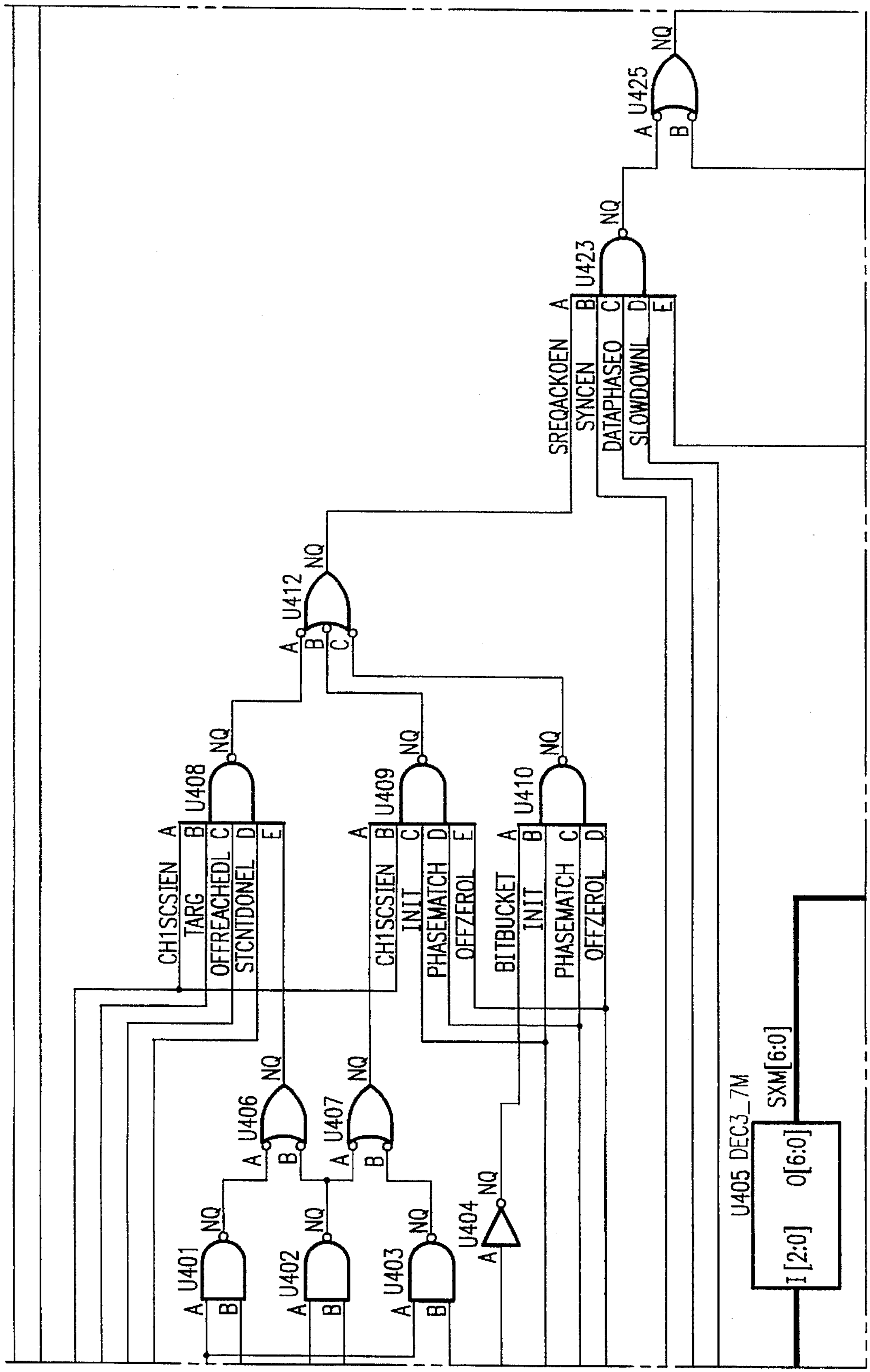
Figures 2, 118B:
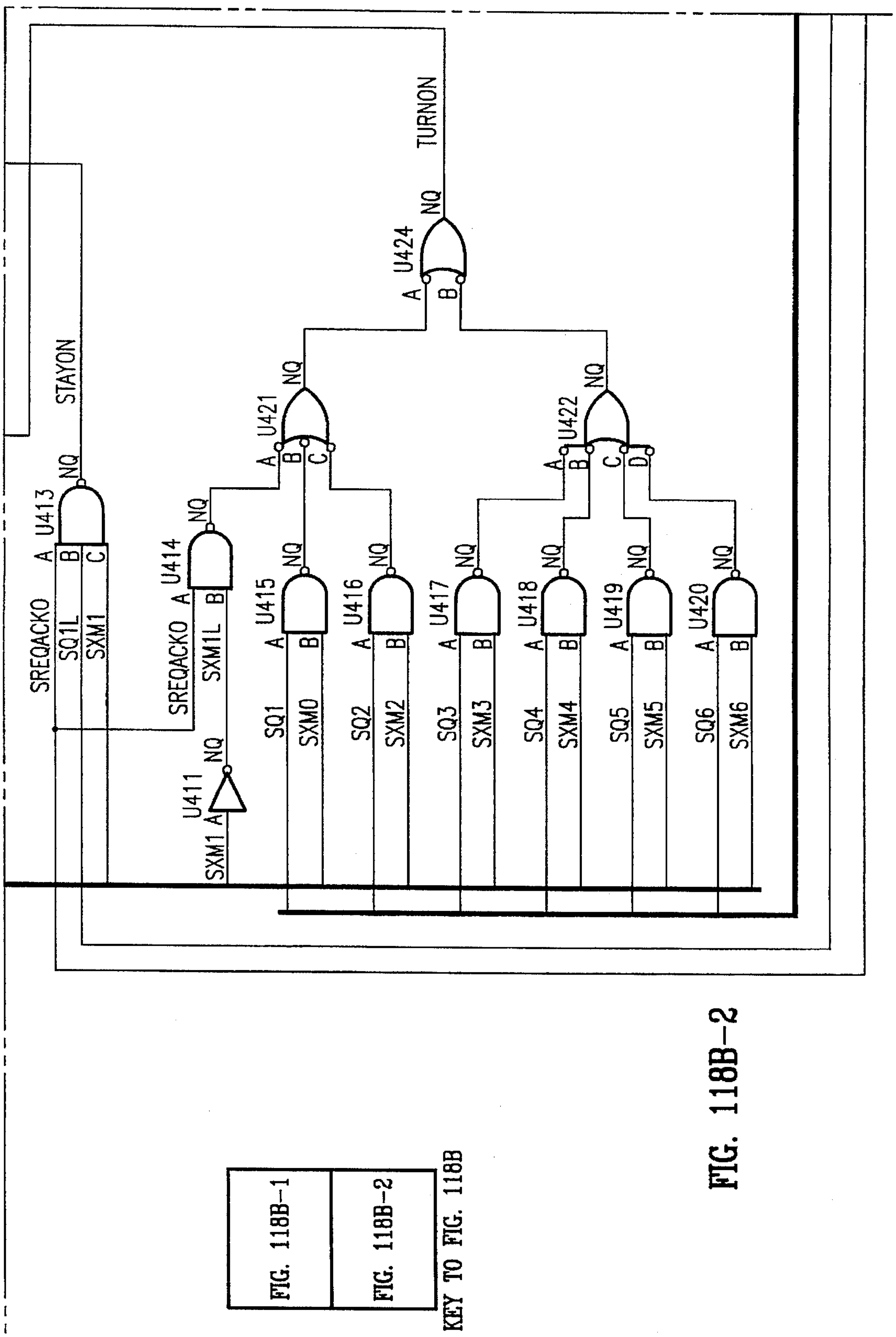
Figures 1, 118C:
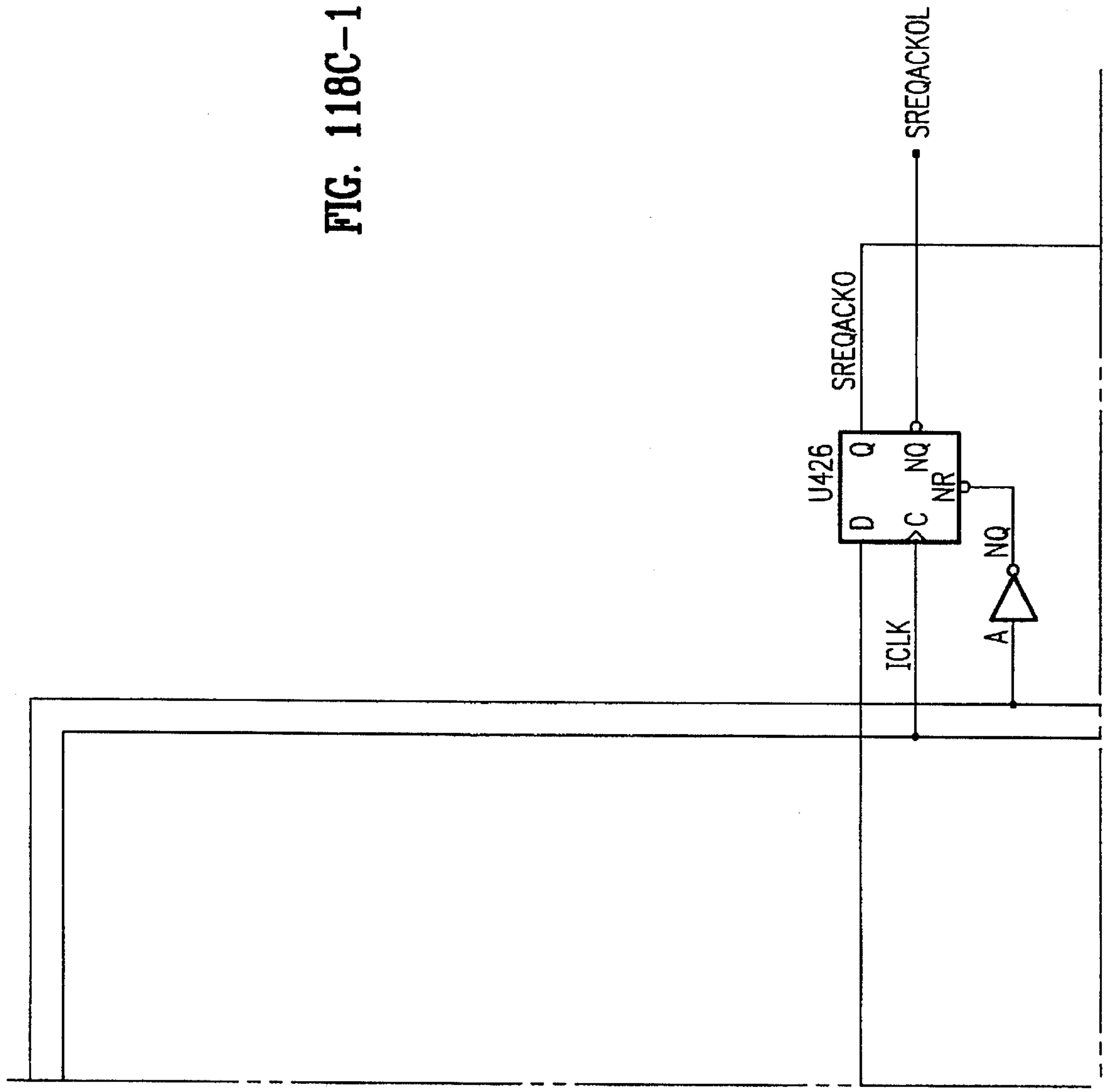
Figure 118C:
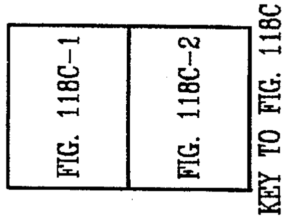
Figure 2:
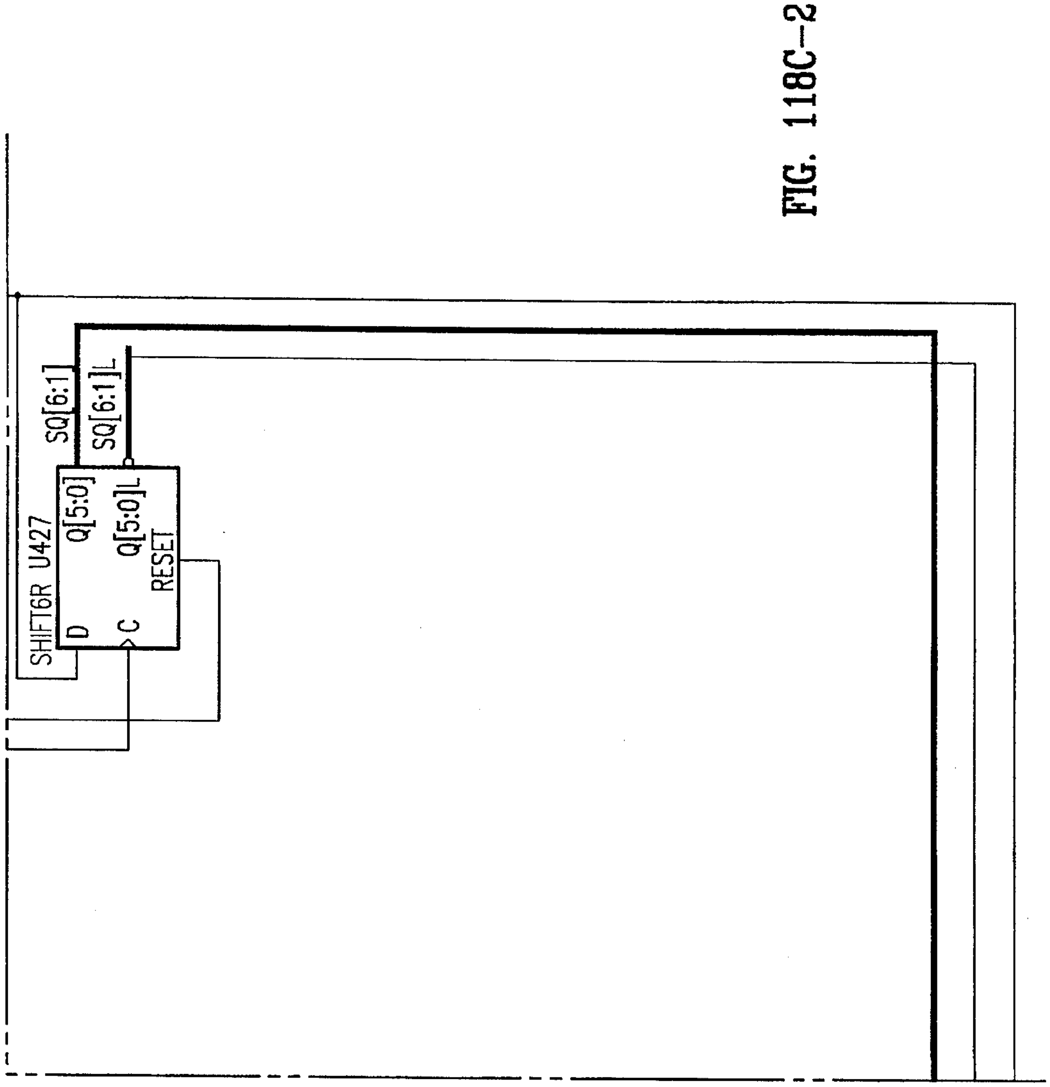
Figure 119:
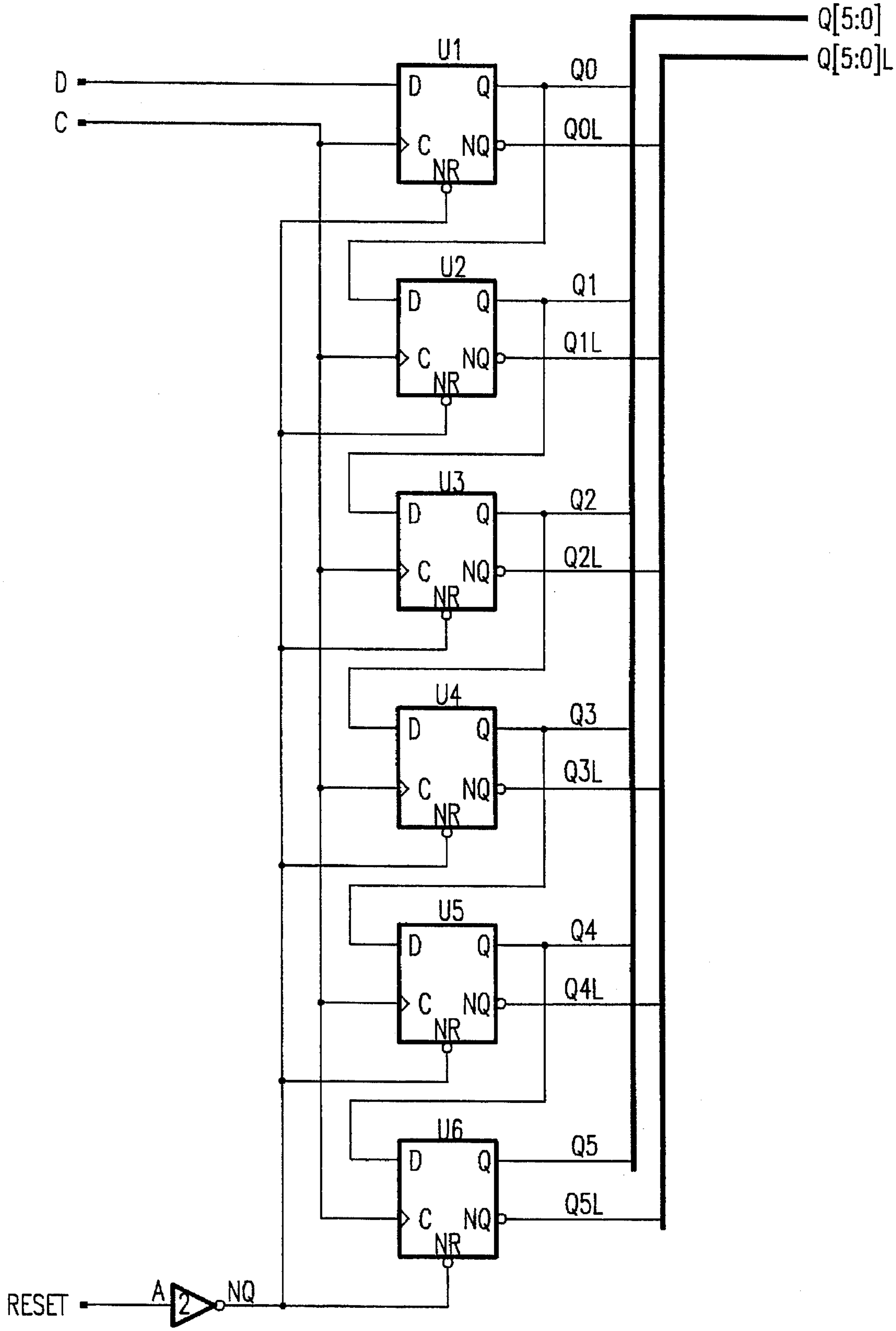
FIG. 119 illustrates a 6-bit shifter circuit SHIFT6R.
Figures 120A, 120B:
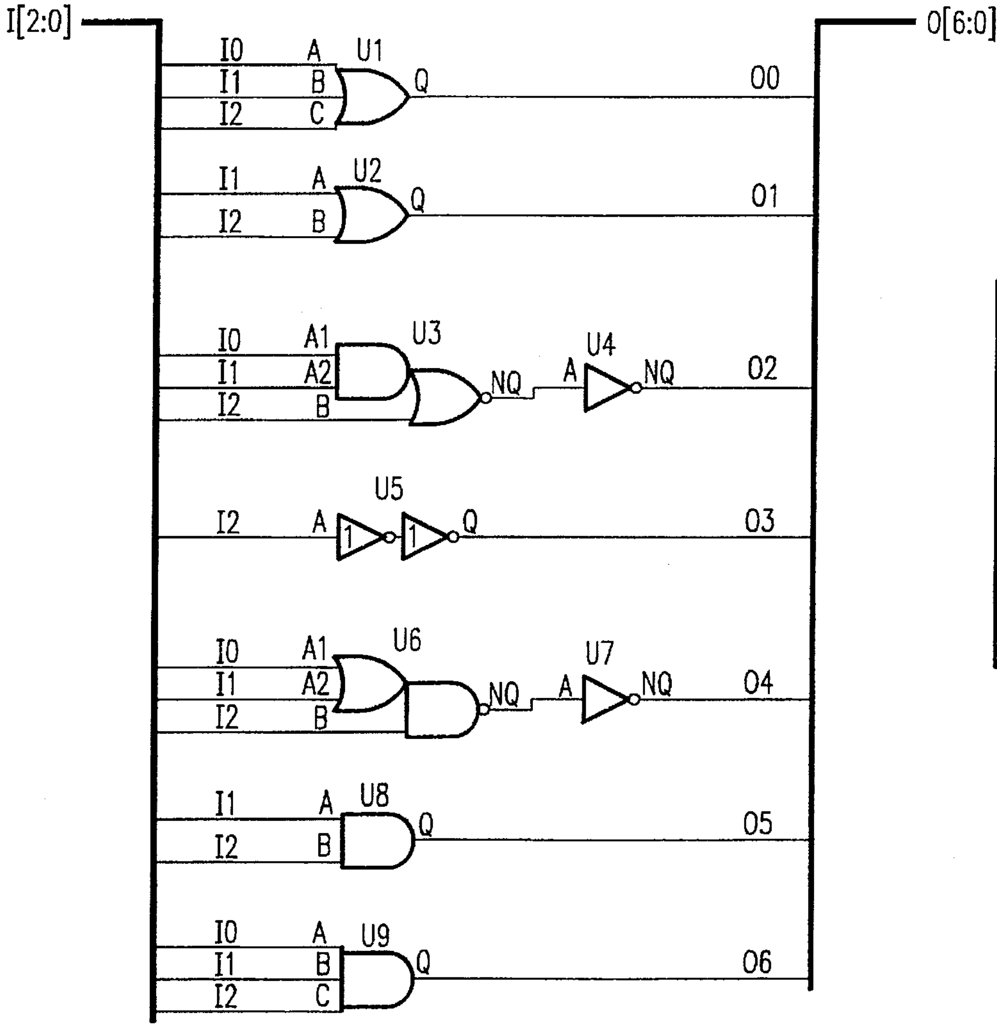
FIG. 120A illustrates a three-to-seven decoder circuit DEC3_7M.
FIG. 120B is a truth table for circuit DEC3_7M.
Figure 121A:
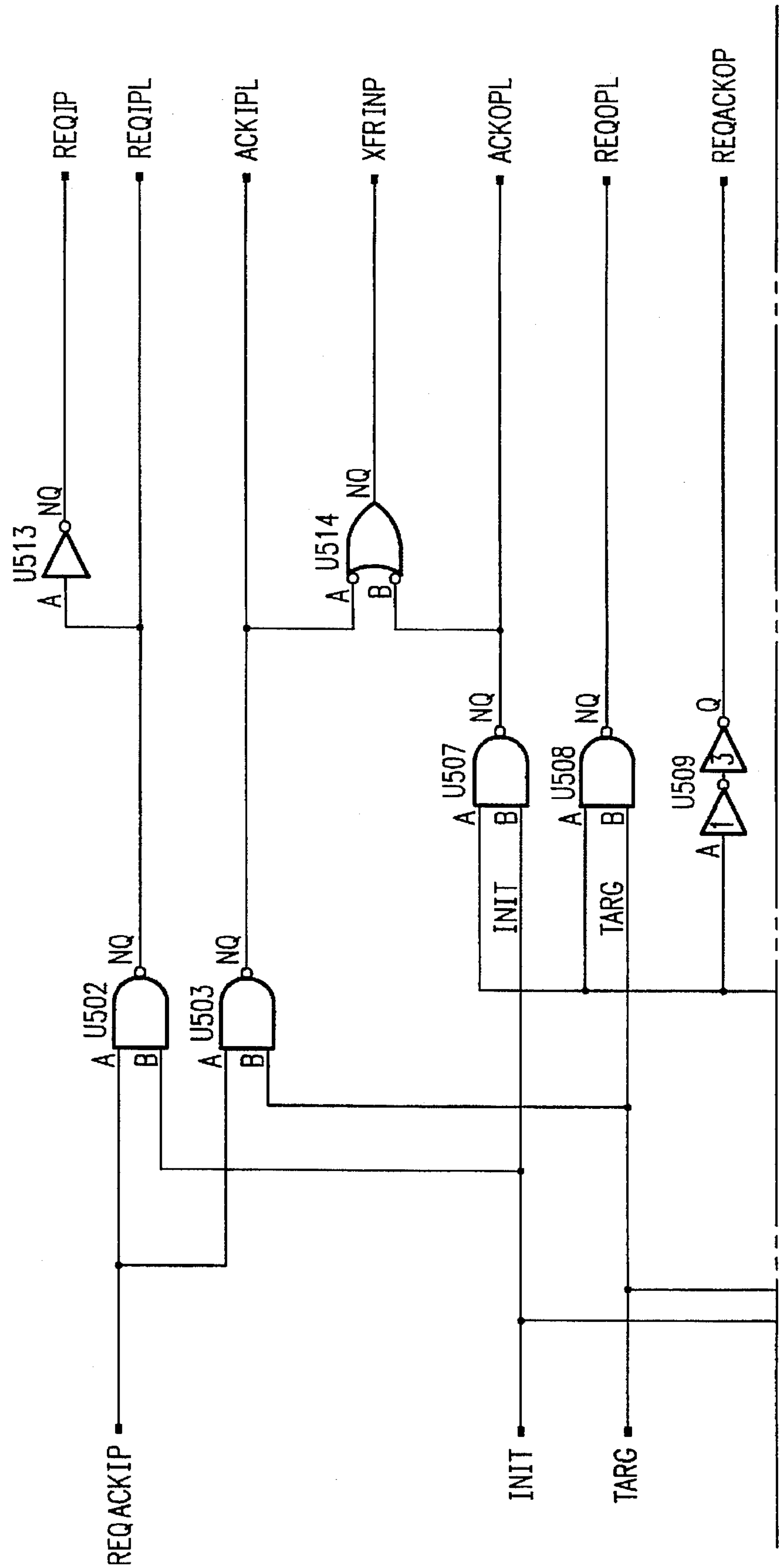
FIG. 121 is the last portion of circuit RQAKCTL (FIG. 113C).

FIGS. 114A through 114D illustrate SCSI REQ/ACK in logic. FIGS. 115A and 115B illustrate asynchronous SCSI REQ/ACK out logic. FIGS. 116A and 116B illustrate offset count and SCSI count logic and include circuits SCSIRATE and UDC4R, which was described above. Circuit SCSIRATE is one of the registers illustrated in FIG. 8A and is also illustrated in more detail in FIG. 117. FIGS. 118A through 118C are the synchronous SCSI REQ/ACK logic. The synchronous SCSI REQ/ACK logic includes circuit DEC3_7M and circuit SHIFT6R. Circuit SHIFT6R is a 6-bit shifter and is illustrated in more detail in FIG. 119. Circuit DEC3_7M is similar to a three-to-seven decoder and is illustrated in FIG. 120A. FIG. 120B is a truth table for circuit DEC3_7M. FIG. 121 is the last portion of circuit RQAKCTL (FIG. 113C).

Figures 1, 123A:
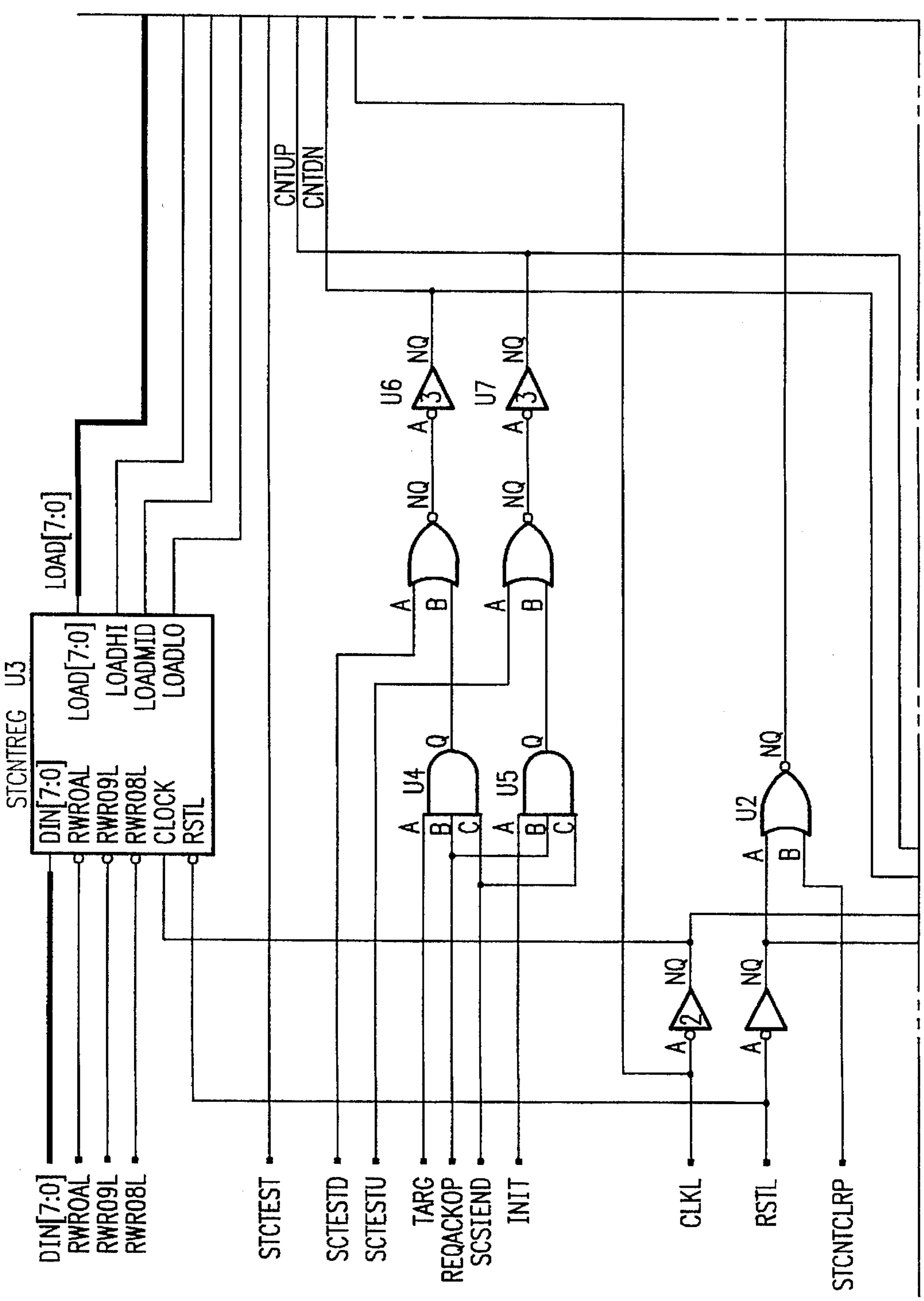
FIGS. 123A and 123B illustrate transfer count logic circuit STCOUNT of FIG. 113B that includes circuits STCNTREG and UDC24LR.
Figures 1, 123B:
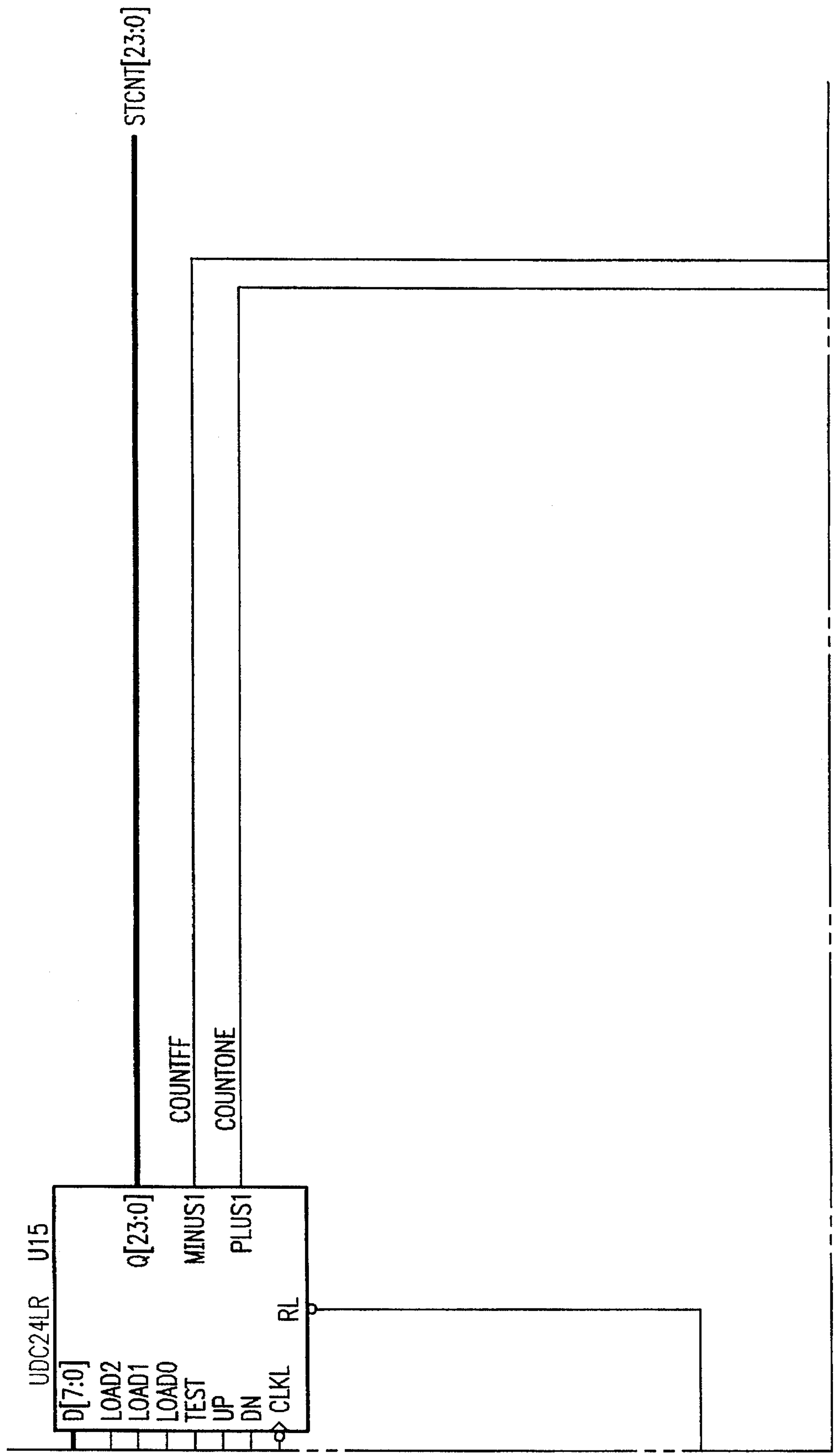
Figures 2, 123B:
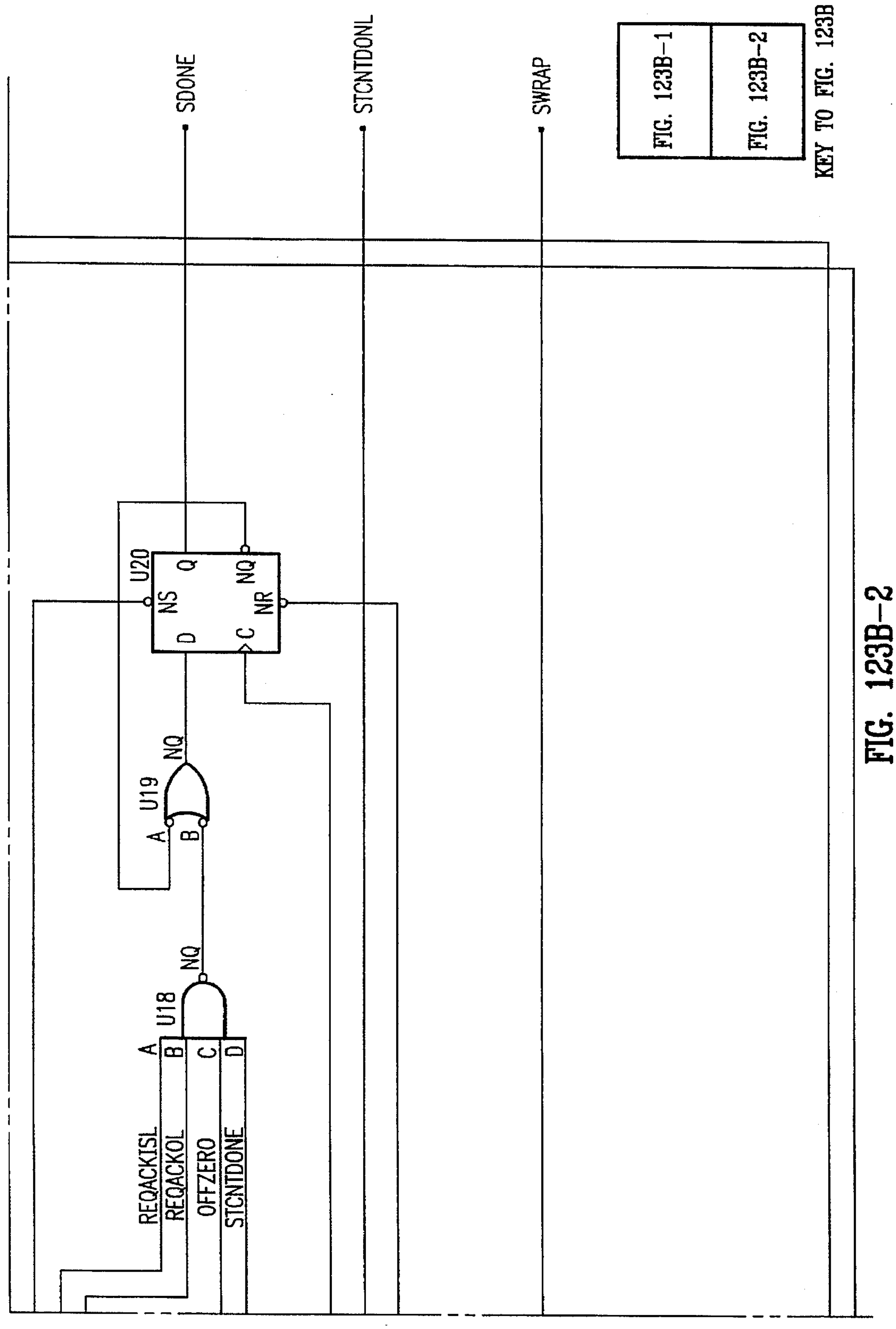
Figure 124A:
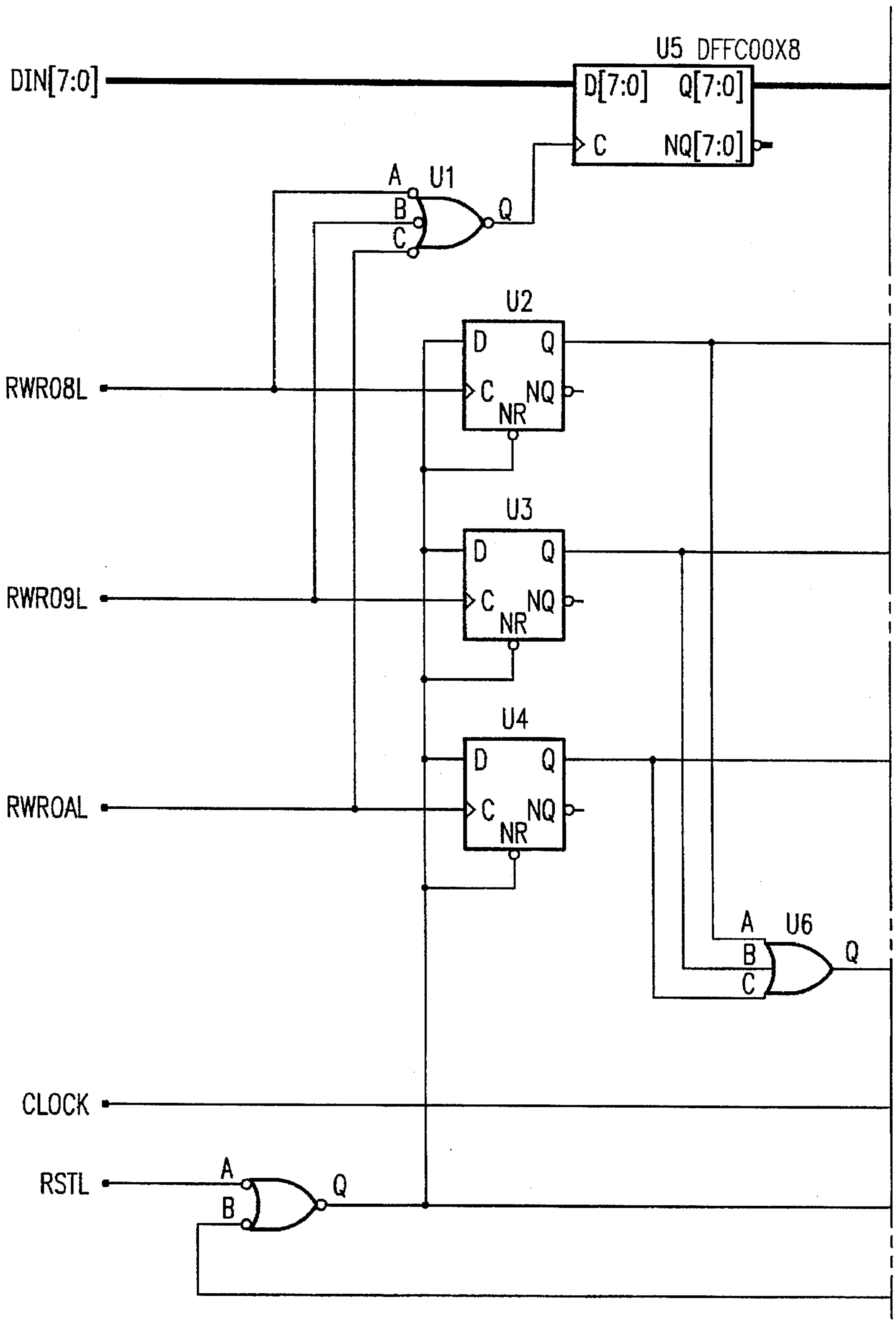
FIG. 124A and 124B illustrate circuit STCNT that includes the eight registers of circuit DFFC00X8.
Figure 124B:
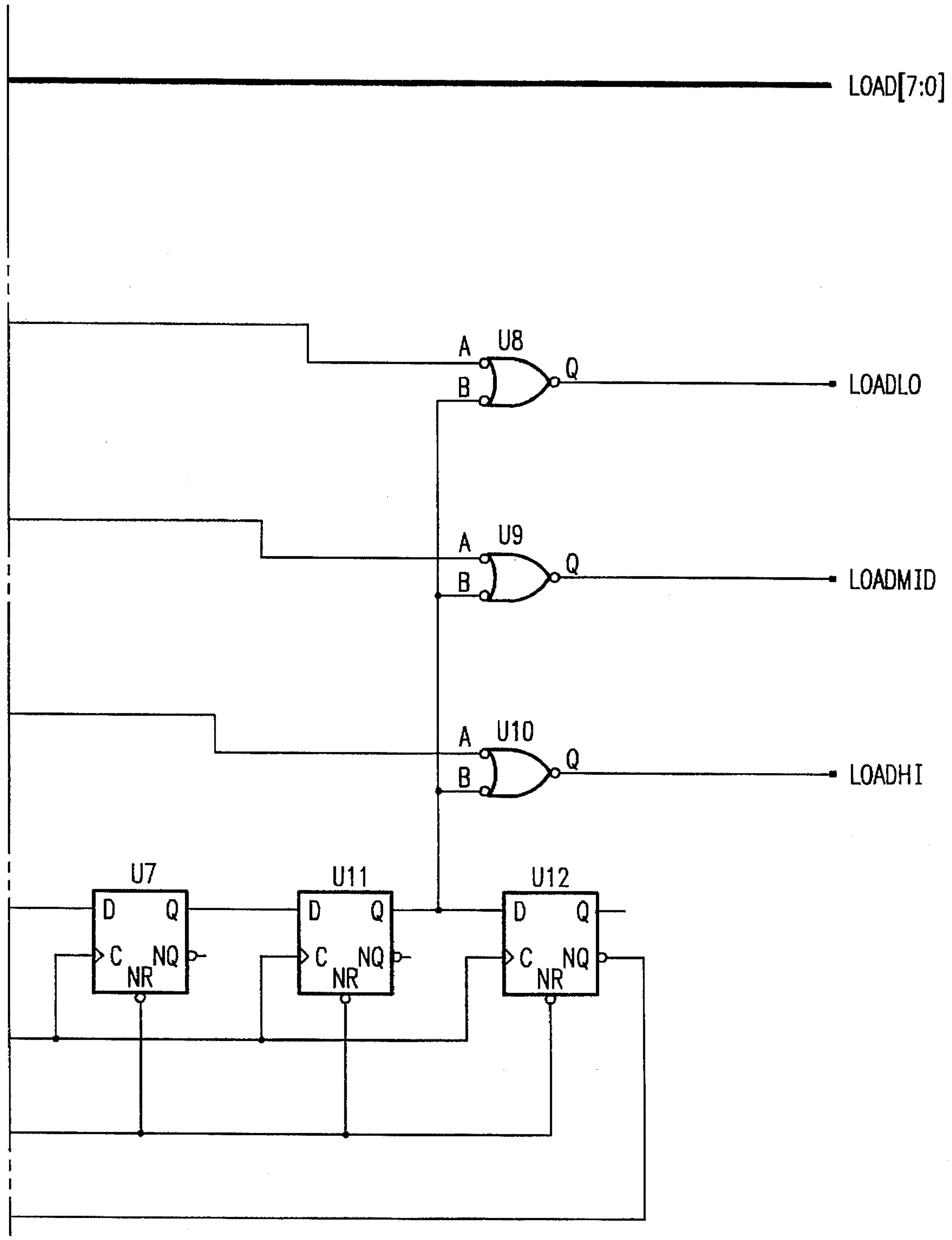
Figure 125A:
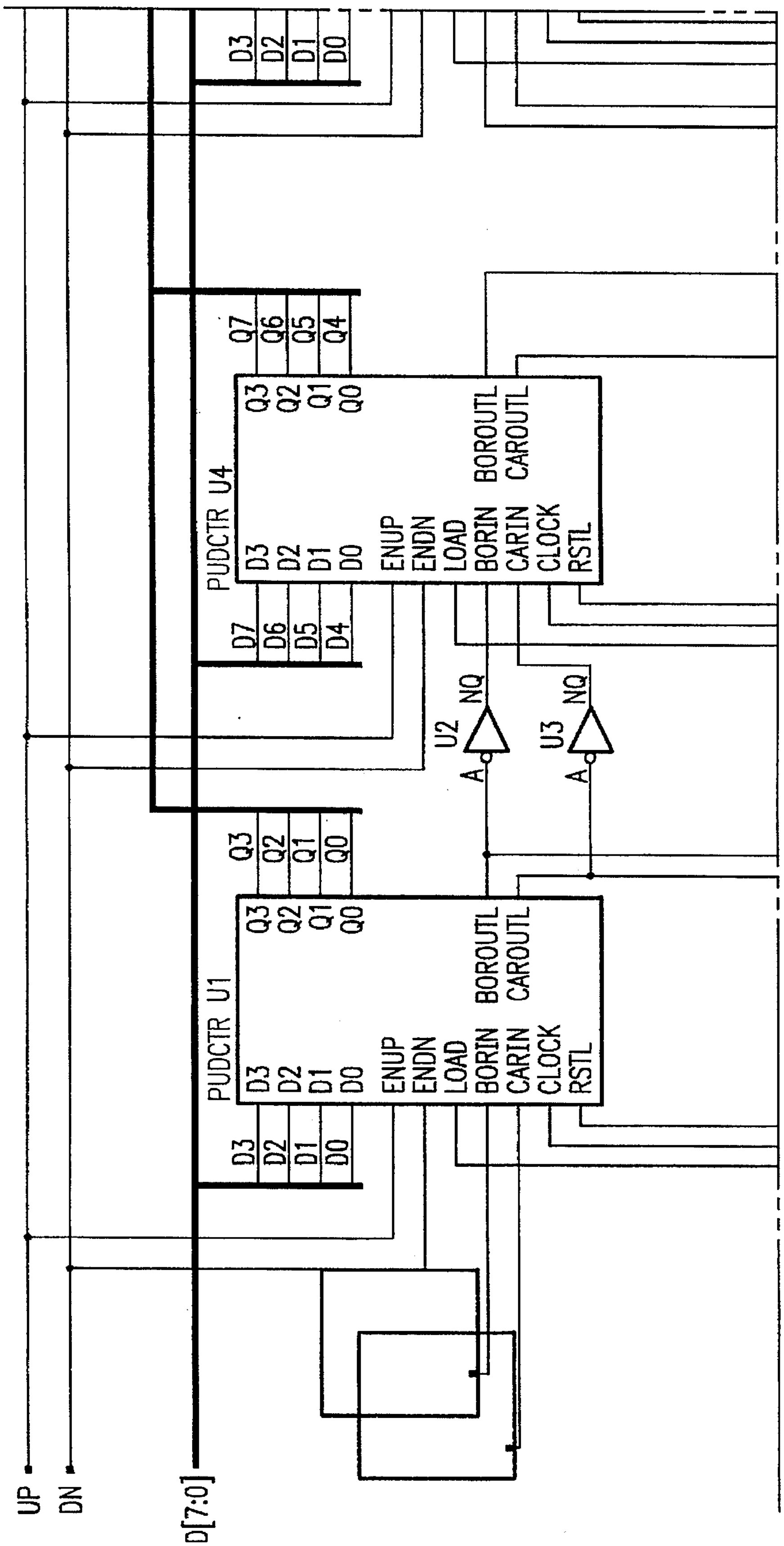
FIGS. 125A, 125B, 125C and 125D illustrate circuit UDC24LR that includes six PUDCTR circuits.
Figure 125B:
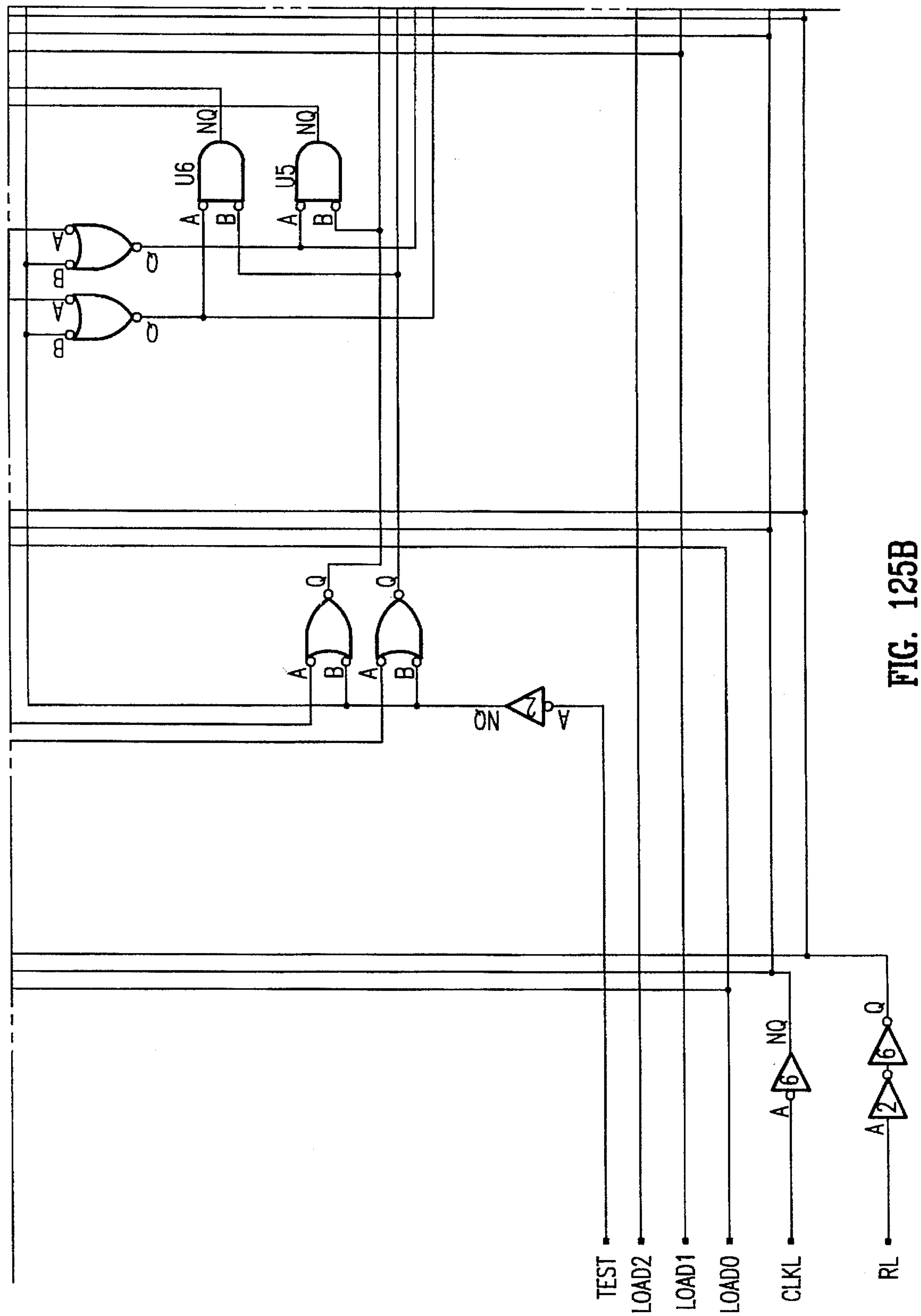
Figures 1, 125C:
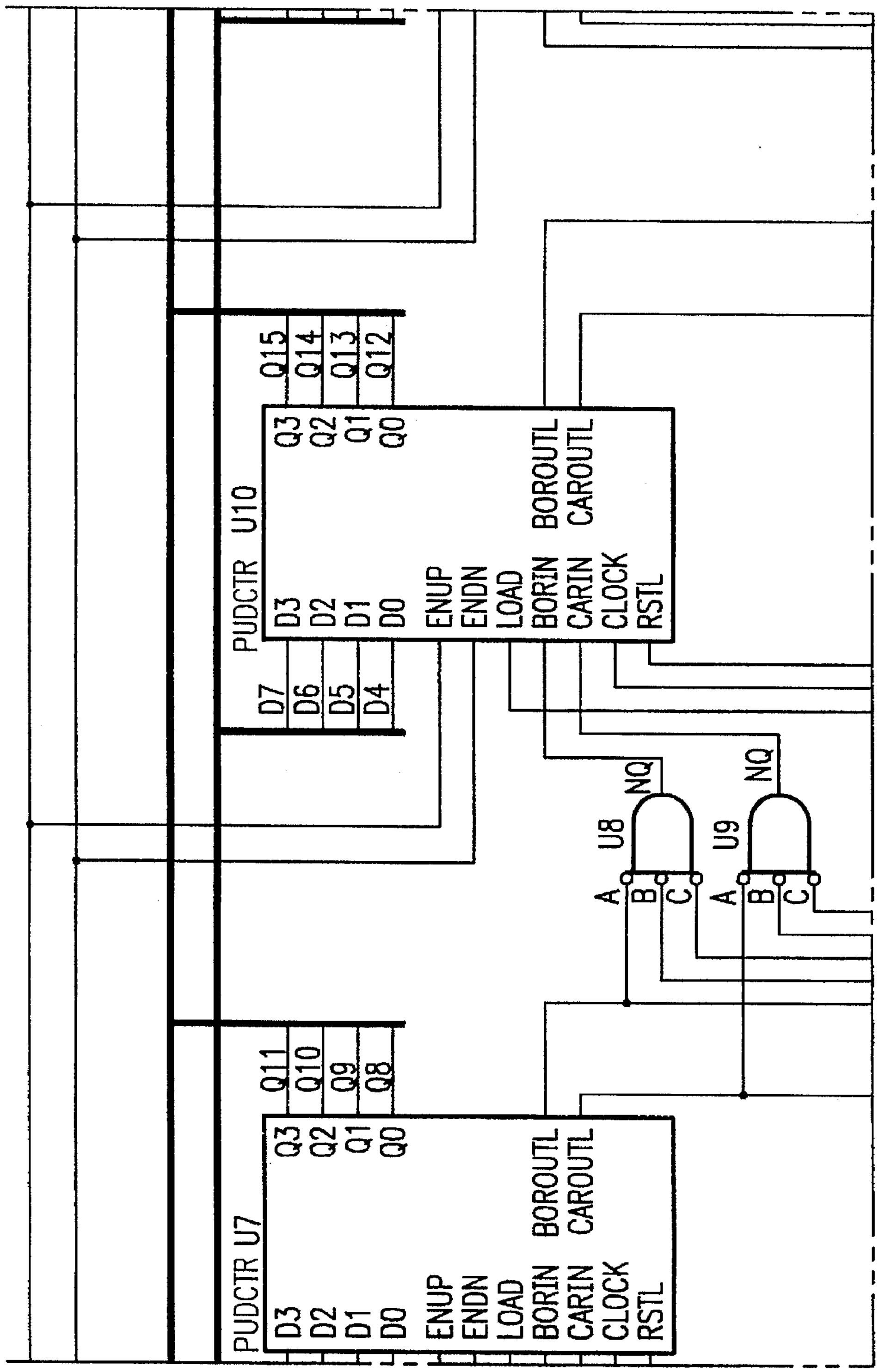
Figures 2, 125C:
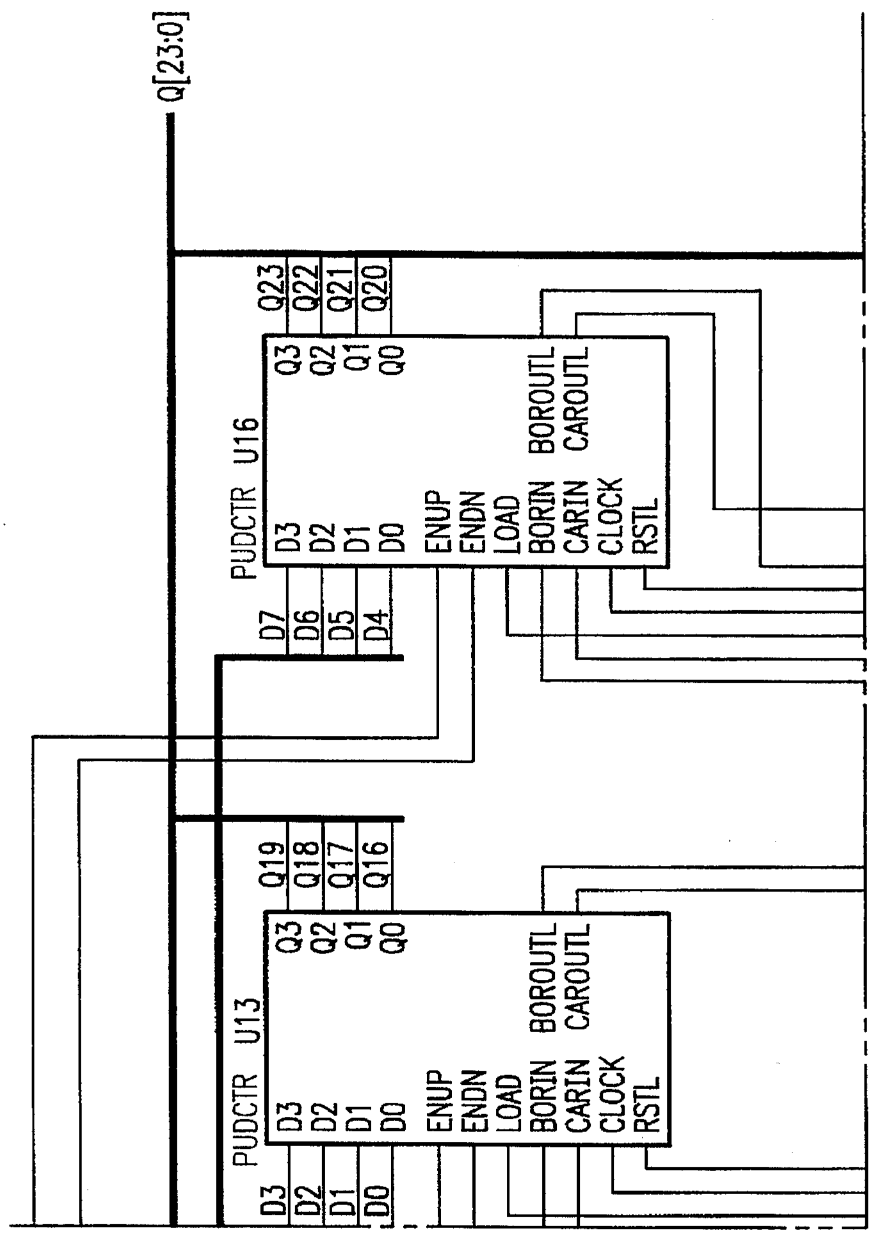
Figures 1, 125D:
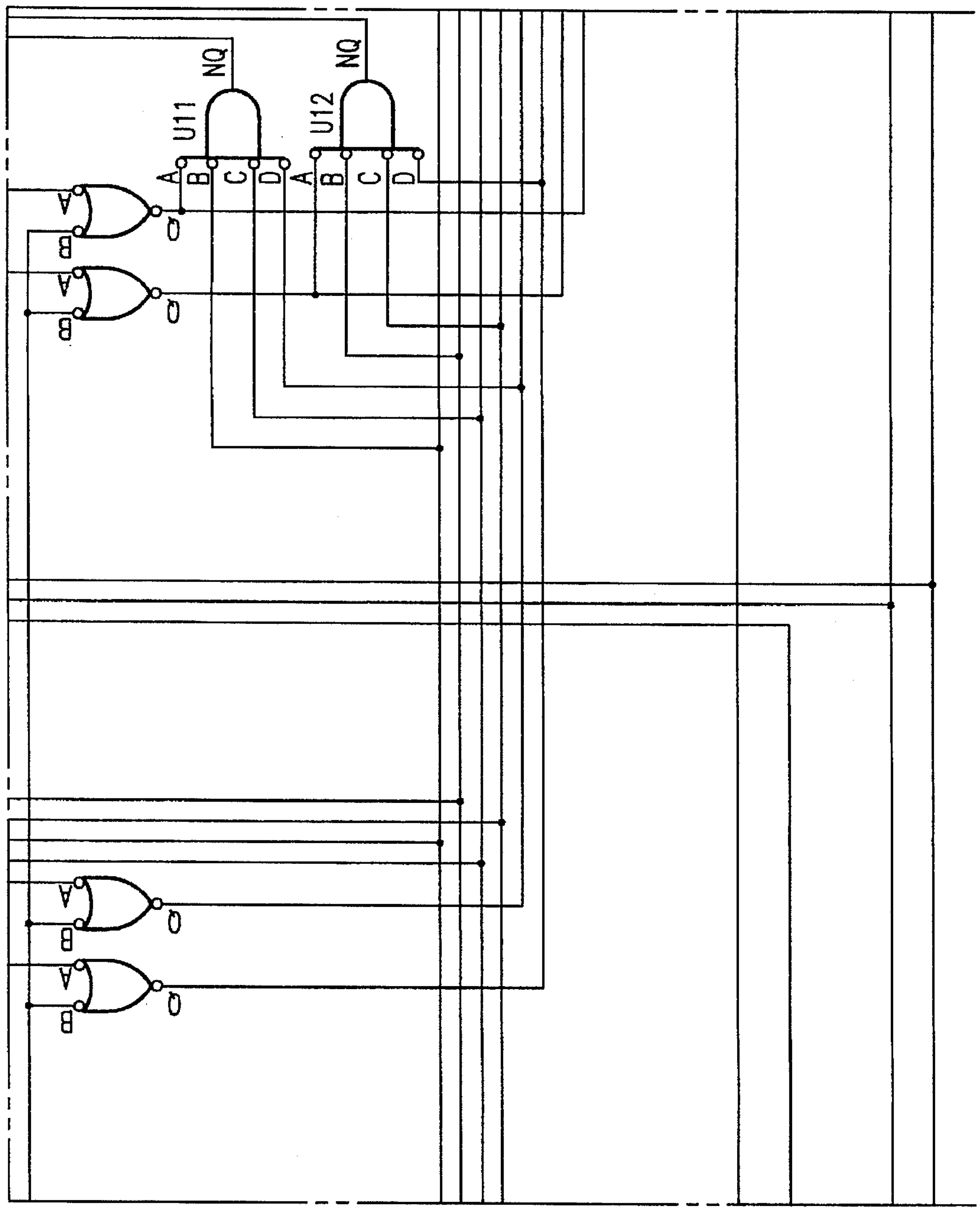
Figures 2, 125D:
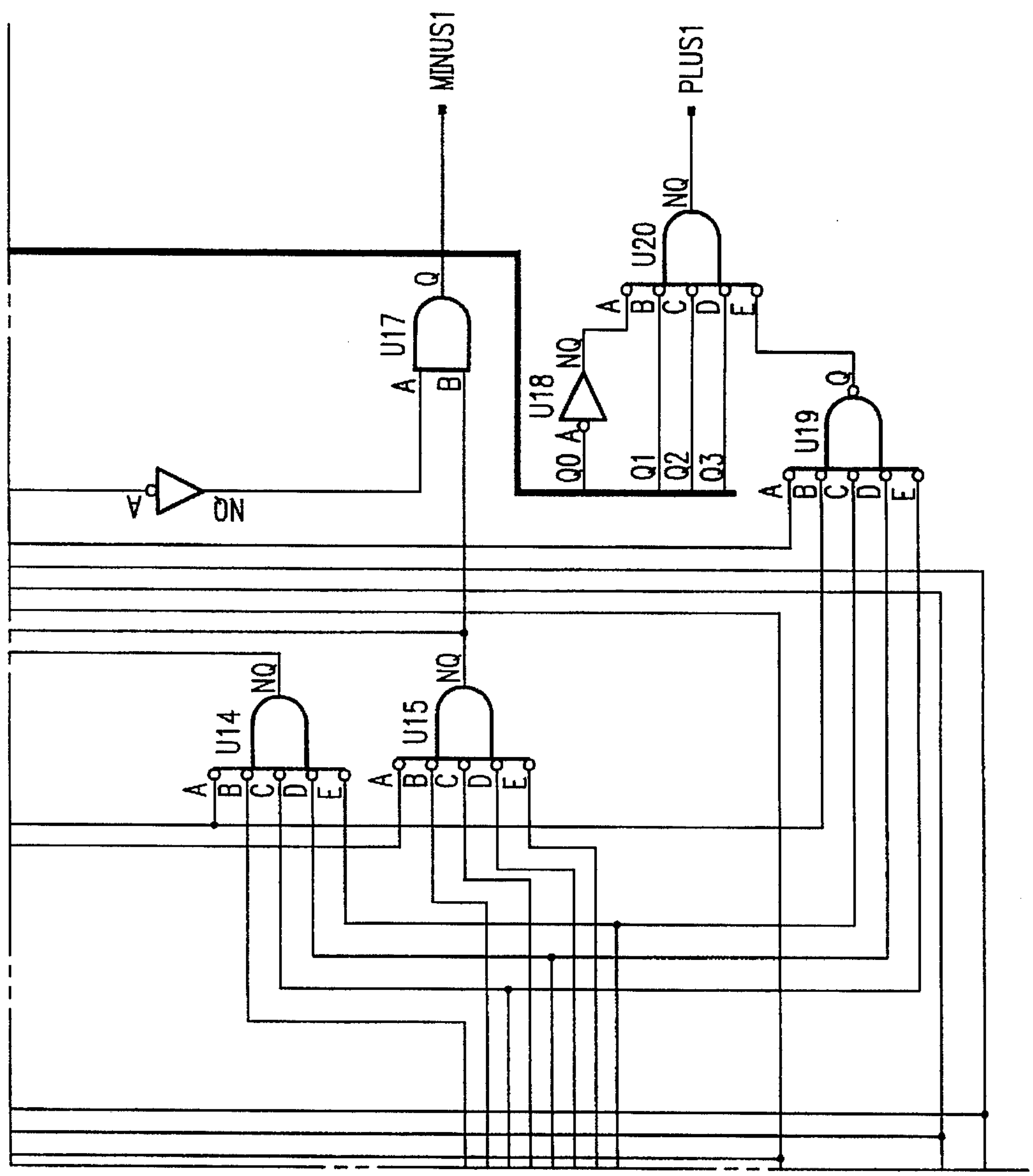
Figure 126A:
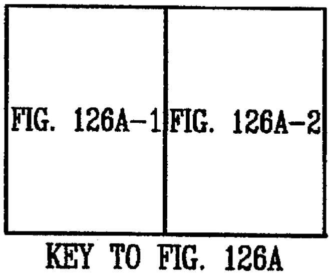
FIGS. 126A and 126B illustrate circuit PUDCTR.
Figure 1:
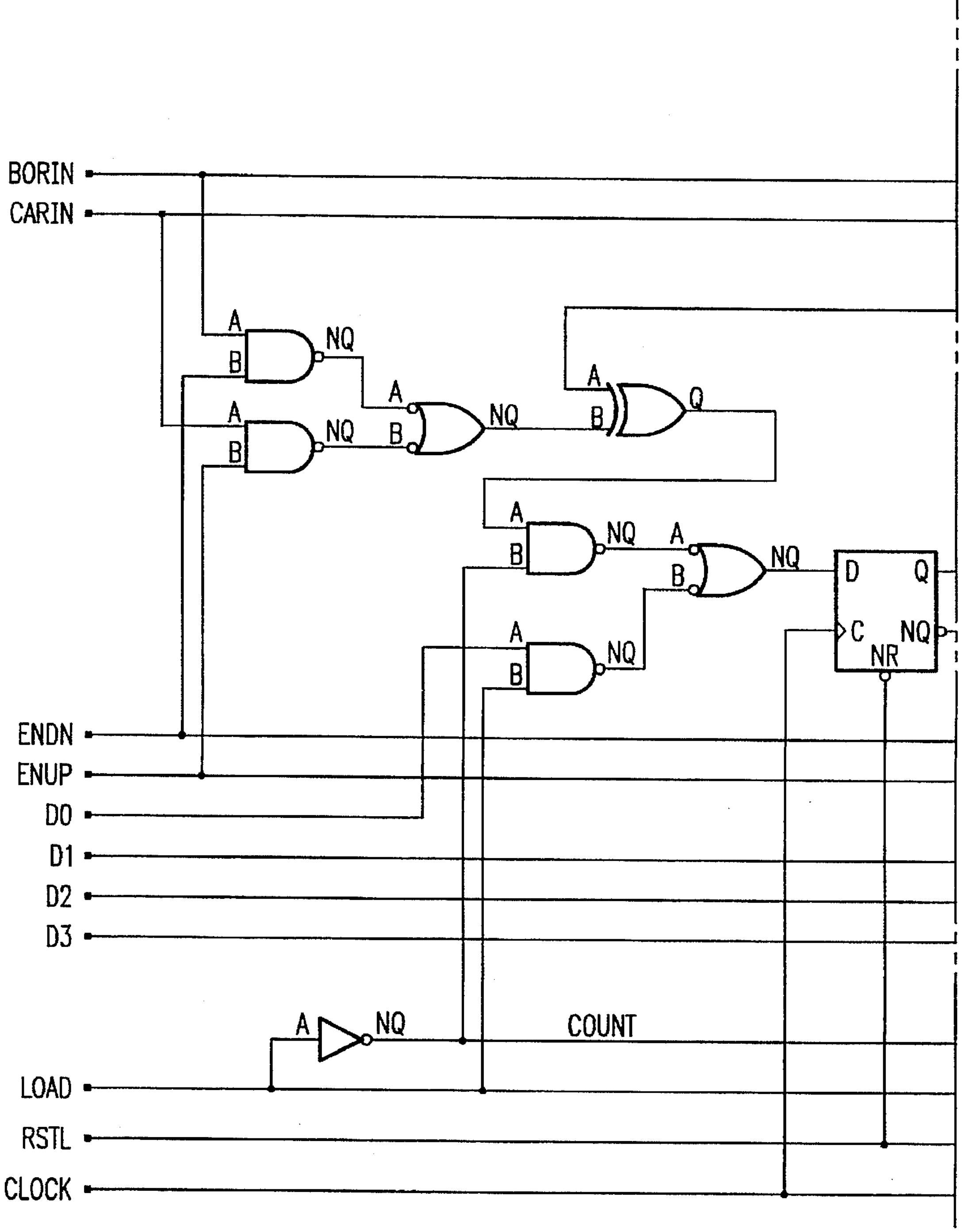
Figures 2, 126A:
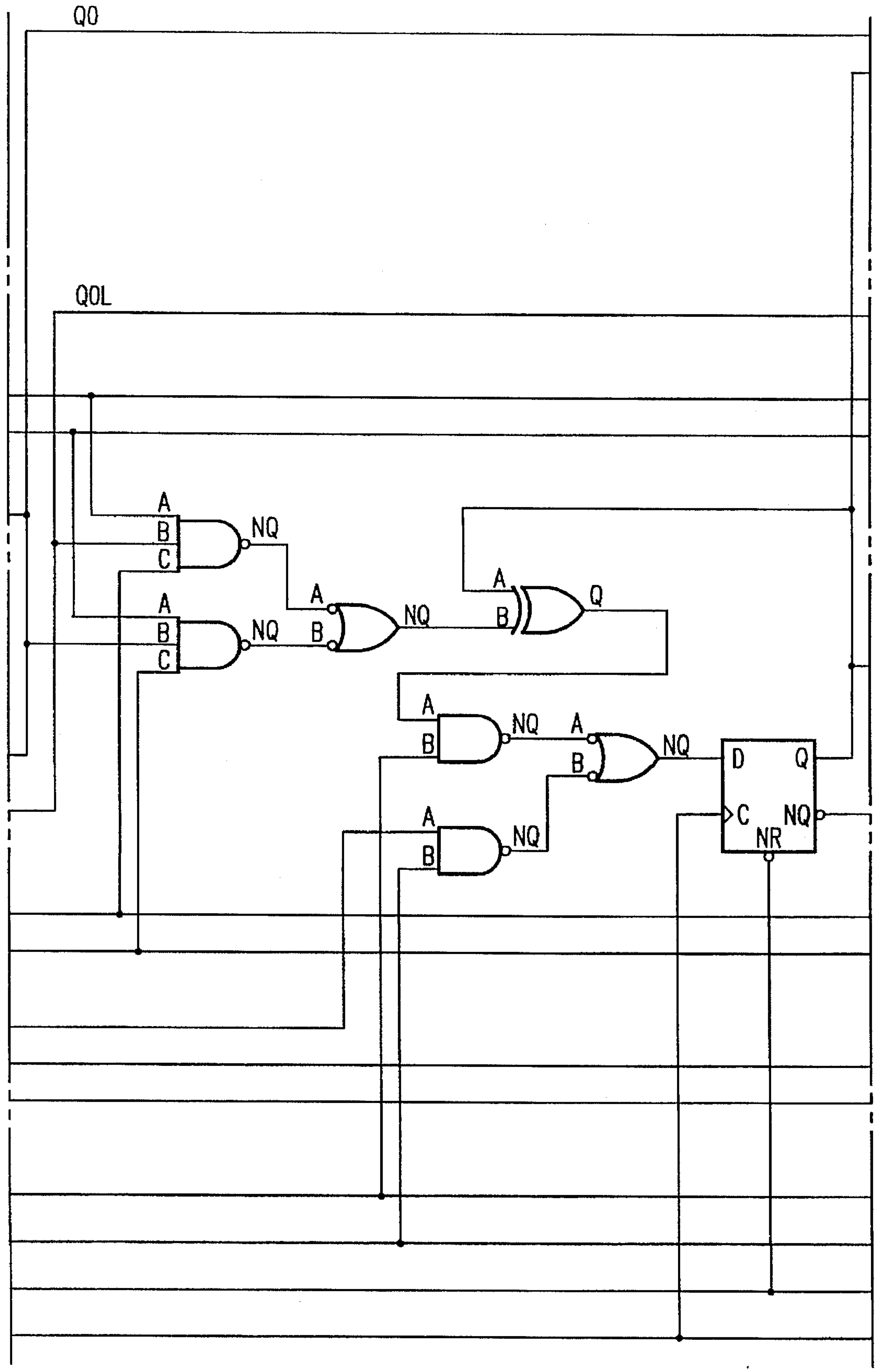
Figures 1, 126B:
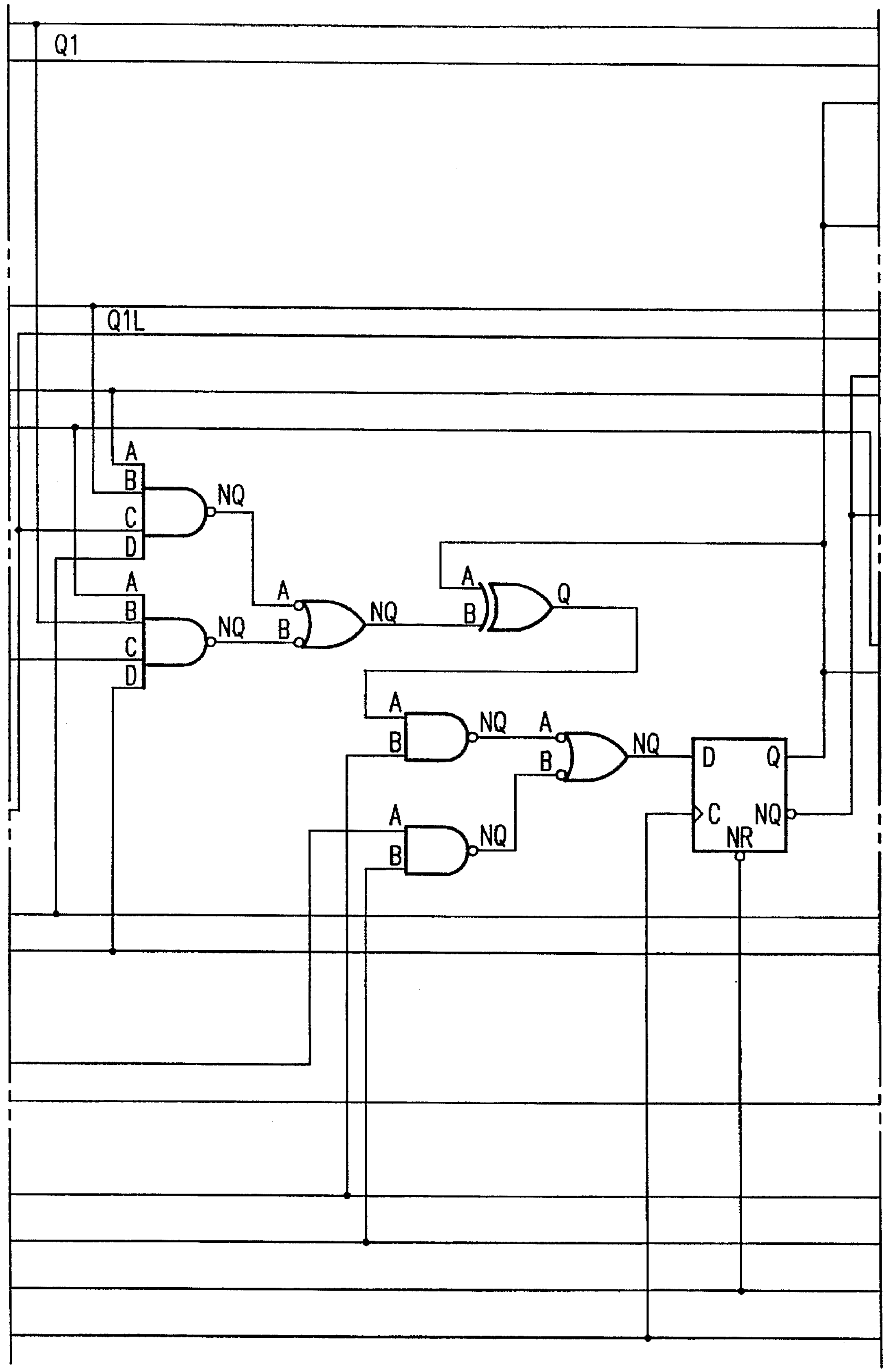
Figures 2, 126B:
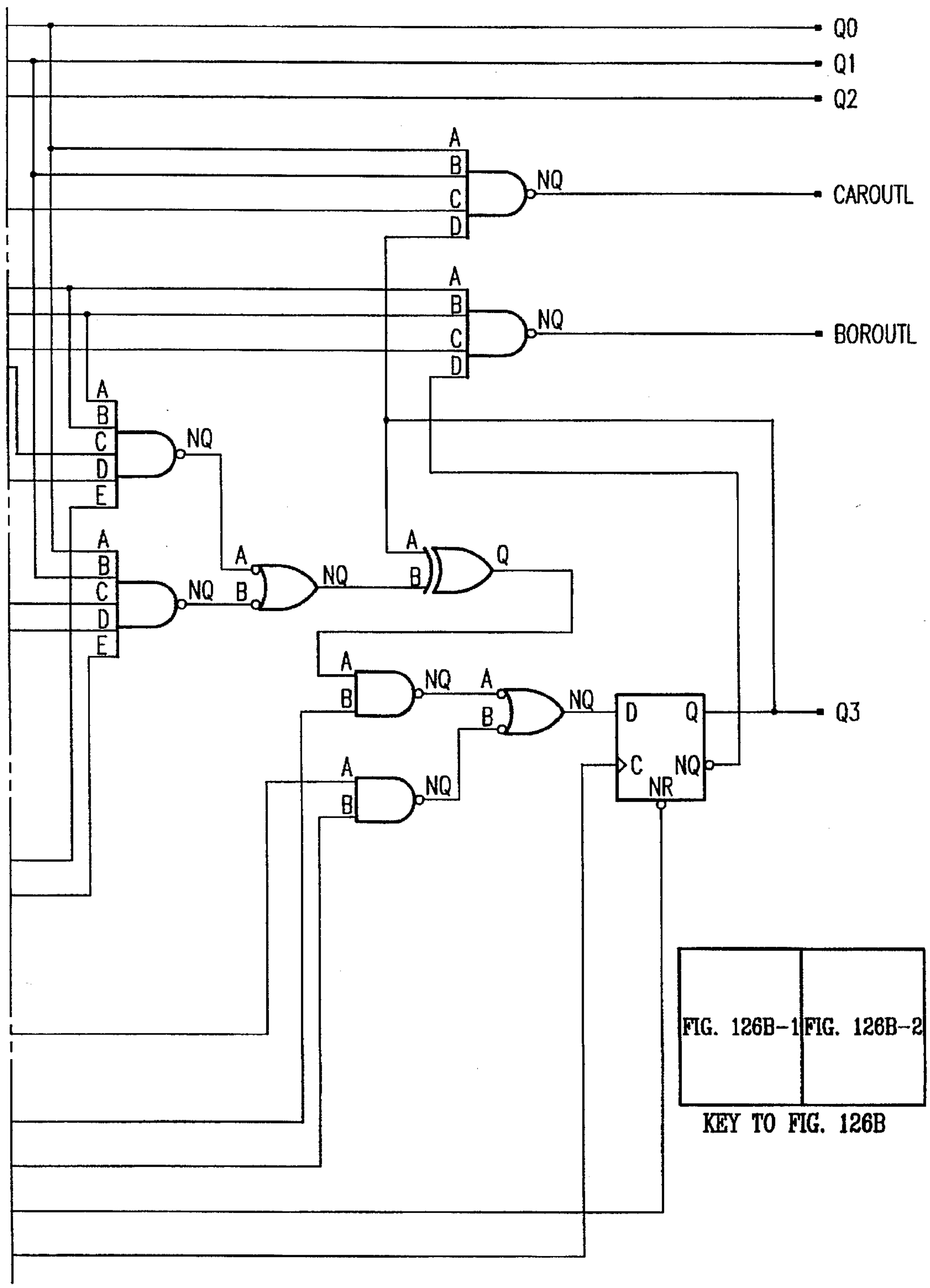

Circuit PHASECTL (FIG. 113B) is the SCSI phase control circuit and is illustrated in more detail in FIG. 122. Circuit STCOUNT (FIG. 113B) is the transfer count logic and as illustrated in FIGS. 123A, 123B includes circuits STCNTREG and UDC24LR. Circuit STCNT is illustrated in FIGS. 124A and 124B and includes the eight registers of circuit DFFC00X8 described previously. Note that circuit STCNT includes registers STCNT0 and STCNT1 (FIG. 8A). Circuit UDC24LR is illustrated in FIGS. 125A through 125D and includes six PUDCTR circuits. Circuit PUDCTR is illustrated in more detail in FIGS. 126A and 126B.

Figures 2, 127A:
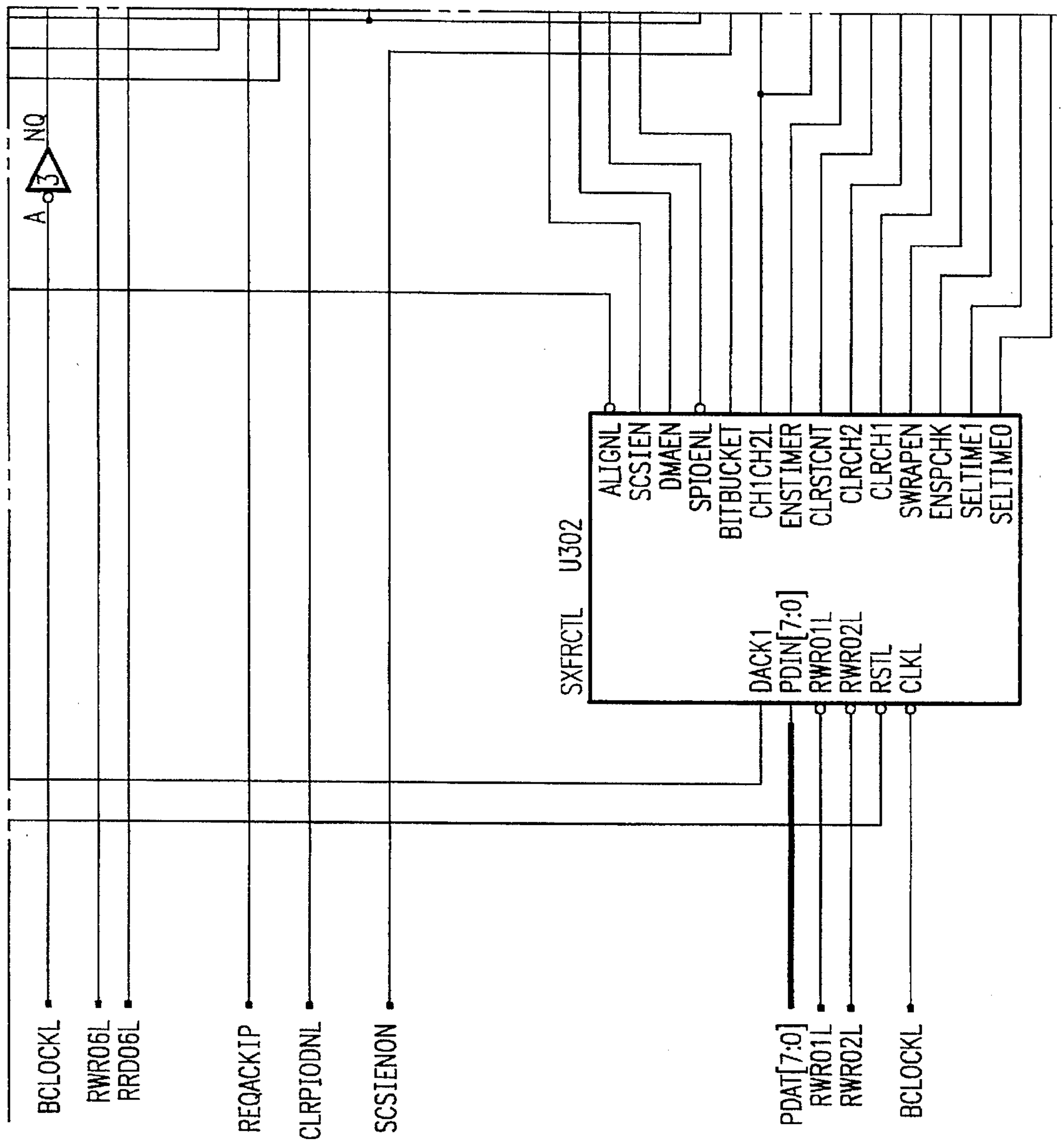
FIGS. 127A and 127B illustrate the third portion of circuit SCSI, that includes circuits SXFRCTL, SFIFOCTL, PIOCTL, and XFRCTL.
Figure 127B:
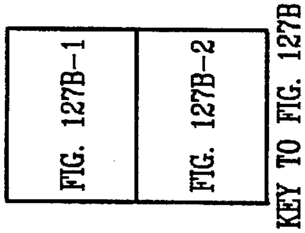
Figure 1:
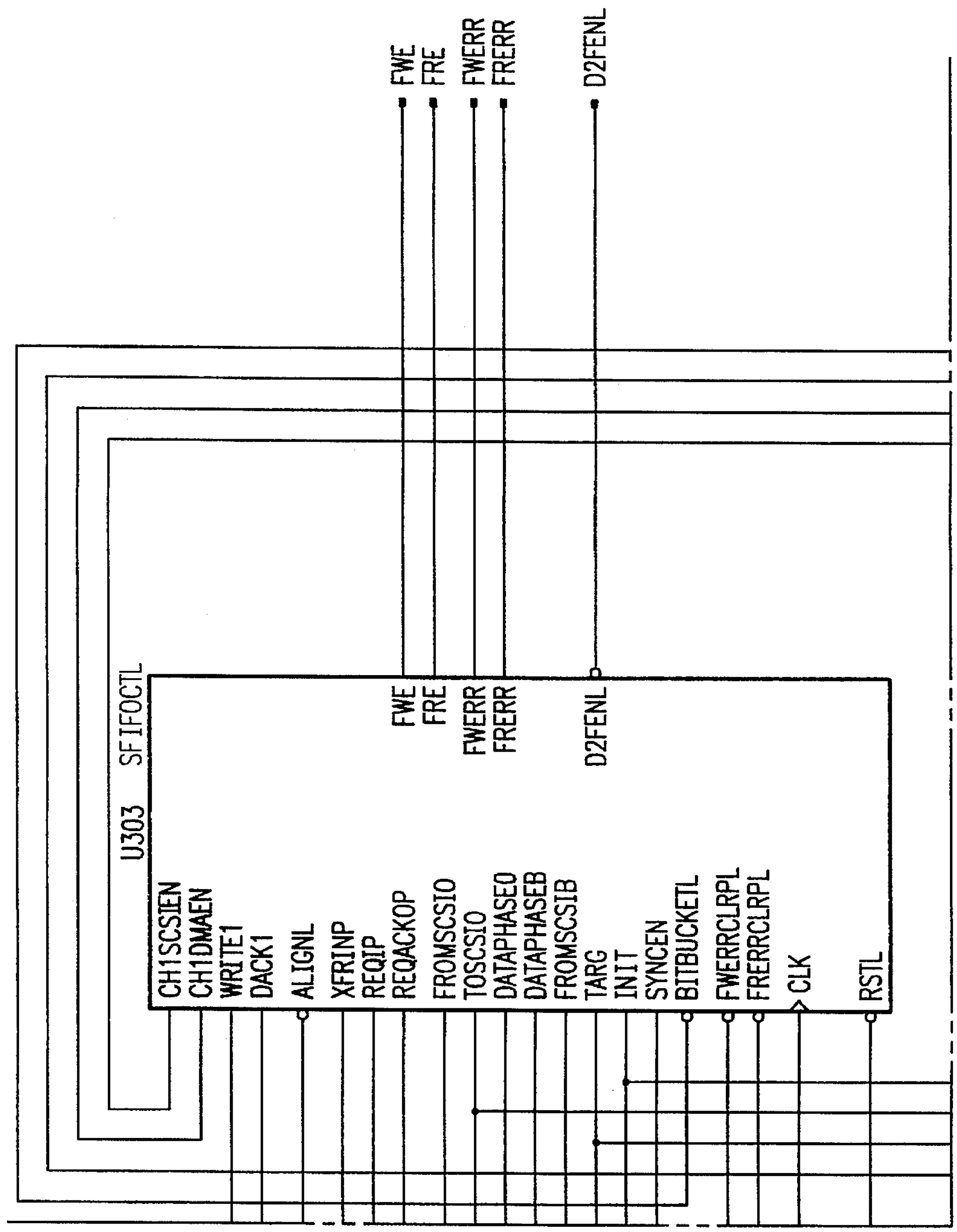
Figures 2, 127B:
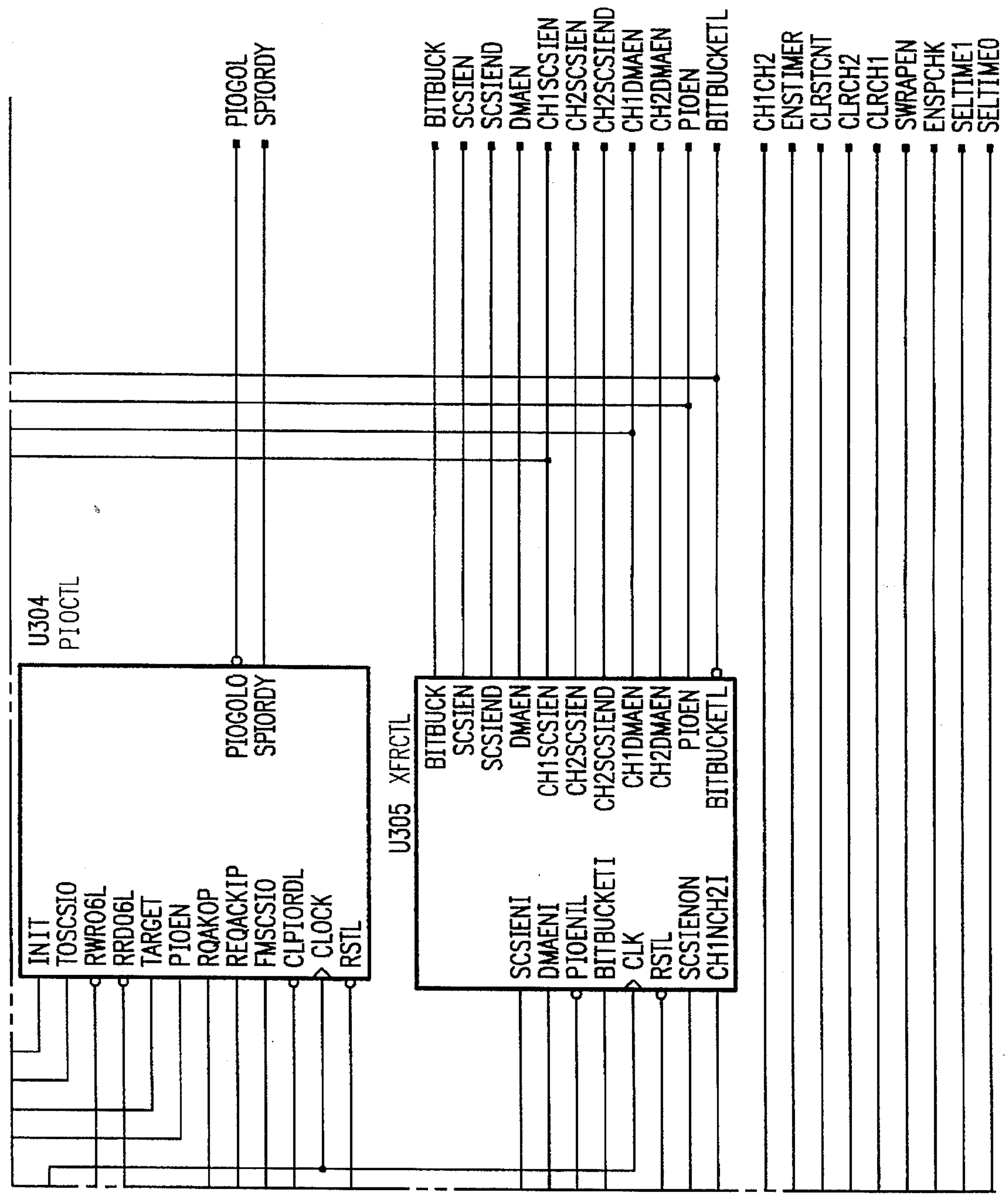
Figures 1, 128A:
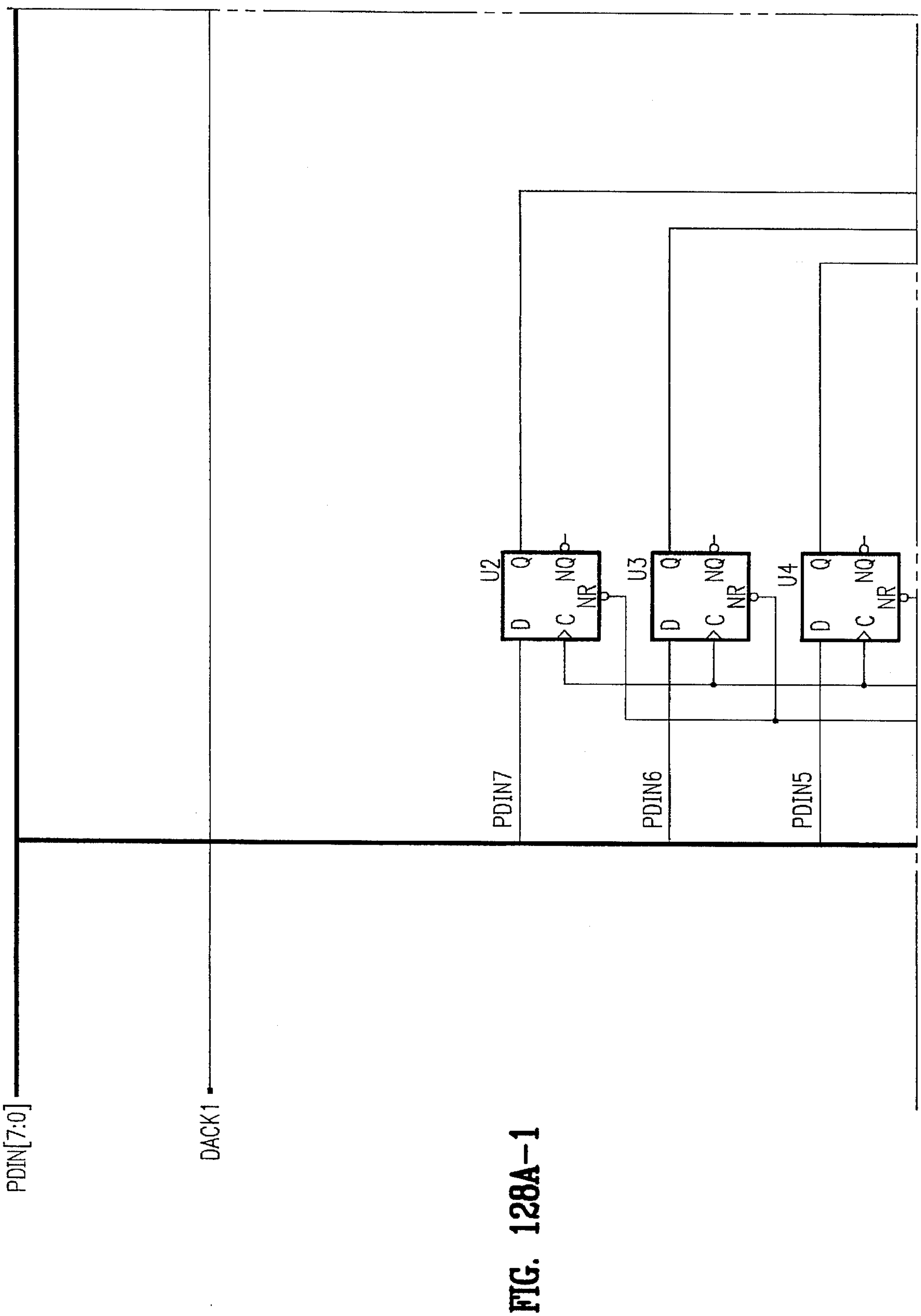
FIGS. 128A and 128B illustrate circuit SXFRCTL.
Figures 2, 128A:
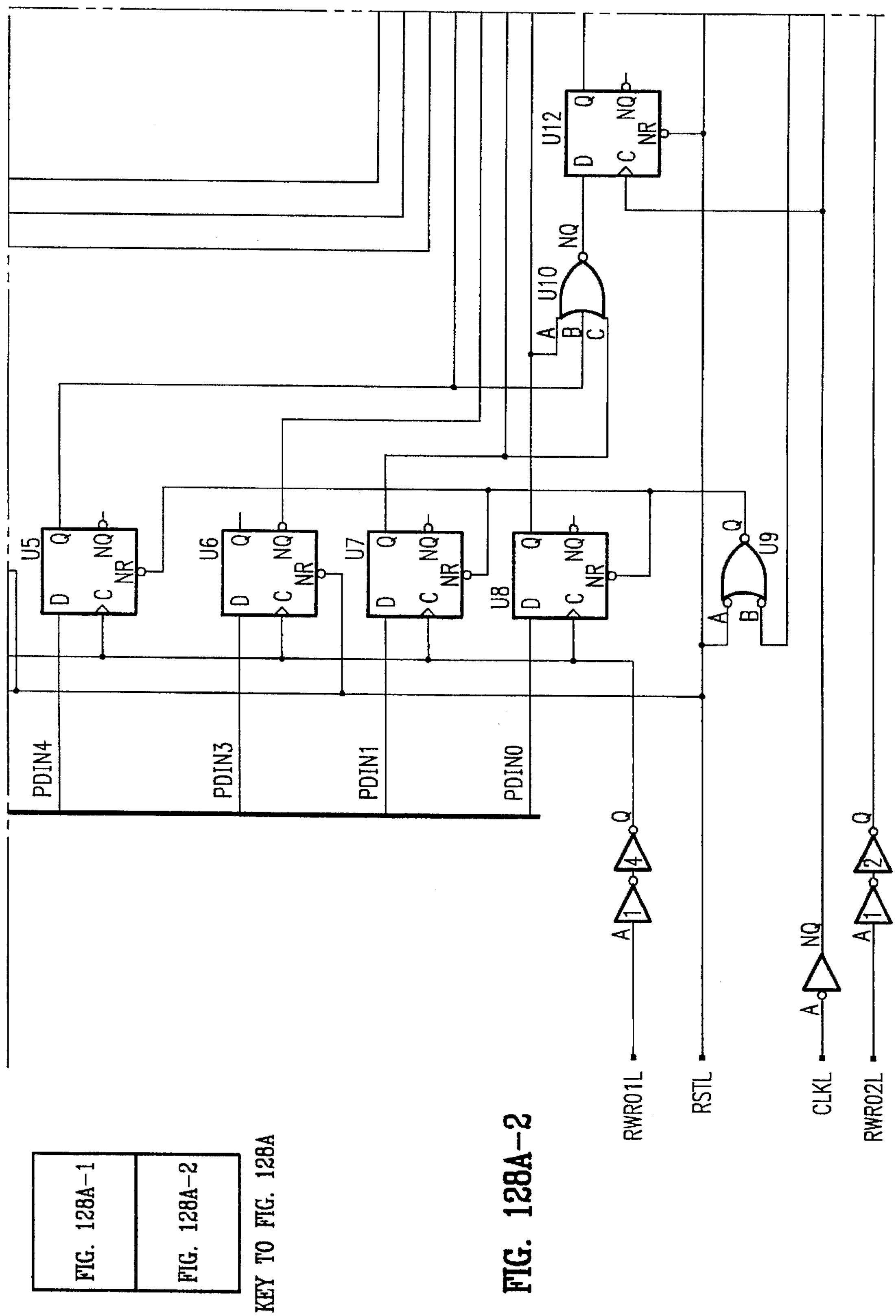
Figures 1, 128B:
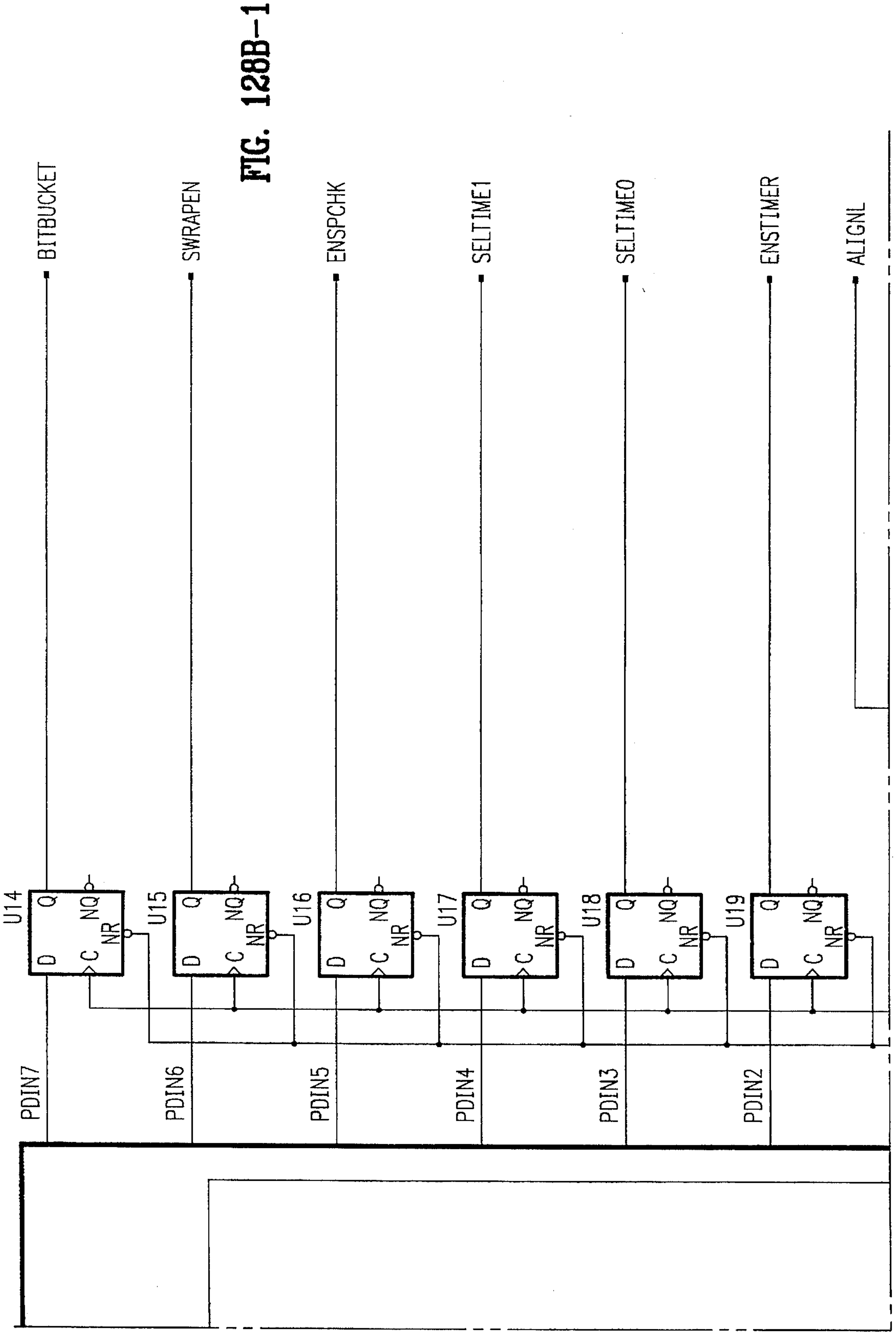
Figures 2, 128B:
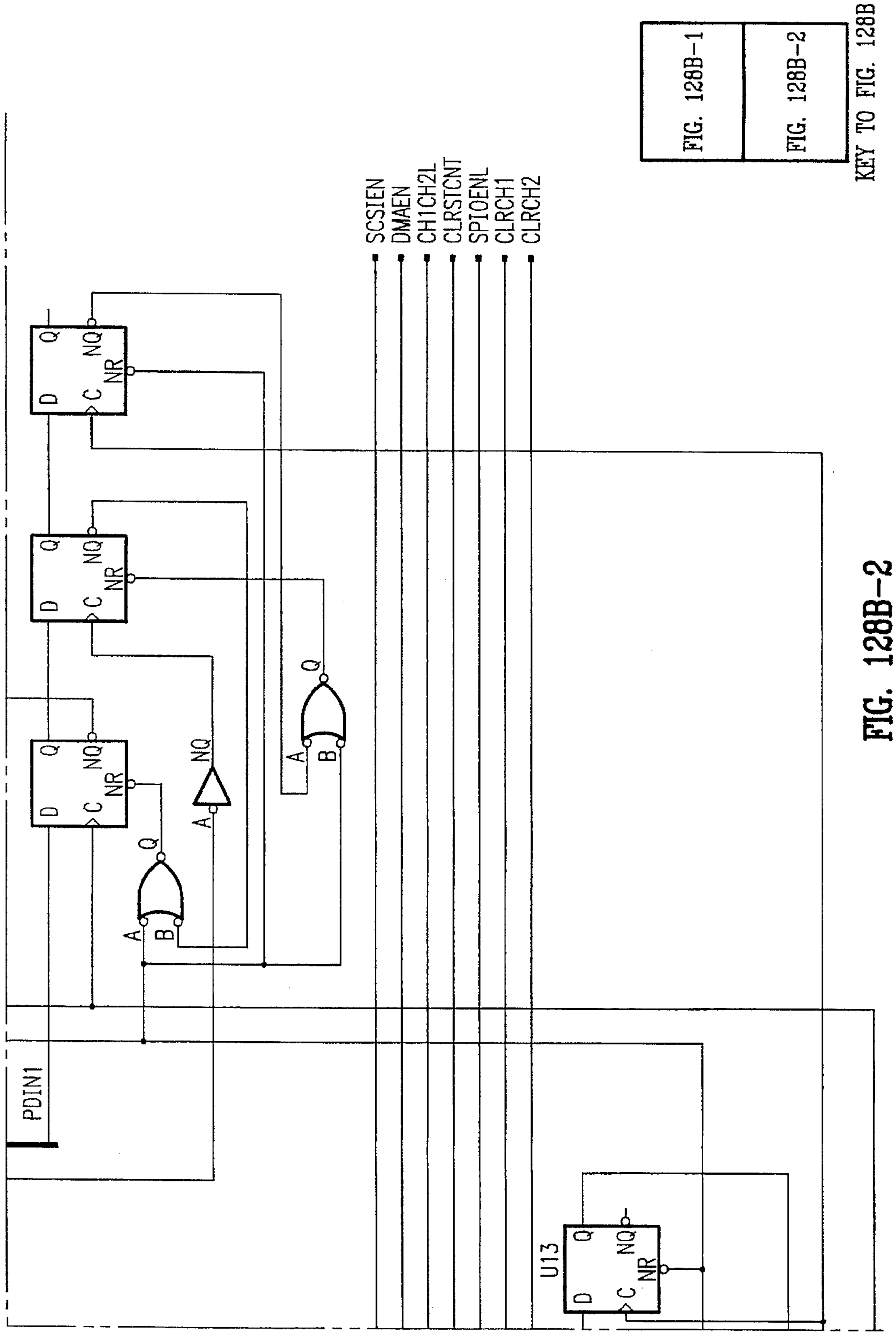
Figure 129A:
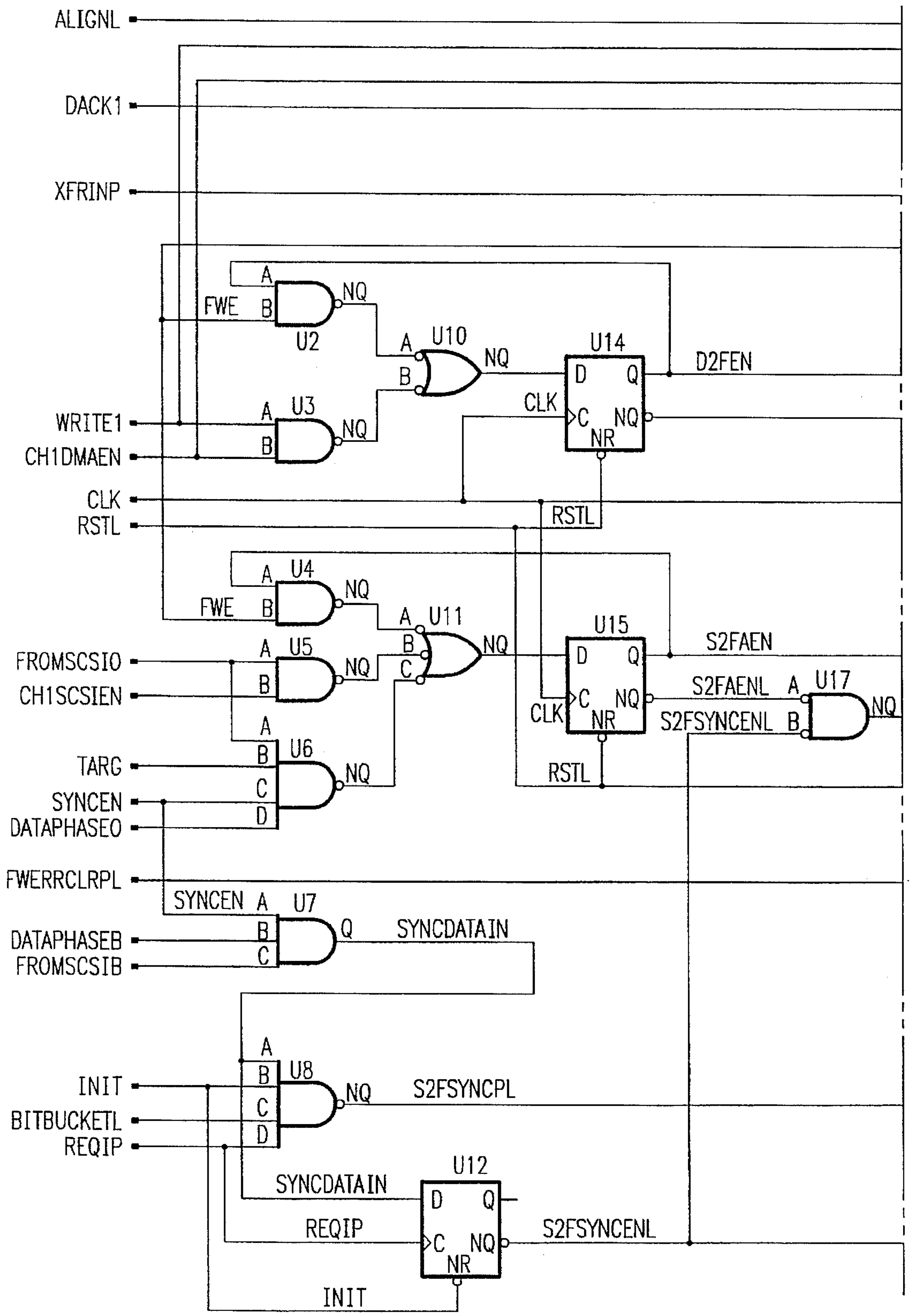
FIGS. 129A and 129B illustrate the FIFO read control logic circuit SFIFOCTL.
Figure 129B:
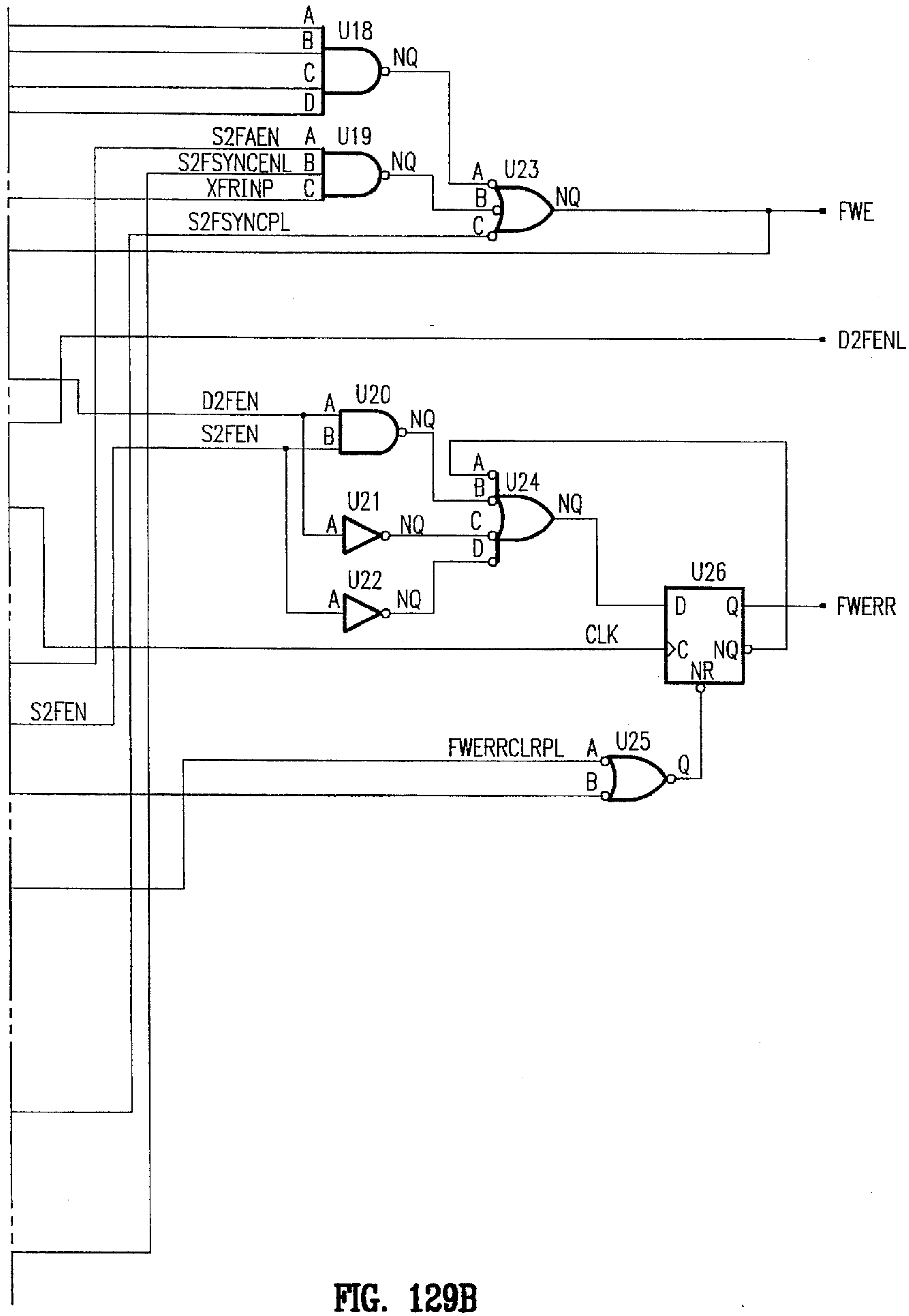
Figure 130A:
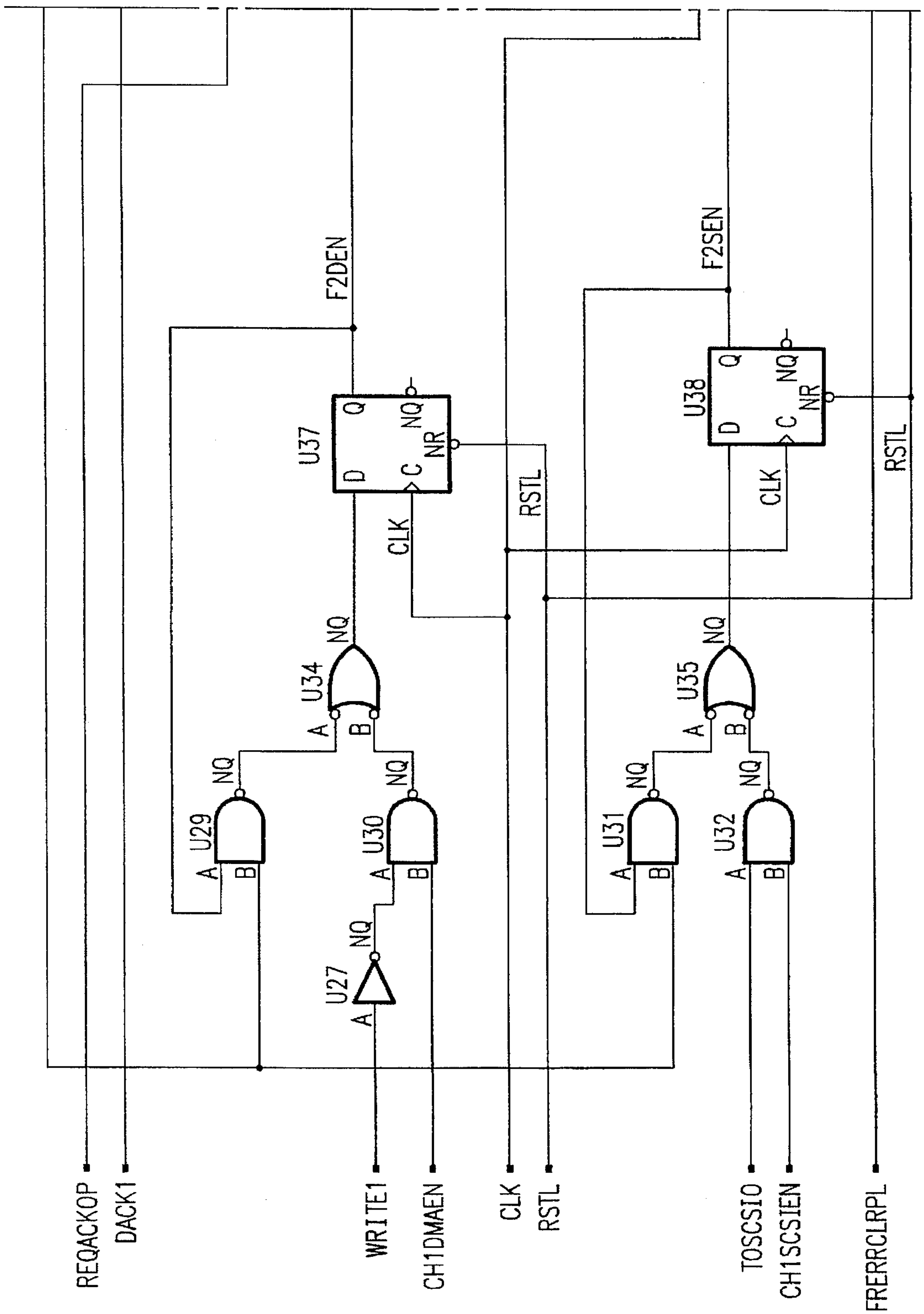
FIGS. 130A and 130B illustrate FIFO read control logic circuit SFIFOCTL.
Figure 130B:
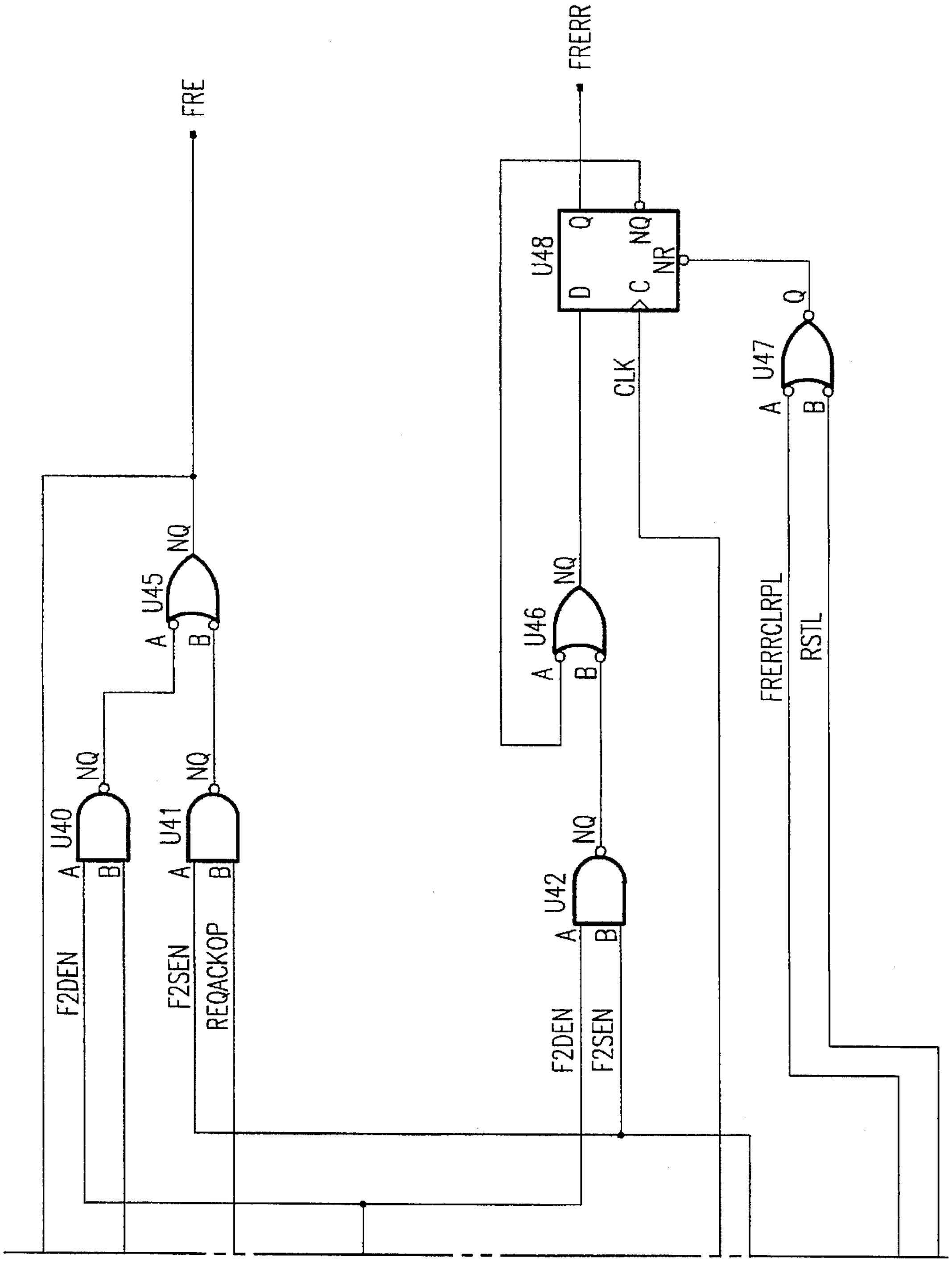

The third portion of circuit SCSI is illustrated in FIGS. 127A and 127B. This portion of circuit SCSI is the DMA, PIO, and FIFO controls. Specifically, as shown in FIGS. 127A and 127B, this circuit includes circuits SXFRCTL, SFIFOCTL, PIOCTL, and XFRCTL. Circuit XFRCTL (FIG. 127A) is the SCSI transfer control and includes registers SXFRCTL0 and SXFRCTL1 (FIG. 8A). As shown in FIGS. 128A and 128B, circuit SXFRCTL generates each of the bits in the two registers. Circuit SFIFOCTL (FIGS. 129A and 129B) is the FIFO write control logic. Circuit SFIFOCTL (FIGS. 130A and 130B) also includes the FIFO read control logic.

Figure 131A:
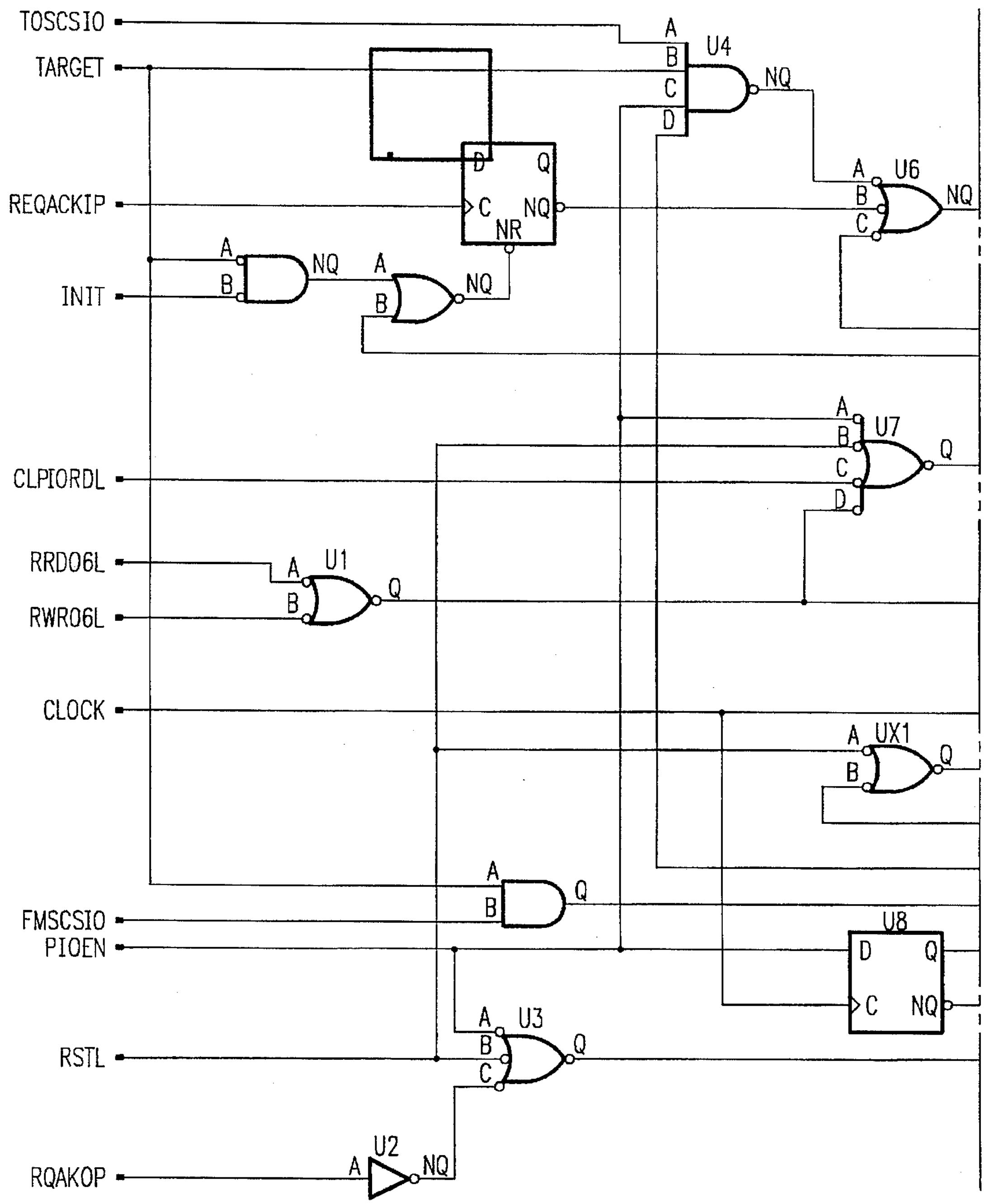
FIG. 131 illustrates PIO control logic circuit PIOCTL of FIG. 127B.
Figure 132A:
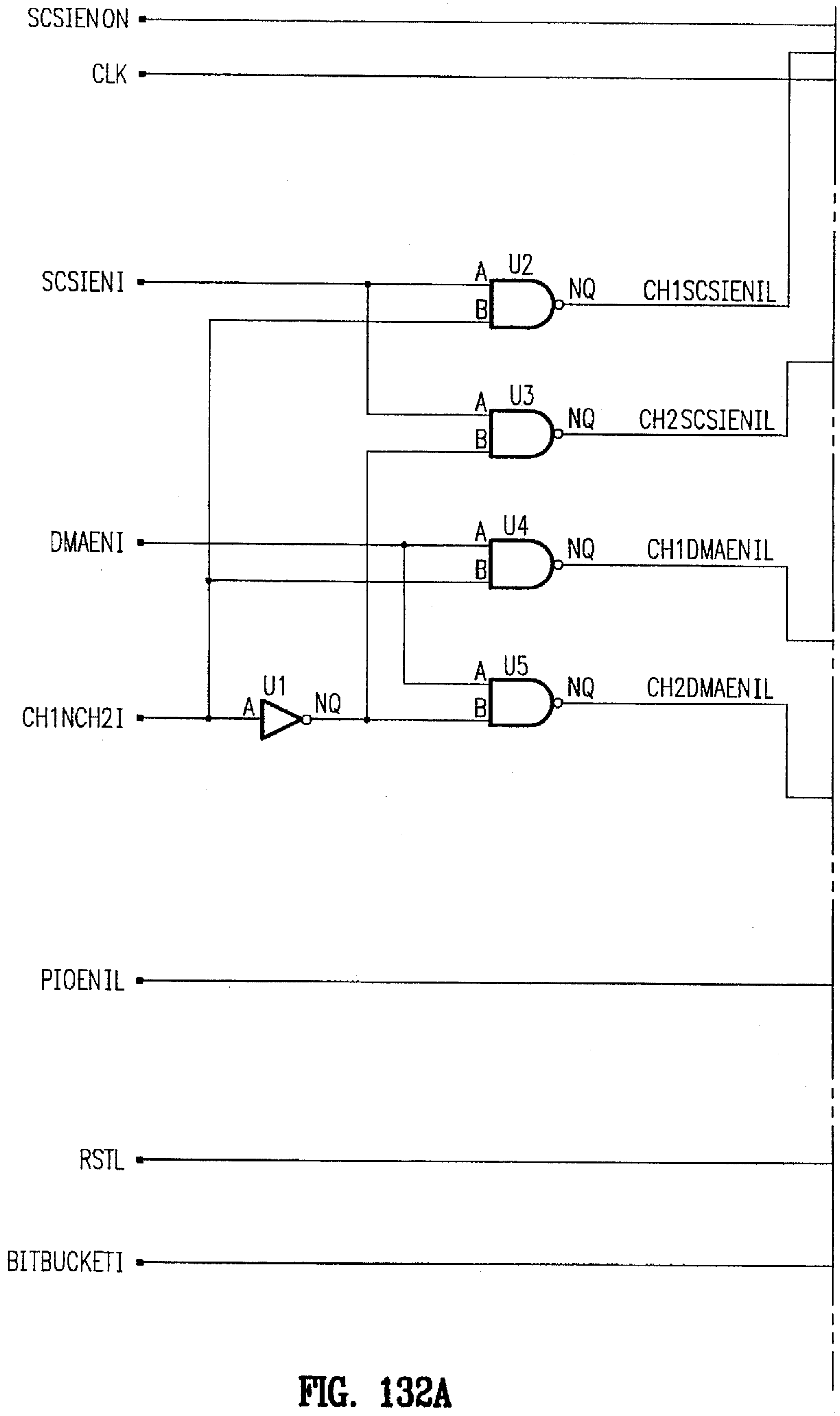
FIGS. 132A and 132B illustrate data transfer control circuit XFRCTL of FIG. 127B.
Figure 132B:
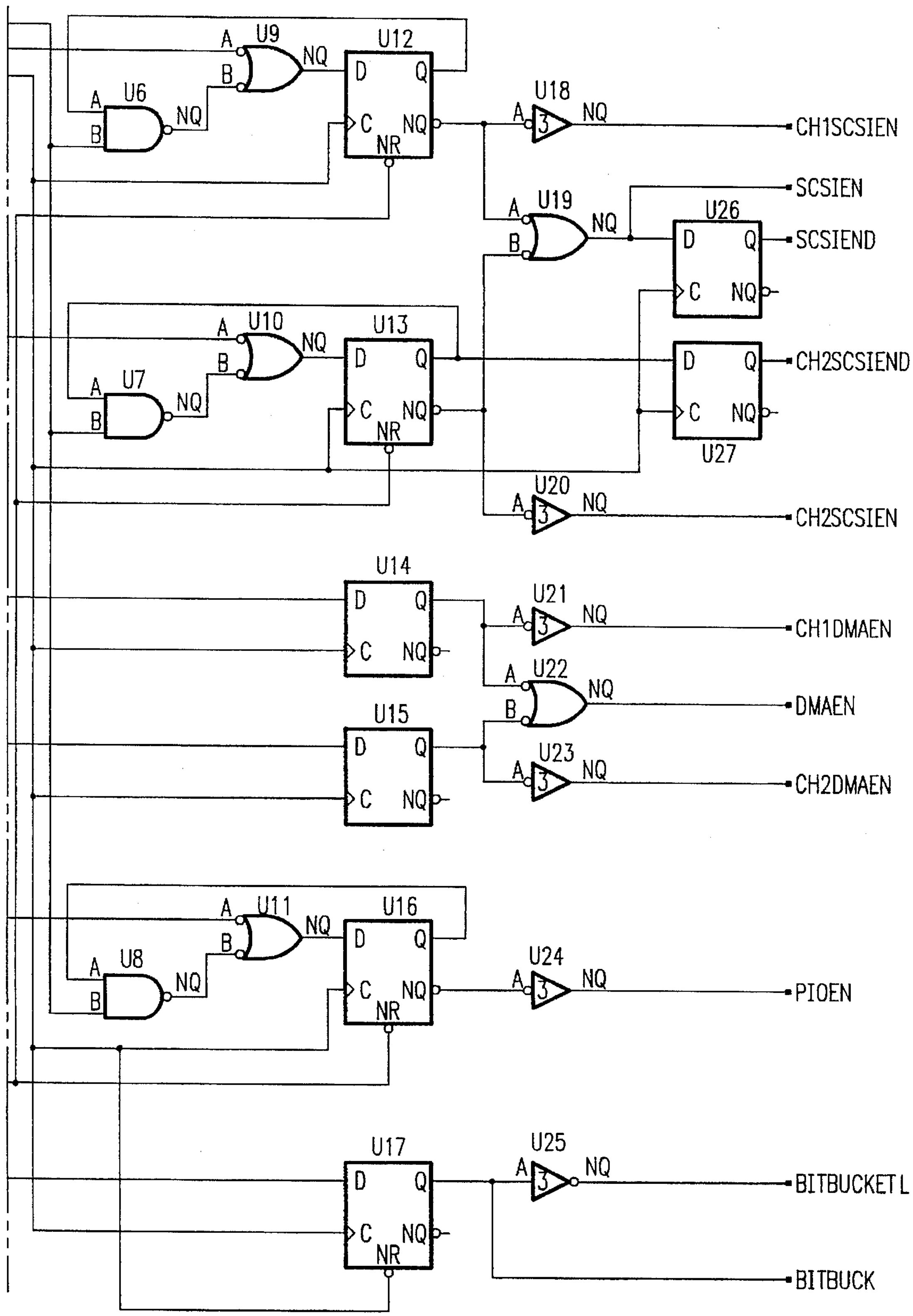

Circuit PIOCTL (FIG. 127B) is the PIO control logic and is shown in more detail in FIG. 131. Circuit PIOCTL generates bit SPIORDY in register SSTAT0 (FIG. 8B). Circuit XFRCTL (FIG. 127B) is the data transfer controls and is illustrated in more detail in FIGS. 132A and 132B.

Figure 133:
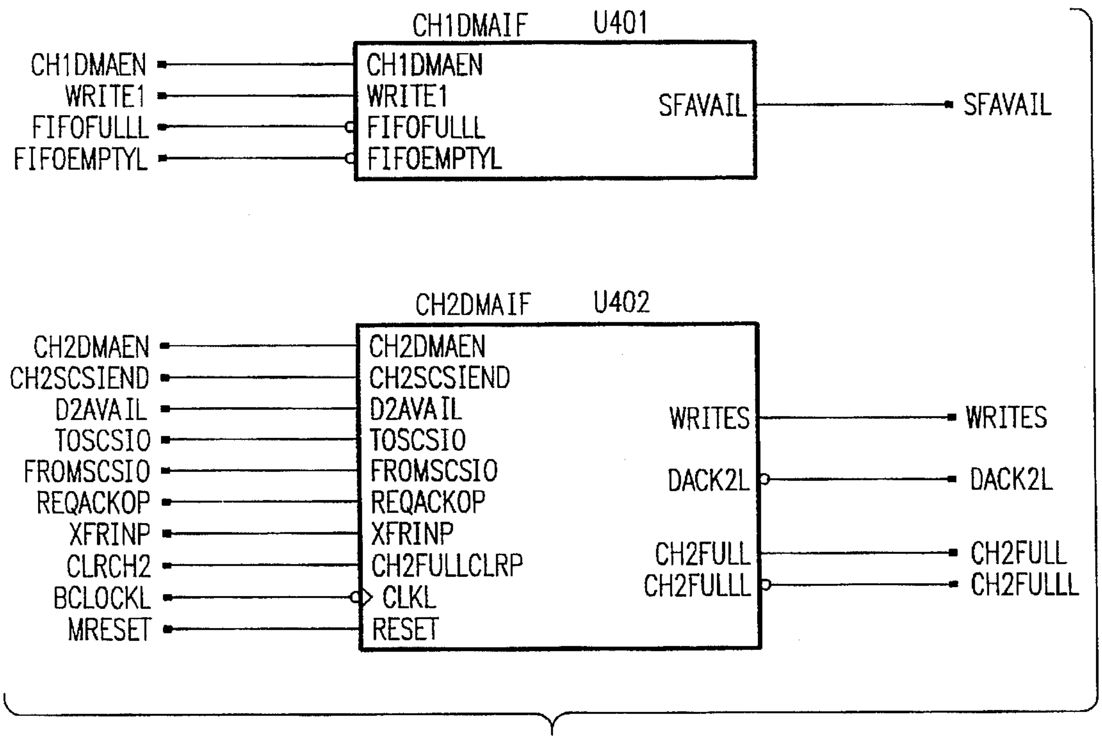
FIG. 133 is the fourth part of circuit SCSI and is the DMA channel 1 and channel 2 interface.
Figure 134:
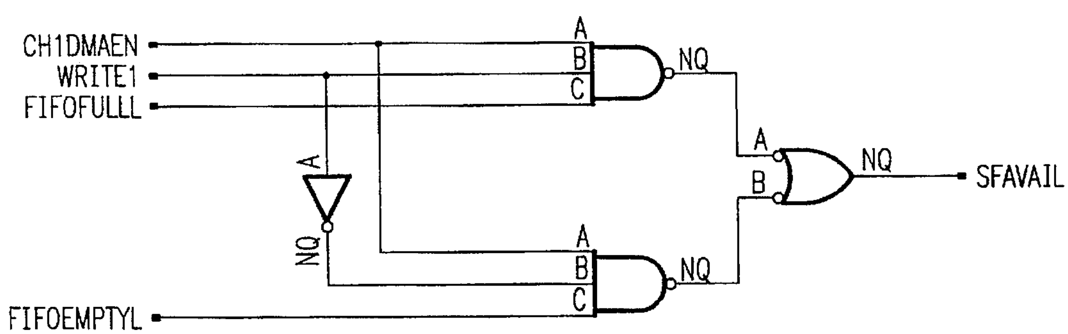
FIGS. 134 and 135 illustrate circuits DH1DMAIF and CH2DMAIF in more detail.
Figure 135:
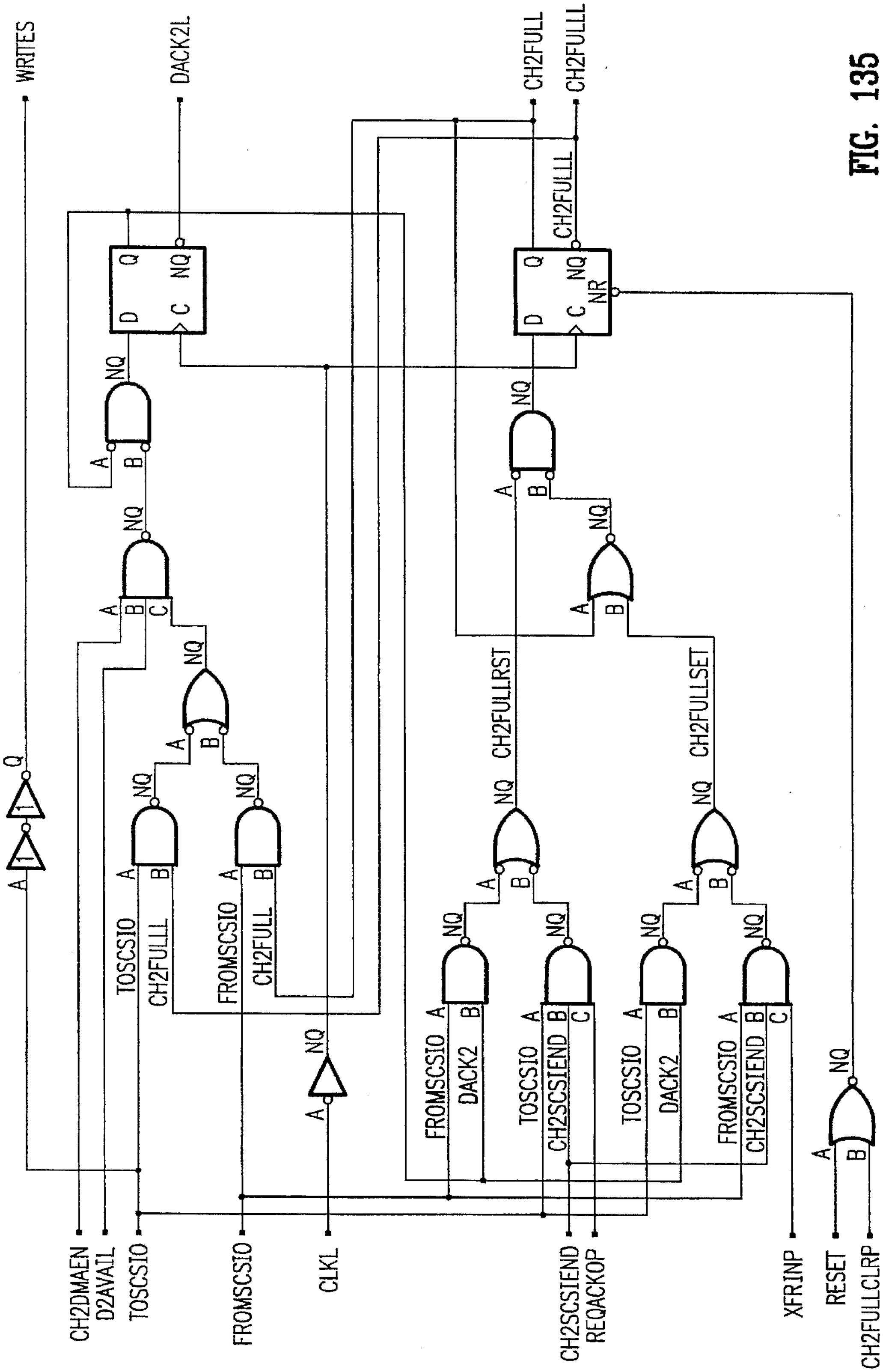

FIG. 133 is the fourth part of circuit SCSI and is the DMA channel 1 and channel 2 interface. As illustrated in FIG. 133, this circuit includes circuits CH1DMAIF and CH2DMAIF. These circuits are illustrated in more detail in FIGS. 134 and 135, respectively.

Figures 1, 136A:
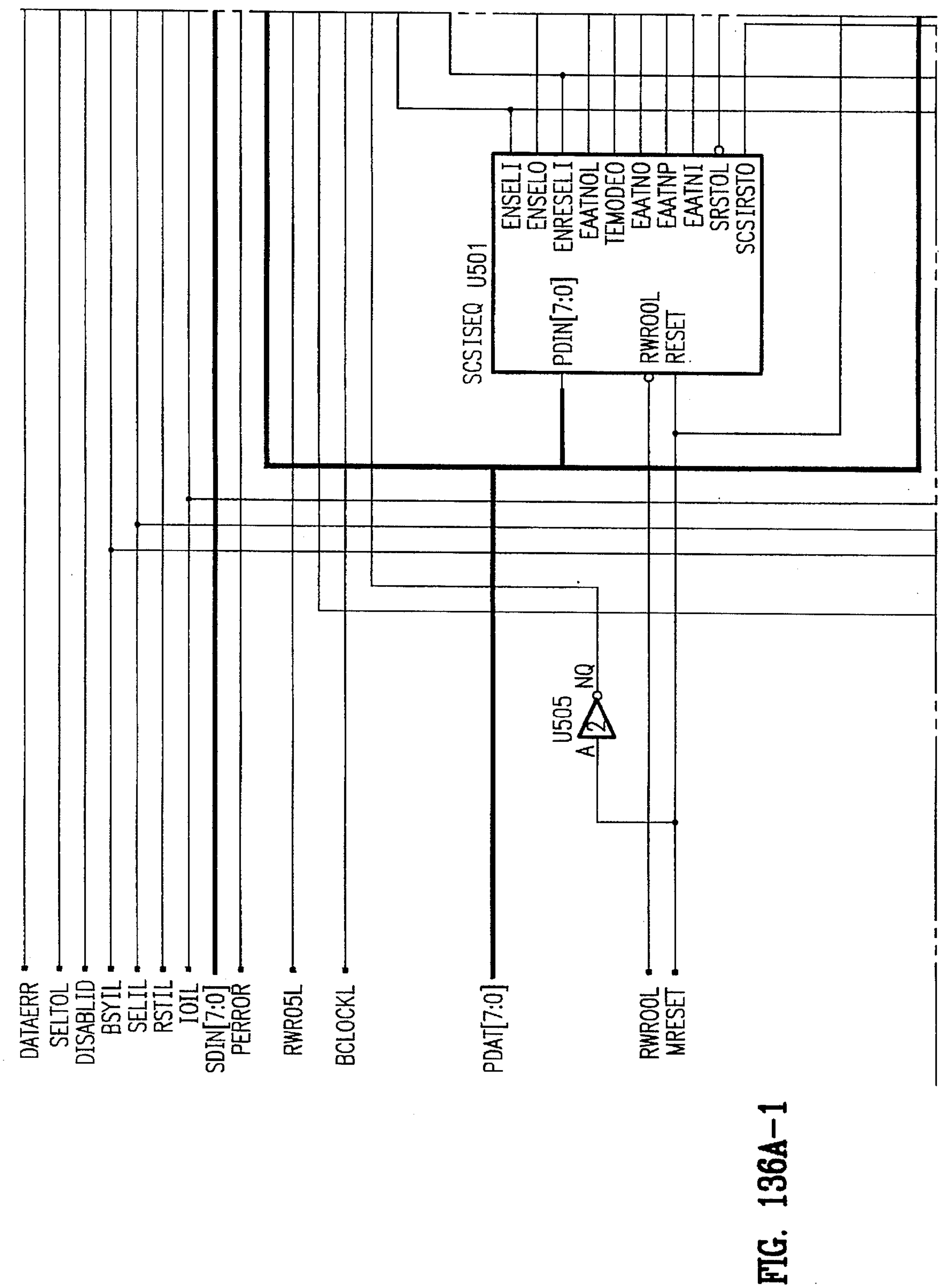
FIGS. 136A, 136B and 136C illustrate the fifth part of circuit SCSI that includes circuits SCSISEQ, AUTOCON, SCSISIG, and GRP1MUX.
Figures 1, 136B:
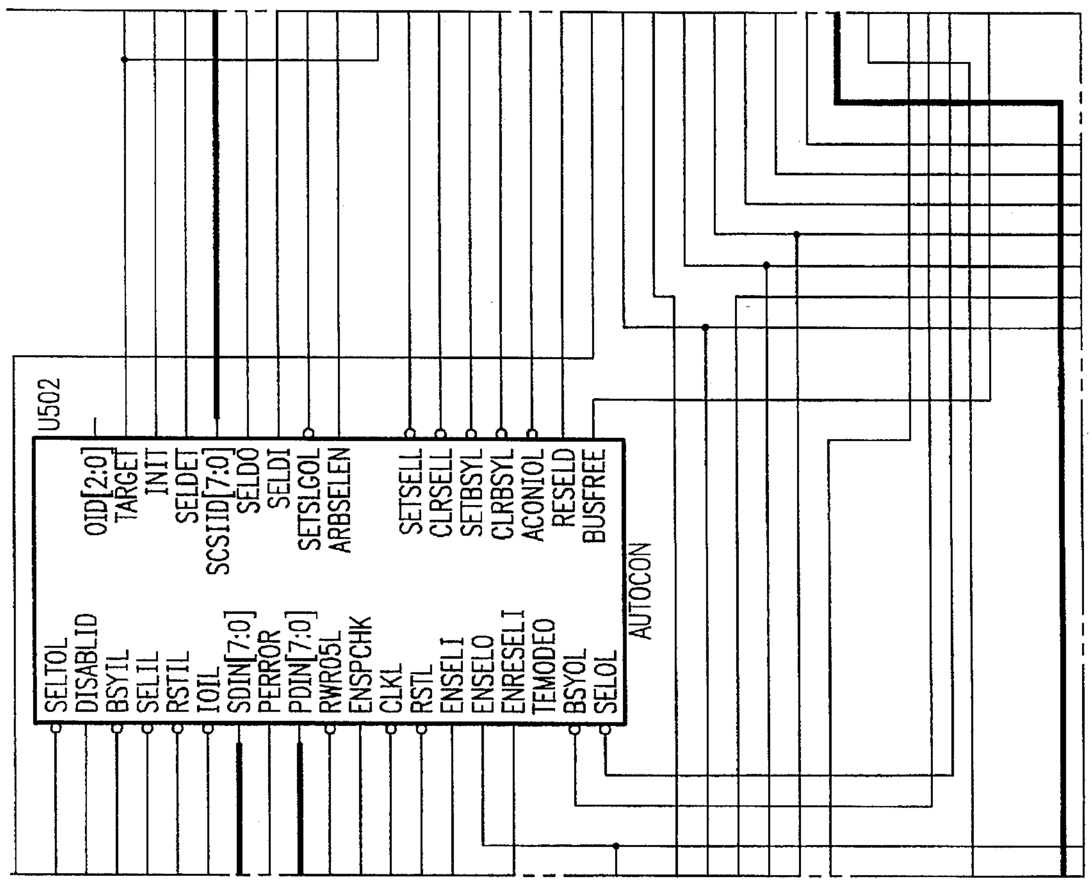
Figures 1, 136C:
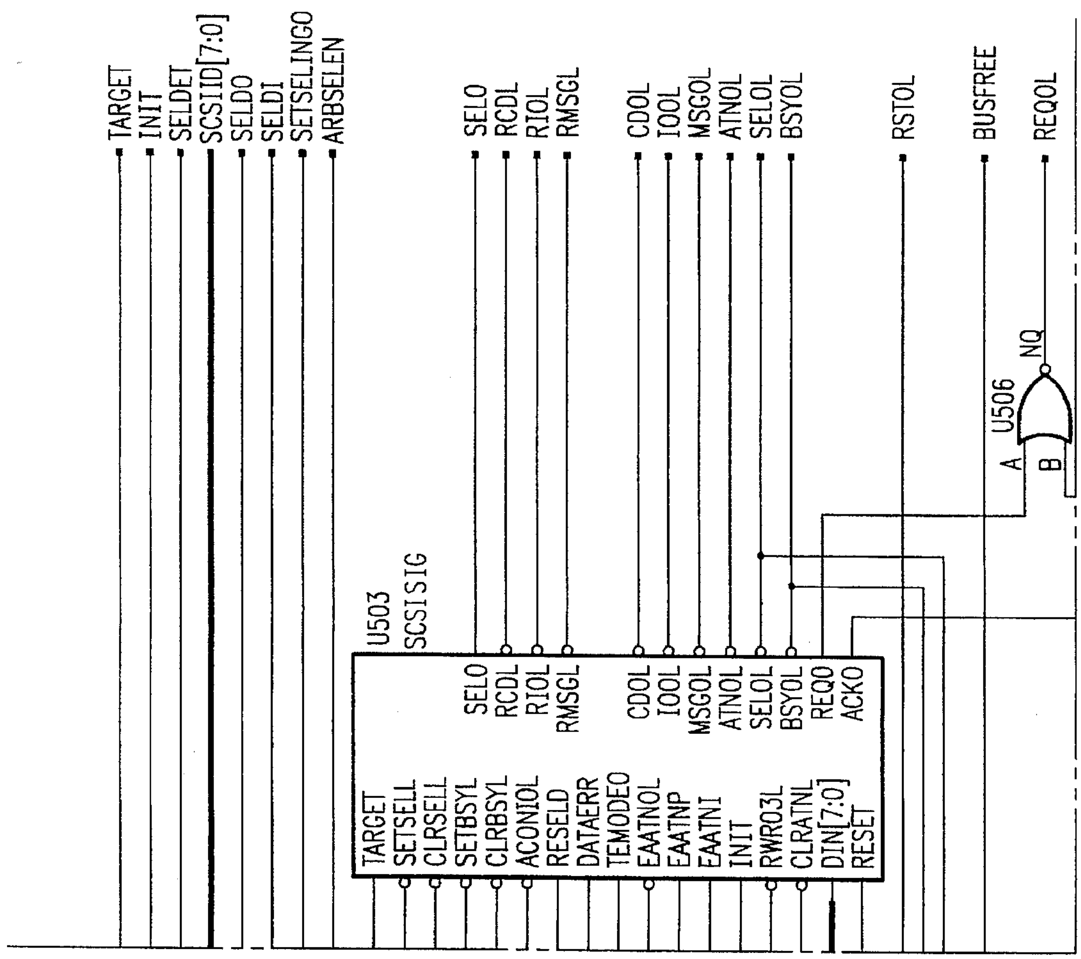
Figure 136C:
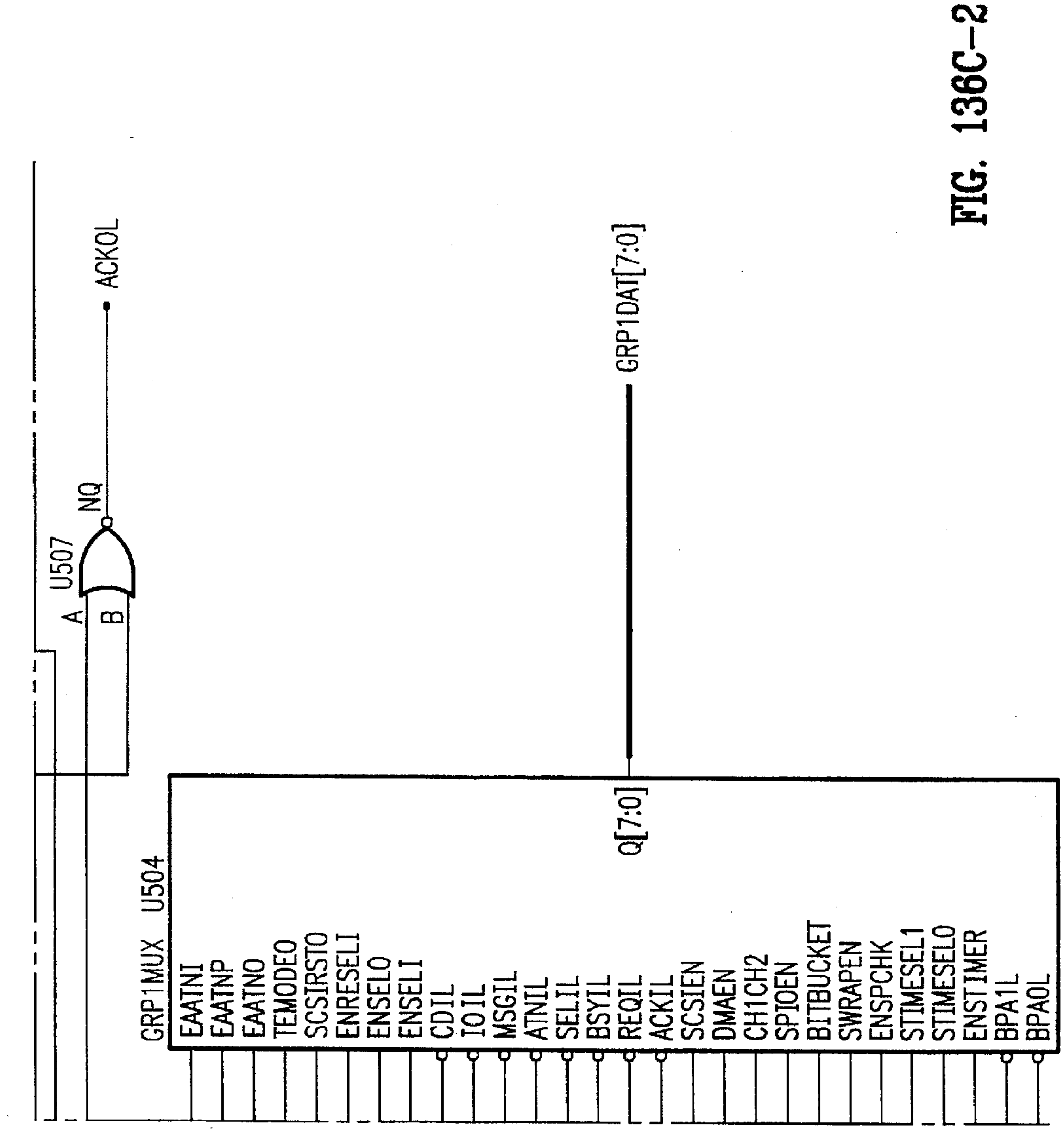
Figure 2:
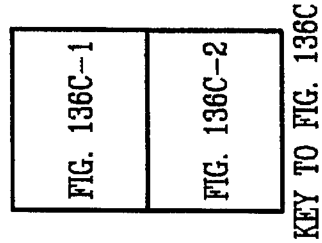
Figure 137A:
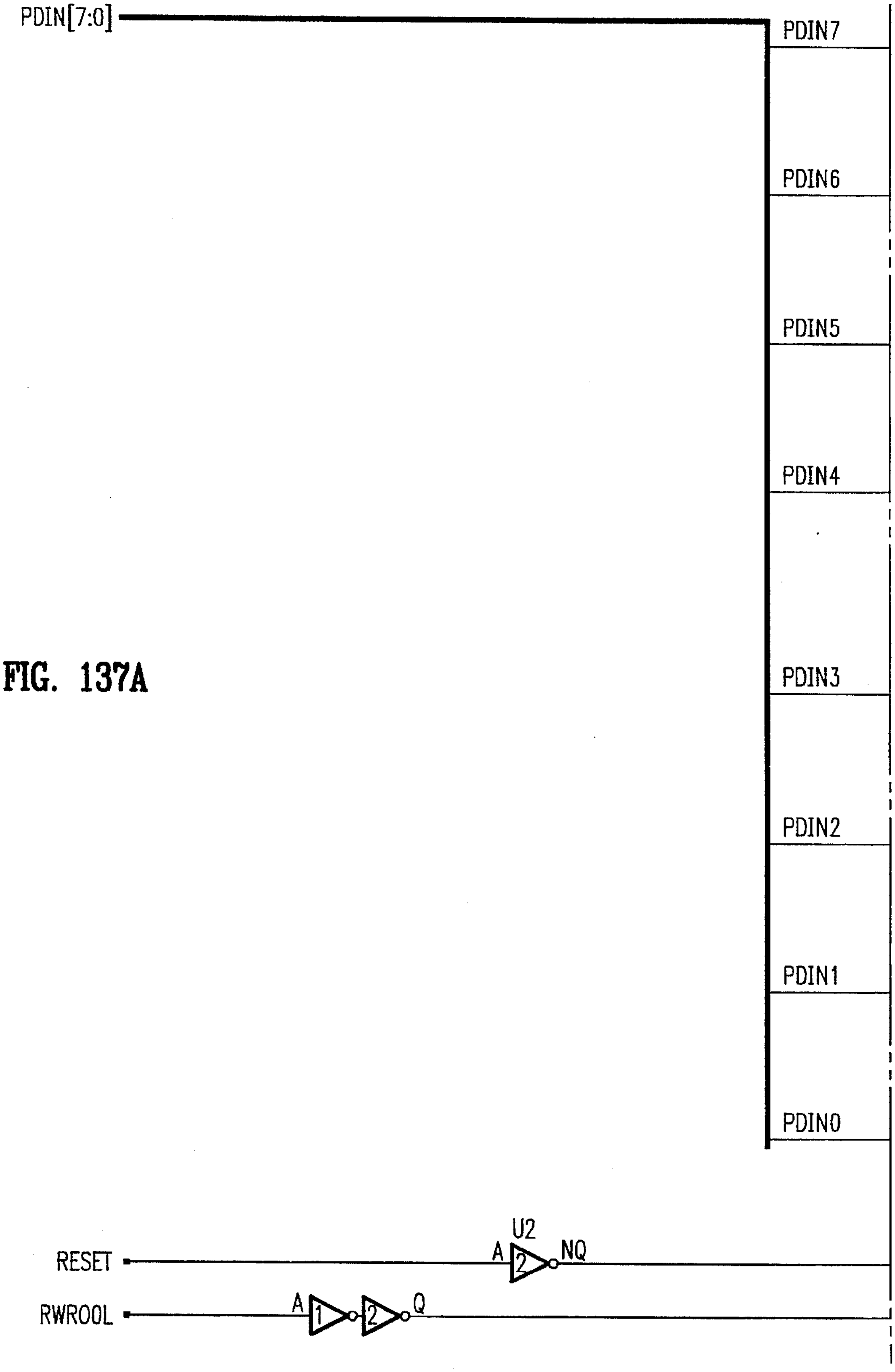
FIGS. 137A and 137B illustrates circuit SCSISEQ of FIG. 136A.
Figure 137B:
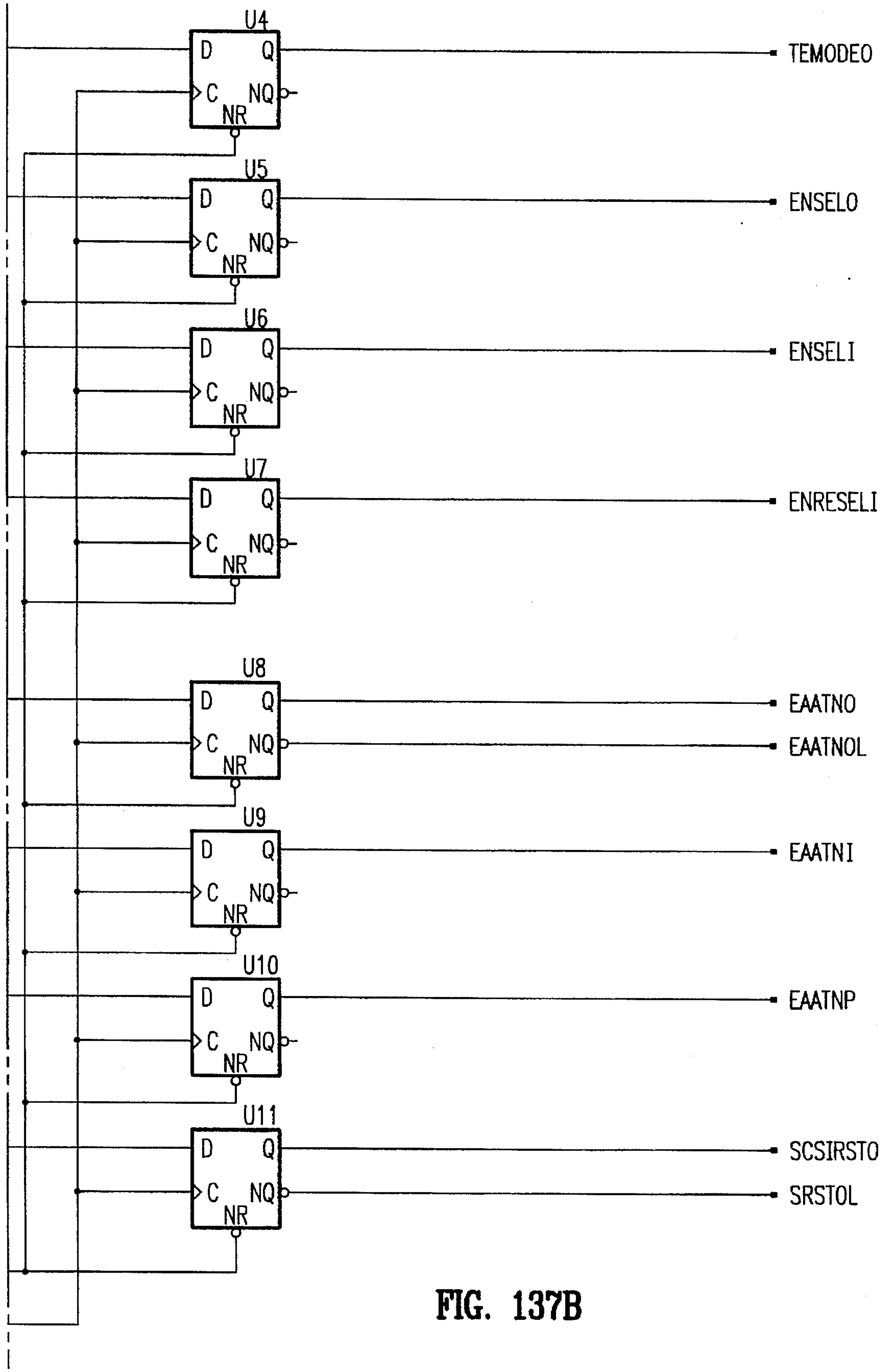

The fifth part of circuit SCSI is illustrated in FIGS. 136A through 136C, and includes circuits SCSISEQ, AUTOCON, SCSISIG, and GRP1MUX. Circuit SCSISEQ (FIG. 136A) is shown in more detail in FIGS. 137A and 137B. Circuit SCSISEQ is register SCSISEQ (FIG. 8A).

Figure 139C:
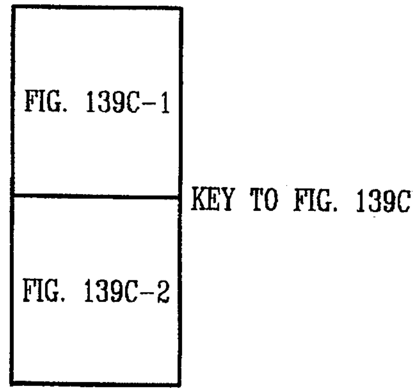
Figure 1:
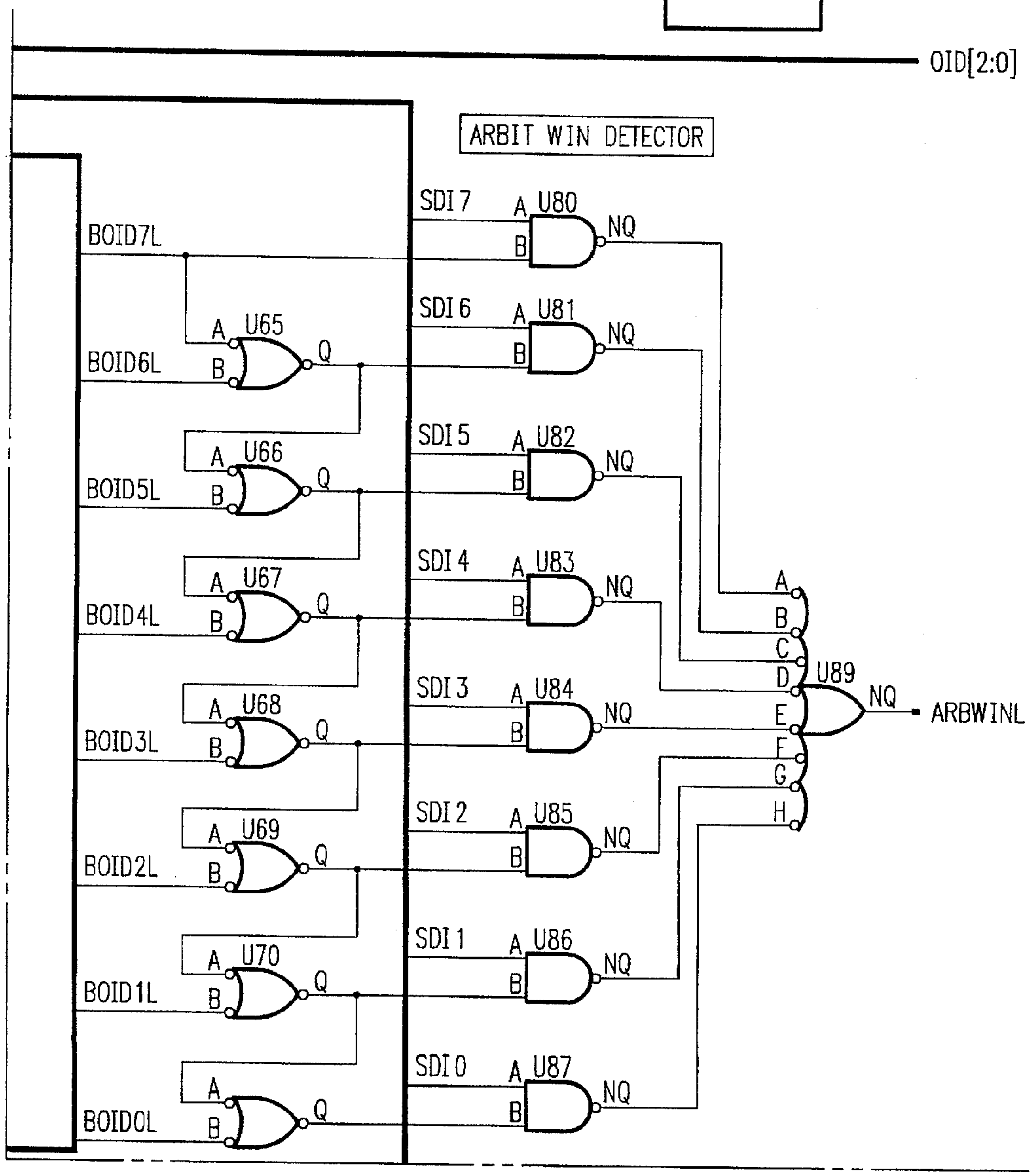
Figures 2, 139C:
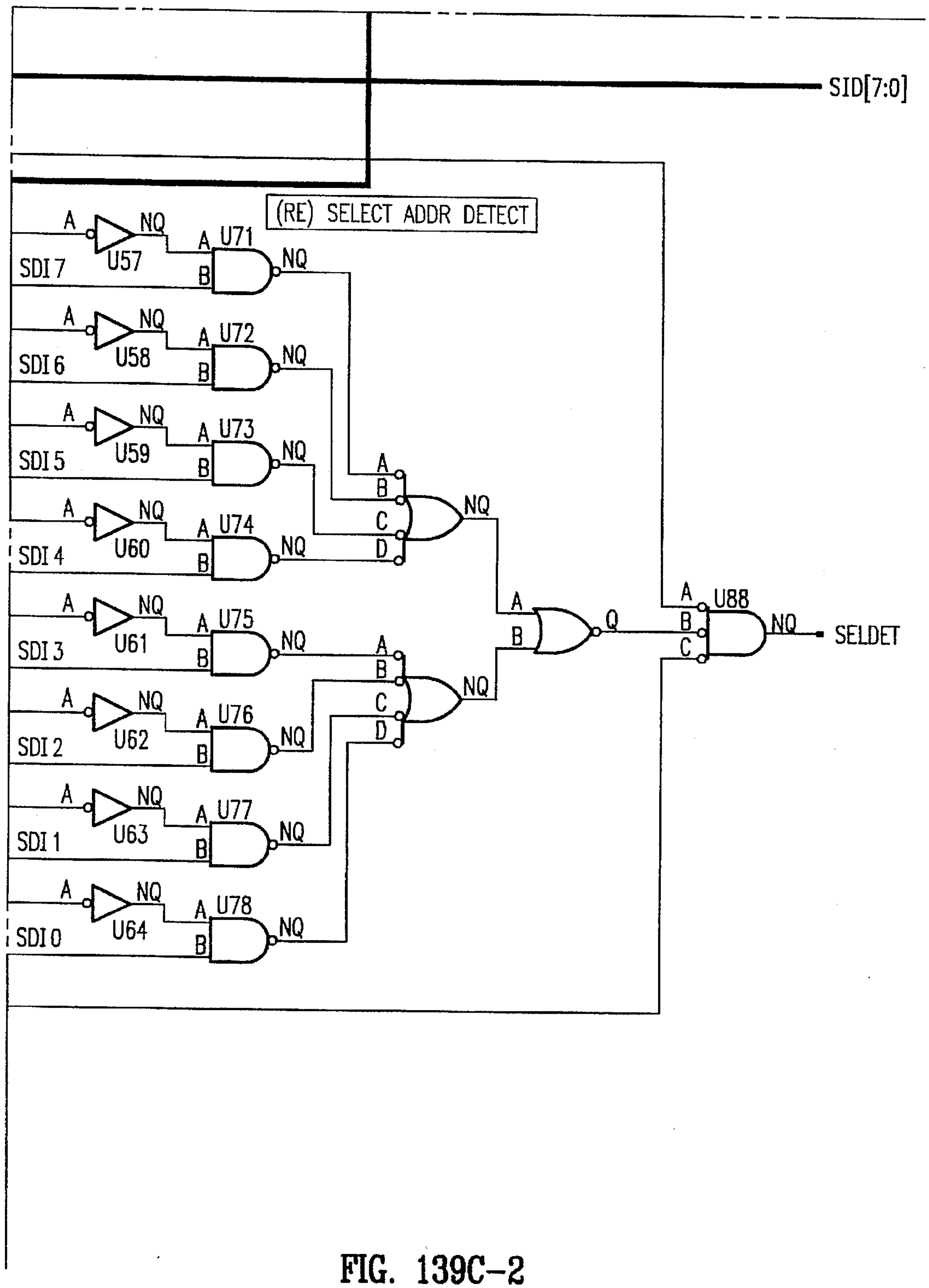
Figure 142A:
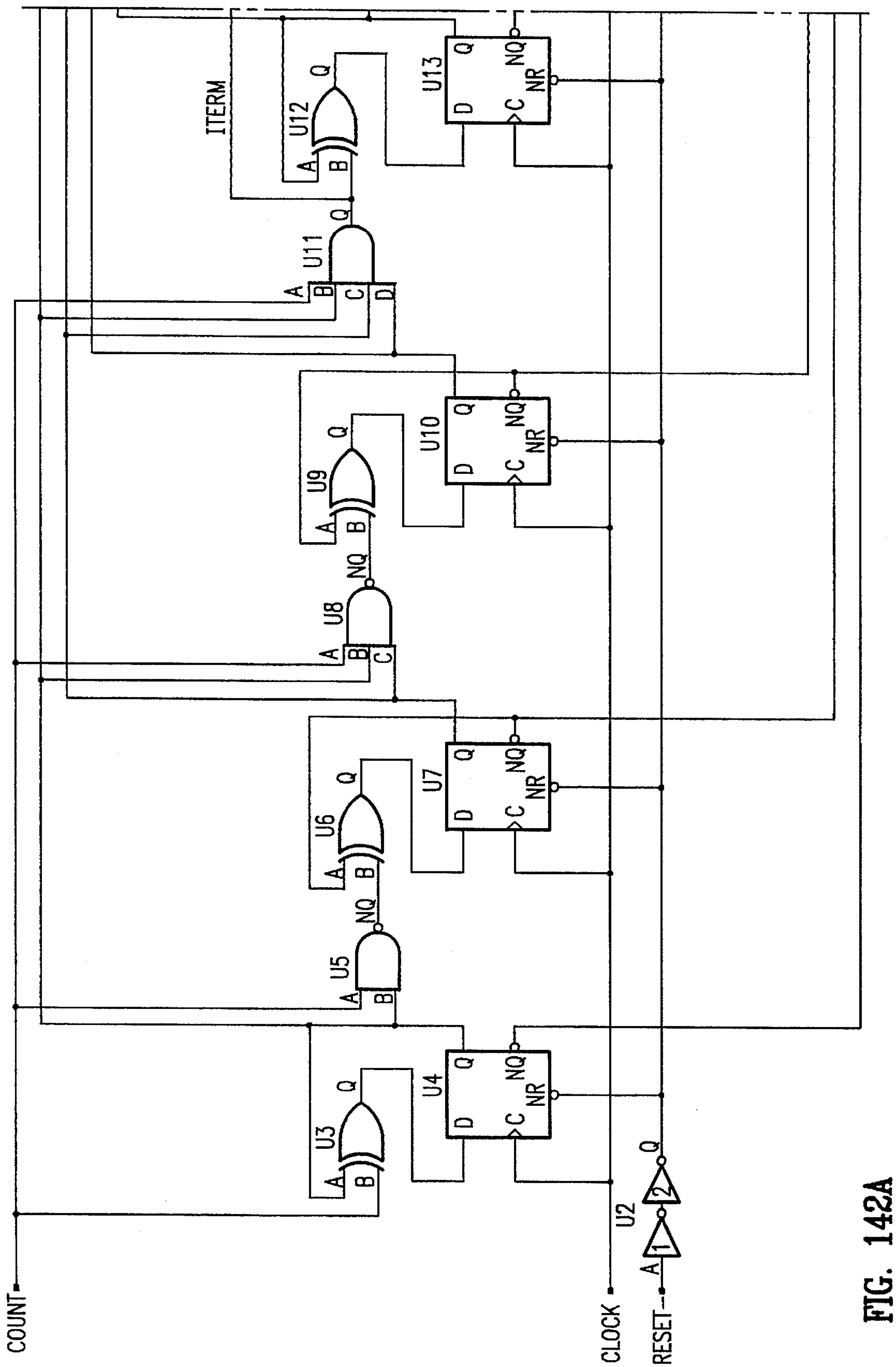
Figure 142B:
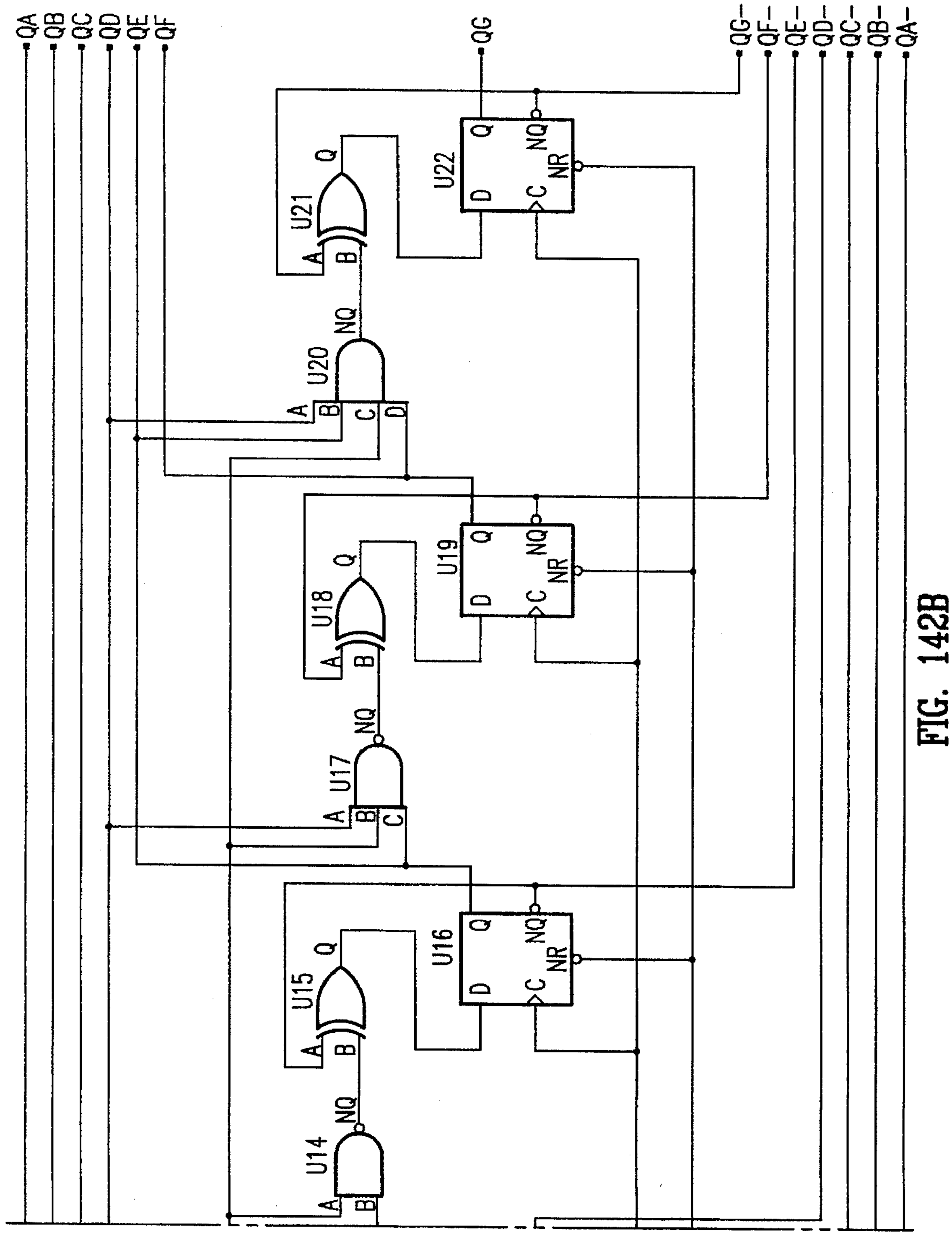
Figures 1, 143A:
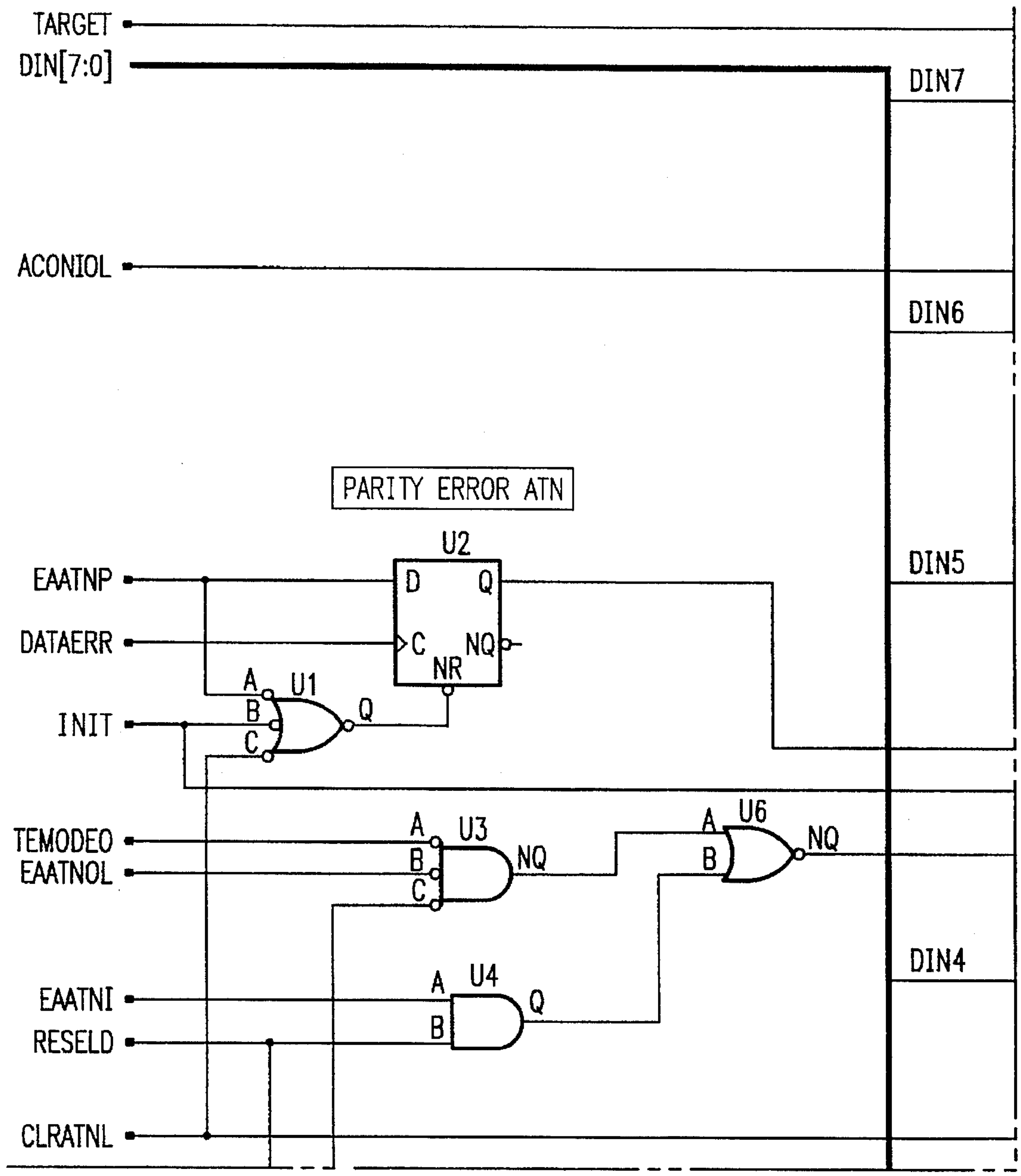
FIGS. 143A and 143B illustrate circuit SCSISIG of FIG. 136C that includes a parity error attention circuit.
Figures 1, 143B:
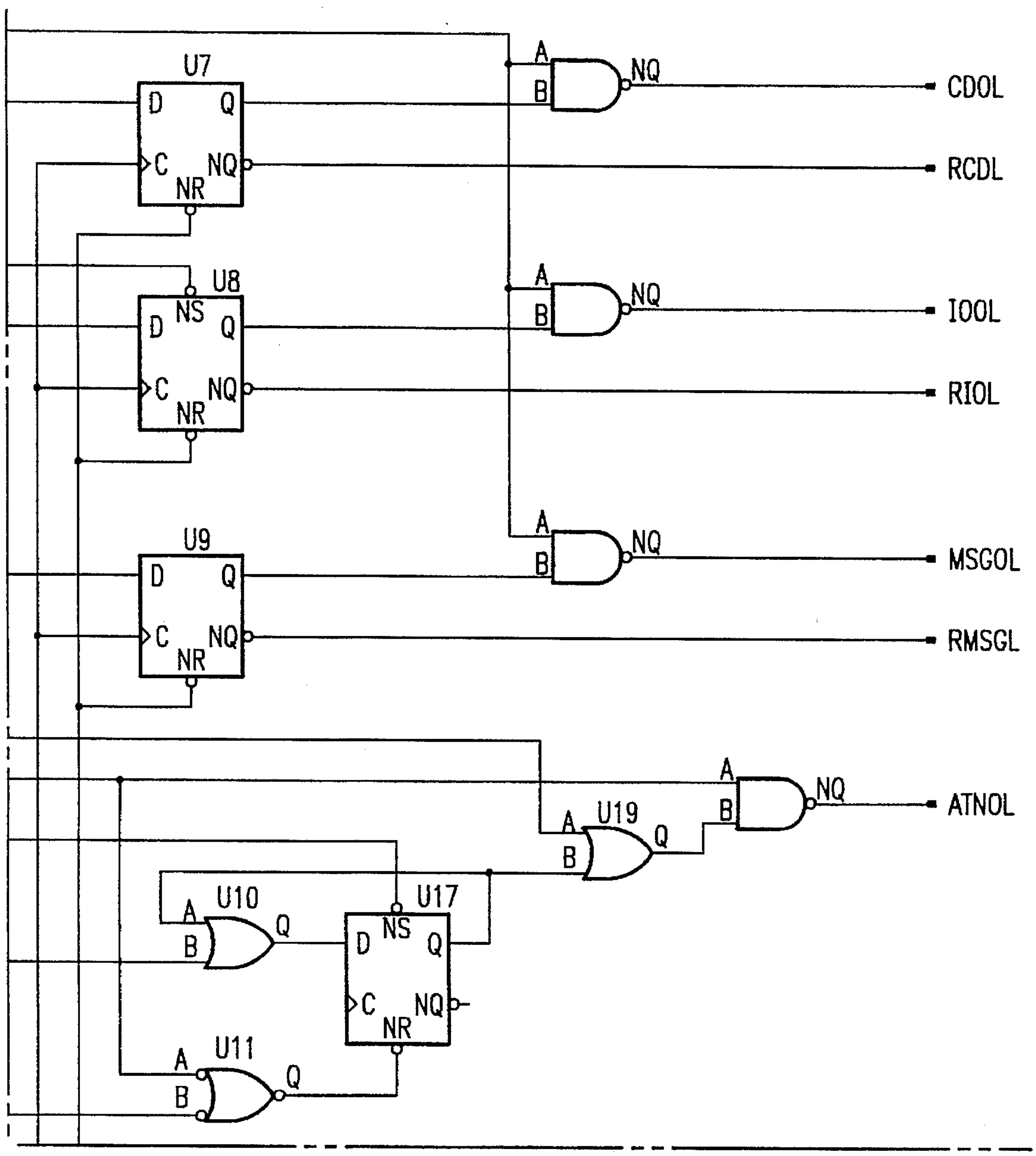
Figure 144A:
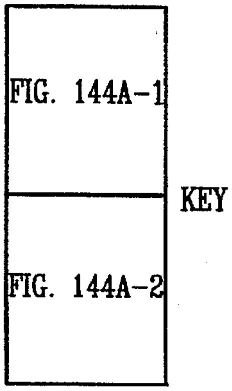
FIGS. 144A and 144B illustrate circuit GRP1MUX of FIG. 136C that includes circuits MUX41L.
Figure 1:
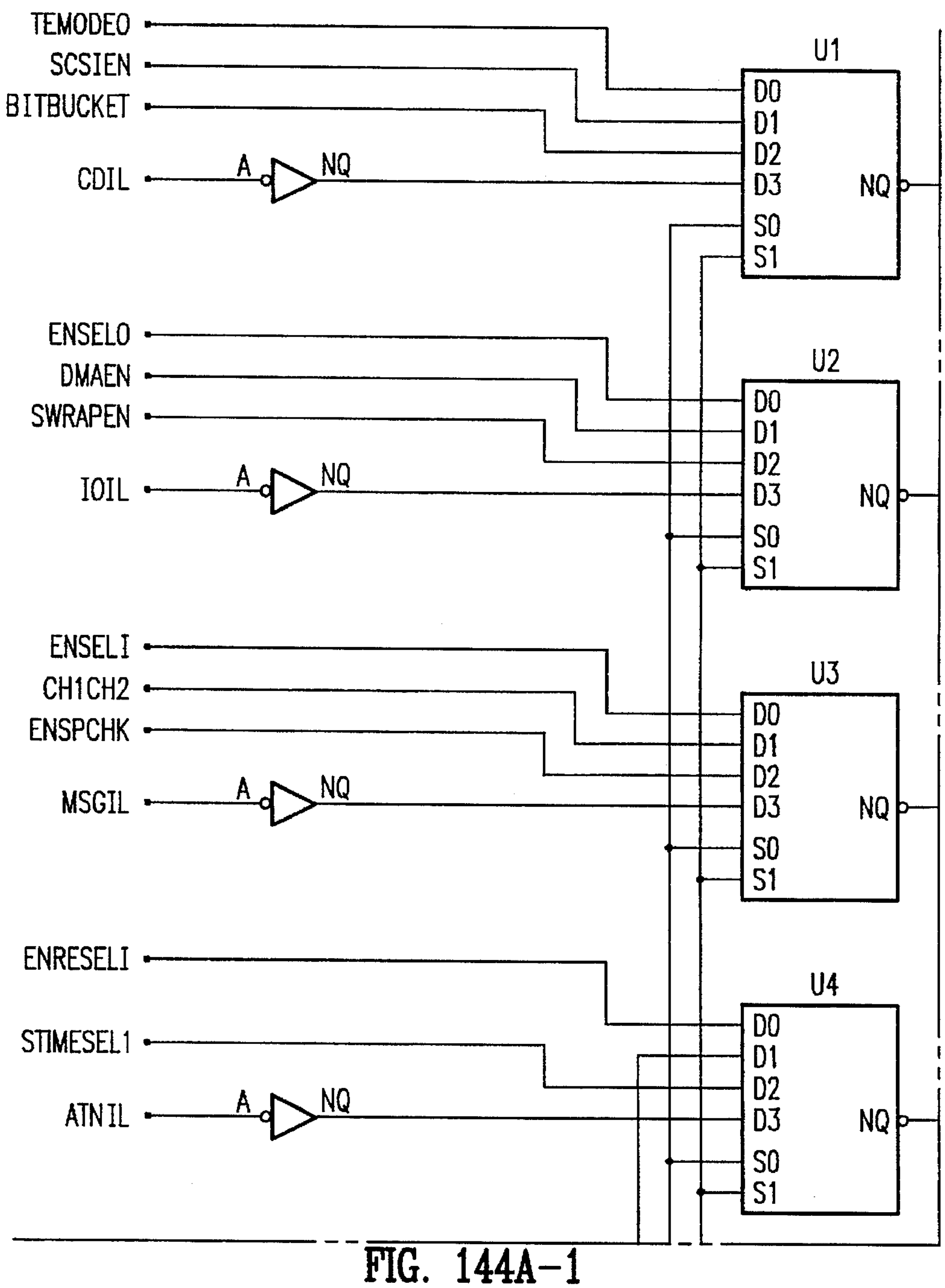
Figures 2, 144A:
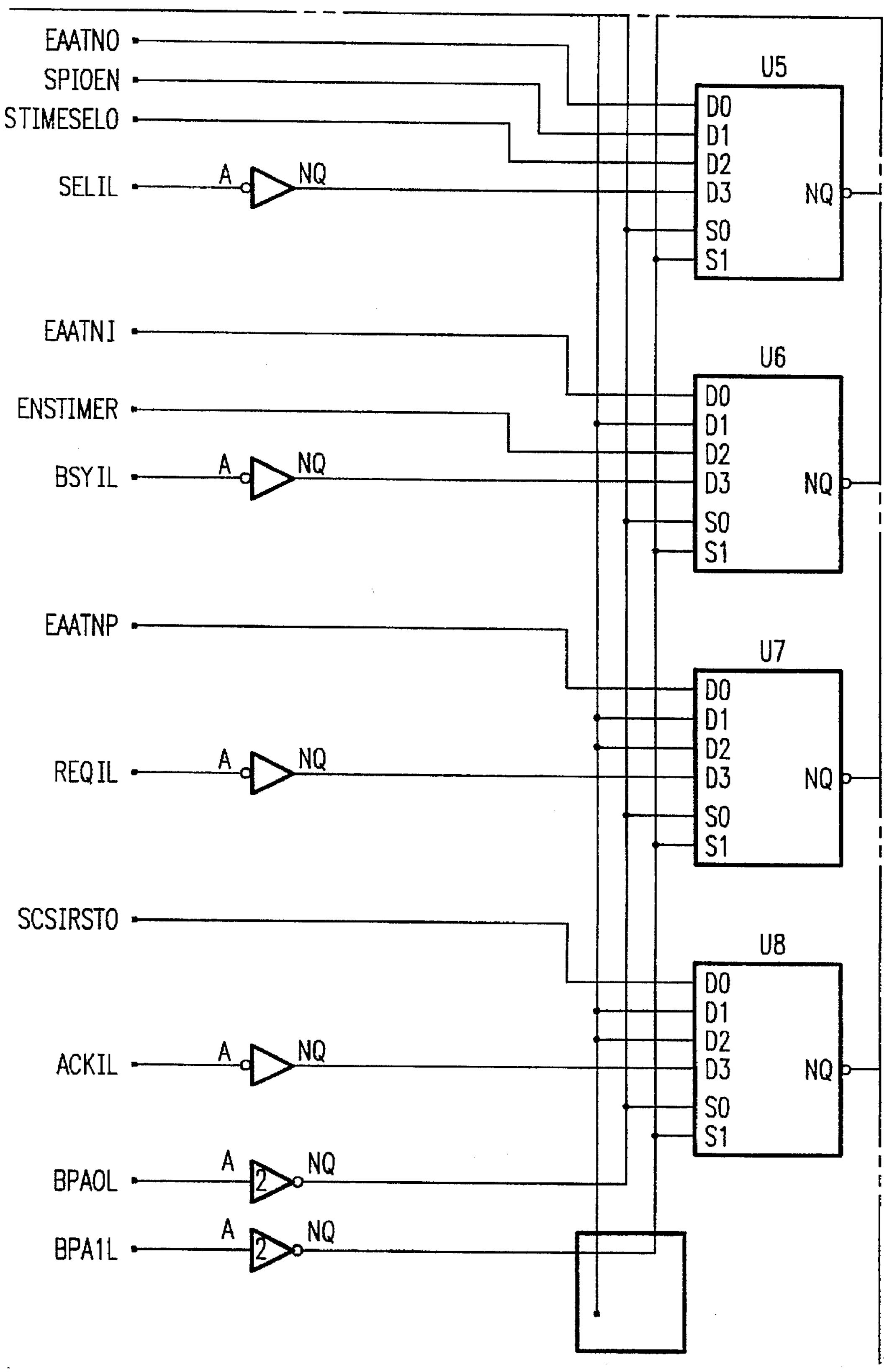
Figure 144B:
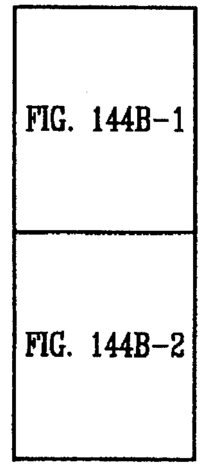
Figure 1:
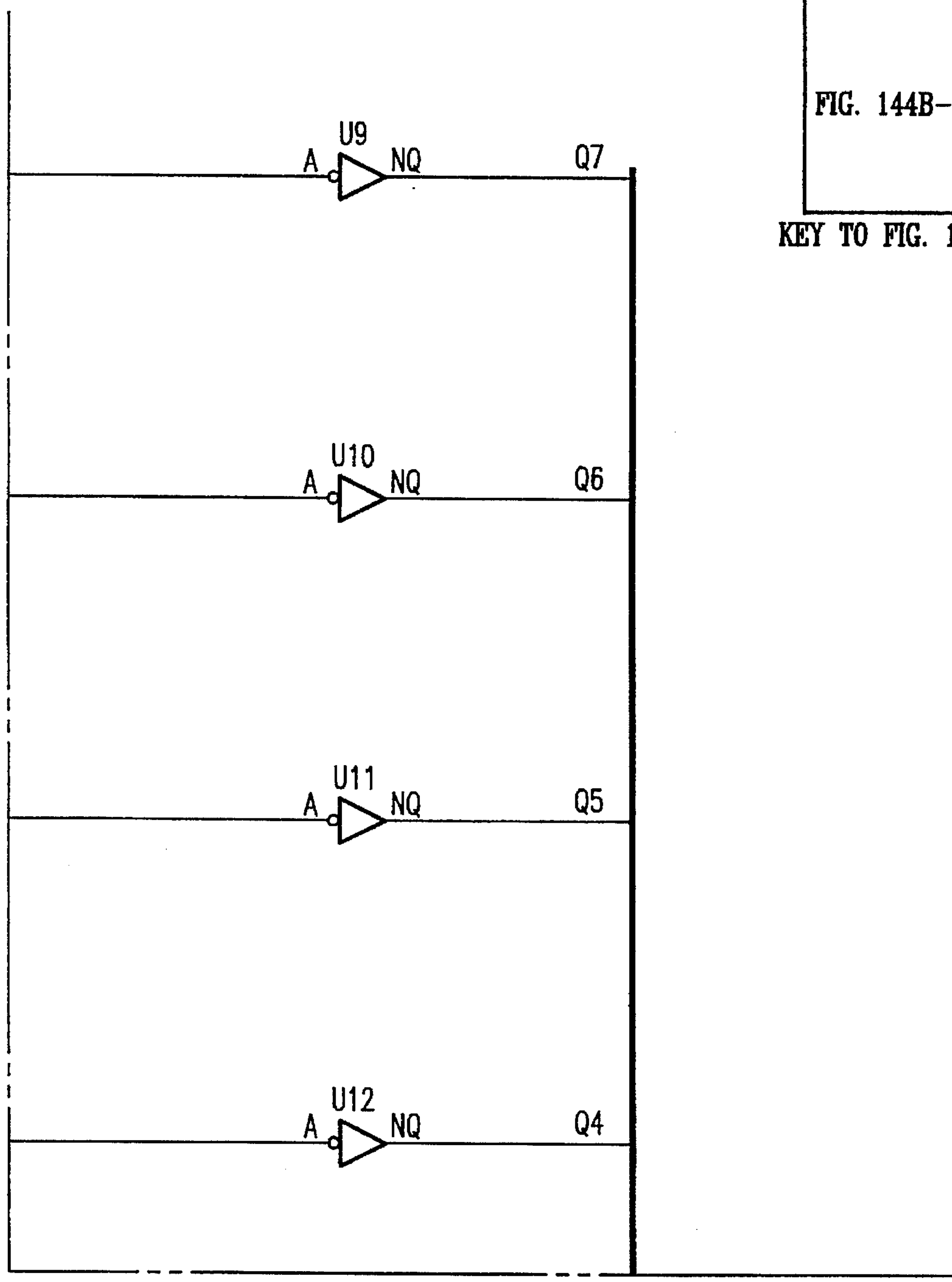
Figures 2, 144B:
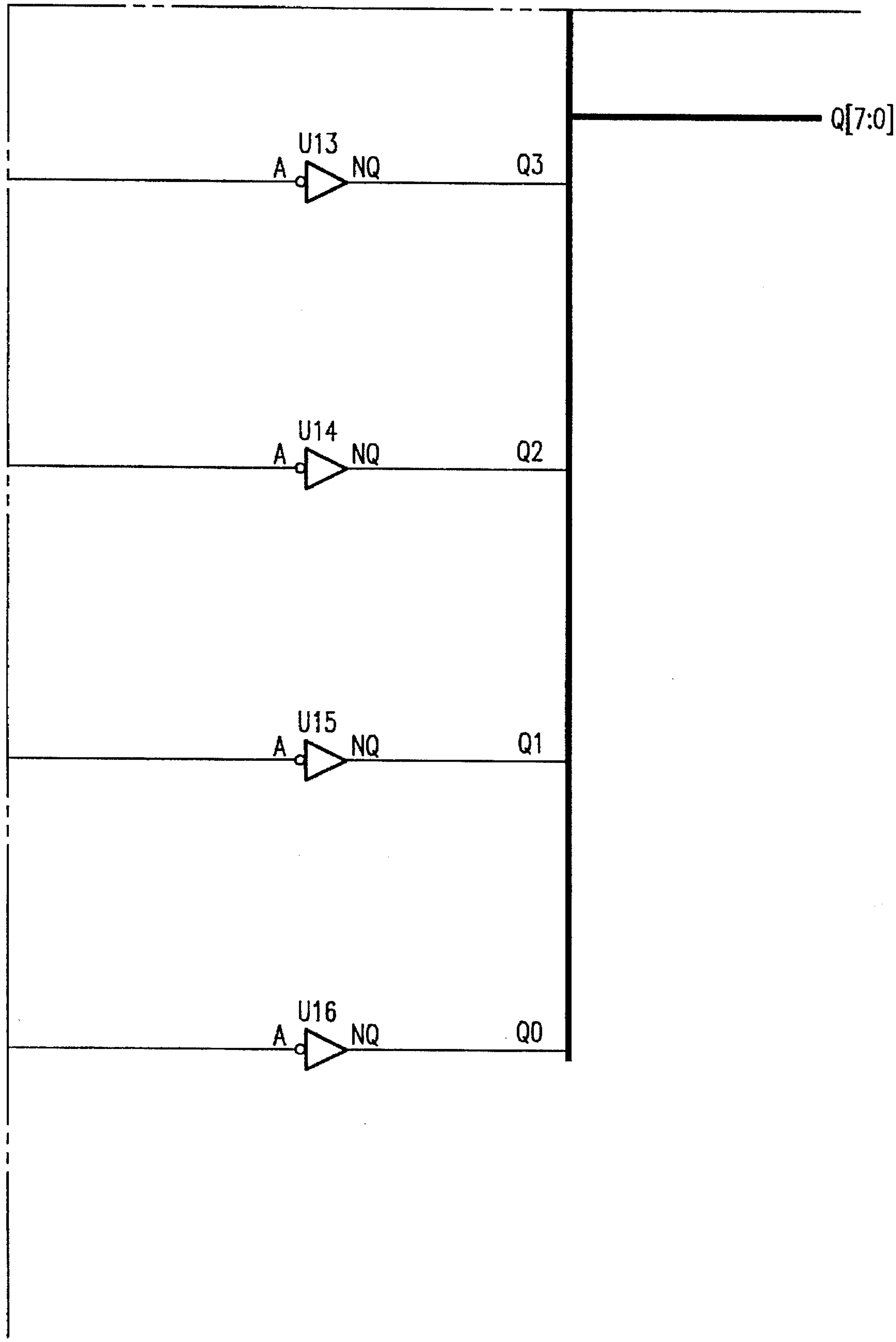

Circuit AUTOCON is illustrated in more detail in FIGS. 138A, 138B, and 138C and includes the circuitry for the selection/reselection in/out hardwired sequencers described above with respect to FIG. 10. Circuit AUTOCON includes the bus free detection circuit, auto connect sequencer, a select detection and a select abort circuit. Also, circuits DEL400N and SEQUENCE as well as circuit IDLOGIC are included within Circuit AUTOCON. Circuit IDLOGIC is illustrated in more detail in FIGS. 139A, 139B and 139C. Circuit IDLOGIC includes own ID latch circuit, own ID decode circuit, other ID latch circuit, other ID decode circuit, SCSI ID gates, select address detect, greater than two ID bit detect, and arbitration win detector. These are the circuits previously described with respect to FIG. 10. Circuit DEL400N is illustrated in FIG. 140. Circuit SEQUENCE is illustrated in FIGS. 141A and 141B and includes circuit CTIMER. FIGS. 142A and 142B illustrate circuit CTIMER. Circuit SCSISIG (FIG. 136C) is illustrated in more detail in FIGS. 143A and 143B. Circuit SCSISIG includes a parity error attention circuit. Circuit SCSISIG, as shown in FIGS. 143A and 143B, also includes register SCSISIG. Circuit GRP1MUX (FIG. 136C) is illustrated in FIGS. 144A and 144B and includes circuits MUX41L which are equivalent to circuit MUX4_1 described previously.

The sixth part of circuit SCSI is illustrated in FIGS. 145A, 145B and 145C and includes circuits CLRSINT, SCSIINT1, SCSIINT0, GRP3MUX, GRP5MUX, and SELTIMER. Circuit CLRSINT (FIGS. 146A, 146B, 146C) includes registers CLRINT0 (FIG. 8B) and register CLRSINT1, which are also illustrated in FIG. 9. Circuit SCSIINT0 (FIGS. 147A, 147B) includes register SIMODE0 which is comprised of circuit DFFC00X7, which is illustrated in FIG. 148. Register SIMODE0 is the same as the register in FIG. 8B. Circuit SCSIINT0 is similar to FIG. 9. For example, OR gate 903 in FIG. 9 is equivalent to gate U16 (FIG. 147B) in circuit SCSIINT0. AND gate 902 in FIG. 9 is equivalent to each of gates U9 through U15 (FIG. 147B) in circuit SCSIINT0, as each of the gates receives a masking signal from register SIMODE0. Register 901 (FIG. 9) is similar to registers U1 through U7 (FIG. 147A). However, in this case, the status event is either provided to the clock terminal and used to gate a signal through the register, or as in the case of register U7 is applied to the D input terminal and is clocked through the register.

Circuit SCSIINT1 (FIG. 145B) is shown in more detail in FIGS. 149A and 149B. This circuit is similar to that described for FIGS. 147A and 147B and that discussion is incorporated herein by reference. FIG. 150 illustrates circuit DFFC00X8 which are register SIMODE1.

Figures 1, 151A:
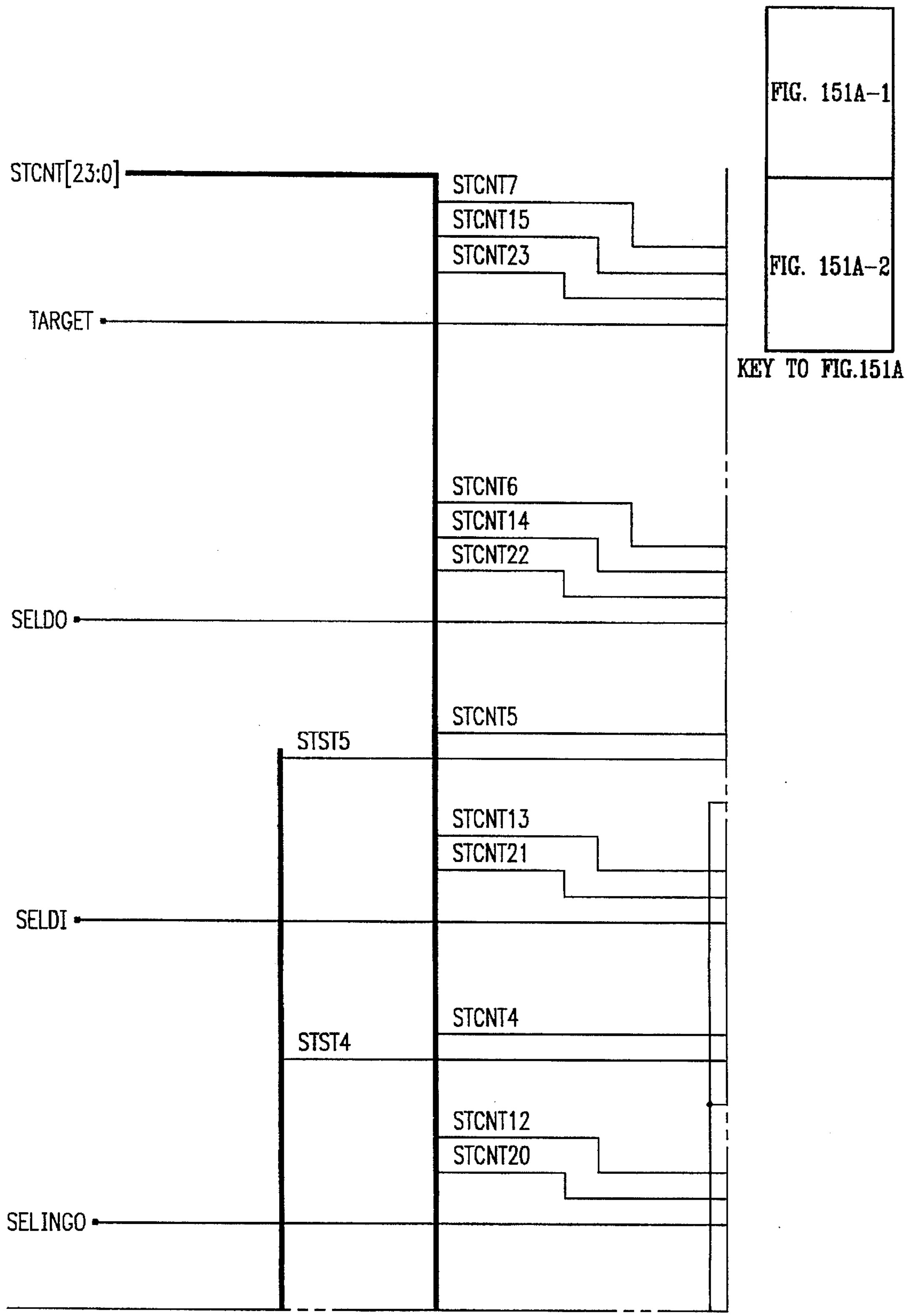
Figures 2, 151A:
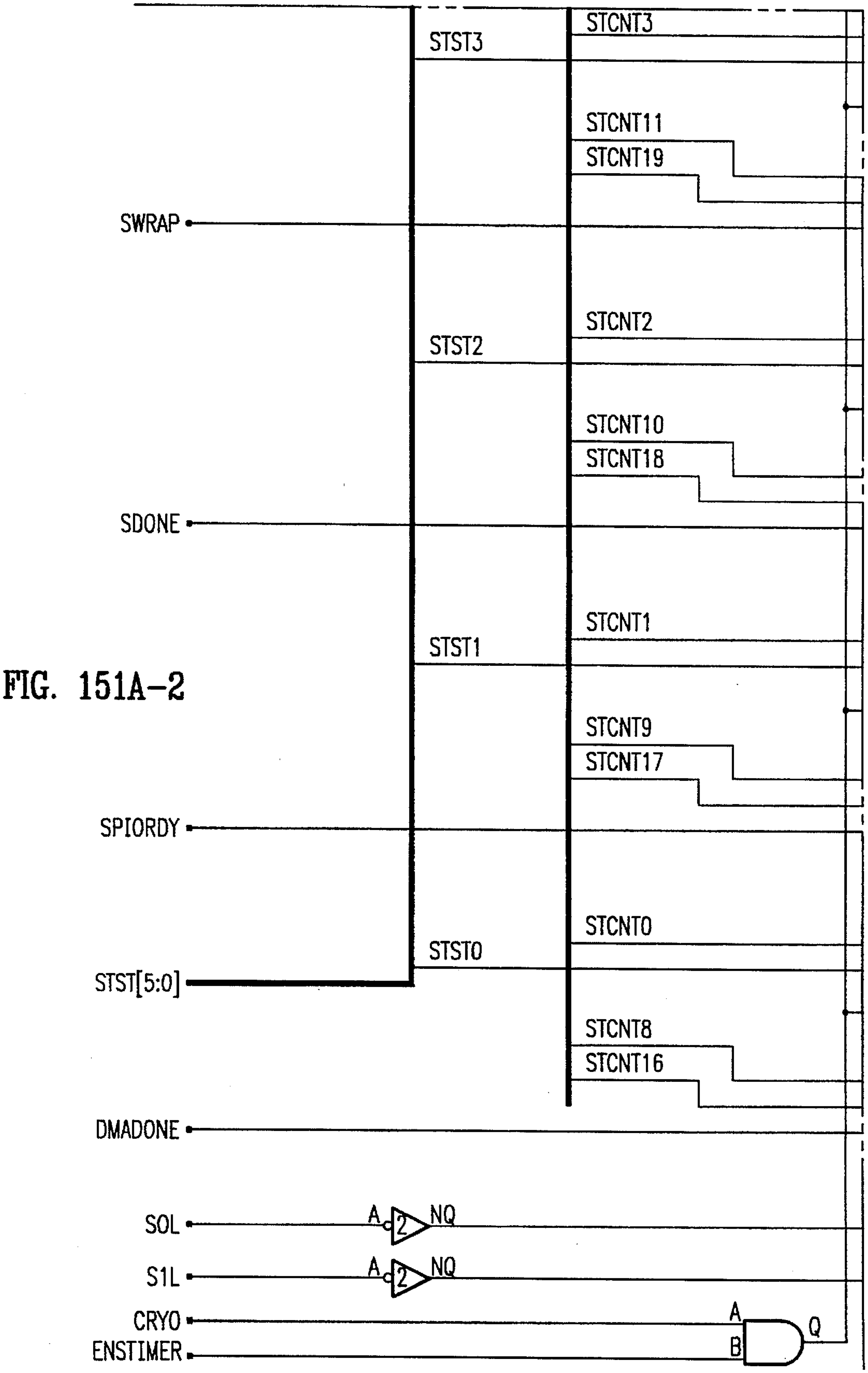
Figure 151B:
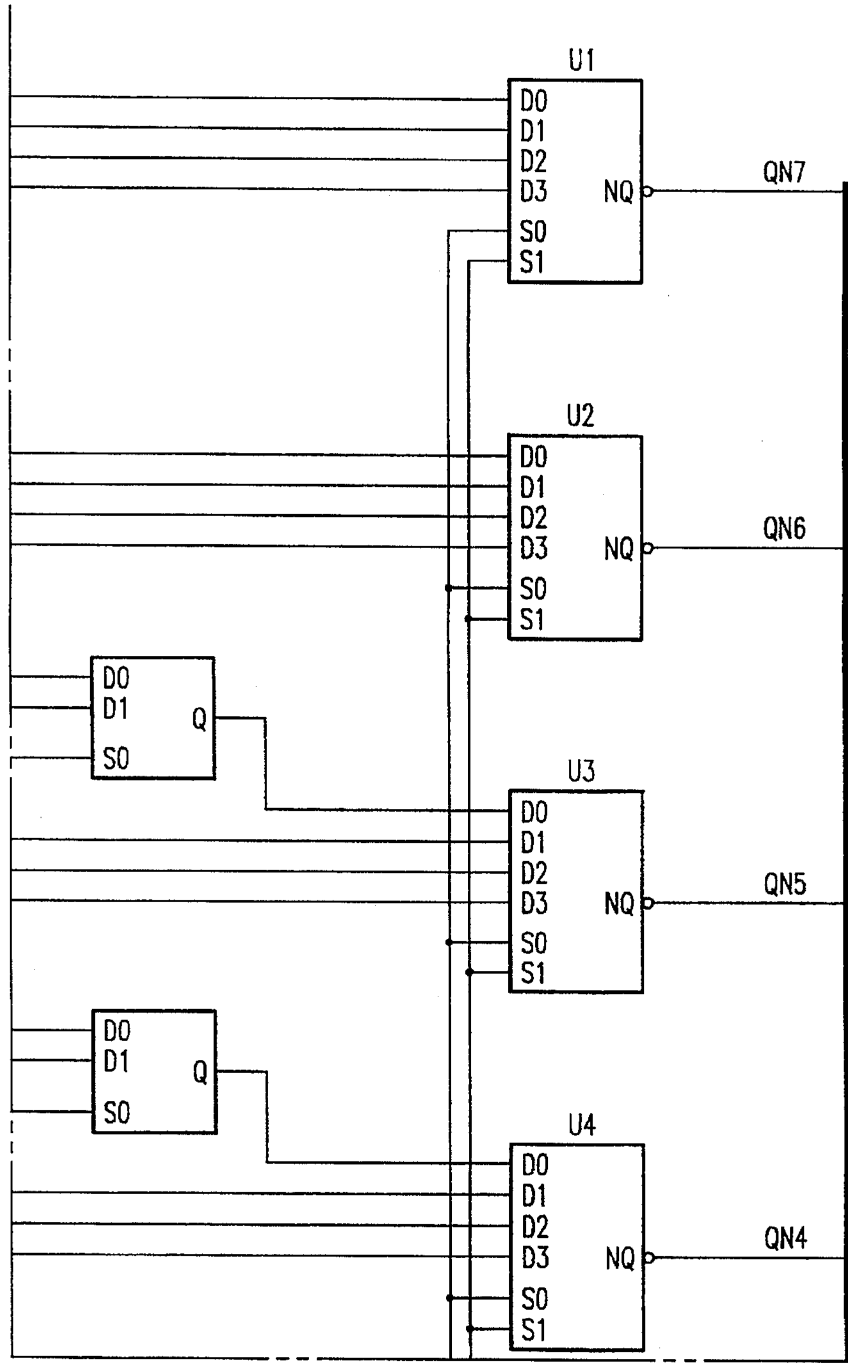
Figure 1:
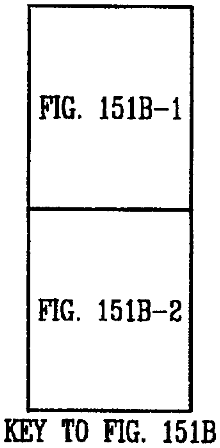
Figures 2, 151B:
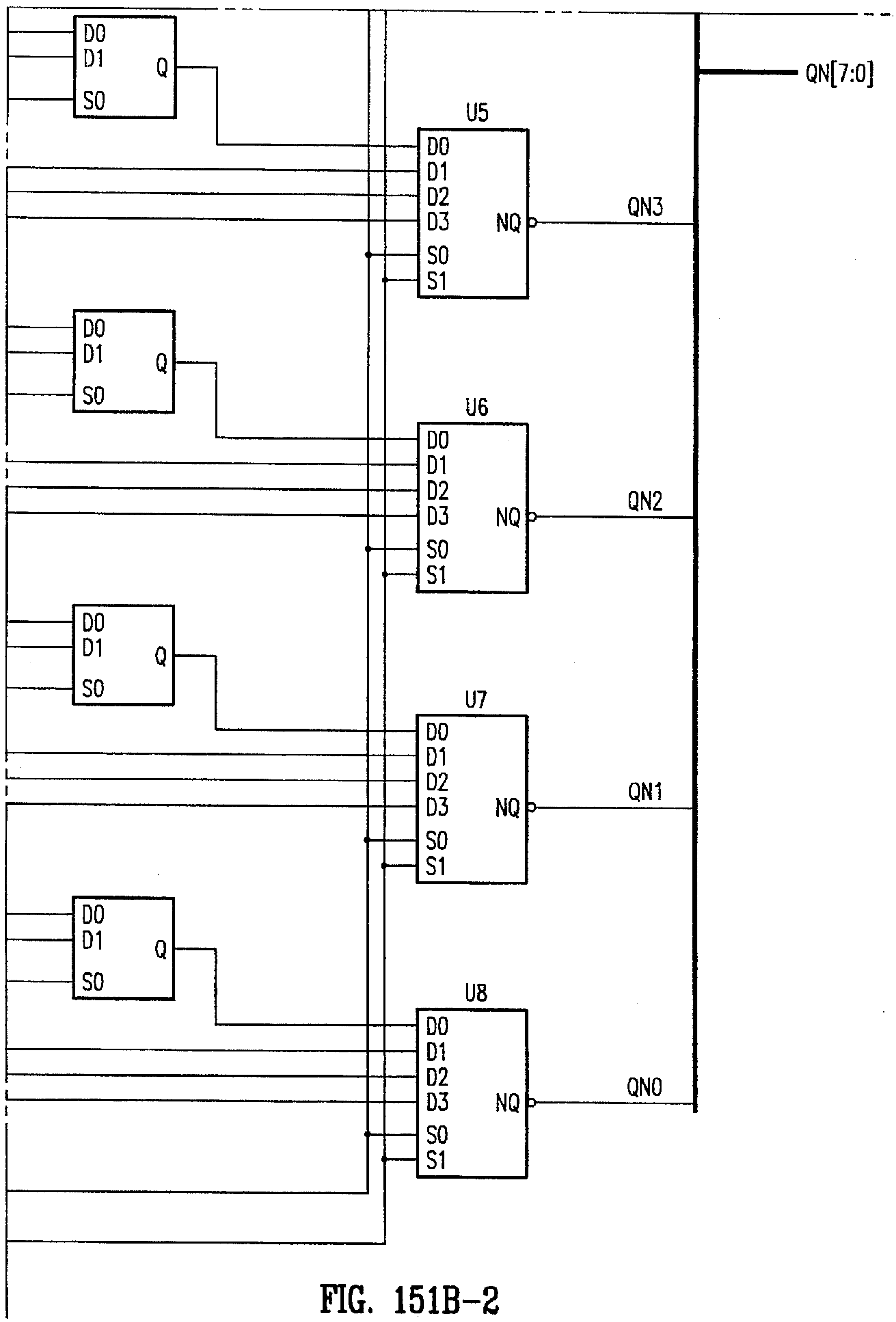
Figure 152:
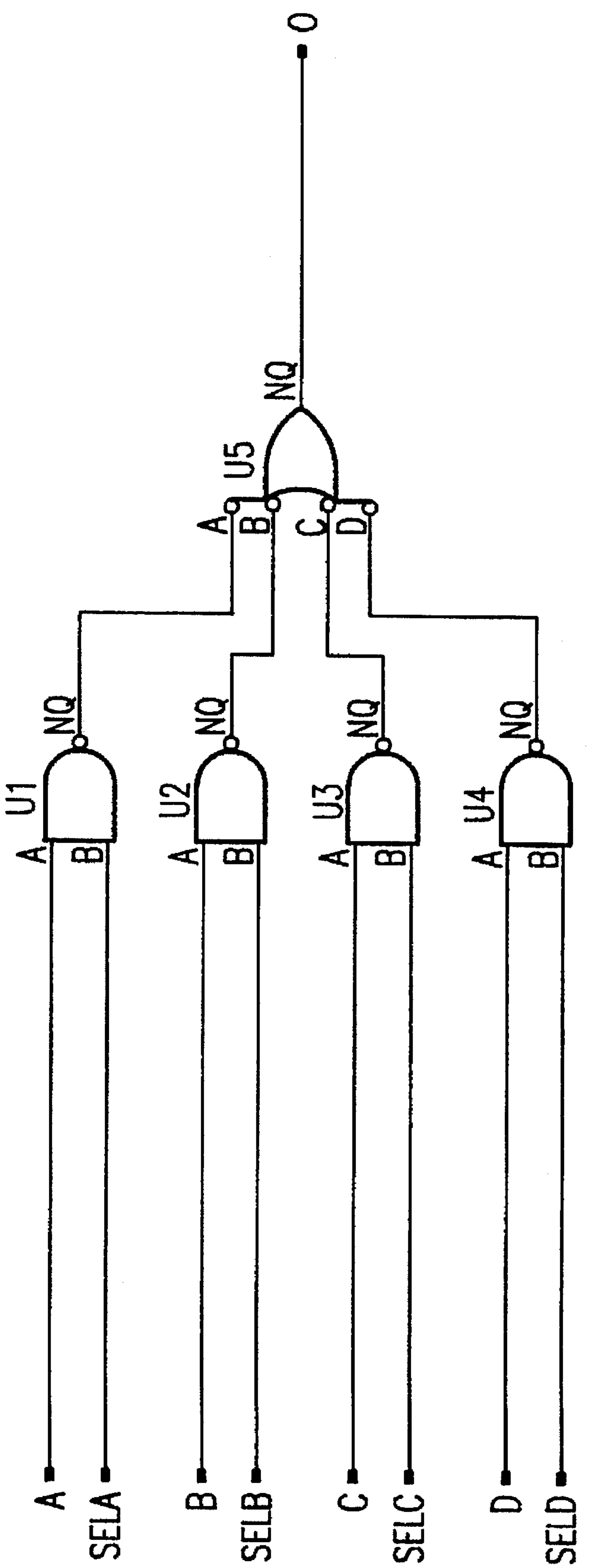
Figure 153:
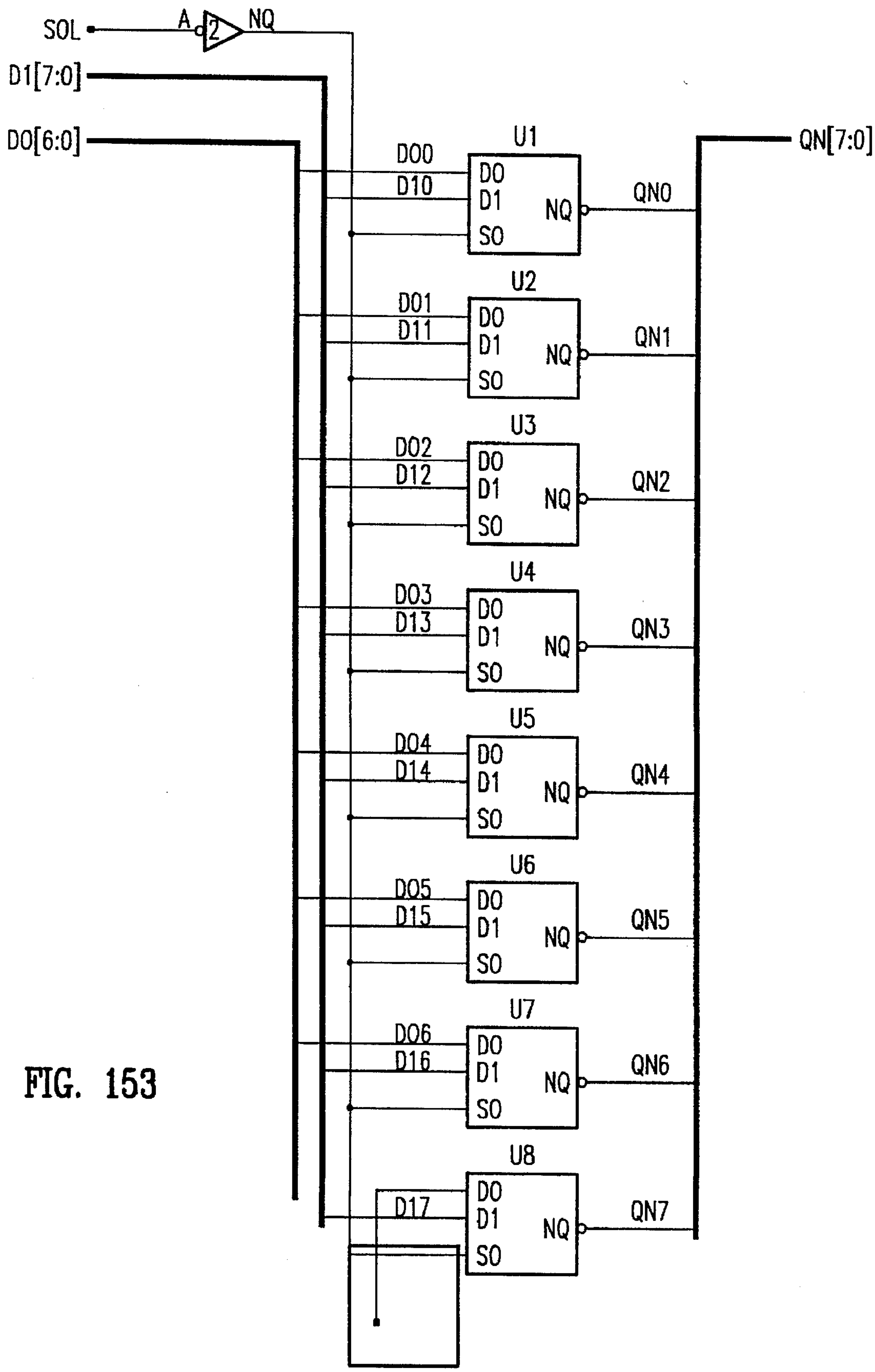
Figure 155A:
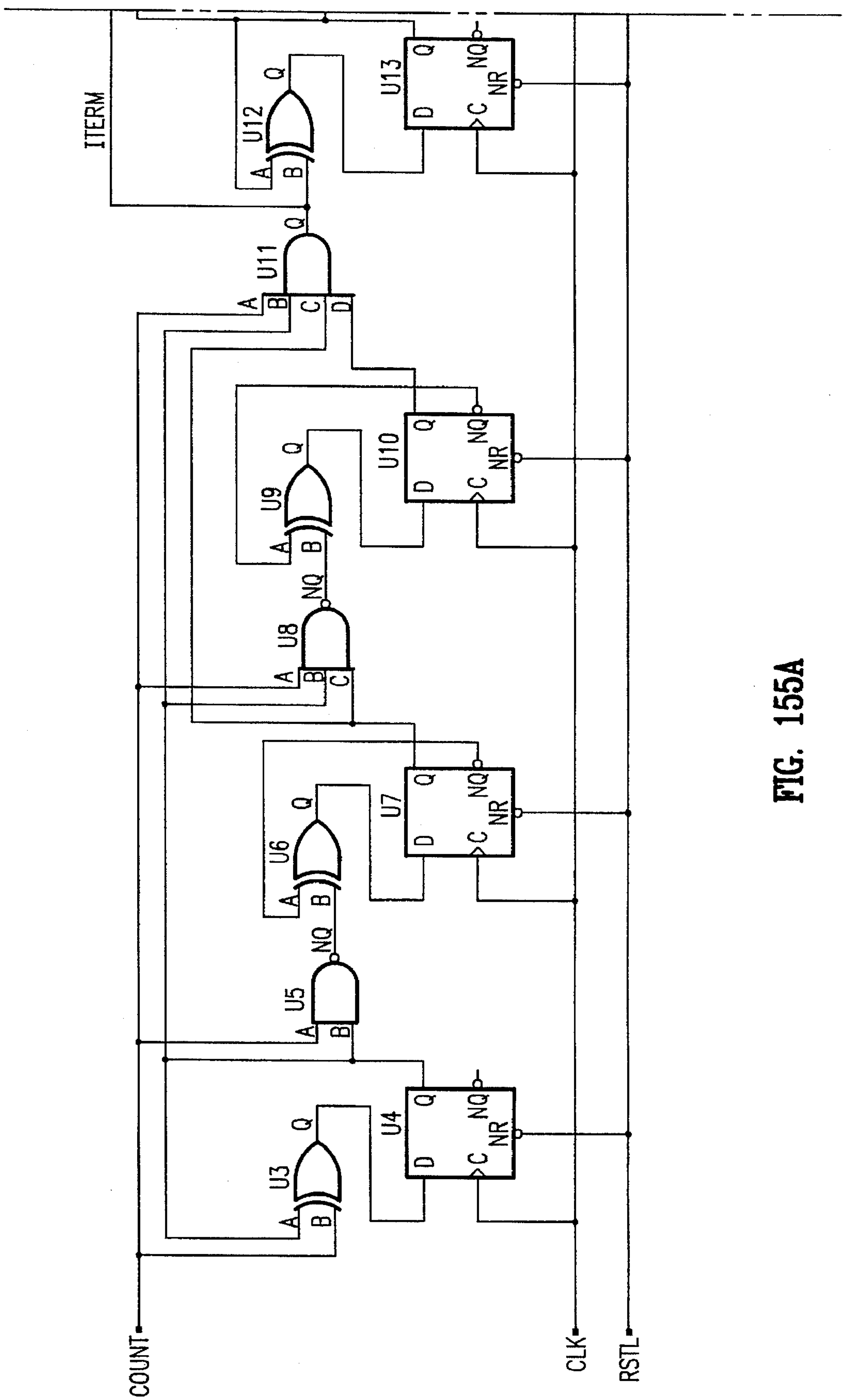
Figure 155B:
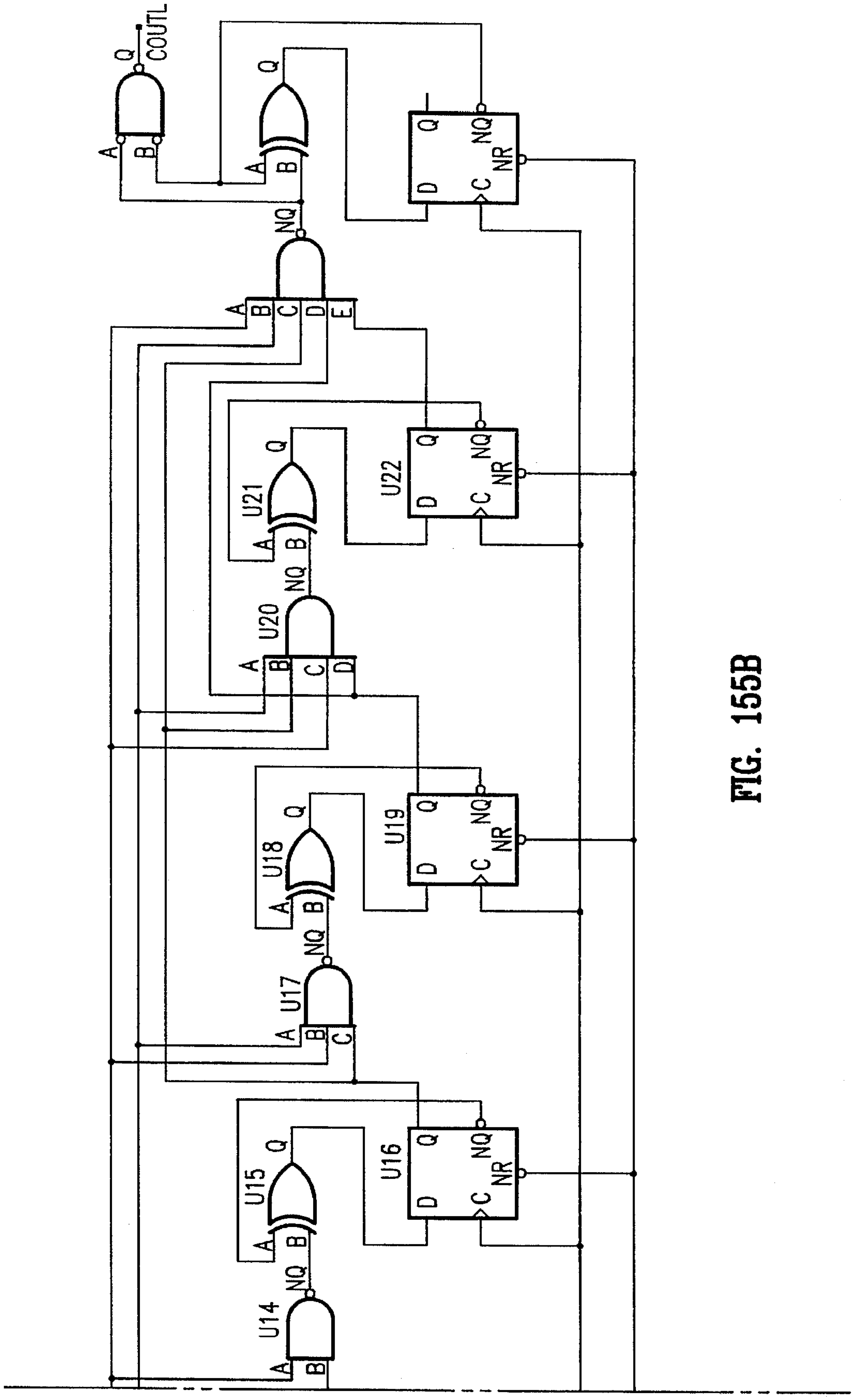
Figure 156:
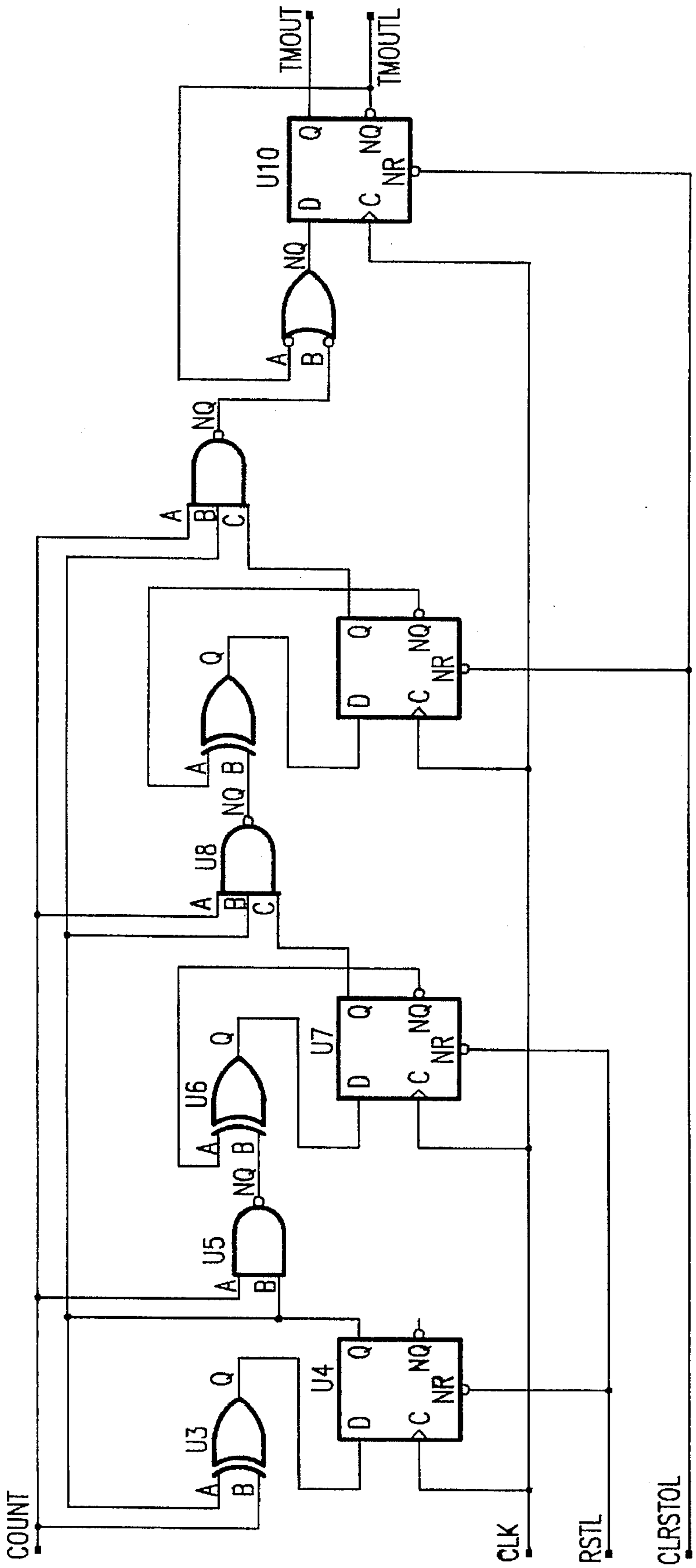

Circuit GRP3MUX (FIG. 145B) is illustrated in more detail in FIGS. 151A through 151B. Circuit GRP3MUX includes a plurality of circuits MUX21 and MUX41. Circuit MUX41 is the same as circuit MUX4_1 illustrated in FIG. 152. Circuit MUX21 is the same as circuit MUX2_1 which was described above. Circuit GRP5MUX includes a plurality of MUX two-to-one circuits as illustrated in FIG. 153. Circuit SELTIMER is shown in more detail in FIGS. 154A and 154B and is the self timer circuit for H/A integrated circuit 6260. Circuit SELTIMER includes circuits DIV256, DIV10, and ABORTDEL. Circuits DIV256 and DIV10 simply divide the clock rate into a slower speed and one embodiment of circuit DIV256 is illustrated in FIGS. 155A and 155B. Circuit SELTIMER includes a time out select capability. Circuit ABORTDEL (FIG. 154B) is illustrated in more detail in FIG. 156.

Figure 157A:
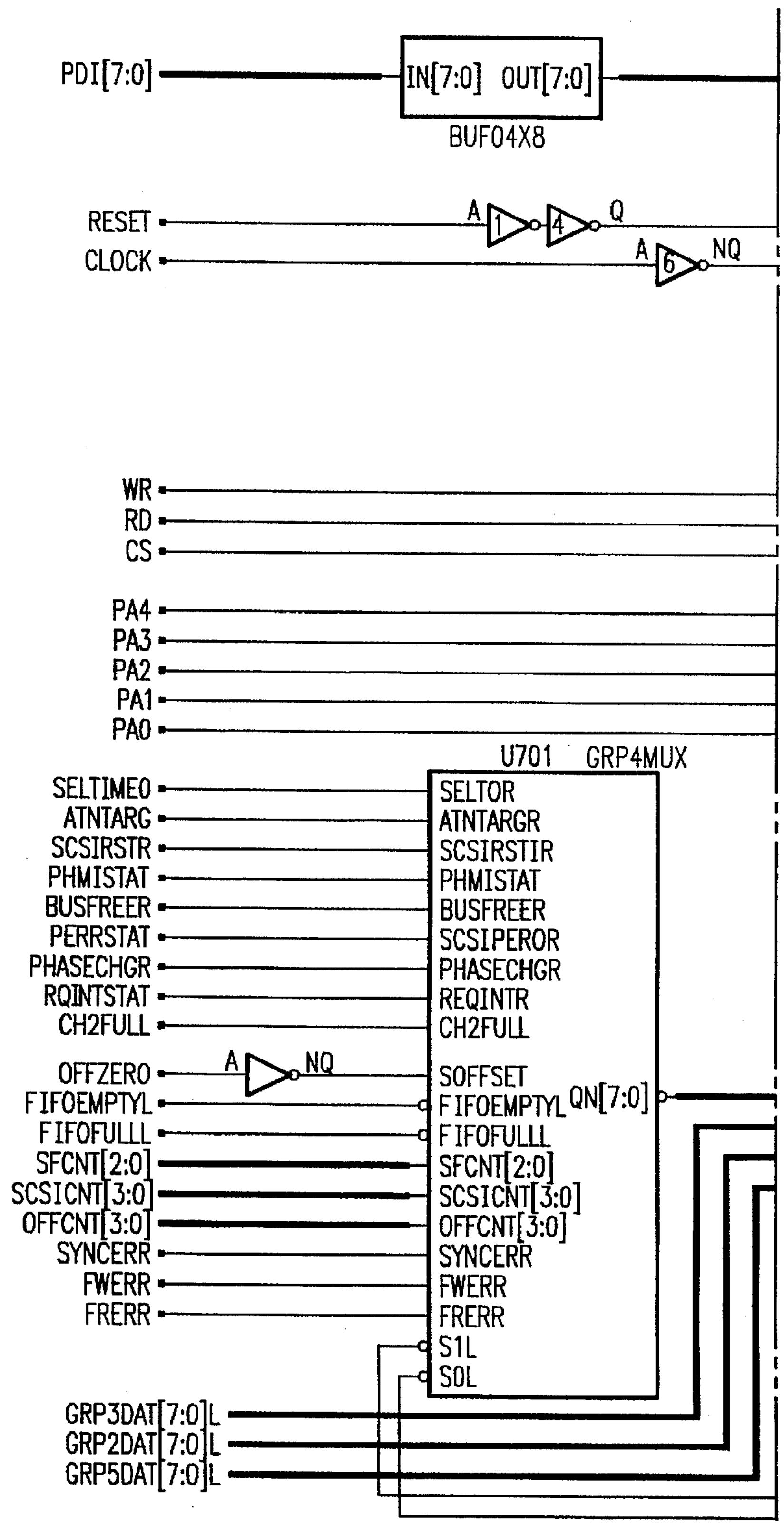
Figure 157B:
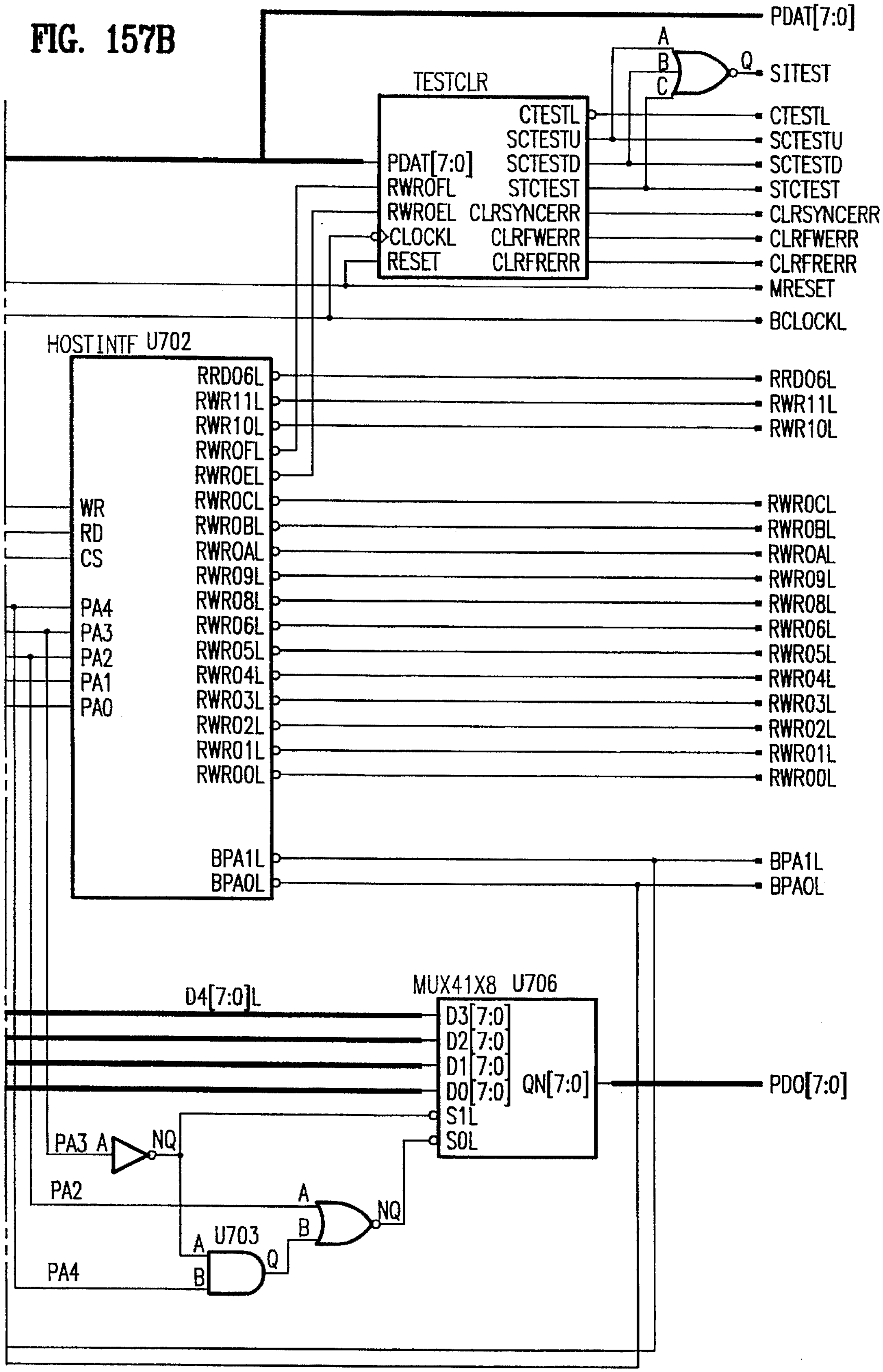
Figure 158:
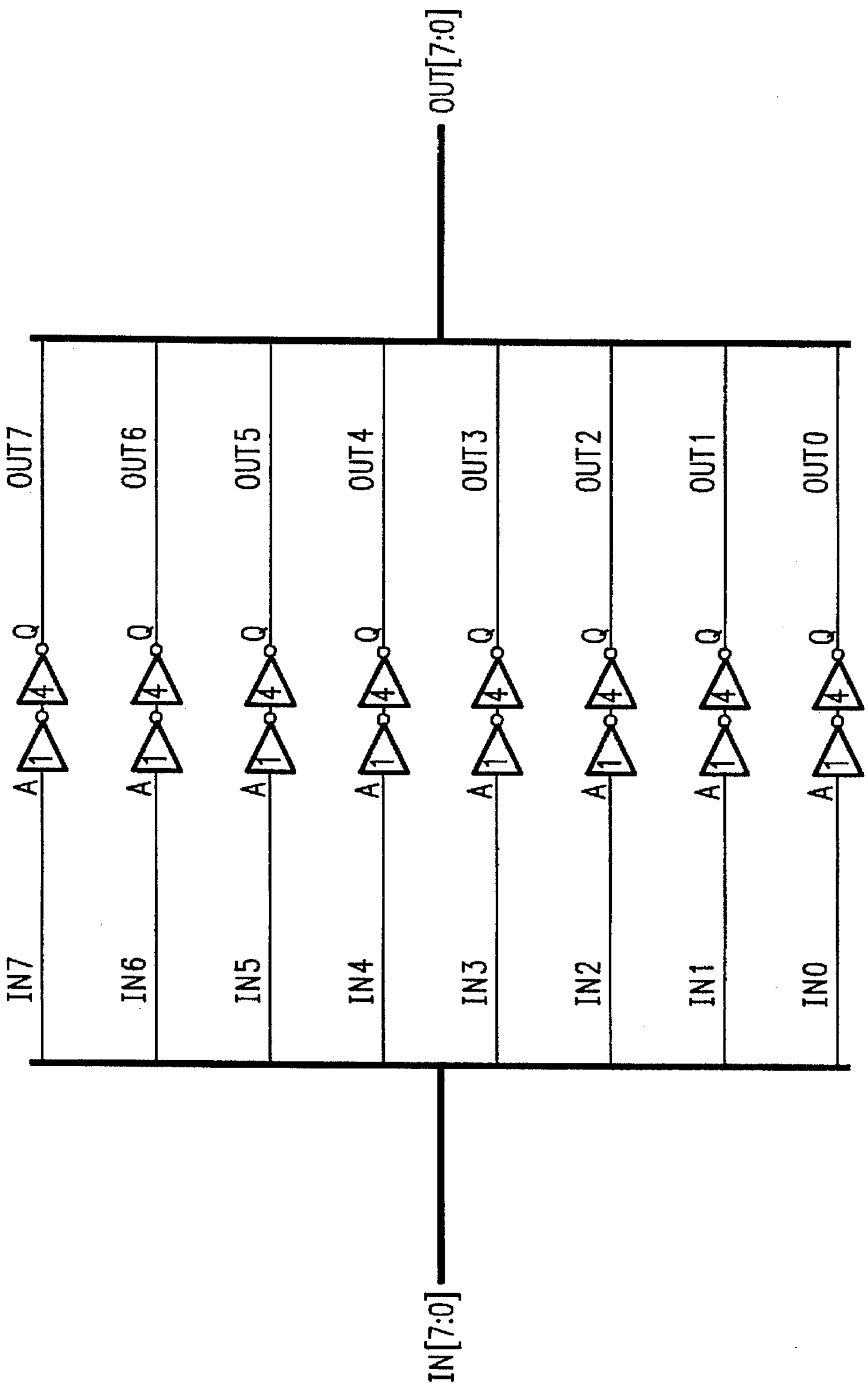
Figure 159A:
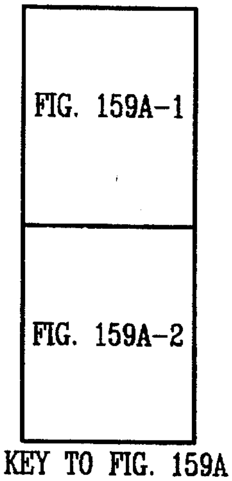
Figure 1:
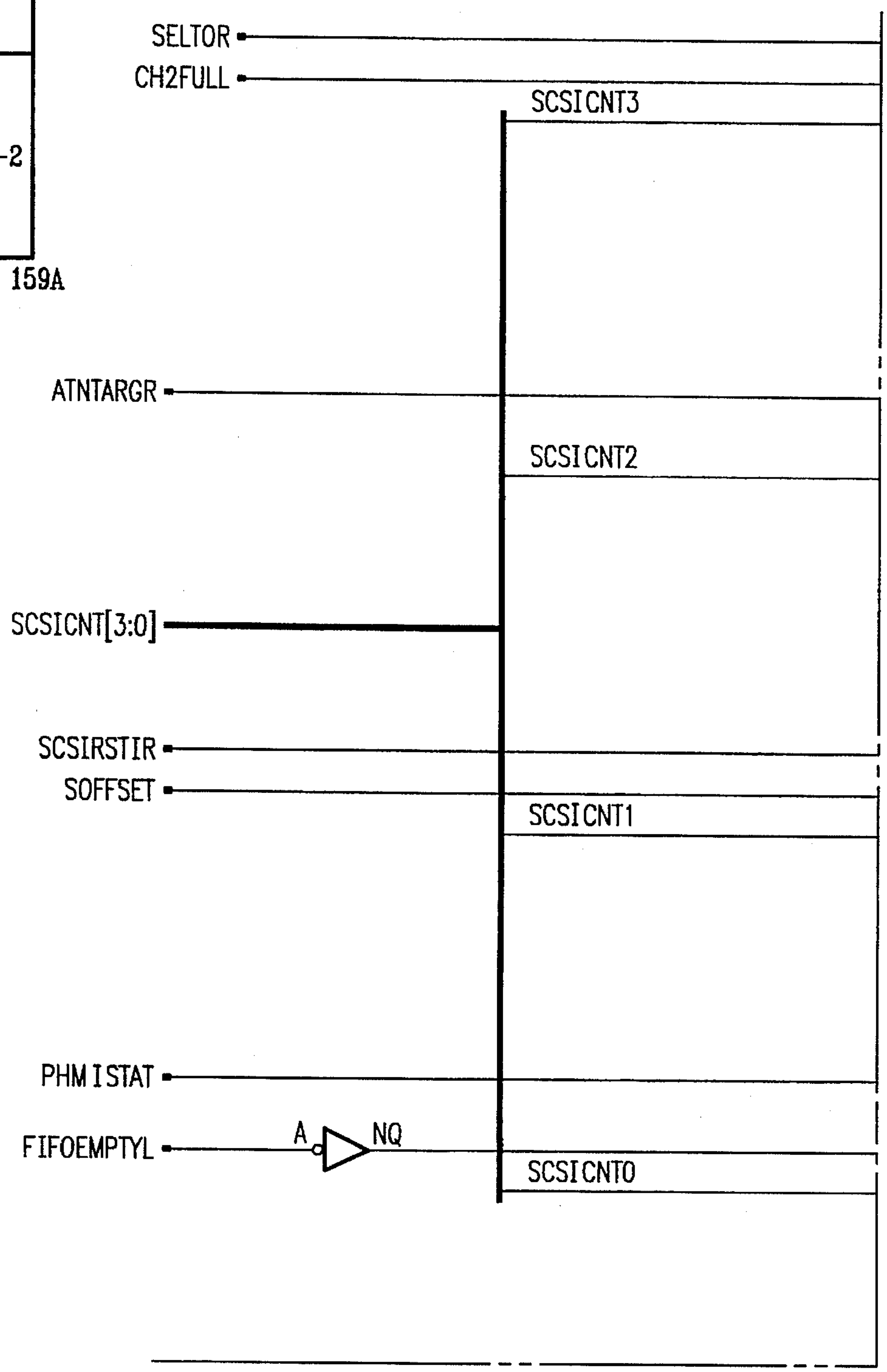
Figures 2, 159A:
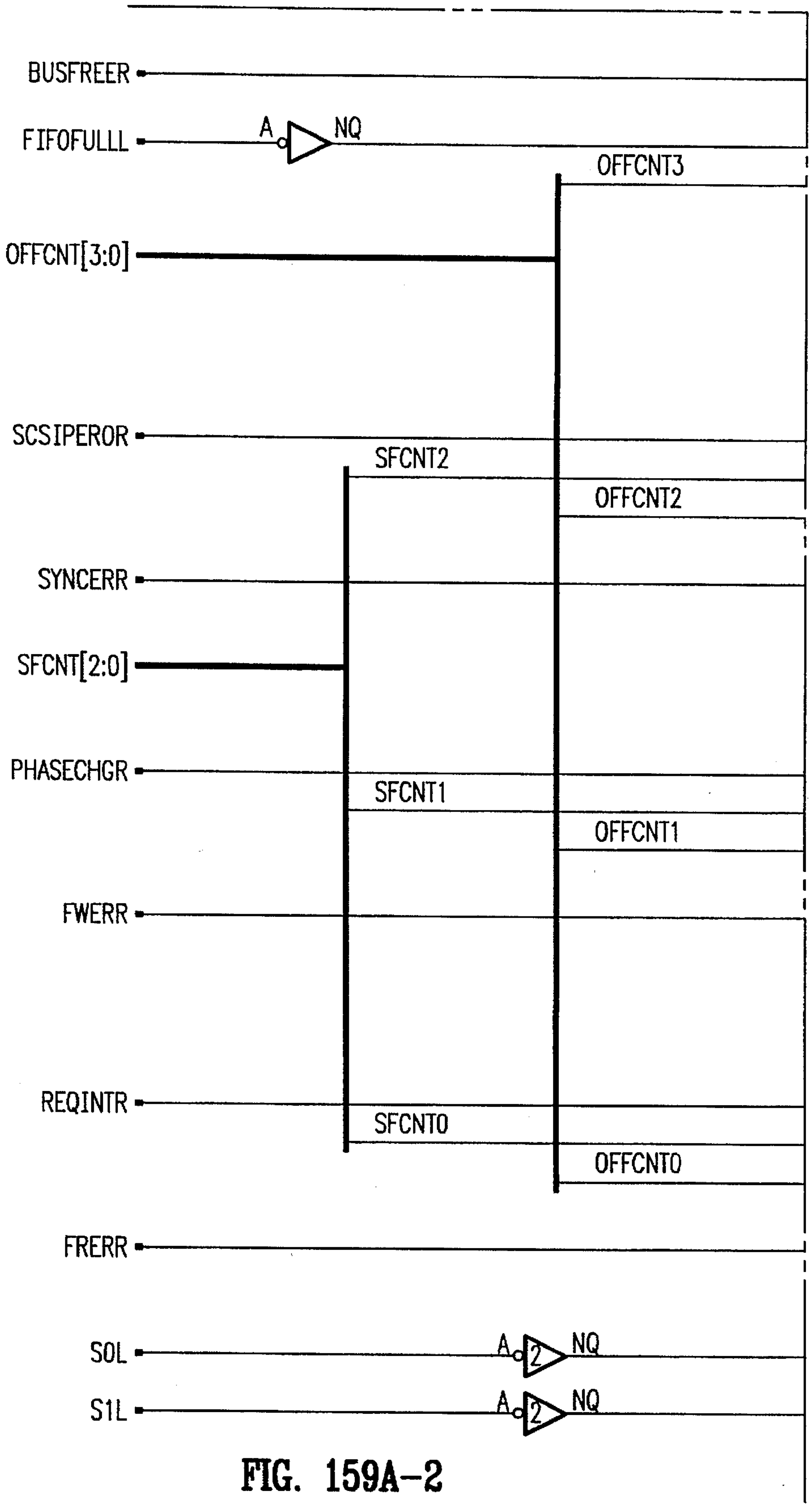
Figure 159B:
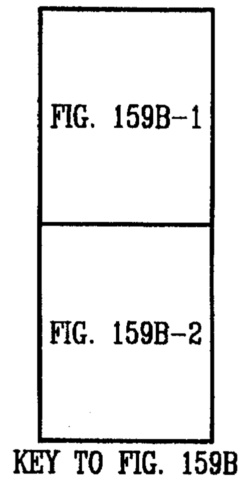
Figure 1:
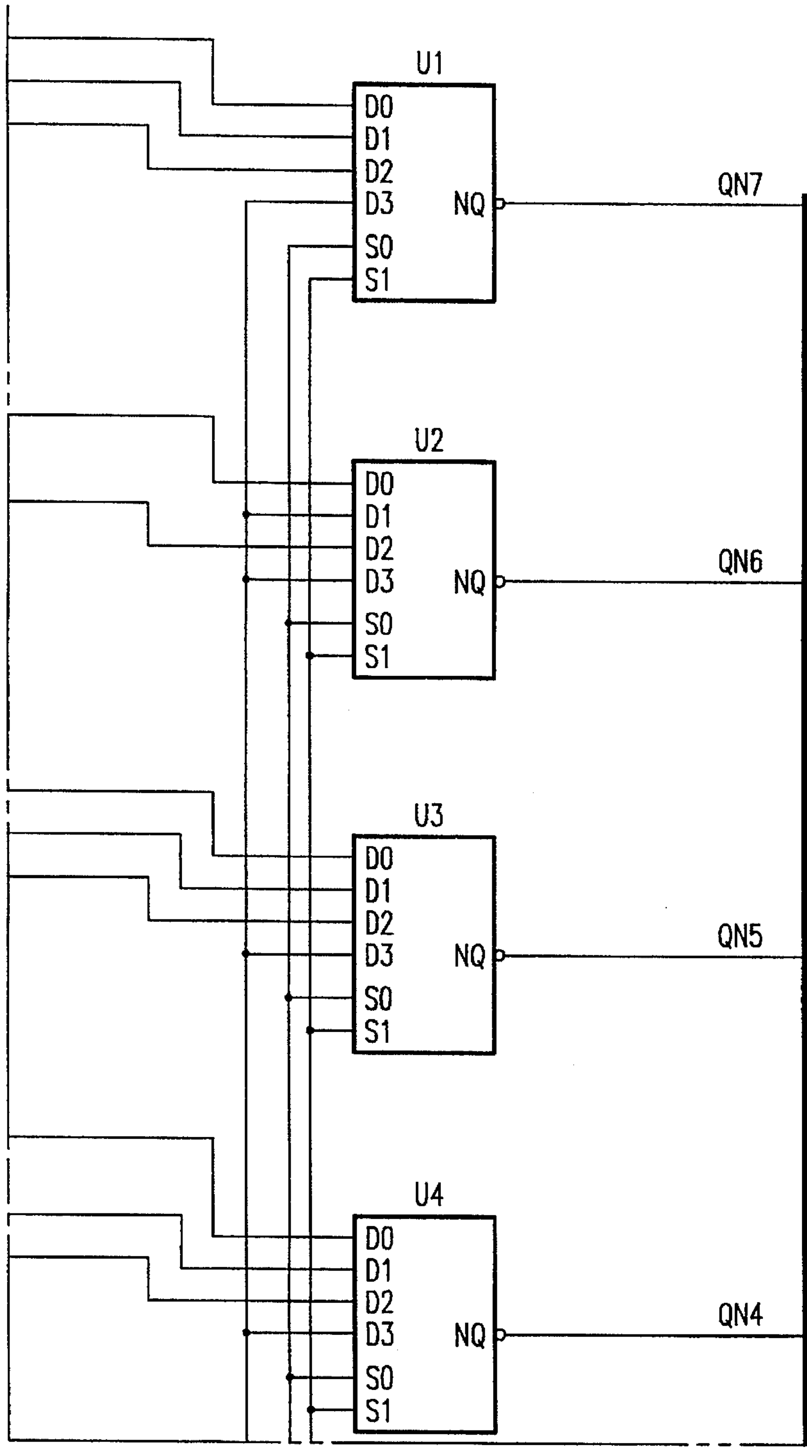
Figures 2, 159B:
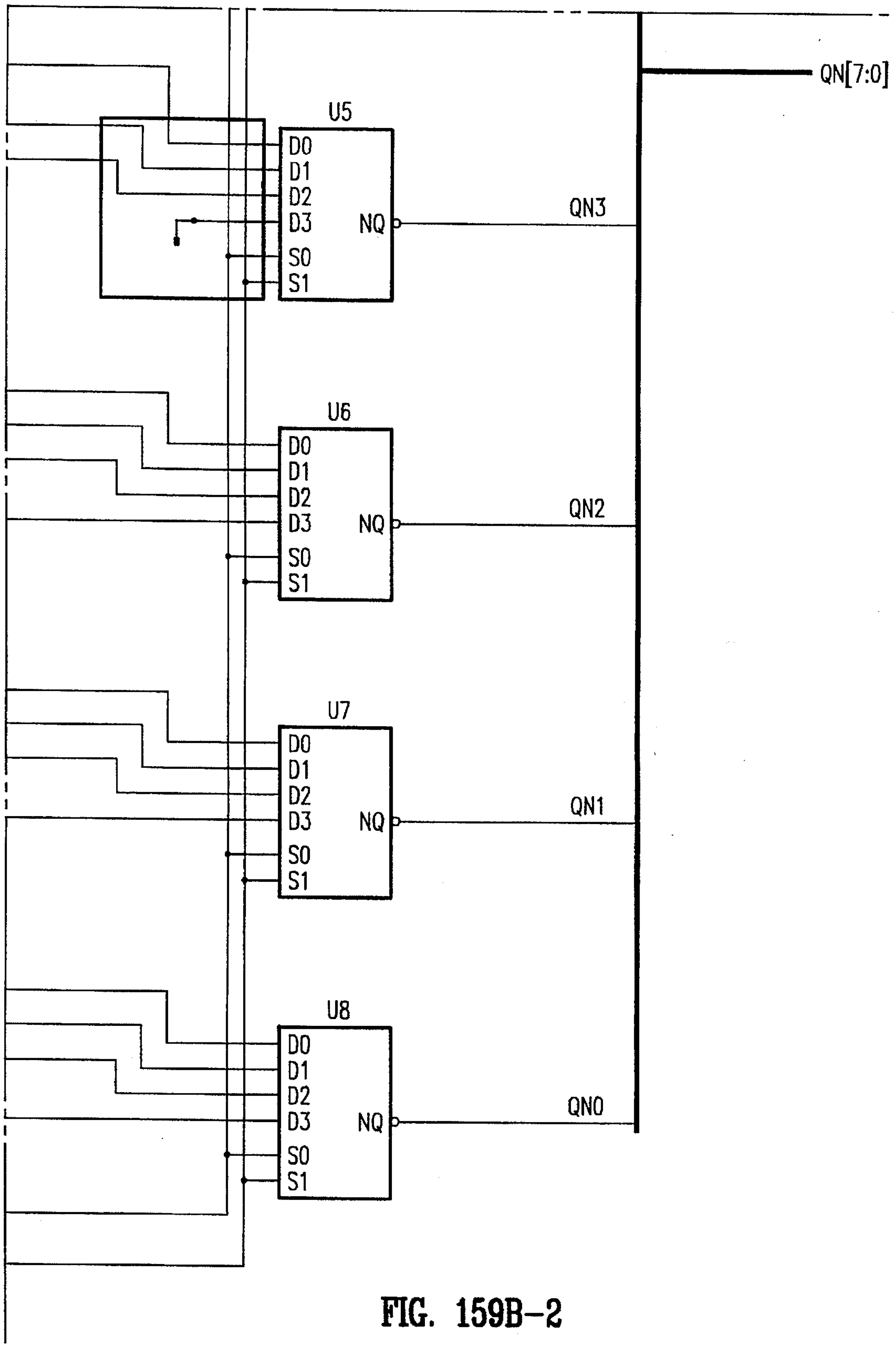

The final portion of circuit SCSI is illustrated in FIGS. 157A and 157B and includes circuits GRP4MUX, BUF04X8, TESTCLR, HOSTINTF, and MUX41X8. Circuits BUF04X8, GRP4MUX, HOSTINTF, TESTCLR, and MUX41X8 are shown in more detail in FIG. 158, FIGS. 159A and 159B, FIG. 160, FIGS. 161A and 161B, and FIG. 162, respectively.

Figure 176B:
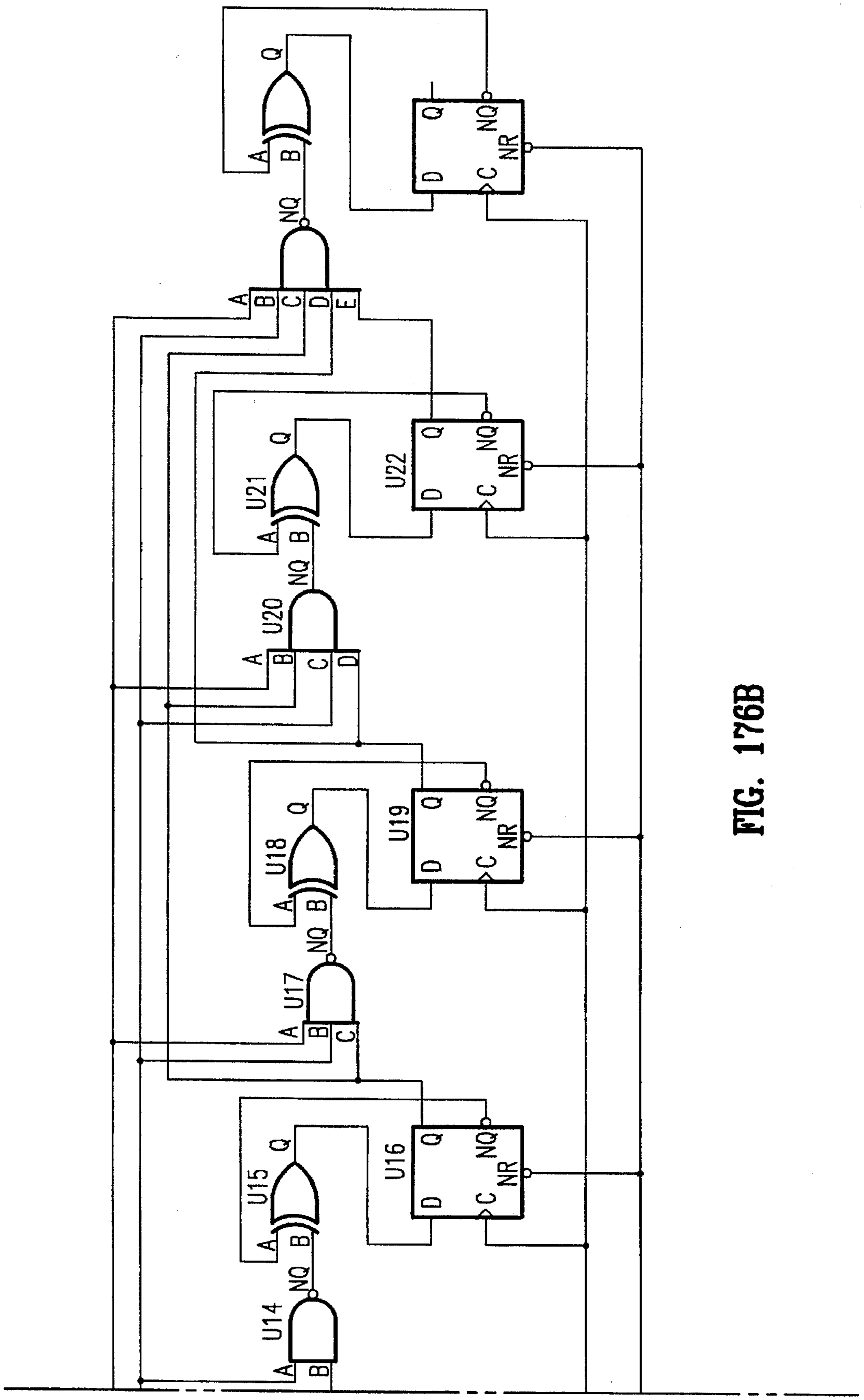

The final portion of the overall structure of H/A integrated circuit 6260 is illustrated in FIGS. 163A and 163B and includes circuits TMUXSEL, MUX4_8, MUX3_8E, MUX2_3_2, MUX2_1, and BYTESEL2. Circuit TMUXSEL is shown in more detail in FIG. 164. Circuit MUX3_8E is illustrated in FIGS. 165A and 165B. FIG. 166 illustrates circuit MUX2_3_2. Circuit BYTESEL4 is illustrated in FIGS. 167A and 167B. FIG. 168 shows octal inverter circuit INVO1X8. FIG. 169 shows circuit INVX8A. Circuits LATCH2, LATCH5, LATCH6, LATCH8, and LATCH8HA are illustrated in FIGS. 170, 171, 172, 173, and 174A and 174B, respectively. Circuit BOFFCTR is illustrated in FIGS. 175A and 175B. Circuit UCTR8B is illustrated in FIGS. 176A and 176B. Finally, FIG. 177 illustrates circuit DIV20.

In the previous embodiment, the H/A integrated circuit 6260 was preferably contained on the motherboard 220A of computer system 220. Similarly, Sparrow driver 302 was contained in random access memory. These embodiments are illustrative only of the principles of the invention and are not intended to limit the invention to the specific embodiments described. As is known to those skilled in the art, H/A integrated circuit 6260 could be mounted on other than the motherboard 220A and Sparrow driver 302 could be contained in any suitable storage medium.

TABLE A

Referring to the top plan view of FIG. 5B, the outer 68 pins of the PLCC (Plastic leaded chip carrier) package are grouped into non-overlapping sets of AT bus pins, SCSI bus pins and miscellaneous other pins as shown. The names and functions of the pins are described in this Table (I = input into the H/A chip, O = output from the H/A chip).

| NAME | TYPE | DESCRIPTION |
|---|---|---|
| (a) AT PINS: | | |
| SA0–SA9 | I | System address lines. |
| AEN | I | Address enable. This signal is low for programmed I/O access and high for DMA transfers. |
| ALTERNATE* | I | Alternate I/O address decode. When high the address block is decoded at 340H, when low it is decoded at 140H. |

TABLE A-continued

Referring to the top plan view of FIG. 5B, the outer 68 pins of the PLCC (Plastic leaded chip carrier) package are grouped into non-overlapping sets of AT bus pins, SCSI bus pins and miscellaneous other pins as shown. The names and functions of the pins are described in this Table (I = input into the H/A chip, O = output from the H/A chip).

| NAME | TYPE | DESCRIPTION |
|---|---|---|
| SD0–SD15 | I/O | System data lines. Eight bit transfers use pins SD0–SD7 while 16 bit data transfers use all of pins SD0–SD15. (Tristate drivers are provided on-chip to supply logic high and low output currents, IOH=–8 mA, IOL=24 mA) |
| DRQ | O | DMA Request. When DMA transfers are enabled, this signal is driven high when several bytes are ready to transfer out to the SCSI bus or when there is room for inputting several bytes into the internal FIFO. (A two state driver is provided on-chip to supply IOH=–8 mA, IOL=24 mA) |
| DACK* | I | DMA Acknowledge. This signal is driven low by the DMA controller when a DMA channel is granted to H/A integrated circuit 6260. |
| IRQ | O | Interrupt Request. This signal is driven high when an enabled interrupt event of H/A integrated circuit 6260 needs to be serviced by the host microprocessor. (Driven by an on-chip two state driver, IOH=–8 mA, IOL=24 mA) |
| IOR* | I | I/O Read, active low |
| IOW* | I | I/O Write |
| T/C | I | Terminal count. This signal is driven high by the DMA controller during the last DMA data transfer to signal the end of the transfer. |
| SBHE* | I | System Bus High Enable. This signal indicates that data on the higher SD8–SD15 data lines is valid. |
| RESET | I | System Reset. This signal is active high at power up or hard system reset. This signal has hysteresis for noise immunity. (1.5 V < Vth+ < 2.0 V; 0.6 V < Vth– < 1.1 V; [Vth+ – Vth–] = 0.4 V) |
| IOCS 16* | O | I/O Chip Select 16. This signal is driven low when the current I/O data transfer mode is word length (16 bits wide). (Open collector driver, IOL=24 mA) |
| SCDO-7* | I/O | SCSI Data. These bidirectional pins are used during information transfer phases on the SCSI bus. (Open collector driver, IOL=48 mA, input hysteresis 0.2 V) |
| SDP* | I/O | SCSI Data Parity. Parity is always valid when driving the SCSI Data bus, and is checked when enabled. (Open collector driver, IOL=48 mA, input hysteresis 0.2 V) |
| RST* | I/O | Reset. This pin is driven under programmed control. When externally activated an interrupt is sent to the host. (Open collector driver, IOL–48 mA, input hysteresis 0.2 V) |
| ATN* | I/O | Attention. This pin is driven when H/A integrated circuit 6260 functions as an initiator, detected when the H/A integrated circuit 6260 functions as a target. (Open collector driver, IOL=48 mA, input hysteresis 0.2 V) |
| BSY* | I/O | Busy. This pin is driven and received by the initiator for the Arbitration and Selection phases. The pin is driven and received by the target for all phases. (Open collector driver, IOL=48 mA, input hysteresis 0.2 V) |

TABLE A-continued

Referring to the top plan view of FIG. 5B, the outer 68 pins of the PLCC (Plastic leaded chip carrier) package are grouped into non-overlapping sets of AT bus pins, SCSI bus pins and miscellaneous other pins as shown. The names and functions of the pins are described in this Table (I = input into the H/A chip, O = output from the H/A chip).

| NAME | TYPE | DESCRIPTION |
|---|---|---|
| SEL* | I/O | Select. Driven and received by target and initiator for selection and reselection phases. (Open collector driver, IOL=48 mA, input hysteresis 0.2 V) |
| C/D* | I/O | Command/Data. Received by initiator, driven by target to establish current phase. (Open collector driver, IOL=48 mA, input hysteresis 0.2 V) |
| I/O* | I/O | In/Out. Received by initiator, driven by target to establish current phase. (Open collector driver, IOL=48 mA, input hysteresis 0.2 V) |
| MSG* | I/O | Message. Received by initiator, driven by target to establish current phase. (Open collector driver, IOL=48 mA, input hysteresis 0.2 V) |
| REQ* | I/O | Request. Received by initiator, driven by target. Indicates Target is ready for next byte. (Open collector driver, IOL=48 mA, input hysteresis 0.2 V) |
| ACK* | I/O | Acknowledge. Driven by initiator, received by target. Indicates byte has been transferred. (Open collector driver, IOL=48 mA, input hysteresis 0.2 V) |
| PORTEN | O | Port enable decode. This is an address decode for an external port driver. Address bits 1–9 are included in this signal decode along with AEN. Address bit 0 must be decoded externally with IOR and IOW. (Two state driver, IOH=–2 mA, IOL=2 mA) |
| +5 V | I | 5 Volt power supply. +/–5% max. variation. Two pins. |
| GND | I | Ground. 7 pins. |
| X1 | I | Crystal input. 20 MHz crystal |
| X2 | O | Crystal output. 20 MHz crystal |
| CLKSEL | I | Clock select. When using the on board oscillator this pin should be tied to +5 V. When an external clock is used, this pin should be left floating, along with X1 and X2. |
| F1 | I/O | Clock in/out. This pin is either a clock source or input depending on the state of CLKSEL. When CLKSEL is high, it is an output clock at the crystal frequency. When CLKSEL is floating, this pin is an input, and is the clock source for the chip. |

TABLE B

An important feature of the host/adapter integrated circuit of this invention is the register set used in the control and operation of the host/adapter integrated circuit. One embodiment of each bit in each of the registers is presented in this Table. The name of each register is followed in parenthesis by an acronym for the register and an indication of whether the register is read (R), written to (W), or both (R/W) by the host microprocessor 221. The name of each register is preceded by the relative hexadecimal position of the register in host microprocessor address space 340h through 35Eh inclusive. The symbols (–) and (+) refer to the state of the control bit after a hard reset as being respectively inactive or active.

| BIT | | DEFINITION |
|---|---|---|
| | | 340h SCSI Sequence Control (SCSISEQ, R/W) |
| 7 | (–) | TEMODEO - Target Enable Mode Out bit is used to select whether bit ENSELO, bit 6 of this register, triggers a Reselection Out sequence (bit TEMODEO=1) or a Selection Out Sequence (bit TEMODEO=0). |
| 6 | (–) | ENSELO - Enable Selection Out bit is set to a logic one ("1" or High) to allow the SCSI Logic to perform (i) a Selection Sequence (bit TEMODEO = 0) as an Initiator (ID = OID field of SCSIID Register) and Select a Target (ID = TID field of the SCSIID Register), or (ii) a Reselection Sequence (bit TEMODEO=1) as a Target (ID = OID field of SCSIID Register) and reselect an Initiator (ID = TID field of Register SCSIID). This bit is set to zero by the microprocessor, or by a hard reset. |
| 5 | (–) | ENSELI - Enable Selection In bit is set to a one to allow the SCSI Logic to respond to a valid Selection sequence. This bit is set to zero by the microprocessor when no more selections are wanted. |
| 4 | (–) | ENRSELI - Enable Reselection In bit is set to a one to allow the SCSI Logic to respond to a valid Reselection sequence. This bit is set to zero by the microprocessor. |
| 3 | (–) | ENAUTOATNO - Enable Auto Attention Out bit is set to one so that a SCSI ATN is asserted when a Selection Sequence (bit ENSELO=1, bit TEMODEO=0) is executed. This bit is set when an Initiator wants to follow Selection with Message Out. Writing a zero to this bit does not clear ATN. |
| 2 | (–) | ENAUTOATNI - Enable Auto Attention In bit is set to a one so that SCSI ATN is asserted when the host/adapter circuit 6260 is reselected by a Target (bit ENRSELI=1). This bit is set when an Initiator wants to follow Reselection with Message Out. Writing a zero to this bit does not clear ATN. |
| 1 | (–) | ENAUTOATNP - Enable Auto Attention Parity bit is set to a one so that an Initiator SCSI ATN is asserted during information transfer in phases Data In, Message In, and Status In if a parity error is detected on bus SD0–SD7. Writing a zero to this bit does not clear ATN. |
| 0 | (–) | SCSIRSTO - SCSI Reset Out bit is set to a one so that a SCSI RST is asserted on the SCSI Bus. This bit must be cleared by the microprocessor with a write of 0. This bit is not gated with the Target/Initiator Mode. |
| | | 341h SCSI Transfer Control 0 (SXFRCTL0, R/W) |
| 7 | (–) | SCSIEN - SCSI Enable bit is set to a one to enable transfers between the SCSI Bus and SCSI FIFO. Writing a zero to this bit cleanly halts the transfer. When this bit is set to zero, the bit must be read back with a zero before the transfer is guaranteed to have halted. Synchronous data-in transfers are enabled when the offset is non-zero. |
| 6 | (–) | DMAEN - DMA Enable bit is set to a one to enable transfers between the SCSI and DMA FIFOs. |
| 5 | | CH1/CH2— - Channel 1/Channel 2 bit is set to one to select channel 1. Channel 2 references are retained for future upward compatibility only. |
| 4 | (–) | CLRSTCNT - Clear SCSI Transfer Counter (STCNT) bit is set to a one to set the SCSI Transfer Counter to 000000h. The hardware generates a clear pulse so this bit need not be toggled. This bit is always read back as zero. |
| 3 | (–) | SPIOEN - SCSI PIO Enable Bit is set to a one, to enable automatic data transfer PIO mode on the SCSI Bus. This bit must remain set for the entire PIO transfer. Writing a zero to this bit stops any further PIO transfers without corrupting any valid data in the SCSIDAT Register. |
| 2 | | Not Used, always reads 0. |
| 1 | | CLRCH1 - Clear Channel 1 bit is set to a one so that the hardware generates a pulse to clear the SCSI CH1 FIFO, Offset Count, and SCSI Transfer Counter. This bit is used to initialize the channel for a data transfer. |
| 0 | | CLRCH2 - Not Used |
| | | 342h SCSI Transfer Control 1 (SXFRCTL1, R/W) |
| 7 | | BITBUCKET - SCSI Bit Bucket bit is set to a one to enable the SCSI Logic to read data from the SCSI Bus and throw the data away or supply 00h write data. No data is saved and no transfer stops occur because of FIFO full/empty conditions. This bit is used only while H/A integrated circuit 6260 is in Initiator Mode. |
| 6 | | SWRAPEN - When in Target mode and this bit is set to one, Register STCNT is allowed to wrap past 0 to allow the transfer count to exceed a 24 bit value. Status bit SWRAP is one when the wrap occurs. If it is not the last wrap, status bit SWRAP is cleared by writing a one to CLRSWRAP Control (bit3, CLRSINT0 Register) and wait for the next SWRAP interrupt. If it is the last wrap, bit SWRAP is zeroed by writing a one to CLRSWRAP Control and a zero to SWRAPEN, and then wait for the SDONE Interrupt (bit 2, SSTAT0). This bit is not functional during Initiator Mode. |
| 5 | | ENSPCHK - When set to a one, parity checking is enabled on the SCSI Bus during selection/reselection and information transfer cycles. When set to a zero, bit SCSIPERR will always read as a zero. |
| 4, 3 | | STIMESEL [1, 0] - These bits define the selection timeout time used by the hardware selection timer.<br>0, 0 - 256 ms<br>0, 1 - 128 ms<br>1, 0 - 64 ms<br>1, 1 - 32 ms |
| 2 | | ENSTIMER - When set to one, enables the hardware selection timer. During selection or reselection out, if the timer times out, SEL will be turned off, and bit SELTO will be set to one in register SSTAT1. If this bit is set to zero, SEL will remain on the bus until it is cleared. |

TABLE B-continued

An important feature of the host/adapter integrated circuit of this invention is the register set used in the control and operation of the host/adapter integrated circuit. One embodiment of each bit in each of the registers is presented in this Table. The name of each register is followed in parenthesis by an acronym for the register and an indication of whether the register is read (R), written to (W), or both (R/W) by the host microprocessor 221. The name of each register is preceded by the relative hexadecimal position of the register in host microprocessor address space 340h through 35Eh inclusive. The symbols (−) and (+) refer to the state of the control bit after a hard reset as being respectively inactive or active.

| BIT | DEFINITION |
|---|---|
| 1 | BYTEALIGN - When set to one, causes 1 handshake to occur between the DMA FIFO and the SCSI FIFO, with the data being discarded. This is used during a write operation to align data after an odd byte boundary disconnect. |
| 0 | Not Used, always reads 0. |

343h SCSI Signal (SCSISIG, R/W)

The SCSISIG Write register allows control of the SCSI signals that are enabled on the bus according to the mode of operation (Target or Initiator). CD, IO, and MSG in SCSISIG Write are used for the phase comparison when in Initiator Mode. All control signals in this register are cleared by the BUS FREE or SCSI RESET conditions, or a Hard Reset.

| BIT | | DEFINITION |
|---|---|---|
| | | SCSISIG Read Bits: |
| 7 | | CDI - Reflects state of CD signal on SCSI Bus. |
| 6 | | IOI - Reflects state of IO signal on SCSI Bus. |
| 5 | | MSGI - Reflects state of MSG signal on SCSI Bus. |
| 4 | | ATNI - Reflects state of ATN signal on SCSI Bus. |
| 3 | | SELI - Reflects state of SEL signal on SCSI Bus. |
| 2 | | BSYI - Reflects state of BSY signal on SCSI Bus. |
| 1 | | REQI - Reflects state of REQ signal on SCSI Bus. |
| 0 | | ACKI - Reflects state of ACK signal on SCSI Bus. |
| | | SCSISIG Write Bits: |
| 7 | (−) | CDO - If in Target mode, sets CD on SCSI Bus. If Initiator mode, sets the state of CD expected on the next REQ pulse. |
| 6 | (−) | IOO - If in Target mode, sets IO on SCSI Bus. If Initiator mode, sets the state of IO expected on the next REQ pulse. |
| 5 | (−) | MSGO - If in Target mode sets MSG on SCSI Bus. If Initiator mode, sets the state of MSG expected on the next REQ pulse. |
| 4 | (−) | ATNO - If in Target mode, this bit is not used. If in Initiator mode, writing one to this bit sets ATN on the SCSI Bus. ATN may be cleared by writing one to bit CLRANTNO (bit 6 in CLRSINT1). |
| 3 | (−) | SELO - When set to a one asserts SEL on the SCSI Bus. When set to a zero, deasserts SEL if no one else is asserting SEL. |
| 2 | (−) | BSYO - When set to a one asserts BSY on the SCSI Bus. Can be used to negate BSY if no one else is driving it. This bit is also set by the selection out or reselection out logic. |
| 1 | (−) | REQO - If in Target mode, sets REQ on the SCSI Bus. It is not functional if an Initiator. |
| 0 | (−) | ACKO - If in Initiator mode, sets ACK on the SCSI Bus. It is not functional if a Target. |
| | | 344h SCSI Rate Control (SCSIRATE, W) |
| 7 | | Not Used. |

-continued

| BIT | DEFINITION |
|---|---|
| 6-4 | SXFR [2:0] - Synchronous SCSI Transfer Rate 2:0. These bits select the transfer rate per the following table. Times are shown in terms of nanoseconds for a 20 MHz clock and also in terms of clock period T. The transfer rate is expressed in Megabytes per second. |

| SXFR | REQ/ACK PW | PERIOD | RATE |
|---|---|---|---|
| 010 | 100 nS (2T) | 200 nS (4T) | 5.00 MB/S |
| 011 | 100 nS (2T) | 250 nS (5T) | 4.00 MB/S |
| 100 | 100 nS (2T) | 300 nS (6T) | 3.33 MB/S |
| 101 | 100 nS (2T) | 350 nS (7T) | 2.86 MB/S |
| 110 | 100 nS (2T) | 400 nS (8T) | 2.50 MB/S |
| 111 | 100 nS (2T) | 450 nS (9T) | 2.22 MB/S |

For transfer rates below 2.22 MB/S, use of the Asynchronous transfer mode is suggested.

| BIT | DEFINITION |
|---|---|
| 3-0 | SOFS [3:0] - SCSI Offset. When these four bits are set to 0000 the SCSI Transfer Mode is Asynchronous. When set to any other value the Transfer Mode is Synchronous with the indicated offset. Valid ranges besides 0000, are 0001 through 1000. This field only applies to DATA Phases on CH1. It should be set up properly per the SCSI Device synchronous negotiation since the Target could force a DATA in Phase even though a different phase may be expected. |
| | 345h SCSI ID (SCSIID, W) |
| 7 | Not Used. |
| 6-4 | OID[2:0] - Own ID. This is H/A integrated circuit 6260's device ID on the SCSI Bus during any type of selection/reselection sequence. It is the Initiator ID during Selection Out (bit ENSELO=1, bit TEMODEO=0) and Reselection In (bit ENRSELI=1, bit TEMODEO=0). It is the Target ID during Selection In (bit ENSELI=1, bit TEMODEO=1) and Reselection Out (bit ENSELO=1, bit TEMODEO=1). |
| 3 | Not Used. |
| 2-0 | TID [2:0] - Other ID. This is the other device ID on the SCSI Bus during any selection/reselection sequence. It is the other Target ID during Selection Out (bit ENSELO=1, bit TEMODEO=0) and Reselection In (bit ENRSELI=1, bit TEMODEO=0). It is the other Initiator ID during Selection In (bit ENSELI=1, bit TEMODEO=1) and Reselection Out (bit ENSELO=1, bit TEMODEO=1). In any case, it is THE OTHER ID. |

345h Selection/Reselection ID (SELID, R)

These are read-only register bits. After a selection in or reselection in has taken place, the IDs may be read from this register to determine the reselecting target.

| BIT | DEFINITION |
|---|---|
| 7 | SELID [7] |
| 6 | SELID [6] |
| 5 | SELID [5] |
| 4 | SELID [4] |
| 3 | SELID [3] |
| 2 | SELID [2] |
| 1 | SELID [1] |
| 0 | SELID [0] |

346h SCSI Latched Data (SCSIDAT, R/W)

This is a read/write latch used to transfer data on the SCSI Bus during Automatic or Manual SCSI PIO Transfer. Bit 7 is the MSB. Direct access to the SCSI Bus is provided via read of SCSIBUS Register.

347h SCSI Data Bus (SCSIBUS, R)

This read-only register reads the SCSI Data lines directly. This is used to read the bus during manual selection/reselection. Bit 7 is the MSB.

348h–34Ah SCSI Transfer Count (STCNTn, W/R)

These registers, STCNT0–STCNT2, contain the DMA Byte transfer count on the SCSI Interface. STCNT0 is the least significant byte, STCNT1 is the mid byte, and STCNT2 is the most significant byte.

If Target Mode is enabled, these counters are loaded with the number of REQ's to send out on the SCSI Bus. Loading 000000h will give a byte transfer count of 16,777,216 decimal (16M Hex). The counters count down on REQ's until they reach 0 at which time status bit SDONE (bit 2, register SSTAT0) is one (unless bit SWRAPEN has been set to a one). Each time the register wraps to 0 the status bit SWRAP (bit 3, register SSTAT0) is set to a one. Bit SWRAP should then be cleared via control bit CLRSWRAP (bit 3, register CLRSINT0) before the next wrap (that time is 16M times the SCSI Bus transfer period). The host processor must keep track of the number of wraps.

If Initiator Mode is enabled these registers must be set to zero by the Processor each time transfer is enabled between SCSI and the DMA FIFO's (via bit CLRSTCNT, bit 4, register SXFRCTL). The counters count up on REQ's. Optionally the counters can be reloaded with the current byte count if there is a disconnect/reconnect midway in a transfer. The counter provides transfer status only.

34Bh Clear SCSI Interrupts 0 (CLRSINT0, W)

Writing a one to any bit in this register clears the associated interrupt bit except bit 7 which sets the interrupt bit to one. Writing a zero has no effect. The bit does not have to be set to zero before another one is written.

| BIT | | DEFINITION |
|---|---|---|
| 7 | (+) | SETSDONE - Sets the SDONE interrupt bit, (bit 2 in register SSTAT0). |
| 6 | (+) | CLRSELDO - Clears the SELDO interrupt. |
| 5 | (+) | CLRSELDI - Clears the SELDI interrupt. |
| 4 | (+) | CLRSELINGO - Clears the SELINGO interrupt. |
| 3 | (+) | CLRSWRAP - Clears the SWRAP interrupt. |
| 2 | (+) | CLRSDONE - Clears the SDONE interrupt. |
| 1 | (+) | CLRSPIORDY - Clears the SPIORDY interrupt and status. |
| 0 | (+) | CLRDMADONE - Clears the DMADONE interrupt and status. |

34Bh SCSI Status 0 (SSTAT0, R)

This register contains the status of the SCSI interrupt bits. Any interrupt bit may be read at any time whether or not it has been enabled in SIMODE0. When enabled and set to one, the bit causes the interrupt line to go to the active state (except TARGET which is a status bit only).

| BIT | DEFINITION |
|---|---|
| 7 | TARGET - When this bit is set to a one it signals that H/A integrated circuit 6260 is the Target. It is only valid after a selection or reselection is completed and before bus free. |
| 6 | SELDO - This bit is set to a one when a Select Out or Reselect Out Sequence has been successfully done. Bit TARGET decides whether it was Select (TARGET=0) or Reselect (TARGET=1). Bit SELDO remains a one for the duration of the command in process. It is cleared by a Bus Free condition. Interrupts may be enabled by setting ENSELDO (bit 6, SIMODE0) to one. |
| 5 | SELDI - This bit is set to a one when H/A integrated circuit 6260 has been selected or reselected. If bit TARGET is a one, a selection occurred, and if zero, a reselection occurred. This bit will remain a one for the duration of the command in process. It is cleared by a Bus Free condition. Interrupts may be enabled by setting ENSELDI (bit 5, SIMODE0) to one. A read of this bit is the OR of the SELDI status and the SELDI interrupt bits. |
| 4 | SELINGO - This bit is set to a one during selection or reselection of another device. This interrupt is used to start looking for SELDO or Bus Timeout. This bit will remain a one after successful arbitration of the SCSI bus, and during the Selection phase. When a successful selection has been completed (SELDO is one), this bit will be zero. |
| 3 | SWRAP - This bit is set to one when counter STCNT wraps past 0. In Target mode, bit SWRAPEN (bit 6 in SXFRCTL1) must be set to enable the counter to wrap past 000000h. SWRAP is set when the counter counts down from 000001h to 000000h. In Initiator mode, bit SWRAP is active all the time. Bit SWRAP is set when the counter counts up from FFFFFFh to 000000h. SWRAP may be cleared by writing one to bit CLRSWRAP (bit 3 in register CLRSINT0). |
| 2 | SDONE - When set to a one the counter STCNT has counted down to 0. The bit is not set if SWRAPEN Control (bit 1, SCSICTL) is set to a one. This bit can also be set to a one by writing a one to bit 7 of register CLRSINT0. This signal is never set to one during Initiator mode (unless it was set to one before going into Initiator mode). This bit is cleared by writing a one to CLRSDONE of SLRSINT0. SCSIEN (bit 7, SXFRCTL0) should be cleared before this bit in target mode to prevent false transfers. |
| 1 | SPIORDY - When set to a one the automatic SCSI PIO function has been enabled and data is ready or needed by the SCSI data transfer logic. As an initiator, this bit is set to one when REQ is active. In target mode, the bit is set when ACK is active. In both initiator and target mode, during a transfer to SCSI, the bit is cleared on a write to SCSIDAT. During a transfer from SCSI, it is cleared on a read from SCSIDAT. |
| 0 | DMADONE - This bit is valid when DMA is used as the mode of data transfer. During a write operation this bit indicates that no data bytes are retained in either the SCSI FIFO or the DMA FIFO, and that terminal count has been received from the DMA controller. During a read operation it indicates only that the terminal count has been reached by the DMA controller. |

34Ch Clear SCSI Interrupts 1 (CLRSINT1, W)

Writing a one to any bit in this register clears the associated interrupt bit (except for bit 6 which clears attention). Writing a zero has no effect. The bit does not have to be set to zero before another one is written.

| BIT | | DEFINITION |
|---|---|---|
| 7 | (+) | CLRSELTIMO - Clears the SELTO interrupt. |
| 6 | (+) | CLRATNO - Clears the SCSI ATN bit if set by the Processor or any automatic mode. ATN is also cleared by the BUS FREE condition. |
| 5 | (+) | CLRSCSIRSTI - Clears SCSIRSTI interrupt. |
| 4 | | Not Used |
| 3 | (+) | CLRBUSFREE - Clears BUSFREE interrupt. |
| 2 | (+) | CLRSCSIPERR - Clears SCSIPERR interrupt. |
| 1 | (+) | CLRPHASECHG - Clears PHASECHG interrupt. |
| 0 | (+) | CLRREQINIT - Clears REQINIT interrupt. |

34Ch SCSI Status 1 (SSTAT1, R)

This read-only register contains the status of SCSI interrupt bits. Any interrupt bit may be read at any time whether or not it has been enabled in SIMODE1. If enabled and set to one, it will cause the interrupt line to go to the active state. All are cleared by the corresponding bits in the CLRSINT1

Register (except for ATNTARG and PHASEMIS).

| BIT | | DEFINITION |
|---|---|---|
| 7 | (–) | SELTO - This bit is set when the hardware selection timer is enabled and a selection or reselection timeout occurs. The timer is enabled by setting bit ENSTIMER (bit 2, register SXFRCTL1) to one along with the timeout value in bits 3 and 4. The bit is cleared by setting bit CLRSELTIMO in register CLRSINT1 to one. |
| 6 | (–) | ATNTARG - This bit is set to a one when you are a Target and the Initiator has set ATN. It is not latched and will be cleared when ATN is cleared. |
| 5 | (–) | SCSIRSTI - This bit is set to a one when another device asserts RST on the SCSI Bus. It remains set until cleared by writing a one to register CLRSINT1 bit 5. |
| 4 | (–) | PHASEMIS - This bit is set to a one when the actual phase on the SCSI Bus does not match the expected phase written to the SCSISIG Register. It is qualified with bit REQINIT (bit 0, register SSTAT1) and cleared when the two phase values match. Initiator Mode only. |
| 3 | (–) | BUSFREE - This bit is set to a one when the BSY and SEL signals have been negated on the SCSI Bus for 400 nanoseconds. This signal is latched and may be cleared by setting bit CLRBUSFREE in register CLRSINT1 to one. |
| 2 | (–) | SCSIPERR - This bit is set to a one when a parity error is detected on the incoming SCSI Information transfer. Parity is sampled on the leading edge of REQ if in Initiator mode or the leading edge of ACK if in Target mode. If parity is enabled (bit ENSPCHK in register SXFRCTL1 is set to one), a parity error causes a one to be latched in this bit until cleared by writing one to bit CLRSCSIPERR in register CLRSINT1. After writing to bit CLRSCSIPERR, this bit reflects the parity of the last byte transferred on the bus. If bit ENSPCHK is set to zero, this bit is always read as a zero. |
| 1 | (–) | PHASECHG - This bit is set to a one when the phase on the SCSI bus does not match the expected phase written to the SCSISIG register. It is not qualified with REQ. |
| 0 | (–) | REQINIT - Initiator Mode Only. This is set to a one on the leading edge of a REQ asserted on the SCSI Bus. It is cleared with any ACK on the SCSI bus or with bit CLRREQINIT. |

34Dh SCSI Status 2 (SSTAT2, R)

These bits are read only and give the status of the SCSI Ch1 FIFO.

| BIT | DEFINITION |
|---|---|
| 7 | CH2FULL - Not Used. |
| 6 | Not Used, always reads 0. |
| 5 | SOFFSET - When this bit is set to a one it indicates that ACK's are pending to be sent (Initiator Mode) or received (Target Mode) during Synchronous Transfers. |
| 4 | SEMPTY - When this bit is set to a one it indicates that the SCSI FIFO is empty. |
| 3 | SFULL - When this bit is set to a one it indicates that the SCSI FIFO is full. |
| 2–0 | SFCNT [2:0] - FIFO Byte Count. When these bits are 000 and bit SEMPTY=1 the FIFO is empty. When these bits are 000 and bit SFULL=1 the FIFO is full. Otherwise, the FIFO contains the number of bytes shown in this field. |

34Eh SCSI Test Control (SCSITEST, W)

This write-only register is used to force test modes in the SCSI Logic.

| BIT | DEFINITION |
|---|---|
| 7–4 | Not Used. |
| 3 | SCTESTU - When set to a one the SCSI transfer counter STCNT is put into a mode where it counts up at the input clock rate. |
| 2 | SCTESTD - When set to a one the SCSI transfer counter STCNT is put into a mode where it counts down at the input clock rate. |
| 1 | Not Used. |
| 0 | STCTEST - When set to one, forces a stage to stage carry true in both transfer and select abort counters. This causes both counters to run at clock rate.<br>During the Transfer count test, the counter contents can be monitored by reading the desired stage.<br>If bits STCTEST and ENSTIMER are both true, then STCOUNT0 read register (bits 0 thru 5) is reassigned to the select abort counter as follows: |

| BIT | ASSIGNMENT |
|---|---|
| 5 | Stage 6 ( /2, output) |
| 4 | Stage 5 ( /2, output) |
| 3 | Stage 4 ( /2, output) |
| 2 | Stage 3 ( /10, carry out) |
| 1 | Stage 2 ( /256, carry out) |
| 0 | Stage 1 ( /256, carry out) |

34Eh SCSI Status 3 (SSTAT3, R)

This read-only register is the status of the current Synchronous SCSI Information Transfer Phase.

| BIT | | DEFINITION |
|---|---|---|
| 7–4 | (–) | SCSICNT [3:0] - Gives the difference between what the offset count says is in the SCSI FIFO1 and what the FCNT says is in the SCSI FIFO1. Used by hardware to prevent SCSI FIFO1 overrun. Do not read this counter unless transfers are stopped. |
| 3–0 | (–) | OFFCNT [3:0] - Gives the current SCSI Offset count. Do not read this counter unless transfers are stopped. |

34Fh Clear SCSI Errors (CLRSERR, W)

Writing a 1 to any bit in this register clears the associated status bit. Writing a 0 has no effect. The bit does not have to be cleared to 0 before another 1 is written

| BIT | | DEFINITION |
|---|---|---|
| 7–3 | | Not Used. |
| 2 | (–) | CLRSYNCERR - Clears SYNCERR status. |
| 1 | (–) | CLRFWERR - Clears FWERR status. |
| 0 | (–) | CLRFRERR - Clears FRERR status. |

34Fh SCSI Status 4 (SSTAT4, R)

This is a read of the possible error conditions during a SCSI Transfer.

| BIT | | DEFINITION |
|---|---|---|
| 7–3 | | Not used, these bits always read 0000. |
| 2 | (–) | SYNCERR - This error flag is set to a one when the H/A integrated circuit 6260 goes into a Synchronous transfer mode where data is transferred from the SCSI bus and the SCSI FIFO is not empty or the SCSI Offset is not zero. This means that the SCSI FIFO may overflow |

-continued

| BIT | | DEFINITION |
|---|---|---|
| | | because the SCSICNT is not correct. |
| 1 | (−) | FWERR - This bit is set when more than one source is enabled to write to the SCSI FIFO. This can occur when the CH1 FIFO path is set up to send data from DMA FIFO1 to SCSI FIFO1 to SCSI and H/A integrated circuit 6260 is reslected as an Initiator and the target drives I/O such that data is enabled SCSI to SCSI FIFO1 (DATA IN phase). |
| 0 | (−) | FRERR - This bit is set to a one when more than one source is enabled to read from the SCSI FIFO1. |

350h SCSI Interrupt Mode 0 (SIMODE0, R/W)

Setting any bit will enable that function to interrupt the microprocessor via the IRQ pin.

| BIT | DEFINITION |
|---|---|
| 7 | Not Used, always reads 0. |
| 6 | ENSELDO - Enables SELDO status to assert IRQ pin. |
| 5 | ENSELDI - Enables SELDI status to assert IRQ pin. |
| 4 | ENSELINGO - Enables SELINGO status to assert IRQ pin. |
| 3 | ENSWRAP - Enables SWRAP status to assert IRQ pin. |
| 2 | ENSDONE - Enables SDONE status to assert IRQ pin. |
| 1 | ENSPIORDY - Enables SPIORDY status to assert IRQ pin. |
| 0 | ENDMADONE - Enables DMADONE status to assert IRQ pin. |

351h SCSI Interrupt Mode 1 (SIMODE1, R/W)

Setting any bit will enable that function to interrupt the microprocessor via the IRQ pin.

| BIT | DEFINITION |
|---|---|
| 7 | ENSELTIMO - Enables the SELTO status to assert the IRQ pin. |
| 6 | ENATNTARG - Enables ATNTARG status to assert IRQ pin. |
| 5 | ENSCSIRST - Enables SCSIRST status to assert IRQ pin. |
| 4 | ENPHASEMIS - Enables PHASEMIS status to assert IRQ pin. |
| 3 | ENBUSFREE - Enables BUSFREE status to assert IRQ pin. |
| 2 | ENSCSIPERR - Enables the latched SCSIPERR status to IRQ pin. |
| 1 | ENPHASECHG - Enables PHASECHG status to assert IRQ pin. |
| 0 | ENREQINIT - Enables REQINIT status to assert IRQ pin. |

352h DMA Control 0 (DMACNTRL0, R/W)

This register contains the basic controls for a data transfer using PIO or DMA to/from the SCSI bus. These bits may be set at the same time to define the mode of transfer and enable it to start.

| | | |
|---|---|---|
| 7 | (−) | ENDMA - Enables data transfer between the host system and the internal 128 byte FIFO of the adapter chip using either DMA or PIO. Clearing this bit also clears bit ATDONE in register DMASTAT. |

-continued

| | | |
|---|---|---|
| 6 | | 8BIT/−16BIT - When set to a one, indicates that transfers to or from DMADATA will be 8 bits wide using SD0 thru SD7. When set to zero data transfers will be 16 bits wise and SD0 through SD15 will be used. |
| 5 | | DMA/−PIO - When set to a one indicates that the DMA method of data transfer is to be used. When set to zero, the PIO method will be used. |
| 4 | | Unused, reads zero. |
| 3 | | WRITE/−READ - When set to a one, indicates a host to SCSI transfer. When cleared, indicates a SCSI to host transfer. |
| 2 | (−) | INTEN - When set to a one enables IRQ pin for host interrupts. |
| 1 | | RSTFIFO - When set to a one, clears the DMA FIFO counter. This bit is self clearing. |
| 0 | | SWINT - When set to one, causes IRQ to go active if INTEN is set to one. This is a way for software to cause an interrupt. |

352h DMA Control 1 (DMACNTRL1, R/W)

These are other control bits used in defining the mode of operation.

| | | |
|---|---|---|
| 7 | (−) | PWRDWN - When set to a one halts the adpater chip's oscillator to conserve power. The chip is not operational at this time. |
| 6 | | Unused. |
| 5 | | Unused. |
| 4 | | Unused. |
| 3 | | STK [3] - Stack offset pointer, write only. |
| 2 | | STK [2] |
| 1 | | STK [1] |
| 0 | | STK [0] |

354h DMA Status (DMASTAT, R)

These bits report in real time the status of a DMA or PIO operation.

| | |
|---|---|
| 7 | ATDONE - Used during DMA mode only, this bit is set when the host system DMA controller has transferred the last byte/word and has asserted the terminal count (T/C) signal. While the ATDONE bit is set, the adapter-chip to AT DMA logic is disabled. The ATDONE bit is cleared when the ENDMA bit (DMACNTRL0 bit 7) is reset. Bit ATDONE does not generate an interrupt. |
| 6 | WORDRDY - Used during PIO mode. When the data transfer count does not equal or end on a 32 byte boundary, the host transfers the data out of or into the DMA FIFO one word at a time. This signal indicates that a 16 bit word is ready for or needed from the host. |
| 5 | INTSTAT - This bit is the OR of all enabled interrupts. It may be read at any time to determine if there is an interrupt condition, whether or not interrupts are enabled with INTEN. |
| 4 | DFIFOFULL - This bit indicates that the DMA FIFO is full. This bit is used during SCSI to host PIO transfers. |
| 3 | DFIFOEMP - This bit indicates that the DMA FIFO is empty. This bit is used during host to SCSI PIO transfers. |
| 2 | Unused. |
| 1 | Unused. |
| 0 | Unused. |

355h FIFO Status (FIFOSTAT, R)

These bits indicate how many bytes are left in the DMA FIFO. They are used at the end of a transfer when using PIO. The DMA FIFO is 128 bytes deep. However, under some circumstances the DMA FIFO may hold up to 4 additional bytes. The count will be correct, the additional data is available in the FIFO.

| | |
|---|---|
| 7 | FCNT [7] |
| 6 | FCNT [6] |
| 5 | FCNT [5] |
| 4 | FCNT [4] |
| 3 | FCNT [3] |
| 2 | FCNT [2] |
| 1 | FCNT [1] |
| 0 | FCNT [0] |

356h DMA Data (DMADATA, W/R)

This is the port where data transfer takes place for DMA or PIO operations. For DMA operations, it is 16 bits wide if bit 8BIT/–16BIT in register DMACNTRL0 is set to zero and 8 bits if it is set to a one. During 8 bit transfers the data is present on the low order bits only.

During PIO operations, data is written or read using the REP INS or REP OUTS instructions to this port. SBHE on the AT bus determines if this is an 8 or 16 bit transfer. If SBHE is not active 8 bits are transferred on the low order data lines. If SBHE is active, 16 bits are transferred.

| | |
|---|---|
| 15 | DATH [15] |
| . | . |
| . | . |
| . | . |
| 8 | DATH [8] |
| 7 | DATL [7] |
| . | . |
| . | . |
| . | . |
| 0 | DATL [0] |

358h Burst Control (BRSTCNTRL, WR)

These bits control the burst on and burst off time during DMA transfers. Both may be set from 1 to 15 μs (microseconds). Loading zero in the Burst on and Burst off timer will disable the timer. The part will stay on the bus as long as there is data to transfer.

| | |
|---|---|
| 7 | BON [3] |
| 6 | BON [2] |
| 5 | BON [1] |
| 4 | BON [0] |
| 3 | BOFF [3] |
| 2 | BOFF [2] |
| 1 | BOFF [1] |
| 0 | BOFF [0] |

359h port A (PORTA, R/W)

This port provides an external 8 or 16 bit R/W port which may be accessed at any time. Bits are user defined.

35Ah Port B (PORTB, R/W)

This port provides an external 8 or 16 bit R/W port which may be accessed at any time. Bits are user defined.

35Ch Revision (REV, R)

This port gives the revision of the IC. Bits 2–0 are valid. The first version of the chip will return a value of 0.

35Dh Stack (STACK, W/R)

This port is an 8 bit wide by 16 byte deep stack for use as general purpose memory. It may be addressed by writing to the lower 4 bits of the DMACNTRL1 register. This is the offset value which is the first value read or written to the stack. This allows the software to directly access any byte in the stack. Successive reads or writes will access the next higher location in the stack.

35Eh Test register (TEST, W)

This register is used for test purposes only, and is not written to during normal operation. It's description is given here for completeness. During testing, either SCSIBLK or DMABLK should be set, but not both. If desired, one of the bits 2–6 may be set for specific tests.

| BIT | DESCRIPTION |
|---|---|
| 7 | Not used. |
| 6 | BOFFTMR - When set with either SCSIBLK or DMABLK enables BOFTMR [7:0] to SCDO [7:0]. |
| 5 | BONTMR - When set with either SCSIBLK or DMABLK enables BONTRM [7:0] to SCDO [7:0] |
| 4 | STCNTH - When set with either SCSIBLK or DMABLK enables STCNT [23.16] to SDO [15:8]. |
| 3 | STCHNTM - When set with either SCSIBLK or DMABLK enables STCNT [15:8] to SDO [15:8]. |
| 2 | STCNTL - When set with either SCSIBLK or DMABLK enables STCNT [7:0] to SDO [15:8]. |
| 1 | SCSIBLK - Enables the SCSI logic block for testing. Pin redefinitions are given blow. |
| 0 | DMABLK - Enables the DMA logic block for testing. Pin redefinition for test purposes are given below. |

We claim:

1. A host adapter integrated circuit for use in a host computer system having a host computer bus, a host processor for executing user instructions, and a SCSI bus having a set of data lines and a set of control lines, and for transfer of data between a host computer data bus of said host computer bus, and said SCSI bus via a SCSI protocol that includes a sequence of SCSI phases, said host adapter integrated circuit comprising:

a sequencer circuit having a first plurality of control lines coupled to said host computer bus and a second plurality of control lines connected to said set of control lines of said SCSI bus;

wherein said sequencer circuit controls at least one SCSI phase that is different from a SCSI data phase in said sequence of SCSI phases and completes said at least one SCSI phase without use of any processor; and a hardware interrupt circuit having an input line connected to said sequencer circuit and an interrupt output line;

wherein upon receipt of a signal on said input line, said hardware interrupt circuit generates a hardware interrupt signal on said interrupt output line for said host processor, and further wherein upon receipt of said hardware interrupt, said host processor suspends operation of any program executing in said host computer system, and uses said host adapter integrated circuit to perform another SCSI phase of operations in said sequence of SCSI phases for transferring data between said host computer data bus and said set of data lines of said SCSI bus.

2. A host/adapter system, for use in a host computer system having a host processor for executing user instructions, and for interfacing a host computer data bus of a host computer bus with a SCSI bus, that includes a set of data lines and a set of control lines, for transfer of data between said host computer data bus and said SCSI bus via a SCSI protocol that includes a sequence of SCSI phases, said host/adapter system comprising:

host adapter BIOS and service means including a SCSI manager means; and a driver means coupled to said SCSI manager means, wherein said driver means is for loading into a memory of said host computer system wherein said memory is coupled to said host processor of said host computer system, and for controlling data transfer between said computer data bus and said SCSI bus by sending instructions to said host processor which in turn generates information; and a host adapter integrated circuit including:

a sequencer circuit having a first plurality of control lines coupled to said host computer bus wherein said first plurality of control lines (i) receive signals in response to signals from said driver means including said information, and (ii) provide signals which in turn are transmitted to said driver means; and a second plurality of control lines connected to said set of control lines of said SCSI bus;

wherein said sequencer circuit, in response to signals on said first plurality of control lines, controls at least one SCSI phase that is different from a SCSI data phase in said sequence of SCSI phases; and said driver means returns control of said host processor to said host computer system, and said sequencer circuit completes said at least one SCSI phase in said sequence of SCSI phases without use of any processor; and a hardware interrupt circuit having an input line connected to said sequencer circuit, and an interrupt output line;

wherein upon receipt of a signal on said input line, said hardware interrupt circuit generates a hardware interrupt signal on said interrupt output line for said host processor, and further wherein upon receipt of said interrupt signal, said host processor suspends operation of any program executing in said host computer system, and uses said host adapter integrated circuit to perform another SCSI phase in said sequence of SCSI phases.

3. The host adapter integrated circuit of claim 1 wherein said sequencer circuit further comprises a SCSI arbitration sequencer and said at least one SCSI phase comprises a SCSI arbitration phase.

4. The host adapter integrated circuit of claim 1 wherein said sequencer circuit further comprises a SCSI selection out sequencer and said at least one SCSI phase comprises a SCSI selection out phase.

5. The host adapter integrated circuit of claim 1 wherein said sequencer circuit further comprises a SCSI selection in sequencer and said at least one SCSI phase comprises a SCSI selection in phase.

6. The host adapter integrated circuit of claim 1 wherein said sequencer circuit further comprises a SCSI reselection out sequencer and said at least one SCSI phase comprises a SCSI reselection out phase.

7. The host adapter integrated circuit of claim 1 wherein said sequencer circuit further comprises a SCSI reselection in sequencer and said at least one SCSI phase comprises a SCSI reselection in phase.

8. A host/adapter system as in claim 2 wherein said driver means further comprises:

means for programming said host adapter integrated circuit to perform said at least one SCSI phase;

means, coupled to said programming means, for waiting for a hardware interrupt comprising:

means for storing an address for resumption of operations of said driver means upon completion of said at least one SCSI phase; and means, coupled to said address storing means, for returning control of said host processor to said host computer system while said host adapter integrated circuit performs said at least one SCSI phase; and interrupt handler means, coupled to said stored address, for determining which of a plurality of hardware interrupts were generated by said host adapter integrated circuit hardware interrupt circuit wherein upon detection of a hardware interrupt indicating completion of said at least one SCSI phase, said interrupt handler means returns processing in said driver to said stored address.

9. The host adapter integrated circuit of claim 1 or claim 2 wherein said sequencer circuit controls a second SCSI phase in said sequence of SCSI phases and completes said second SCSI phase of operations without use of said host processor wherein said second SCSI phase of operations is a different SCSI phase than said at least one SCSI phase.

10. The host adapter integrated circuit of claim 1 or claim 2 further comprising:

an interrupt generating circuit responsive to control signals from said set of control lines of said SCSI bus, and coupled to said hardware interrupt circuit wherein said interrupt generating circuit generates interrupts indicating the status of said SCSI bus, hereinafter referred to as "SCSI bus status interrupts."

11. The host adapter integrated circuit of claim 10 further comprising:

a data storage structure including a plurality of bits used in the control of said host adapter integrated circuit.

12. The host adapter integrated circuit of claim 11, wherein said host processor has an address space and said data storage structure further comprises:

a plurality of registers wherein said registers are included in the address space of said host processor.

13. The host adapter integrated circuit of claim 12 wherein at least one register of said plurality of registers includes enable bits wherein a hardware interrupt for said host processor is generated by said hardware interrupt circuit only when the enable bit, for the SCSI bus status interrupt generated by said interrupt generating circuit, in said at least one register is active.

14. The host adapter integrated circuit of claim 12 wherein at least one register of said plurality of registers includes interrupt status bits wherein upon generation of the SCSI bus status interrupt by said interrupt generating circuit, the interrupt status bit for the SCSI bus status interrupt in said at least one register is set independent of whether an enable bit is active for the SCSI bus status interrupt.

15. The host adapter integrated circuit of claim 14 wherein at least one register of said plurality of registers includes interrupt clear bits wherein upon setting of an interrupt clear bit in said at least one register, the interrupt status bit corresponding to said interrupt clear bit in said at least one register including interrupt status bits is cleared.

16. The host adapter integrated circuit of claim 1 or claim 2 further comprising:

a data buffer circuit connected to said host computer data bus and to said SCSI bus wherein said data buffer circuit transfers information between said host computer data bus and said SCSI bus.

17. The host adapter integrated circuit of claim 16 wherein said data buffer circuit has a data transfer path with a width in bits that is equal to the width in bits of said host computer data bus.

18. The host adapter integrated circuit of claim 17 wherein said data buffer circuit comprises a first-in-first-out data buffer (FIFO).

19. The host adapter integrated circuit of claim 18 wherein said FIFO has a size in the range of 32 bytes to 512 bytes.

20. The host adapter integrated circuit of claim 19 wherein said FIFO has a size of 128 bytes.

21. The host adapter integrated circuit of claim 18 wherein said data buffer circuit additionally comprises a second first-in-first-out data buffer (FIFO).

22. The host adapter integrated circuit of claim 21 wherein a size of said second FIFO determines an offset condition for synchronous data transfer between said host computer data bus and said SCSI bus.

23. The host adapter integrated circuit of claim 1 or claim 2 further comprising:

a first internal clock oscillator circuit connected to clocked components in said host adapter integrated circuit wherein said first internal clock oscillator circuit generates an internal clock signal to said clocked components in said host adapter integrated circuit; and an external clock oscillator circuit pin wherein an external clock oscillator circuit coupled to said external clock oscillator circuit pin generates an external clock signal to said clocked components in said host adapter integrated circuit and further wherein only one of said internal and external clock signals is operative at any given time and said one of said internal and external clock signals is an operative clock signal.

24. The host adapter integrated circuit of claim 23 further comprising:

means, responsive to said operative clock signal, for selectively providing a clock signal to said clocked components whereby upon stopping provision of said clock signal to said clocked components, said host adapter integrated circuit is powered down.

25. The host adapter integrated circuit of claim 24 wherein said means for selectively providing a clock signal comprises a powerdown signal having a first logic level and a second logic level.

26. The host adapter integrated circuit of claim 25 wherein said means for selectively providing a clock signal further comprises a logic gate having two input terminals wherein said powerdown signal is applied to one of said two input terminals and the operative clock signal is applied to the other input terminal and further wherein:

said logic gate passes said operative clock signal therethrough when said powerdown signal has said first logic level; and said logic gate fails to pass said operative clock signal therethrough when said powerdown signal has said second logic level.

27. An host adapter integrated circuit, for use in a host computer system having a host computer bus and a host processor for executing user instructions, and for transferring data between a host computer data bus of said host computer bus and a SCSI bus having a set of data lines and a set of control lines, said host adapter integrated circuit comprising:

a hardware sequencer circuit connected to said set of control lines of said SCSI bus, and coupled to said host computer bus, and responsive to information from a driver means wherein said hardware sequencer circuit controls each SCSI phase of a plurality of SCSI phases, and further wherein upon providing information to said hardware sequencer circuit, such a driver means returns control of said processor to said computer system, and said hardware sequencer circuit completes at least one SCSI phase without use of any processor;

a SCSI interrupt circuit coupled to said set of control lines of said SCSI bus, and coupled to said hardware sequencer circuit wherein said SCSI interrupt circuit generates SCSI interrupts indicating the status of said SCSI bus, and indicating completion of a SCSI phase; and a host processor interrupt circuit connected to said SCSI interrupt circuit, wherein said host processor interrupt circuit generates a hardware interrupt for said host processor in response to said SCSI interrupt circuit indicating completion of a SCSI phase wherein upon receipt of said hardware interrupt, said host processor suspends operation of any program executing in said host computer system.

28. The host adapter integrated circuit of claim 27 wherein said host processor has an address space and said host adapter integrated circuit further comprises:

a plurality of registers wherein said registers are included in the address space of said host processor and each of said registers contains a plurality of bits.

29. The host adapter integrated circuit of claim 28 wherein at least one register of said plurality of registers includes enable bits wherein a hardware interrupt for said host processor is generated by said host processor interrupt circuit only when the enable bit for the SCSI interrupt generated by said SCSI interrupt circuit in said at least one register is active.

30. The host adapter integrated circuit of claim 29 wherein at least one register of said plurality of registers includes status bits wherein upon generation of the SCSI interrupt by said SCSI interrupt circuit, a status bit for the SCSI interrupt in said at least one register including status bits is set independent of whether an enable bit is active for that SCSI interrupt.

31. The host adapter integrated circuit of claim 30 wherein said host processor interrupt circuit further comprises a plurality of logic gates wherein each logic gate is coupled to only one status bit and to the enable bit corresponding to that status bit wherein the logic value of the status bit is passed through the logic gate as an output signal to an output line only when the enable bit is active.

32. The host adapter integrated circuit of claim 31 wherein said host processor interrupt circuit further comprises a first logic gate having a plurality of input terminals wherein each input terminal is connected to one output line from a logic gate in the plurality of logic gates and an output line wherein said first logic gate generates an output signal on said first logic gate output line whenever any one output signal from the plurality of logic gates has a predetermined level.

33. The host adapter integrated circuit of claim 32 wherein said host processor interrupt circuit further comprises a second logic gate having (i) a global interrupt enable signal as a first input signal wherein the global interrupt enable signal is driven by a global interrupt enable bit in one of said plurality of registers, and (ii) the output signal of said first logic gate as a second input signal wherein:

said second logic gate passes the output signal of said first logic gate therethrough as an output signal only upon said global interrupt bit being active; and the output signal of said second logic gate is the hardware interrupt signal to said host processor.

34. The host adapter integrated circuit of claim 30 wherein at least one of said plurality of registers includes interrupt clear bits wherein upon setting of an interrupt clear bit in said at least one register including interrupt clear bits, the status bit corresponding to said interrupt clear bit in said at least one register including status bits is cleared.

35. The host adapter integrated circuit of claim 27 further comprising:

a data buffer circuit connected to said host computer data bus and to said SCSI bus wherein said data buffer circuit transfers information between said host computer data bus and said SCSI bus.

36. The host adapter integrated circuit of claim 35 wherein said data buffer circuit has a data transfer path with a width in bits that is equal to a width in bits of said host computer data bus.

37. The host adapter integrated circuit of claim 35 wherein said data buffer circuit comprises a first-in-first-out data buffer (FIFO).

38. The host adapter integrated circuit of claim 37 wherein said FIFO has a size in the range of 32 bytes to 512 bytes.

39. The host adapter integrated circuit of claim 38 wherein said FIFO has a size of 128 bytes.

40. The host adapter integrated circuit of claim 37 wherein said data buffer circuit additionally comprises a second first-in-first-out data buffer (FIFO).

41. The host adapter integrated circuit of claim 40 wherein a size of said second FIFO determines a maximum offset condition for synchronous data transfer between said host computer data bus and said SCSI bus.

42. The host adapter integrated circuit of claim 41 wherein said second FIFO has a size of eight bytes.

43. The host adapter integrated circuit of claim 27 further comprising:

a first internal clock oscillator circuit connected to clocked components in said host adapter integrated circuit wherein said first internal clock oscillator circuit generates an internal clock signal to said clocked components in said host adapter integrated circuit; and an external clock oscillator circuit pin wherein an external clock oscillator circuit coupled to said external clock oscillator circuit pin generates an external clock signal to said clocked components in said host adapter integrated circuit and further wherein only one of said internal and external clock signals is operative at any given time and said one of said internal and external clock signals is an operative clock signal.

44. The host adapter integrated circuit of claim 43 further comprising:

means, responsive to said operative clock signal, for selectively providing a clock signal to said clocked components whereby upon stopping provision of said clock signal to said clocked components, said host adapter integrated circuit is powered down.

45. The host adapter integrated circuit of claim 44 wherein said means for selectively providing a clock signal comprises a powerdown signal having a first logic level and a second logic level.

46. The host adapter integrated circuit of claim 45 wherein said means for selectively providing a clock signal further comprises a logic gate having two input terminals wherein said powerdown signal is applied to one of said two input terminals and the operative clock signal is applied to the other input terminal and further wherein:

said logic gate passes said operative clock signal therethrough when said powerdown signal has said first logic level; and said logic gate fails to pass said operative clock signal therethrough when said powerdown signal has said second logic level.

47. In a host computer system including a host computer data bus, a host processor, and an host adapter integrated circuit having (a) hardwired sequencers for performing predetermined SCSI phases upon programming of said host adapter integrated circuit and (b) a hardware interrupt generating circuit for generating a hardware interrupt upon one of (i) completion of a predetermined SCSI phase, and (ii) predetermined conditions on a SCSI bus having a set of data lines and a set of control lines, a method for transferring data between said host computer data bus and said set of data lines of said SCSI bus comprising:

programming by means of said host processor at least one of said hardwired sequencers to perform at least one SCSI phase wherein said at least one of said hardwired sequencers is connected to said set of control lines of said SCSI bus;

returning control of said host processor to said host computer system;

performing said at least one SCSI phase using said programmed at least one of said hardwired sequencers connected to said set of control lines of said SCSI bus without further use of any processor; and generating a hardware interrupt for said host processor upon completion of said at least one SCSI phase wherein upon receipt of said hardware interrupt, said host processor suspends operation of any program executing in said host computer system.

48. The method of claim 47 further comprising the step of:

generating interrupts indicating the status of said SCSI bus wherein said interrupts are hereinafter referred to as "SCSI interrupts."

49. The method of claim 47 wherein the host adapter integrated circuit further comprises a plurality of registers wherein each register includes a plurality of bits.

50. The method of claim 49 further comprising the step of:

storing interrupt enable bits in at least one of said plurality of registers wherein the SCSI interrupt in the SCSI interrupt generating step is sent to said host processor as a hardware interrupt only when the interrupt enable bit for that SCSI interrupt stored in said at least one register is active.

51. The method of claim 49 further comprising the step of:

storing interrupt status bits in at least one register of said plurality of registers wherein the SCSI interrupt status bit for a SCSI interrupt is active upon generation of the SCSI interrupt for that interrupt status bit by the SCSI interrupt generating step.

52. The method of claim 51 further comprising the step of:

storing interrupt clear bits in at least one register of said plurality of registers wherein the SCSI interrupt status bit for a SCSI interrupt is cleared upon setting of the interrupt clear bit for that SCSI interrupt.

* * * * *